US011678753B2

(12) United States Patent
Kramer

(10) Patent No.: US 11,678,753 B2
(45) Date of Patent: Jun. 20, 2023

(54) FOODWARE SYSTEM INCLUDING A DINING PLATE HAVING SENSING COMPONENT, AND INFORMATION AND ENTERTAINMENT DISPLAY

(71) Applicant: James F. Kramer, Foster City, CA (US)

(72) Inventor: James F. Kramer, Foster City, CA (US)

( * ) Notice: Subject to any disclaimer, the term of this patent is extended or adjusted under 35 U.S.C. 154(b) by 374 days.

(21) Appl. No.: 17/064,589

(22) Filed: Oct. 6, 2020

(65) Prior Publication Data

US 2021/0186241 A1 Jun. 24, 2021

Related U.S. Application Data

(60) Provisional application No. 62/911,369, filed on Oct. 6, 2019.

(51) Int. Cl.
*A47G 19/02* (2006.01)
*A47G 19/22* (2006.01)
(Continued)

(52) U.S. Cl.
CPC ....... *A47G 19/2227* (2013.01); *A47G 19/025* (2013.01); *F21V 33/0024* (2013.01); *G01G 19/413* (2013.01); *G01G 19/4146* (2013.01); *A47G 2019/2238* (2013.01); *A47G 2019/2244* (2013.01); *A47G 2200/08* (2013.01); *A47G 2200/143* (2013.01); *F21Y 2115/10* (2016.08)

(58) Field of Classification Search
CPC .............. A47G 19/025; A47G 19/2227; A47G 2019/2238; A47G 2023/0658
See application file for complete search history.

(56) References Cited

U.S. PATENT DOCUMENTS

| | | | |
|---|---|---|---|
| 2,114,460 | A | 4/1938 | Ziegler |
| 2,224,319 | A | 12/1940 | Schroyer |

(Continued)

FOREIGN PATENT DOCUMENTS

| | | | |
|---|---|---|---|
| CN | 2066269 | U | 11/1990 |
| CN | 2193094 | Y | 2/1994 |

(Continued)

OTHER PUBLICATIONS

Livewire Enterprises, Product Name: "LiveWire," information from website: www.livewireent.com/galleryparties.shtml, unknown initial posting date.

(Continued)

*Primary Examiner* — Ismael Negron

(57) ABSTRACT

An active foodware system includes dining plates having visual stimulating, sensing, and wireless communication components. A visual stimulating component emits light to provide information or entertainment. The sensing component detects characteristics of the food received in the dining plate, such as weight or temperature. Data related to the food may be displayed on the visual stimulating component, or sent by the wireless communication component to a computer or mobile communication device. Computer software may display nutrition information on the visual stimulating component before, during, and after dining, or provide visual and auditory encouragement for children to eat.

39 Claims, 135 Drawing Sheets

(51) Int. Cl.

| | |
|---|---|
| ***F21V 33/00*** | (2006.01) |
| ***G01G 19/414*** | (2006.01) |
| ***G01G 19/413*** | (2006.01) |
| *F21Y 115/10* | (2016.01) |

(56) References Cited

U.S. PATENT DOCUMENTS

| | | | | |
|---|---|---|---|---|
| 2,658,297 | A | 11/1953 | Woolsey | |
| 2,663,866 | A | 12/1953 | Simpson | |
| 3,205,755 | A | 9/1965 | Sklar | |
| 3,370,163 | A | 2/1968 | Dudley | |
| 3,510,643 | A | 5/1970 | File | |
| 3,705,982 | A | 12/1972 | Smolinski | |
| 3,839,793 | A | 10/1974 | Crapio | |
| 3,878,386 | A | 4/1975 | Douglas | |
| 4,034,213 | A | 7/1977 | Norris | |
| 4,207,673 | A | 6/1980 | DiGirolamo et al. | |
| 4,344,113 | A | 8/1982 | Ditto et al. | |
| 4,390,928 | A | 6/1983 | Runge | |
| 4,803,604 | A | 2/1989 | Nichols et al. | |
| 4,914,819 | A | 4/1990 | Ash | |
| 4,922,355 | A | 5/1990 | Dietz et al. | |
| 4,992,704 | A | 2/1991 | Stinson | |
| 5,023,761 | A | 6/1991 | de Lange | |
| 5,047,267 | A | 9/1991 | Pantaleo et al. | |
| 5,075,970 | A | 12/1991 | Albert | |
| 5,119,279 | A | 6/1992 | Makowsky | |
| 5,189,793 | A | 3/1993 | Ratzon et al. | |
| 5,269,717 | A | 12/1993 | Tardif | |
| 5,299,356 | A | 4/1994 | Maxwell | |
| 5,339,548 | A | 8/1994 | Russell | |
| 5,355,289 | A | 10/1994 | Krenn | |
| 5,421,089 | A | 6/1995 | Dubus et al. | |
| 5,430,628 | A | 7/1995 | Saunders | |
| 5,485,355 | A | 1/1996 | Voskoboinik et al. | |
| 5,553,735 | A | 9/1996 | Kimura | |
| 5,575,553 | A | 11/1996 | Tipton | |
| 5,575,563 | A | 11/1996 | Chiu et al. | |
| 5,678,925 | A | 10/1997 | Garmaise et al. | |
| 5,785,407 | A | 7/1998 | Ratcliffe et al. | |
| 5,966,814 | A | 10/1999 | Lin | |
| 5,969,606 | A | 10/1999 | Reber et al. | |
| 5,983,783 | A | 11/1999 | Archard et al. | |
| 6,084,526 | A | 7/2000 | Blotky et al. | |
| 6,129,292 | A | 10/2000 | Leung et al. | |
| 6,140,932 | A | 10/2000 | Frank et al. | |
| 6,152,575 | A | 11/2000 | Montanino | |
| 6,163,248 | A | 12/2000 | Paek et al. | |
| 6,166,496 | A | 12/2000 | Lys et al. | |
| 6,213,616 | B1 | 4/2001 | Chien | |
| 6,254,247 | B1 | 7/2001 | Carson | |
| 6,335,691 | B1 | 1/2002 | Bird | |
| 6,412,398 | B1 | 7/2002 | Norcross et al. | |
| 6,419,384 | B1 | 7/2002 | Lewis et al. | |
| 6,425,862 | B1 | 7/2002 | Brown | |
| 6,443,589 | B1 | 9/2002 | Lee | |
| 6,464,222 | B1 | 10/2002 | Parker | |
| 6,511,196 | B1 | 1/2003 | Hoy | |
| 6,591,524 | B1 | 7/2003 | Lewis et al. | |
| 6,675,483 | B2 | 1/2004 | Bond et al. | |
| 6,793,362 | B2 | 9/2004 | Tai | |
| 6,864,462 | B2 | 3/2005 | Sanoner et al. | |
| 6,865,815 | B1 | 3/2005 | Dunn et al. | |
| 7,163,311 | B2 | 1/2007 | Kramer | |
| 7,409,765 | B2 | 8/2008 | So | |
| 8,672,504 | B2 | 3/2014 | Kramer | |
| 9,737,173 | B2 | 8/2017 | Kramer | |
| 9,782,027 | B2 | 10/2017 | Kramer | |
| 10,085,598 | B2 | 10/2018 | Kramer | |
| 10,091,972 | B1 * | 10/2018 | Jensen | A01K 7/02 |
| 10,881,249 | B2 | 1/2021 | Kramer | |
| 2002/0079317 | A1 * | 6/2002 | Scott | A47G 19/025 220/574 |
| 2002/0097195 | A1 | 7/2002 | Frank | |
| 2002/0124017 | A1 | 9/2002 | Mault | |
| 2002/0137990 | A1 | 9/2002 | Cardoso | |
| 2003/0041106 | A1 | 2/2003 | Tuli | |
| 2003/0122730 | A1 | 7/2003 | Frank et al. | |
| 2003/0210141 | A1 | 11/2003 | Iacovino | |
| 2004/0032730 | A1 * | 2/2004 | Ciarrocchi, Jr. | A47G 23/0309 362/276 |
| 2004/0118618 | A1 | 6/2004 | Davidson | |
| 2004/0177434 | A1 | 9/2004 | Sputh | |
| 2006/0158870 | A1 * | 7/2006 | Lee | A47G 19/025 362/109 |
| 2006/0158886 | A1 * | 7/2006 | Lee | A47G 19/025 362/652 |
| 2007/0028453 | A1 | 2/2007 | Crow | |
| 2008/0019122 | A1 | 1/2008 | Kramer | |
| 2012/0106158 | A1 * | 5/2012 | Vaessen | A47G 23/06 362/253 |
| 2017/0202379 | A1 * | 7/2017 | Vucicevic | A61B 5/053 |
| 2017/0273488 | A1 * | 9/2017 | Lonis | A47G 23/16 |
| 2017/0347818 | A1 * | 12/2017 | Song | A47G 19/2227 |
| 2018/0132643 | A1 * | 5/2018 | Shklar | G01F 23/266 |
| 2021/0398645 | A1 * | 12/2021 | Dev | G16H 10/20 |

FOREIGN PATENT DOCUMENTS

| | | | |
|---|---|---|---|
| CN | 2159160 | Y | 3/1994 |
| CN | 2386735 | Y | 7/2000 |
| CN | 2495211 | Y | 6/2002 |
| DE | 19950250 | A1 | 4/2001 |
| GB | 1577289 | A | 5/1978 |
| JP | H06-237849 | A | 8/1994 |
| JP | H07-020933 | U | 4/1995 |
| JP | H08-112182 | A | 5/1996 |
| JP | H09-056563 | A | 3/1997 |
| JP | 2001-190386 | A | 7/2001 |
| JP | 2003-255877 | A | 9/2003 |
| JP | 2004-041613 | A | 2/2004 |
| JP | 2004-105231 | A | 4/2004 |
| KR | 20020064809 | A | 8/2002 |
| KR | P2002-0084015 | | 11/2002 |
| WO | 9602183 | A1 | 2/1996 |
| WO | 0225228 | A2 | 3/2002 |

OTHER PUBLICATIONS

Matthew Crowley, "Inventions: Glitter Gulp," Las Vegas Review Journal, Feb. 10, 2003, website: www.reviewjoumal.com/lvrj_home/2003/Feb-10-Mon-2003/business/20583098.html.

ebigchina.com, Product Name: "Flash Ice Glass," information from website: www.ebigchina.com/ebcps/4/pd/811728.html?mode=?popup, unknown initial posting date.

coolstuffcheap.com, Product Name: "Lighted Barware," information from website: www.coolstuffcheap.com/lightware.html, unknown initial posting date.

shop.com, Product Name: "Fiber Optic Stemmed Glass," information from website: www.shop.com/op/aprod-~fiber+optic+stemmed+glass-s66761, unknown initial posting date.

reluct.com, Category: "EL Wire Light Objects," information from website: www.reluct.com/home/2004_07_25_archive.html, unknown initial posting date.

Connie Cheng and Leonardo Bonanni, Counter Intelligence—MIT Media Lab, "Intelligent Spoon," website: www.media.mit.edu/ci/projects/intelligentspoon.html, unknown initial posting date.

* cited by examiner 1338
1339
1340
1341

1342
1327
1326
1322
1323
1324

1328
1325
1305
1306
1301
1302

1303
1304
1300
1336
1337
1329
1330
1335
1334

1333
1331
1332
1347
1348
1344
1345

1346
1343
1314
1308
1315
1309
1318
1312
1313

1321
1319
1310
1320
1311
1317
1316

FIG. 15A
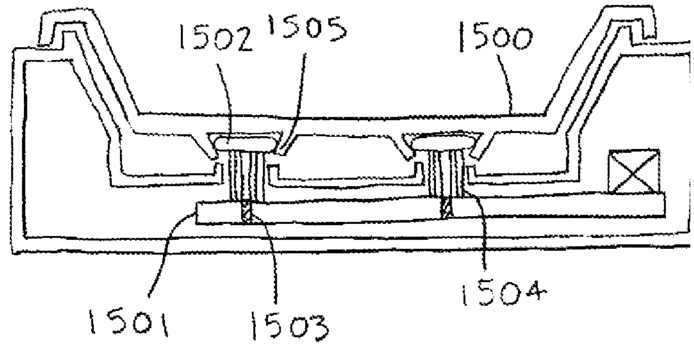
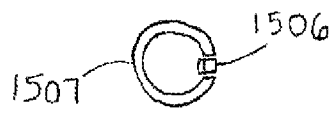
FIG. 15B
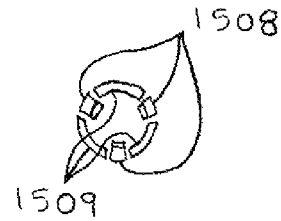
FIG. 15C
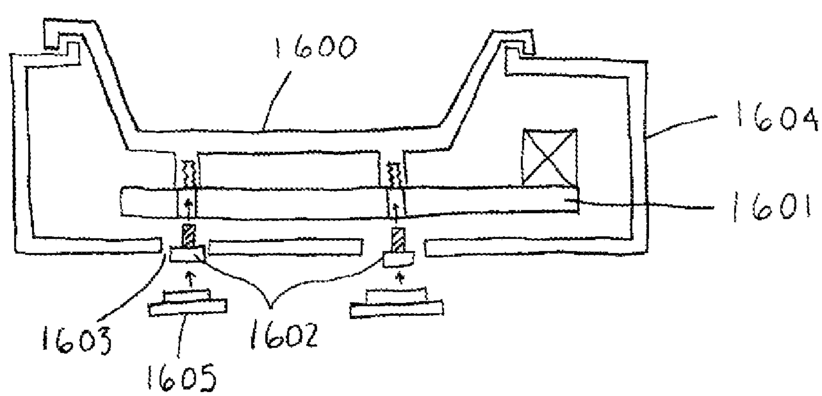
FIG. 16

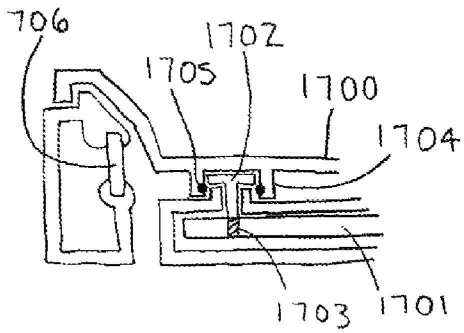
FIG. 17A
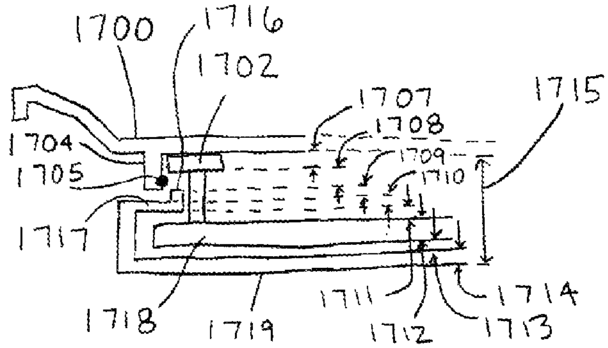
FIG. 17B
FIG. 18
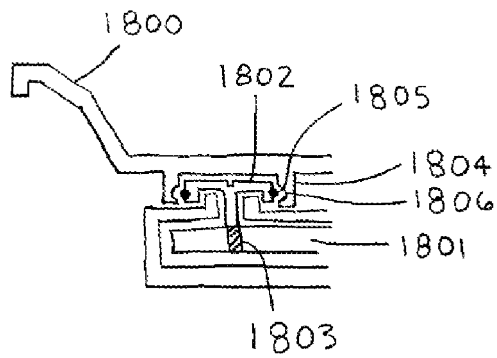
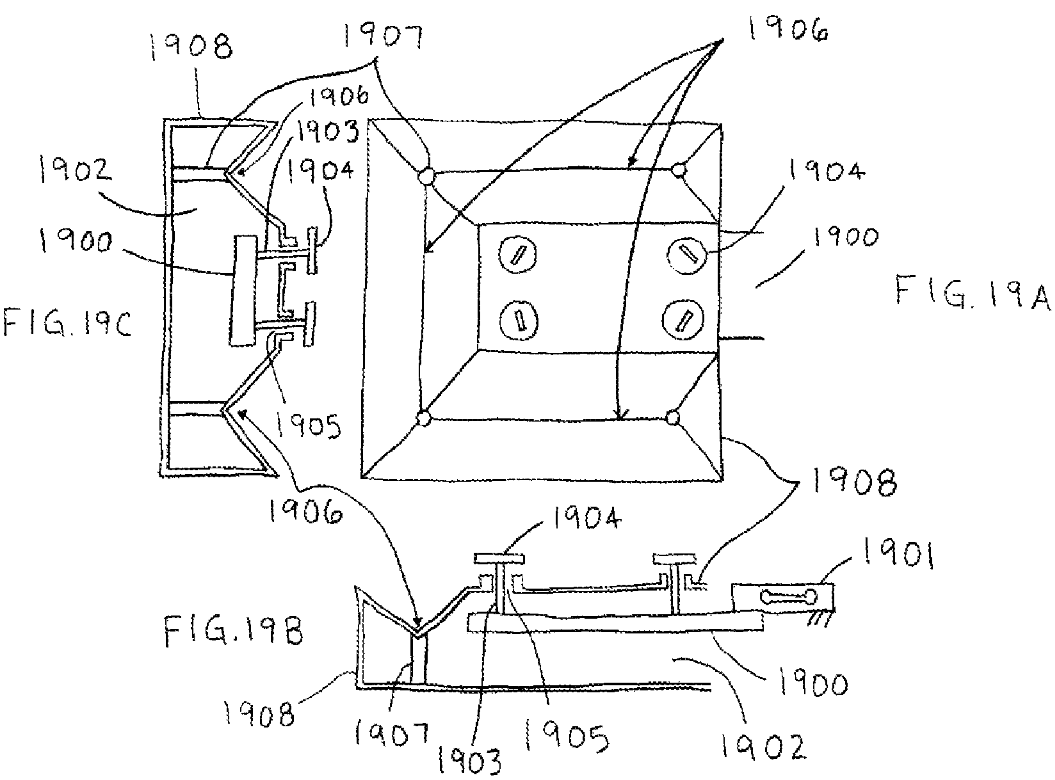
FIG. 19C
FIG. 19A
FIG. 19B

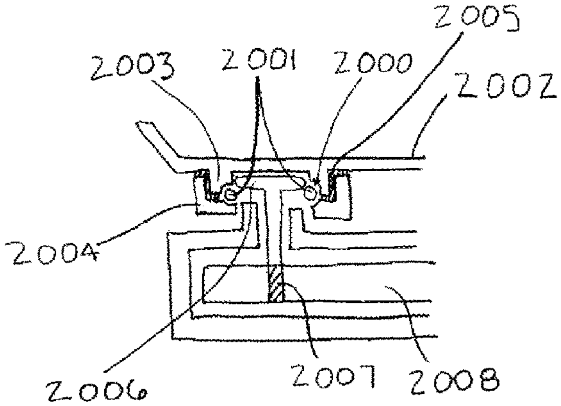
FIG. 20A
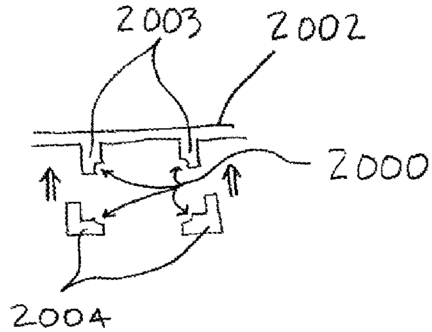
FIG. 20B
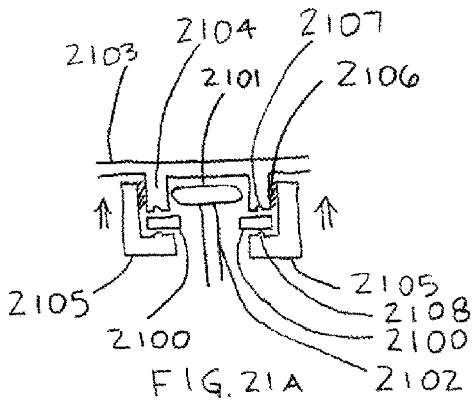
FIG. 21A
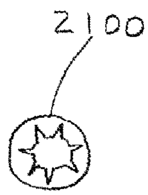
FIG. 21B
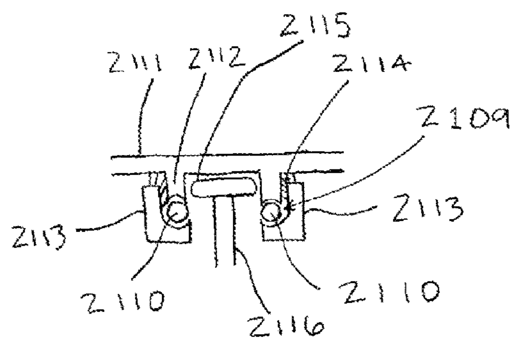
FIG. 21C
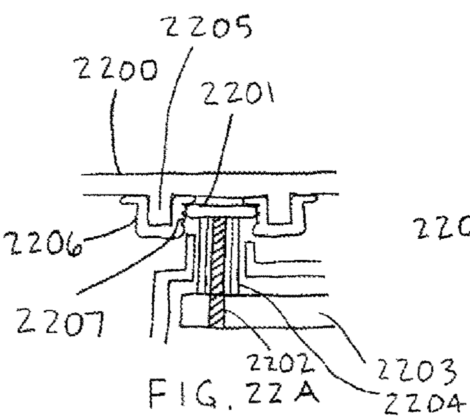
FIG. 22A
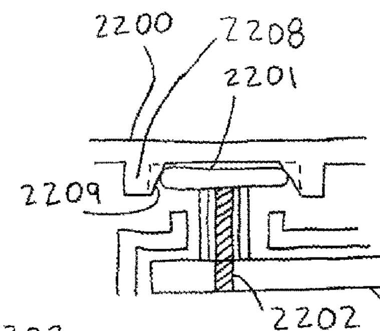
FIG. 22B
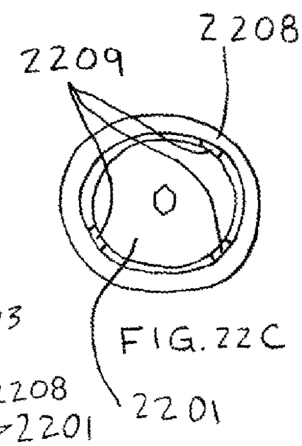
FIG. 22C
FIG. 22D
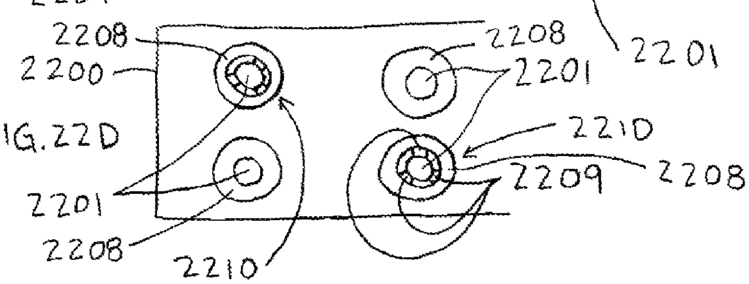

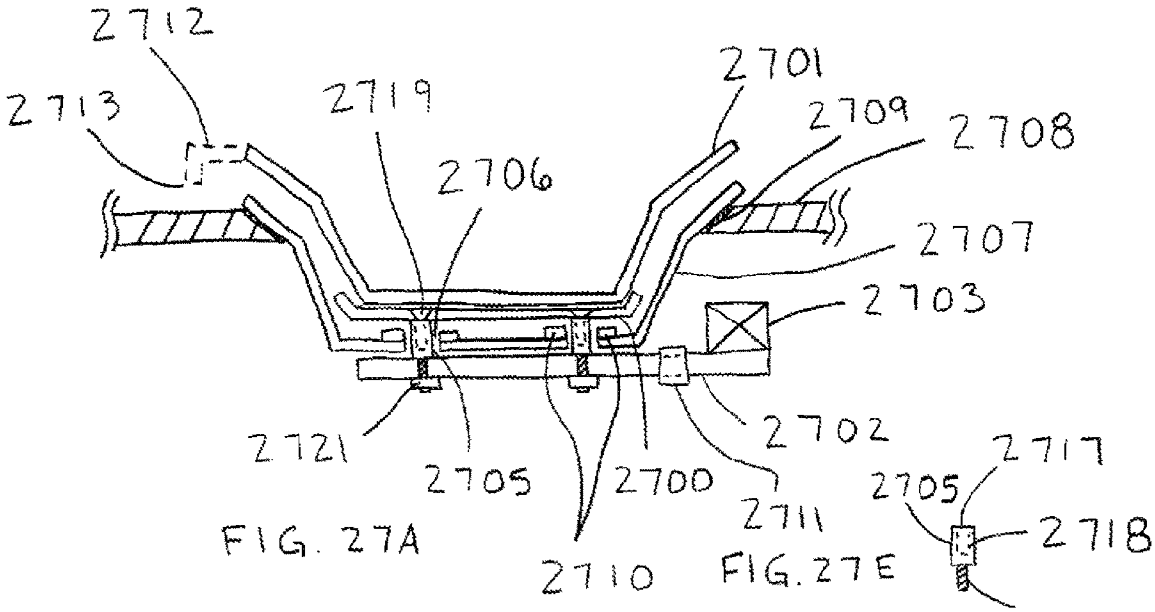
FIG. 27A
FIG. 27E
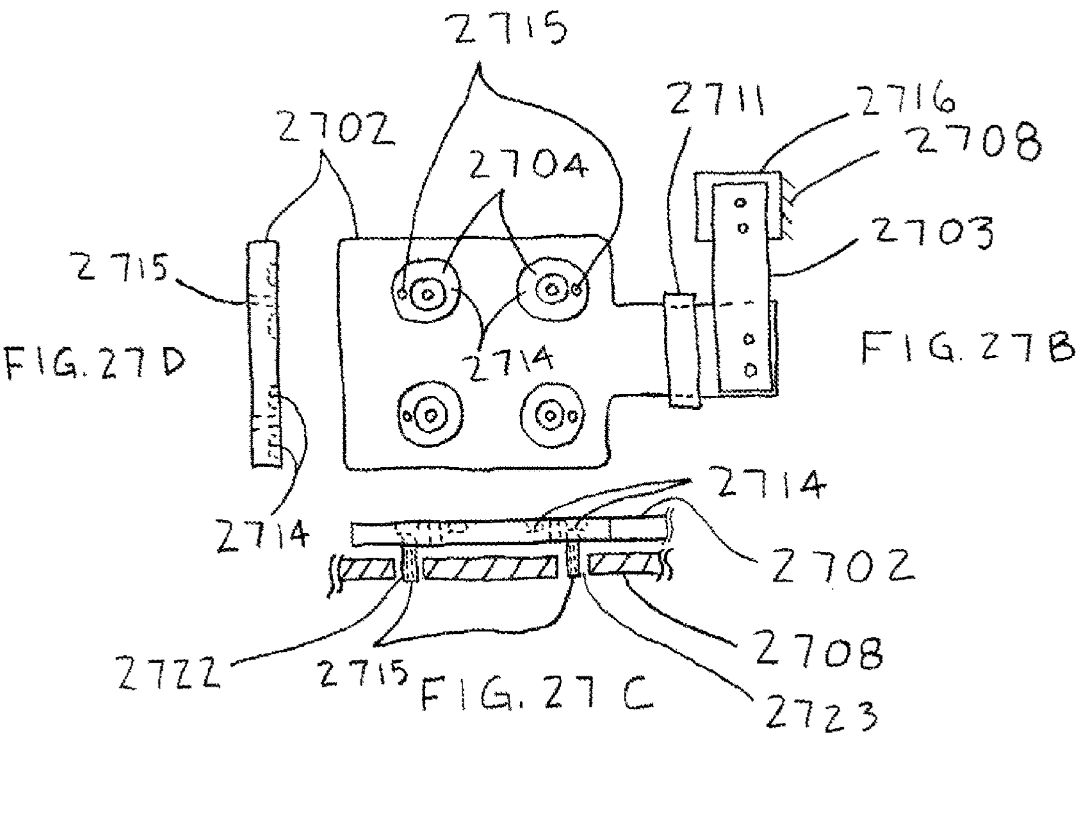
FIG. 27D
FIG. 27B
FIG. 27C

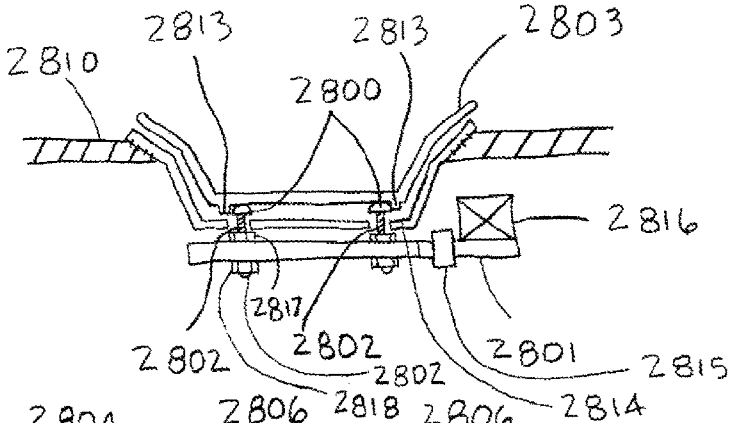
FIG. 28A
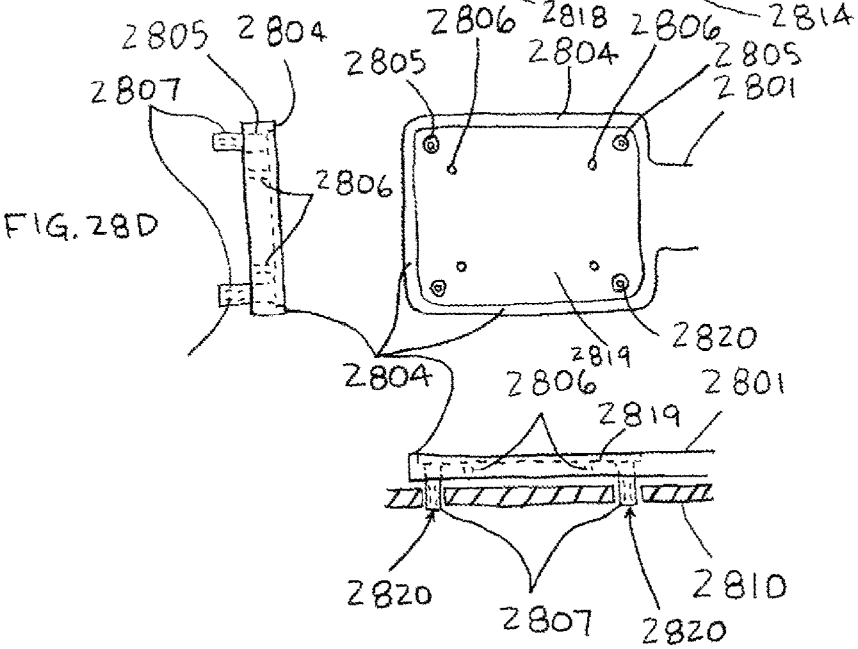
FIG. 28D
FIG. 28B
FIG. 28C
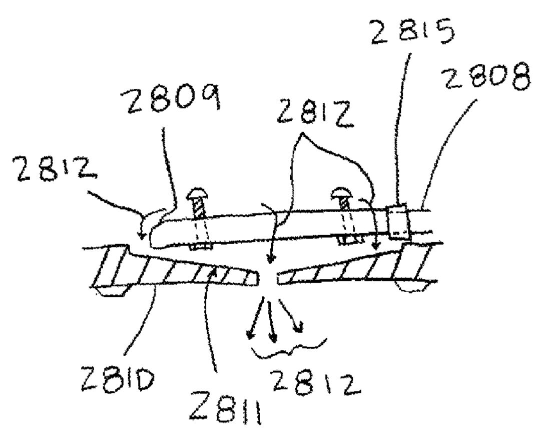
FIG. 28E
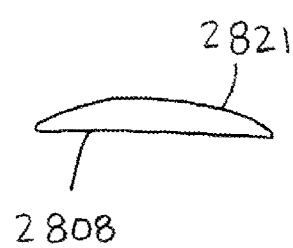
FIG. 28F

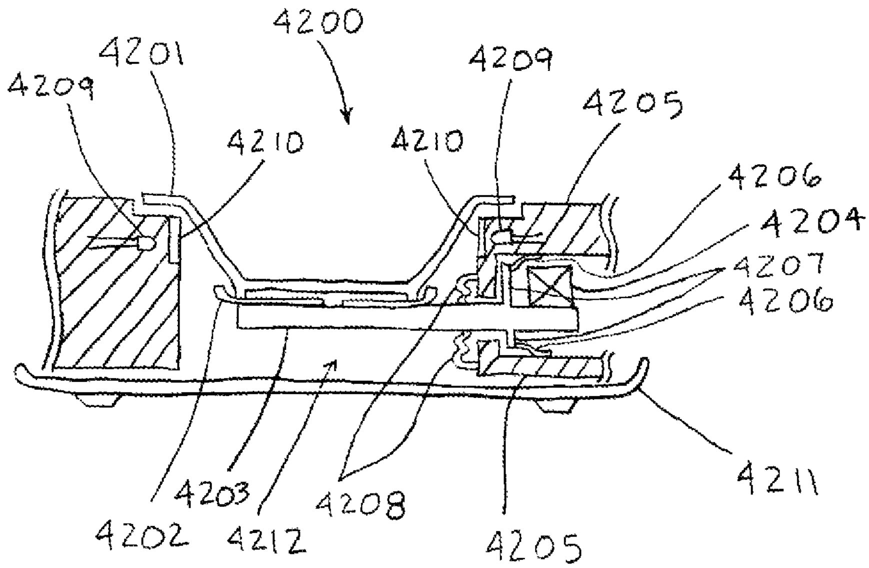
FIG. 42
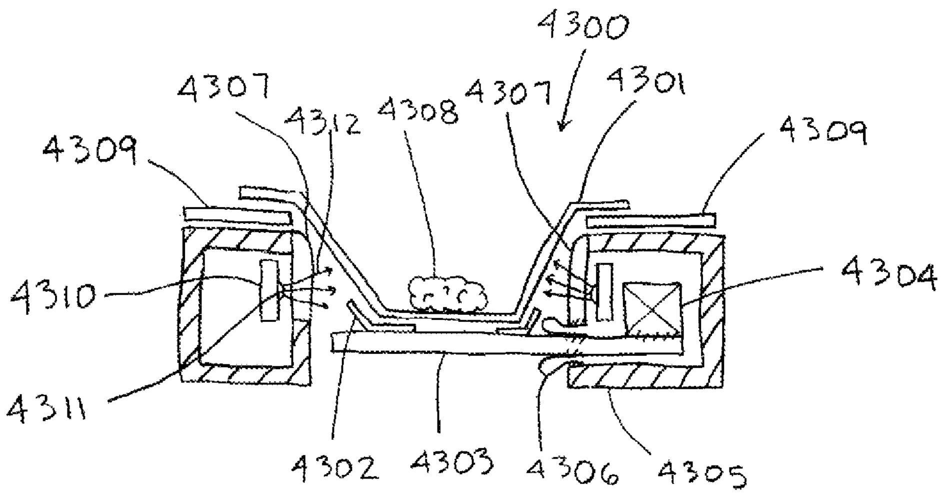
FIG. 43A
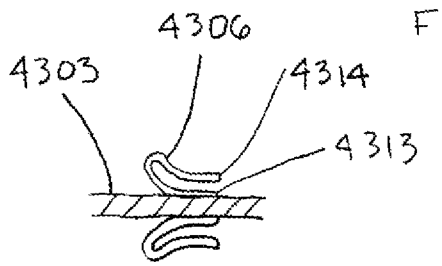
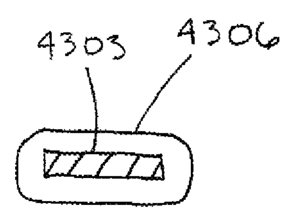
FIG. 43B
FIG. 43C FIG. 45A
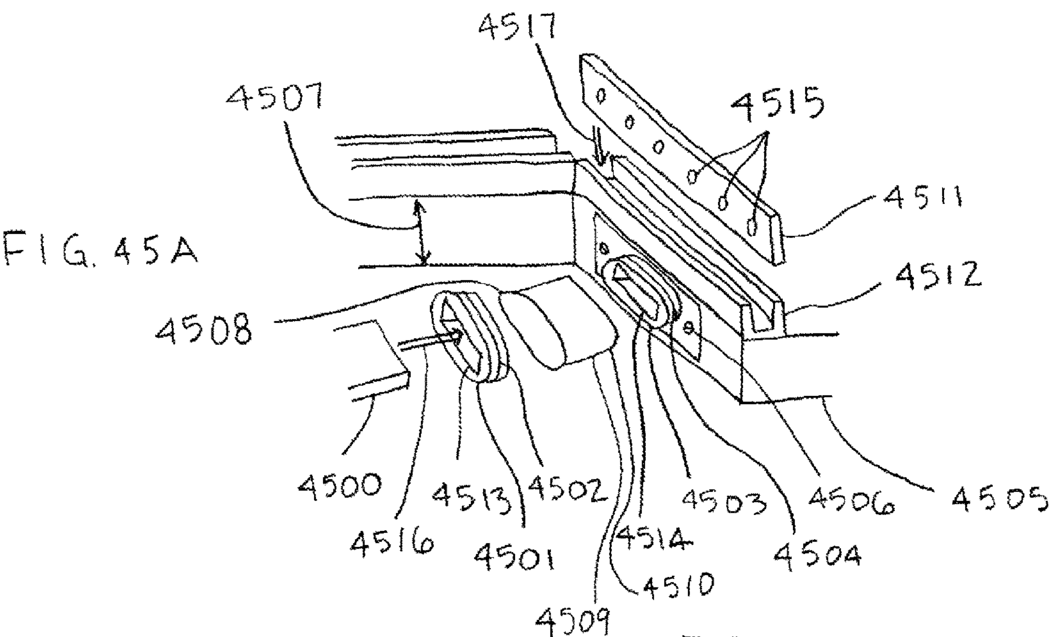
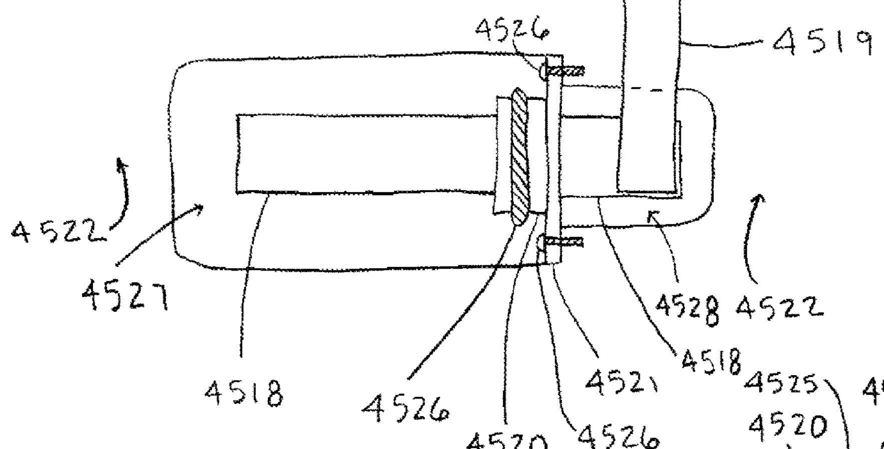
FIG. 45B
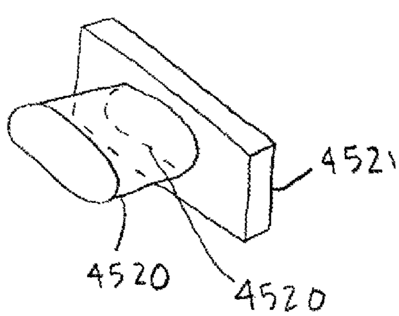
FIG. 45C
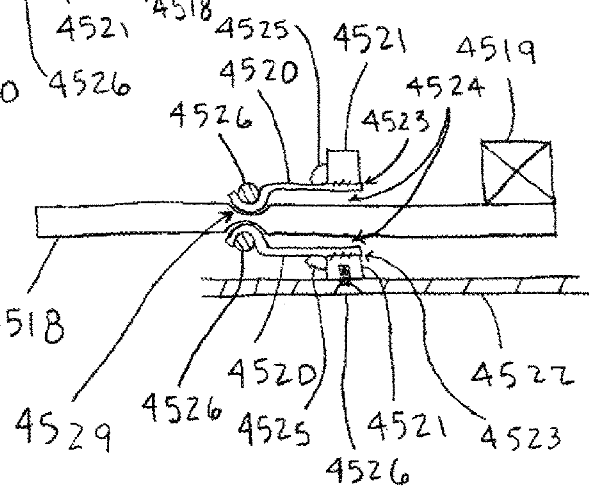
FIG. 45D FIG. 49A
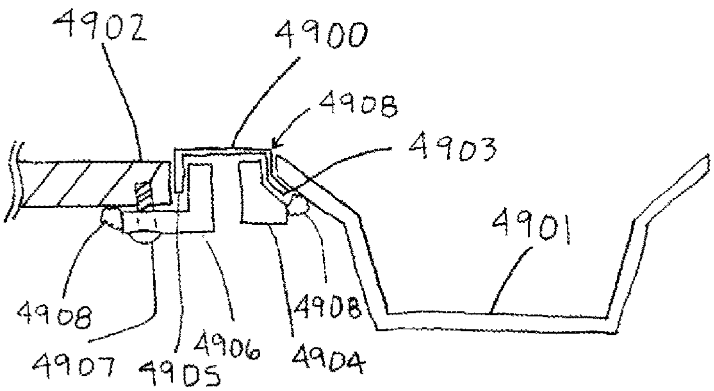
FIG. 49F
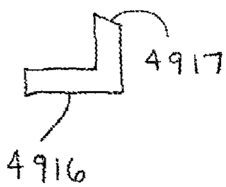
FIG. 49H
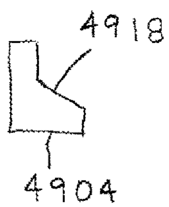
FIG. 49G
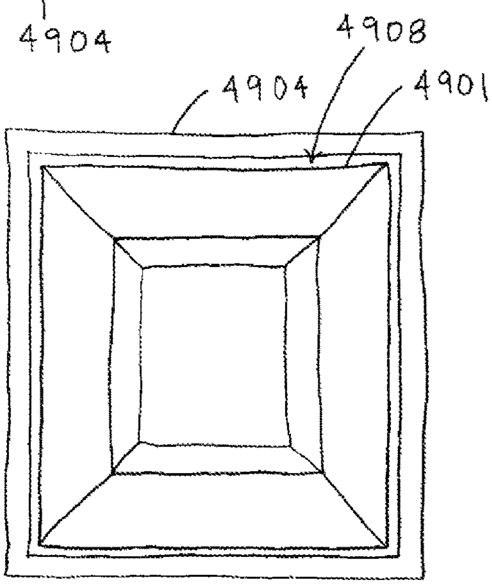
FIG. 49B
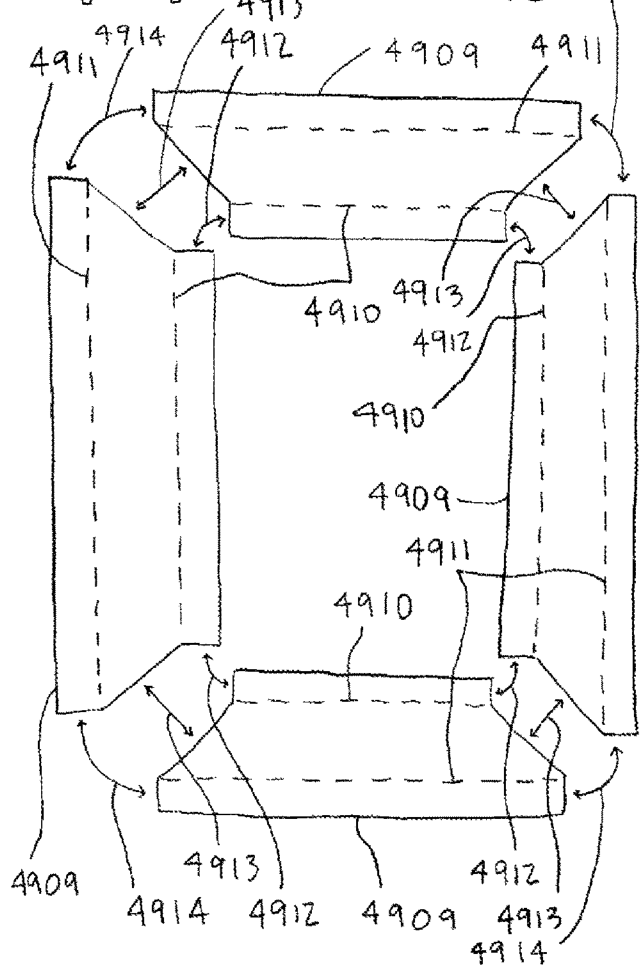
FIG. 49C FIG. 52A
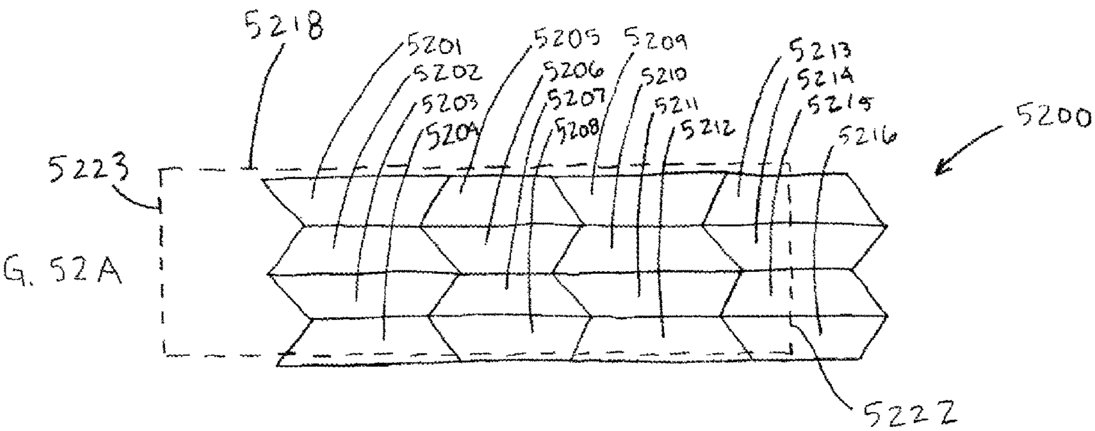
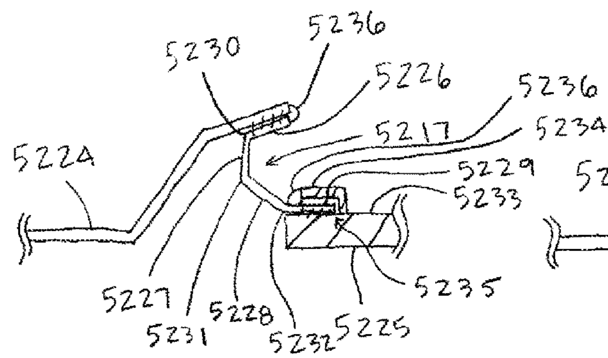
FIG. 52B
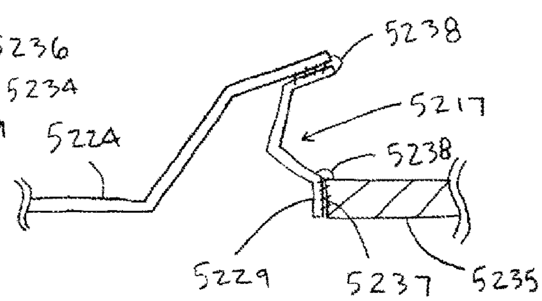
FIG. 52C
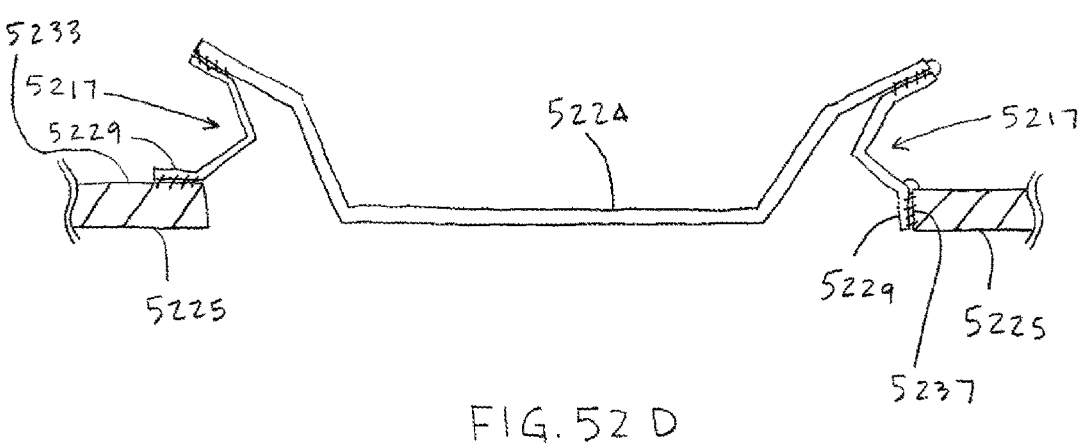
FIG. 52D FIG. 52E
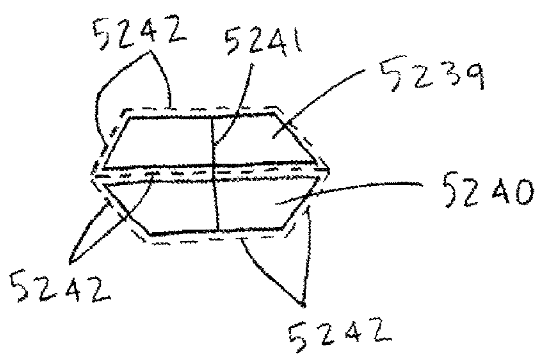
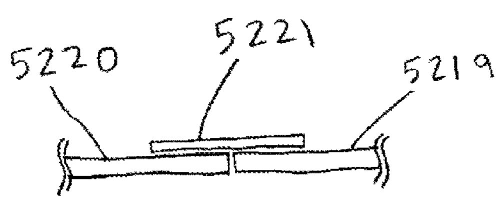
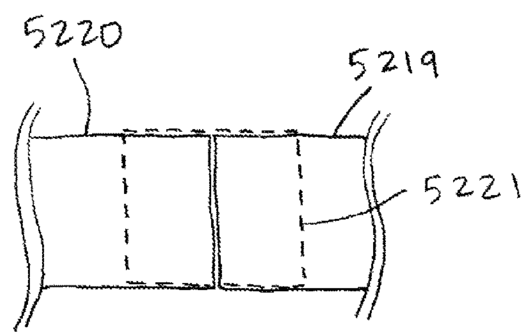
FIG. 52F
FIG. 52G

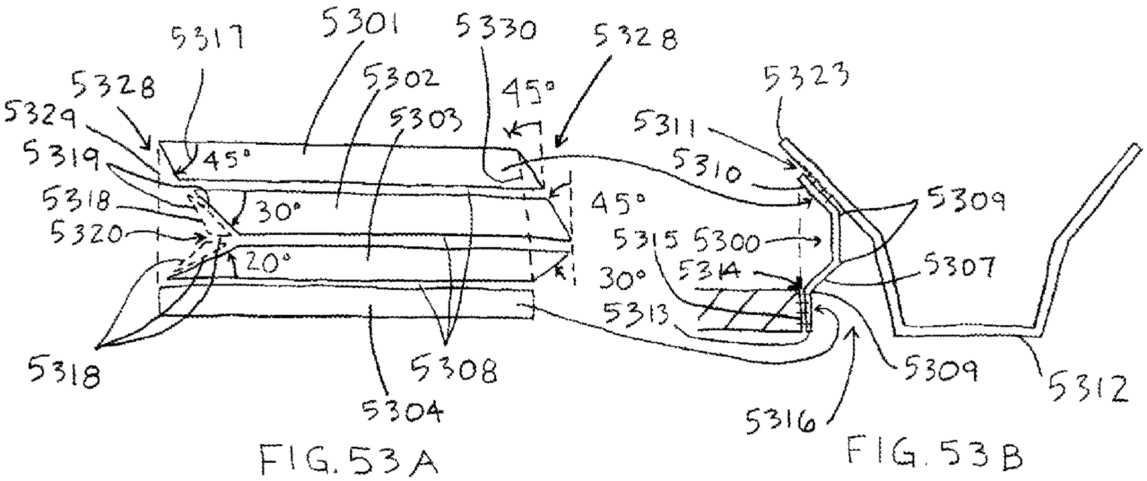
FIG. 53A
FIG. 53B
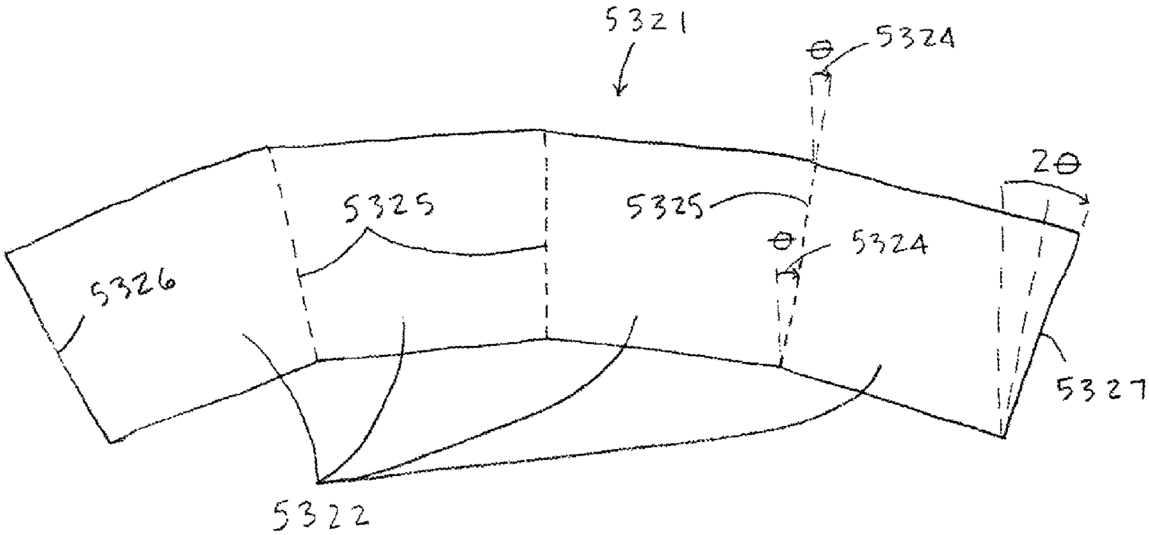
FIG. 53C

5800

SmartDish™
5806
5803

5807
5812
5812
5802
5803
5801
5803
5802

5802
5809
5805
5804
5814

5808
5813

5810

5811

5816
5815

FIG. 59A
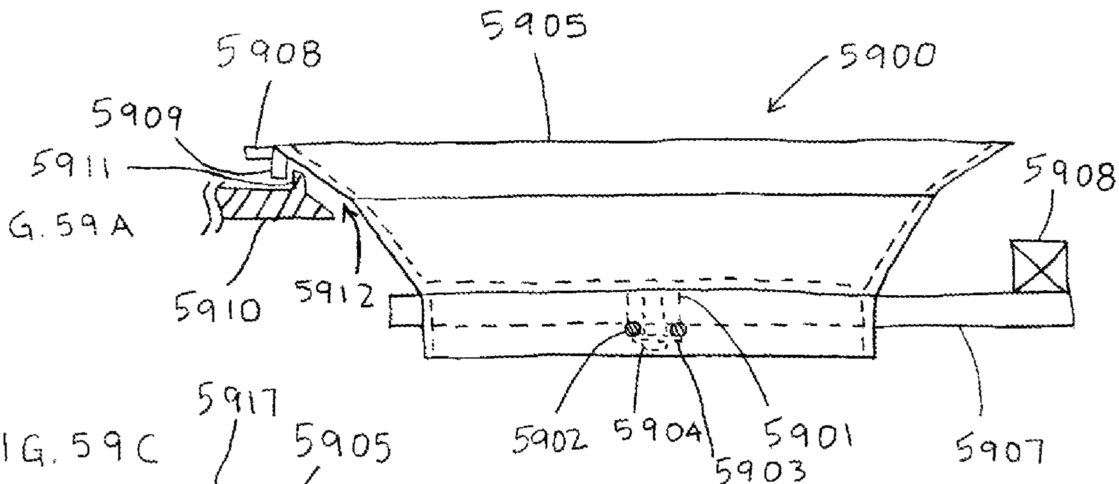
FIG. 59C
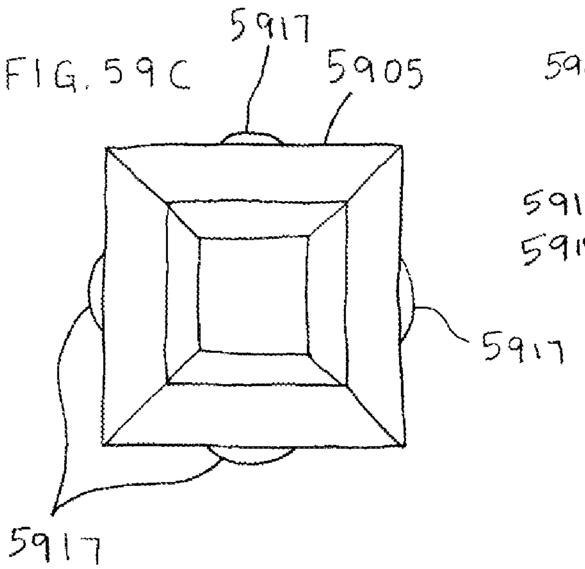
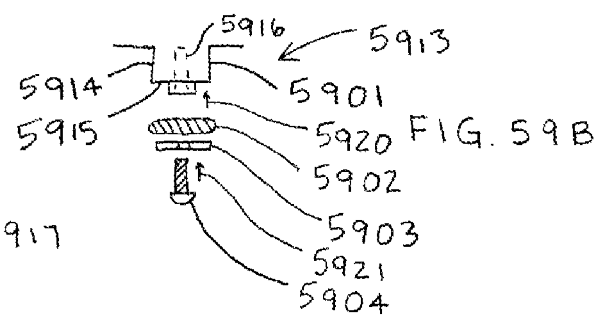
FIG. 59B
FIG. 59D
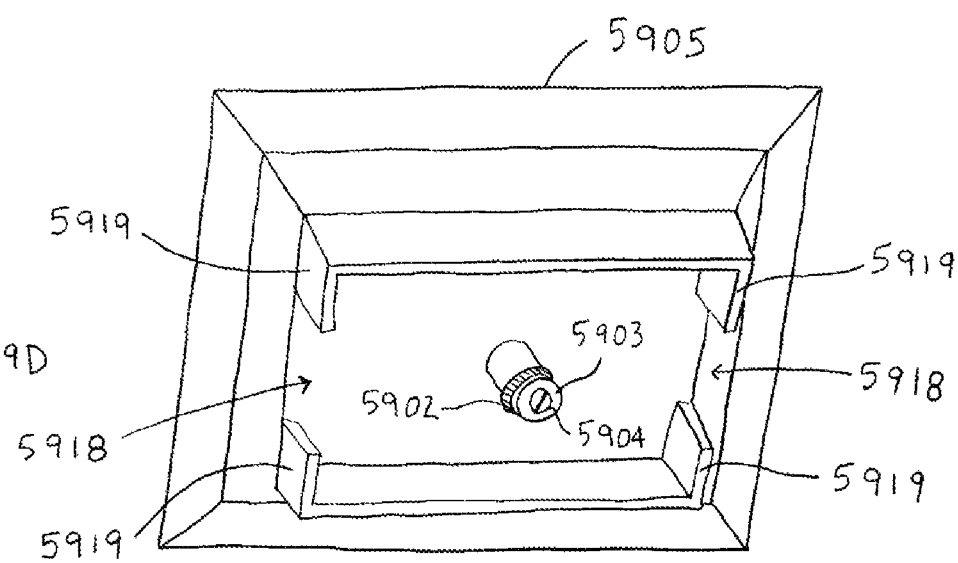
FIG. 59E
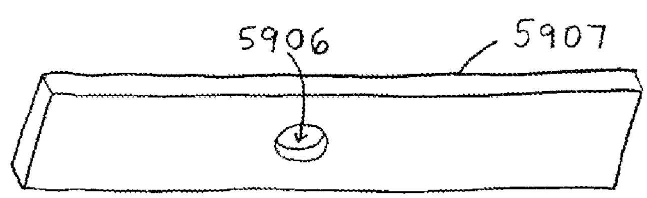

FIG. 62
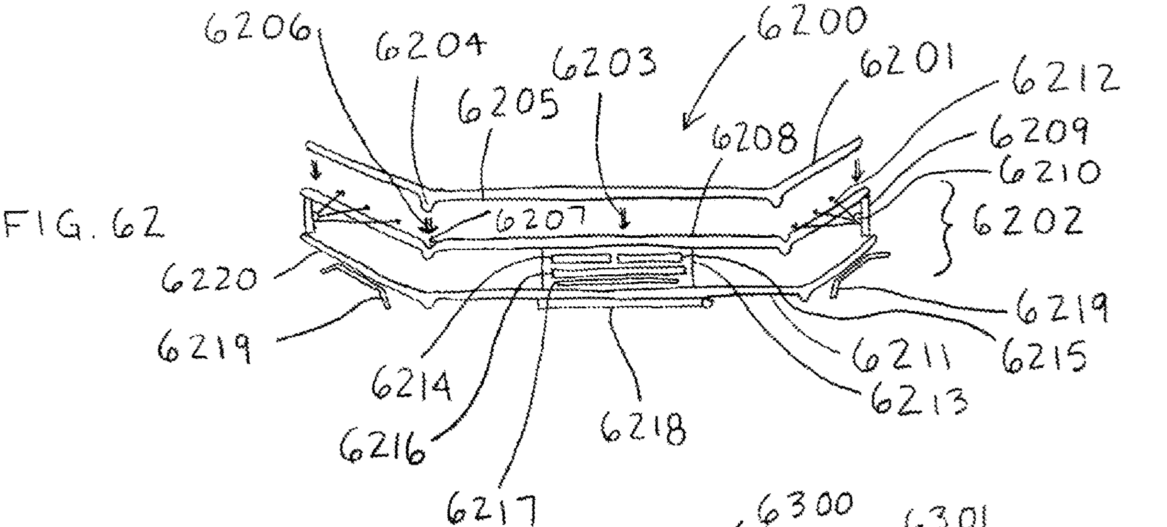
FIG. 63A
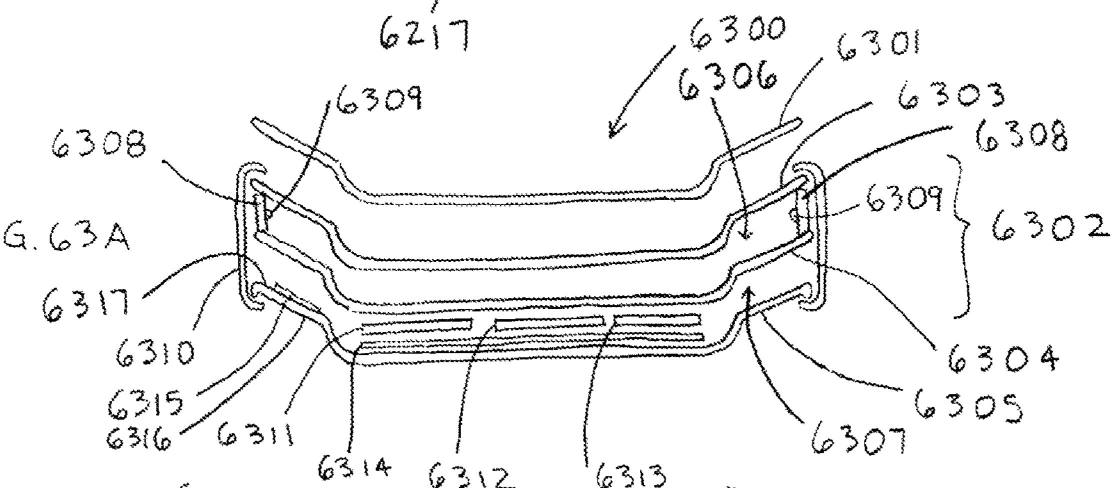
FIG. 63B
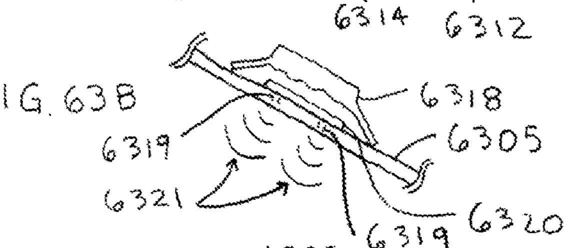
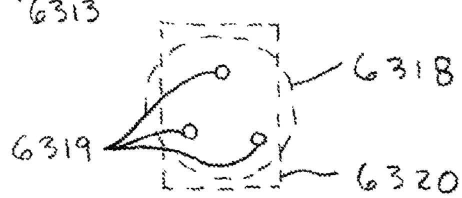
FIG. 63C
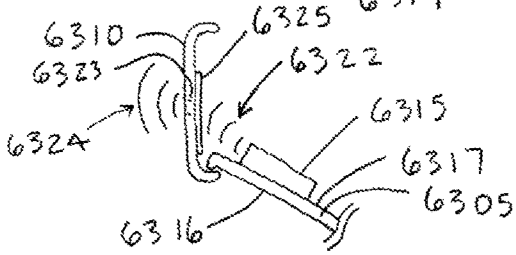
FIG. 63D

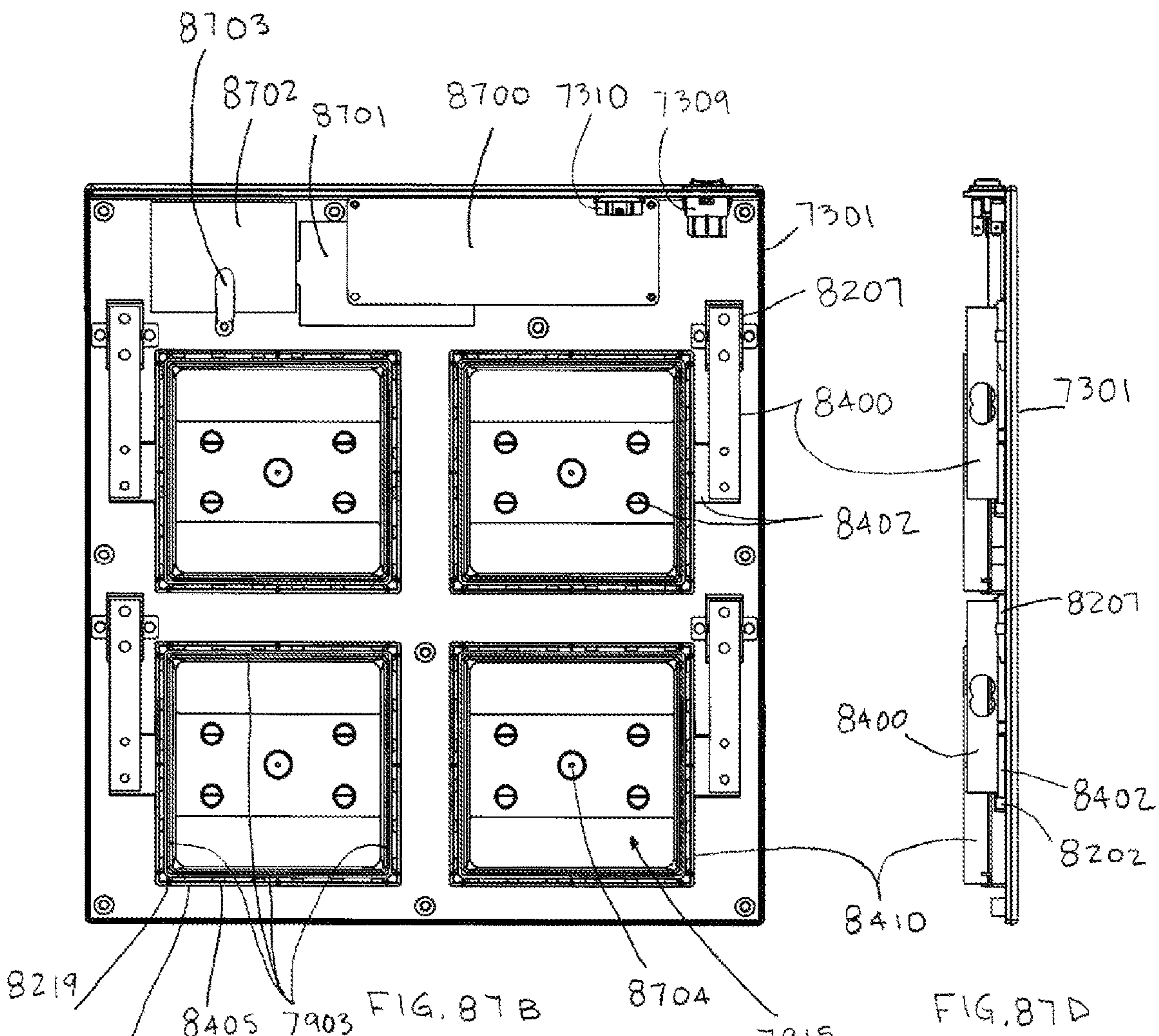
FIG. 87B
FIG. 87D
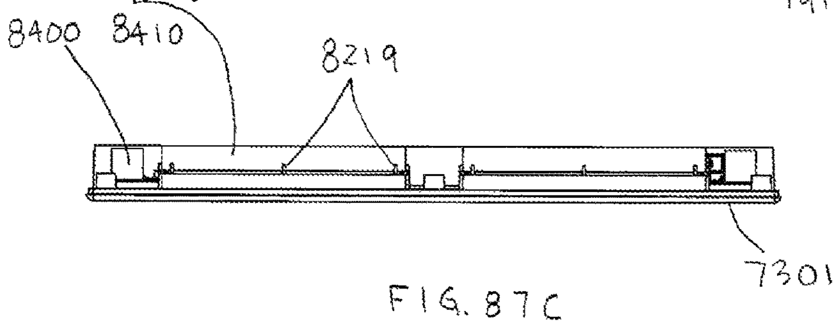
FIG. 87C

FIG. 102A
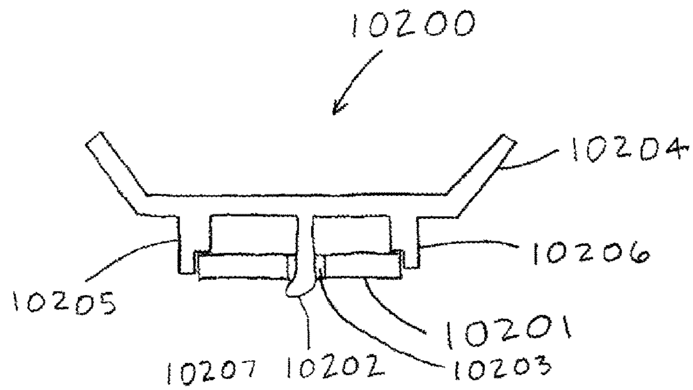
FIG. 102B
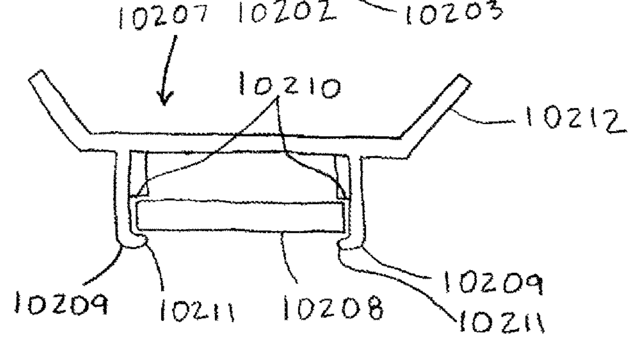
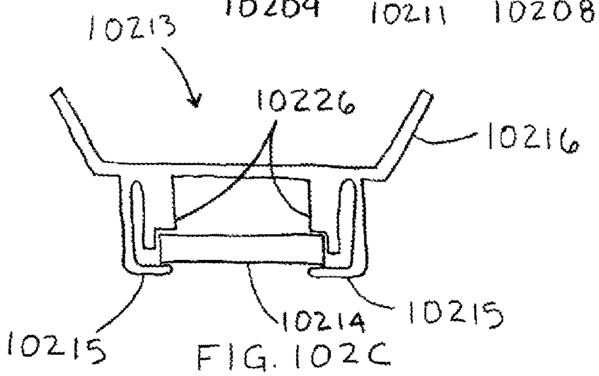
FIG. 102C
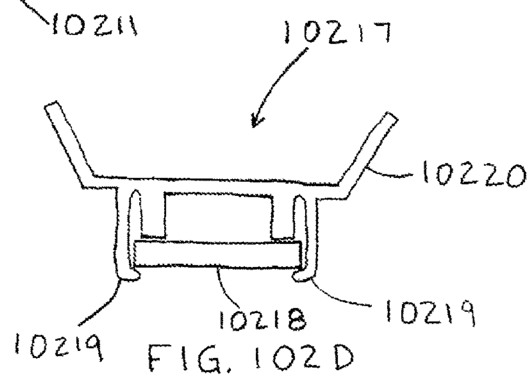
FIG. 102D
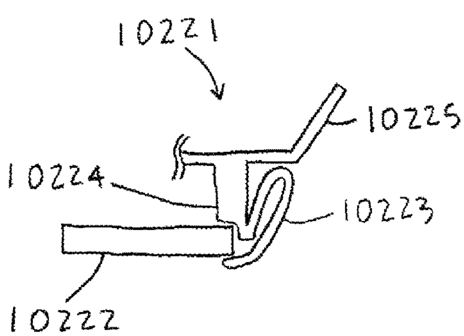
FIG. 102E
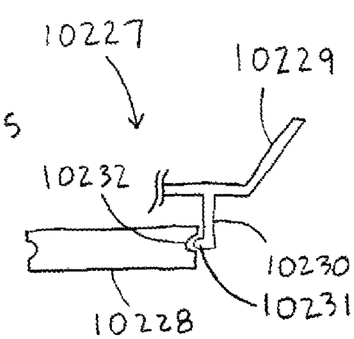
FIG. 102F
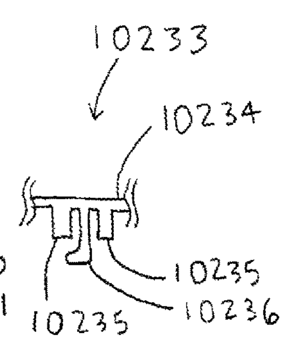
FIG. 102G

FOODWARE SYSTEM INCLUDING A DINING PLATE HAVING SENSING COMPONENT, AND INFORMATION AND ENTERTAINMENT DISPLAY

TECHNICAL FIELD

The field of this invention is devices associated with food presentation and/or consumption.

BACKGROUND

Much of our lives are spent consuming food, including beverages. Ingestion is the primary object. However, there are a number of situations where one wishes to have some additional experience with eating. With a number of people, one can have a conversation associated with the consumption. However, eating alone can be a solitary experience. We have all seen restaurants where the diners are involved in eating and watching television. Children can be recalcitrant when a parent is trying to feed them. To encourage children to eat, various plate designs have been used. Labels on containers are static and limited to having a printed design. Fast food chains have various dishes with graphic designs, such as the latest movie hero. In these situations the diner is involved with stimuli other than the food for different purposes. The other stimuli can involve entertainment, distraction, reward or the like.

For the most part the diner does not have control over what is being presented, as in the case of television, or the presentation is static and quickly loses its attraction, as in dining plate design. In addition, there is an interest in using the period of time in which the diner is eating to present information.

Also, there is an interest in providing dishware, utensils and beverage containers with attractive designs. At dinners, there is an effort to have the china, glassware, and utensils to be properly related to have an attractive table. On many occasions, one is celebrating an event or holiday where the decorations are related to the event or holiday. Having separate sets of china for each event is beyond the ability of most households to afford and store.

Furthermore, one is interested in providing dynamic flexible components, where the programs for the viewer can be readily changed, adapted to particular situations, and expanded, as desired. A personal computer ("PC") provides opportunities to devise programs that can be related to specific situations associated with dining. Even with the decreasing costs of computers, the computer is still a significant investment to be dedicated to a dining experience. Being able to use available data processing equipment without the investment associated with a dedicated instrument is advantageous. Marrying dishware with data processing equipment already owned by a user provides substantial economic advantages and encourages the combination of food presentation with a programmed data processor.

There are a number of devices that are found in non-analogous art and have found different purposes than providing a dining experience. For example, the game Pong, invented by Nolan Bushnell, was provided as a visual game to allow two players to compete in bouncing a virtual ball against a virtual wall. Such game could be produced in a table form where the players ostensibly could have had food that was supported by the table. However, the potential for food to be present existed, but the food was not associated with the game and the presence of food was incidental to the purpose of device. Other devices have been used to weigh food, such as a food scale. Conceivably, a food scale could have a processor for indicating the weight and allied information, e.g., units of weight, but any visual presentation is limited to weight and not to consumption of food.

An opportunity exists to provide devices associated with food presentation that provide more than support for the food and can be modified in relation to the needs of a particular situation.

LITERATURE

Garmaise, U.S. Pat. No. 5,678,925, describes a mug for sensing and indicating the temperature of its liquid contents. Tipton, U.S. Pat. No. 5,575,553, describes a container with light encapsulated in the sidewall for illuminating the sidewall. Crapio, U.S. Pat. No. 3,839,793, describes a utensil with exposed LED. Reber, et al., U.S. Pat. No. 5,969,606, describes a food storage container with humidity sensor. de Lange, U.S. Pat. No. 5,023,761, describes a utensil holder with light for illuminating the food at the working end of the utensil. Voskoboinik, et al., U.S. Pat. No. 5,485,355, describes cable-like electroluminescent light sources. Albert, U.S. Pat. No. 5,075,970, describes a sound-emitting utensil. Carson, U.S. Pat. No. 6,254,247 B1, describes a liquid container and method for producing a holographic image on the container.

SUMMARY OF THE INVENTION

The subject invention relates to foodware systems with single media or multimedia capabilities and optionally communication capabilities. Active foodware systems are provided producing sensory signals, particularly in recognizable formats, where the signals are initiated by an independent action, generally related to the food being presented. Such active foodware systems may also be associated with user input, such as verbal or contact, and can also be programmable. Typical active foodware system feedback will usually include at least one of visual, auditory and haptic feedback, employing optical sources, such as point light sources, images, and information; oral sources, such as microphones, speakers and voice synthesizers, allowing for verbal interaction and communication capability; and the like. The active foodware system may directly or indirectly provide the signals, where the active foodware system, particularly translucent plates or dishes, can be seated on an underplate having the indicated capabilities. Components of the devices include processors, memory, computer programs in the memory, power sources, feedback devices, speakers, fiber optic components, light sources, ports, and the like. In many instances when a light source is referred to as a light emitting diode (LED) the light source may be a laser diode. The active foodware system can have independent data processing and a monitor or be fitted to a laptop PC where the laptop monitor provides the visual presentation and data processing, analysis of signals obtained from the active foodware system and the opportunity to vary the visual presentation. The active foodware system of the subject invention has a multitude of uses, including but not limited to informing or entertaining the user/diner, and may display television signals, radio signals, music player signals, computer signals and the like.

BRIEF DESCRIPTION OF THE DRAWINGS

FIG. 15A is an end view of a portion of an active foodware system where a dining plate mating structure is easily removably snapped to the heads of screws screwed into a cantilever beam. FIG. 15B is a bottom view of a clip including a retaining ring and a single clip for holding the dining plate mating structure to the head of a screw. FIG. 15C is a bottom view of a clip including a retaining structure similar to FIG. 15B, but where there are a plurality of clips and a plurality of retaining rings.

FIG. 16 is an end view of a portion of an active foodware system where the dining plate mating structure is screwed to a cantilever beam with screws that may be accessed through holes in the bottom of a housing structure.

FIGS. 17A-17B are an end view of a portion of an active foodware where a dining plate mating structure has extensions having O-rings for easily removably snapping to the heads of screws screwed into a cantilever beam.

FIG. 18 is an end view of a portion of an active foodware system where a dining plate mating structure has extensions having grooves for mating with O-rings held by the periphery of the heads of screws screwed into a cantilever beam.

FIG. 19A is a plan view, FIG. 19B is an end view, and FIG. 19C is a side view of a portion of an active foodware system having a cantilever beam extending from a load cell inside a cantilever compartment that is intended to remain mostly dry and food free. A trough is formed on the top of the cantilever compartment for channeling away any liquid that gets under the dining plate mating structure. The trough channels liquid to drain holes that exit out the bottom of the active foodware housing structure.

FIGS. 20A-20B are an end view of a portion of an active foodware system providing a structure for creating a groove for holding an O-ring.

FIG. 21A is an end view of a portion of an active foodware system providing a structure for holding a rubber washer for clipping to a screw head of a screw screwed into a cantilever beam. FIG. 21B is an example rubber washer, such as a silicone rubber washer, for clipping over a screw head. FIG. 21C is an end view of a portion of an active foodware system providing a structure for creating a groove for holding an O-ring.

FIGS. 22A-22B are end views of a portion of an active foodware system providing a structure for clipping a dining plate mating structure to a screw head of a screw 202 screwed into a cantilever beam. FIG. 22C is a bottom view of the extension of FIG. 22B having a plurality of angled portions to wedge onto the screw head. FIG. 22D is a plan view of FIG. 22B with four screw heads.

FIG. 23 also provides drainage paths.

FIG. 27A is a side section view of a dining plate mating structure supporting a dining plate. FIG. 27B is a plan view of a cantilever extending at substantially 90 degrees from a beam load cell, providing drainage paths for allowing liquid to drain that gets under the dining plate mating structure and onto the cantilever beam. FIG. 27C is a side view of FIG. 27B with some hidden lines shown, and FIG. 27D is an end view of FIG. 27B with some hidden lines shown, of the cantilever of FIG. 27B. FIG. 27E is a side view of a standoff with a threaded hole, and a threaded screw for receiving a nut.

FIG. 28A is a side section view of a dining plate mating structure consisting primarily of the heads of screws screwed into a cantilever. A dining plate removably attaches directly to the screw heads. FIG. 28B is a plan view of a cantilever with a liquid-retaining ridge around its periphery, and with liquid-drainage holes. FIG. 28C is a side view of FIG. 28B with some hidden lines shown, and FIG. 28D is an end view of the cantilever of FIG. 28B with some hidden lines shown. FIG. 28E is a side view alternative to FIG. 28C which replaces drainage tubes with a cantilever with a curved top, and a bottom of the housing structure with sloped surfaces. FIG. 28F is an end view of the alternate cantilever of FIG. 28E, where the top surface is curved to allow liquid to drain off the sides.

FIG. 39A is a perspective view of a polyurethane laminate fabric cover covering a portion of a cantilever.

Similar to FIG. 34A.

Similar to FIG. 34A.

FIG. 42 provides two alternate embodiments where the cantilever has a watertight seal between a cantilever and a housing structure. In the first embodiment, a seal attaches to a portion of the cantilever and to the housing structure. In the second embodiment, a bellows-like diaphragm seal attaches to the cantilever and to the housing structure.

Similar to FIG. 42, the embodiment of FIG. 43A has a watertight seal attached between the cantilever and the housing structure. The seal may also attach to a lens. FIG. 43B is a close-up view of the water seal. FIG. 43C is an end view of FIG. 43B.

FIG. 45A is an exploded perspective view of a portion of an active foodware system for making a cantilever watertight. FIGS. 45B-45D are similar in some aspects to the embodiment of FIG. 45A, where FIG. 45B is a plan view, FIG. 45C is a perspective view, and 45D is a side view.

The side section views of FIGS. 46A-46J are for embodiments similar in some aspects to the embodiment of FIG. 24C, which is a water-resistant design. However, rather than including a liquid partial barrier, as is provided by FIG. 24C, the embodiments of FIGS. 46A-46K include a variety of bellows designs to block liquid and food from getting under a dining plate mating structure.

FIG. 49A is a side section view of a portion of an embodiment of a waterproof fabric extending from a dining plate mating structure to a surrounding rim of a housing structure. FIG. 49B is a plan view of a portion of the embodiment of FIG. 49A. FIG. 49C is a plan view of four pieces of a pattern for making the waterproof fabric of FIG. 49A. When the four pattern pieces are joined, the waterproof fabric has a U-shaped cross-section as provided by the side cross-section view of FIG. 49H. FIG. 49F is a side section view of an alternative bracket for the bracket of FIG. 49A. FIG. 49G is a side section view of another bracket of the embodiment of FIG. 49A.

FIG. 52A is a plan view of a pattern for making 16 stiffeners for a square bellows. FIGS. 52B-52D are side section views of portions of square bellows for providing a flexible seal and extending from a dining plate mating structure to a surrounding rim of a housing structure. FIG. 52E is a plan view of a portion of a bellows. FIG. 52F is a side section view, and FIG. 52G is a plan view, of right and left ends of PUL fabric butted next to each other and joined using single-sided tape, creating a PUL fabric loop.

FIG. 53A is a plan view of 6 stiffeners for each of the four sides of a square bellows. FIG. 53B is a side section view of the square bellows attached. FIG. 53C is a plan view of a pattern for the material of four sides of a pyramid-frustum bellows.

FIG. 59A is a side view of a portion of an embodiment of an active foodware system having a protuberance having a rubber O-ring or plastic C-clip, a retaining washer, and a screw attached to the bottom of a dining plate mating structure. FIG. 59B is a side exploded view of a portion of FIG. 59A. FIG. 59C is a plan view of the dining plate mating structure of FIG. 59A. FIG. 59D is a perspective view from beneath the dining plate mating structure. FIG. 59E is a perspective view from beneath the load-cell cantilever, showing a cantilever hole.

FIG. 62 is a side section view of an active foodware system, also called a ChillPlate™, having a dining plate positioned by an underplate structure, also called a DataPlate™. An LED strip with LEDs is positioned around the perimeter of the underplate, with light from the LEDs emitting through the underplate.

FIG. 63A is a side section view of an active foodware system, also called a ChillPlate™, and also called an IlluMiDish™. The underplate structure has a top light-diffusing plate structure, a middle reflective plate structure, and a bottom component enclosure plate structure. An LED strip with LEDs is positioned around the perimeter of the underplate. FIG. 63B is a side section view, and FIG. 63C is a plan view of a disc speaker placed over holes in the bottom plate structure. FIG. 63D is a side section view of a smartphone speaker, such as a flat iPhone® speaker.

FIGS. 87A-87F are a perspective, plan, front, right-side, bottom, and rear view, respectively, of the base with a few of the components that are typically inside of the mechanical housing structure of the useful embodiment of the active foodware system of FIG. 73A.

FIG. 96 provides an example app display for a computer, mobile phone, tablet computer, and the like.

FIG. 102A is an end section view of a portion of an embodiment of an active foodware system including a flexure arm that extends through a hole in the cantilever for holding the dining plate mating structure to the cantilever. FIGS. 102B-102G are end section views of various flexures.

FIG. 110A is a side section view of a portion of an embodiment of an active foodware system similar to FIG. 108A, where a dining plate mating structure is not yet lowered and attached to a base piece. In FIG. 110B an O-ring is attached to a cantilever by a flathead screw threaded into the cantilever.

Figure 111A:
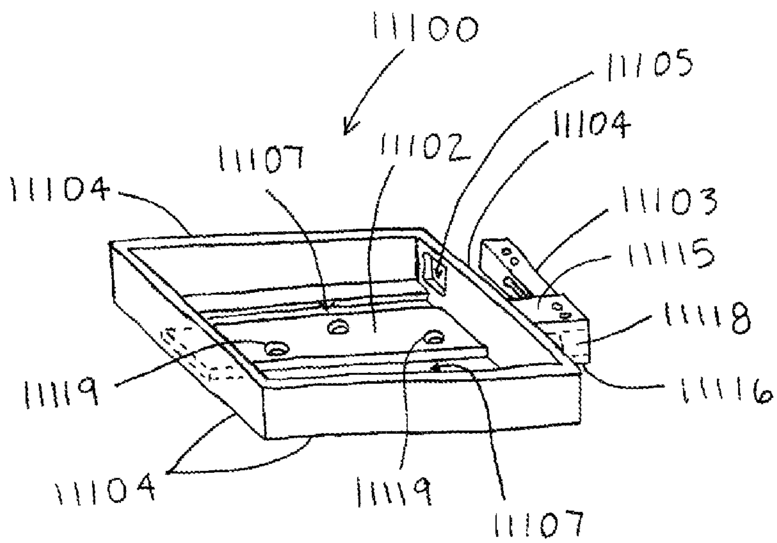
Figure 111B:
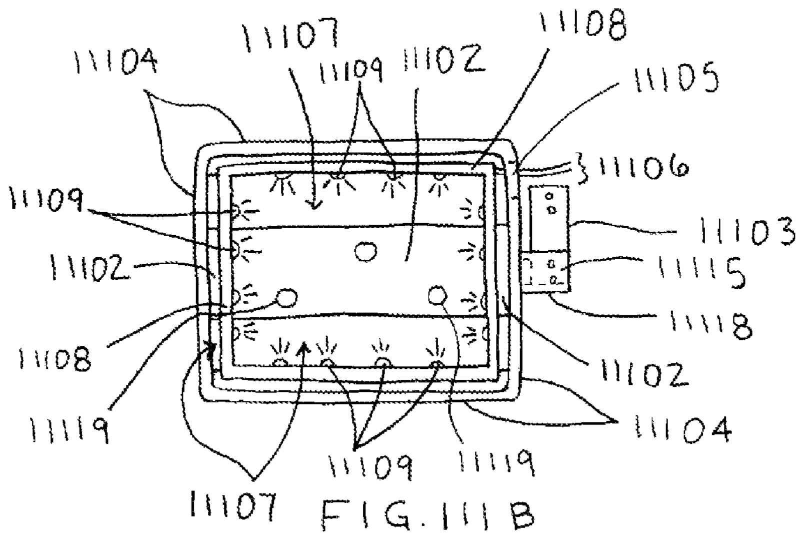
Figure 111C:
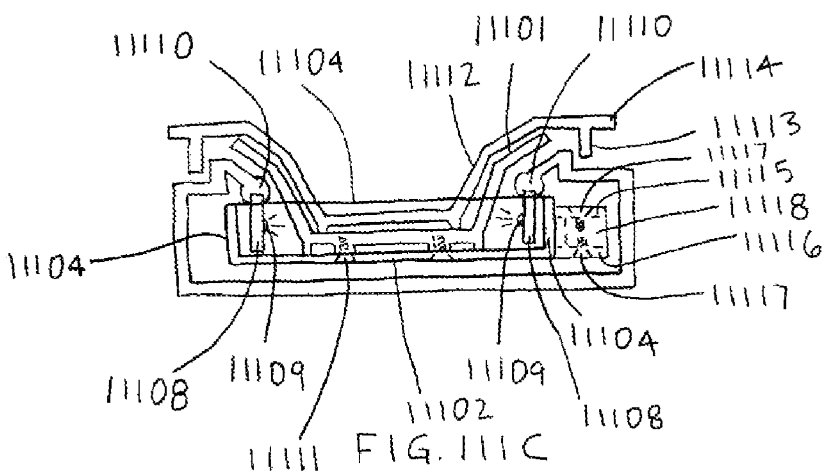

FIG. 111A is a perspective view of a portion of an embodiment of an active foodware system, including a main cantilever together with multiple cantilever support beams and structure surrounding the main cantilever. FIG. 111B is a plan view of the portion of FIG. 111A, additionally providing an LED strip with LEDs. FIG. 111C is a side section view of the portion of FIG. 111B, additionally providing a dining dish on a dining plate mating structure.

DETAILED DESCRIPTION OF THE INVENTION

An active foodware system is provided that can afford single media or multimedia presentation. The active foodware system comprises devices that provide at least one of visual, auditory and haptic stimuli, usually at least visual, where the stimuli can be related to the food being presented. The active foodware system may comprise a power source, a device or devices for producing signals and may also include a device or devices for sensing and/or receiving signals and a processor for processing signals and/or data. The active foodware system may include all of the sensing and stimuli producing devices. The active foodware system may also include the circuitry to control the devices and perform the various activities provided by the active foodware system.

The active foodware system comprises as a central element a dining surface. The dining surface is equivalent to an eating surface and is the exposed surface of an eating or dining plate. The dining surface will be recessed as compared to a region surrounding the dining surface. The recessed surface serves to receive food and the surrounding region prevents spillage. In combination with the dining surface will be a mechanical structure supporting the dining surface.

Also as part of the system will be at least one of a sensing component, a stimulating component or a processor component; or the mechanical structure will have a form to separably receive a processor module. Typically, when the mechanical structure has a stimulating component as other than a software controlled graphical display below the dining surface, then light emanates from the dining surface or the mechanical structure is integral with the dining surface. When the sensing component senses weight, typically the stimulating component will include information other than information provided by a scale.

Typically one of the sensing, stimulating or processor components will be in functional relationship with a mechanical structure. These components may be attached, integral, molded or sealed into, encased, in contact with, connected to or otherwise directly involved with the mechanical structure. Alternatively, the mechanical structure may have a “space,” where space includes a cavity, slot, opening, etc., for receiving a processor component, usually with the mechanical structure able to cover at least a portion of the processor component, particularly during dining.

The mechanical structure is intended to be supported by furniture, such as a dining table, desk, high chair, and the like, types of furniture that find use for dining, although not necessarily limited to dining. The furniture raises the mechanical structure to a level where dining is convenient with the mechanical structure, but may raise the dining surface to a level somewhat higher than the level at which one normally dines. The height to which the mechanical structure is raised will generally be about 2.5 feet or greater and less than about 3.5 feet, where the mechanical structure will generally raise the dining surface to less than about 1 foot above the support. In the case of a plate, the dining surface may be raised about an inch or less.

The active foodware system typically has a dining plate having an exposed dining surface for receiving and presenting food. Referring to a “dining plate” or “dining dish,” the dining plate or dining dish typically includes any recessed relatively flat dining surface, deeper dining dish, dining bowl, and the like, where one typically uses a utensil or one’s fingers to remove the food. It may also include a controller, such as a switch, control circuit, processor, etc. for controlling sensory stimulation or sensing components. Thus the active foodware system can appeal to various organoleptic characteristics. The stimulating and sensing components can be related to the food being presented, either directly or indirectly, such as presence of the food, consumption of the food, temperature, food menu, selection, etc., or providing attention-attracting stimuli, such as entertainment, information, educational presentation, promotional advertisements, etc., which can keep the diner interested and close to the food. The plate may be a unitary object that includes the dining surface, a light transmissive entity and a support member, where the latter may be the same structural element. Usually, the plate will be associated with a light generator that may be separate or be part of the same structural element. There can be one or more dining surfaces that are contiguous or separated. Each dining surface will usually be in close proximity or juxtaposition to one or more stimulating, e.g., transmissive, entities. Generally, the area under the dining surface will be light transmissive when the light generator is below the dining surface. Typically, the sensing component will be part of the mechanical structure.

Active foodware system components can include or be adapted to include a data processor and visual feedback display unit in an active foodware system. By designing an active foodware system component to fit the unit to form an integral structure, the resulting active foodware system has the flexibility of the unit in providing stimuli while at the same time presenting food to the viewer. Also, signals from the active foodware system component can be processed by the data processor and be used in providing the stimuli. The data processor and visual feedback display unit may be provided by a personal computer, such as a laptop computer with a monitor, or a game console. When the data processor and monitor are integral to other components of the active foodware system, other than a separable dining surface, the combined unit will be referred to as the "sensory unit." When the data processor and monitor are separable from the other components of the active foodware system, other than a separable dining surface, such other components will be referred to as the "separable sensory unit."

A subassembly of the subject invention employs a dining plate with an exposed dining surface and a connector to an external processor for controlling the stimuli. In this way, the subassembly can be sold as an individual entity separate from the processor, where the user may connect the subassembly to the external processor. By having appropriate components integrated with the plate in the subassembly, these can be controlled by the external processor when the subassembly is connected to the external processor.

For the purposes of this invention the "active foodware system" includes all of the components that serve as elements to present, store, utilize or consume food and provide sensory stimulation, sensing and controlling. The active foodware system includes foodware, such as dishware, utensils, containers, flatware, stemware, and ancillary devices used with such entities, such as cup holders. The active foodware system may comprise components or subsystems comprising individual components. A distinction will be made between physically separable and inseparable components and subsystems of the active foodware system. In the system there will be at least a dining surface, such as a dining plate, dining bowl or dining dish, from which food is consumed. The dining surface may be supported by one member of a place setting when in use. There is at least one active component that provides sensory stimulation. There may be one or more passive components. In describing the invention, those components generating or using electrical power will be referred to as "active" components and active subsystems comprise at least one active component. Each of the active components is active in employing electrical power to provide feedback to a user/diner and/or sensing user/diner input. Those components or subsystems that do not generate or use electrical power will be referred to as "passive" components or subsystems, respectively.

In referring to a processor, the processor may be programmable or non-programmable, e.g., hard wired, and there may be one or more processors. Programming may be accomplished with hardware or software. A programmable processor may be a central processing unit (CPU), microcontroller, microprocessor, digital signal processor (DSP), and the like, which is typically connected to ROM and RAM and has a software program in the ROM and/or RAM controlling the programmable processor's operation. The processor may also be a Programmable Logic Array (PLA), Field-Programmable Logic Array (FPLA), Programmable Array Logic (PAL), and the like. The processor will provide for receiving signals from sensors and outputting stimuli of the active foodware system. The processor can be part of an existing system, particularly a commercially available system, having in addition to the processor a graphic display and optionally one or more ports for connection to electronics of the mechanical structure. Such existing systems include generically laptops, where "Laptops" refers to the family of laptop computers, tablet computers, handheld computers, intelligent mobile terminals, and the like. The existing systems also include generically gamepads, where "Gamepads" refers to gamepads, game consoles, and the like. As exemplary are the Sony PSP®, Sony PlayStation® Game Console, Microsoft Xbox®, etc.

The active foodware system may also include sensing capability. Sensing may involve sensing components, including but not limited to contact sensors, touchscreens, motion sensors, proximity sensors, temperature sensors, moisture sensors, pressure sensors, light sensors, sound sensors and the like. The sensing capability may be associated with food characteristics, such as weight, position, center of mass, temperature, movement, color, reflectivity, opacity, size, density, volume, etc.

Stimulation directed to the diner can provide encouragement to eat, rewards for eating, minatory messages, educational messages, information, directions concerning food selection, etc. A portion of the dining surface may have access reversibly blocked. For example, access to dessert may be blocked until the active foodware system senses that the other foods have been eaten.

Other forms of stimulation may include heating of the plate and food, e.g. a heating element in the plate, color patterns, pictures, photographs, etc. For visual stimulation, a light generator is employed. The light generator may take various forms, such as an LCD, LED, electroluminescent wire, fluorescent light, plasma display, neon light, incandescent light, optical fiber, light channel or tube, CRT, etc. When referring to a light generator as a component of a system, the associated video processing, interface and circuitry is inherently included if not explicitly included. When referring to a light generator as a component of a system, the light generator may also include a touch screen, even if not explicitly shown.

The active foodware system can include utensils and vessels with the dining plate. The different components of a place setting may each provide stimulation and sensing and may communicate with each other and a user of the active foodware system. For example, one can provide that the proximity or contact of a utensil to the dining plate can result in encouragement to bring the utensil to the food on the dining surface and recognize when the utensil is moved away from the dining surface.

In distinguishing the subject invention devices from a food scale, the scale is limited to provide solely information about the weight of the food, such as the weight, the units, e.g., grams, in which the weight is presented, cost, and the like.

The active foodware system may be used in a restaurant and provide a food menu, which may be hierarchical. Such an active foodware system may display an image of various food options on the dining surface as the food would actually look if ordered. The active foodware system may allow diner input, ordering and payment, for example, by sensing contact with the plate or voice input. A diner's order on the active foodware system may be automatically directed to the kitchen.

Of particular interest are dining plates, which can be used for presenting food, particularly with conventional or active utensils and drinking receptacles, for demonstration of various designs, for providing information or entertainment, etc. The dining plate will usually be the center of the active foodware system involving most, if not all, of the stimuli to the user/diner.

The dining plates may be active systems or subsystems and have all or some of the circuitry and stimuli producing devices contained in the dining plate. For example, by molding an upper or lower layer of a dining plate having compartments and channels for housing the devices and connecting the devices, the various devices may readily be placed in their appropriate positions and relationships and connected accordingly. One may then seal all of the devices with potting compound, epoxy, fiberglass, and the like, to protect the devices and connectors from moisture. A complementary layer, e.g., undercover, can be attached while the sealant is curing, so as to be bonded to the sealant and provide for an attractive dining plate, e.g., an attractive underlayer. Alternatively, one may provide for a channel proximal to the edge of the dining plate with an underlayer having a ridge fitting into the channel. By having a sealant in the channel or on the ridge, fitting the ridge into the channel will hermetically seal the upper and lower layers to form the dining plate. The design will allow for chambers, leads or the like at the periphery of the dining plate for connection to other components, such as batteries, antennae, etc. A compartment can be provided at the periphery for receiving a battery that would be in operative connection with the internal devices through leads, pads, etc., that can be made of corrosion resistant materials, to allow for washing of the dining plate after removing the battery.

The manner in which the upper and lower layers of the plate are sealed is to provide for a water resistant seal. In this way the dining plate can be washed and the devices and circuitry between the layers are protected from corrosion. By having an external power source or providing for a sealed compartment for receiving a power source, one can provide an integral plate that only lacks the power source, but can be connected with the power source when in use.

The dining plate unit may have an upper dining plate, of which at least a portion is translucent, and an underplate having the various devices for the stimuli or sensing. Such translucent plate would include the dining surface, a transmissive entity and further serve as a support structure for the dining surface. The translucent plate can be glass or various plastics, such as polycarbonate, PVC, Plexiglas, polyethylene, polypropylene, poly-4-methylpentene-1, Delrin®, etc. The translucent plate may be readily molded and typically will be relatively thin to allow for efficient transmission of light from the underplate. Thicknesses in the range of about 1 to 10 mm may be employed. In addition, various designs may be incorporated into the translucent dining plate to cooperate with the stimuli emanating from the underplate.

The foodware system may be capable of communicating data, such as sending data or receiving downloaded data, such as video files, movies, pictures, designs, audio files, computer programs, etc. The data communication may be done offline or streamed in real time. The data communication may be via a wired or wireless link. The data communication may be from or to a website. The data communication may be from or to a server computer. Data communication may be from or to a peer-to-peer network. Data communication may be via any convenient protocol, including http, https, ftp, and the like. The active foodware system may accept external hardware media such as DVDs, CDs, memory sticks, floppy disks, hard drives and the like, where the content may be seen and/or heard on the active foodware system. By having ports, connectors, transmitters or receivers for receiving external signals that can then be presented as stimuli, the active foodware system provides great flexibility. Thus, the active foodware system can be self-contained or rely on external devices to provide signals which are then presented to the user/diner.

The data received by the active foodware system can be utilized in different ways depending upon the type of received data. Typically, if the data is a picture file format, the active foodware system will display a digital image; if the data is a movie or video format, then the active foodware system will display movie or video; if the data is a haptic feedback file format, the active foodware system will provide haptic feedback; if the data is an audio file format, the active foodware system will play sound; and if the data is a computer program, the active foodware system will run the program. However, one type of data may be converted into a different stimulation; for example, an audio format may be converted into a haptic format and/or visual format or may be used to augment a visual image.

By "image" is intended a representation formed by light emission at different sites, usually of other than a simple geometric form. For the most part, the image will be formed by a plurality of light-emitting sites. Light-emitting sites may be obtained with one or more electroluminescent elements, a plurality of LEDs, an LCD display, a fluorescent display, a plasma display, a plurality of incandescent lights, and the like. Simple geometric forms include circles and various regular polygons of from 3-4 sides, such as triangles, squares, and rectangles.

The active foodware system may comprise a mechanical structure having a dining surface and comprising any one of a stimulating component, a sensing component and a processor component, with the component being in proximity to the dining surface, with the dining surface being recessed in relation to a region surrounding the dining surface, with the dining surface being recessed for receiving food and preventing spillage from said dining surface, and in the event that the stimulating component is a visual stimulating component, (a) the visual stimulating component has a plurality of sites that emit light that produces other than a single simple geometric form, or (b) the visual stimulating component is sealed in the mechanical structure.

The active foodware system may also comprise: a dining surface, where the dining surface is recessed in relation to a region surrounding the dining surface, where the dining surface is recessed for receiving food and preventing spillage from the dining surface, and in combination with the dining surface, further comprising a mechanical structure for supporting the dining surface, and (1) in functional relationship to the mechanical structure, any one of the following functioning while dining: a sensing component, a stimulating component and a processor component, with the proviso that (a) when the mechanical structure has a visual stimulating component and the stimulating component is other than a software controlled graphical display, either (i) light emanates from the dining surface from a plurality of sites that emit light that produces other than a single simple geometric form, or (ii) the visual stimulating component is sealed in the mechanical structure or (b) when the sensing component senses weight, the stimulating component includes information other than information provided by a scale; or (2) the mechanical structure has an adjustable support structure, a horizontal dining platform for supporting food in a raised position, while a keyboard is positioned at least partially under the dining platform, at least a portion of the dining platform being translucent to permit viewing at least a portion of the keyboard during dining.

Typical active foodware system visual displays include light guides (such as optical fibers, electroluminescent light sources, light channels in the active foodware system material, light tubes, and the like), liquid crystal displays, light emitting diodes, laser diodes, plasma displays, fluorescent lights, fluorescing fluids, incandescent lights, and the like. The active foodware system may include haptic feedback, including but not limited to vibrotactile feedback, tactile feedback, electrocutaneous feedback, and force feedback, so the user/diner may feel desired vibrations, jolts, impacts or movements of the active foodware system. A useful vibrotactile feedback element is a rotating motor with eccentric mass, such as is found in vibrating cell phones. Typical auditory feedback displays include voice-coil speakers, piezoelectric speakers, and the like, including speakers and sound-generating elements used in cell phones.

The active foodware system may accept wired or wireless input that affects the visual, auditory or haptic display of the active foodware system, such as signals from a data processor. For example, the active foodware system may accept voice input, wired or wireless mouse input, wired or wireless peripheral device input. Games may be played using the active foodware system where the active foodware system dining plate comprises a visual feedback display. The active foodware system may have built-in controls for controlling the displayed content, providing game control input, communicating with other active foodware systems, and the like.

Embodiments of particular interest include having a passive or active component or subsystem comprising the dining surface that interacts with a separable active component or subsystem. For example, one may have an underplate as an active subsystem under a dining plate having a dining surface. Such underplate may rest on a table, be part of a table or be affixed to a table. In one embodiment, at least a portion of the dining plate is translucent while the underplate transmits visual sensory stimulation through the translucent portion of the dining plate. Another example, is the use of a data processor, e.g., laptop computer, and visual feedback display, e.g., monitor, that fits with a subsystem comprising a dining surface. The subsystem optionally includes a sensor for sensing changes in the amount of food present and provides feedback. One can also provide for recognition by the data processor of a unit of food related to an average amount per intake and have the sensor recognize when the change in the amount is unrelated to an average intake, e.g., where the food is discarded.

One may be interested in sensing the position of food on the dining surface. Various technologies that may be employed as the sensing component include infrared emitters/detectors, cameras, including CCD cameras, touch screens, pressure and weight sensors, ultrasonics, radar, temperature sensors, lasers, proximity sensors, and the like. Depending upon the technology, the different entities would be positioned in different known ways in relation to the dining surface. A signal from the sensing component may be transmitted to a stimulating component to modulate the stimulation. The sensed information can be used in a variety of ways by the active foodware system. For instance, if it is detected that while a child is eating, food is being moved about the dish rather than being consumed, the parent may be notified or the stimulation to the child may be altered. The parent may be notified by phone, email, pager, auditory signal, etc. In another embodiment, designs, both colors and patterns, displayed at the dining surface may be varied. Attractively, one could have simulated electrostatic patterns related to the position of the food.

One item of an active foodware system may communicate information with another item of an active foodware system. An active foodware system fork may communicate its movement to an active foodware system dining plate of the same user/diner or the active foodware system dining plate of a different user/diner. A computer which typically is not in physical contact with the active foodware system may communicate with the active foodware system in real time or offline.

Active foodware systems may include corded telephone technology, cordless telephone technology, walkie talkie technology, mobile/cellular telephone technology, internet access, web searching technology, and the like.

Advertisers may combine promotions with active foodware systems. For example, a fast-food store may provide active foodware system cups, dining plates and/or utensils with moving and/or talking movie characters or interactive games on them.

The subject active foodware system serves to provide an enhanced dining experience. One can present to a diner a visual, aural, haptic or other sensory stimulation to enhance the dining experience. A dining surface is maintained in proximity to a stimulating component. Of particular interest is to have a processor to communicate with the stimulating component to provide the desired stimulation. The method comprises presenting food to a diner on such dining surface; running a computer program on a computer with instructions for selecting at least one active foodware system; transferring data from the computer memory to the processor; and depending upon the type of the data, displaying, playing or operating the data, in conjunction with a member of the active foodware system, such as a dining plate or underplate. The selected member will have a receiver for receiving and storing the data. One may also select data from a data source to be included in the data transferred to the active foodware system member. In this way, stimulation may be provided during the consumption of the food. The stimulation can be related to the food and its consumption, providing information about the food, its preparation, its characteristics, etc.

Of particular interest is sensing the weight of the food on a dining surface. Visual or auditory stimuli in relation to the weight of food sensed can be provided. Auditory signals may be provided that relate to the consumption of the food and provide rewards, instructions, etc., in relation to such consumption.

The subject invention is further described in detail hereunder referring to the embodiments provided in the drawings. While the drawings viewed together with their associated description provide a clear disclosure of the invention to someone skilled in the art, the inventor sometimes uses some non-standard notation in the drawings to focus the viewer's attention on important features. Such non-standard notation includes: (1) short hash marks between two neighboring structures to indicate where they are attached; or between one object and white space to indicate where the object is attached to a base structure, such as is often used to indicate that the non-deflecting end of a load cell is attached to a reference base structure; (2) to simplify viewing, some side and end views include section views where some of the cut material sections are not crosshatched, for example, typically section views of dining plates and dining plate mating structures are not crosshatched; (3) some views provide only some selected hidden lines to direct the viewer's attention to important hidden features, such as in FIG. 27C; (4) some of the section views are hybrids and include portions of the structure cut away (to allow viewing of object internals) next to other portions of the structure that are not cut away, and which may include hidden lines to direct the viewer's attention to important hidden features; (5) sometimes crosshatching is used for an opening to help the viewer distinguish the boundary of the opening from surrounding solid structure, such as in FIG. 14A; (6) many of the light-emitting diodes (LEDs) have arrows drawn extending from them to indicate the direction of light when the LED is illuminated, but the arrows do not mean that the particular LED is always illuminated.

Figure 1C:
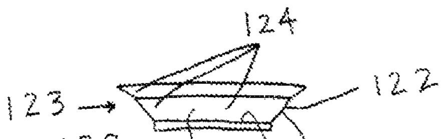
FIG. 1C is a side view.
Figure 1D:
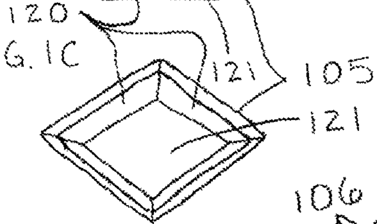
FIG. 1D is a perspective view, of a dining plate for mating with the mating structures.
Figure 1A:
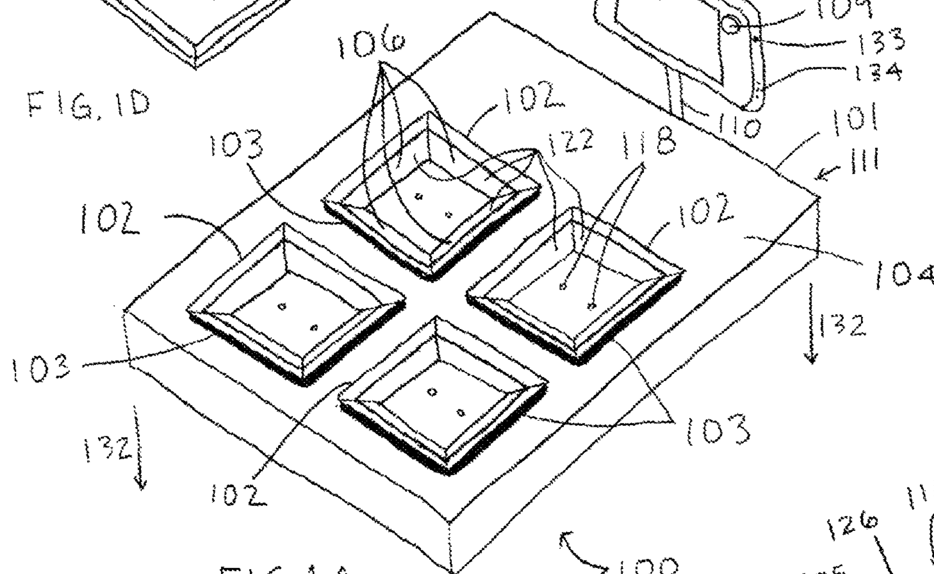
FIG. 1A is a perspective view of a top portion of a foodware system having a housing structure and four mating structures for mating with four dining plates.

FIG. 1A is a perspective view of a top portion 111 of an active foodware system 100 having a housing structure 101 and four dining plate mating structures 102 for mating with dining plates 105. Although four dining plate mating structures 102 are shown, any convenient number of dining plate mating structures 102 may be used. Each dining plate 105 typically mates with one dining plate mating structure 102, but may also mate with a plurality of dining plate mating structures 102. Each dining plate mating structure 102 typically mates with one dining plate 105, but may also mate with a plurality of dining plates 105.

Each dining plate mating structure 102 has a portion 106 of its side walls 122 that is translucent, transparent, and/or vacant. When the portion 106 is translucent, it may be translucent white to diffuse light. The portion 106 may also include a translucent design, graphic, image, sequence of similar or dissimilar images (including an image of a person, animal, cartoon, superhero, insect, or creature), an item of food, an object, an alpha-numeric symbol, and the like.

Figure 1E:
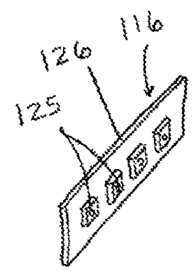
FIG. 1E is a perspective view of an LED strip with a plurality of electrically controllable LED integrated circuits.
Figure 1F:
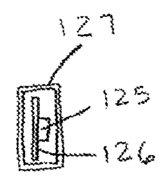
FIG. 1F is a side view of an LED strip inside a protective enclosure, which may be made of translucent silicone rubber and provides waterproofing.
Figure 1B:
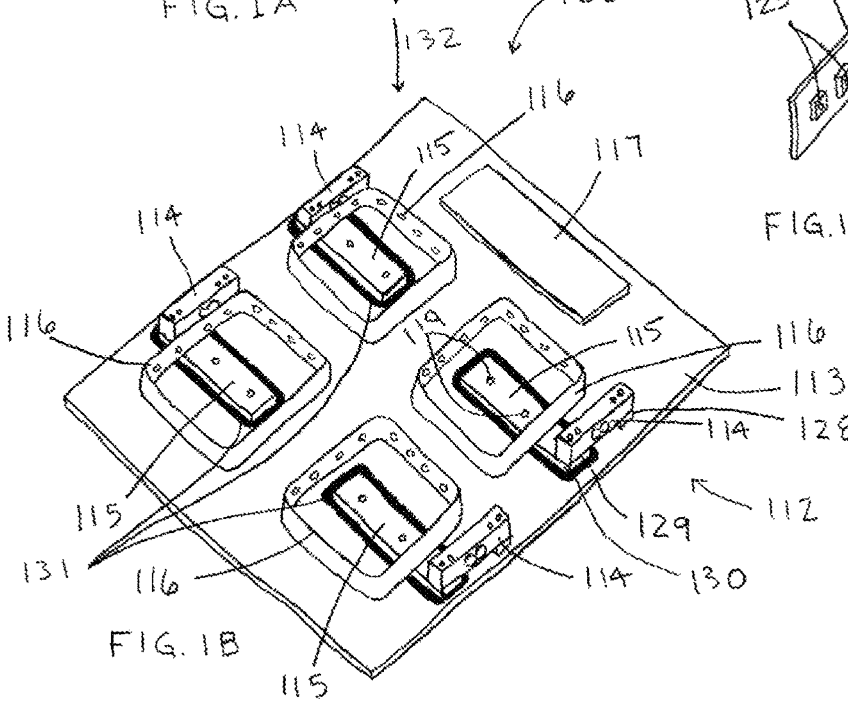
FIG. 1B is a perspective view of the bottom portion of the foodware system of FIG. 1A having four beam load cells with a cantilever beam attached to each load cell at one end and attached to the bottom of each mating structure at the other end. Four LED strips surround translucent portions of the side walls of the mating structures for shining light, which may be multicolored and include lighting effects, through the translucent portions and providing visual stimulation. Electrical components provide processing and control.

Each dining plate mating structure 102 typically has a mate fastening structure 118 for fastening to a mating support, which may be a cantilever beam 115 (see FIG. 1B). Each dining plate mating structure 102 has at least a portion which is recessed below the top surface 104 of the housing structure 101 into an opening 103.

The active foodware system 100 may include, or be configured to communicate with, a mobile communication device 107 for communicating a data signal with a data processor, where the housing structure 101 includes the data processor. The mobile communication device 107 typically has a graphical display 108, a microprocessor, at least one camera 109, a microphone 133, and a speaker 134. The mobile communication device 107 may be attached by an attachment member 110 to the top portion 111 of the housing structure 101, to a bottom portion 112 (see FIG. 1B), to a free-standing structure, or not attached to any support.

The camera 109 may be used for capturing one or a plurality of images or video of the food on the dining dishes 105, of a barcode, of the user, and/or of the environment, and may wirelessly transmit the images or video of the food, user, barcode, and/or environment to an external computer, such as a computer server, cloud computer, website, wireless telephone, mobile computer, and the like. The external computer may provide processing of the images or video. When the camera image is of a barcode, typically the barcode is of a package containing the food or of a label on or associated with the food. The image of the food may be used to help recognize the type or quantity of food in each dining plate 105. The recognition may be performed by the microprocessor of the mobile communication device 107, or by the external computer. The video may be used to help estimate the amount of food eaten or rate of eating food. The video may be used to communicate between the user and another person. For example, a relative, or a healthcare professional may use their own mobile telephone or computer to communicate with the mobile communication device 107 to encourage the user to eat, provide advice about the food, and/or monitor the user's eating. In place of a live person, a computer-generated character may be automated to communicate with the mobile communication device 107 to encourage the user to eat, provide advice about the food, and/or monitor the user's eating. When the user is communicating with another person, typically the graphical display 108, the microphone 133, and the speaker 134 are also used. The video may be to communicate graphical, animated, or video information from a computer to the user, such as for entertainment, to provide nutritional information about the food, or to provide food preparation information. The video may include a person talking, an animated character talking, text, and the like. Typically, a video will provide sound synchronized with the visual feedback, where the sound may include talking, singing, music, and the like.

The microphone 133 may be used by the user to provide voice commands or information to the foodware system 100, such as by verbally describing which type of food is in each dining plate 105. The speaker 134 may be used by the foodware system 100 to query information from the user, or to provide auditory feedback to the user. The graphical display 108 may be used by foodware system 100 to provide visual information or data about the food that is on each of the dining plates 105, the food that has been already eaten, or nutrition information about the user or nutrition recommendations. The graphical display 108 and speaker 134 may provide signals which are synchronized with lighting effects provided by LED strips associated with each dining dish (see FIG. 1B).

FIG. 1B is a perspective view of the bottom portion 112 of the foodware system 100 of FIG. 1A. The top portion 111 of the foodware system 100 is combined 132 with the bottom portion 112 of the foodware system 100, typically by fastening. Beam load cells 114 are attached at one end 128 to a bottom surface 113 of the housing structure, and are attached at the other end 129 to a cantilever beam 115. In this embodiment, four beam load cells 114 are attached. The cantilever beam 115 is attached at one end 130 to the end 129 of a load cell 114, and is attached to the mating structure 102 by a cantilever fastening structure 119, which fastens to the mate fastening structure 118 (see FIG. 1A). The mate fastening structure 118 and the cantilever fastening structure 119 may include holes, spacers, standoffs, screws, nuts, other fastening structures and techniques as will be provided subsequently, and the like.

LED strips 116 are positioned to surround the translucent portions 106 of the side walls of the mating structures 102 (see FIG. 1A) for shining light through the translucent portions 106 and providing visual stimulation, where the light may be multicolored and include lighting effects. In this embodiment, four LED strips 116 are shown. Each cantilever 115 is shown in a recessed cavity 131 or other opening in the bottom portion 112, which allows the cantilever 115 to pass beneath the LED strip 116.

Electrical components 117, many of which may be positioned on a printed circuit board (PCB), provide processing and control. The electrical components include a data processor and wireless communication component for wirelessly communicating a data signal with a mobile communication device 107. The data signal may be communicated using Bluetooth, Bluetooth Low Energy (BLE), WiFi, Ethernet, cellular technology, and may use radio waves (RF), light, sound, or any other convenient wireless technology. The electrical components may also include electrical wires, an amplifier, and an analog-to-digital converter to convert an analog weight signal from a load cell to digital weight signal for the data processor to receive and process. The electrical components may also provide electrical wires and signals for the data processor to control the color, intensity, and lighting effect of the LED strips 116.

FIG. 1C is a side view, and FIG. 1D is a perspective view, of a dining plate 105 for mating with one or a plurality of the mating structures 102. Each dining plate 105 has a dining surface 121 recessed in relation to a region 123 of the dining plate 105 surrounding the dining surface 121, where the dining surface is recessed for receiving solid food and preventing spillage from the dining surface 121. The region 123 of a dining plate 105 typically includes a vertical, slanted, and/or horizontal surface or wall extending away from the dining surface 121. A dining plate 105 typically has one or a plurality of translucent, or even transparent, portions 124 of the region 123 for transmitting light which passes through the translucent portions of 106 of the side walls of a mating structure 102 when a dining plate 105 is removably mated thereto. A portion 124 may also include a translucent design, graphic, image, sequence of similar or dissimilar images (including an image of a person, animal, cartoon, superhero, insect, or creature), an object, an alphanumeric symbol, and the like.

FIG. 1E is a perspective view of an LED strip 116 with a plurality of electrically controllable LED integrated circuits 125. Typically, an LED strip 116 includes LED integrated circuit elements 125, which may be silicon-based "chips" with LEDs, mounted to a flexible substrate 126. The LED strips are typically 0.2" to 0.5" tall, and 0.1" to 0.15" thick; although the dimensions may vary. The LED chips are typically spaced on the strips with a density from 30 LED chips per meter in strip length, up to 144 LED chips per meter. Typically an LED strip 116 is positioned to surround the translucent portions 106 of the side walls of a mating structure 102 (see FIG. 1A) for shining light inward through the translucent portions 106 and providing visual stimulation. Typically the direction of maximum radiation intensity of each LED chip element 125 is directed at one or a plurality of the translucent portions 106 of one or a plurality of sidewalls 122 of a mating structure 102.

FIG. 1F is a side view of an LED strip 116 positioned inside a protective casing or sheath 127. The casing 127 is typically made of translucent silicone rubber and provides waterproofing for the LED chips 125 and related electrical circuitry on the flexible substrate 126. The outer dimensions of the casing typically range from 0.3" to 0.6" tall, and 0.15"-0.25" thick; although the dimensions may vary.

A useful embodiment includes an LED strip 116 with density of 60 LED chips per meter and with a silicone rubber protective casing, such as provided by BTF-Lighting, model BTF-5V-60L-W. This density of LED chips provides four LED chips per side of a square mating structure 102 that is roughly 4" on a side, for a total of 16 LED chips per mating structure 102. The useful embodiment further includes a translucent portion 106 of a mating structure 102 that is translucent white for providing a diffuse white-light backlight for illuminating the translucent portion 124 of a dining plate 105, that is transparent or has a translucent image, when the dining plate 105 is mated with the mating structure 102.

The active foodware system 100 senses food and provides multimedia feedback, such as light, sound, and video, making dining informative, educational and fun. Some of the many applications include: (a) provide calorie consumption for weight-conscious adults; (b) list total carbs and protein for persons with diabetes; (c) help hospitals track nutritional intake by patients; (d) encourage children to "eat their vegetables"; and (e) audio-visual edu-tainment while dining.

A first exemplary useful application of the active foodware system 100 is for nutritional education and portion control, to help a user/diner monitor the types and amount of nutrition they consume. The portion-control application is for anyone wishing to monitor the calories they're consuming, as well as nutritional information about their meal, such as total carbs. The active foodware system 100 displays the calories on each plate, as well as the calorie total for the meal. If the calorie total is more than a pre-set desired amount, the user/diner may be advised to reduce the amount of food on a particular plate. The active foodware system 100 may log the nutrition placed on each plate before starting to eat, as well as the nutrition actually consumed for each meal. The active foodware system 100 may also compare total calorie intake with calories expended according to a wearable fitness tracker, and inform the diner how eating the food on their plates might affect their weight and overall health.

A second exemplary useful application of the active foodware system 100 is an eating-coach, where a fun cartoon character coach encourages a novice eater to eat the food their parent places on the plates. If the active foodware system 100 determines that the child is not eating, the coach asks the child to "play a game" and eat some of a particular food. After the child eats, they are congratulated and rewarded with a fun song and an educational fact about the food. If the child stops eating, the music pauses, and the coach encourages them to finish their food. When all the food is eaten, the active foodware system 100 can text the parent that Junior just joined the "clean-plate club!"

A third exemplary useful application of the active foodware system 100 is an educational-video for more advanced children who have mastered the eating-coach application and know how to eat by themselves, but sometimes still need a little extra encouragement to finish all their food. In this application, a playlist of fun, food-education videos is streamed from the internet as long as the active foodware system 100 determines that the child is still eating. If the child stops eating, the active foodware system 100 pauses the video, and the cartoon character coach appears in the upper right corner and encourages them to finish their food. Once they resume eating, the video continues.

In the description that follows, in some cases where elements in one figure relate to elements in another figure, the related element numbers are both listed and separated by commas. In particular, FIGS. 1A, 1C, 73A, and 96 share some related elements.

In a first implementation of the first exemplary useful application of the active foodware system 100, i.e., the nutritional education and portion control application, the user creates and/or logs into their account 9616 using a mobile application, a.k.a., "app," running on the mobile communication device 107. An example app display 9600 is provided in FIG. 96. To create a profile, the user enters their gender, date of birth, height, weight, and their activity level. From this information, a basil metabolic rate (BMR) is calculated for the user, which is the calories the user burns while at rest at their present weight. The BMR is the budget for the user to maintain their current weight. The user also enters their weight goal and how quickly they want to reach their desired weight.

The user may also create a watchlist of nutrients for which they wish to monitor the amount consumed. Exemplary watchlist nutrients include calories, total fat, saturated fat, trans fat, cholesterol, sodium, total carbohydrates, dietary fiber, total sugars, protein, vitamin A, vitamin C, vitamin D, calcium, iron, potassium, and phenylalanine. If the user is diabetic, they may also enter their "insulin-to-carb ratio", which determines the amount of insulin they should take if they consume, or intend to consume, a particular total carbohydrate amount. For each watchlist nutrient, the user may enter the desired maximum or minimum amount of that nutrient by weight per day they wish to consume.

The graphical display 108 of the mobile communication device 107 of the active foodware system 100 may initially display four white squares 9601 graphically in a 2×2 array, or other pattern similar to the form and arrangement of dining plates 105, 7302. An example image 9600 presented on the graphical display 108 is provided in FIG. 96, where four white squares 9601 are a positioned in a 2×2 array on the left of FIG. 96, and where an image 9608 of each food in the physical dining plate 105, 7302 is displayed in the corresponding white square 9601. Beneath each graphical white square 9601 on the graphical display 108 is displayed the weight 9602 and total amount 9603 of a selected nutrient 9604 on the corresponding dining plate 105, 7302. The nutrient name 9604 is typically selected by the user from a drop-down list 9606, where each element in the drop-down list 9606 is the name of a nutrient that the user specified in their watchlist.

Figure 96:
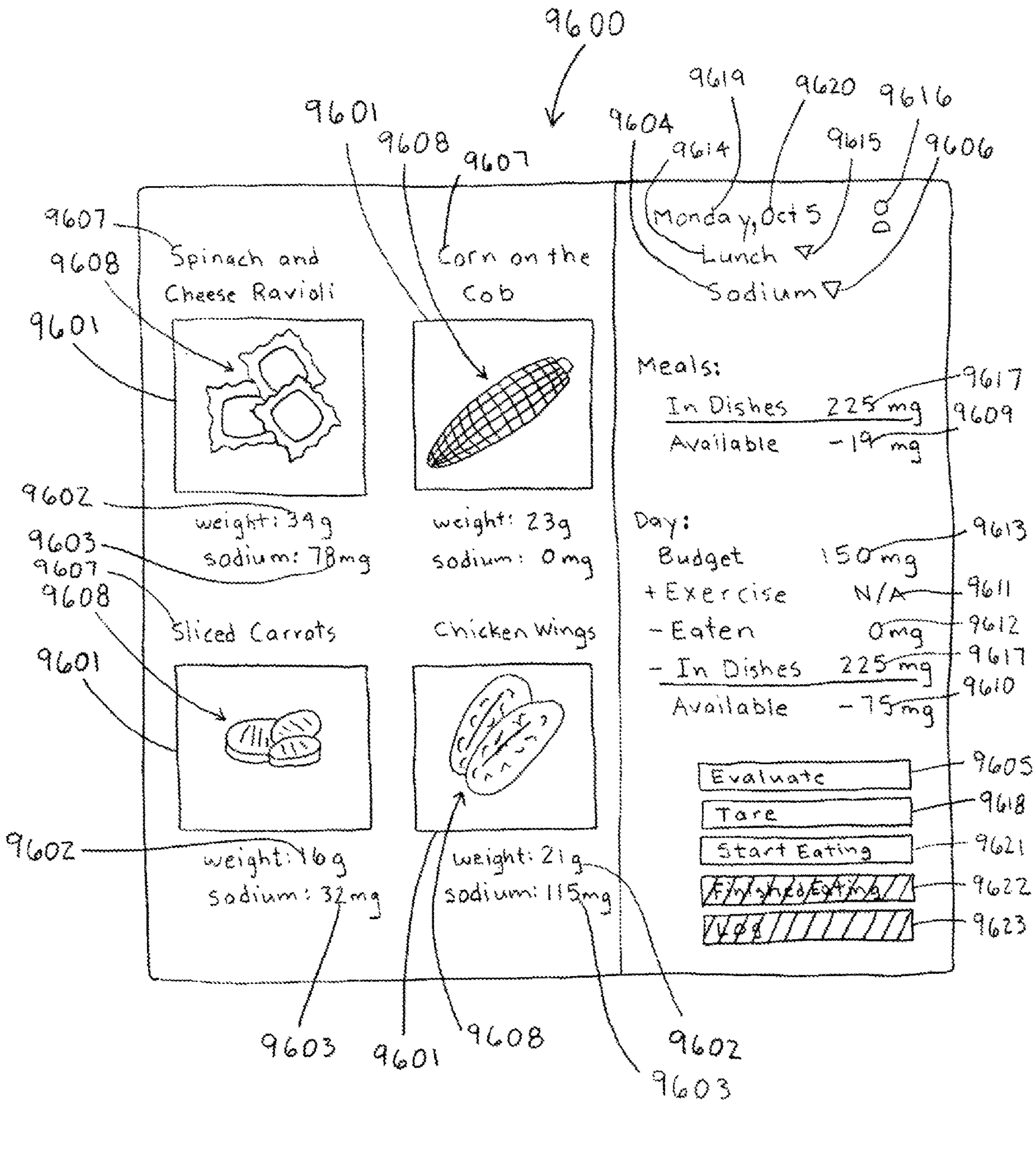

As provided in FIG. 96, there is a "Tare" graphical button 9619 for zeroing weights 9602.

If the user taps on a white square 9601 on the graphical display 108, the app solicits input from the user about which food is on the corresponding dining plate 105, 7302. The solicitation may be as text on the graphical display 108, or by voice from the speaker 134. The user may enter the name of the food by typing in the name, by speaking the name into the microphone 133, by using the camera 109 to record an image of a barcode for the food, or by using the camera 109 automatically to recognize the type and name of the food on the dining plates 105, 7302. The name 9607 of the food may be displayed above the corresponding white square 9601 on the graphical display 108 of the mobile communication device 107.

The user may consume pre-packaged meals. Such pre-packaged meals may be provided in containers that mate with one or more dish holders, such as the dining plate mating structure 102 in FIG. 1A and the dish holder 7332 in FIG. 73A. The user may remove and place only a portion of the meal in one or more dining dishes (such as a dining plate 105 in FIG. 1C and/or a dining dish 7302 in FIG. 73A) that are mated with a dish holder 102, 7332. The pre-packaged meals typically have known nutrition information per gram for the contents, i.e., the nutrient density of each nutrient. A barcode of the pre-packaged meals may be scanned using the camera 109 or entered manually into the mobile application running on the mobile communication device 107. A SKU may be scanned or entered manually. The pre-packaged meals may be purchased, or otherwise received from a nutrition organization, such as Weight Watchers® and/or NutriSystems®, and the like. For convenience, the pre-packaged meals may be ordered online and may be received in the mail or by home delivery. Using pre-packaged meals is a convenient way to enter quickly the precise nutrition information for a specific recipe of food that may involve a combination of many different nutritional components.

When speaking the name of the food into the microphone 133, the microprocessor in the mobile communication device 107 may use speech recognition to recognize the name locally, or a digital recording of the spoken name may be transmitted to a remote data processor, such as a computer "in the cloud," for recognizing the name and transmitting the recognized name back to the mobile communication device 107. When using the camera 109 to recognize the type and name of the food, the microprocessor in the mobile communication device 107 may use image recognition to recognize the type and name of the food locally, or the digital image of the food may be transmitted to a remote data processor, such as a computer "in the cloud," for recognizing the type and name and transmitting the recognized type and name of the food back to the mobile communication device 107.

From the name 9607 of the food, the nutrient density, i.e., nutrients per gram (or other weight measure) are determined. Typically the nutrients per gram for a specific food name 9607 are retrieved from a database. The database may be stored locally on the mobile communication device 107, or retrieved from an external server computer, such as a USDA database. The camera 109 may take a photo of the food in each dining plate 105, 7302 for display, or an existing photo of the food may be retrieved from the mobile communication device 107 or an external database, and the image 9608 of the food displayed in the graphical square 9601 to replace the initial white background.

The weights 9602 of food on each dining plate 105, 7302 may be used to calculate the amount 9603 of each nutrient 9604 on each dining plate 105, 7302 by multiplying the nutrient density of each nutrient 9604 on each dining plate 105, 7302, by the weight 9602 of food on the associated dining plate 105, 7302.

The user repeats the process above and taps on each of the other white squares 9601 and enters the food name 9607 of the food on the corresponding dining plate 105, 7302. As each food name 9607 is entered, and the image 9608 of the food is displayed in the graphical square 9601 on the graphical display 108, the total weight 9602 and total amount 9603 of the selected nutrient 9604 on that dining plate 105, 7302 for the meal is displayed, typically below the image 9608. Based on the maximum daily value of the nutrient entered into the watchlist, the total amount remaining that the user may consume of that nutrient 9604 for the current meal 9609 and for that day 9610 are displayed on the graphical display 108.

If the selected nutrient 9604 is "calories," the app may read calories expended as exercise 9611 so far for the day from other apps or from an external database. The total calories available 9610 for the user to consume for the day equals the total daily budgeted 9613 calories based on the user's BMR adjusted by the difference in calories the user must consume to reach their target weight, and increased by the total number of calories expended through exercise 9611. For nutrients 9604 other than calories, the total nutrients available 9610 for the user to consume for the day are determined similarly to calories, except exercise 9611 typically doesn't affect the total 9610 for other nutrients.

The current meal 9614 is typically selected by the user from a drop-down list 9615. Alternatively, the meal 9614 may be automatically prompted based on the time of day, typically after the amount of the selected nutrient already consumed 9612 has been subtracted. The day 9619 of the week and date 9620 may be displayed. The budget amount available 9609 for the selected meal 9614 for a selected nutrient 9604 is typically determined as a percentage of the budget available 9610 for that nutrient 9604 remaining for the day. For example, breakfast may be 20% of the daily budget remaining 9610, lunch may be 25% of the daily budget remaining 9610, a snack may be 20% of the daily budget remaining 9610, and dinner may be 35% of the daily budget remaining 9610 at the time it is eaten.

Once the user has loaded the dining plates 105, 7302 with food and entered the name 9607 of food in each dining plate 105, 7302, they may tap a graphical "evaluate" button 9605 to evaluate the portions of food present on the dining plates 105, 7302. Tapping "evaluate" 9605 compares the total amount 9617 of the selected nutrient 9604 present on the dining plates 105, 7302 with the budget amount 9609 for the meal and/or the budget amount remaining 9610 for the day of that nutrient 9604. If the total amount 9617 of the selected nutrient 9604 present on all the dining plates 105, 7302 is less than the budget amount 9609 for the meal, then the LEDs 116 illuminate that surround the dining plate mating structures 102, 7332 supporting the dining plates 105, 7302. A typical color for this scenario is green.

In general, for any color desired, the LEDs 116 may illuminate for a preset period of time and then go off, they may flash a preset number of times, or the LEDs 116 may provide another desired lighting effect.

If the budget amount 9609 for the selected nutrient 9604 is exceeded by the amount 9617 present in the food on all the dining plates 105, 7302, all dining plates 105, 7302 that contain amounts of the selected nutrient 9604 above a minimum amount are illuminated in a color typically other than green by the LEDs 116 surrounding the dining plate mating structure 102, 7332 supporting that dining plate 105, 7302. For example, if the budget amount 9609 is exceeded by less than a first threshold, for example 10%, then the color of the light of the LEDs 116 may be yellow to indicate caution. If the budget amount 9609 is exceeded by more than the first threshold, for example 10%, then the color of the light of the LEDs 116 typically is red to indicate warning. If the budget amount 9609 is exceeded by more than a second threshold, for example 25%, then the color of the light of the LEDs 116 may be red and the LEDs 116 may be flashed to indicate a stronger warning.

Rather than comparing the total amount 9617 of a selected nutrient 9604 present in the food on all the dining plates 105, 7302 to one or two discrete threshold percentages of the meal budget amount 9609, the color of the LEDs 116 may change linearly in color from green to red, or in general from any first color to a second color in a predetermined color sequence, with each percent that the total amount of a selected nutrient 9604 exceeds the budget amount 9609 for that nutrient 9604. A variety of lighting special effects may be used, including flashing, on for a period of time then off, one or more LEDs 116 at a time sequencing around the dining plate 105, 7302 in a manner where the light appears to be an object moving around the perimeter of the dining plate 105, 7302, and the like.

The squares 9601 on the graphical display 108 displaying images 9608 of the food in the associated dining plate 105, 7302 may also be highlighted with a color and effect similar or related to the color of the light of the LEDs 116. For instance, if the light of the LEDs 116 is flashing red, a graphical square frame surrounding the square food image 9608 on the graphical display 108 may also flash red. The values 9603, 9609, 9610 and associated labels may also be displayed in red to indicate over budget.

A useful benefit of the present invention, is that prior to eating, the user/diner knows whether the portion sizes of the food present on the dining plates 105, 7302 is within an acceptable limit. If when the user taps "evaluate" 9605, all dining plates 105, 7302 are illuminated in green, then the user knows the portion sizes of the food on their dining plates 105, 7302 is acceptable to eat according to their meal plan. If the color of the light illuminating any dining plate 105, 7302 instead is yellow or red, the user is encouraged to reduce the portion size of the food on that offending dining plate 105, 7302.

Once all dining plates 105, 7302 illuminate green, the user may tap a graphical button to "start eating" 9621. The weights 9602 of food on each dining plate 105, 7302 are then used to calculate the amount 9603 of each nutrient 9604 on each dining plate 105, 7302 based on the nutrient density of each nutrient 9604 starting in each dining plate 105, 7302. These starting amounts for each nutrient 9604 are recorded for later comparison and optional logging.

As the user eats, the total amount of each nutrient 9604 remaining on the dining plates 105, 7302 is displayed 9617. So, at any point, the user knows that if they stop eating, how much of each nutrient 9604 they will not be consuming, and can save the amount of the nutrient 9604, such as calories, to consume from the same or a different food item at a later meal, or credit toward more weight loss for the day.

When the user is finished eating, they may tap a graphical button for "finished eating" 9622, Then the weights 9602 of food remaining on each dining plate 105, 7302 is used to calculate the amount 9603 of each nutrient 9604 remaining on each dining plate 105, 7302 based on the nutrient density of each nutrient 9604 in each dining plate 105, 7302. These final amounts for each nutrient 9604 are recorded. The final amounts for each nutrient 9604 are subtracted from the starting amounts for each nutrient 9604 to determine the total amount of each nutrient 9604 consumed. The final, uneaten amounts remaining on the dining plates 105, 7302 for each nutrient 9604 are then credited back to the user as not being eaten. Accordingly, the total amount of any nutrient 9604 remaining in the dining plates 105, 7302 may be eaten as part of a future meal.

After the user has tapped "finished eating" 9622, they may tap a graphical button for "log" 9623. Tapping "log" 9623 typically records all the data from the meal to a database for the user. Recording data from the meal to a database for the user may also occur automatically without requiring the user to tap "log" 9623. Novel and unobvious advantages of the active foodware system 100 include: (a) the amount of various nutrients 9604 for a meal, such as nutrients included in a watchlist, may be determined easily, quickly, and simultaneously for all dining plates 105, 7302 prior to eating; (b) the food may be eaten from the dining plates 105, 7302 resting on the dining plate mating structures 102, 7332 of the active foodware system, without the need to weigh and move each dining plate 105, 7302 to a new location for eating; (c) the amount of a nutrient 9604 in the dining plates 105, 7302 relative to a budget amount 9609 for that nutrient 9604 is easily understood by the user due to colored lighting effects illuminating from the dining plates 105, 7302 prior to, during, and/or after eating, whether or not the graphical display 108 is nearby and/or viewable; (d) if the graphical display 108 is viewable, the amount of a nutrient 9604 in the dining plates 105, 7302 relative to a budget amount 9609 for that nutrient 9604 is easily understood by the user due to colored graphics on the graphical display 108 associated with each dining plate 105, 7302 prior to, during, and/or after eating; (e) as the user eats, they know how much 9603 of each nutrient 9604 remains on each dining plate 105, 7302, so they can make an informed decision whether to continue eating, or to stop at any time and credit the amount of uneaten nutrients remaining toward a future meal or toward weight loss for the day; and (f) if the user is diabetic, as they eat they know at any point how many carbohydrates, protein, and fat they have consumed, or are about to consume, and they are informed how much corresponding insulin they should take.

Figure 2A:
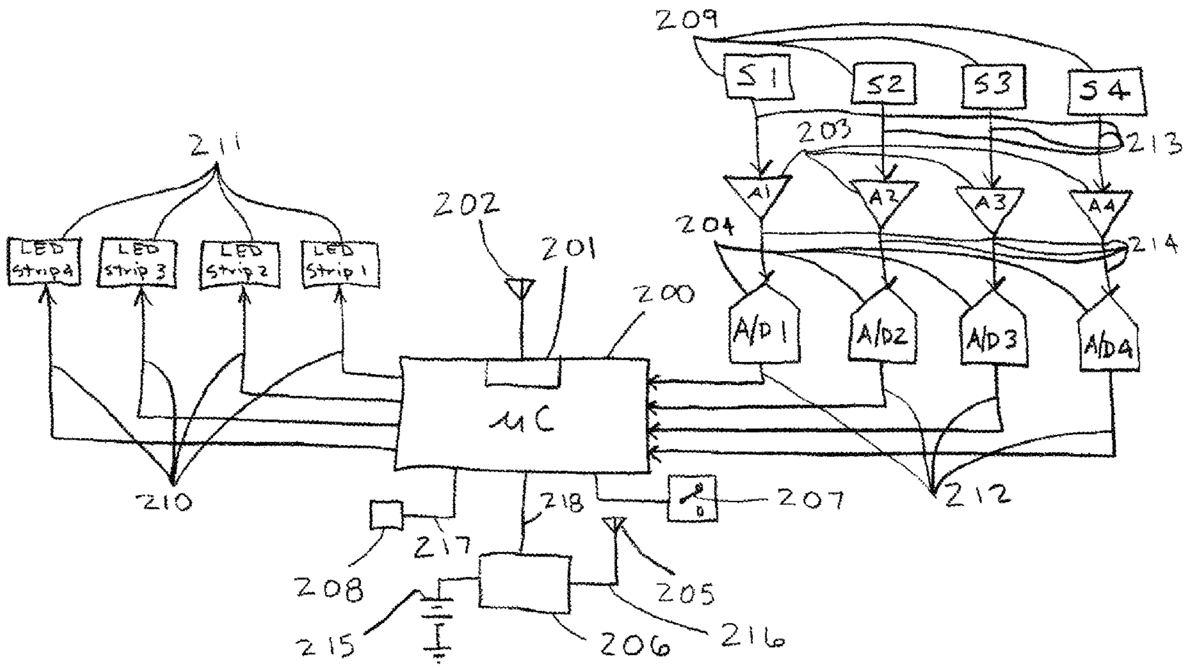
FIG. 2A is a block diagram of electrical components which provide processing and control, including a microcontroller, a wireless communication component, a plurality of sensor amplifiers, a plurality of analog-to-digital converters, a wireless power antenna, a battery-charging component, and on-off switch, and a digital-communication connector. The electrical components may receive signals from sensors, such as load cells, and may provide control signals to visual stimulating components, such as LEDs or LED strips.

FIG. 2A is a block diagram of electrical components 117 providing processing and control, including a microcontroller 200, a wireless communication component 201 which typically includes an antenna 202, one or a plurality of sensor amplifiers 203 for amplifying sensor signals 213 providing amplified signals 214 to one or a plurality of analog-to-digital converters 204 providing digitized signals 212 to the microcontroller 200, a wireless power antenna 205, a battery-charging component 206, an on-off switch 207, and a digital-communication connector 208. The electrical components may receive signals from one or a plurality of sensors 209, such as weight sensors, which may include load cells, and the electrical components may provide control signals to the sensors.

The microcontroller 200 may include a microprocessor, or data processor, and is typically programmable by computer software. The microcontroller and/or electrical components may send control signals 210 to one or a plurality of visual stimulating components, which may include light-emitting diodes (LEDs), LED integrated circuits, or a plurality of LEDs or LED integrated circuits on substrates which may be flexible, together called an LED strip 211. The microcontroller may provide control signals that cause the visual stimulating component to produce light of varying colors and intensities for producing a desired visual effect.

The battery-charging component 206 is capable of charging a battery 215 from a wireless-power signal 216 from the wireless-power antenna 205 and/or a wired-power signal 217 from the digital-communication connector 208. The digital-communication connector 208 may provide the wired-power signal 217 directly to the battery-charging component 206 (not shown), or the digital-communication connector 208 may provide the wired-power signal 217 directly to the microcontroller 200 which has electrical circuitry that redirects the wired-power signal 217 via a connection 218 to the battery-charging component 206. The microcontroller 200 may be powered by the digital-communication connector 208, the wireless-power antenna 205, and/or the battery 215.

Figure 2B:
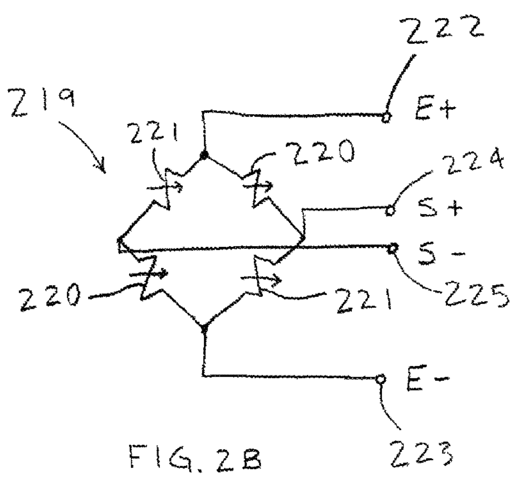
FIG. 2B is a Wheatstone bridge configuration for a load cell with four strain gages.

FIG. 2B is a Wheatstone bridge configuration 219 for a load cell having four strain gages. When weight is sensed by the load cell, typically two of the strain gages experience compression and decrease resistance 220, and two of the strain gages experience tension and increase resistance 221. An excitation voltage is applied across the terminal 222 labeled E+ relative to the terminal 223 labeled E−. When weight is applied to the load cell, the terminal 224 labeled S+ increases in voltage relative to the terminal 225 labeled S−. The difference in voltage across terminal 224 and terminal 225 is typically sensed by a differential amplifier, such as is provided by the sensor amplifiers 203.

Figure 3A:
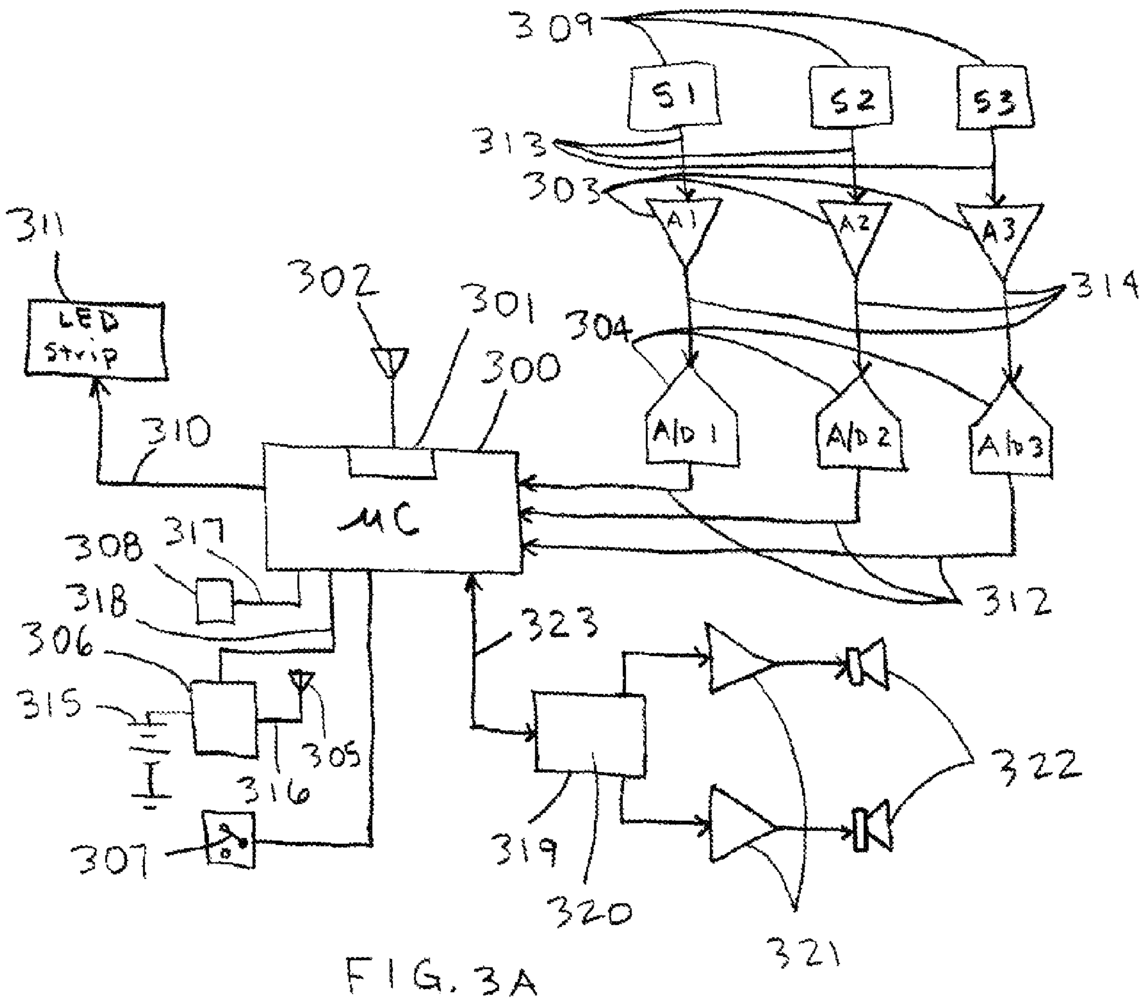
FIG. 3A is a block diagram of electrical components provide processing and control, including a microcontroller, a wireless communication component, a plurality of sensor amplifiers, a plurality of analog-to-digital converters, a wireless power antenna, a battery-charging component, and on-off switch, a digital-communication connector, an auditory stimulating component with a sound-generating integrated circuit, a plurality of audio amplifiers, and a plurality of audio output devices, such as speakers.

FIG. 3A is a block diagram of electrical components 117 providing processing and control, including a microcontroller 300, a wireless communication component 301 which typically includes an antenna 302, one or a plurality of sensor amplifiers 303 for amplifying sensor signals 313 providing amplified signals 314 to one or a plurality of analog-to-digital converters 304 providing digitized signals 312 to the microcontroller 300, a wireless power antenna 305, a battery-charging component 306, and on-off switch 307, a digital-communication connector 308, an auditory stimulating component 319 with a sound-generating integrated circuit 320 communicating with the microcontroller 300 by a auditory connection 323, a plurality of audio amplifiers 321, and a plurality of audio output devices 322, such as speakers.

The microcontroller 300 may include a microprocessor, or data processor, and is typically programmable by computer software. The microcontroller and/or electrical components may send control signals 310 to one or a plurality of visual stimulating components, which may include light-emitting diodes (LEDs), LED integrated circuits, or a plurality of LEDs or LED integrated circuits on substrates which may be flexible, together called an LED strip 311. The microcontroller may provide control signals that cause the visual stimulating component to produce light of varying colors and intensities for producing a desired visual effect.

The battery-charging component 306 is capable of charging a battery 315 from a wireless-power signal 316 from the wireless-power antenna 305 and/or a wired-power signal 317 from the digital-communication connector 308. The digital-communication connector 308 may provide the wired-power signal 317 directly to the battery-charging component 306 (not shown), or the digital-communication connector 308 may provide the wired-power signal 317 directly to the microcontroller 300 which has electrical circuitry that redirects the wired-power signal 317 via a connection 318 to the battery-charging component 306. The microcontroller 300 may be powered by the digital-communication connector 308, the wireless-power antenna 305, and/or the battery 315.

Figure 3B:
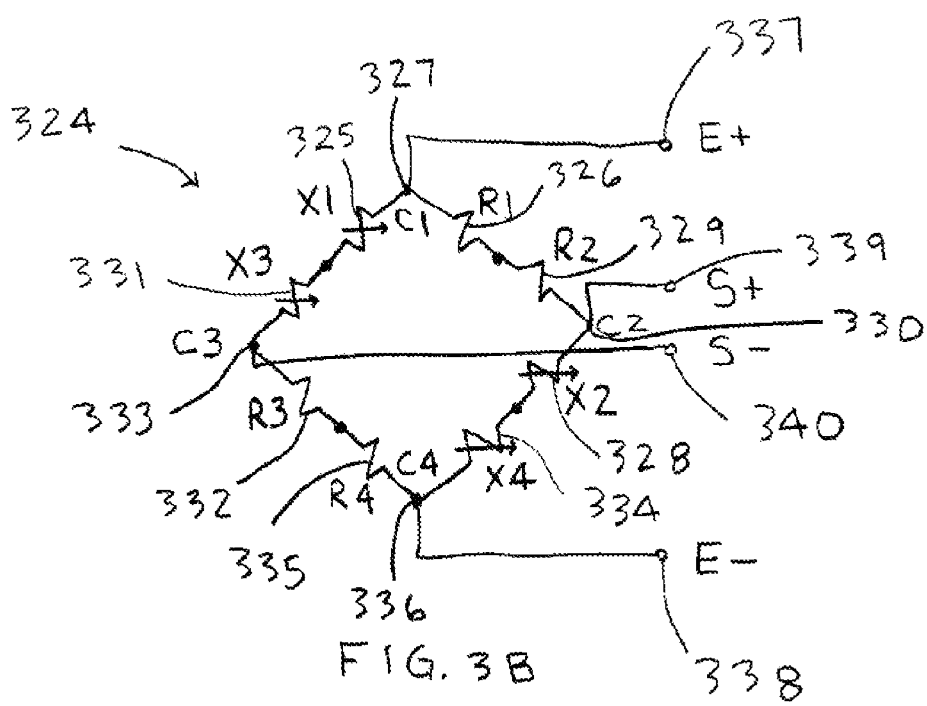
FIG. 3B is a Wheatstone bridge configuration for connecting four load sensors, each having a strain gage and a fixed resistor.

FIG. 3B is a Wheatstone bridge configuration 324 for connecting four load sensors to provide a single weight determination, each load sensor having a strain gage and a fixed resistor. Typically the load sensors are referred to as disc, button, or washer load sensors. Typically each of the four load sensors are placed below the distal corners of a square mating structure for a dining plate. When a dining plate is functionally mated with the mating structure, typically a peripheral portion of the dining plate, which may be substantially horizontal, extends over at least a portion of the load sensor. A first load sensor has a first strain gage 325, a first fixed resistor 326, and a first center tap 327; a second load sensor has a second strain gage 328, a second fixed resistor 329, and a second center tap 330; a third load sensor has a third strain gage 331, a third fixed resistor 332, and a third center tap 333; and a fourth load sensor has a fourth strain gage 334, a fourth fixed resistor 335, and a fourth center tap 336. When weight is sensed by the load cell, typically all four of the strain gages 325, 328, 331, and 334 experience tension and increase resistance. An excitation voltage is applied across the terminal 337 labeled E+ relative to the terminal 338 labeled E−. When weight is applied to the connected load sensors, the terminal 339 labeled S+ increases in voltage relative to the terminal 340 labeled S−. The difference in voltage across terminal 339 and terminal 340 is typically sensed by a differential amplifier, such as is provided by the sensor amplifiers 303.

Figure 4B:
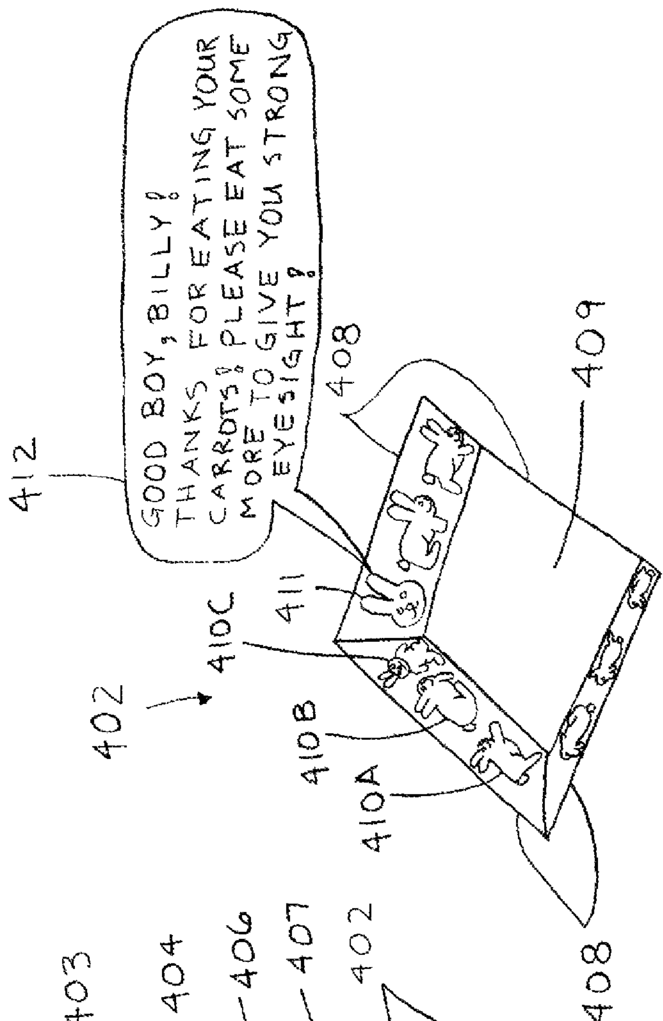
FIG. 4B is a perspective view of a dining plate mating structures having a plurality of translucent portions having images for being backlit by LEDs or LED strips. As each of the translucent images is backlit in sequence, the object appears to move, talk, change expression, or morph.
Figure 4A:
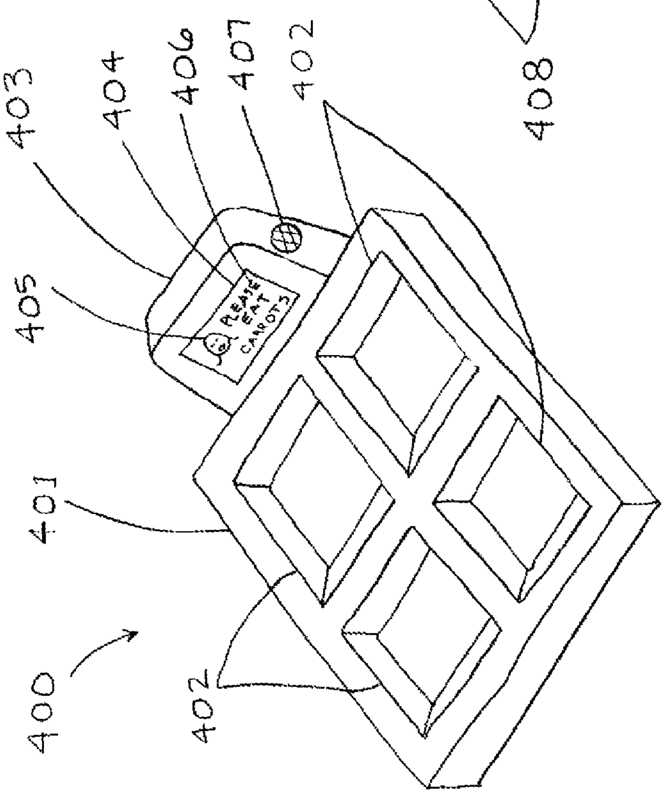
FIG. 4A is a perspective view of an active foodware system having a housing structure including four dining plate mating structures, each for removably mating with a dining plate. The active foodware system also includes a graphical touch-screen display with a narrator talking.

FIG. 4A is a perspective view of an active foodware system 400, similar in some aspects to the active foodware system 100 of FIGS. 1A-1F, and having a housing structure 401 including a plurality of mating structures, such as four dining plate mating structures 402, each dining plate mating structure for removably mating with a dining plate. The active foodware system 400 typically includes a visual stimulating component 403 including graphical display 404, which may be a touch screen, displaying an interactive visual image 405, where the visual image 405 is synchronized with sound from an auditory stimulating component, such as a speaker 407. The visual image 405 may include a narrator talking, and may include displayed text 406. In the exemplary embodiment of FIG. 4A, exemplary text says, "Please eat carrots."

FIG. 4B is a perspective view of one or a plurality of sidewalls 408 around a recessed center portion 409 of at least one of the dining plate mating structures 402 having a plurality of translucent portions having images 410A, 410B, 410C, 411 for being backlit. The translucent images 410A, 410B, 410C, 411 may be backlit by one or a plurality of LEDs 125 or LED strips 116. The translucent images 410A, 410B, 410C, 411 may be a sequence of images of an object, which may be an animate or inanimate object, moving, talking, changing expression, or morphing. The sequence of images 410A, 410B, 410C, 411 may include frames of a video. As each of the translucent images 410A, 410B, 410C, 411 is backlit in sequence, e.g., 410A to 410B to 410C, the object appears to move, talk, change expression, or morph.

Lights may cycle around a dining plate mating structure 402 illuminating the figure, in this case a rabbit 410A, 410B, 410C, 411, to make it look like it's hopping around the perimeter. The FIG. 410A, 410B, 410C, 411 can stop and provide a message 412, typically of encouragement or congratulations. The light cycle is typically initiated after activity is detected by the dining plate mating structure 402, such as eating. The light cycle can also initiate to encourage a diner to eat.

The light cycle can also be synchronized with the narrator 405 on the graphic (touch) screen 404.

The message by the character 410A, 410B, 410C, 411 on the light-cycle dining plate mating structure 402, or by the narrator 405, is typically synchronized with verbal or musical sound from the speaker 407. A human voice may be recorded, or text entered and then synthesized. The voice or text input may be input on a mobile device. In the exemplary embodiment of FIG. 4B, exemplary verbal sound synchronized with illuminating the rabbit character 411 says, "Good boy, Billy! Thanks for eating your carrots! Please eat some more to give you strong eyesight!"

In general, typically a dining plate mated with a dining plate mating structure 402 has a one or a plurality of sidewalls having portions that are translucent or transparent and juxtaposed to the translucent portions of the dining plate mating structure 402, such that the images 410A, 410B, 410C, 411 that are backlit on the dining plate mating structure 402 may be seen through the dining plate as well. The sidewalls of the dining plate surround the dining surface of the dining plate. The dining surface is recessed relative to the sidewalls for receiving solid food, where the sidewalls prevent spillage from the dining surface. The sidewalls of the dining plate and dining plate mating structure 402 typically make between a 45-degree and a 90-degree angle with pure horizontal.

In general, a dining plate may have a substantially horizontal surface, lip, or ledge surrounding the top portion of the dining plate sidewall and extending away from the center of the dining plate. The horizontal surface of the dining plate may be used to lift or carry a dining plate by human hand or by a dining plate carrier tray, and may provide a surface that is cooler in temperature than a portion of the dining plate that is closer to the dining surface having warm food.

In general, a dining plate mating structure 402 may also have a substantially horizontal surface, lip, or ledge surrounding the top portion of the dining plate mating structure sidewall 408 and extending away from the center 409 of the dining plate mating structure. The horizontal surface of a dining plate mating structure 402 may help prevent food or liquid from spilling under the dining plate mating structure 402. The horizontal surface may include a downward barrier near its outer edge that helps prevent food or liquid from spilling under the dining plate mating structure 402. The downward barrier may overlap an upward barrier on the top surface of a housing structure, such as the top surface 104 of the housing structure 101, to help prevent food or liquid from spilling under the dining plate mating structure 402.

The horizontal surface at the top edge of a dining plate sidewall and/or dining plate mating structure sidewall 408 typically makes between a 0-degree and a 45-degree angle with pure horizontal.

FIGS. 5A-5D are an active foodware system 500 having one or a plurality of cameras 504, 506, 524, 531 for capturing images or video of food 508, 534 on dining plates 507, 533, the user/diner, and/or the environment. The cameras 504, 506, 524, 531 may include optics 505, 516, 525, either built in or added externally, to assist capturing the images or video. The optics 505, 516, 525 may include telephoto and/or macro lenses, or optics which may be dynamically adjusted or selected to provide a desired focal length. Three separate cameras may be used, one configured for each of three desirable focal lengths. The cameras 504, 506, 524, 531 and optics 505, 516, 525 may be positioned on one or both sides of a mobile phone 503 or tablet computer.

Figures 5A, 5B, 5C, 5D:
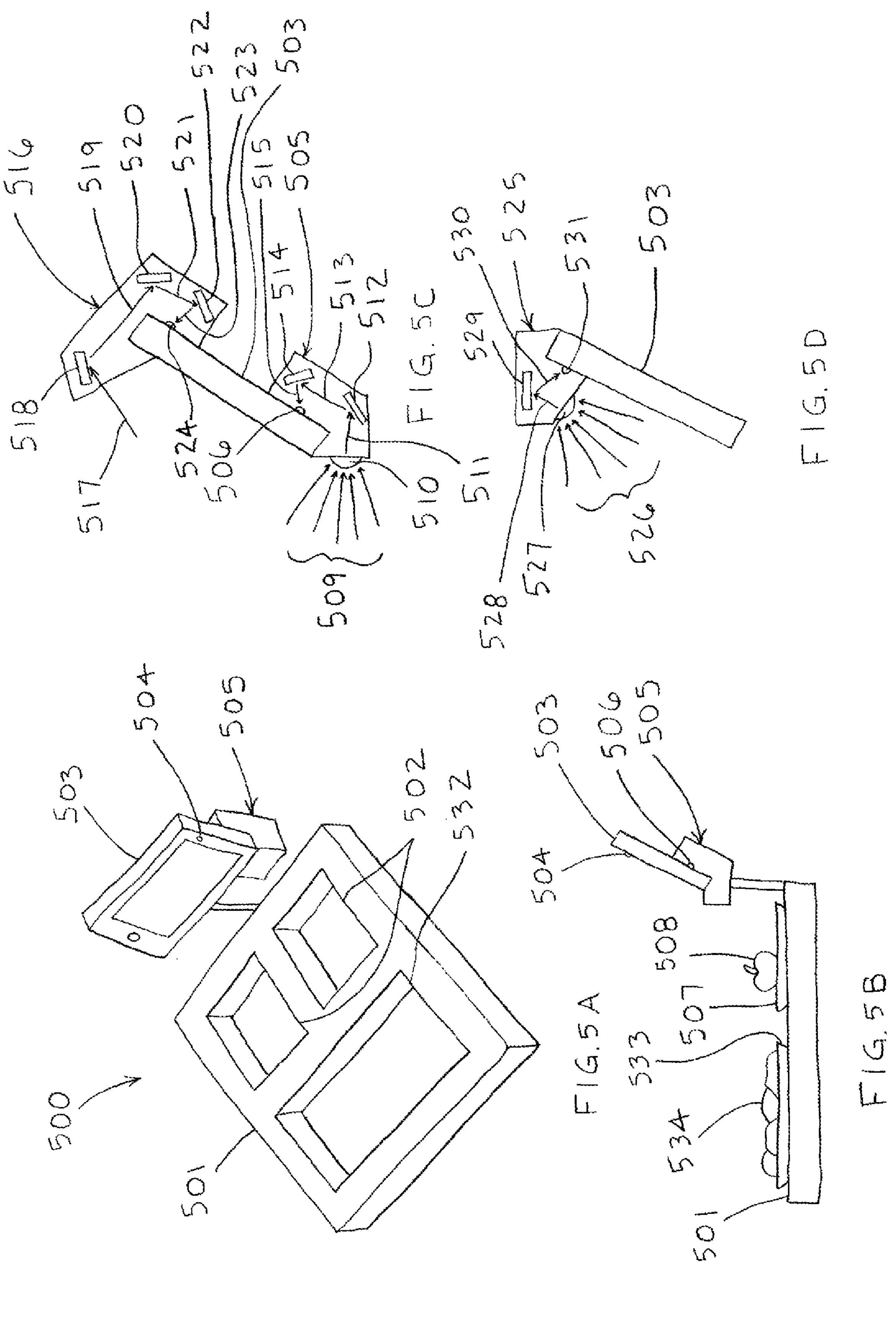
FIGS. 5A-5D are an active foodware system having cameras for capturing images or video of food on dining plates, the user/diner, and/or the environment. The cameras may include optics to assist capturing the images or video, and may be positioned on one or both sides of a mobile phone or tablet computer.

FIG. 5A is a perspective view of an active foodware system 500, similar in some aspects to the active foodware system 100 of FIGS. 1A-1F. A tradename for the embodiment of this active foodware system 500 is NutriPlate™. The active foodware system 500 has a housing structure 501 including a plurality of mating structures, such as three dining plate mating structures 502, 532, where two of the dining plate mating structures 502 are smaller than the third dining plate mating structure 532. The active foodware system 500 of FIG. 5A is provided with a smartphone 503. Optics 505 are provided to allow the back camera to look around and see what's in all dining plates 507, 533, such as food 508, 534. There may also be optics for the front camera 504. Both cameras may be used at the same time for different angles.

FIG. 5B is a side view of the active foodware system 500 having mated dining plates 507, 533 having food 508, 534, respectively.

FIG. 5C is a side view of a smartphone 503 with lower-rear optics 505 for a lower-rear camera 506. The lower-rear optics 505 are for channeling light 509 from food dishes 507, 533 to a single lower-rear smartphone camera lens 506. The optics 505 may have a plurality of mirrors 512, 513 to redirect light 509. In the embodiment of FIG. 5C, light 509 enters the lens 510 that provides focused light 511. The focused light 511 is directed to a mirror 512. Light 513 leaving the mirror 512 is directed to the mirror 514. Light 515 leaving the mirror 512 is directed to the lower-rear camera lens 506.

FIG. 5C is also a side view of a smartphone 503 with upper-rear optics 516 for an upper-rear camera 524, which has a better angle to view all the dining dishes 507, 533. The upper-rear optics 516 may have a plurality of mirrors 518, 520, 522 to redirect light 517. In the embodiment of FIG.

5C, light 517 reflects from a mirror 518. Light 519 leaving the mirror 518 is directed to the mirror 520. Light 521 leaving the mirror 520 is directed to the mirror 522. Light 523 leaving the mirror 522 is directed to the upper-rear camera lens 524.

FIG. 5D is also a side view of a smartphone 503 with upper-front optics 525 for an upper-front camera 531 to direct light 526 from the dining dishes 507, 533. In the embodiment of FIG. 5D, the upper-front optics 525 has a lens 527 to focus the light 526 to provide focused light 528. The focused light 528 is directed to a mirror 529. Light 530 leaving the mirror 529 is directed to the upper-front camera lens 531.

Figure 5E:
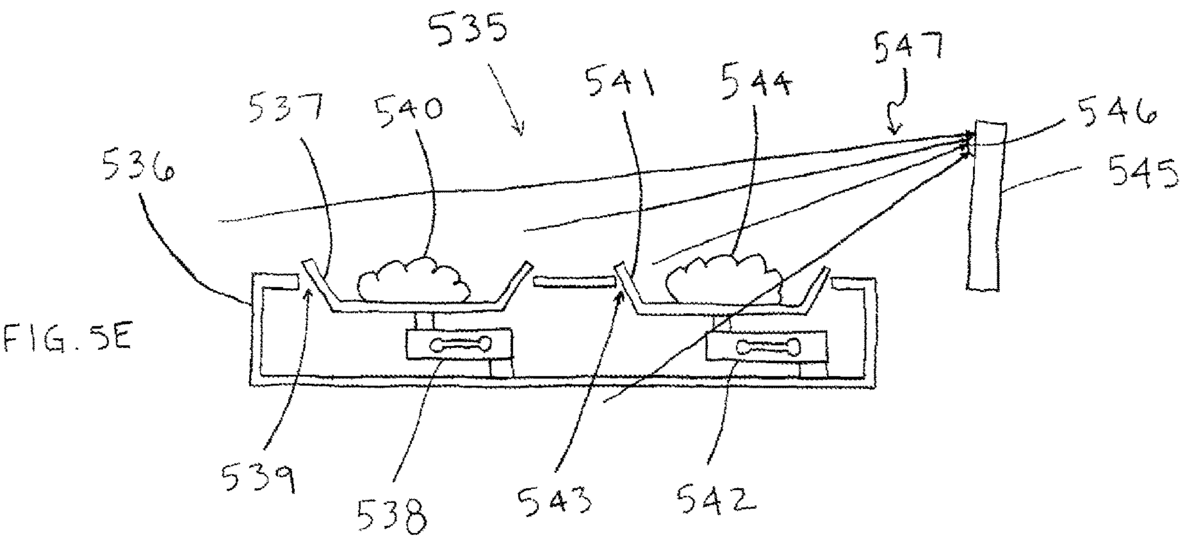
FIGS. 5E and 5F are side views of an active foodware system having a housing structure including one or a plurality of dining plate mating structures. The dining plate mating structures are over dish cavities, and are supported by load cells.

FIG. 5E is a side view of an active foodware system 535, which is similar in some aspects to the active foodware system 500 of FIG. 5A. The active foodware system 535 has a housing structure 536 including a plurality of dining plate mating structures 537, 541. The dining plate mating structure 537 is over a dish cavity 539, and the dining plate mating structure 541 is over a dish cavity 543. The dining plate mating structure 537 is supported by a load cell 538, and the dining plate mating structure 541 is supported by a load cell 542. The dining plate mating structure 537 has food 540, and the dining plate mating structure 541 has food 544.

A mobile device 545 has a software app and a camera 546 to recognize food items 540, 544, where the camera 546 receives light 547 from the food items 540, 544. The weight of the food items 540, 544 is sensed by the load cells 538, 542 supporting the dining plate mating structures 537, 541. The weight of the food items 540, 544 is transferred by Bluetooth to the app, which determines the calories of the food items 540, 544.

Figure 5F:
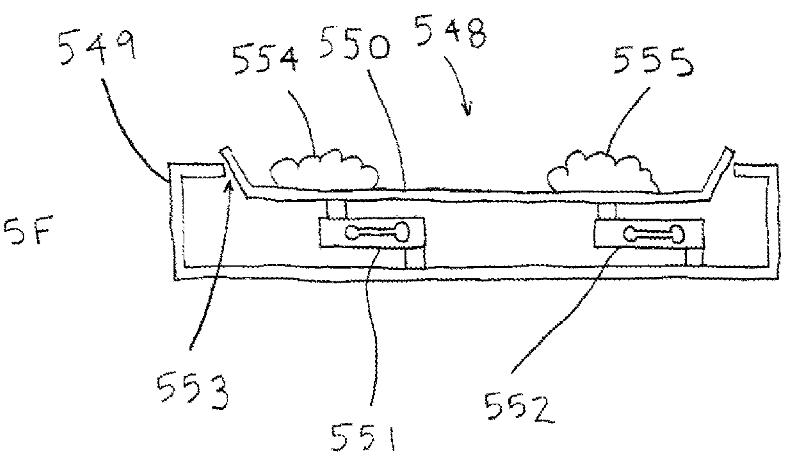

FIG. 5F is a side view of an active foodware system 548, which is similar in some aspects to the active foodware system 535 of FIG. 5E. The active foodware system 548 has a housing structure 549 including a large dining plate mating structure 550 that is larger than the dining plate mating structures 537, 541 of FIG. 5E. The large dining plate mating structure 550 is over a large dish cavity 553. The large dish cavity 553 may be the size of multiple dish cavities 539, 543 of FIG. 5E, and the large dining plate mating structure 550 may straddle multiple dish cavities 539, 543 of FIG. 5E. The large dining plate mating structure 550 is supported by multiple load cells 551, 552, or by cantilever beams extending from load cells 551, 552. The large dining plate mating structure 550 has food 554, 555.

FIGS. 6A-6D are an active foodware system 600 having a plurality of dining plate mating structures 601 for removably mating 612 with dining plates 602. The active foodware system 600 is similar in some aspects to the active foodware system 400 of FIGS. 4A-4B. A tradename for the embodiment of this active foodware system 600 is FunPlayte™ The active foodware system 600 typically includes a visual stimulating component 603 including graphical display 604 displaying an interactive visual image 605, where the visual image is synchronized with sound from an auditory stimulating component, such as a speaker 606, as provided by FIG. 6E. The visual image 605 may include a narrator talking, and may include displayed text 607.

Figure 6C:
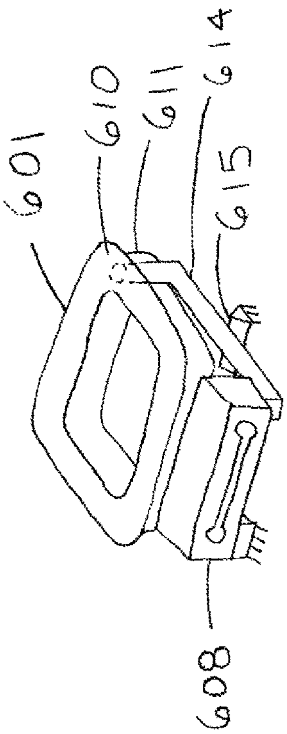
FIGS. 6A-6E are an active foodware system having dining plate mating structures for removably mating with dining plates. A tradename for the embodiment of this active foodware system is FunPlayte™. The active foodware system includes a sensing component, such as a load cell, and a graphical display displaying an interactive visual image, such as a narrator talking, synchronized with sound from speakers.
Figure 6D:
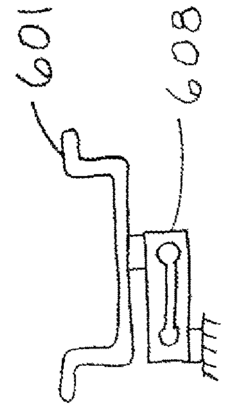
Figure 6E:
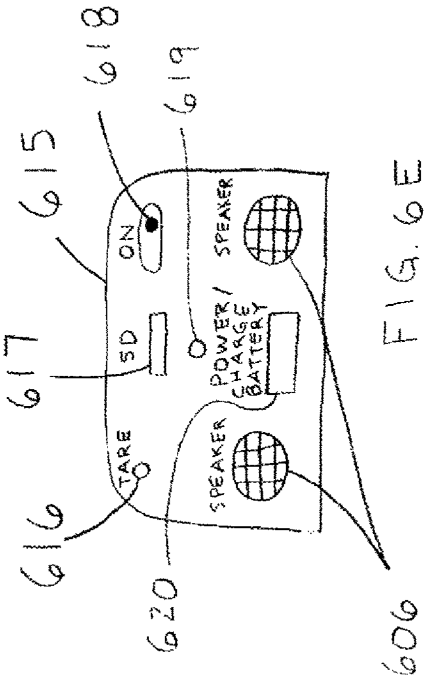
Figure 6A:
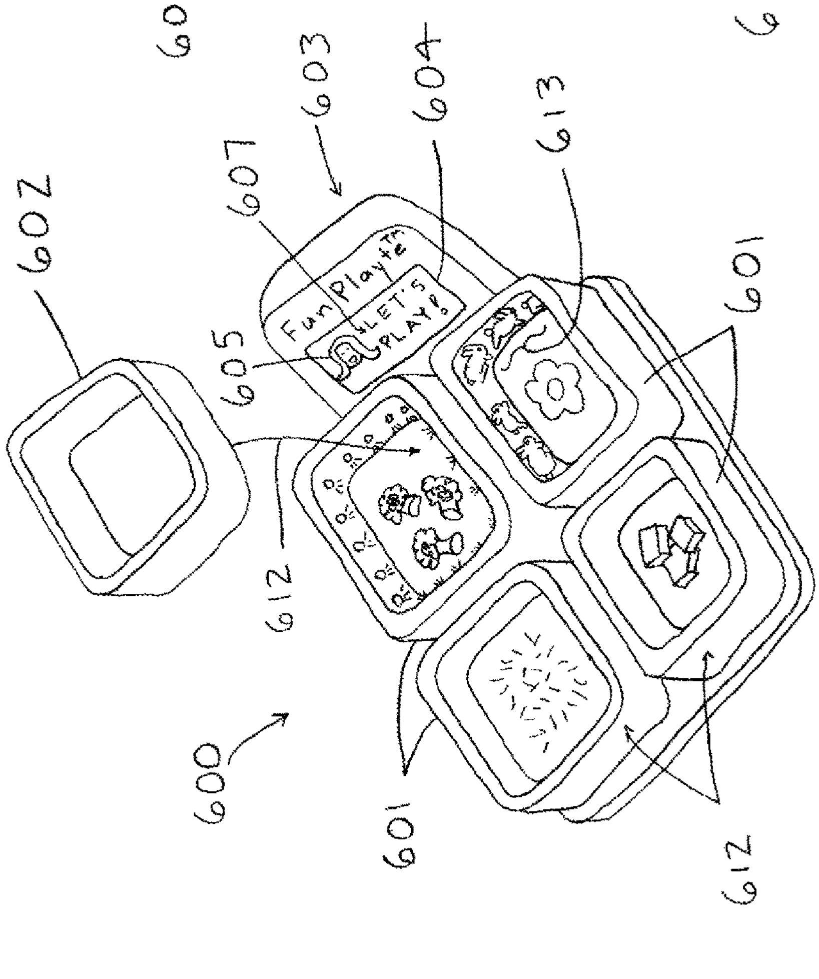
Figure 6B:
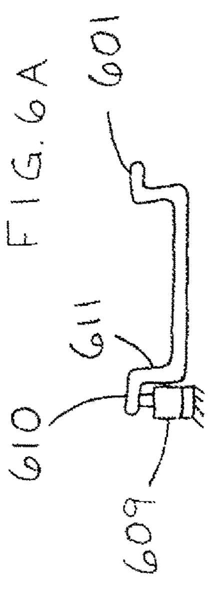

FIGS. 6B-6D provide a sensing component, such as a load cell, load sensor, or strain gage, for sensing the weight of food placed in a dining plate which is mated with one or more of the dining plate mating structures 601. The sensing components may be beam-type 608, disc-type 609, button-type, or washer-type load cells or load sensors, or any combination thereof. The sensing components may be arranged around the periphery of a mating structure, as provided in FIGS. 6B and 6C. The sensing components may be arranged below, and attached to, the horizontal surface 610 surrounding the sidewalls 611 of a dining plate mating structure 601. The sensing components may be arranged to the side of, and attached to, the sidewalls of a dining plate mating structure 601. The sensing components may be arranged below the level of the horizontal surface surrounding the sidewalls of a dining plate mating structure 601, and arranged to the side of the sidewalls, and attached to a cantilever beam which supports the dining plate mating structure 601.

When the sensing component is a beam load cell, it may be oriented at substantially a 90-degree angle relative to the cantilever beam. The cantilever beam may extend underneath the dining plate mating structure 601 and support it from below. The cantilever beam may be attached to a portion of the sidewall of the dining plate mating structure 601. The top surface of the beam load cell may be below the horizontal surface surrounding the sidewalls of the dining plate mating structure and simultaneously above the bottom edge of the sidewall. The cantilever beam may be attached to the bottom surface of the beam load cell.

As provided in the embodiment of FIG. 6A, there may be LED strips 612 around each dining plate mating structure 601. Clear liner dining plates 602 hold food and fit (mate) into stationary dining plate mating structures 601. A dining plate mating structure 601 may have translucent images 613, such as a bunny rabbit, so when the lights from the LED strips 612 flash around, it looks like the bunny rabbit is hopping. There may be silicone rubber covering over LEDs, load cells, and the video display 604 to make them watertight.

An embodiment of the active foodware system 600 includes the following:

(1) Each of four dining plates 602 may have its own weight sensing.

(2) The narrator 605 asks the diner to eat broccoli, or whatever else "Mom" programmed, e.g., meat, rice, cookie, etc., and lights flash around that dining plate 602.

(3) When reduction in weight in that dining plate 602 is detected, the narrator 605 says, "Good job! Thanks for eating your broccoli! Let's play a game and find the broccoli." On the graphic display 604, images are displayed, such as broccoli, a banana, and an apple. If an incorrect image is pressed, the narrator 605 says, "Close, try again," and the incorrect image selection is removed. When the correct image is touched, the narrator 605 says, "That's right! Broccoli is good for your heart!"

(4) When there is a correct answer, lights around all the dining plates 602 make flashing effects, combined with fun sounds synchronized.

In FIG. 6B, there is torque on the load cell 609, since the dining plate mating structure 601 is cantilevered.

FIG. 6C provides a lower profile than FIG. 6D, since FIG. 6C has the load cell 608 on the side of the dining plate mating structure 601. Using a rocker 614, which rocks on a fulcrum 615 and connects the load cell 608 to the dining plate mating structure 601, the torque on the load cell 608 is eliminated, since the dining plate mating structure 601 is no longer cantilevered.

FIG. 6D provides higher profile embodiment, where the load cell 608 is positioned under the dining plate mating structure 601.

FIG. 6E is a rear view of an enclosure 615 for the visual stimulating component 603. The rear of the enclosure 615 may include: a "Tare" button 616 to zero the weight of a load cell; an SD card slot 617; an on/off switch, which may be a slide switch 618; speakers 606; a light 619 for indicating whether the active foodware system 600 is running off of an internal battery, or off external power, which also charges the internal battery; and a power receptacle 620 for receiving external power.

Figure 7:
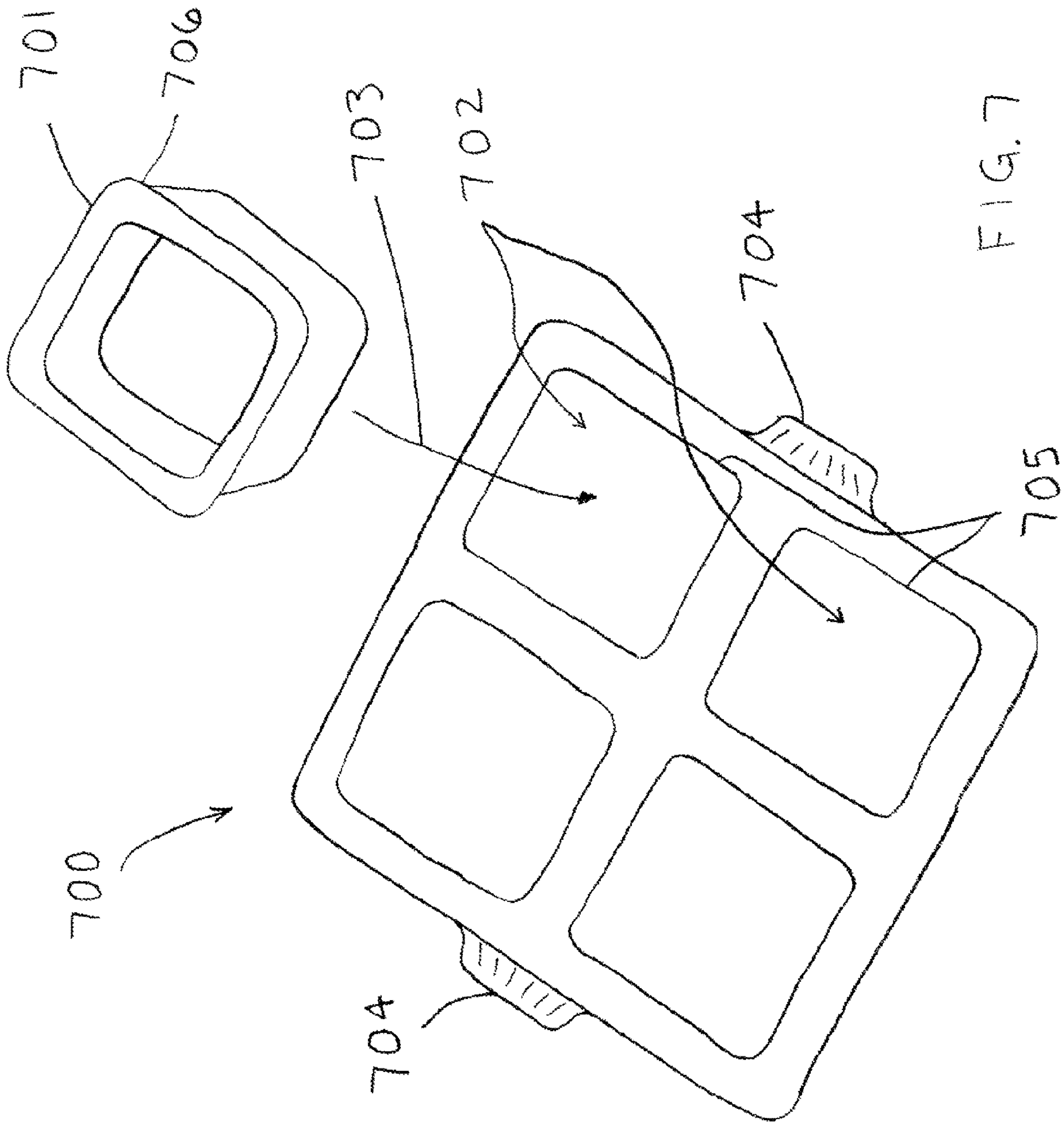
FIG. 7 is a perspective view of a dining plate carrier tray, having a plurality of openings for holding and carrying dining plates.

FIG. 7 is a perspective view of a dining plate carrier tray 700, having a plurality of openings 702. There may be four openings, each for holding a dining plate 701, although any convenient number of openings 702 (see also openings 7506 in related FIG. 75) may be used. The border 705 of the openings has a portion capable of supporting the horizontal surface 706 surrounding a dining plate 701. In typical operation, one or more dining plates 701 are filled with food and placed 703 in the openings 702 of the carrier tray 700. The user then lifts the carrier tray by the handles 704, which lifts all the dining plates 701 together, and then places the carrier tray 700 on top surface of a foodware system housing structure, such as the top surface 104 of the housing structure 101 of FIG. 1A. The carrier tray 700 may have carrier mating structure that helps position the carrier structure 700 in functional relation to the housing structure of the foodware system, and positions each dining plate 701 into a desired position in a dining plate mating structure. Accordingly, food may be prepared in a kitchen, placed into dining plates 701, and the dining plates 701 placed 703 into the dining plate carrier 700. Then conveniently all the dining plates 701 with food may be carried together and placed into the desired dining plate mating structures almost simultaneously. After dining, the process may be reversed, and all dining plates 701 may be lifted simultaneously with the dining plate carrier 700, and carried together to the kitchen, where the dining plates 701 may be remove from the dining plate carrier 700 and cleaned. In general, the dining plate carrier 700 (also referred to as a rack) makes it easier to load and carry all four dining plates 701 (also known as food compartments) from the kitchen counter to a FunPlayte, such as provided by the embodiment of FIGS. 6A-6E.

Figure 8A:
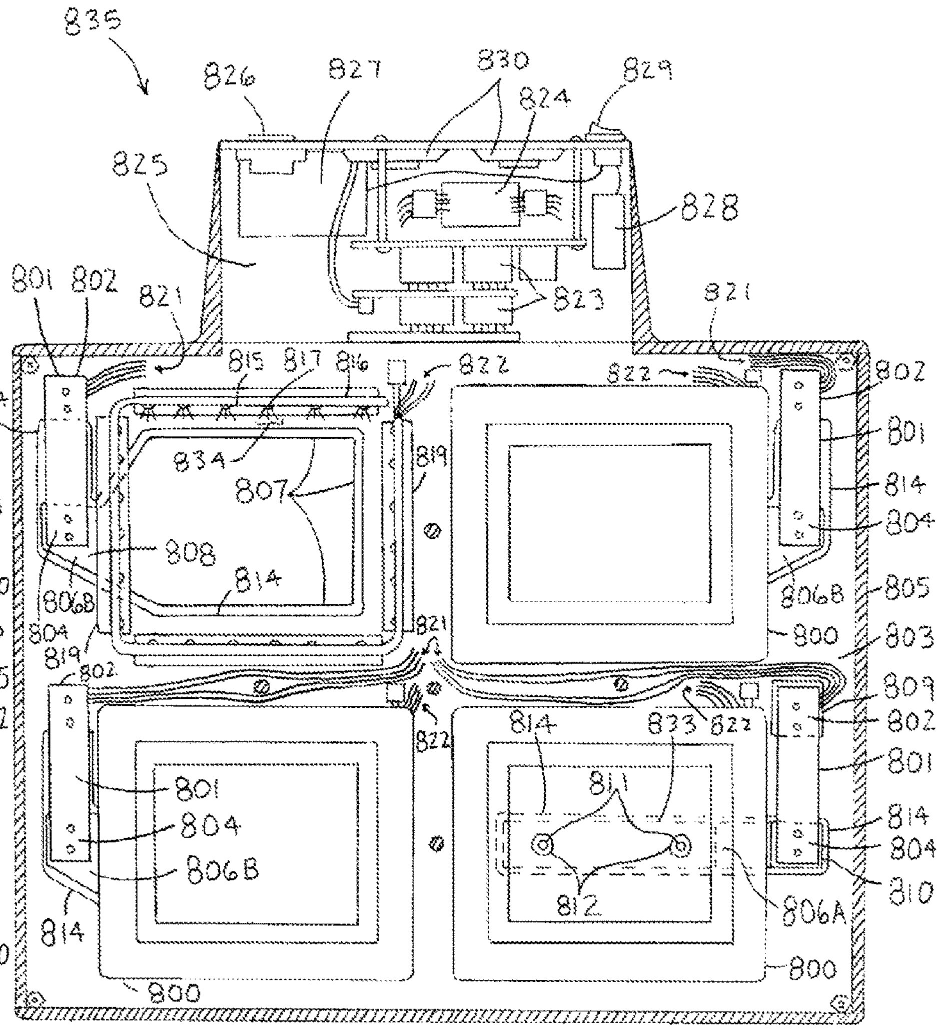
FIG. 8A is a plan view of an active foodware system having four dining plate mating structures, each supported by a cantilever beam extending 90 degrees from a beam load cell. A portion of the sidewall of each dining plate mating structure is backlit by an LED strip having a plurality of LEDs for emitting light.
Figure 8C:
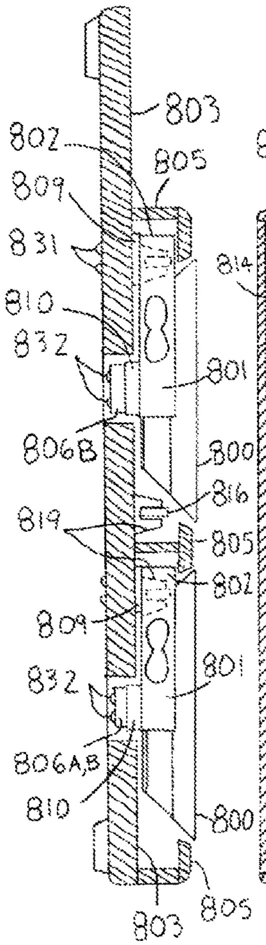
FIG. 8C is a left side view of the active foodware system of FIG. 8A.
Figure 8B:
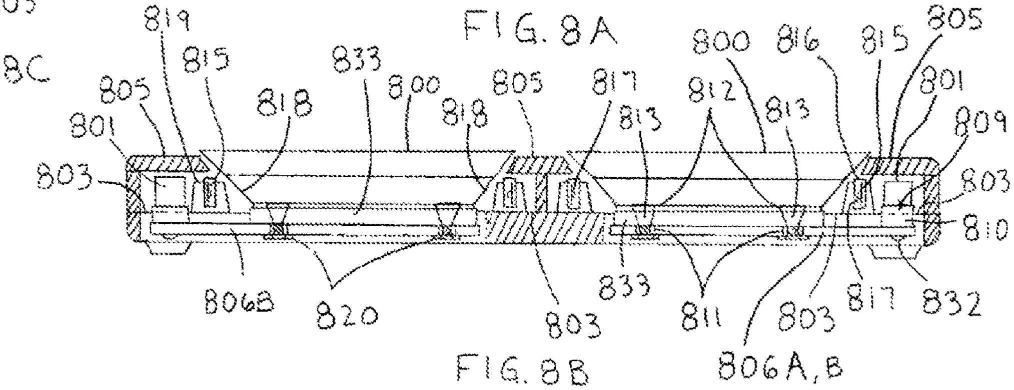
FIG. 8B is a front end view.

FIG. 8A is a plan view of an active foodware system 835 having four dining plate mating structures 800, each supported by a cantilever beam 806 (where two versions of a cantilever beam 806A and 806B are provided) extending at substantially 90 degrees from a beam load cell 801, and a portion of the sidewall of each dining plate mating structure is backlit by an LED strip 815 having a plurality of LEDs 817 for emitting light 834. FIG. 8B is a front end view of the active foodware system 835 of FIG. 8A. FIG. 8C is a left side view of the active foodware system 835 of FIG. 8A. Although four dining plate mating structures 800 are provided for by the embodiment of FIG. 8A, (with one not shown in order to expose the structure beneath), any convenient number of dining plate mating structures 800 may be used.

FIG. 8A provides for four dining plate mating structures 800; although, only three dining plate mating structures 800 are shown, since one dining plate mating structure 800 is not shown to make it easier to show the apparatus typically positioned under the top of a dining plate mating structure 800. The dining plate mating structures 800 are shown as square in shape to minimize unused space between them; although, any convenient mating structure shape may be used, including rectangles, circles, triangles, pentagons, and the like.

Four beam load cells 801 are provided. The beam load cells 801 are attached at one end 802 to a bottom surface 803 of a housing structure 805, and are attached at the other end 804 to a cantilever beam 806. The housing structure 805 may be translucent, blue, and ⅛" thick. The base with bottom surface 803 may be opaque, black, matte black P95, acrylic plastic, and ¼" thick. In FIGS. 8A-8C, referring to a cantilever beam 806 may refer to either of the exemplary cantilevers provided, e.g., cantilever 806A or cantilever 806B. The cantilever beam may be aluminum, and ⅛" thick. The beam load cells 801 may be attached at the end 802 to the bottom surface 803 of the housing structure 805 by screws 831. The end 802 of the beam load cell 801 may be elevated up above the bottom surface 803 by an elevation-up spacer 809. The elevation-up spacer 809 may be aluminum, and 1/16" thick. The end 804 of the beam load cell 801 may connected to an elevation-down spacer 810 that is positioned between the end 804 of the beam load cell 801 and the cantilever beam 806, and which lowers down the top surface of the cantilever beam 806 to below the bottom surface 803. The elevation-down spacer 810 may be aluminum, and ⅛" thick. The end 804 of the beam load cell 801 may be connected to the elevation-down spacer 810 by screws 832, which may screw into tapped threads in the beam load cell 801. The dining plate mating structure may be supported over the cantilever beam 806 by a mating structure elevation-up spacer 833. The mating structure elevation-up spacer 833 may be acrylic plastic, ⅛" thick, and may be attached by glue or screws.

The cantilever beam 806 may take any convenient form, such as a rectangular cantilever beam 806A, or a cantilever beam 806B having a square portion 807 for supporting a dining plate mating structure 800 and a flange portion 808 for attachment to the end 804 of the beam load cell 801. (Note that FIG. 8 has similarities to FIG. 1, where the beam load cells 114 are attached at one end 128 to a bottom surface 113 of the housing structure, and are attached at the other end 129 to a cantilever beam 115.)

The cantilever beam 806 may be attached to a dining plate mating structure 800 with screws 813 which may pass through holes 811 in the cantilever 806 and through the holes 812 in the bottom surface of the mating structure 800. The screws 813 may be held in place by screw threads in the cantilever beam 806, screw threads in the mating structure, or threaded nuts 820.

The cantilever beam 806 may be recessed below the bottom surface 803 in a cantilever cavity 814 which allows the cantilever beam 806 to pass below the LED strip 815, which may be supported by the bottom surface 803.

LED strips 815 surround the sidewalls 818 of the dining plate mating structure 800. The LED strips 815 may be held in position relative to the bottom surface 803 by LED support structure 819. The LED support structure 819 may include a U-shaped channel for holding the top and/or bottom portion of an LED strip 815 in a desired position.

The LED strips 815 may be protected by a casing 816 or sheath. The casing 816 may be watertight to protect the LEDs 817 and other electrical circuitry on the flexible substrate of the LED strip 815. The casing 816 may be made of silicone rubber or any other flexible translucent material.

The beam load cells 801 have wiring 821 that electrically connects sensor signals from the load cells 801 to sensing electrical circuitry 823 connected to a microcontroller 824. The load-cell wiring 821 may include four wires. The LED strips 815 also have wiring 822 that electrically connects LED control signals from the microcontroller 824 to the LED strips 815. The LED-strip wiring 822 may include wires for signal, power and ground. A data communication connector 826 is typically provided to communicate digital data from an external computer with the active foodware system, and also to provide external electrical power. The data communication connector 826 may be a USB connector or other convenient connector. One or more batteries 827 and 828 typically provide power when the active foodware system is not connected to an external power supply; although, either or both may provide electrical power even when the active foodware system is connected to an external power supply. The batteries 827 may include four AA batteries, and the battery 828 may be a 9-volt battery. An on/off switch 829 is also provided. Speakers 830 may also be provided to provide auditory feedback, which may related to the food in a dining plate, and which may be synchronized with visual stimulation from one or more LED strips 815 or a graphical display. All or a portion of the sensing 823, microcontroller 824, power 826, 827, 828, data communications 826, on/off switch 829, and related circuitry may be positioned in a dedicated electronics area 825 of the housing structure 805, or positioned wherever is convenient.

Figure 9A:
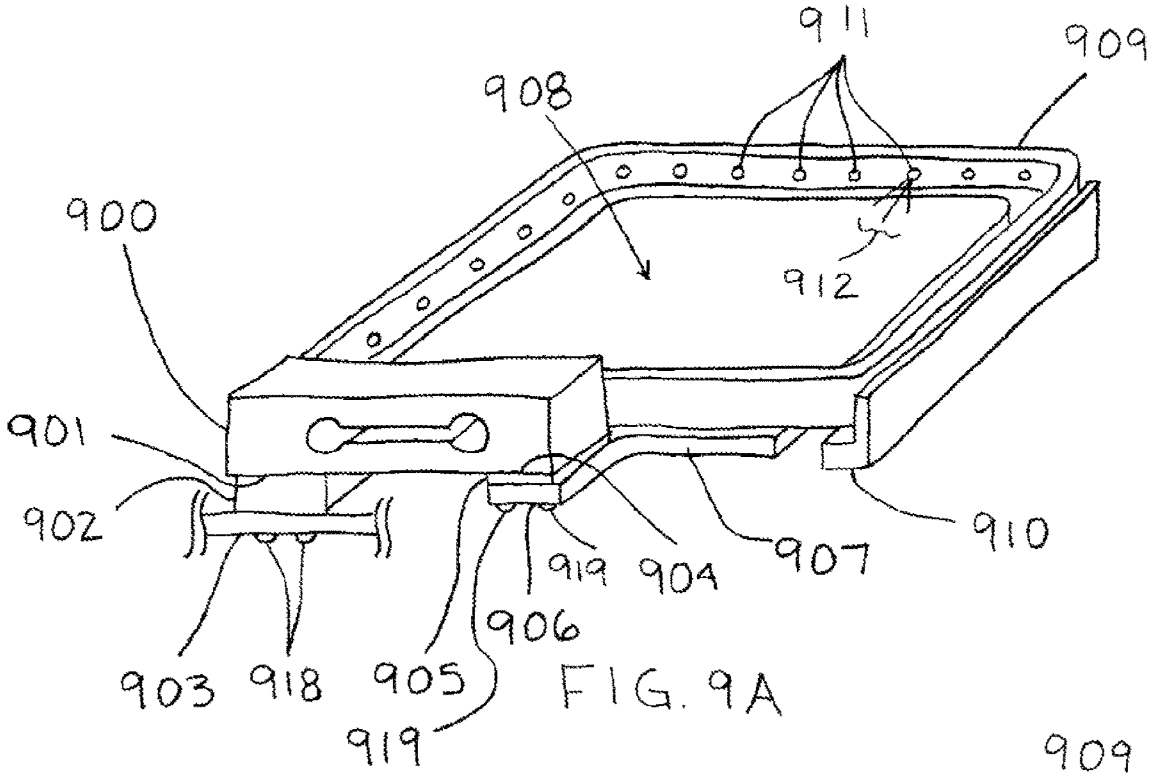
FIG. 9A is a perspective view of a beam load cell attached at one end by an elevation-up spacer to a housing surface, and connected at the other end by an elevation-down spacer to a flange end of a cantilever beam with square shape for supporting a dining plate mating structure. An LED strip surrounds the square shape.

FIG. 9A is a perspective view of a beam load cell 900 attached at one end 901 by an elevation-up spacer 902 to a housing surface 903, and connected at the other end 904 by an elevation-down spacer 905 to a flange end 906 of a cantilever beam 907 with square shape 908 for supporting a dining plate mating structure. An LED strip 909 surrounds the square shape 908 where the dining plate mating structure is to be placed, and the LEDs 911 face where the sidewalls of the dining plate mating structure will be in order to shine LED light 912 through translucent portions of the dining plate mating structure.

The LED strip 909 is shown in the embodiment of FIG. 9A as being supported by an LED strip support structure 910 having an L-shaped cross section, e.g., "corner molding," which may be acrylic plastic.

The cantilever beam 907 is also referred to as a weighing platform to support the dining plate mating structure. The dining plate mating structure may be white polystyrene plastic, and may be glued to the weight platform. The cantilever beam 907 may be ⅛" thick. The housing surface 903 is also referred to as a base plate 903, and may be ¼" thick. The attachment of the elevation-up spacer 902 to the housing surface 903 may use screws 918. The attachment of the elevation-down spacer 905 to the flange end 906 may use screws 919. Holes may be required in the base plate 903 in order to access the screws 919.

Figure 9B:
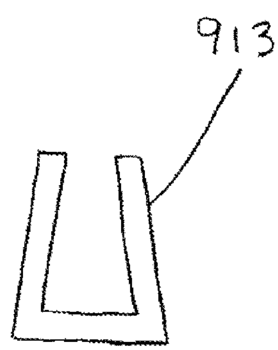
FIG. 9B is an end view of an LED strip support structure.

FIG. 9B is an end view of another LED strip support structure 913 having a U-shaped cross section (e.g., "deep end-cap channel"). One face of the U-shaped cross section deep end-cap channel may be cut down to lower one face of the U shape relative to the opposing face. The LED strip support structure 913 may be secured by glue or screws.

Figure 9C:
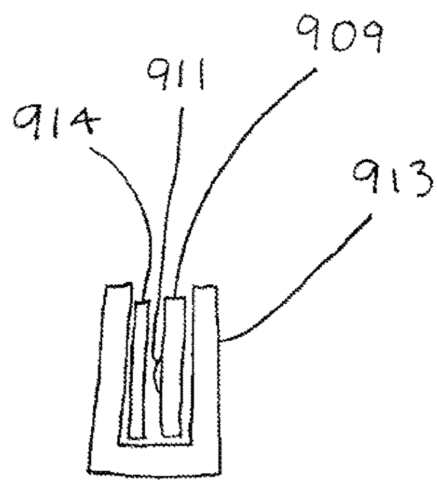
FIG. 9C is an end view of an LED strip with LED being supported by—the LED strip support structure.

FIG. 9C is an end view of an LED strip 909 with LED 911 being supported by the LED strip support structure 913. An optional translucent lens 914 is also provided. The lens 914 may be a diffusing lens, such as white polystyrene. Other colors may be used, and other types of lenses may be used, like "Illusion Film™".

Figure 9E:
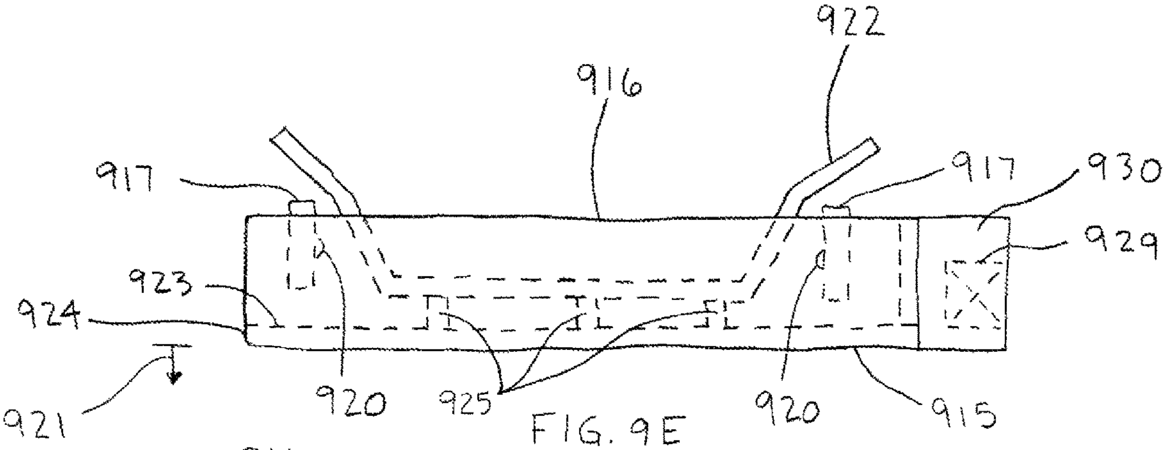
FIGS. 9D and 9E provide a dining plate mating structure supported by the surface of a square cantilever beam having two side support beams.
Figure 9D:
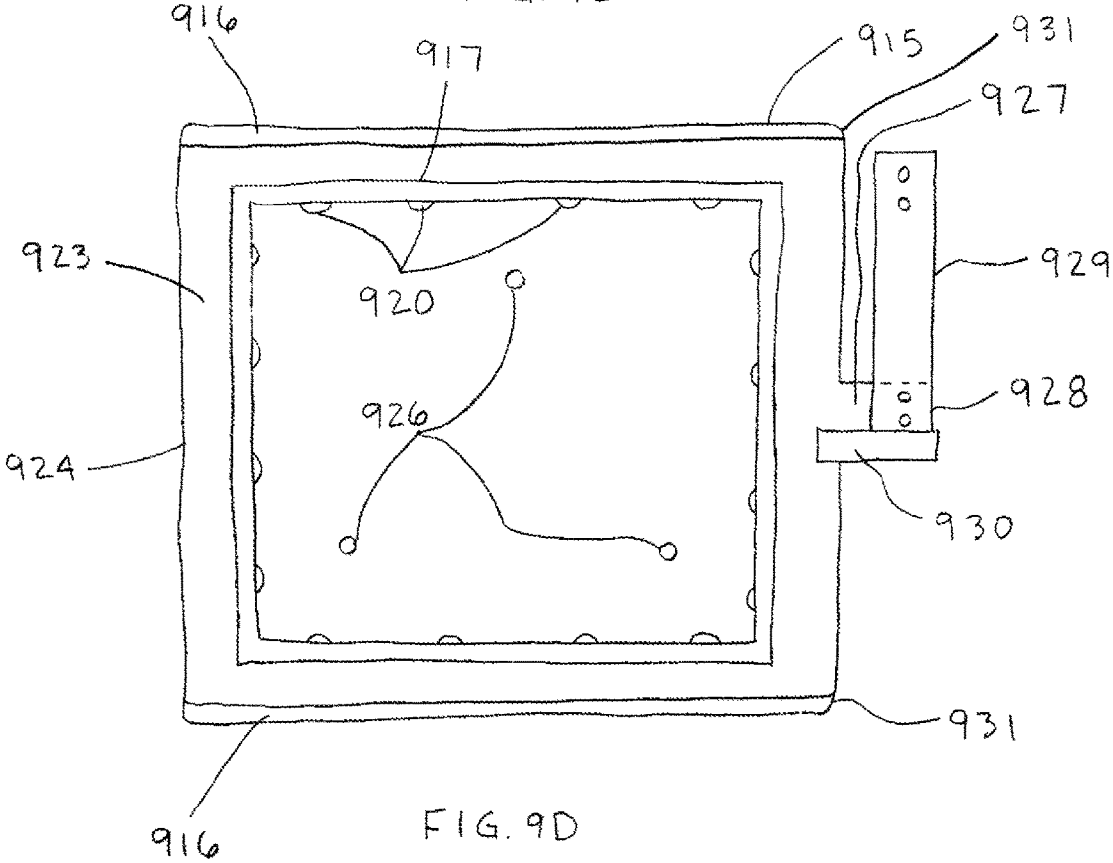

FIG. 9D is a plan view, and FIG. 9E is a side view, of a cantilever beam 915 with side support beams 916 to increase the area moment of inertia of the cantilever beam 915, and thus decrease its flexure for a given food load. This allows the cantilever beam 915 to be made from plastic instead of a material with higher modulus of elasticity, such as aluminum. Typically the side support beams 916 of such a cantilever beam 915 would be positioned radially on the outside of the LED strips 917 having LEDs 920.

The moment of inertia, I, of a side support beam 916 of width, B, and height, H, equals B*Hˆ3/12. The deflection 921 of such a single side support beam 916 of length, L, under a weight, W, equals W*Lˆ3/(3*E*I), where E is Young's Modulus for the material of the single side support beam 916.

As provided by the embodiment of FIGS. 9D and 9E, a dining plate mating structure 922 is supported by the surface 923 of the square cantilever beam 924 having two side support beams 916. As provided by the embodiment of FIGS. 9D and 9E, the support includes three column supports 925 attaching the dining plate mating structure 922 to the surface 923 at three locations 926. A flange 927 of the square cantilever beam 924 is attached to one end 928 of the beam load cell 929. The attachment includes a tall attachment member 930 that extends inward past the edges 931 of the side support beams 916 toward the center of the square cantilever beam 924 in order to provide more stiffness to prevent vertical deflection when food is added.

FIGS. 10A-10D are side views of various structures for attaching a dining plate mating structure 1000 to a cantilever beam 1001.

Figure 10A:
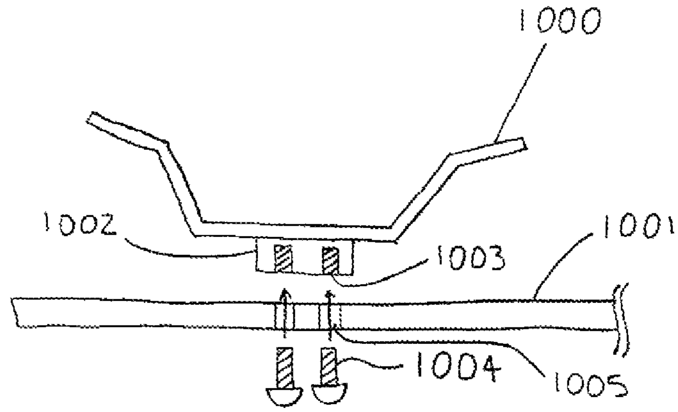
FIGS. 10A-10D are side views of various structures for attaching a dining plate mating structure 1000 to a cantilever beam 1001.

In FIG. 10A, the dining plate mating structure 1000 has a block 1002 with tapped holes 1003 for receiving screws 1004 that pass through holes 1005 in the cantilever beam 1001.

Figure 10B:
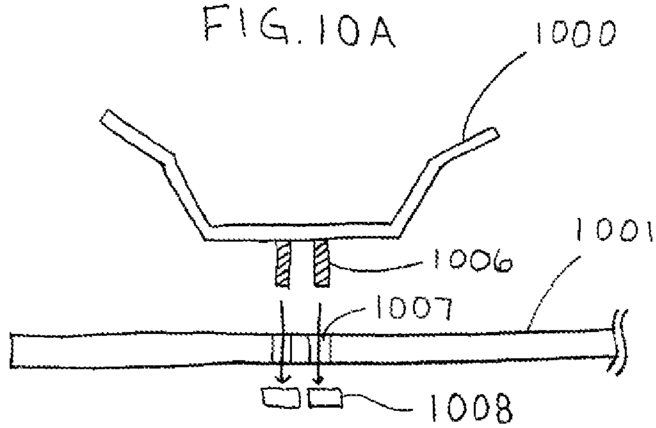

In FIG. 10B, the dining plate mating structure 1000 has screws 1006 that may be plastic and glued to the dining plate mating structure 1000. The screws 1006 pass through holes 1007 in the cantilever beam 1001 and are secured by nuts 1008.

Figure 10C:
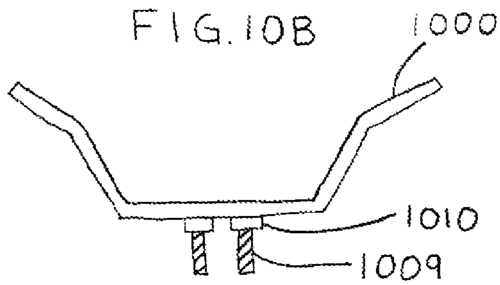

FIG. 10C is an alternate embodiment to FIG. 10B where the dining plate mating structure 1000 has screws 1009 having heads 1010 attached to the dining plate mating structure 1000.

Figure 10D:
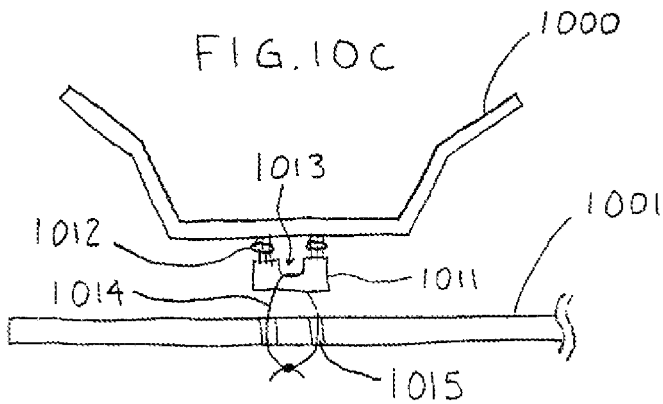

In FIG. 10D, the dining plate mating structure 1000 has a bracket 1011 attached that may be glued by glue 1012 to the dining plate mating structure 1000. The bracket has a depression 1013 through which a tie 1014 is passed. The tie 1014 also passes through holes 1015 in the cantilever beam 1001.

Figure 11A:
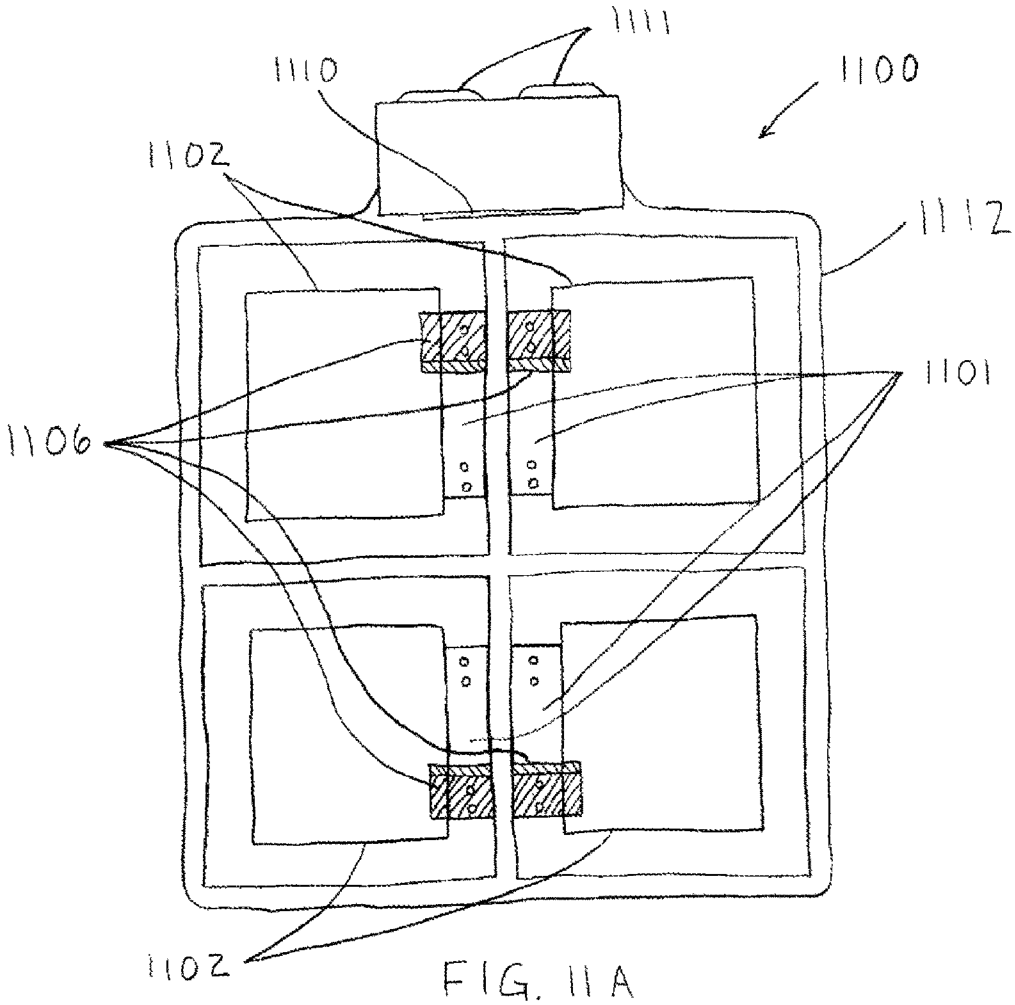
FIG. 11A is a plan view of an active foodware system.
Figure 11B:
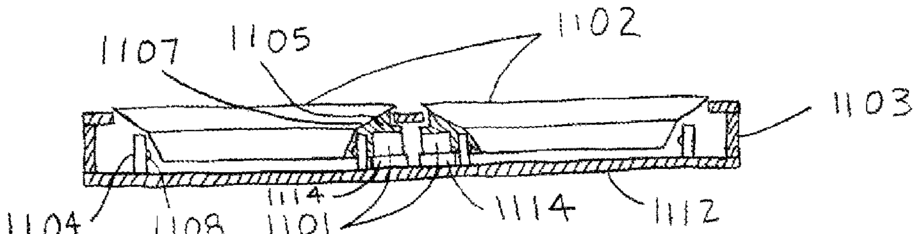
FIG. 11B is an end view, including beam load cells placed on a base between dining plate mating structures.

FIG. 11A is a plan view of an active foodware system 1100, and FIG. 11B is an end view, similar to the active foodware system 835 provided by FIGS. 8A and 8B, but the active foodware system 1100 includes beam load cells 1101 placed on a base 1112 between dining plate mating structures 1102, rather than along the outer periphery of the housing structure 1103, as provided by the active foodware system 835.

Figure 11C:
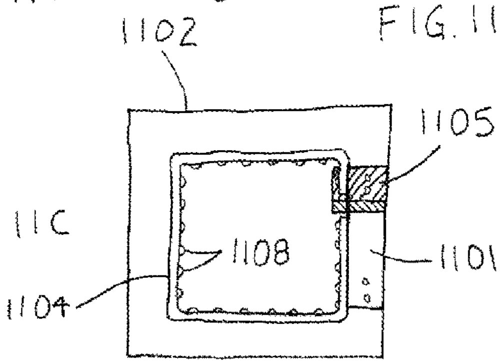
FIG. 11C is a plan view where an LED strip with LEDs is located beneath a dining plate mating structure. The figure also provides an L-shaped bracket for attaching the beam load cell to the dining plate mating structure sidewall.
Figure 11F:
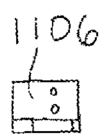
FIG. 11F is a plan view of the L-bracket.
Figure 11E:
FIG. 11E is an end view of the L-bracket.
Figure 11D:
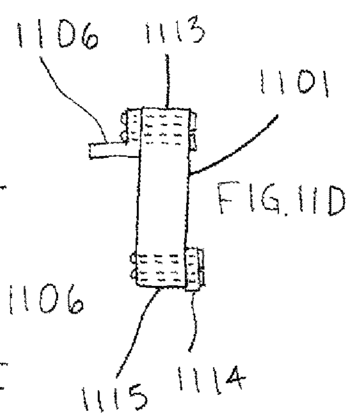
FIG. 11D is a side view of a beam load cell with L-bracket attached to one end of the beam load cell, and an elevation-up spacer attached to the other end.

FIG. 11C is a plan view of a dining plate mating structure 1102 providing where an LED strip 1104 with LEDs 1108 may be located beneath the dining plate mating structure 1102. The figure also provides a bracket 1105, which may be L-shaped 1106, for attaching the beam load cell 1101 to the dining plate mating structure sidewall 1107. FIG. 11D is a side view of a beam load cell 1101 with L-bracket 1106 attached to one end 1113 of the beam load cell 1101, and an elevation-up spacer 1114 attached to the other end 1115; FIG. 11E is an end view of the L-bracket 1106; and FIG. 11F is a plan view of the L-bracket 1106.

FIG. 11A further provides a CPU enclosure 1109 that houses components similar in some aspects to the electronics in the electronics area 825 of FIG. 8A. The CPU enclosure 1109 includes a front LCD 1110 and rear speakers 1111.

The dining plate mating structure 1102 may be white polystyrene plastic.

The active foodware system 1100 may be covered in a silicone rubber sheet to provide a seal against moisture.

Figure 12:
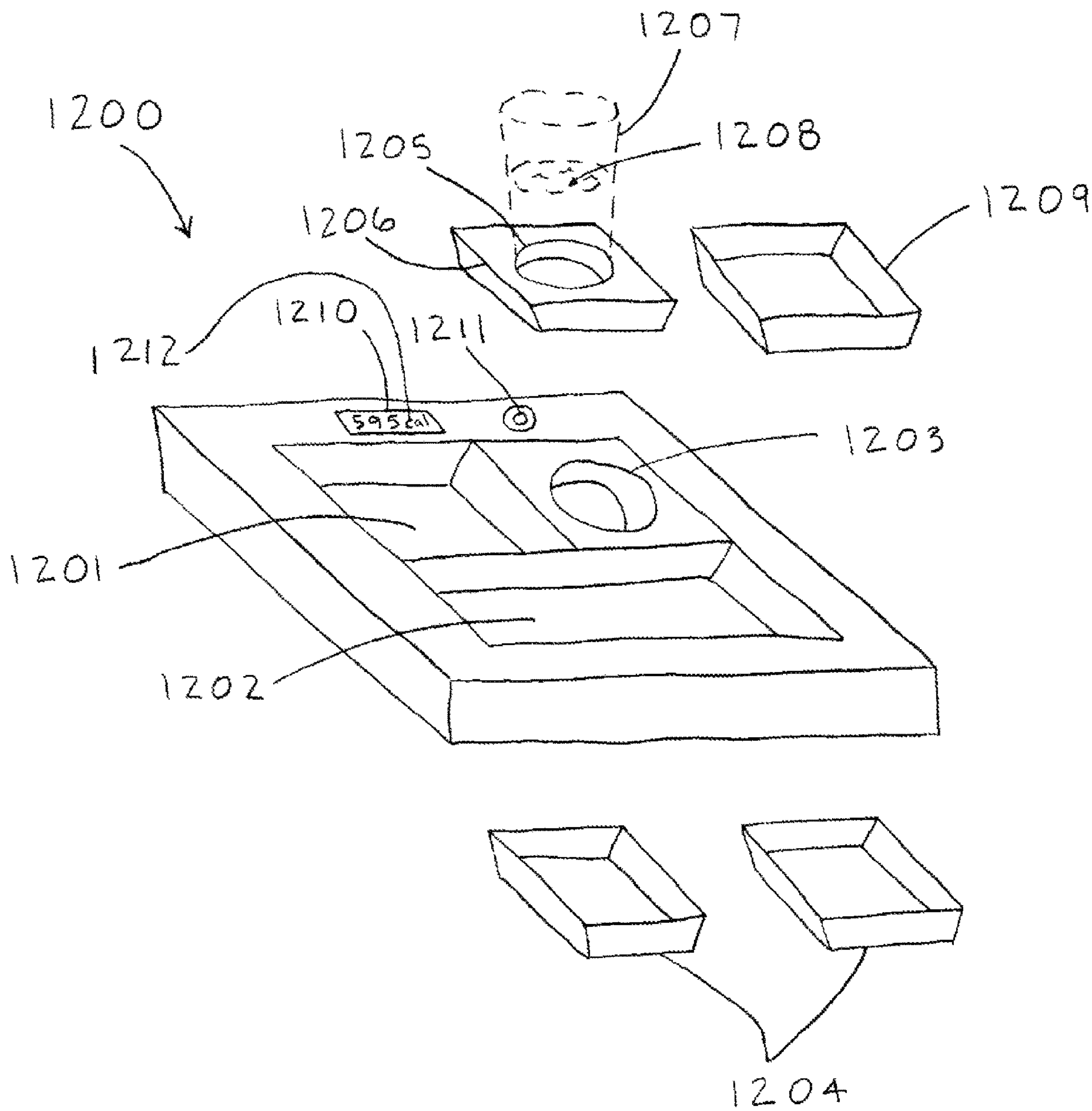
FIG. 12 is a perspective view of an active foodware system including a plurality of differently shaped dining plate mating structures for mating with a plurality of dining plates. A round dining dish may be a cup holder for holding a drinking cup for containing a beverage.

FIG. 12 is a perspective view of an active foodware system 1200 including a plurality of differently shaped dining plate mating structures for mating with a plurality of dining plates. Shapes of the dining plate mating structures may be squares 1201, rectangles 1202, triangles, circles 1203, polygons, and the like. Typically a dining plate will have the same shape as the dining plate mating structure it mates with, although not always. For instance, two square dining dishes 1204 may be positioned in a rectangular dining plate mating structure 1202, two triangular dining dishes may be positioned in a square dining plate mating structure, a round dining dish 1205 may have a square extending perimeter frame 1206 to mate with a square dining plate mating structure 1201, and the like.

The round dining dish 1205 may be a cup holder for holding a drinking cup 1207 for containing a beverage 1208.

In an embodiment of the active foodware system 1200 of FIG. 12, the rectangular dining plate mating structure 1202 may mate with one larger rectangular dining dish or with two smaller square dining dishes 1204 for holding an entree; the square dining plate mating structure 1201 mates with a square dish for holding a vegetable, a side food item, or a salad; and the circular dining plate mating structure 1203 is for holding a drinking cup. Alternately, the circular dining plate mating structure 1203 may be replaced by a square dining plate mating structure, which may then mate with the round dining dish 1205 having a square extending perimeter frame 1206, or mate with another square dining plate 1209, which may be for holding a second side food item.

The active foodware system 1200 may include an optional nutrition display 1210 that may display calories 1212. The active foodware system 1200 may include an optional barcode scanner and/or camera.

FIGS. 13A-13F are plan views of an active foodware system providing a variety of dining plate mating structure shapes for mating with dining plates.

Figures 13A, 13B, 13C, 13D, 13E, 13F:
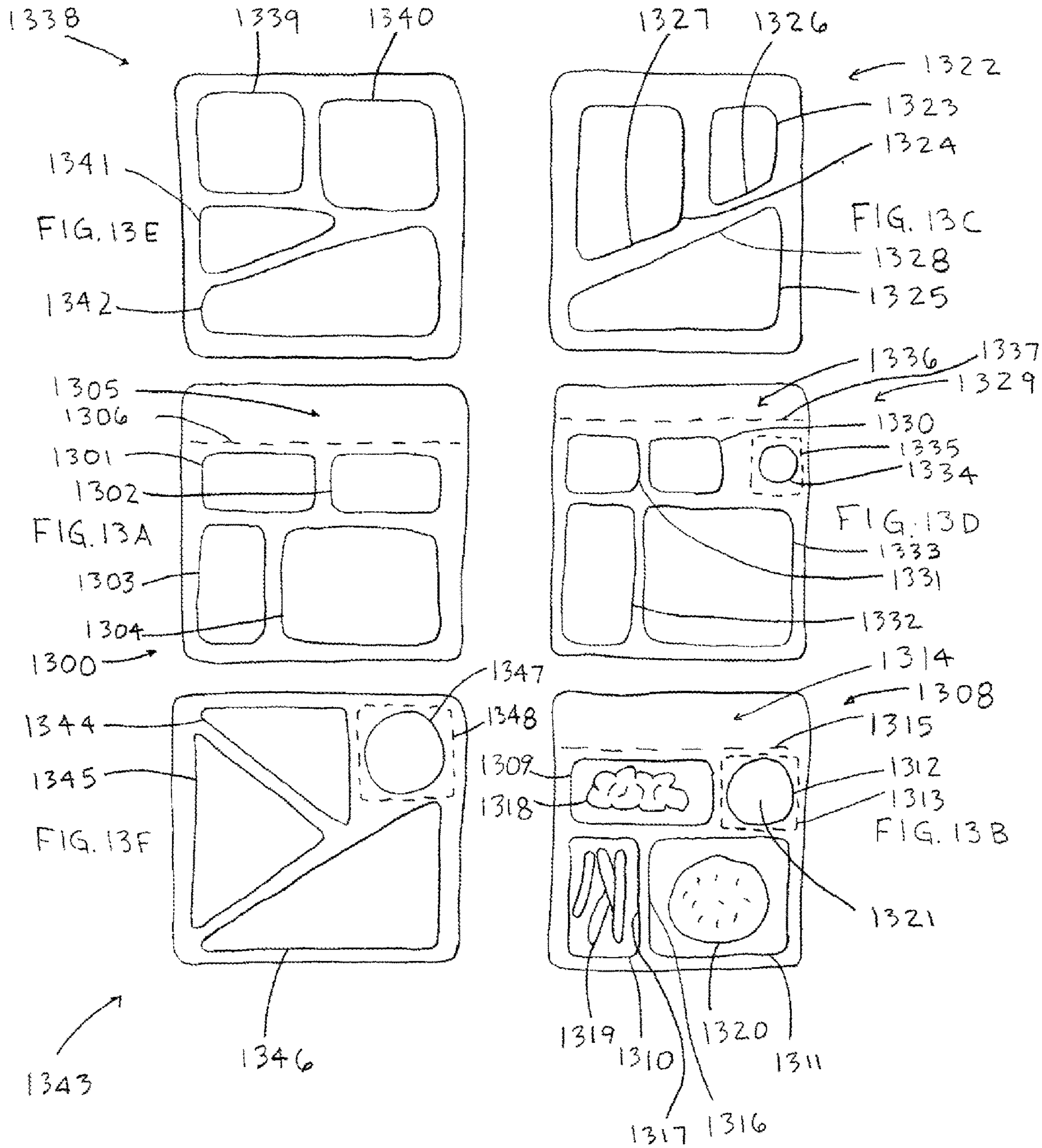
FIGS. 13A-13F are plan views of an active foodware system providing a variety of dining plate mating structure shapes for mating with dining plates.

FIG. 13A is a plan view of an active foodware system 1300 having four dining plate mating structures 1301, 1302, 1303, 1304 that are rectangular. The portion 1305 of the active foodware system 1300 separated by the dashed line 1306 may be used for electronics.

FIG. 13B is a plan view of an active foodware system 1308 having four dining plate mating structures: two 1309, 1310 are rectangular and may be the same size so there are fewer different sizes, one 1311 is square, and one 1312 is circular. The circular dining plate mating structure 1312 may alternately have a square frame, as indicated by the dashed square 1313, for use with a round insert to hold a drinking cup or other food item. The portion 1314 of the active foodware system 1308 separated by the dashed line 1315 may be used for electronics. As shown, the square dining plate mating structure 1311 may have side dimension 1316 similar to the long side dimension 1317 of the rectangular dining plate mating structure 1310. Regarding the square dining plate mating structure 1311, being square makes orientation easy, since each side is the same length.

In an embodiment of the active foodware system 1308 of FIG. 13B, the rectangular dining plate mating structure 1309 may be for holding a dish for salad 1318; the rectangular dining plate mating structure 1310 may be for holding a dish for fries 1319; the square dining plate mating structure 1311 may be for holding a dish for a hamburger 1320; and the circular dining plate mating structure 1312 may be for holding a container for milk 1321.

FIG. 13C is a plan view of an active foodware system 1322 having three dining plate mating structures 1323, 1324, 1325. As shown, the side 1326 of the dining plate mating structure 1323, and the side 1327 of the dining plate mating structure 1324, are parallel to the side 1328 of the dining plate mating structure 1325, but they are not parallel to other sides.

FIG. 13D is a plan view of an active foodware system 1329 having five dining plate mating structures: two smaller rectangular dining plate mating structures 1330, 1331; one larger rectangular dining plate mating structure 1332; one square dining plate mating structure 1333, and one circular dining plate mating structure 1334. As provided by FIG. 13B, the circular dining plate mating structure 1334 may alternately have a square frame, as indicated by the dashed square 1335, for use with a round insert to hold a drinking cup or other food item. Also as provided by FIGS. 13A and 13B, the portion 1336 of the active foodware system 1329 separated by the dashed line 1337 may be used for electronics.

FIG. 13E is a plan view of an active foodware system 1338 having four dining plate mating structures. As shown, two of the dining plate mating structures are square 1339, 1340, and two are triangular 1341, 1342.

FIG. 13F is a plan view of an active foodware system 1343 having four dining plate mating structures. As shown, three of the dining plate mating structures are triangular 1344, 1345, 1346, and one is circular 1347. As provided by FIG. 13B, the circular dining plate mating structure 1347 may alternately have a square frame, as indicated by the dashed square 1348, for use with a round insert to hold a drinking cup or other food item.

Figure 14B:
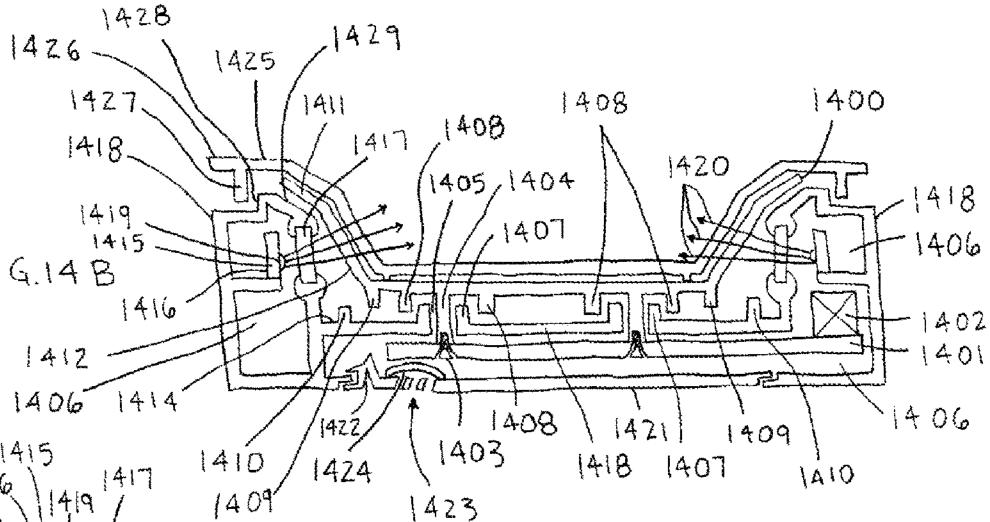
FIGS. 14B and 14C are end and side views of a dining plate mating structure attached to a cantilever beam extending from a beam load cell.
Figure 14C:
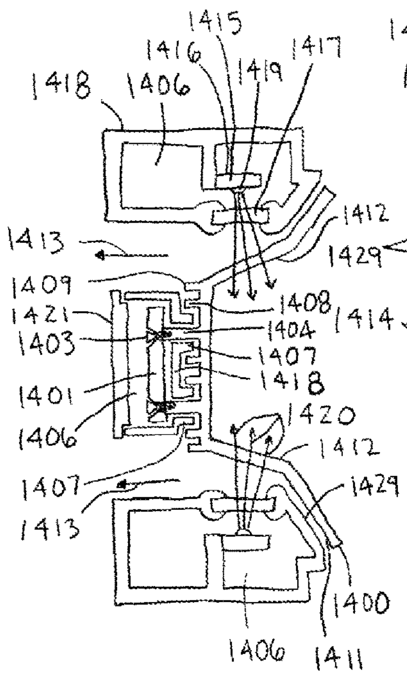
Figure 14A:
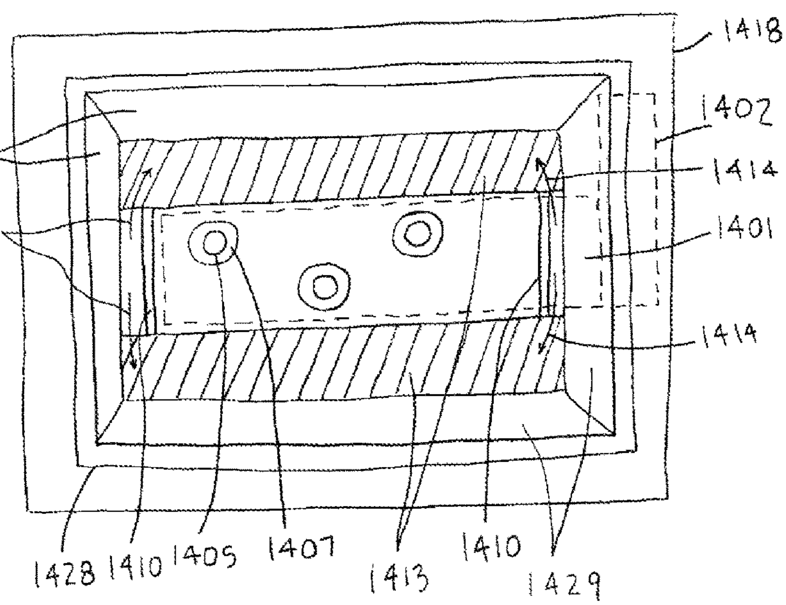
FIG. 14A is a plan view of the portion with the dining plate mating structure removed to show the structure beneath the location where the dining plate mating structure is typically positioned when in operation. There are barriers that help channel liquid away from holes and toward drains, such as gaps, on the sides of a cantilever compartment, so that water can drain out.

FIGS. 14A-C are a portion of an active foodware system. FIG. 14B is an end view, and FIG. 14C is a side view, of the portion that includes a dining plate mating structure 1400; whereas, FIG. 14A is a plan view of the portion with the dining plate mating structure 1400 removed to show the structure beneath the location where the dining plate mating structure 1400 is typically positioned when in operation. The active foodware system may include a plurality of similar portions. The plurality may be four similar portions arranged in a 2×2 array in a single housing structure. The portion shown includes water barriers and drains to channel liquid away from the cantilever beam 1401 and electronics.

In FIGS. 14A-C, the dining plate mating structure 1400 is attached to a cantilever beam 1401 extending from a load cell 1402, which may be a beam load cell. The dining plate mating structure 1400 may be attached by screws 1403 to spacers 1404 positioned between the dining plate mating structure 1400 and the cantilever beam 1401. Each of the spacers 1404 extends from the dining plate mating structure 1400 through a hole 1405 in a cantilever compartment 1406. Surrounding the hole 1405 is a barrier 1407 for preventing liquid that manages to get under the dining plate mating structure 1400 from easily pouring into the hole 1405, getting inside the cantilever compartment 1406, and interfering with the cantilever beam 1401 and/or related electronics. On the underneath side of the dining plate mating structure 1400 is typically another barrier 1408 which hangs down and surrounds the barrier 1407 to guide water away from the hole. The barrier 1408 may be circular. The barrier 1408 helps prevent liquid that might collect on the bottom surface of the dining plate mating structure 1400 from dripping down a spacer 1404. There may be additional barriers 1409 on the underside of the dining plate mating structure 1400 that help redirect liquid that might get under the peripheral lip 1411 of the dining plate mating structure 1400 and drip down the sidewall 1412. The barriers 1409 may go all around the base of the dining plate mating structure 1400 to provide a drip point, as well as to provide rigidity. There may be additional barriers 1410 that help channel liquid away 1414 from the holes 1405 and toward drains 1413, such as gaps, on the sides of the cantilever compartment 1406, so that water can drain out.

The LED strips 1415 reside in the cantilever compartment 1406, and have a water-resistant casing 1416 or are positioned behind a lens 1417 that makes a watertight seal with the active foodware system housing structure 1418. The LED strips 1415 are positioned such that the direction of maximum radiation intensity of each LED element 1419 is directed at a translucent portion of the sidewall 1412 of the dining plate mating structure 1400 for emitting light 1420 through it. Typically, the entire sidewall 1412 is translucent white for diffusing light 1420 as it passes through.

The bottom of the cantilever compartment 1406 may have a removable door 1421 to allow cleaning of any liquid or food particles that might still make their way into the cantilever compartment 1406. The removable door 1421 may have a snap-in latch 1422 at one end. The removable door, or another portion of the bottom of the cantilever compartment 1406, may have vent slots or holes 1423 to allow any liquid inside the cantilever compartment 1406 to evaporate. The vent slots 1423 may be covered with a water-resistant material 1424 that still allows vapor to pass through, such as polyurethane laminate (PUL), Gortex®, and the like.

A dining plate 1425 is mated with the dining plate mating structure 1400 when in dining use. The dining plate 1425 may have lifting/carrying tabs 1426, which are typically positioned around the periphery. Also around the periphery of the dining plate 1425 may be a food/liquid barrier 1427 which extends down. The housing structure 1418 may have a housing food/liquid barrier 1428 which extends up, typically just inside the food/liquid barrier 1427 which extends down from the dining plate 1425. Beyond the housing barrier 1428, the surface of the housing typically slopes inward 1429 to help drain away any food/liquid that manages to get under the plate barrier 1427 and over the housing barrier 1428. The slope of the housing 1429 typically is similar to the slope of the lip 1411 of the dining plate mating structure 1400, in order to minimize the size of the gap between the two and thereby minimize the amount of food that falls into the cantilever compartment 1406.

FIG. 15A is an end view of a portion of an active foodware system similar to the system of FIGS. 14A-14C, except rather than the dining plate mating structure 1500 being screwed to the cantilever beam 1501 (as is provided by FIGS. 14A-14C), in FIG. 15A the dining plate mating structure 1500 is easily removably snapped to the heads 1502 of screws 1503 screwed into the cantilever beam 1501. The screws 1503 may be shoulder screws. The screws 1503 may be wafer-head screws passing through a spacer 1504 that determines the height of the screw head 1502. Clips 1505 on the dining plate mating structure 1500 easily and removably snap to the screw heads 1502, to permit the dining plate mating structure 1500 to be easily removed for cleaning and to remove food which is able to get under the dining plate mating structure 1500.

FIG. 15B is a bottom view of a clip 1505 including a retaining ring 1507 and a single clip 1506 for holding the dining plate mating structure 1500 to the head 1502 of a screw. The clips 1506 may be flexible clips that include a cantilevered clip that flexes in order to allow the head of the screw 1502 to pass by, and then snaps back into its unflexed position to hold the screw head 1502. FIG. 15C is a bottom view of a clip 1505 including a retaining structure similar to FIG. 15B, but where there are a plurality of clips 1508 and a plurality of retaining rings 1509.

FIG. 16 is an end view of a portion of an active foodware system similar to the system of FIGS. 14A-14C, where the dining plate mating structure 1600 is screwed to the cantilever beam 1601 with screws 1602 that may be accessed through holes 1603 in the bottom of the housing structure 1604. The holes 1603 in the housing structure 1604 may be left open or optionally plugged with plugs 1605. The plugs 1605 may screw or snap into the holes 1603. The plugs 1605 may be rubber hole plugs, and may have vent holes/slots to allow evaporation.

FIGS. 17A-17B are an end view of a portion of an active foodware system similar to the system of FIGS. 15A-15C, except rather than the dining plate mating structure 1700 having flexible snaps for snapping to the cantilever beam 1701 (as was provided by FIGS. 15A-15C), in FIGS. 17A-17B the dining plate mating structure 1700 has extensions 1704 having O-rings 1705, or functional equivalent, for easily removably snapping to the heads 1702 of screws 1703 screwed into the cantilever beam 1701.

FIG. 17A provides an LED strip 1706. The screw 1703 may be a shoulder screw, and may have a slotted wafer head 1702.

Referring to FIG. 17B, dimensions may be: less than ⅛" for the thickness 1707 of the screw head 1702; ⅛" for the gap 1708 beneath the screw head 1702 and the top of the water barrier 1716; ⅛" for the height 1709 of the water barrier 1716; less than ⅛" for the thickness 1710 of the top wall 1717 of the compartment around the cantilever 1718; less than ⅛" for the gap 1711 beneath the bottom surface of the top wall 1717 and the cantilever 1718; ⅛" for the thickness 1712 of the cantilever 1718; ⅛" for the gap 1713 beneath the cantilever 1718 and the top surface of the bottom wall 1719 of the compartment around the cantilever 1718; less than ⅛" for the thickness 1714 of the bottom wall 1719; and less than or equal to 1.0" for the total distance 1715 between the bottom surface of the dining plate mating structure 1700 and the bottom surface of the bottom wall 1719.

FIG. 18 is an end view of a portion of an active foodware system similar to the system of FIGS. 17A-17B, except the dining plate mating structure 1800 has extensions 1804 having grooves 1806 for mating with O-rings 1805, or functional equivalent, held by, or otherwise functionally associated with, the periphery of the heads 1802 of screws 1803 screwed into the cantilever beam 1801.

FIG. 19A is a plan view, FIG. 19B is an end view, and FIG. 19C is a side view of a portion of an active foodware system similar to the system of FIG. 18. In FIGS. 19A-19C, there is a cantilever beam 1900 extending from a load cell 1901 inside a cantilever compartment 1902 which is intended to remain mostly dry and food free. Screws 1903 with screw heads 1904 protrude from holes 1905 in the cantilever compartment 1902 for snapping to structure on a dining plate mating structure (not shown). A trough 1906 is formed on the top of the cantilever compartment 1902 for channeling away any liquid that gets under the dining plate mating structure. The trough 1906 may channel liquid to drain holes 1907 that exit out the bottom of the active foodware housing structure 1908.

FIGS. 20A-20B are an end view of a portion of an active foodware system similar to the system of FIGS. 17A-17B, providing a structure for creating a groove 2000 for holding an O-ring 2001. The dining plate mating structure 2002 has extensions 2003 that is secured to a retainer 2004, such as by glue 2005. The extensions 2003 and retainer 2004 each provide a portion of the groove 2000 for positioning O-rings 2001, or functional equivalent, for easily removably snapping to the heads 2006 of screws 2007 screwed into a cantilever beam 2008.

FIG. 21A is an end view of a portion of an active foodware system similar to the system of FIGS. 17A-17B and FIGS. 20A-20B, providing a structure for holding a rubber washer 2100 for clipping to a screw head 2101 of a screw 2102 screwed into a cantilever beam. Similar to FIGS. 20A-20B, the structure for holding the rubber washer 2100 includes a dining plate mating structure 2103 having extensions 2104 secured to a retainer 2105, such as by glue 2106. As shown in FIG. 21A, the extensions 2104 may have grooves 2107, and the retainer 2105 may have associated protrusions 2108, in order better to secure the rubber washer 2100.

FIG. 21B is an example rubber washer 2100, such as a silicone rubber washer, for clipping over a screw head 2101.

FIG. 21C is an end view of a portion of an active foodware system similar to the system of FIGS. 17A-17B and FIGS. 20A-20B, providing a structure for creating a groove 2109 for holding an O-ring 2110. Similar to FIGS. 20A-20B, the dining plate mating structure 2111 has extensions 2112 that is secured to a retainer 2113, such as by glue 2114. The extensions 2112 and retainer, such as an O-ring retainer clip 2113, each provide a portion of the groove 2109 for positioning the O-ring 2110, or functional equivalent, for easily removably snapping to the heads 2115 of screws 2116 screwed into a cantilever beam.

FIGS. 22A-22B are end views of a portion of an active foodware system similar to the system of FIGS. 17A-17B and FIGS. 15A-15C, providing a structure for clipping a dining plate mating structure 2200 to a screw head 2201 of a screw 2202 screwed into a cantilever beam 2203.

The dining plate mating structure 2200 is easily removably snapped to a head 2201 of a screw 2202 screwed into the cantilever beam 2203. The screw 2202 may be a shoulder screw. The screw 2202 may be wafer-head screw passing through a spacer 2204 that determines the height of the screw head 2201. The dining plate mating structure 2200 has an extension 2205 covered with a silicone rubber "boot" 2206, which may be glued on, may have ribbing 2207, and which easily and removably snaps to the screw head 2201, to permit the dining plate mating structure 2200 to be easily removed for cleaning and to remove food which is able to get under the dining plate mating structure 2200.

FIG. 22B is similar to FIG. 22A, but provides a different structure for clipping a dining plate mating structure 2200 to a screw head 2201 of a screw 2202 screwed into a cantilever beam 2203. The different structure for clipping includes an extension 2208 which has angled portions 2209 to wedge onto the screw head 2201.

FIG. 22C is a bottom view of the extension 2208 of FIG. 22B having a plurality of angled portions 2209 to wedge onto the screw head 2201. The extension 2208 is a water barrier, and the angled portions 2209 are constraints.

FIG. 22D is a plan view of FIG. 22B with four screw heads 2201, where two 2210 screw heads 2201 are constrained by wedging to the dining plate mating structure 2200 by the angled portions 2209, and two screw heads 2201 are not wedged, but only surrounded by the water barrier extension 2208.

Figure 23:
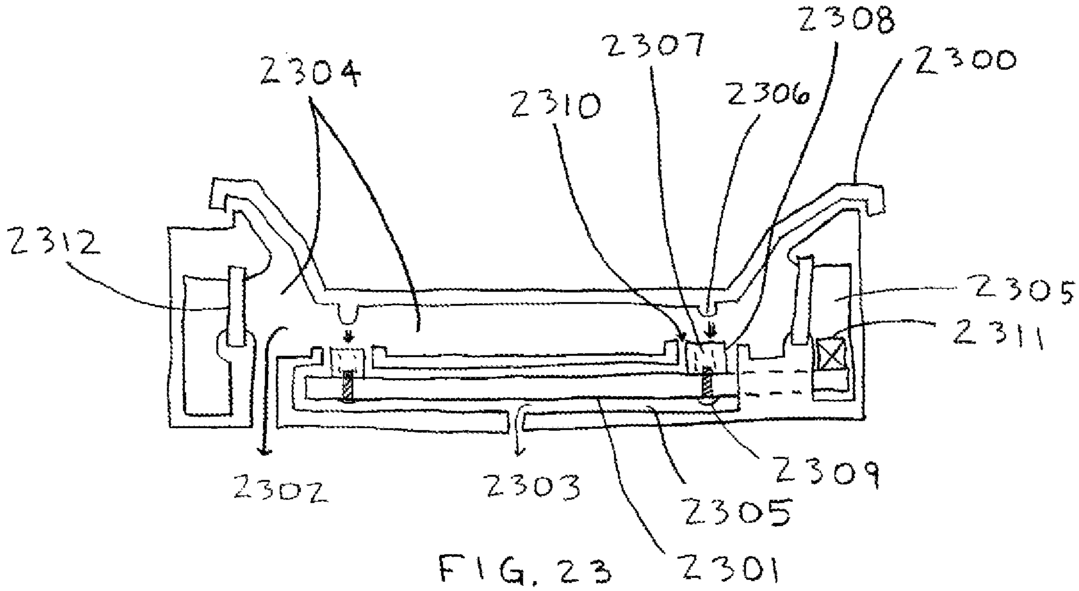
FIG. 23 is an end view of a portion of an active foodware system providing a structure for easily removably attaching a dining plate mating structure to a cantilever beam.

FIG. 23 is an end view of a portion of an active foodware system similar to the system of FIGS. 14A-14C, providing a structure for easily removably attaching a dining plate mating structure 2300 to a cantilever beam 2301. FIG. 23 also provides drainage paths 2302, 2303 for allowing liquid to drain that gets under 2304 the dining plate mating structure 2300 and/or into the cantilever compartment 2305.

The structure for easily removably attaching a dining plate mating structure 2300 to a cantilever beam 2301 includes protuberances 2306 on the dining plate mating structure 2300 which extend into mating cavities 2307 in a structure 2308 attached to the cantilever beam 2301, where the attaching may use screws 2309. The purpose of the structure 2308 is to leave most of the hole 2310 filled when the dining plate mating structure 2300 (also called a receptacle dish) is removed for cleaning, so water doesn't drain into the hole 2310. Separate caps also may be provided to plug the holes 2310 when the dining plate mating structure 2300 is removed for cleaning.

The cantilever beam 2301 is attached at one end to a load cell 2311. There is an LED strip 2312.

Figure 24A:
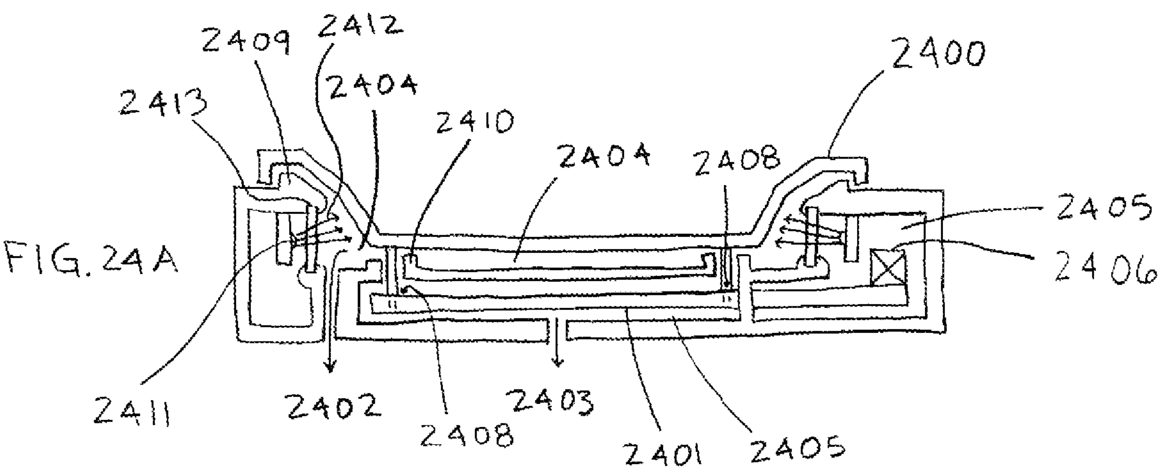
FIG. 24A is a side view of a portion of an active foodware system providing drainage paths for allowing liquid to drain that gets under the dining plate mating structure and/or into the cantilever compartment.
Figure 24B:
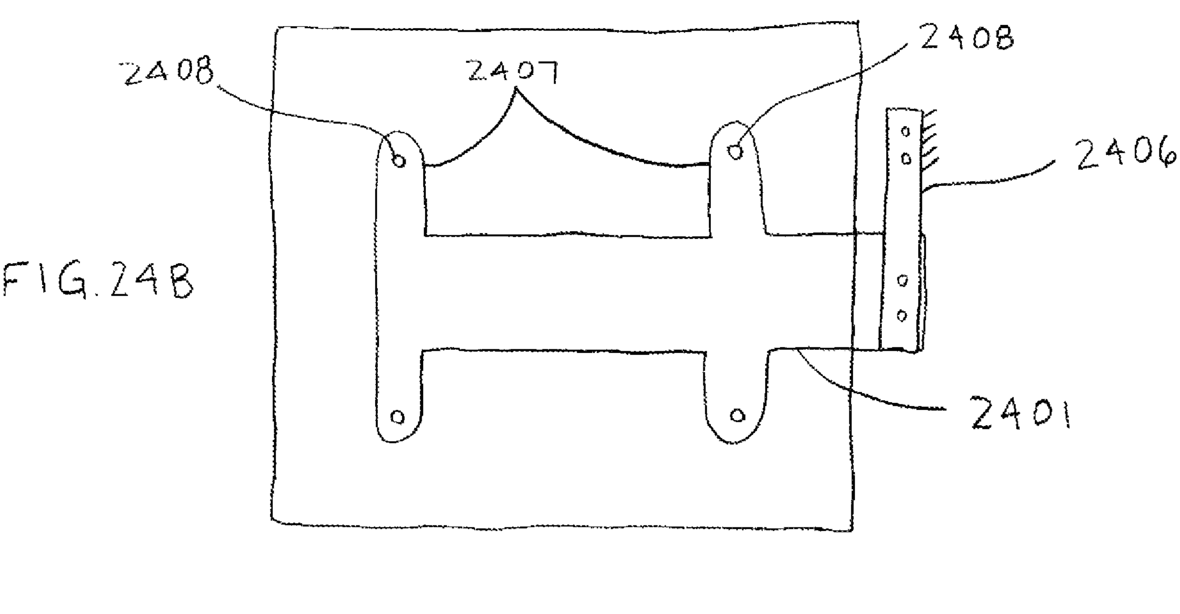
FIG. 24B is a plan view of a cantilever extending at substantially 90 degrees from a beam load cell, and having extensions for supporting a dining plate mating structure.

FIG. 24A is a side view of a portion of an active foodware system similar to the system of FIGS. 14A-14C and 23, providing drainage paths 2402, 2403 for allowing liquid to drain that gets under 2404 the dining plate mating structure 2400 and/or into the cantilever compartment 2405. FIG. 24B is a plan view of a cantilever 2401 extending at substantially 90 degrees from a beam load cell 2406, and having extensions 2407 for supporting a dining plate mating structure 2400, which may be attached at the positions 2408 shown.

In FIG. 24A, to provide moisture resistance, walls 2409, 2410 prevent liquid from getting to the cantilever compartment 2405 or under 2404 the dining plate mating structure 2400. An LED 2411 may shine light 2412 through a lens 2413.

Figure 24C:
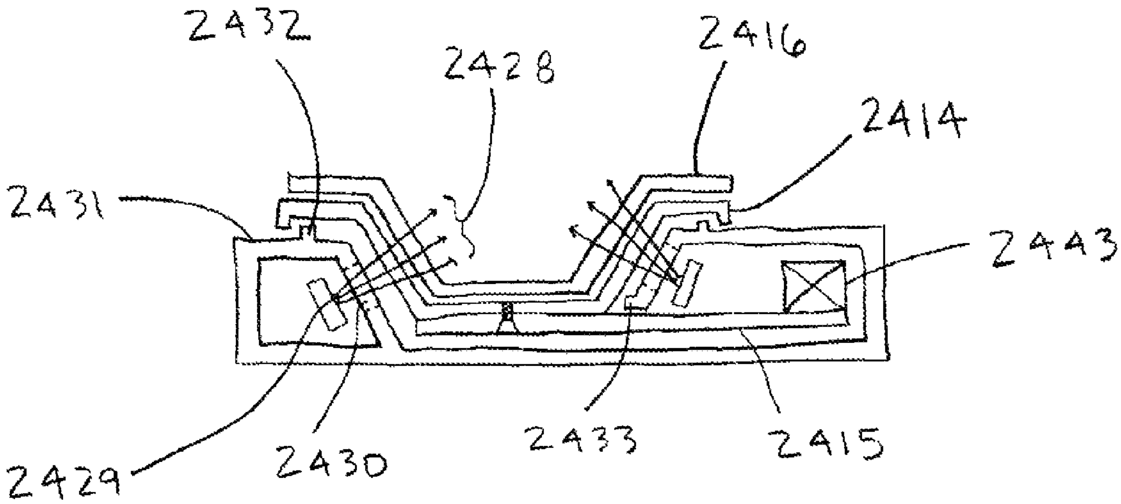
FIG. 24C is a side view where the dining plate mating structure is attached to a cantilever beam, and a dining dish is removably mated with the dining plate mating structure.

FIG. 24C is a side view of a portion of an active foodware system, where the dining plate mating structure 2414 is attached to the cantilever beam 2415, and a dining dish 2416 is removably mated with the dining plate mating structure 2414.

Figure 24D:
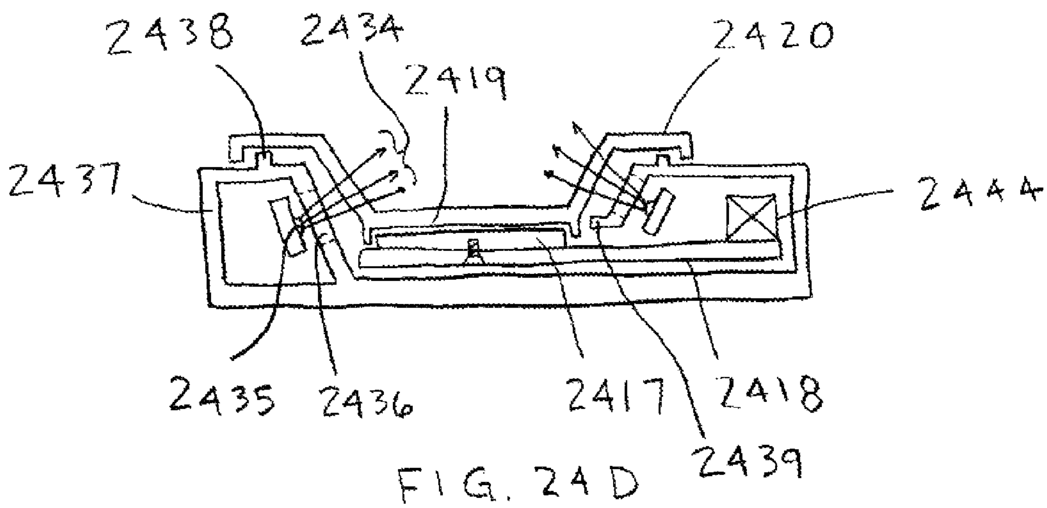
FIG. 24D is a side view where the dining plate mating structure does not have sidewalls, but is a low-profile structure, such as a platform, attached to cantilever beam to which the bottom of the dining plate directly mates.

FIG. 24D is a side view of a portion of an active foodware system, where the dining plate mating structure 2417 does not have sidewalls, but is a low-profile structure, such as a platform, attached to the cantilever beam 2418 to which the bottom 2419 of the dining plate 2420 directly mates. The dining plate 2420 may mate with the low-profile structure 2417 by removably snapping into place.

Figure 24E:
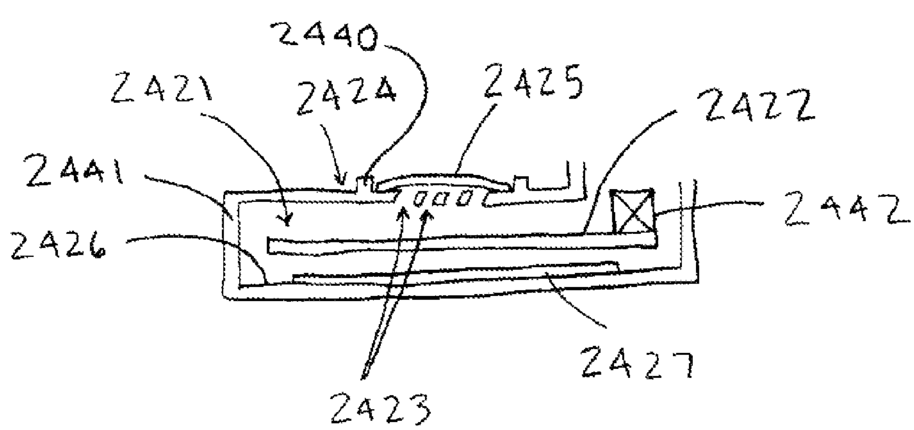
FIG. 24E is a side view of a cantilever compartment around a cantilever beam, where the cantilever compartment has vents or holes.

FIG. 24E is a side view of a portion of an active foodware system having a cantilever compartment 2421 around the cantilever beam 2422. The cantilever compartment 2421 has vents 2423 or holes, typically along the top portion 2424 of the cantilever compartment 2421, and optionally covered by a liquid-resistant material 2425 that allows liquid to evaporate through, such as polyurethane laminate (PUL) or Gortex. The inside bottom portion 2426 of the cantilever compartment 2421 may have a layer 2427 of sponge or foam secured to it to absorb liquid and keep the liquid from sloshing around, prior to it evaporating through the vents 2423.

FIG. 24C is a water-resistant design. Light 2428 from an LED 2429 passes through a clear or translucent lens 2430 and then through the dining plate mating structure 2414 and the dining dish 2416 on the dining plate mating structure 2414. On the enclosure 2431 under a portion of the dining plate mating structure 2414 is a liquid partial barrier 2432. There is a ledge 2433 to guide around the cantilever 2415 liquid that leaks past the liquid partial barrier 2432. A load cell 2443 is attached at one end of the cantilever 2415.

FIG. 24D is also a water-resistant design. Light 2434 from an LED 2435 passes through a clear or translucent lens 2436 and then through the dining dish 2420 on the dining plate mating structure 2417. On the enclosure 2437 under a portion of the dining dish 2420 is a liquid partial barrier 2438. There is a ledge 2439 to guide around the cantilever 2418 liquid that leaks past the liquid partial barrier 2432. A load cell 2444 is attached at one end of the cantilever 2418.

FIG. 24E has a water barrier 2440 on the enclosure 2441. The layer 2427 of sponge or foam may be adhesive-backed foam, for example, surgical foam tape, to absorb any water droplets that get into the cantilever compartment 2421 before they evaporate up through the PUL cover 2425. The PUL cover 2425 may be adhered over top vents using polyurethane adhesive to allow moisture to evaporate out of the cantilever compartment 2421. A load cell 2442 is attached at one end of the cantilever 2422.

Figure 25A:
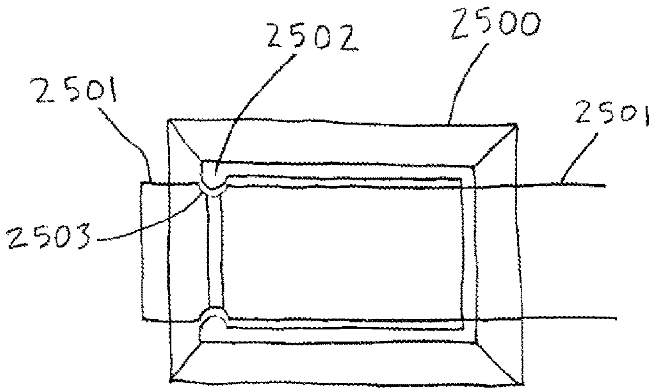
FIG. 25A is a plan view.
Figure 25B:
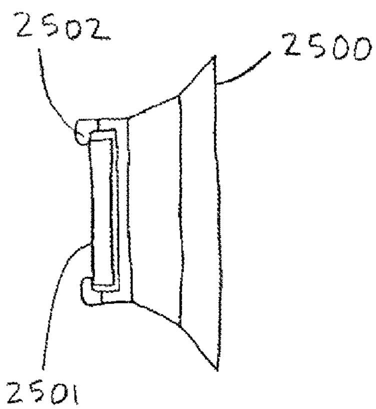
FIG. 25B is an end view of a flexure clip on the bottom side of a dining plate mating structure that quickly and removably snaps into indents in a cantilever beam.

FIG. 25A is a plan view, and FIG. 25B is an end view of a flexure clip 2502 on the bottoms side of a dining plate mating structure 2500 that quickly and removably snaps into indents 2503 in a cantilever beam 2501.

In FIG. 25A, the dining plate mating structure 2500 is provided as clear, so the cantilever beam 2501 is visible. The dining plate mating structure 2500 is also referred to as a receptacle dish. The intents 2503 may be in the "far end" of the cantilever 2501 in order to register the dining plate mating structure 2500. FIG. 25B provides flex-hinge "clips" 2502 on the far end of the dining plate mating structure 2500.

Figure 26A:
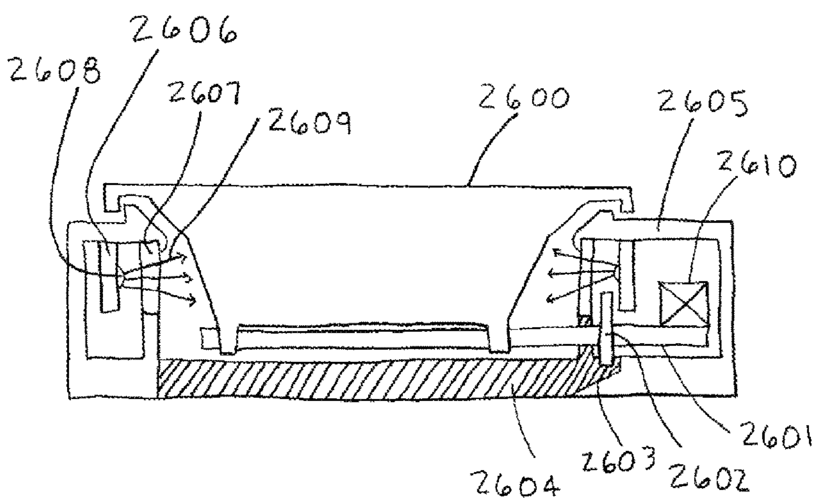
FIG. 26A is a side view of a portion of an active foodware system having a liquid barrier attached to a cantilever beam for directing liquid that gets under a dining plate mating structure to drain down the drainage slope and out a drainage region at the bottom of a housing structure.
Figure 26B:
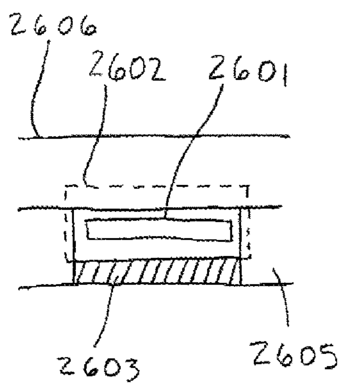
FIG. 26B is an end view of an LED strip with optional lens, the cantilever, liquid barrier, and drainage slope.

FIG. 26A is a side view of a portion of an active foodware system having a liquid barrier 2602 attached to the cantilever beam 2601 for directing liquid that gets under the dining plate mating structure 2600 to drain down the drainage slope 2603 and out the drainage region 2604 at the bottom of the housing structure 2605. FIG. 26B is an end view of an LED strip 2606 with optional lens 2607, the cantilever 2601, liquid barrier 2602, and drainage slope 2603.

FIG. 26A provides an LED 2608 on the LED strip 2606 emitting light 2609 through the lens 2607. A load cell 2610 is attached at one end of the cantilever 2601. In the figures, some hidden lines are omitted for clarity.

FIG. 27A is a side section view of a portion of an active foodware system similar to the system of FIGS. 14A-14C, having a dining plate mating structure 2700 supporting a dining plate 2701. FIG. 27B is a plan view of a cantilever 2702 extending at substantially 90 degrees from a beam load cell 2703, providing drainage paths 2704 for allowing liquid to drain that gets under the dining plate mating structure 2700 and onto the cantilever beam 2702. FIG. 27C is a side view of FIG. 27B with some hidden lines shown, and FIG. 27D is an end view of FIG. 27B with some hidden lines shown, of the cantilever 2702 of FIG. 27B.

In the embodiment of FIG. 27A, the dining plate mating structure 2700 is attached to the cantilever 2702 using standoffs 2705, which may be metal. The standoffs 2705 pass through holes 2706 in a recessed portion 2707 of the housing structure 2708. The recessed portion 2707 may be white translucent polystyrene plastic, and may be attached 2709 to the housing structure 2708 with glue or a silicon rubber gasket. The dining plate 2701 may be clear. The dining plate mating structure 2700 may be clear polystyrene plastic to permit seeing whether food is underneath it, and also allows light from the side to be seen. There may be a washer 2710 around a hole 2706 to form a water block, as well as to provide a deflection limit stop for the cantilever 2702, since the attached dining plate mating structure 2700 will contact the washer 2710. A structure 2711, such as a thick rubber band, may extend around the cantilever 2702 to prevent water from draining along the cantilever 2702 to the load cell 2703. The peripheral edge of the dining plate 2701 may have an extension 2712 to prevent water from dripping down along the side of the dining plate 2701 by providing a dripping point 2713 over the housing structure 2708.

In the embodiment of FIGS. 27B-27D, the drainage path 2704 may include a drainage moat 2714 with a drainage hole 2715. The end of the load cell 2703 not attached to the cantilever 2702 may be attached to a structure 2716 that is attached to the housing structure 2708. The cantilever 2702 may be aluminum.

FIG. 27C provides a drainage tube 2722 extending from the bottom of the drainage hole 2715. The drainage tube 2722 may be acrylic. The drainage tube 2722 may extend through a hole 2723 in the bottom of the housing structure 2708.

FIG. 27E is a side view of a standoff 2705, which may be metal. The standoff has an end 2717 with a threaded hole 2718 for receiving a screw 2719. The other end of the standoff 2705 has a threaded screw 2720 for receiving a nut 2721.

FIG. 28A is a side section view of a portion of an active foodware system similar in some aspects to the system of FIG. 27A, where the dining plate mating structure consists primarily of the heads 2800 of screws 2802 screwed into the cantilever 2801. The dining plate 2803 removably attaches directly to the screw heads 2800. FIG. 28B is a plan view of a cantilever 2801 with a liquid-retaining ridge 2804 around its periphery, and with liquid-drainage holes 2805 and locations 2806 for attaching dining plate mating structure screw heads 2800. FIG. 28C is a side view of FIG. 28B with some hidden lines shown, and FIG. 28D is an end view of the cantilever 2801 of FIG. 28B with some hidden lines shown. FIG. 28E is a side view alternative to FIG. 28C which replaces drainage tubes 2807 with a cantilever 2808 with a curved top 2809, and a bottom of the housing structure 2810 with sloped surfaces 2811, all to direct the flow of liquid 2812 that gets under the dining dish 2803 and onto the cantilever beam 2808.

In the embodiment of FIG. 28A, the bottom ridge (i.e., base) 2813 of the dining plate 2803 is used to position the dining plate 2803 relative to the screw head 2800. Then, the height of the screw head 2800 sets the cantilever 2801 flexure limit (since the screw head 2800 contacts the recessed portion 2814 of the housing structure 2810). Unlike FIG. 27A, FIG. 28A does not have a washer on the recessed portion 2814 surrounding the screws 2802, since a washer would block liquid from draining, so it would puddle. Without such a washer, liquid that gets under the dining plate 2803 may drain out the bottom of the recessed portion 2814 and onto the cantilever 2801.

The cantilever 2801 may be aluminum or plastic. A liquid barrier 2815, for preventing liquid on the cantilever 2801 from reaching the load cell 2816, may be a plastic clip or rubber band. The top nut 2817 is not necessary if the cantilever 2801 is threaded, but the bottom nut 2818 is required to "lock" the screw 2802 in place. The nut 2818 may be an M2 nylon nut to "lock" the screw 2802, which may be an M2 nylon screw.

The embodiment of FIG. 28B provides optional barriers and holes. The liquid retaining barrier 2804 surrounds a cavity 2819 on the cantilever 2801. Inside the liquid-drainage holes 2805 are tube drainage holes 2820. The locations 2806 for attaching dining plate mating structure screw heads 2800 may be threaded screw holes 2806.

Instead of drainage tubes 2807 draining liquid through holes in the bottom of the housing structure 2810 (see FIG. 28C), the entire bottom of the cantilever 2801 may be left exposed to allow liquid to drain off the sides of the cantilever 2801.

FIG. 28F is an end view of the alternate cantilever 2808 of FIG. 28E, where the top surface is curved to allow liquid to drain off the sides.

Figure 29A:
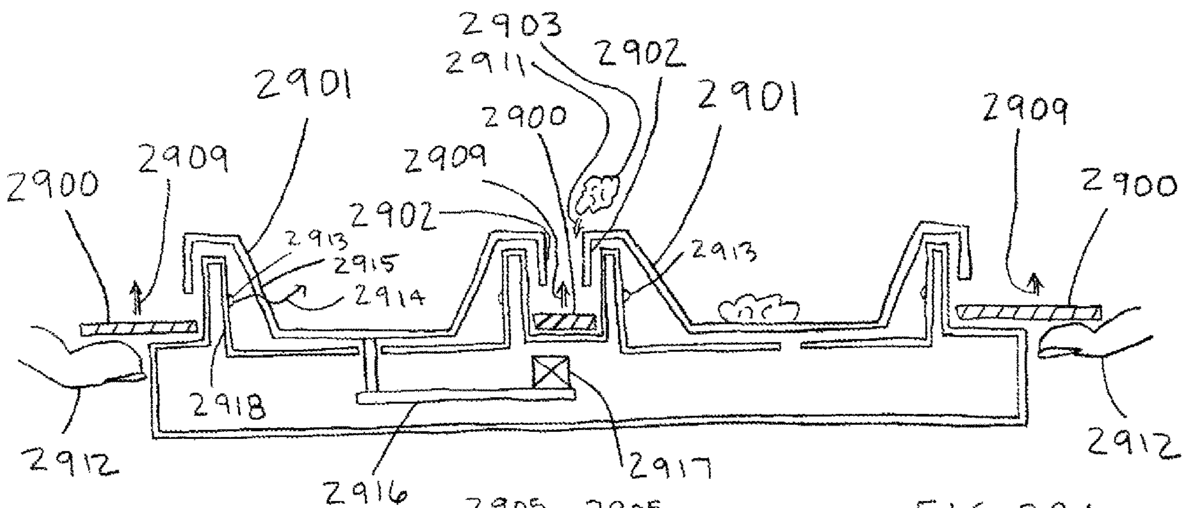
FIGS. 29A-29B are side section views of a carrier tray for lifting, carrying, and placing a plurality of dining plates at the same time.
Figure 29B:
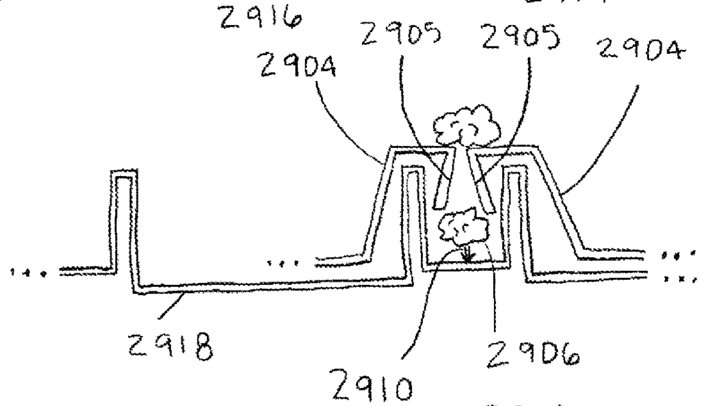
Figure 29C:
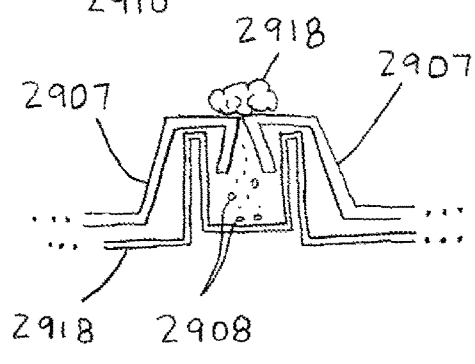
FIG. 29C is similar to FIG. 29B, where the portions of dining plates are positioned close to each other so only very tiny food and crumbs will fit between the dining plates.

FIGS. 29A-29B are side section views of a carrier tray 2900 for lifting 2909, carrying, and placing a plurality of dining plates 2901 at the same time. FIG. 29A provides dining plates 2901 with a lip 2902 at the peripheral edge that extends mostly straight down. It is possible for food 2903 to get stuck 2911 between such dining plates. FIG. 29B provides portions of dining plates 2904 with a lip 2905 at the peripheral edge that angles back toward each dining plate 2904. For such dining plates 2904, food 2906 that is small enough to drop between the dining plates 2904, will not get stuck between the lips 2905, since they angle away from each other, so the food 2906 will drop all the way down 2910. FIG. 29C is similar to FIG. 29B, where the portions of dining plates 2907 are positioned close to each other so only very tiny food 2908 and crumbs will fit between the dining plates 2907.

In the embodiment of FIG. 29A, a finger 2912 may be used to lift 2909 the dining plates 2901 together by the plate lifter 2900, also known as the carrier tray 2900.

The dining plate lips 2902 are for preventing food 2903 from getting under the dining plates 2901.

The housing structure 2918 has LEDs 2913 for emitting light 2914 through the walls 2915 of the dining plates 2901. The dining plates 2901 are supported by one end of a cantilever 2916, where the other end of the cantilever 2916 is attached to a load cell 2917 for weight sensing.

In the embodiment of FIG. 29B, the dining plates 2904 each have a slanted lip 2905, so if food 2906 does fall past, it will drop all the way down and won't wedge between the lips 2905.

In the embodiment of FIG. 29C, the dining plates 2907 are positioned close to each so most food 2918 won't fit between the edges of the dining plate 2907. Very tiny food particles 2908 might pass between edges of the dining plates 2907, but will fall to the bottom and won't interfere with weight sensing.

Figure 30A:
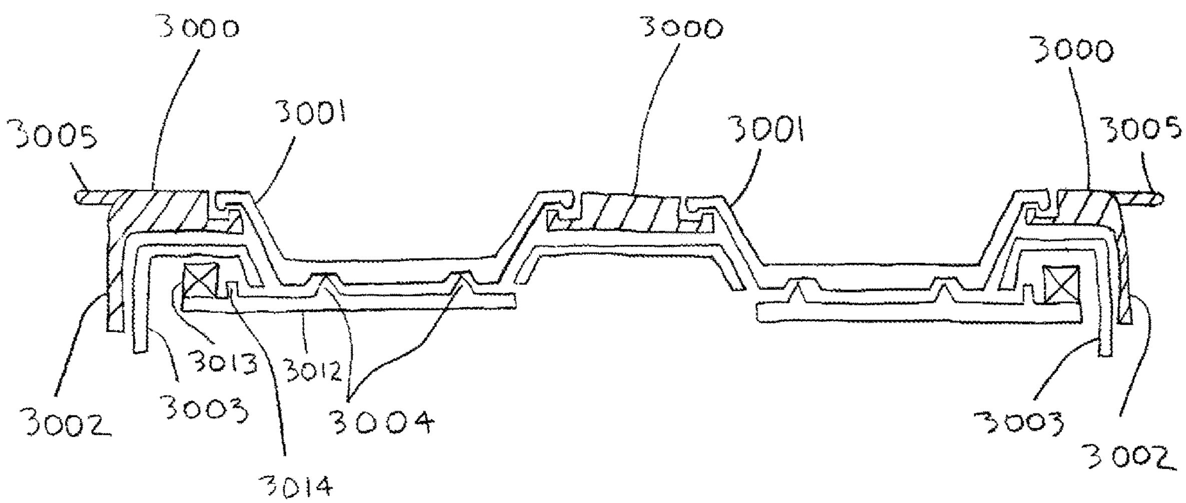
FIGS. 30A-30B are side section views of a carrier tray for lifting, carrying, and placing a plurality of dining plates at the same time.

FIG. 30A is a side section view of a carrier tray 3000 for lifting, carrying, and placing a plurality of dining plates 3001 at the same time. The carrier 3000 has legs 3002 to raise the top surface of the carrier 3000 off the counter while loading the dining plates 3001, but where the legs 3002 do not touch the table when the carrier 3000 is lowered onto the housing structure 3003 surrounding a plurality of dining dish mating structures 3004. The carrier 3000 also has tabs 3005 for easy lifting, carrying, and holding.

Figure 30B:
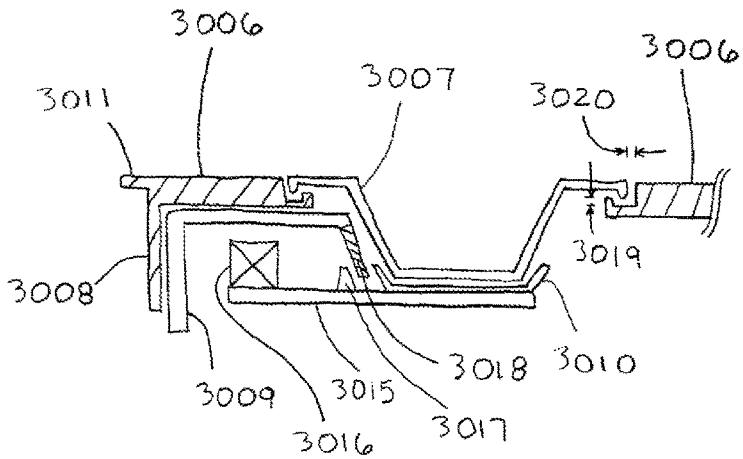

Similar to FIG. 30A, FIG. 30B is a side section view of a carrier tray 3006 for lifting, carrying, and placing a plurality of dining plates 3007 at the same time. The carrier 3006 has legs 3008 to raise the top surface of the carrier 3006 off the counter while loading the dining plates 3007, but where the legs 3008 do not touch the table when the carrier 3006 is lowered onto the housing structure 3009 surrounding a plurality of dining dish mating structures 3010. The carrier 3006 also has tabs 3011 for easy lifting, carrying, and holding.

In the embodiment of FIG. 30A, the dining plates 3001 may be removable translucent plastic plates/dishes 3001. The dining dish mating structures 3004 are attached to a cantilever 3012 which is attached to load cell 3013 for sensing weight. The cantilever 3012 has a barrier 3014 to block liquid from reaching the load cell 3013.

In the embodiment of FIG. 30B, the dining dish mating structures 3010 are attached to a cantilever 3015 which is attached to load cell 3016 for sensing weight. The cantilever 3015 has a barrier 3017 to block liquid from reaching the load cell 3016. The tabs 3011 help lift out the tray 3006 of dining dishes 3007 for easy cleaning. The dining plate mating structures 3010 cradle to hold the dining dishes 3007 on the cantilever 3015. The housing structure 3009 provides a frame for the weight-sensing underplate. The housing structure 3009 includes a lens 3018 for and LED. The carrier 3006 with dining dishes 3007 sits on the legs 3008 while on a counter for loading of food. The height of the gap 3019 is typically larger than the width of the gap 3020, so if something like a grain of rice squeezes past the gap 3020, the edge of the dining plate 3007 won't rest on it.

Figure 31A:
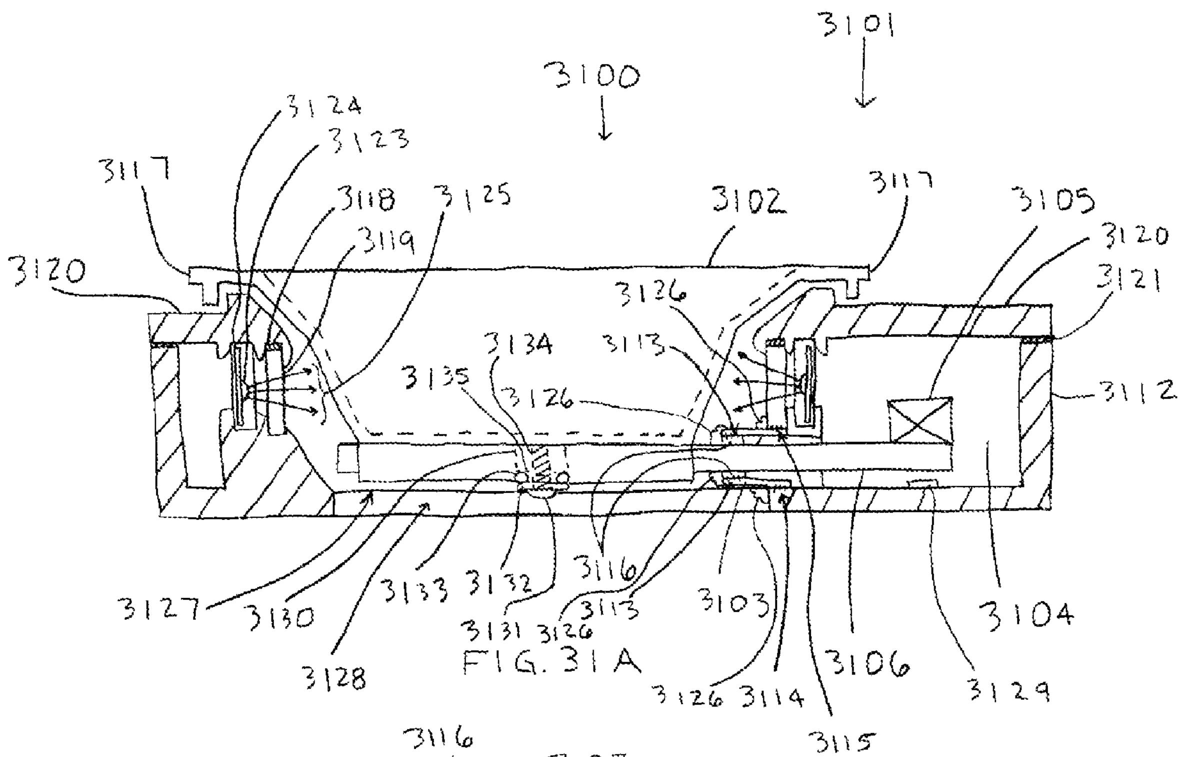
FIG. 31A is a side view with partial section view of a portion of an active foodware system that includes a dining plate mating structure. Liquid is prevented by a liquid seal from entering a cantilever compartment that contains a load cell attached to the cantilever, as well as other electronics.
Figure 31B:
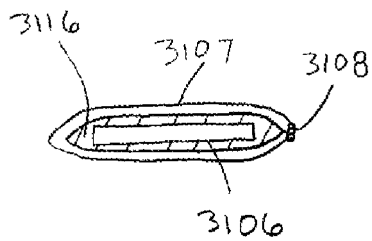
FIG. 31B is an end view of a flexible material, such as PUL (polyurethane laminate) or silicone rubber (including a silicone rubber "sleeve"), surrounding the cantilever beam.

FIG. 31A is a side view with partial section view, and FIG. 31B is an end view, of a portion 3100 of an active foodware system 3101 that includes a dining plate mating structure 3102. Typically there are a plurality of such portions 3100. The number of such portions 3100 may be four. Liquid is prevented by a liquid seal 3103 from entering a cantilever compartment 3104 that contains a load cell 3105 attached to the cantilever 3106, as well as other electronics. Typically the liquid seal 3103 is a flexible rubber, fabric, or membrane that is attached at a location 3113 to the cantilever beam 3106 and attached at locations 3114, 3115 to the cantilever compartment 3104, preventing liquid and other food that gets under dining plate mating structure 3102 and reaches the cantilever beam 3106 from entering the cantilever compartment 3104 and potentially interfering with the load cell 3105 and/or other electronics. The liquid seal 3103 may be attached 3113 to a mounting bracket 3116 that is attached to the cantilever beam 3106. FIG. 31B is an end view of a flexible material 3107, such as PUL (polyurethane laminate) or silicone rubber (including a silicone rubber "sleeve"), surrounding the cantilever beam 3106. If PUL is used, the seam 3108 of a tube of PUL is typically placed along the bending axis of the cantilever beam 3106.

Figure 31C:
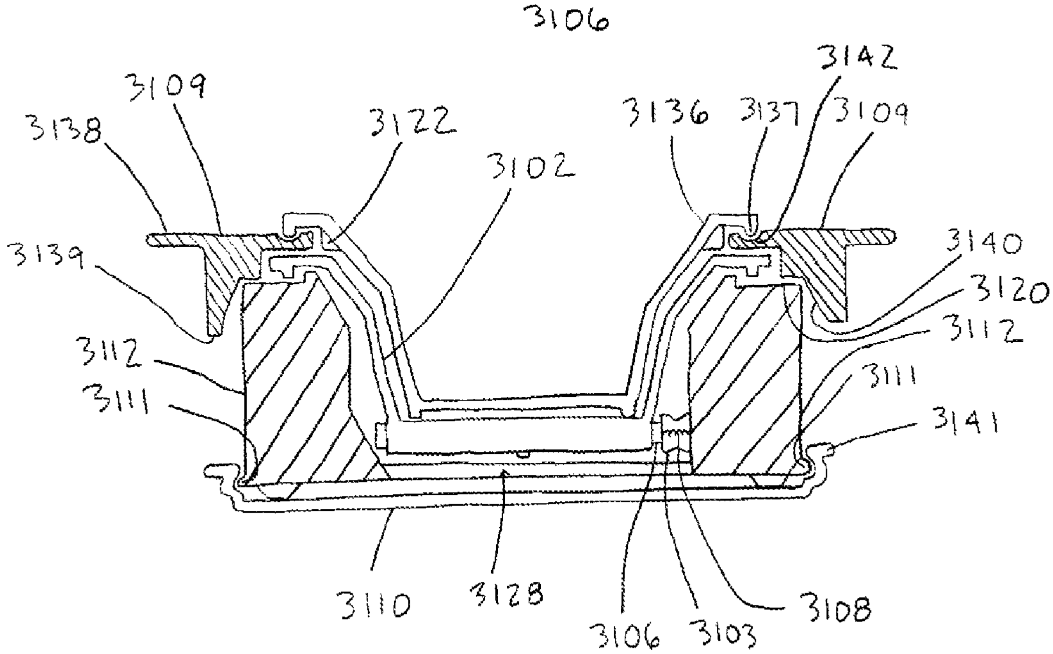
FIG. 31C is a side section view of the apparatus of FIGS. 31A-31B, with a carrier tray and a drip pan.

FIG. 31C is a side section view of the apparatus of FIGS. 31A-31B, with a carrier tray 3109, a.k.a. a dining plate loading dock. FIG. 31C also provides a drip pan 3110 for going under the apparatus of FIGS. 31A-31B to collect any liquid or food crumbs. Typically the drip pan 3110 snaps to a ridge 3111 or groove around the base of the housing structure 3112 of the active foodware system 3101.

In the embodiment of FIG. 31A, the dining plate mating structure 3102 has a lip 3117 to grab and lift the dining plate mating structure 3102 from the cantilever 3106. The dining plate mating structure 3102, also called a dish holder, may be translucent white.

Teflon tape 3118 or a silicone rubber gasket may be used between the lens 3119 and top 3120 of the housing structure. Teflon tape 3121 or a silicone rubber gasket may also be used between the top 3120 of the housing structure and the base 3112 of the housing structure.

An LED 3123 on an LED strip 3124 emits light 3125 through the lens 3119.

Glue 3126, such as silicone or polyurethane sealant, may be used.

A lip 3127 around the bottom of a cantilever opening 3128 provides a lower limit stop, where the bottom of the dish holder 3102 hits, whenever the dish holder 3102 is in place. There is an extra limit stop adjustment 3129 if necessary, which may be a silicone-rubber pad.

Referring ahead to FIGS. 59A and 59B, which have similar aspects to FIG. 31A, the dining plate mating structure 3102 of FIG. 31A may have a protuberance 3130 with a screw cavity 3134 into which a screw 3131 is screwed. The screw 3131 holds a rubber O-ring 3133, or plastic C clip, between a retaining washer 3132 and an O-ring shoulder 3135 on the protuberance 3130. The protuberance 3130 of the dining plate mating structure 3102 passes through a hole in the cantilever 3106 and the snaps the dining plate mating structure 3102 onto the cantilever 3106, as the O-ring 3133 (or C clip) expands on the opposite side of the cantilever 3106 to hold the dining plate mating structure 3102 on the cantilever 3106. The dining plate mating structure 3102 may be snapped off for cleaning.

The embodiment of FIG. 31C provides a dining dish 3136, such as a microwavable clear melamine plastic dining dish, on the dining plate mating structure 3102. The dining plate mating structure 3102, also called a dish holder, may be white and translucent. The dining dish 3136 may have fins 3122 to prevent the dining dish 3136 from rocking in the dining plate mating structure 3102 while dining, especially if a carrier tray 3109 is not used. The dining dish 3136 may have a protrusion 3137 that sits in a depression 3142 in the carrier tray 3109 while loading food and during transportation.

The carrier tray 3109 has a ridge 3138 around it, or finger tabs, to lift it. The foot 3139 of the carrier tray 3109 sits on the counter when loading food into dining dishes 3136. The leg of the carrier tray 3109 is angled 3140, to help guide the carrier tray 3109 onto the top 3120 of the housing structure of the active foodware system 3101 (also called SmartDish™).

The drip pan 3110 may have a ridge 3141 around it for holding, and also for bending out to un-snap the drip pan 3110 from the ridge 3111 on the base 3112. The food drip pan 3110 is for catching any food that gets under the dining plate mating structure 3102 and falls or drops all the way down through the cantilever opening 3128.

Figure 32A:
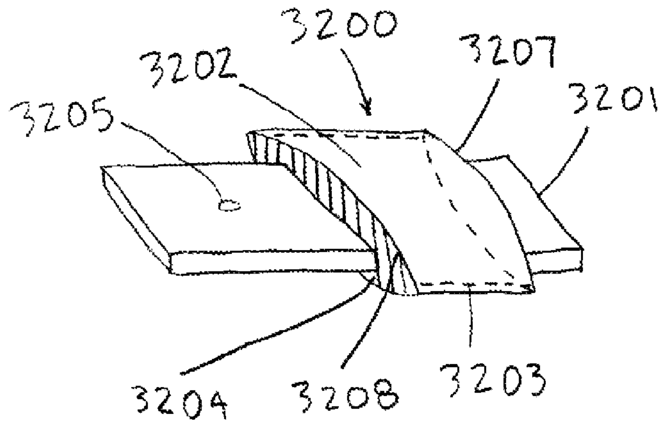
FIG. 32A is a perspective view of a water seal for a cantilever, such as is used in FIGS. 31A-31C.
Figure 32B:
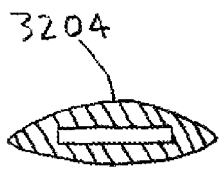
FIG. 32B is an end view of a cutout.
Figure 32C:
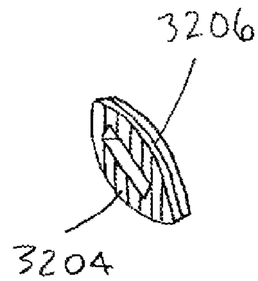
FIG. 32C is a perspective view of a cutout.

FIG. 32A is a perspective view of a first water seal 3200 for a cantilever 3201, such as is used in FIGS. 31A-31C. Polyurethane Laminate (PUL) fabric 3202 or a sheet of silicone rubber surrounds the cantilever 3201, with the two ends heat sealed 3203. One side 3207 of the PUL 3202 is attached to the base of the housing structure internally. The other side 3208 of the PUL 3202 is attached to a "football-shaped" cutout 3204. FIG. 32B is an end view of such a cutout 3204, and FIG. 32C is a perspective view of such a cutout 3204. The cantilever 3201 typically has a hole 3205 for attaching a dining plate mating structure. The cutout 3204 may have a depression 3206 for fastening the side 3208 of PUL fabric 3202. Since PUL fabric 3202 is flexible, it allows the cantilever 3201 to deflect when loaded, while producing little resistance that would affect weight measurement.

Figure 33A:
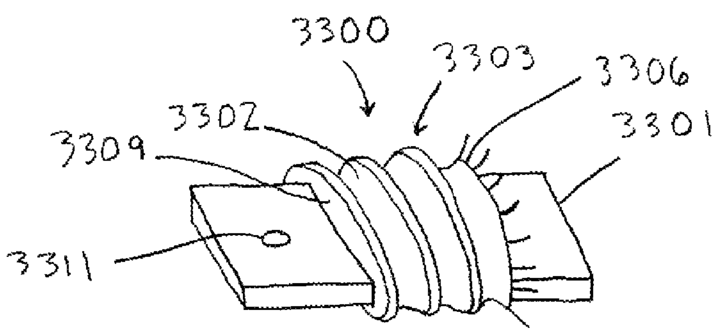
FIG. 33A is a perspective view of another water seal for a cantilever, such as is used in FIGS. 31A-31C. A bellows shape made from polyurethane laminate (PUL) fabric or a sheet of silicone rubber surrounds the cantilever.

Similar to FIG. 32A, FIG. 33A is a perspective view of a second water seal 3300 for a cantilever 3301, such as is used in FIGS. 31A-31C. The cantilever 3301 typically has a hole 3311 for attaching a dining plate mating structure. A bellows shape 3303 made from polyurethane laminate (PUL) fabric 3302 or a sheet of silicone rubber surrounds the cantilever 3301. Since PUL fabric 3302 is flexible, the bellows 3303 made from it allows the cantilever 3301 to deflect when loaded, while producing little resistance that would affect weight measurement.

Figure 33B:
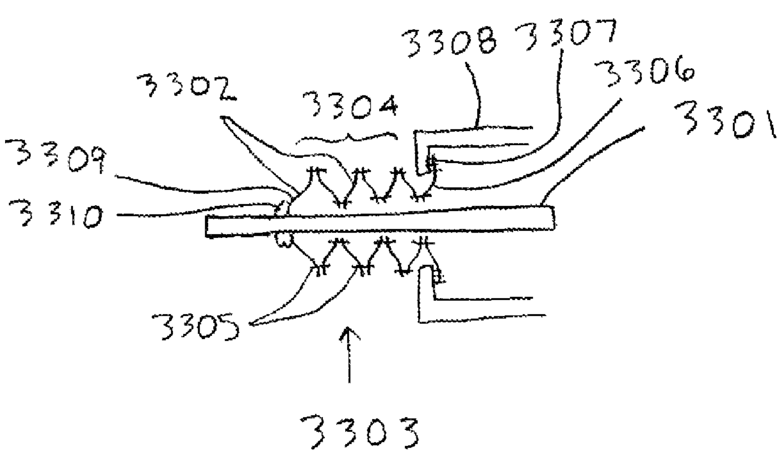
FIG. 33B is a side view of the bellows shape.

FIG. 33B is a side view of the bellows shape 3303. The bellows 3303 may have a plurality 3304 of pieces of PUL fabric 3302 fastened together 3305. One side 3306 of the bellows 3303 is attached internally 3307 to the base 3308 of the housing structure of the active foodware system (also called SmartDish™). The attachment 3307 may include a bead of silicone or polyurethane to seal the bellows 3303 to the base 3308 of the housing structure. The other side 3309 of the PUL 3302 is attached to the cantilever 3301. The attachment may include a bead 3310 of silicone or polyurethane to seal the bellows 3303 to the cantilever 3301.

Figure 34A:
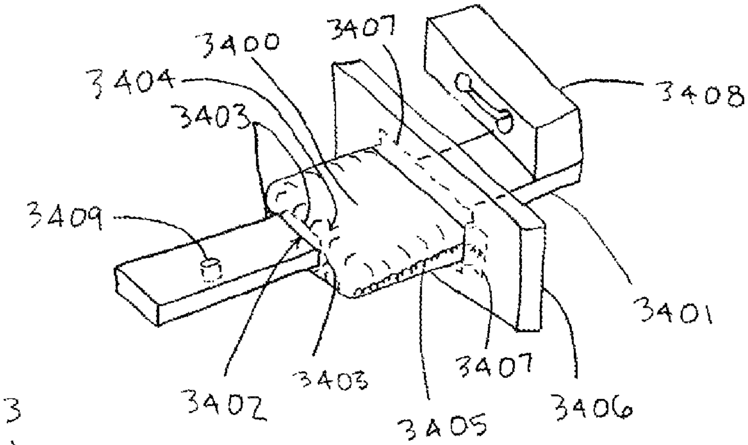
FIG. 34A is a perspective view of a polyurethane laminate fabric cover covering a portion of a cantilever.

FIG. 34A is a perspective view of a polyurethane laminate fabric cover 3400 covering a portion of a cantilever 3401. This design has a lot of free area of PUL fabric to bend as the cantilever 3401 deflects down, providing very little bending resistance. The seam 3405 of the PUL cover 3400 may be sealed on the inside. The cantilever 3401 is inserted into the slit 3402. Flaps 3403 surrounding the slit are pushed inside the PUL cover 3400 and attached to the cantilever 3401, such as by gluing. After attaching the PUL cover 3400 to the cantilever 3401, the cantilever 3401 is pushed further into the hole in the PUL cover 3400, so the PUL cover 3400 bows up 3404 to pre-load tension in the PUL cover 3400. The end of the PUL cover 3400 that is not attached to the cantilever 3401 is attached to the inner wall 3406 of the housing structure of the active foodware system (also called SmartDish™). Flaps 3407 of the PUL cover 3400 are attached to the inner wall 3406. The cantilever 3401 is attached to a load cell 3408. The cantilever 3401 may have a hole 3409 for mounting a dining plate mating structure, also called a dish holder. The PUL cover 3400 typically has the shiny side (i.e., water-repelling coating) of the PUL fabric on the inside, so the water repelling coating isn't damaged by a user during cleaning. To clean mildew from the PUL fabric, a spray bleach may be used.

Figure 34B:
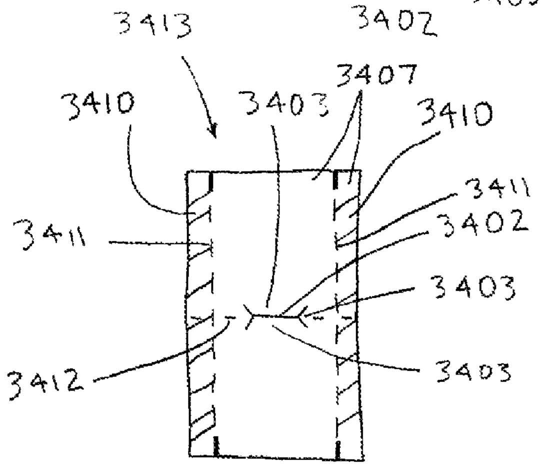
FIG. 34B is a plan view of a pattern for the PUL cover.

FIG. 34B is a plan view of a pattern 3413 for the PUL cover 3400. The pattern 3413 is folded along the dashed fold line 3412. Then the portions 3410, shown as crosshatched portions along both sides of the pattern 3413, between the side perimeter and the dashed line indicating the final visible edge 3411, may be heat sealed from the outside, typically while the shiny side of the PUL fabric is on the outside. The sealed pattern 3413 of the PUL cover 3400 is then turned right-side out so the sealed portions 3410 are on the inside of the PUL cover 3400, next to the cantilever 3401.

Figure 34C:
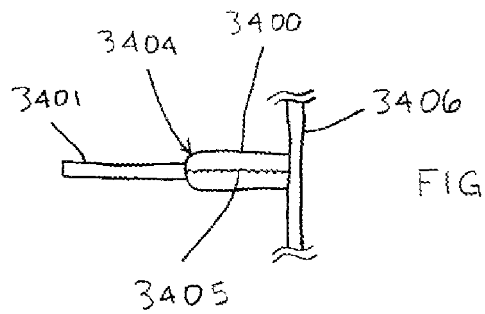
FIG. 34C is a side view of the PUL cover on the cantilever and attached to the inner wall.

FIG. 34C is a side view of the PUL cover 3400 on the cantilever 3401 and attached to the inner wall 3406.

Figure 35A:
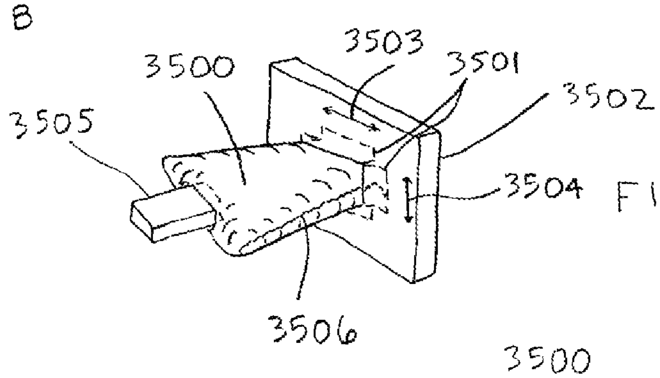
FIG. 35A is a perspective view of a design of a PUL cover similar to the PUL cover of FIG. 34A, but where the attachment 351 to the wall is narrowed in the direction to make the PUL cover taller nearer the wall.
Figure 35B:
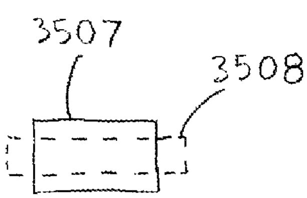
FIG. 35B is a front view of the wall hole size of FIG. 35A provided over a dashed outline of the wall hole size of FIG. 34A.
Figure 35C:
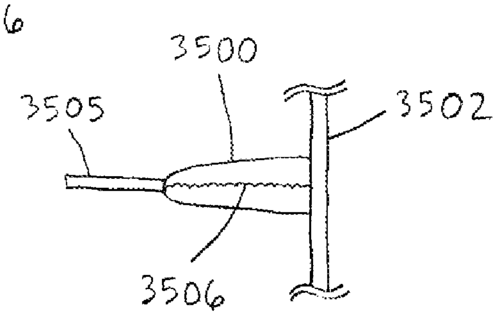
FIG. 35C is a side view of the PUL cover on the cantilever and attached to the inner wall, where the side view of FIG. 35C has a slightly different profile than the side view of FIG. 34C.

FIG. 35A is a perspective view of a design of a PUL cover 3500 similar to the PUL cover 3400 of FIG. 34A, but where the attachment 3501 to the wall 3502 is narrowed in the direction 3503 to make the PUL cover taller 3504 nearer the wall 3502. The PUL cover 3500 is around a cantilever 3505. The PUL cover 3500 has a seam 3506. FIG. 35B is a front view of the wall hole size 3507 of FIG. 35A provided over a dashed outline of the wall hole size 3508 of FIG. 34A. FIG. 35C is a side view of the PUL cover 3500 on the cantilever 3505 and attached to the inner wall 3502, where the side view of FIG. 35C has a slightly different profile than the side view of FIG. 34C.

Figure 36B:
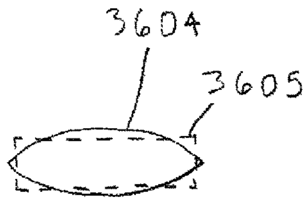
FIG. 36B is a front view of the wall hole shape of FIG. 36A provided over a dashed outline of the wall hole size of FIG. 34A.
Figure 36A:
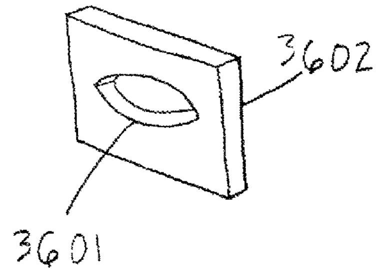
FIG. 36A is a perspective view of a wall hole in a wall to insert a design of a PUL cover similar to the PUL cover of FIG. 34A.
Figure 36C:
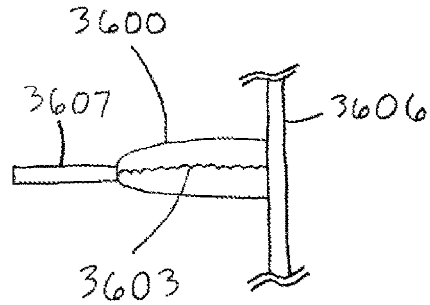
FIG. 36C is a side view of the PUL cover on the cantilever and attached to the inner wall.

FIG. 36A is a perspective view of a wall hole 3601 in a wall 3602 to insert a design of a PUL cover 3600 similar to the PUL cover 3400 of FIG. 34A. The shape of the wall hole 3601 produces a slightly different bend in the PUL cover 3600 than the PUL cover 3400 of FIG. 34A when the cantilever 3607 deflects under load. The PUL cover 3600 is around the cantilever 3607. The PUL cover 3600 has a seam 3603. FIG. 36B is a front view of the wall hole shape 3604 of FIG. 36A provided over a dashed outline of the wall hole size 3605 of FIG. 34A. FIG. 36C is a side view of the PUL cover 3600 on the cantilever 3607 and attached to the inner wall 3606, where the side view of FIG. 36C has a similar profile to the side view of FIG. 35C.

Figure 37B:
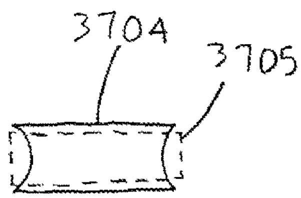
FIG. 37B is a front view of the wall hole shape of FIG. 37A provided over a dashed outline of the wall hole size of FIG. 34A.
Figure 37A:
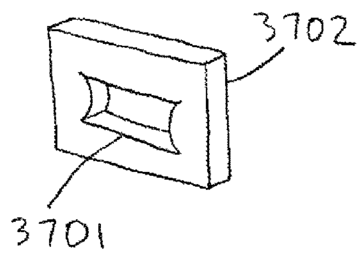
FIG. 37A is a perspective view of a wall hole in a wall to insert a design of a PUL cover similar to the PUL cover of FIG. 34A.

FIG. 37A is a perspective view of a wall hole 3701 in a wall 3702 to insert a design of a PUL cover 3700 similar to the PUL cover 3400 of FIG. 34A. The shape of the wall hole 3701 produces a slightly different bend in the PUL cover

Figure 37C:
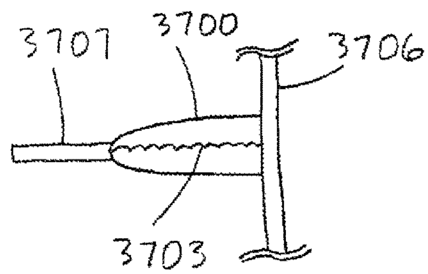
FIG. 37C is a side view of the PUL cover on the cantilever and attached to the inner wall.

3700 than the PUL cover 3400 of FIG. 34A when the cantilever 3707 deflects under load. The PUL cover 3700 is around the cantilever 3707. The PUL cover 3700 has a seam 3703. FIG. 37B is a front view of the wall hole shape 3704 of FIG. 37A provided over a dashed outline of the wall hole size 3705 of FIG. 34A. FIG. 37C is a side view of the PUL cover 3700 on the cantilever 3707 and attached to the inner wall 3706, where the side view of FIG. 37C has a similar profile to the side view of FIG. 35C.

Figure 38B:
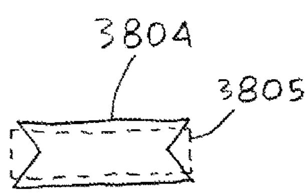
FIG. 38B is a front view of the wall hole shape of FIG. 38A provided over a dashed outline of the wall hole size of FIG. 34A.
Figure 38A:
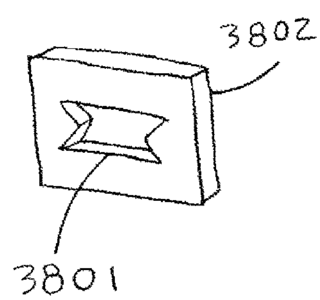
FIG. 38A is a perspective view of a wall hole in a wall to insert a design of a PUL cover similar to the PUL cover of FIG. 34A.
Figure 38C:
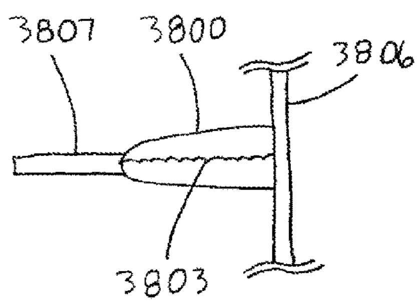
FIG. 38C is a side view of the PUL cover on the cantilever and attached to the inner wall.

FIG. 38A is a perspective view of a wall hole 3801 in a wall 3802 to insert a design of a PUL cover 3800 similar to the PUL cover 3400 of FIG. 34A. The shape of the wall hole 3801 produces a slightly different bend in the PUL cover 3800 than the PUL cover 3400 of FIG. 34A when the cantilever 3807 deflects under load. The PUL cover 3800 is around the cantilever 3807. The PUL cover 3800 has a seam 3803. FIG. 38B is a front view of the wall hole shape 3804 of FIG. 38A provided over a dashed outline of the wall hole size 3805 of FIG. 34A. FIG. 38C is a side view of the PUL cover 3800 on the cantilever 3807 and attached to the inner wall 3806, where the side view of FIG. 38C has a similar profile to the side view of FIG. 35C.

Figure 39B:
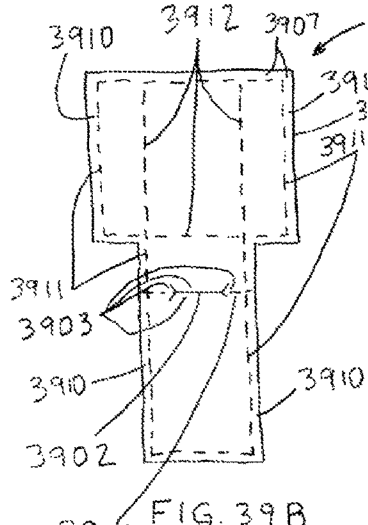
FIG. 39B is a plan view of a pattern for the PUL cover.
Figure 39A:
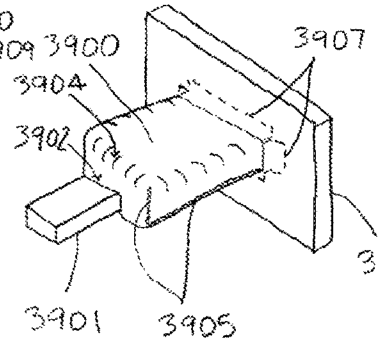
FIGS. 39A, B, C-41A, B, C are similar to FIGS. 34A, B, C. Similar to FIG. 34A.

FIGS. 39A, B, C-41A, B, C are similar to FIGS. 34A, B, C. Similar to FIG. 34A, FIG. 39A is a perspective view of a polyurethane laminate fabric cover 3900 covering a portion of a cantilever 3901. This design has a lot of free area of PUL fabric to bend as the cantilever 3901 deflects down, providing very little bending resistance. The seam 3905 of the PUL cover 3900 may be sealed on the inside. The cantilever 3901 is inserted into the slit 3902. Flaps 3903 surrounding the slit are pushed inside the PUL cover 3900 and attached to the cantilever 3901, such as by gluing. After attaching the PUL cover 3900 to the cantilever 3901, the cantilever 3901 is pushed further into the hole in the PUL cover 3900, so the PUL cover 3900 bows up 3904 to pre-load tension in the PUL cover 3900. The end of the PUL cover 3900 that is not attached to the cantilever 3901 is attached to the inner wall 3906 of the housing structure of the active foodware system (also called SmartDish™). Flaps 3907 of the PUL cover 3900 are attached to the inner wall 3906. The cantilever 3901 is attached to a load cell. The cantilever 3901 may have a hole for mounting a dining plate mating structure, also called a dish holder. The PUL cover 3900 typically has the shiny side (i.e., water-repelling coating) of the PUL fabric on the inside, so the water repelling coating isn't damaged by a user during cleaning. To clean mildew from the PUL fabric, a spray bleach may be used.

Similar to FIG. 34B, FIG. 39B is a plan view of a pattern 3908 for the PUL cover 3900. The pattern 3908 is folded along the dashed fold lines 3912. Then the portions 3910 along both sides of the pattern 3908, between the side perimeter 3909 and the dashed line indicating the final visible edge 3911, may be heat sealed from the outside, typically while the shiny side of the PUL fabric is on the outside. The sealed pattern 3908 of the PUL cover 3900 is then turned right-side out so the sealed portions 3910 are on the inside of the PUL cover 3900, next to the cantilever 3901.

Figure 39C:
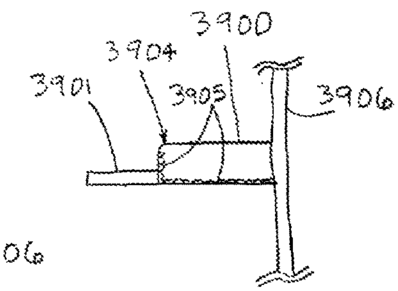
FIG. 39C is a side view of the PUL cover on the cantilever and attached to the inner wall.

FIG. 39C is a side view of the PUL cover 3900 on the cantilever 3901 and attached to the inner wall 3906.

Figure 40B:
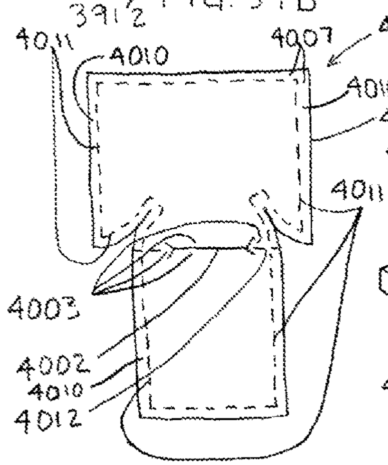
FIG. 40B is a plan view of a pattern for the PUL cover.
Figure 40A:
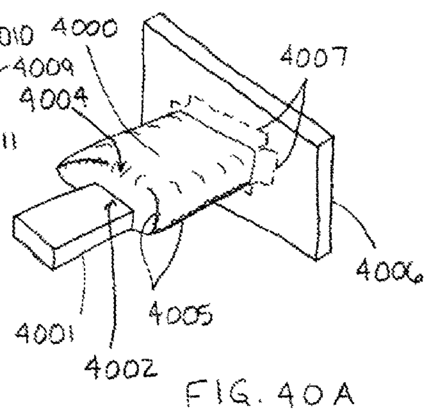
FIG. 40A is a perspective view of a polyurethane laminate fabric cover covering a portion of a cantilever.

Similar to FIG. 34A, FIG. 40A is a perspective view of a polyurethane laminate fabric cover 4000 covering a portion of a cantilever 4001. This design has a lot of free area of PUL fabric to bend as the cantilever 4001 deflects down, providing very little bending resistance. The seam 4005 of the PUL cover 4000 may be sealed on the inside. The cantilever 4001 is inserted into the slit 4002. Flaps 4003 surrounding the slit are pushed inside the PUL cover 4000 and attached to the cantilever 4001, such as by gluing. After attaching the PUL cover 4000 to the cantilever 4001, the cantilever 4001 is pushed further into the hole in the PUL cover 4000, so the PUL cover 4000 bows up 4004 to pre-load tension in the PUL cover 4000. The end of the PUL cover 4000 that is not attached to the cantilever 4001 is attached to the inner wall 4006 of the housing structure of the active foodware system (also called SmartDish™). Flaps 4007 of the PUL cover 4000 are attached to the inner wall 4006. The cantilever 4001 is attached to a load cell. The cantilever 4001 may have a hole for mounting a dining plate mating structure, also called a dish holder. The PUL cover 4000 typically has the shiny side (i.e., water-repelling coating) of the PUL fabric on the inside, so the water repelling coating isn't damaged by a user during cleaning. To clean mildew from the PUL fabric, a spray bleach may be used.

Similar to FIG. 34B, FIG. 40B is a plan view of a pattern 4008 for the PUL cover 4000. The pattern 4008 is folded along the dashed fold line 4012. Then the portions 4010 along both sides of the pattern 4008, between the side perimeter 4009 and the dashed line indicating the final visible edge 4011, may be heat sealed from the outside, typically while the shiny side of the PUL fabric is on the outside. The sealed pattern 4008 of the PUL cover 4000 is then turned right-side out so the sealed portions 4010 are on the inside of the PUL cover 4000, next to the cantilever 4001.

Figure 40C:
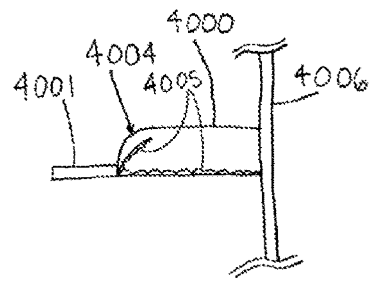
FIG. 40C is a side view of the PUL cover on the cantilever and attached to the inner wall.

FIG. 40C is a side view of the PUL cover 4000 on the cantilever 4001 and attached to the inner wall 4006.

Figure 41B:
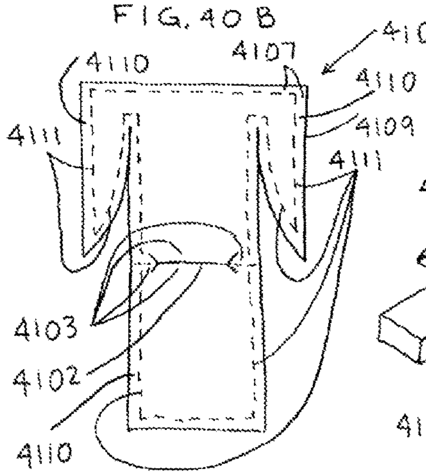
FIG. 41B is a plan view of a pattern for the PUL cover.
Figure 41A:
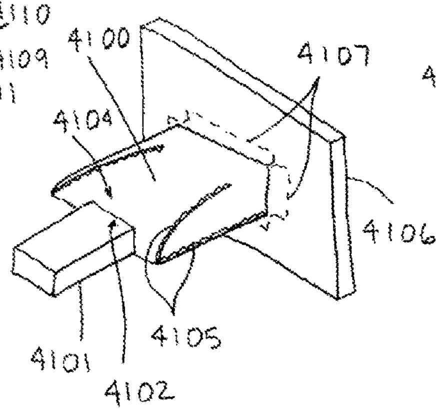
FIG. 41A is a perspective view of a polyurethane laminate fabric cover covering a portion of a cantilever.

Similar to FIG. 34A, FIG. 41A is a perspective view of a polyurethane laminate fabric cover 4100 covering a portion of a cantilever 4101. This design has a lot of free area of PUL fabric to bend as the cantilever 4101 deflects down, providing very little bending resistance. The seam 4105 of the PUL cover 4100 may be sealed on the inside. The cantilever 4101 is inserted into the slit 4102. Flaps 4103 surrounding the slit are pushed inside the PUL cover 4100 and attached to the cantilever 4101, such as by gluing. After attaching the PUL cover 4100 to the cantilever 4101, the cantilever 4101 is pushed further into the hole in the PUL cover 4100, so the PUL cover 4100 bows up 4104 to pre-load tension in the PUL cover 4100. The end of the PUL cover 4100 that is not attached to the cantilever 4101 is attached to the inner wall 4106 of the housing structure of the active foodware system (also called SmartDish™). Flaps 4107 of the PUL cover 4100 are attached to the inner wall 4106. The cantilever 4101 is attached to a load cell. The cantilever 4101 may have a hole for mounting a dining plate mating structure, also called a dish holder. The PUL cover 4100 typically has the shiny side (i.e., water-repelling coating) of the PUL fabric on the inside, so the water repelling coating isn't damaged by a user during cleaning. To clean mildew from the PUL fabric, a spray bleach may be used.

Similar to FIG. 34B, FIG. 41B is a plan view of a pattern 4108 for the PUL cover 4100. The pattern 4108 is folded along the dashed fold line 4112. Then the portions 4110 along both sides of the pattern 4108, between the side perimeter 4109 and the dashed line indicating the final visible edge 4111, may be heat sealed from the outside, typically while the shiny side of the PUL fabric is on the outside. The sealed pattern 4108 of the PUL cover 4100 is then turned right-side out so the sealed portions 4110 are on the inside of the PUL cover 4100, next to the cantilever 4101.

Figure 41C:
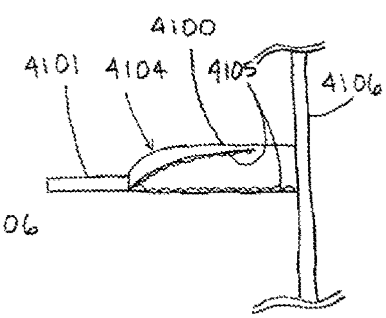
FIG. 41C is a side view of the PUL cover on the cantilever and attached to the inner wall.

FIG. 41C is a side view of the PUL cover 4100 on the cantilever 4101 and attached to the inner wall 4106.

FIG. 42 is a side section view of a portion 4200 of an active foodware system. A dining plate 4201 is on a dining plate mating structure 4202. The dining plate mating structure 4202 is on a cantilever 4203, where the cantilever 4203 is also attached to a load cell 4204.

FIG. 42 provides two alternate embodiments where the cantilever 4203 has a watertight seal between the cantilever 4203 and the housing structure 4205. In the first embodiment, a seal 4206 attaches to a portion 4207 of the cantilever 4203 and to the housing structure 4205. The seal 4206 may be plastic, rubber, neoprene, or polyurethane laminate (PUL) fabric. As shown, the seal 4206 is long, so it does not provide much bending resistance when the cantilever 4203 deflects.

In the second embodiment, a bellows-like diaphragm seal 4208 attaches to the cantilever 4203 and to the housing structure 4205. The bellows-like diaphragm seal 4208 may be plastic, rubber, neoprene, or polyurethane laminate (PUL) fabric. The bellows-like construction does not provide much bending resistance when the cantilever 4203 deflects. The seal 4208 is not likely to rupture, and if it did, not much liquid would get inside the housing structure 4205.

The housing structure 4205 has LEDs 4209 with clear side-wall lenses 4210. A drip pan 4211 may clip onto the housing structure 4205 for collecting liquid and solid food that gets under the dining plate 4201. If there is an opening 4212 in the housing structure 4205 beneath the cantilever 4203, the drip pan 4211 also protects the cantilever 4203 and load cell 4204 from exceeding rated maximum forces in the case where a user presses up on the cantilever 4203 when lifting the portion 4200 of the active foodware system.

FIG. 43A is a side section view of a portion 4300 of an active foodware system. A dining plate 4301 is on a dining plate mating structure 4302, also referred to as a positioning cradle structure. The dining plate mating structure 4302 is on a cantilever 4303, where the cantilever 4303 is also attached to a load cell 4304 for measuring weight of food 4308.

Similar to FIG. 42, the embodiment of FIG. 43A has a watertight seal 4306 attached between the cantilever 4303 and the housing structure 4305. The seal 4306 may also attach to a lens 4307. The seal 4306 may be silicone rubber, polyurethane laminate (PUL) fabric, or grommet-like water seal. As shown, the seal 4306 is folded, so it does not provide much bending resistance along the fold when the cantilever 4303 deflects.

FIG. 43A also provides a plate carrier 4309. An LED strip 4310 has an LED 4311 for emitting light 4312 through the lens 4307. The lens 4307 may be translucent white, frosted, and the like, and preferably scratch resistant.

FIG. 43B is a close-up view of the water seal 4306. One portion 4313 of the seal 4306 is attached to the cantilever 4303, and another portion 4314 of the seal 4306 is attached to the housing structure 4305 and/or the lens 4307.

FIG. 43C is an end view of FIG. 43B. FIG. 43C provides how the seal 4306 goes around the cantilever 4303.

Figure 43D:
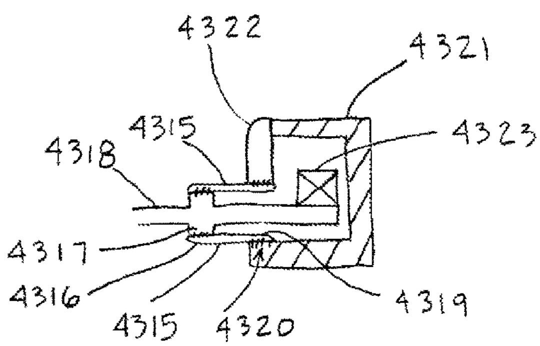
FIGS. 43D-43O are side section views of other embodiments of a water seal, some having bellows shapes.

FIG. 43D is a side section view of another embodiment of a water seal 4315. One portion 4316 of the seal 4315 is attached to a portion 4317 of the cantilever 4318, and another portion 4319 of the seal 4315 is attached 4320 to the housing structure 4321 and/or a lens 4322. The seal 4315 may be a polyurethane laminate (PUL) fabric or silicone rubber tube, and may be attached using glue or a fastener. A load cell 4323 is attached to the cantilever 4318.

Figure 43E:
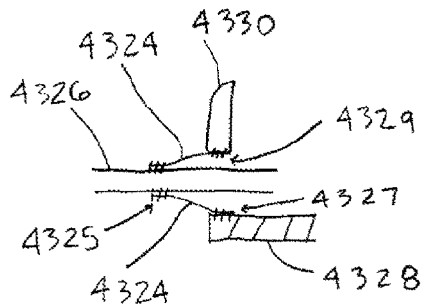

FIG. 43E is a side section view of a portion of another embodiment of a water seal 4324. One portion of the seal 4324 is attached 4325 to a cantilever 4326, and another portion of the seal 4324 is attached 4327 to the housing structure 4328 and attached 4329 to a lens 4330. The seal 4324 may be a polyurethane laminate (PUL) fabric or silicone rubber tube with one end of the tube having a larger diameter than the other end.

Figure 43F:
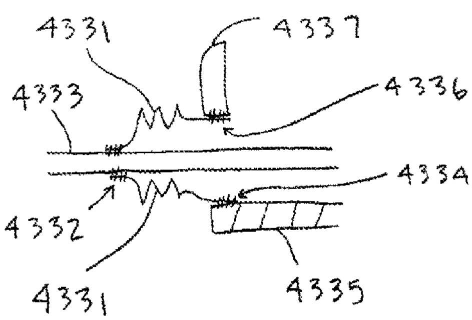

Similar to FIG. 43E, FIG. 43F is a side section view of a portion of another embodiment with a bellows water seal 4331. One portion of the seal 4331 is attached 4332 to a cantilever 4333, and another portion of the seal 4331 is attached 4334 to the housing structure 4335 and attached 4336 to a lens 4337. Attachment may include a fastener. As shown, the bellows water seal 4331 may have one end with a larger diameter than the other end.

Figure 43G:
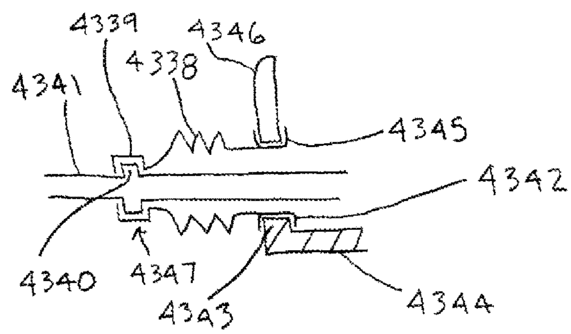

Similar to FIG. 43F, FIG. 43G is a side section view of a portion of another embodiment with a bellows water seal 4338. One portion 4339 of the seal 4338 is attached to a portion 4340 of a cantilever 4341 attached to a load cell, and another portion 4342 of the seal 4338 is attached to a portion 4343 of the housing structure 4344, and another portion 4345 of the seal 4338 is attached to a lens 4346. Attachment may include a clip shape 4347, which may be custom molded silicone rubber. As shown, the bellows water seal 4338 may have one end with a larger diameter than the other end.

Figure 43H:
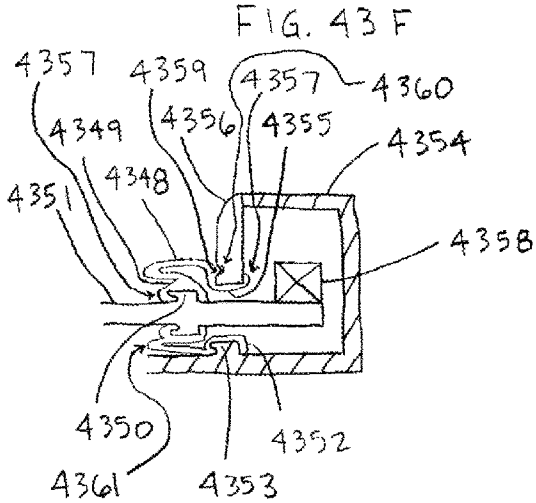

Similar in some aspects to FIG. 43D and FIG. 43G, FIG. 43H is a side section view of another embodiment with a water seal 4348. One portion 4349 of the seal 4348 is attached to a portion 4350 of a cantilever 4351 that is attached to a load cell 4358, and another portion 4352 of the seal 4348 is attached to a portion 4353 of the housing structure 4354, and another portion 4355 of the seal 4348 is attached to a lens 4356. Attachment may include a clip shape 4357, which may be custom molded silicone rubber. As shown, the clip shape 4357 may have a protruding ridge 4359 that fits into a recession 4360. The shape of the water seal 4348 is compact, and it does not provide much bending resistance along the fold 4361 when the cantilever 4351 deflects.

Figure 43I:
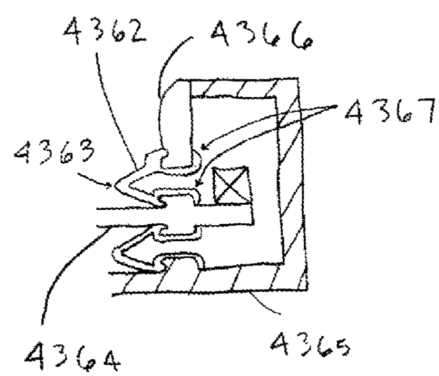

FIG. 43I is similar to the embodiment of FIG. 43H, but where the water seal 4362 has a different shape than the water seal 4348 of FIG. 43I. Similar to the water seal 4348 of FIG. 43I, the water seal 4362 of FIG. 43H includes clip shapes 4367 for attaching the water seal 4362 to the cantilever 4364, housing structure 4365, and lens 4366. The shape of the water seal 4362 does not provide much bending resistance along the fold 4363 when the cantilever 4364 deflects.

Figure 43J:
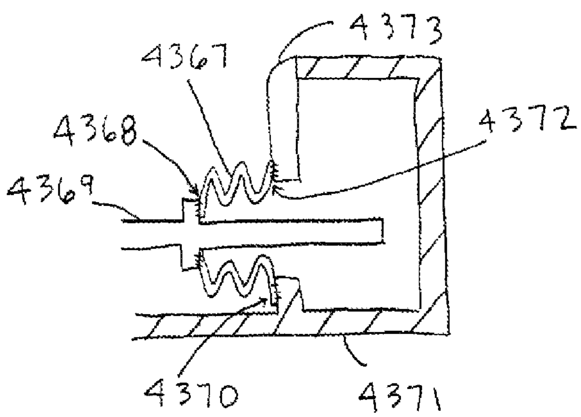

Similar to FIG. 43G, FIG. 43J is a side section view of a portion of another embodiment with a bellows-shaped water seal 4367. One portion of the seal 4367 is attached 4368 to a portion of a cantilever 4369, and another portion of the seal 4367 is attached 4370 to a portion of the housing structure 4371, and another portion of the seal 4367 is attached 4372 to a lens 4373. Attachment may include a fastener or glue.

Figure 43K:
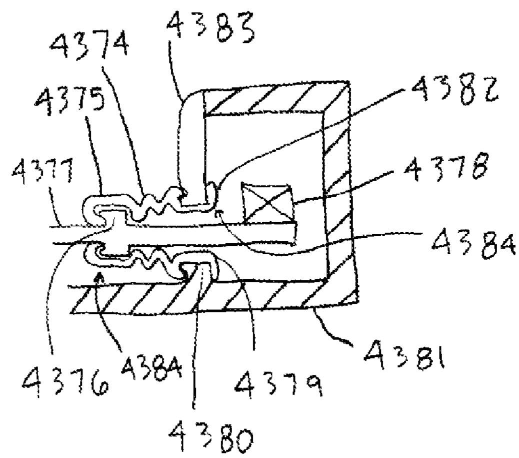

Similar to FIG. 43G, FIG. 43K is a side section view of a portion of another embodiment with a bellows-shaped water seal 4374. The bellows-shaped water seal 4374 may be silicone rubber, and have clip shapes 4384 on the ends for attaching. One portion 4375 of the seal 4374 is attached to a portion 4376 of a cantilever 4377 that is attached to a load cell 4378 for sensing weight, and another portion 4379 of the seal 4374 is attached to a portion 4380 of the housing structure 4381, and another portion 4382 of the seal 4374 is attached to a lens 4383. The bellow-shaped water seal 4374 arrangement of FIG. 43K takes a lot of space along the cantilever 4377.

Figure 43L:
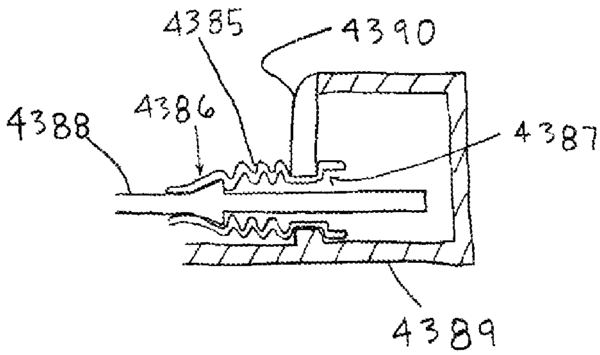

Similar to FIG. 43K, FIG. 43L is a side section view of a portion of another embodiment with a bellows-shaped water seal 4385. Relative to FIG. 43K, in FIG. 43L the bellows-shaped water seal 4385 has different shapes 4386 and 4387 on the ends for attaching to the cantilever 4388, housing structure 4389, and lens 4390.

Figure 43M:
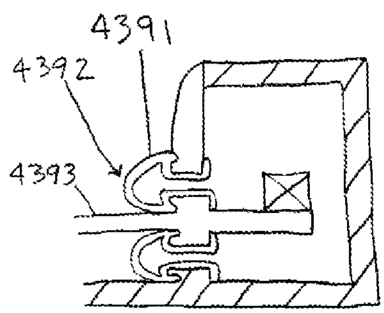

Similar to FIG. 43I, FIG. 43M is a side section view of a portion of another embodiment with a water seal 4391. The shape of the water seal 4391 is compact and has a smoother curve bend 4392 than the fold 4363 of FIG. 43I. The curve bend 4392 does not provide much bending resistance when the cantilever 4393 deflects.

Figure 43N:
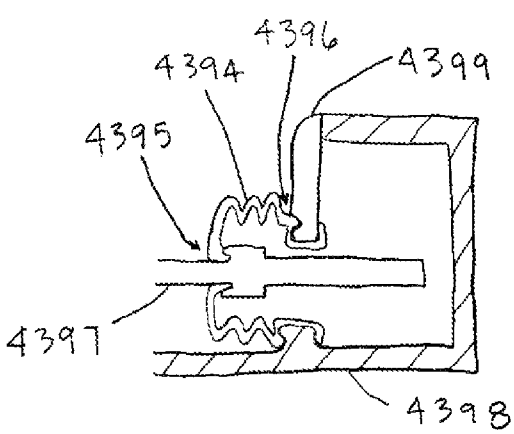

Similar to FIG. 43K, FIG. 43N is a side section view of a portion of another embodiment with a bellows-shaped water seal 4394. Relative to FIG. 43K, in FIG. 43N the bellows-shaped water seal 4394 has a larger diameter and different shapes 4395 and 4396 on the ends for attaching to the cantilever 4397, housing structure 4398, and lens 4399.

Figure 43O:
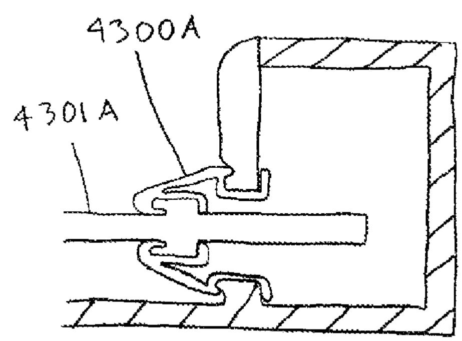

Similar to FIG. 43M, FIG. 43O is a side section view of a portion of another embodiment with a water seal 4300A. As shown, the shape of the water seal 4300A is flatter than the curve bend 4392 of FIG. 43M. The flat water seal 4300A does not provide much bending resistance when the cantilever 4301A deflects.

Figure 43P:
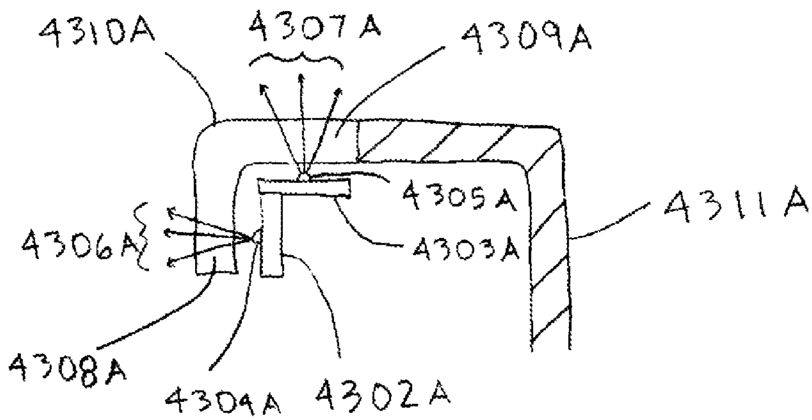
FIGS. 43P-43R are side section views of a lens portion of an active foodware system.
Figure 43Q:
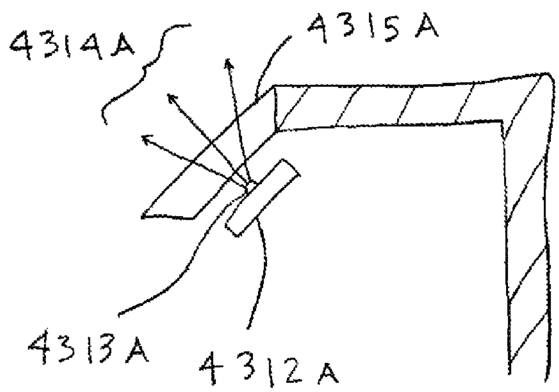
Figure 43R:
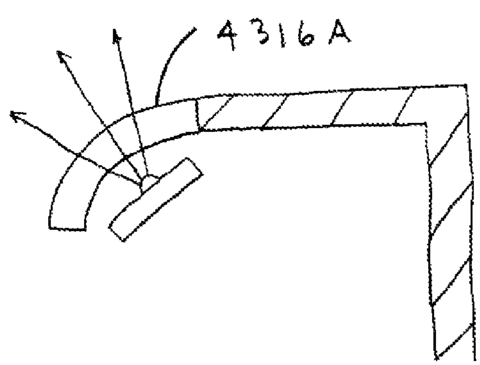

FIGS. 43P-43R are side section views of a lens portion of an active foodware system. FIG. 43P provides a portion of a housing structure 4311A with two LED strips 4302A and 4303A having LED 4304A and LED 4305A emitting light 4306A and 4307A through portion 4308A and portion 4309A of a lens 4310A. In the embodiment of FIG. 43P, the LED strip 4302A faces to the side, and the LED strip 4303A faces upward.

As shown in the embodiment of FIG. 43Q, an LED strip 4312A has an LED 4313A emitting light 4314A substantially at a 45-degree angle and through a flat lens 4315A also substantially at a 45-degree angle. As shown, the embodiment of FIG. 43R is similar to the embodiment of FIG. 43Q, but the lens 4316A is curved.

Figure 44A:
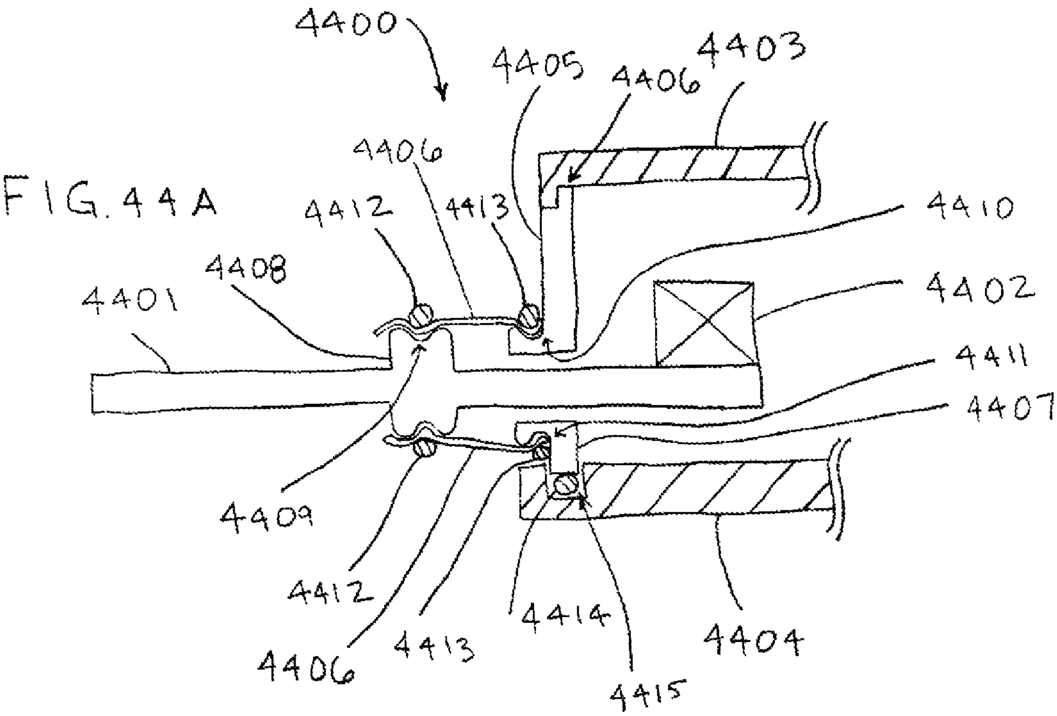
FIGS. 44A-44L are embodiments for making a weight-sensing cantilever watertight.

FIGS. 44A-44L are embodiments for making a weight-sensing cantilever watertight. FIG. 44A is a side section view of a portion 4400 of an active foodware system. A weight-sensing cantilever 4401 is attached to a load cell 4402 that is inside a housing structure having a top 4403 and a bottom 4404. The portion 4400 includes a lens 4405, which may be glued to the top 4403.

To make the cantilever 4401 watertight, so water that gets under a dining plate doesn't reach the load cell 4402, a membrane 4406 is secured between the cantilever 4401 and the lens 4405 and a structure 4407. The cantilever 4401 has a portion 4408 with a recession 4409; the lens 4405 has a recession 4410; and the structure 4407 has a recession 4411. In the embodiment of FIG. 44A, the membrane 4406 is secured at one end to the cantilever recession 4409 by a rubber O-ring 4412. The membrane 4406 is secured at the other end to the lens recession 4410 and the structure recession 4411 by a rubber O-ring 4413. The membrane 4406 is typically a thin rubber membrane, like a surgical glove finger, e.g., latex or vinyl material. Rubber 4414 may be inserted into a gap 4415 in the bottom 4404 for creating a watertight seal between the bottom 4404 and the structure 4407 when the bottom 4404 is screwed on. In the embodiment of FIG. 44A, the rubber 4414 has a round cross-section.

Figure 44B:
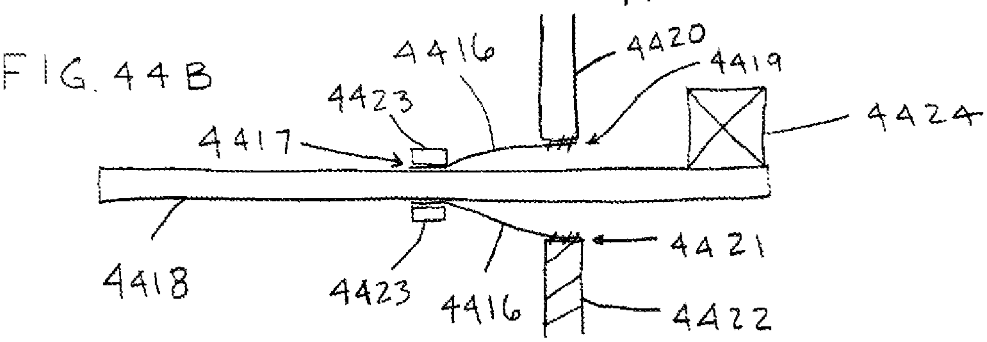

FIG. 44B is a side section view of an embodiment similar in some aspects to FIG. 44A, but with the membrane 4416, which may be rubber, having different attachments structures than FIG. 44B. The attachment 4417 attaches the membrane 4416 to the cantilever 4418 that is attached to a load cell 4424; the attachment 4419 attaches the membrane 4416 to the lens 4420; and the attachment 4421 attaches the membrane 4416 to the bottom 4422 of a housing structure. The attachment 4417 of the membrane 4416 to the cantilever 4418 may include double-stick tape, glue, or a tight rubber band 4423. The attachments 4419 and 4421 may include glue.

Figure 44C:
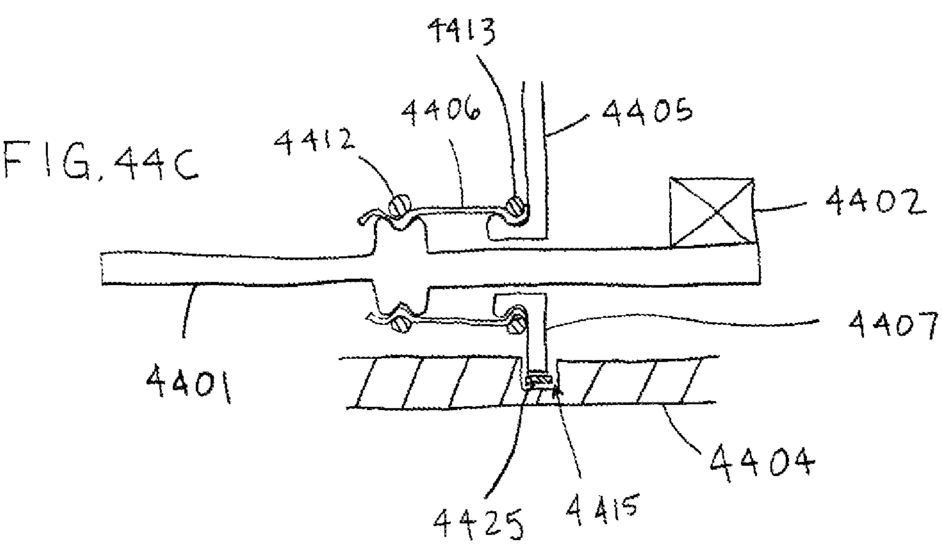

FIG. 44C is a side section view similar to the embodiment of FIG. 44A, but where the rubber 4425 has a flat rectangular cross-section that is inserted into the gap 4415 in the bottom 4404 for creating a watertight seal between the bottom 4404 and the structure 4407 when the bottom 4404 is screwed on.

Figure 44D:
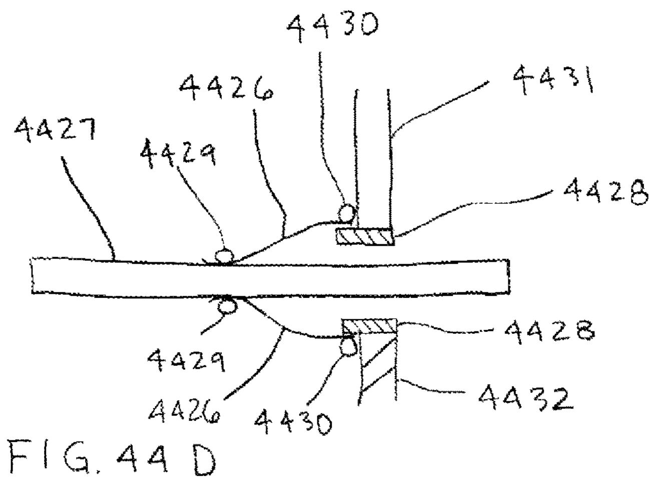
Figure 44E:
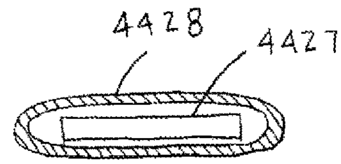

FIG. 44D is a side section view of an embodiment similar in some aspects to FIG. 44B, but with the membrane 4426 having different attachments structures than FIG. 44B. The membrane 4426 may be rubber or polyurethane laminate (PUL) fabric. The membrane 4426 may be attached to the cantilever 4427 and to the oval insert 4428 by flat rubber bands or O-rings 4429 and 4430. In the embodiment of FIG. 44D, the oval insert 4428 attaches to a lens 4431 and to the bottom 4432 of a housing structure. As provided by the end view FIG. 44E, the oval insert 4428 goes around the cantilever 4427.

Figure 44F:
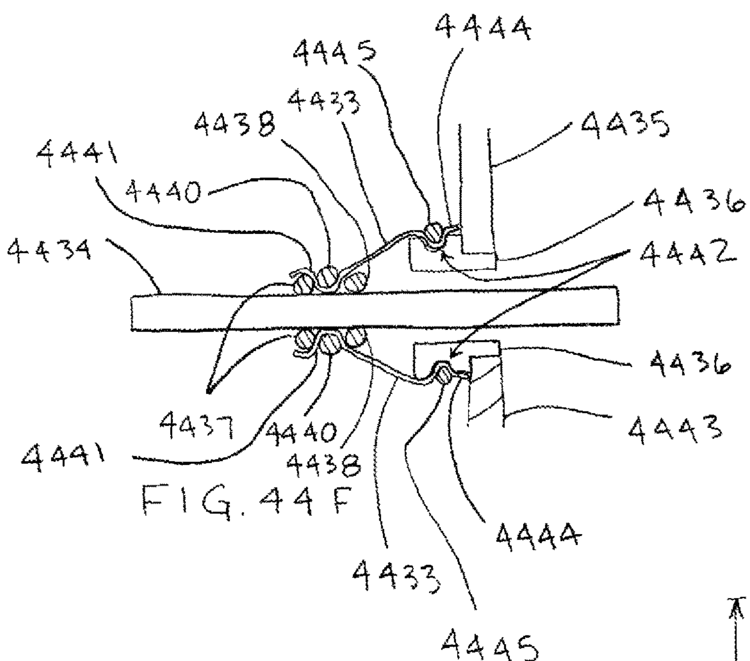

FIG. 44F is a side section view of an embodiment similar in some aspects to FIG. 44B, but with the membrane 4433 having different attachments structures than FIG. 44F. The membrane 4433 may be rubber or polyurethane laminate (PUL) fabric. To make the cantilever 4434 watertight, the membrane 4433 is secured between the cantilever 4434 and an oval insert 4436 attached to the lens 4435 and to the bottom 4443 of a housing structure. The cantilever 4434 has two positioning O-rings 4437 and 4438 that create a recession 4439 in the gap between them. The two positioning O-rings 4437 and 4438 may be glued to the cantilever 4434. A securing/locking O-ring 4440 secures one end 4441 of the membrane 4433 in the recession 4439. The oval insert 4436 has a recession 4442. In the embodiment of FIG. 44F, the second end 4444 of the membrane 4433 is secured to the oval insert recession 4442 by a securing/locking O-ring 4445.

Figure 44G:
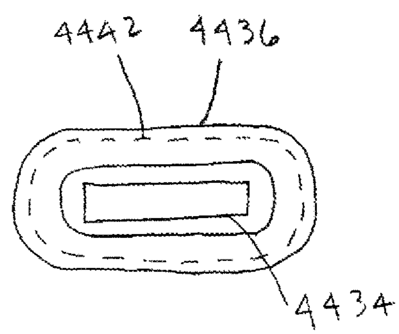

FIG. 44G is an end view of the oval insert 4436 of FIG. 44F, providing the recession 4442 for holding the O-ring 4445.

Figure 44H:
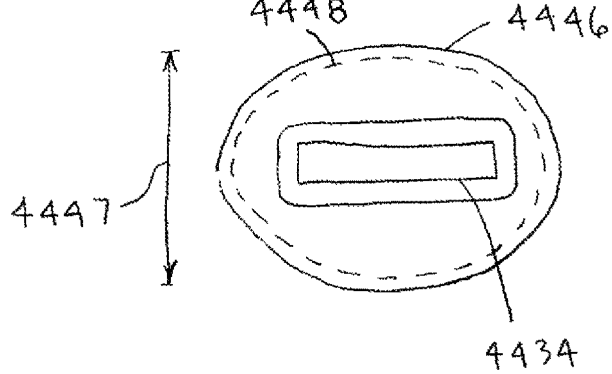

FIG. 44H is an end view of another oval insert 4446 which has a wider short dimension 4447 to keep more tension around it by the securing/locking O-ring 4445 in the recession 4448.

Figure 44I:
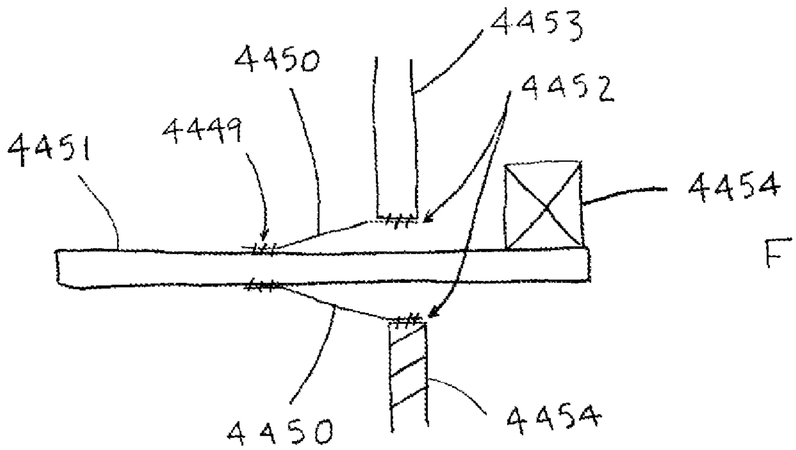

FIG. 44I is a side section view of a portion of an embodiment similar to FIG. 44B. In the portion of the embodiment of FIG. 44I, the attachment 4449 of the membrane 4450 to the cantilever 4451 may include double-stick tape or glue. The attachment 4452 of the membrane 4450 to the lens 4453 and to the bottom 4454 of the housing structure may include glue. The cantilever 4451 is attached to a load cell 4454.

Figure 44J:
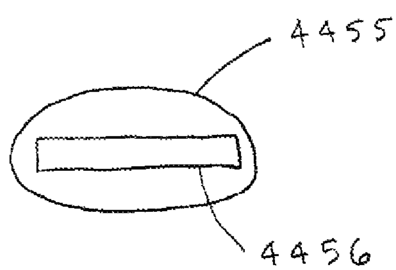
Figure 44K:
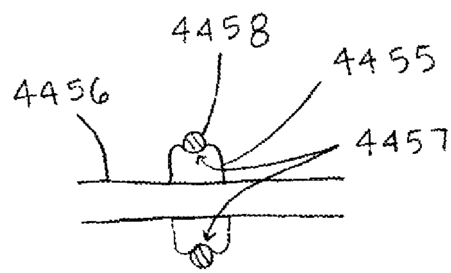

FIG. 44J is an end view of an oval structure 4455 attached to a cantilever 4456. FIG. 44K is a side section view of the oval structure 4455 of FIG. 44J having a recession 4457 into which an O-ring 4458 may be placed to secure a membrane. The oval structure 4455 has an oval shape for keeping tension between the O-ring 4458 and the oval structure 4455 to secure a membrane.

Figure 44L:
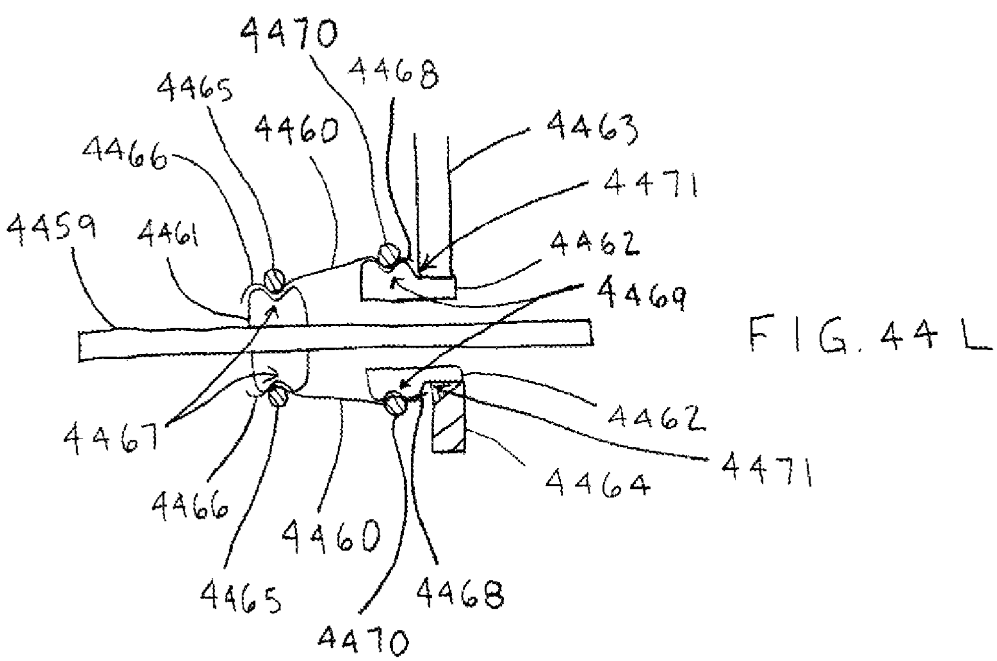

FIG. 44L is a side section view of an embodiment similar in some aspects to FIG. 44F and FIG. 44K. In the embodiment of FIG. 44L, to make the cantilever 4459 watertight, the membrane 4460 is secured between the oval structure 4461 that is attached to the cantilever 4459 (similar to FIG. 44K), and an oval insert 4462 that is attached to the lens 4463 and to the bottom 4464 of a housing structure (similar to FIG. 44F). A securing/locking O-ring 4465 secures one end 4466 of the membrane 4460 in a recession 4467 in the oval structure 4461. The second end 4468 of the membrane 4460 is secured to a recession 4469 in the oval insert 4462 by a securing/locking O-ring 4470. The oval insert 4462 has a drainage channel 4471 next to the lens 4463 and next to the bottom 4464 in order to let water drain around.

FIG. 45A is an exploded perspective view of a portion of an active foodware system for making a cantilever 4500 watertight. The cantilever 4500 is inserted 4516 and attached inside an opening 4513 in a cantilever oval structure 4501, such as by gluing. The cantilever oval structure 4501 is part of the cantilever seal. The cantilever oval structure 4501 has a slot 4502 for receiving a cantilever-securing O-ring or rubber band. A housing oval structure 4503 has a slot 4504 for receiving a housing-securing O-ring. The cantilever 4500 passes through an opening 4514 in the housing oval structure 4503, but is not attached to the cantilever 4500, so the cantilever 4500 may move. The housing oval structure 4503 is attached to the housing structure 4505, and may be attached by screws 4506. The height 4507 of the portion of the housing structure 4505 to which the housing oval structure 4503 is attached may be approximately 0.25" tall.

One end 4508 of a thin membrane tube 4509, which may be polyurethane laminate (PUL) fabric, rubber, or plastic, is secured over the cantilever oval structure 4501 by the cantilever-securing O-ring (not shown). The other end 4510 of the membrane tube 4509 is secured over the housing oval structure 4503 by a housing-securing O-ring (not shown).

In the embodiment of FIG. 45A, an LED strip 4511 with LEDs 4515 is positioned on the housing structure 4505 by inserting 4517 into a U-shaped lens 4512.

FIGS. 45B-45D provide an embodiment of a portion of an active foodware system. FIGS. 45B-45D are similar in some aspects to the embodiment of FIG. 45A, which is an exploded perspective view of a portion of an active foodware system for making a cantilever watertight. FIG. 45B is a plan view, FIG. 45C is a perspective view, and 45D is a side view. In FIGS. 45B and 45D, the cantilever 4518 is attached to a load cell 4519. The cantilever 4518 may be aluminum or plastic.

A thin membrane tube 4520 is attached to a membrane structure 4521 that is attached to the housing structure 4522 of the active foodware system. The membrane tube 4520 may be polyurethane laminate (PUL) fabric, plastic, or rubber. The membrane tube 4520 may be glued to the inside edge 4523 of a hole 4524 in the membrane structure 4521. The glue may be polyurethane or silicone rubber glue. Glue 4525 may be used on the outside of the hole.

The membrane structure 4521 may be screwed with screws 4526 or glued to the housing structure 4522. The cantilever 4518 passes through the hole 4524 in the membrane structure 4521 and through the membrane tube 4520. The membrane tube 4520 is then secured to the cantilever 4518 with an O-ring 4526 or rubber band. The cantilever 4518 may have a recess 4529 into which the O-ring 4526 presses the membrane tube 4520. To allow the cantilever 4518 to deflect, there may be holes 4527 and 4528 in the housing structure 4522 beneath the cantilever 4518.

The diameter of the O-ring 4526 needed is determined as follows. For a 1" wide×⅛" thick cantilever 4518, the circumference equals 2.25"=57.15 mm. The circumference of a circle equal π×D. Solving for the inside diameter of the O-ring yields D=0.72"=18.19 mm.

Figure 45E:
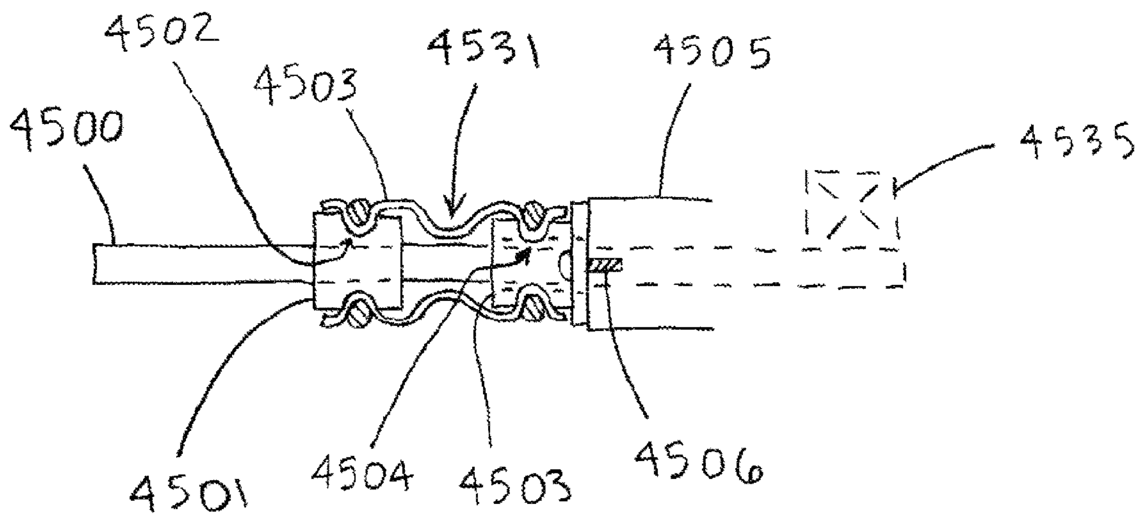
FIGS. 45E and 45F are side section views of alternate embodiments of the thin membrane tube of FIG. 45A for making a cantilever watertight.
Figure 45F:
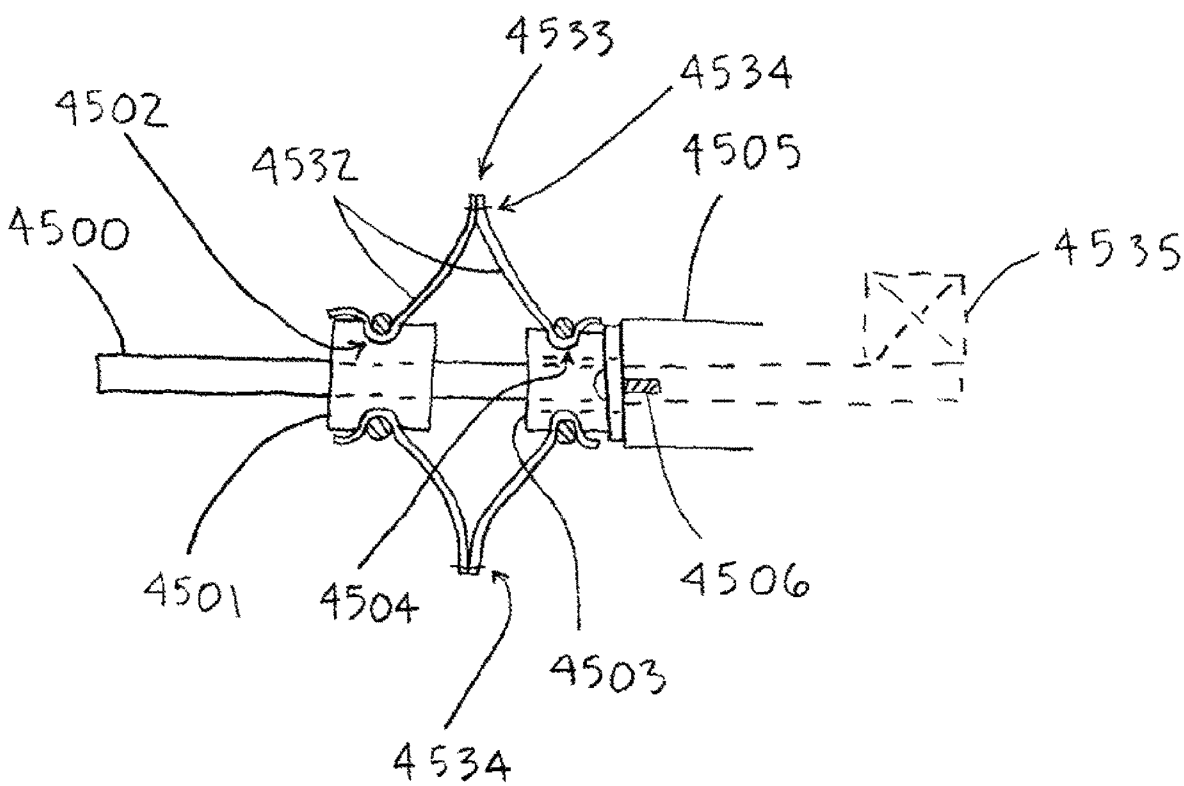

FIGS. 45E and 45F are side section views of alternate embodiments of the thin membrane tube 4509 of FIG. 45A for making a cantilever 4500 watertight. In FIG. 45E, the thin membrane tube 4530 is folded 4531 or kinked, which reduces the resistance when the cantilever 4500 deflects. In FIG. 45F, a thin membrane 4532 is shaped like a diaphragm 4533, which reduces the resistance when the cantilever 4500 deflects. The two sides of the diaphragm may be welded, glued, or stitched together 4534. The cantilever 4500 is attached to the load cell 4535.

Figure 46A:
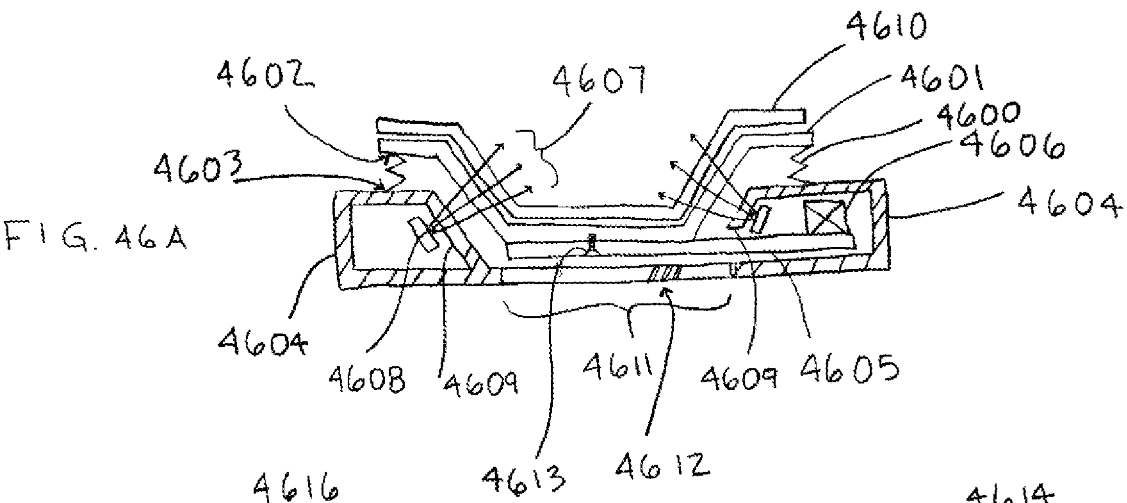
FIG. 46K is a plan view of a square bellows.

FIG. 46A is a side section view of a portion of an active foodware system. The embodiment of FIG. 46A is similar in some aspects to the embodiment of FIG. 24C, which is a water-resistant design. However, rather than including a liquid partial barrier 2432, as is provided by FIG. 24C, the embodiment of FIG. 46A includes an accordion-style bellows 4600 to block liquid and food from getting under a dining plate mating structure 4601. One end of the bellows 4600 is attached 4602 to the dining plate mating structure 4601, and the other end of the bellows 4600 is attached 4603 to the housing structure 4604. The dining plate mating structure 4601 is attached to a cantilever 4605, and the other end of the cantilever 4605 is attached to a load cell 4606. Attachment may include a screw 4613. In the embodiment of FIG. 46A, light 4607 from an LED 4608 passes through a clear or translucent lens 4609 and then through the dining plate mating structure 4601 and the dining dish 4610 on the dining plate mating structure 4601. Similar in some aspects to the removable door 1421 with vent slots 1423 of the embodiment of FIGS. 14B-14C, in FIG. 46A on the bottom of the housing structure 4604 under the cantilever 4605 there is a snap-in removable panel 4611 for allowing cleaning, and having slits 4612 for allowing drying. The embodiment of FIG. 46A with the bellows 4600 may require more vertical space than the embodiment of FIG. 24C with liquid partial barrier 2432.

Figure 46B:
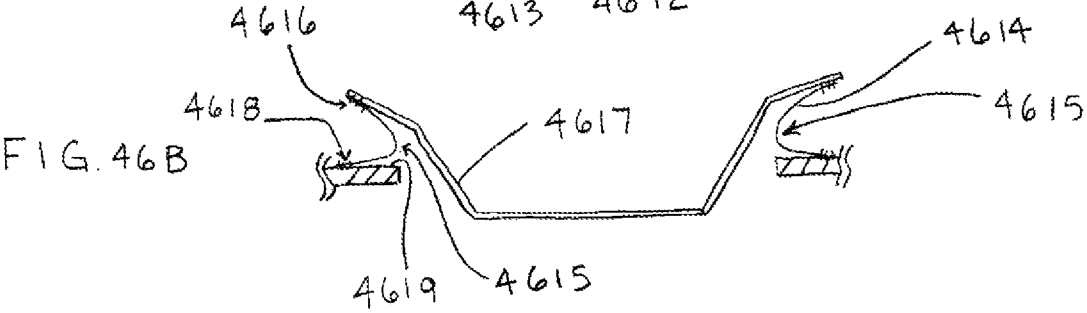

FIG. 46B is a side section view of an embodiment similar to the embodiment of FIG. 46A. FIG. 46B provides a bellows 4614 including a single bend 4615. One end 4616 of the bellows 4614 is secured to the dining plate mating structure 4617, and the other end 4618 of the bellows 4614 is secured to the rim 4619 of the housing structure surrounding the opening for the dining plate mating structure 4617, in order to seal the gap. The bellows 4614 may be silicone rubber.

Figure 46C:
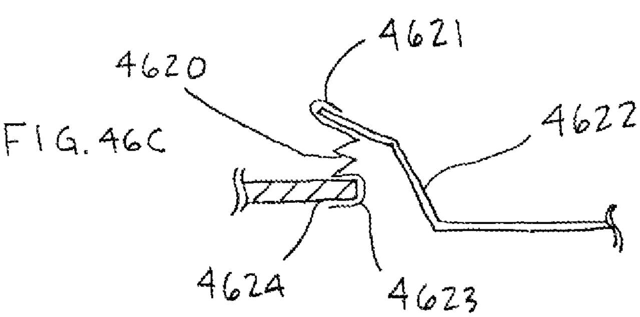

FIG. 46C is a side section view of an embodiment similar to the embodiment of FIG. 46A, where the accordion bellows 4620 includes a first clip structure 4621 on one end of the bellows 4620 for fitting snuggly to the edge of the dining plate mating structure 4622, and a second clip structure 4623 on the other end of the bellows 4620 to fit snuggly to the rim edge 4624 of the housing structure surrounding the opening for the dining plate mating structure 4622, in order to seal the gap. The bellows 4620 may be silicone rubber.

Figure 46D:
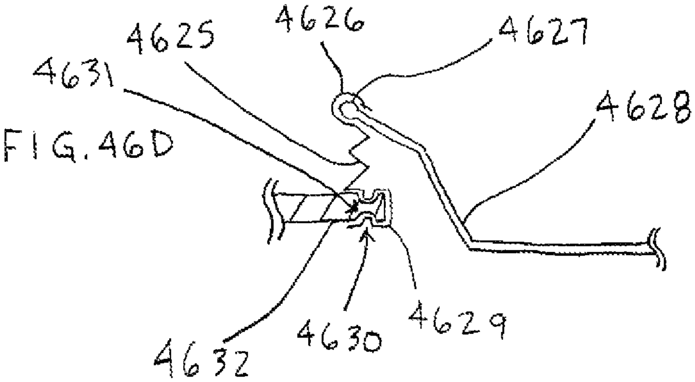

FIG. 46D is a side section view of an embodiment similar to the embodiment of FIG. 46C. FIG. 46D provides an accordion bellows 4625 having a first clip structure 4626 on one end of the bellows 4625 for elastically snapping over a wide portion 4627 of the edge of the dining plate mating structure 4628 for creating a seal. A second clip structure 4629 on the other end of the bellows 4625 has protrusions 4630 for elastically snapping into indentations 4631 of the rim edge 4632 of the housing structure surrounding the opening for the dining plate mating structure 4628 for creating a seal, in order to seal the gap. The bellows 4625 may be silicone rubber.

Figure 46E:
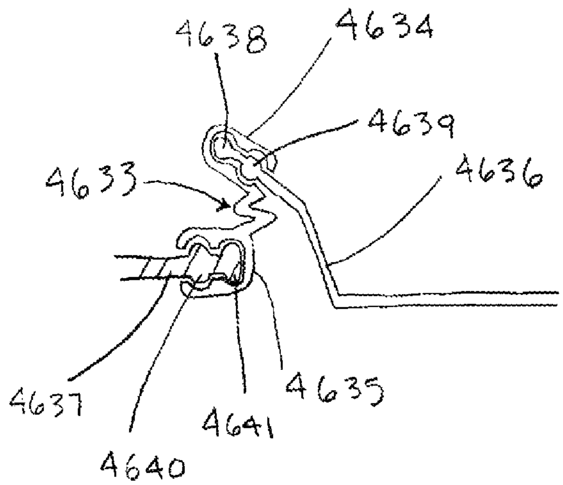

FIG. 46E is a side section view of an embodiment similar to the embodiment of FIG. 46D. FIG. 46E provides a flexible bellows 4633, or other flexible structure, having first 4634 and second 4635 clip structures. The first clip structure 4634 is for gripping the edge of the dining plate mating structure 4636, and the second clip structure 4635 is for gripping the rim edge 4637 of the housing structure surrounding the opening for the dining plate mating structure 4636. The bellows 4633 with clip structures 4634, 4635 may be silicone rubber or other elastic material or membrane. The flexible bellows 4633 includes the first clip structure 4634 on one end of the bellows 4633 for elastically snapping over two wide portions 4638, 4639 of the edge of the dining plate mating structure 4636 for creating a seal. The second clip structure 4635 is on the other end of the bellows 4633 for elastically snapping over two wide portions 4640, 4641 of the rim edge 4637 of the housing structure surrounding the opening for the dining plate mating structure 4636 for creating a seal, in order to seal the gap.

Figure 46F:
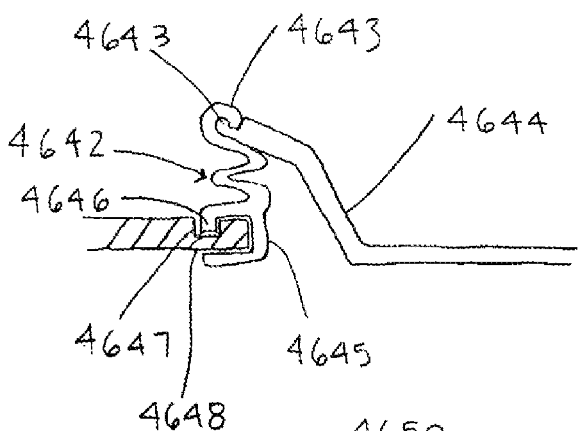

FIG. 46F is a side section view of an embodiment similar to the embodiment of FIG. 46D. FIG. 46F provides a bellows 4642 having a first clip structure 4643 on one end of the bellows 4642 for elastically snapping over a wide portion 4643 of the edge of the dining plate mating structure 4644 for creating a seal. A second clip structure 4645 on the other end of the bellows 4642 has a protrusion 4646 for elastically snapping into an indentation 4647 of the rim edge 4648 of the housing structure surrounding the opening for the dining plate mating structure 4644 for creating a seal, in order to seal the gap. The bellows 4642 may be silicone rubber.

Figure 46G:
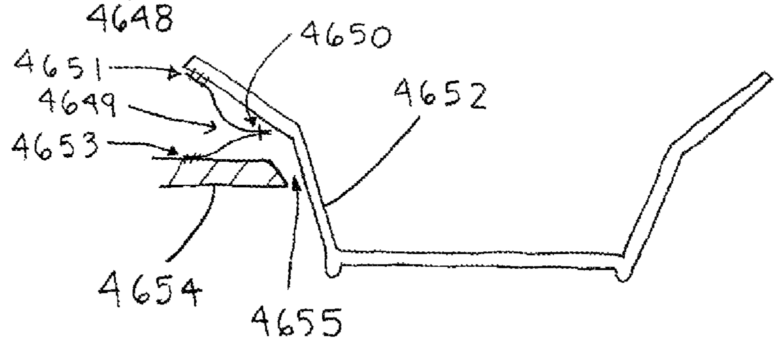

FIG. 46G is a side section view of an embodiment similar to the embodiment of FIG. 46B. FIG. 46G provides a bellows 4649. The bellows 4649 may be polyurethane laminate (PUL) fabric. PUL portions of the bellows 4649 may have a sewn joint 4650. The PUL portions may be sealed by heating, such as by a heat-sealing press or by putting in a dryer for 30 minutes. One end of the bellows 4649 is attached 4651 to the dining plate mating structure 4652, and the other end of the bellows 4649 is attached 4653 to the rim 4654 of the housing structure surrounding the opening for the dining plate mating structure 4652, in order to seal the gap 4655. Glue or double-stick tape may be used for attaching the bellows 4649.

Figure 46H:
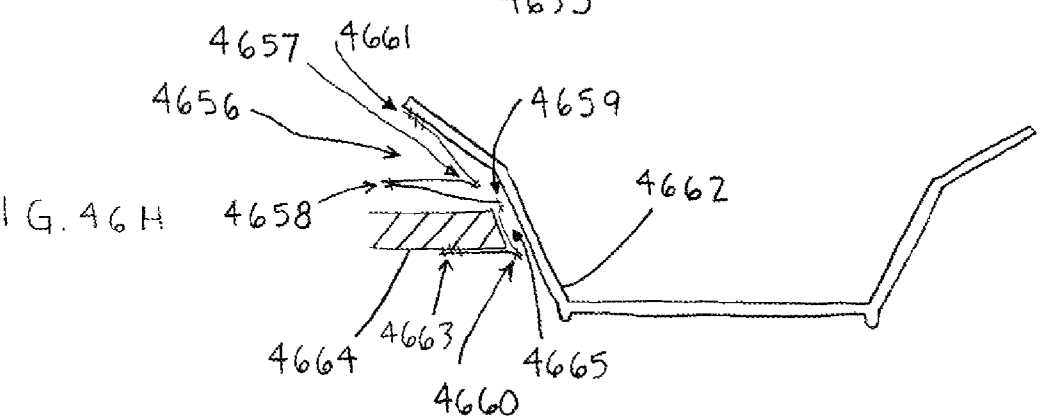
Figure 46:
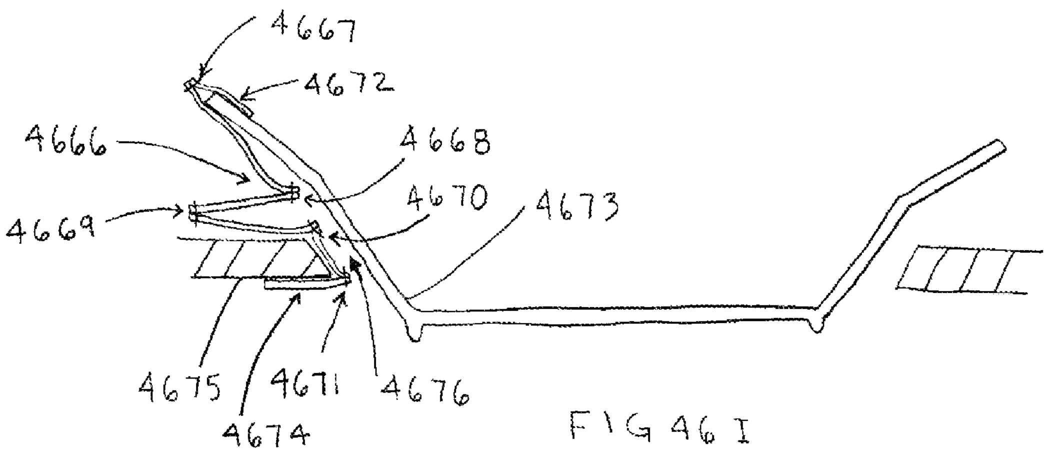
Figure 46:
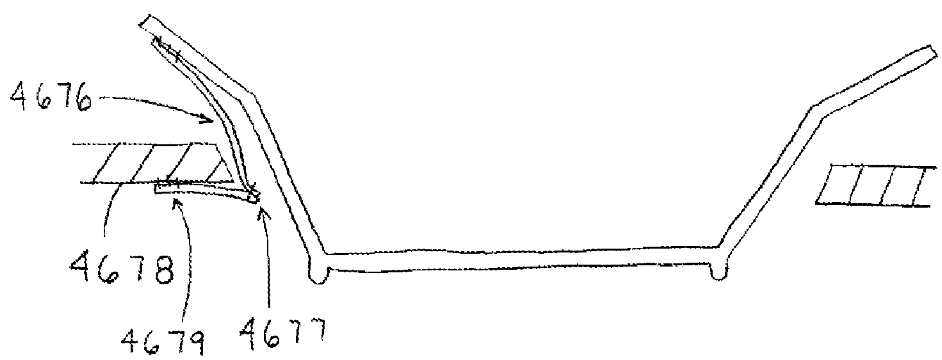

FIG. 46H is a side section view of an embodiment similar to the embodiment of FIG. 46G. FIG. 46H provides a bellows 4656. The bellows 4656 may be polyurethane laminate (PUL) fabric. The bellows 4656 of the embodiment of FIG. 46H has four sewn joints 4657, 4658, 4659, 4660. One end of the bellows 4656 is attached 4661 to the dining plate mating structure 4662, and the other end of the bellows 4656 is attached 4663 to the rim 4664 of the housing structure surrounding the opening for the dining plate mating structure 4662, in order to seal the gap 4665. Glue or double-stick tape may be used for attaching the bellows 4656.

FIG. 46I is a side section view of an embodiment similar to the embodiment of FIG. 46H. FIG. 46I provides a bellows 4666. The bellows 4666 may be polyurethane laminate (PUL) fabric. The bellows 4666 of the embodiment of FIG. 46I has five sewn joints 4667, 4668, 4669, 4670, 4671. One end of the bellows 4666 is secured 4672 to the dining plate mating structure 4673, and the other end of the bellows 4666 is secured 4674 to the rim 4675 of the housing structure surrounding the opening for the dining plate mating structure 4673, in order to seal the gap 4676. The joint 4667 of the bellows 4666 may be used for securing by fitting one end of the bellows 4466 snuggly around the edge of the dining plate mating structure 4673. The joints 4570, 4671 of the bellows 4666 may be used for securing by fitting the other end of the bellows 4466 snuggle around the rim 4675.

FIG. 46J is a side section view of an embodiment similar to the embodiment of FIG. 46G. FIG. 46J provides a bellows 4676. In FIG. 46G, the joint 4650 of the bellows 4649 of FIG. 46G is positioned above the rim 4654, and the end of the bellows 4649 is also attached 4653 above the rim 4654. In contrast, in FIG. 46I the joint 4677 of the bellows 4676 is positioned below the rim 4678, and the end of the bellows 4676 is also attached 4679 below the rim 4678.

Figure 46K:
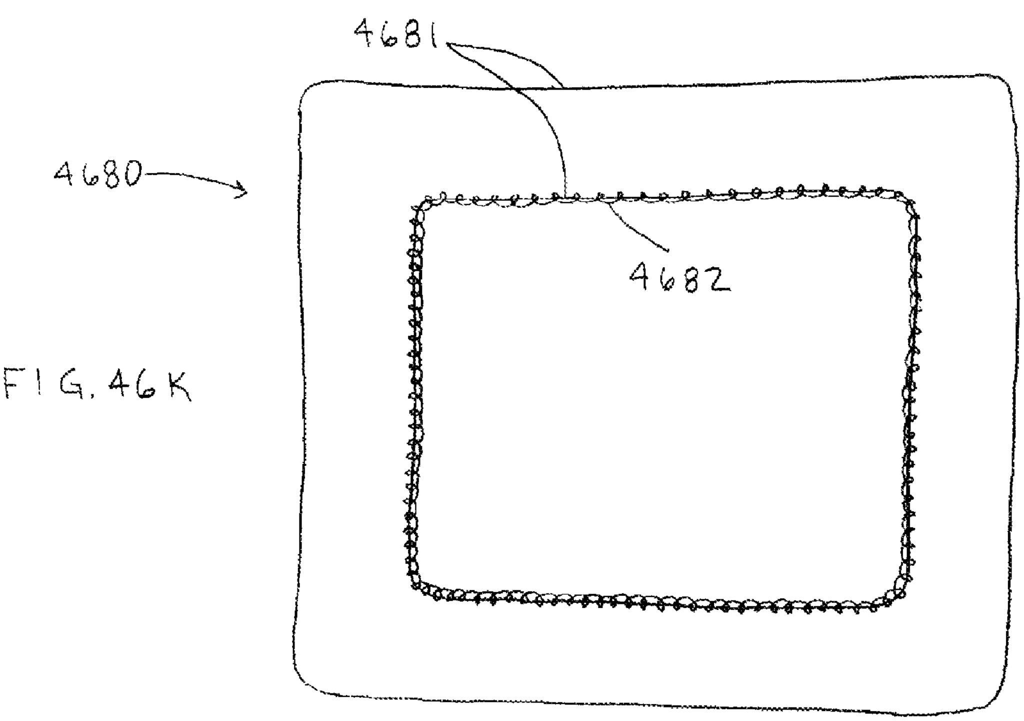

FIG. 46K is a plan view of a square bellows 4680, similar to the bellows 4676 of FIG. 46J. The bellows 4680 may be polyurethane laminate (PUL) fabric. The bellows 4680 may include two or more pieces of the outer annulus shape 4681 sewn together to form a joint 4682, similar to the joint 4677 in FIG. 46J.

Figure 47A:
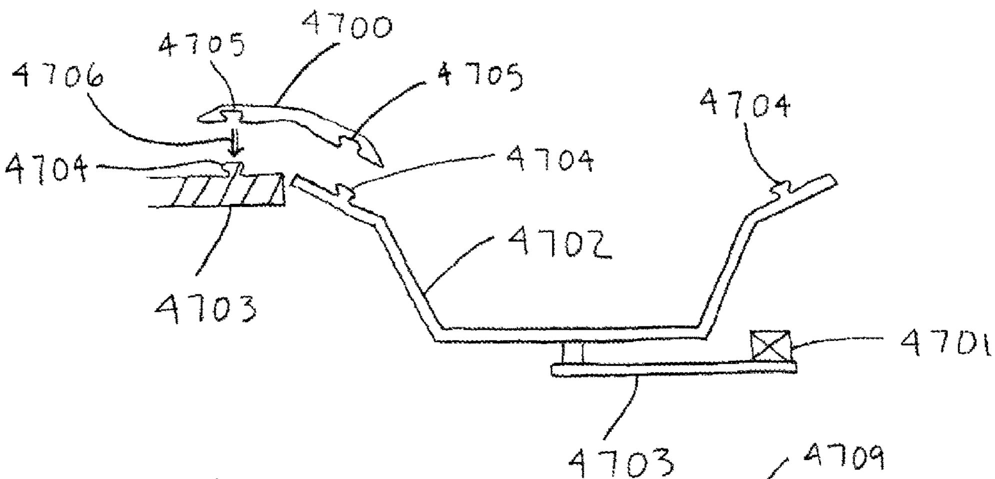
FIG. 47A is a side section view of a portion of an embodiment including a watertight seal that doesn't hinder a load cell.

FIG. 47A is a side section view of a portion of an embodiment including a watertight seal 4700 that doesn't hinder a load cell 4701. The watertight seal 4700 may be polyurethane laminate (PUL) fabric or silicone rubber. A dining plate mating structure 4702 is attached to a cantilever 4703 that is attached to the load cell 4701 for sensing weight. The dining plate mating structure 4702 may be translucent. The dining plate mating structure 4702 is positioned to be surrounded by the rim 4703 of an opening in a housing structure. There may be discrete nubs 4704, or a raised rail, positioned around the periphery of the dining plate mating structure 4702 and also the rim 4703. The watertight seal 4700 may have discrete cavities 4705 that snap over 4706 the nubs 4704, or the watertight seal 4700 may have a channel that mates with and snaps onto the raised rails.

Figure 47B:
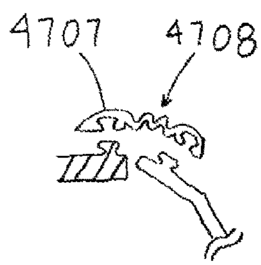
FIGS. 47B-47C are side section views of alternate watertight seals for the embodiment of FIG. 47A that don't hinder a load cell.

FIG. 47B is a side section view of an alternate watertight seal 4707 for the embodiment of FIG. 47A. The watertight seal 4707 of FIG. 47B has a bellows shape 4708 that doesn't hinder a load cell.

Figure 47C:
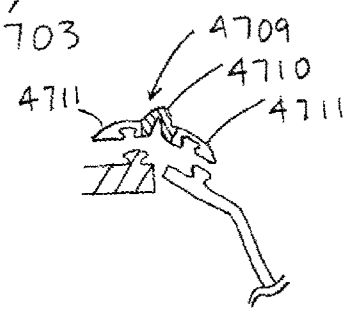

FIG. 47C is a side section view of an alternate watertight seal 4709 for the embodiment of FIG. 47A. The watertight seal 4709 of FIG. 47C has a single ridge bellows shape 4710 that doesn't hinder a load cell. The ridge bellows shape 4710 in the middle portion of the watertight seal 4709 (shown crosshatched) may be polyurethane laminate (PUL) material, and the portions with cavities 4711 or mating channels on the ends of the watertight seal 4709 may be silicone rubber.

Figure 47D:
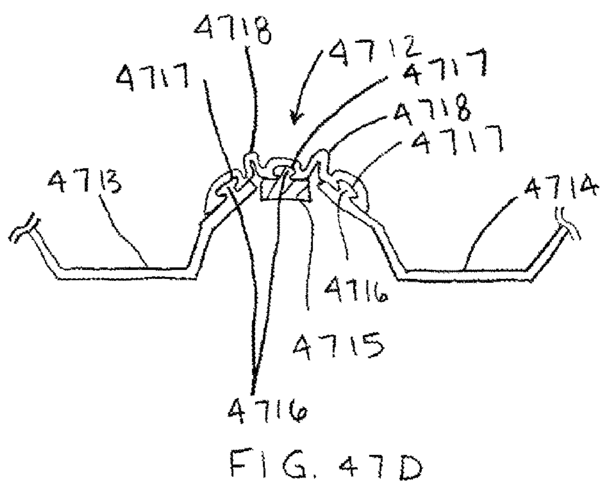
FIGS. 47D-47E and 47G are side section views of a portion of an embodiment including a watertight seal that doesn't hinder multiple load cells.

FIG. 47D is a side section view of a portion of an embodiment including a watertight seal 4712 that doesn't hinder multiple load cells. Portions of two dining plate mating structures 4713, 4714 are provided, each attached to a cantilever that is attached to the load cell for sensing weight. The two dining plate mating structures 4713, 4714 are positioned on opposite sides of a rim 4715 separating two openings in a housing structure. There may be discrete nubs 4716 (also referred to as protrusions) or a raised rail, positioned around the periphery of the dining plate mating structures 4713, 4714 and also the rim 4715. The watertight seal 4712 may have discrete cavities 4717 that snap over the nubs 4716, or the watertight seal 4712 may have a channel that mates with and snaps onto the raised rails. Each bellows 4718 of the watertight seal 4712 may have single-ridge bellows or multi-ridge bellows. The watertight seal 4712 may be polyurethane laminate (PUL) fabric, silicone rubber, or a combination, where, similar to the bellows 4710 of FIG. 47C, just the ridge portion is PUL fabric, and the portions that "snap" onto the nubs are silicone rubber.

Figure 47E:
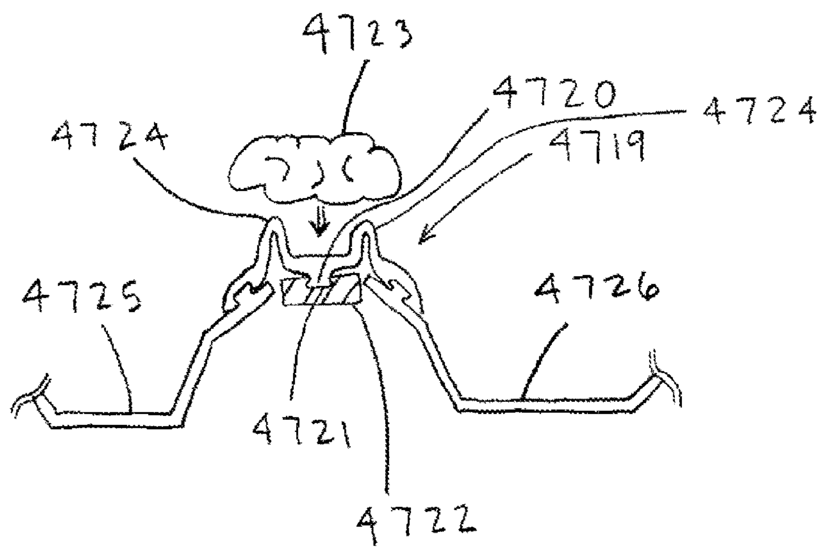

FIG. 47E is a side section view of a portion of an embodiment similar to the portion of the embodiment of FIG. 47D. In contrast to the embodiment of FIG. 47D, the embodiment of FIG. 47E provides a watertight seal 4719 with a nub (or ridge) 4720 for snapping into a cavity (or channel) 4721 in the rim 4722. The rim 4722 is also called the "middle piece." This configuration provides a lower profile over the rim 4722 as compared to FIG. 47D. If food 4723 falls onto the watertight seal 4719, the bellows 4724 will collapse and be supported by the rim 4722 without applying force to the dining plate mating structures 4725, 4726.

Figure 47F:
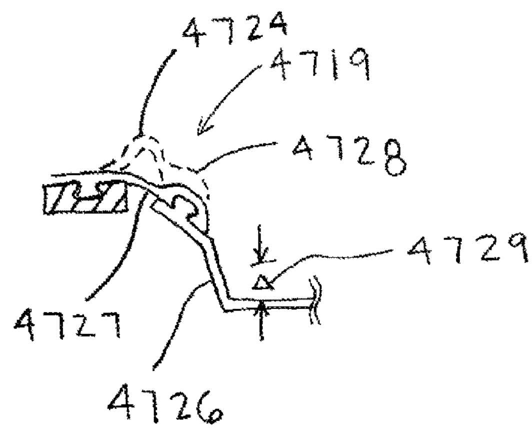
FIG. 47F is a side section view of a portion of the watertight seal of the embodiment of FIG. 47E.

FIG. 47F is a side section view of a portion of the watertight seal 4719 of the embodiment of FIG. 47E. In the embodiment of FIG. 47F, the bellows 4724 of the watertight seal 4719 is not very tall. The height of the bellows 4724 is just tall enough that when the dining plate mating structure 4726 is sensing maximum weight, and is against a limit stop, the bellows 4724 is straight 4727. The dashed line provides an initial position 4728 of the bellows 4724 when the dining plate mating structure 4726 does not have any weight on it, and the solid line provides the extended position 4727 of the bellows 4724 when the dining plate mating structure 4726 is holding the maximum weight, and is deflected down by "delta" 4729.

Figure 47G:
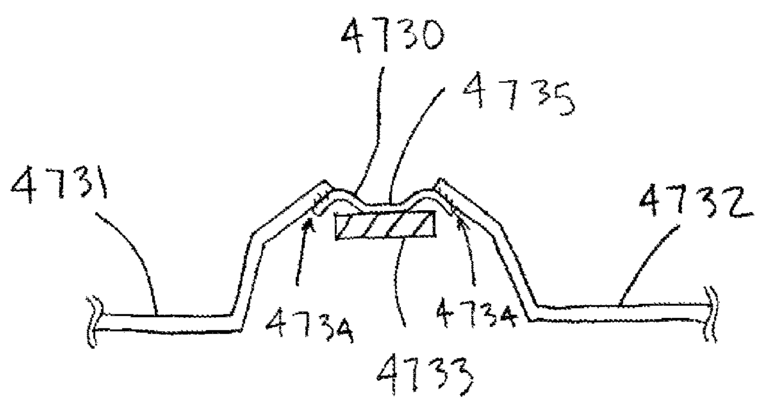

FIG. 47G is a side section view of a portion of an embodiment including a watertight seal 4730 that doesn't hinder multiple load cells. Portions of two dining plate mating structures 4731, 4732 are provided, each attached to a cantilever that is attached to the load cell for sensing weight. The two dining plate mating structures 4731, 4732 are positioned on opposite sides of a rim 4733 separating two openings in a housing structure. The two dining plate mating structures 4731, 4732 may be white and translucent. The watertight seal 4730 may be polyurethane laminate (PUL) fabric. The edges of the watertight seal 4730 are adhered 4734 to the edges of the two dining plate mating structures 4731, 4732, and the middle portion 4735 of the watertight seal 4730 is allowed just to droop over the rim 4733.

Figure 48A:
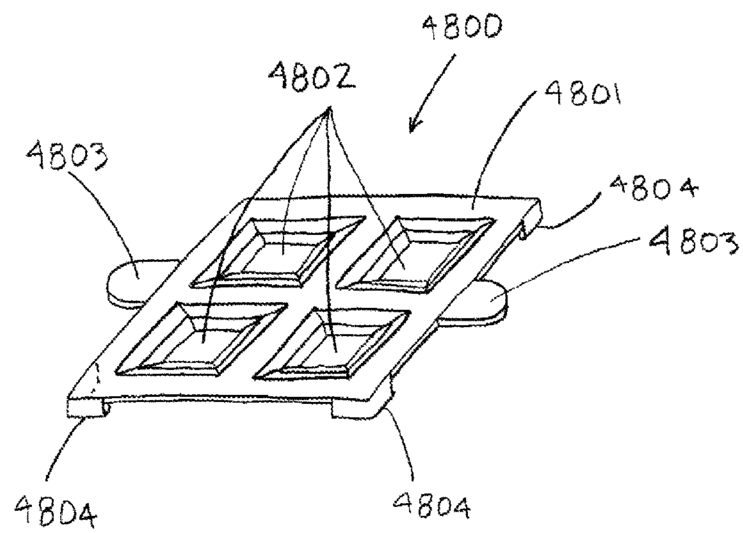
FIG. 48A is a perspective view of a carry tray.
Figure 48B:
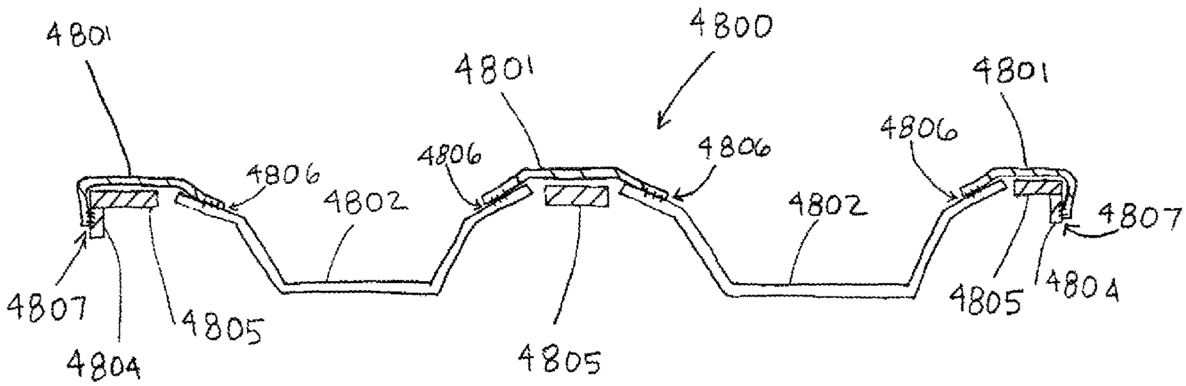
FIG. 48B is a side cross-section view of the carry tray.

FIG. 48A is a perspective view of a carry tray 4800, and FIG. 48B is a side cross-section view of the carry tray 4800. The carry tray 4800 has polyurethane laminate (PUL) material 4801 fastened to four dining plate mating structures 4802. The carry tray 4800 is for sitting on an active foodware system for sensing weight of food (also referred to as a DataPlate™). The carry tray 4800 has carrying handles 4803, also referred to carrying tabs. The carry tray 4800 may have positioning structure 4804. The PUL material 4801 may be white or blue PUL fabric; and covers over structure 4805 that may be blue acrylic plastic structure; and is attached 4806 to dining plate mating structures 4802 that may be clear. The PUL material 4801 may attach 4807 to a portion of the carry tray 4800, such as the positioning structure 4804. Attachment may be by gluing.

FIG. 49A is a side section view of a portion of an embodiment of a waterproof fabric 4900 extending from a dining plate mating structure 4901 to a surrounding rim 4902 of a housing structure. The waterproof fabric 4900 may be white or blue, and the rim 4902 may be blue. One edge 4903 of the waterproof fabric 4900 is held in a gap 4908 and against the dining plate mating structure 4901 by a bracket 4904, and the other edge 4905 of the waterproof fabric 4900 is held against the rim 4902 by a bracket 4906, which may be screwed into the rim 4902 with a screw 4907. Glue 4908 may be used to seal both brackets 4906, 4907. If the screw 4907 is used, the whole assembly of the waterproof fabric 4900 and dining plate mating structure 4901 may be replaceable.

FIG. 49B is a plan view of a portion of the embodiment of FIG. 49A, including the dining plate mating structure 4901 and the bracket 4904. The waterproof fabric 4900 is not provided so the small gap 4908 where the waterproof fabric 4900 goes is visible.

FIG. 49C is a plan view of four pieces 4909 of a pattern for making the waterproof fabric 4900 of FIG. 49A. Each of the pattern pieces 4909 is folded along the dashed lines 4910, 4911 and then all four pattern pieces 4909 are joined according to the arrows 4912, 4913, 4914. Joining may include sewing and heat sealing. When the four pattern pieces 4909 are joined, the waterproof fabric 4900 has a U-shaped cross-section 4915 as provided by the side cross-section view of FIG. 49H.

Figure 49D:
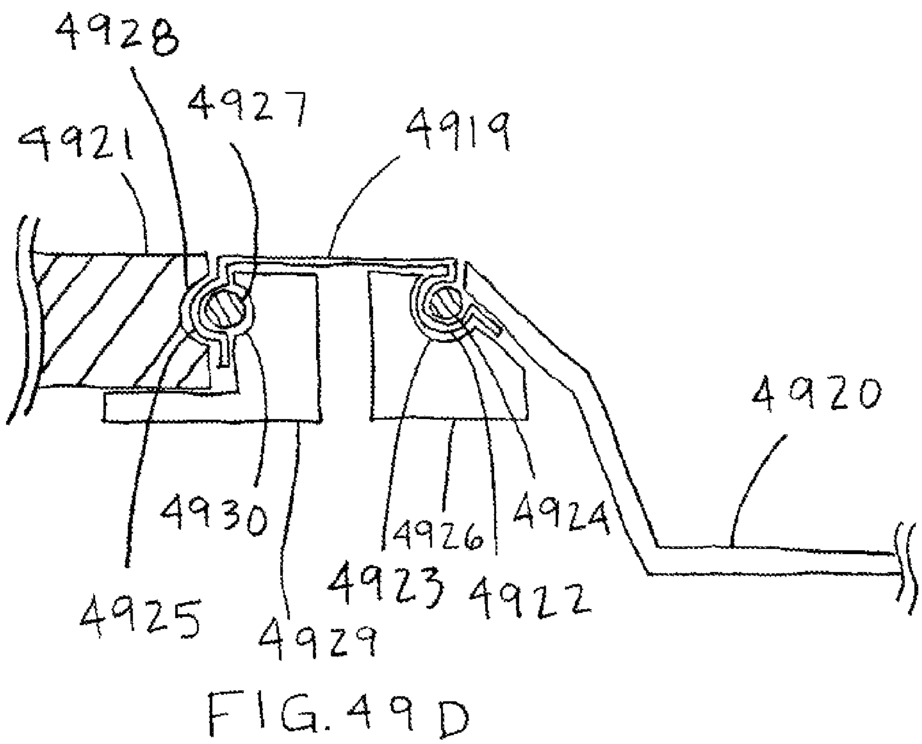
FIGS. 49D-49E are side section views of portions of alternatives to the embodiment of FIG. 49A.

FIG. 49D is a side section view of a portion of an alternative to the embodiment of FIG. 49A. FIG. 49D provides a waterproof fabric 4919 extending from a dining plate mating structure 4920 to a surrounding rim 4921 of a housing structure. The waterproof fabric 4919 may be white or blue, and the rim 4921 may be plastic, such as blue acrylic. To provide a waterproof seal, one edge 4922 of the waterproof fabric 4919 is held in a circular channel 4923 by a silicone rubber string 4924 or wire, or a rubber O-ring. Typically four pieces of the silicone rubber string 4924 are used so a single piece doesn't need to make a sharp 90-degree bend in the corners, such as one of the four corners of the gap 4908 of FIG. 49G. The edge 4922 of the waterproof fabric 4919 and the silicone rubber string 4924 are held against the dining plate mating structure 4920 by a bracket 4926. The other edge 4925 of the waterproof fabric 4919 and another silicone rubber string 4927 or wire, or a rubber O-ring, are held in a circular channel 4928 of the rim 4921 by a bracket 4929 having a circular channel 4930 for holding the silicone rubber string 4927. The dining plate mating structure 4920 may be a white translucent plastic dish, such as PTFE.

Figure 49E:
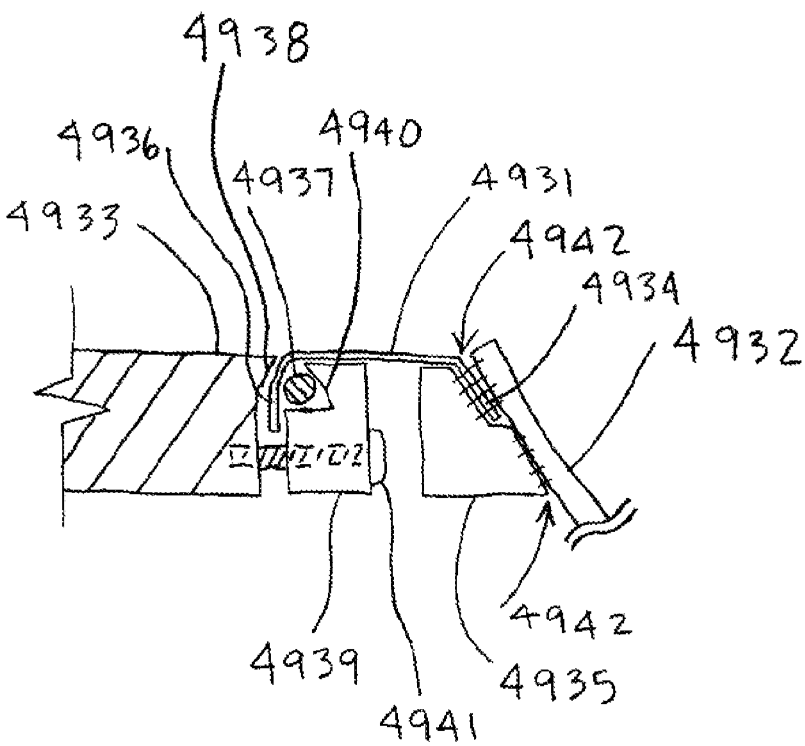

FIG. 49E is a side section view of a portion of an alternative to the embodiment of FIG. 49A. FIG. 49E provides a waterproof fabric 4931 extending from a dining plate mating structure 4932 to a surrounding rim 4933 of a housing structure. To provide a waterproof seal, one edge 4934 of the waterproof fabric 4931 is held against the dining plate mating structure 4932 by a bracket 4935. The pieces may be glued 4942 to seal. The other edge 4936 of the waterproof fabric 4931 and a silicone rubber string 4937 are held by a sloped face 4938 of the rim 4933 and by a bracket 4939 having a "V" channel 4940 for holding the silicone rubber string 4937. A screw 4941 is used to screw in the bracket 4939 to the rim 4933 to removably seal the whole assembly of the waterproof fabric 4931 and dining plate mating structure 4932.

FIG. 49F is a side section view of an alternative bracket 4916 for the bracket 4906 of FIG. 49A. The bracket 4916 has an angle down 4917 to accommodate sloping fabric 4900 when the dining plate mating structure 4901 deflects down under weight of food.

FIG. 49G is a side section view of just the bracket 4904 of the embodiment of FIG. 49A. The bracket 4904 provides a sloped face 4918 that matches the slope of the dining plate mating structure 4901.

Figure 50A:
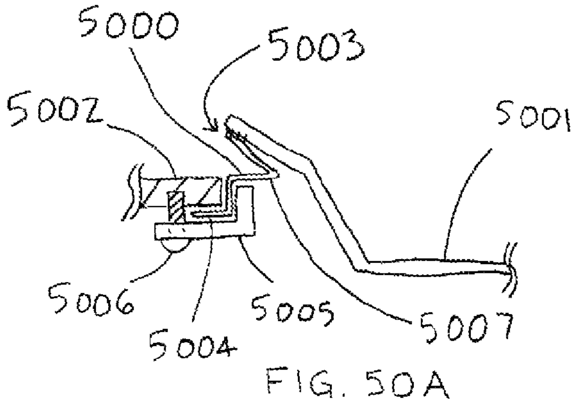
FIGS. 50A-50G are side section views of portions of embodiments of a waterproof fabric for providing a flexible seal and extending from a dining plate mating structure to a surrounding rim of a housing structure.

FIG. 50A is a side section view of a portion of an embodiment of a waterproof fabric 5000 for providing a flexible seal and extending from a dining plate mating structure 5001 to a surrounding rim 5002 of a housing structure. The waterproof fabric 5000 may be waterproof fabric or silicone rubber. One edge of the waterproof fabric 5000 is fastened 5003 to the dining plate mating structure 5001, such as by glue, and the other edge 5004 of the waterproof fabric 5000 is held against the rim 5002 by a bracket 5005, which may be screwed into the rim 5002 with a screw 5006. As provided by FIG. 50A, the waterproof fabric 5000 has extra material in the form of a fold 5007.

Figure 50B:
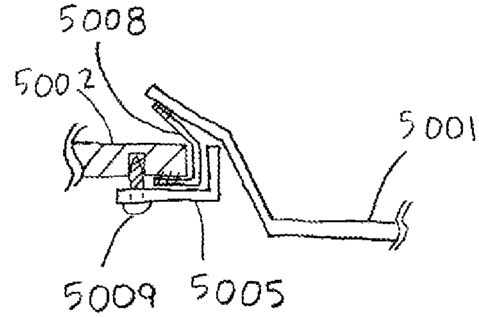

FIG. 50B is a side section view of an alternate embodiment of FIG. 50A. In FIG. 50B, the waterproof fabric 5008 does not have the fold 5007 of FIG. 50A, the screw 5009 is a self-tapping screw, such as a sheet metal screw, and the bracket 5005 of FIG. 50A is a metal bracket.

Figure 50C:
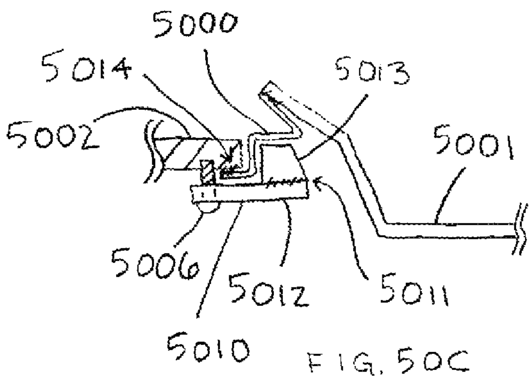

FIG. 50C is a side section view of an alternate embodiment of FIG. 50A. A bracket 5010 may be created by gluing 5011 together plastic pieces 5012, 5013. In FIG. 50C, the waterproof fabric 5000 has double-stick tape 5014 to hold it to the rim 5002 until the bracket 5010 is fastened by the screw 5006.

Figure 50D:
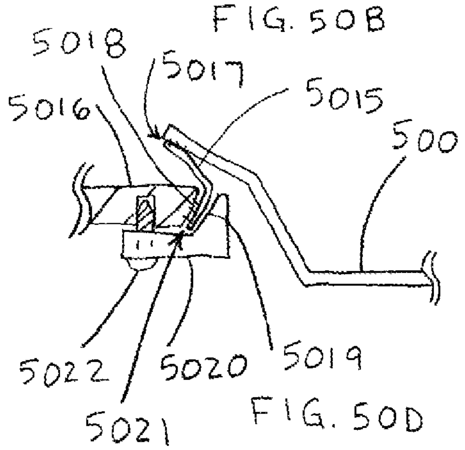

FIG. 50D is a side section view of an alternate embodiment of FIG. 50A. FIG. 50D is a side section view of a portion of an embodiment of a waterproof fabric 5015 for providing a flexible seal and extending from a dining plate mating structure 5001 to a surrounding rim 5016 of a housing structure. One edge of the waterproof fabric 5015 is fastened 5017 to the dining plate mating structure 5001, such as by glue. The other edge of the waterproof fabric 5015 is held against a slanted portion 5018 of the rim 5016 by the mating slanted portion 5019 of a bracket 5020. The waterproof fabric 5015 has double-stick tape 5021 to hold it to the slanted portion 5018 until the bracket 5020 is fastened by the screw 5022.

Figure 50E:
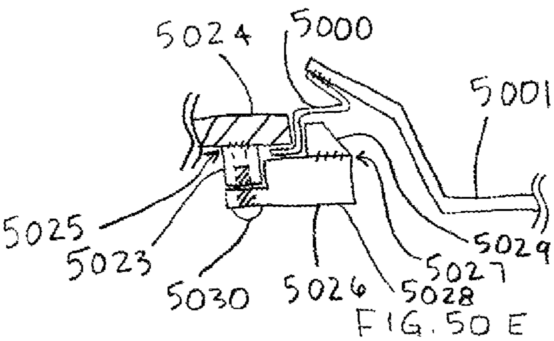

FIG. 50E is a side section view of an alternate embodiment of FIG. 50C. As provided by FIG. 50E, a screw boss 5023 may be added to the rim 5024 of a housing structure, such as by gluing 5025. A taller bracket 5026 may be created by gluing 5027 together plastic pieces 5028, 5029, and fastened to the screw boss 5023 by the screw 5030.

Figure 50F:
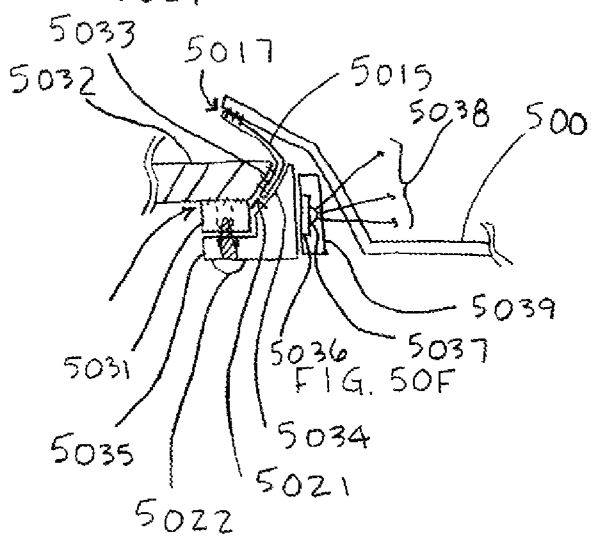

FIG. 50F is a side section view of an alternate embodiment of FIG. 50D, and including a screw boss 5031 similar to the screw boss 5023 of FIG. 50E. FIG. 50F is a side section view of a portion of an embodiment of a waterproof fabric 5015 for providing a flexible seal and extending from a dining plate mating structure 5001 to a surrounding rim 5032 of a housing structure. One edge of the waterproof fabric 5015 is fastened 5017 to the dining plate mating structure 5001, such as by glue. The other edge of the waterproof fabric 5015 is held against a slanted portion 5033 of the rim 5032 by the mating slanted portion 5034 of a bracket 5035. The waterproof fabric 5015 has double-stick tape 5021 to hold it to the slanted portion 5033 until the bracket 5035 clamps the waterproof fabric 5015 by the screw 5022. An LED strip 5036 has an LED 5037 emitting light 5038 through the dining plate mating structure 5001. The LED strip 5036 has a casing 5039 or sheath that may be silicone rubber.

Figure 50G:
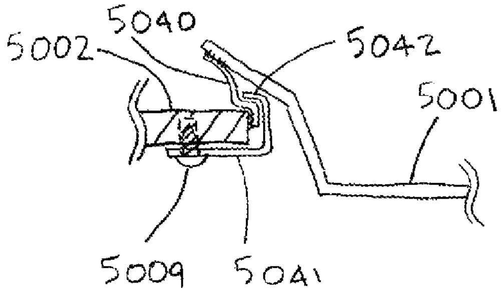

FIG. 50G is a side section view of an alternate embodiment of FIG. 50B. In FIG. 50G, the waterproof fabric 5040 is held against the rim 5002 by a bracket 5041 screwed into the rim 5002 with a screw 5006. The bracket 5041 has a clip portion 5042, which may be metal, for securing the waterproof fabric 5040.

Figure 51A:
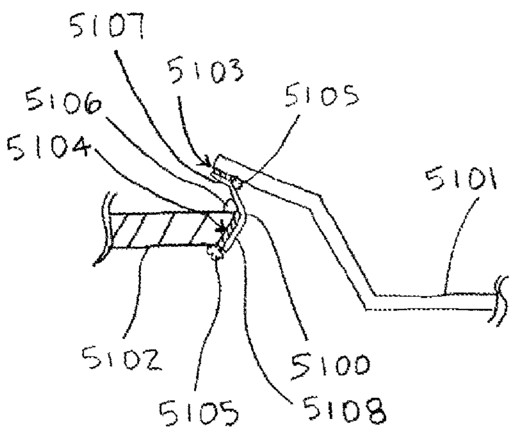
FIG. 51A is a side section view of a portion of an embodiment of a waterproof fabric for providing a flexible seal and extending from a dining plate mating structure to a surrounding rim of a housing structure.

FIG. 51A is a side section view of a portion of an embodiment of a waterproof fabric 5100 for providing a flexible seal and extending from a dining plate mating structure 5101 to a surrounding rim 5102 of a housing structure. The waterproof fabric 5100 may be polyurethane laminate (PUL). One end 5107 of the waterproof fabric 5100 is fastened 5103 to the dining plate mating structure 5101, and the other end 5108 of the waterproof fabric 5100 is fastened 5104 to the rim 5102, where the fastening may include double-stick tape. A bead of glue 5105, such as acrylic glue or Devcon® adhesive may be used. To further seal, a bead 5106 of silicon rubber, polyurethane, or acrylic glue or cement maybe be used.

Figure 51C:
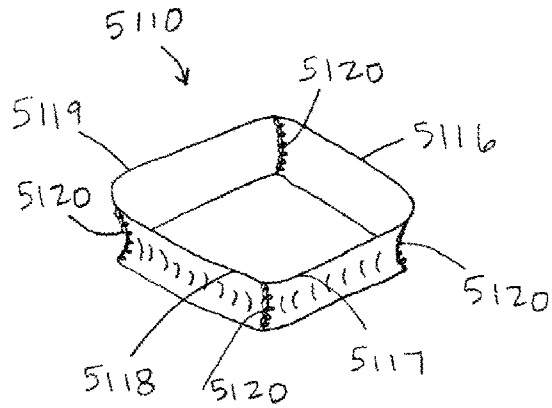
FIGS. 51B-51C are perspective views of waterproof fabric structures. Plan views of exemplary patterns, which each may be used for the four pieces of waterproof fabric structure of FIG. 51B, are provided in FIGS. 51D-51E. A plan view of an exemplary pattern, which may be used for the four pieces of waterproof fabric structure of FIG. 51C, is provided in FIG. 51F.
Figure 51B:
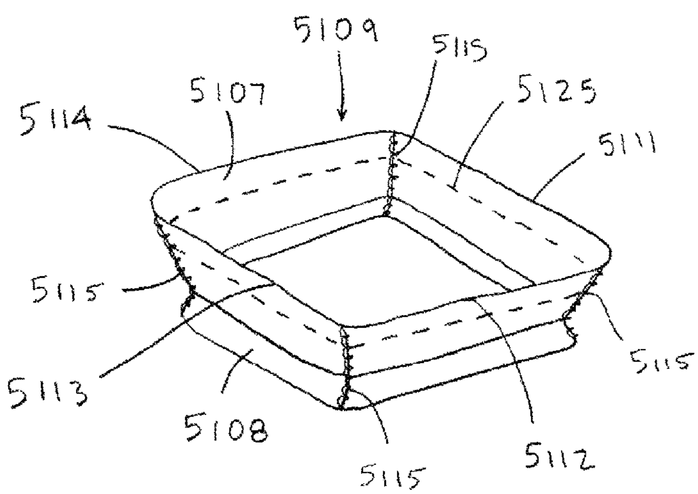
Figure 51D:
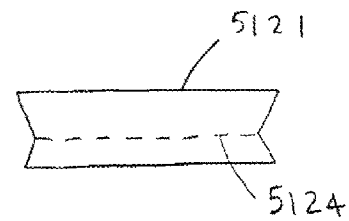
Figure 51E:
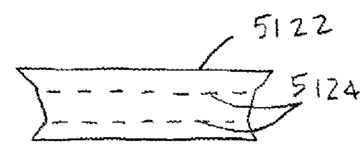

FIG. 51B is a perspective view of a waterproof fabric structure 5109. A side cross-section view of a portion of the waterproof fabric structure 5109 of FIG. 51B is provided in FIG. 51A as waterproof fabric 5100. The waterproof fabric structure 5109 of FIG. 51B may be assembled from four pieces 5111, 5112, 5113, 5114 of waterproof fabric sewn together by corner seams 5115. The corner seams 5115 may be microwaved to seal. Plan views of exemplary patterns 5121, 5122, which each may be used for the four pieces of waterproof fabric structure 5109 of FIG. 51B, are provided in FIGS. 51D-51E. In FIGS. 51D-51E, dashes 5124 indicate fold lines. The waterproof fabric structure 5109 of FIG. 51B may be assembled from four pieces of the pattern 5121 of FIG. 51D, or from four pieces of the pattern 5122 of FIG. 51E. When the waterproof fabric structure 5109, FIG. 51B is assembled from four pieces of the pattern 5122 of FIG. 51E, the waterproof fabric structure 5109 of FIG. 51B has the fold line 5125.

Figure 51F:
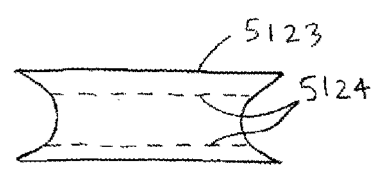

FIG. 51C is a perspective view of a waterproof fabric structure 5110. A side cross-section view of a portion of the waterproof fabric structure 5110 of FIG. 51C is provided in FIG. 51A as waterproof fabric 5100. The waterproof fabric structures 5110 of FIG. 51C may be assembled from four pieces 5116, 5117, 5118, 5119 of waterproof fabric sewn together by corner seams 5120. The corner seams 5120 may be microwaved to seal. A plan view of an exemplary pattern 5123, which may be used for the four pieces of waterproof fabric structure 5110 of FIG. 51C, is provided in FIG. 51F. In FIG. 51F, dashes 5124 indicate fold lines. The waterproof fabric structure 5110 of FIG. 51C may be assembled from four pieces of the pattern 5123 of FIG. 51F.

FIG. 52A is a plan view of a pattern 5200 for making 16 stiffeners 5201-5216 for a square bellows 5217 (see also FIGS. 52B-52D). The set of 16 stiffeners 5201-5216 are adhered to polyurethane laminate (PUL) fabric forming the hinges of the square bellows 5217. A property of PUL fabric is that it is flexible and repels water. The dashed box is a pattern 5218 for the PUL fabric. Each side of four sides of the square bellows 5217 has a set of four stiffeners 5201-5204, 5205-5208, 5209-5212, 5213-5216, with each set of four stiffeners 5201-5204, 5205-5208, 5209-5212, 5213-5216 stacked vertically and connected by three PUL-fabric hinges. Each stiffener 5201-5216 may be approximately ⅛" tall. Due to the angled ends 5218 of each stiffener 5201-5216, each corner of the square bellows 5217 has a zig-zag shape. The right and left ends of the PUL fabric for the pattern 5218 may be butted next to each other and adhered together using stiffeners that overlap the butted ends and have adhesive backing, to create a loop of PUL fabric. The butted joint may be microwaved heated to seal the PUL fabric ends to each other. Alternatively, the right and left ends of the PUL fabric may be sewn together first, such as with nylon thread and using a straight or zig-zag seam. The adhesive-backed stiffeners may then be adhered over the PUL fabric. Alternatively, the right 5219 and left 5220 ends of the PUL fabric may be butted next to each other and joined using single-sided tape 5221, such as provided by FIGS. 52F and 52G. After the ends 5219, 5220 of the PUL are butted and taped, the PUL may be microwaved to melt and seal the butted joint, and then the tape 5221 removed. Alternatively, the ends of the PUL fabric may be overlapped and joined using double-sided tape, which may be permanent Scotch® tape. Alternatively, the ends of the PUL fabric may be joined together with a heat sealer. Alternatively, the ends of the PUL fabric may be joined together with polyurethane glue to seal.

The stiffeners 5201-5216 may be made from plastic, such as Mylar. One way to fabricate the stiffeners 5201-5216 is to copy (such as by photocopying) the pattern 5200 onto clear, adhesive-back plastic. Then, each of the 16 stiffeners 5201-5216 may be cut from the plastic and stuck to the textile side (i.e., not the polyurethane side) of the PUL fabric, leaving approximately a 2 mm gap between each stiffener 5201-5216 to allow for folding, and then the PUL fabric may be folded along the gaps to provide a bellows shape. As discussed above, the stiffeners 5201-5216, having adhesive backing, may be used to join the right and left ends of the PUL fabric. As provided by the positioning of the right-most end 5222 of the dashed pattern outline 5218 of the PUL fabric relative to the stiffener pattern 5200, when the stiffeners 5201-5216 are adhered to the PUL fabric, the right-most end 5219 of the PUL fabric (corresponding to the right-most end 5222 of the pattern outline 5218) may be shifted horizontally to align with the middle portion of the stiffeners 5213-5216, to minimize interference to bending of the seam joining the right-most 5219 and left-most 5220 ends of the PUL fabric (corresponding to the right-most 5222 and left-most 5223 ends of the pattern outline 5218; see also FIG. 52E).

FIG. 52B is a side section view of a portion of the square bellows 5217 of FIG. 52A for providing a flexible seal and extending from a dining plate mating structure 5224 to a surrounding rim 5225 of a housing structure. As provided in FIG. 52B, the bellows 5217 has four panels 5226-5229 connected by three hinges 5230-5232. The top stiffener panel 5226 of the bellows 5217 is attached to the dining plate mating structure 5224, and the bottom stiffener panel 5229 of the bellows 5217 is attached to the top 5233 of the rim 5225. Attachment may be by gluing. Trim 5234 may cover the edge 5235 of the PUL fabric on the bottom panel 5229 of the bellows 5217. Beads 5236 of polyurethane may further seal.

FIG. 52C is a side section view of an alternate embodiment of FIG. 52B. In FIG. 52C, the bottom stiffener panel 5229 of the bellows 5217 is attached to the side 5237 of the rim 5225. Attachment may be by gluing. Beads 5238 of polyurethane may further seal.

FIG. 52D is a side section view of aspects of the embodiment of FIG. 52B combined with the embodiment of FIG. 52C. The combination is only for illustration purposes, since the bottom stiffener panel 5229 of the bellows 5217 would not be simultaneously attached to the top 5233 and to the side 5237 of the rim 5225. Beads of polyurethane may further seal.

FIG. 52E is a plan view of a portion of the bellows 5217 where two adhesive-backed stiffeners 5239, 5240 overlap to join the right 5219 and left 5220 ends of the PUL fabric along the vertical line 5241. The dashed lines 5242 indicate where the PUL fabric may bend around the stiffeners 5239, 5240 (and in general, around all the stiffeners 5201-5216 of FIG. 52A) to allow the bellows 5217 to flex when the dining plate mating structure 5224 is under load.

FIG. 52F is a side section view, and FIG. 52G is a plan view, of right 5219 and left 5220 ends of PUL fabric butted next to each other and joined using single-sided tape 5221, creating a PUL fabric loop. After the ends 5219, 5220 of the PUL are butted and taped, the PUL may be microwaved to melt and seal the butted joint, and then the tape 5221 removed.

FIG. 53A is a plan view of 6 stiffeners 5301-5306 for each of the four sides of a square bellows 5300 (see also FIG. 53B). The four stiffeners 5301-5304, as well as the two optional stiffeners 5305-5306, are attached to each of the four sides of polyurethane laminate (PUL) fabric 5307 in the relative placements shown. The small spaces 5308 between the placements of each stiffener form the folding hinges 5309 of the resulting square bellows 5300. When positioning the four stiffeners 5301-5304 on each of the four sides of PUL fabric 5307, the left dashed line 5329 is aligned with a left edge of each side of the PUL fabric 5307, and the right dashed line 5330 is aligned with each right edge of the side of the PUL fabric 5307.

FIG. 53B is a side section view of the square bellows 5300, where, in order to create a watertight seal, the top 5310 of the bellows 5300 is attached 5311 around a dining plate mating structure 5312, and the bottom 5313 of the bellows 5300 is attached 5314 around the rim 5315 of an opening 5316 in a housing structure. The shapes of the four stiffeners 5301-5304, and the two optional stiffeners 5305-5306, determine the shape of the square bellows 5300 when it extends and collapses. The angled ends 5328 of the stiffeners 5301-5306 are such that the folding hinges 5309 between the stiffeners 5301-5304 extend under the dining plate mating structure 5312, rather than a folding hinge on one side of the square bellows 5300 extending under the edge of the dining plate mating structure 5312, and a folding hinge on either of the neighboring sides of the square bellows 5300 extending out away from the dining plate mating structure 5312.

Typically, the portion of the square bellows 5310 with the stiffener 5302 folds inward toward the dining plate mating structure 5312. The stiffener 5302 may be ⅛" tall. Typically, the left angled end 5328 of the stiffener 5301 is angled 45 degrees inward at the bottom, and the right angled end 5328 is angled 45 degrees inward at the top. Typically, the left angled end 5328 of the stiffener 5302 is angled 30 degrees inward at the bottom, and the right angled end 5328 is angled 45 degrees inward at the top. Typically, the left angled end 5328 of the stiffener 5303 is angled 20 degrees inward at the top, and the right angled end 5328 is angled 30 degrees inward at the bottom.

The 45-degree angle 5317 on the side 5318 of the two optional stiffeners 5305-5306 allows the extra material, which may be stiffened by the two optional stiffeners 5305-5306, to fold 5319, and so a portion 5320 puckers out, extending out away from the dining plate mating structure 5312. Typically the portion of the square bellows 5310 with the next stiffener down 5302 folds inward toward the dining plate mating structure 5312; and the bottom portion of the square bellows 5310 with the lower stiffener 5304 is attached to the inside FIG. 53C is a plan view of a pattern 5321 for the material of four sides 5322 of a pyramid-frustum bellows. A pyramid-frustum bellows is a square bellows that has a larger opening at the top than at the bottom. The pyramid-frustum bellows may be polyurethane laminate (PUL) fabric. Each side 5322 of the pattern 5321 is tilted by an angle theta (θ) 5324 relative to the adjacent sides 5325, so when the far left 5326 and right 5327 edges of the pattern 5321 are joined, the four sides 5322 of the pyramid-frustum bellows each tilt out by theta 5324, and so the pyramid-frustum bellows has a larger opening at the top than at the bottom. For the case where the outer edge 5323 of the top rim of a dining plate mating structure 5312 extends out radially wider than the rim 5315 of an opening in a housing structure (such as in FIG. 53B), the larger opening at the top of the pyramid-frustum bellows may attach to the outer edge 5323 of the top rim, and the smaller opening at the bottom of the pyramid-frustum bellows may attach flush to the rim 5315 of the opening in the housing structure.

Figure 54A:
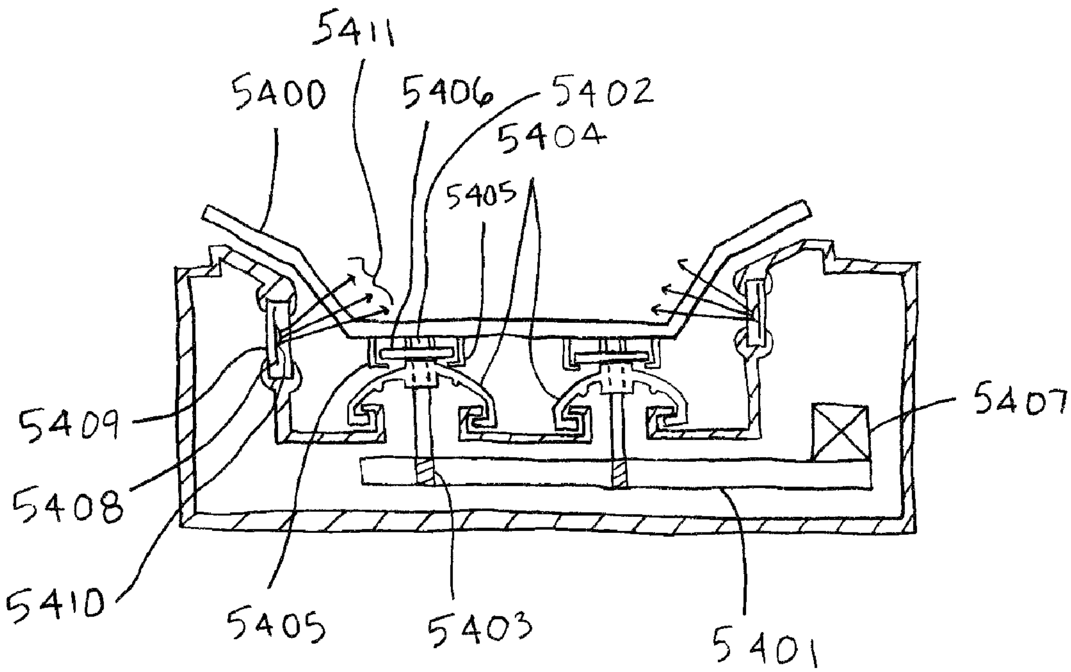
FIG. 54A is a side section view of a portion of an embodiment of an active foodware system including a silicone rubber diaphragm for a watertight seal.

FIG. 54A is a side section view of a portion of an embodiment of an active foodware system similar in some aspects to the embodiment of FIG. 15A; however, the embodiment of FIG. 54A, includes a silicone rubber diaphragm 5404 for a watertight seal. A dining plate mating structure 5400 is clipped by clips 5405 to washers 5406 between the diaphragm and the heads 5402 of screws 5403 screwed into the cantilever beam 5401. The clips 5405 keep the dining plate mating structure 5400 (also known as a "receptacle dish") from rocking during dining. A load cell 5407 is attached to the cantilever beam 5401. As provided in FIG. 54A, LED strips 5408 inside an LED housing 5409 have LEDs 5410 emitting light 5411 through the LED housing 5409 and through the dining plate mating structure 5400.

Figure 54B:
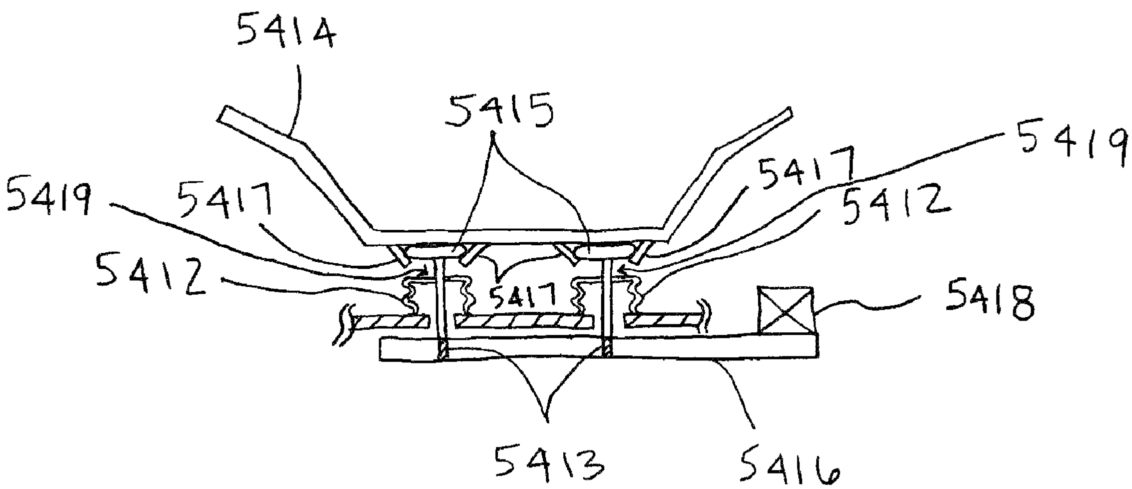
FIG. 54B is a side section view of a portion of an embodiment of an active foodware system including a bellows sealed to a wafer-head bolt for a watertight seal.

FIG. 54B is a side section view of a portion of an embodiment of an active foodware system similar in some aspects to the embodiment of FIG. 15A; however, the embodiment of FIG. 54B, includes a bellows 5412 sealed 5419 to a wafer-head bolt 5413 for a watertight seal. Similar to the embodiment of FIG. 15A, the dining plate mating structure 5414 is easily removably snapped to the heads 5415 of the wafer-head bolts 5413 screwed into the cantilever beam 5416. Clips 5417 on the dining plate mating structure 5414 removably snap to the bolt heads 5415, to permit the dining plate mating structure 5414 to be easily removed for cleaning and to remove food which is able to get under the dining plate mating structure 5414. A load cell 5418 is attached to the cantilever beam 5416.

When compressed, the bellows 5412 produces a resistive force to the compression, Fc, governed by Hook's Law: $Fc=k*x$, where k is the spring constant of the bellows, and x is amount of compression. If the weight of contents on the dining plate mating structure is W, then the total force sensed by the load cell is: $Fs=W-k*x$.

Figure 54C:
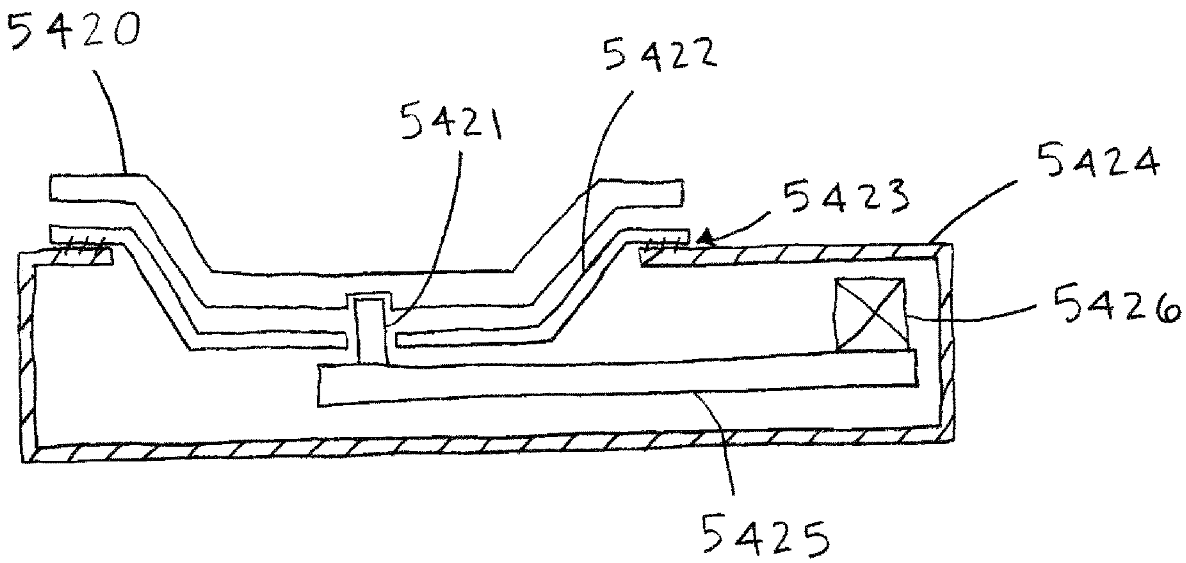
FIG. 54C is a side section view of a portion of an embodiment of an active foodware system where a clear dining plate mating structure plugs onto a nipple attached to a cantilever, and a beam load cell is also attached to the cantilever.

FIG. 54C is a side section view of a portion of an embodiment of an active foodware system. A clear dining plate mating structure 5420 plugs onto a nipple 5421, which may be rubber. A white plate 5422, which is similar in shape to the dining plate mating structure 5420, is permanently attached 5423 watertight to the housing structure 5424. (As provided in other figures, the white plate is typically translucent.) The nipple 5421 is attached to a cantilever 5425, and a beam load cell 5426 is also attached to the cantilever 5425.

Figure 54D:
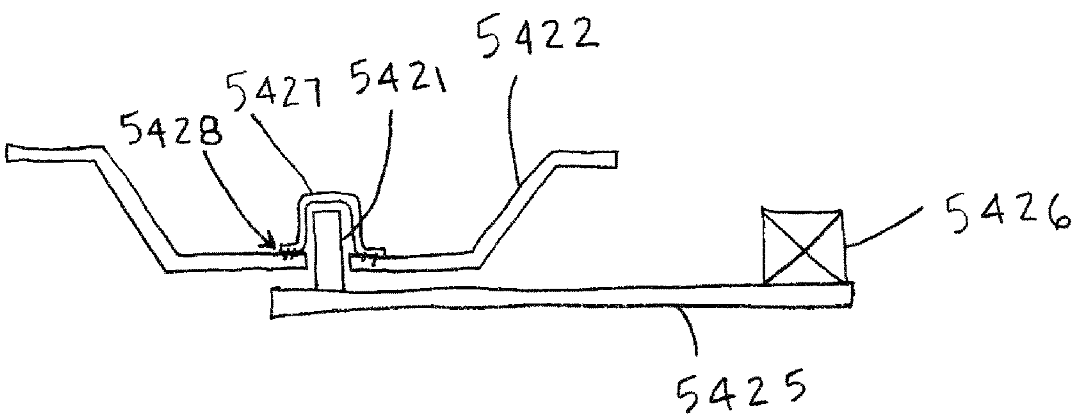
FIG. 54D is a side section view of a portion of a modification to the embodiment of FIG. 54C, where a silicone rubber seal cap is attached over the nipple to provide a watertight seal.

FIG. 54D is a side section view of a portion of a modification to the embodiment of FIG. 54C. A silicone rubber seal cap 5427 is attached 5428 over the nipple 5421 (also called a load-cell protuberance) to provide a watertight seal.

Figure 55A:
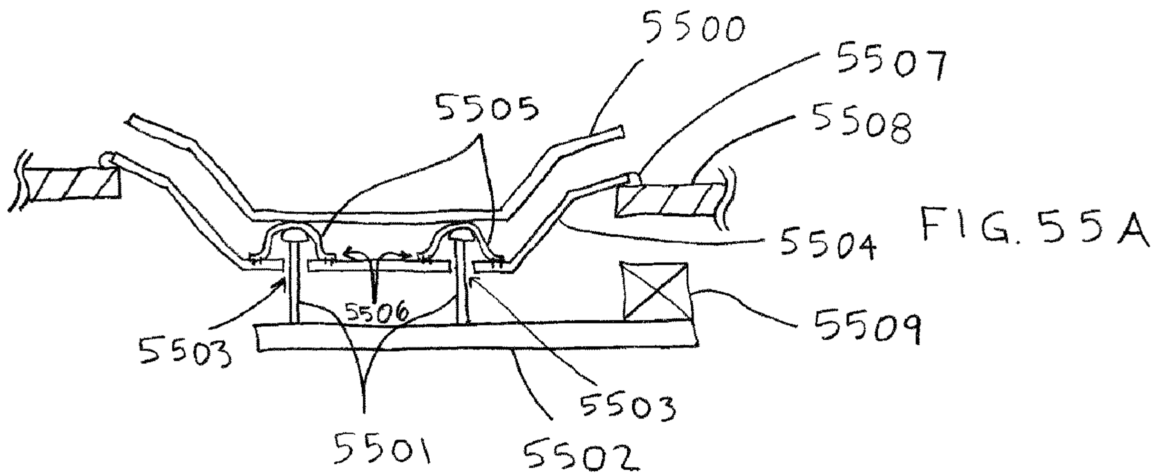
FIG. 55A is a side section view where a dining plate mating structure is on multiple posts that extend from a cantilever and through openings in a white plate.

FIG. 55A is a side section view of a portion of an embodiment of an active foodware system. A dining plate mating structure 5500 is on multiple posts 5501 that extend from a cantilever 5502 and through openings 5503 in a white plate 5504. (As provided in other figures, the white plate is typically translucent.) The posts 5501 are covered with polyurethane laminate (PUL) fabric nipple shapes 5505 that are attached 5506 to the white plate 5504 to provide a watertight seal. The white plate 5504 may be sealed 5507 to a housing structure 5508 with polyurethane. Alternately, the white plate 5504 may have a gasket between it and the housing structure 5508, and a screw to pull the white plate 5504 down against the gasket. Using a screw and gasket permits the white plate 5504 to be removed if desired. A load cell 5509 is attached to the cantilever 5502.

Figure 55B:
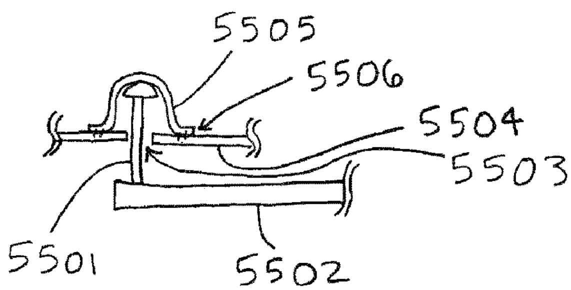
FIG. 55B is a side section close-up view of a portion of the embodiment of FIG. 55A.
Figure 55I:
FIG. 55I is a perspective view of the PUL fabric nipple shape of FIG. 55B.

FIG. 55B is a side section close-up view of a portion of the embodiment of FIG. 55A. FIG. 55I is a perspective view of the PUL fabric nipple shape of FIG. 55B.

Figure 55C:
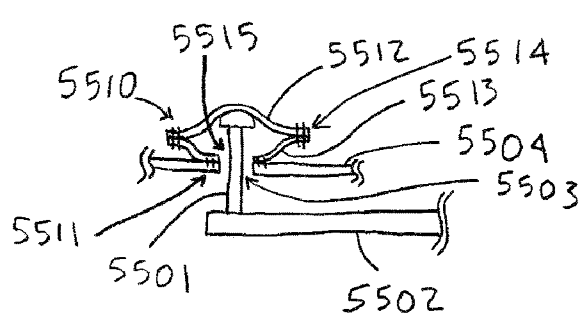
FIG. 55C is a side section close-up view of a portion of a modification to the embodiment of FIG. 55A.

FIG. 55C is a side section close-up view of a portion of a modification to the embodiment of FIG. 55A. Rather than covered with a nipple shape 5505, as in FIG. 55A, a post 5501 is covered with a single bellows 5510 that is attached 5511 to the white plate 5504 to provide a watertight seal. The bellows 5510 is made from a top 5512 and a bottom disc 5513 of polyurethane laminate (PUL) fabric or silicone rubber sewn 5514 or glued together. The bottom disc 5513 of the bellows 5510 has an opening 5515 that the post 5501 passes through.

Figure 55D:
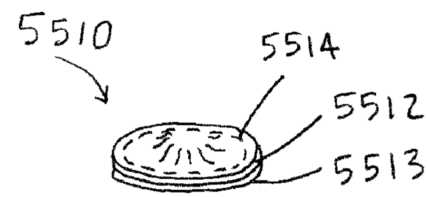
FIG. 55D is a perspective view of the bellows of FIG. 55C.

FIG. 55D is a perspective view of the bellows 5510 of FIG. 55C.

Figure 55E:
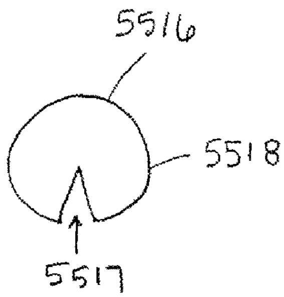
FIG. 55E is a plan view of a flat pattern for making a nipple shape from PUL fabric to make a watertight cover for a post.

FIG. 55E is a plan view of a flat pattern 5516 for making a nipple shape from PUL fabric to make a watertight cover for a post 5501. A wedge portion 5517 is removed from a disc 5518 of material, which when the wedge 5517 is sewn together makes the center lift up into a nipple shape.

Figure 55F:
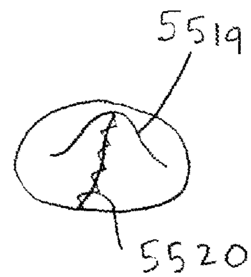
FIG. 55F is a perspective view of a PUL fabric nipple shape when the wedge of FIG. 55E is sewn together.

FIG. 55F is a perspective view of a PUL fabric nipple shape 5519 when the wedge of FIG. 55E is sewn 5520 together.

Figure 55G:
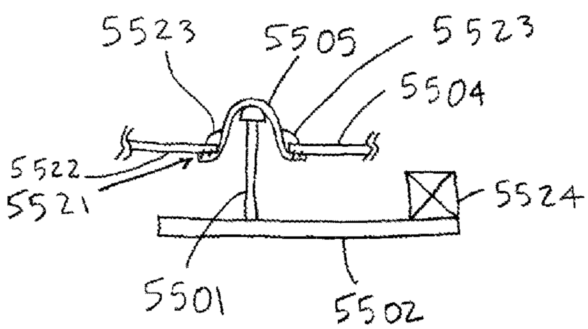
FIGS. 55G and 55H are side section close-up views of portions of alternative attachments for the embodiment of FIG. 55B.

FIG. 55G is a side section close-up view of a portion of an alternative attachment for the embodiment of FIG. 55B. Rather than the nipple-shaped post cover 5505 attaching 5506 to the top of a white plate 5504 as shown in FIG. 55B, in FIG. 55G the nipple shape 5505 is attached 5521 to the bottom side 5522 of the white plate 5504. The attachment 5521 may be by gluing. A polyurethane bead 5523 may be around the top edge between the nipple shape 5505 and the white plate 5504 in order to seal. A load cell 5524 is attached to the cantilever 5502.

Figure 55H:
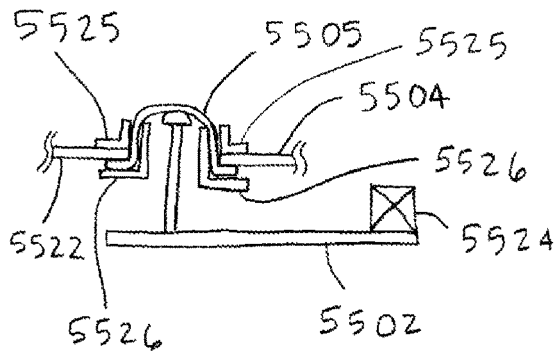

FIG. 55H is a side section close-up view of a portion of an alternative attachment for the embodiment of FIG. 55B. Rather than the nipple-shaped post cover 5505 attaching 5506 to the top of a white plate 5504 as shown in FIG. 55B, in FIG. 55H the nipple shape 5505 is attached to the bottom side 5522 of the white plate 5504 with a top 5525 and a bottom 5526 concentric rivet. A load cell 5524 is attached to the cantilever 5502.

Figure 56A:
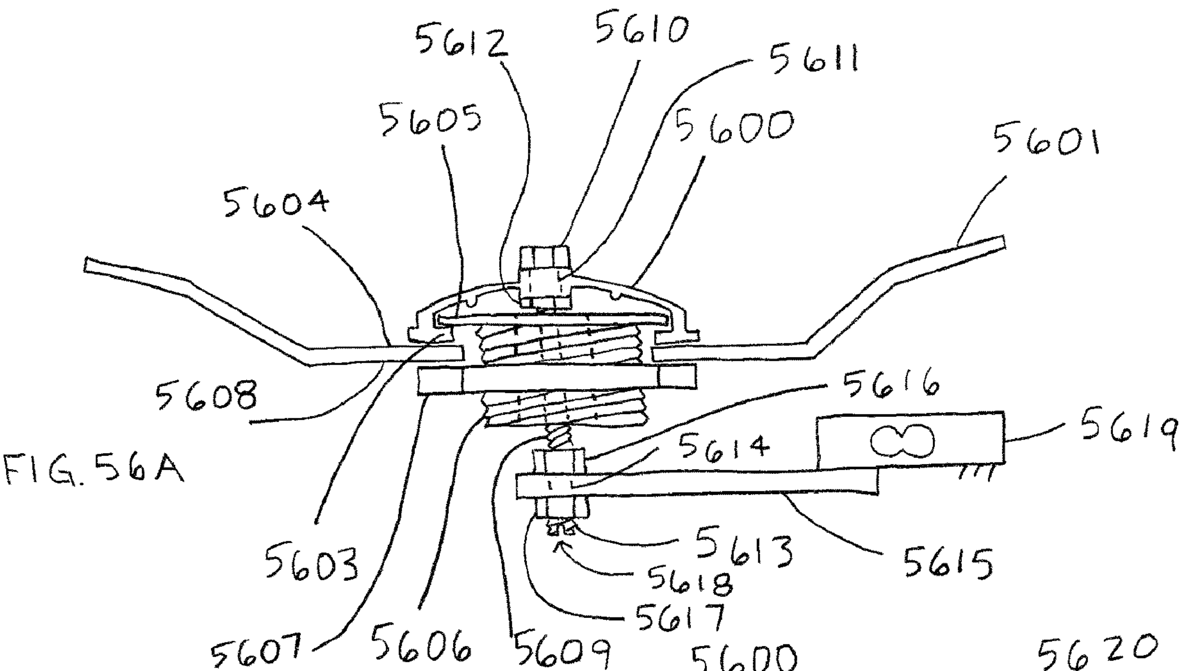
FIG. 56A is a side section close-up view of a portion of an embodiment of an active foodware system including a silicone rubber diaphragm for providing a watertight seal with a housing structure under a dining plate mating structure.

FIG. 56A is a side section close-up view of a portion of an embodiment of an active foodware system similar in some aspects to the embodiments of FIGS. 54A and 55B. Similar to FIG. 54A, the embodiment of FIG. 56A includes a silicone rubber diaphragm 5600 for providing a watertight seal with a housing structure 5601 under a dining plate mating structure. As shown, the housing structure 5601 may be similar in shape to the white dish 5504 of FIG. 55B.

As provided by FIG. 56A, a flange 5603 of the diaphragm 5600 is held tight against the top 5604 of the housing structure 5601 by a disc 5605 that is part of one end of a threaded hollow tube 5606, and by a threaded nut 5607 on the other end of the threaded tube 5606 that is tightened to press against the bottom 5608 of the housing structure 5601. A bolt 5609 with a head 5610 on one end is tightened to a hole 5611 through the top of the diaphragm 5600 by a threaded nut 5612. The other end 5613 of the bolt 5609 then passes through a hole 5614 in a cantilever 5615. The bolt 5609 may be attached to the cantilever 5615 by a top 5616 and a bottom 5617 threaded nut. The bolt 5609 may have a slit 5618 in the end 5613 so a screwdriver may be inserted to keep the bolt 5609 from rotating while tightening the top 5616 and bottom 5617 nuts. A beam load cell 5619 is attached to the cantilever 5615. The disc 5605 and threaded tube 5606 may be made by milling down the top of a bolt or screw, or by attaching a thin washer.

Figure 56B:
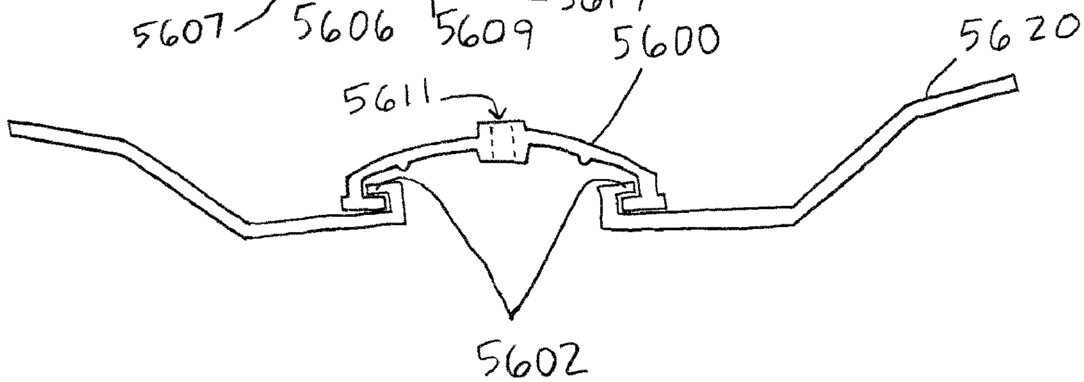
FIG. 56B includes a silicone rubber diaphragm for providing a watertight seal with a housing structure having clip-shaped edges.

FIG. 56B is a side section close-up view of a portion of an embodiment of an active foodware system similar in some aspects to the embodiments of FIGS. 56A and 54A. Similar to FIG. 54A, the embodiment of FIG. 56B includes a silicone rubber diaphragm 5600 for providing a watertight seal with a housing structure 5620 under a dining plate mating structure. As shown, for holding the diaphragm 5600 the housing structure 5620 may have clip-shaped edges 5602 that are similar in shape to the clip-shaped edges of the housing structure under the dining plate mating structure of FIG. 54A. A bolt or screw, such as the screw 5403 of FIG. 54A, or the bolt 5609 of FIG. 56A, may pass through the hole 5611 in the top of the diaphragm 5600.

Figure 57A:
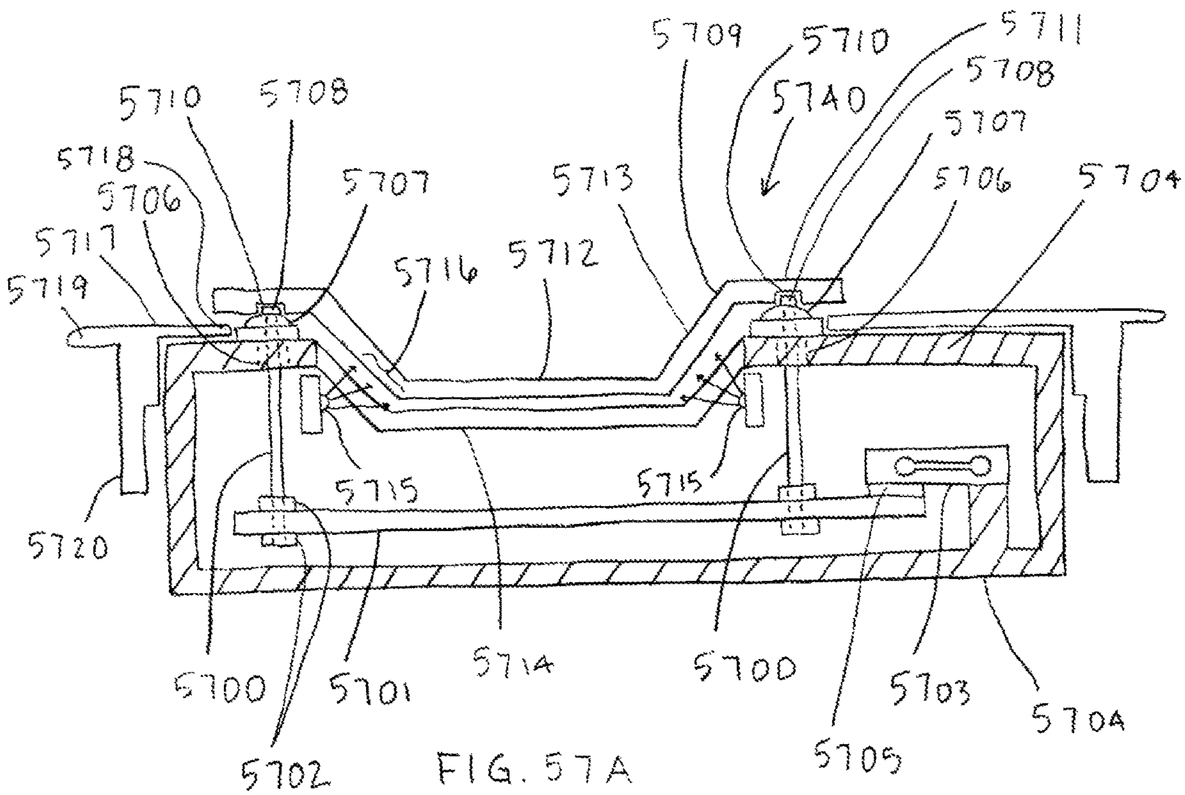
FIG. 57A is a side section view of a portion of a fully sealed watertight embodiment of an active foodware system. Posts are attached to a cantilever, where the posts extend through holes in a housing structure and are covered by silicone rubber diaphragms for keeping the housing structure fully sealed.

FIG. 57A is a side section view of a portion 5740 of a fully sealed watertight embodiment of an active foodware system. Posts 5700 are attached to a cantilever 5701. Nuts 5702 may be used to secure the posts 5700 to the cantilever 5701. A beam load cell 5703 attaches the cantilever 5701 to a housing structure 5704, which is also called a base. There may be a spacer 5705 between the cantilever 5701 and the load cell 5703 to position the cantilever 5701 at a desired height. The posts 5700 extend through holes 5706 in the housing structure 5704 that are covered by silicone rubber diaphragms 5707 for keeping the housing structure 5704 fully sealed. The heads 5708 of the posts 5700 may extend through the silicone rubber diaphragms 5707 to position a dining dish 5709, which may be clear. The dining dish 5709 may have recessions 5710 for fitting over the heads 5708 of the posts 5700 to position the dining dish 5709. The dining dish 5709 has a top peripheral portion 5711, a center lower surface 5712, and side surfaces 5713 that slope from the top peripheral portion 5711 down to the center lower surface 5712.

As provided in FIG. 57A, the housing structure 5704 has a lens 5714 beneath where the dining dish 5709 is positioned. The lens 5714 may have a similar shape to the dining dish 5709. The lens 5714 may be a white frosted lens. LEDs 5715 on the interior side of the housing structure 5704 emit light 5716 through the lens 5714.

In FIG. 57A, a loading dock 5717 is provided. The loading dock 5717 is also called a carrier tray. As shown in FIG. 57A, a portion 5718 of the loading dock 5717 extends under the dining dish 5709 for picking up the dining dish 5709 when the loading dock 5717 is lifted. The loading dock 5717 may have finger holds 5719. The loading dock 5717 may have legs 5720 for when the loading dock 5717 is placed on a table.

Figure 57B:
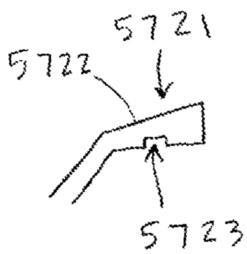
FIGS. 57B-57C are side section views of alternate embodiments of peripheral portions of a dining dish.

FIG. 57B is a side section view of an alternate embodiment of the peripheral portion 5711 of the dining dish 5709 of FIG. 57A. The peripheral portion 5721 of FIG. 57B has a top surface 5722 that slopes toward the center of the dining dish 5709. Similar to the peripheral portion 5711 of the dining dish in FIG. 57A, the peripheral portion 5721 in FIG. 57B has recessions 5723 for fitting over the heads 5708 of the posts 5700 to position the dining dish 5709.

Figure 57C:
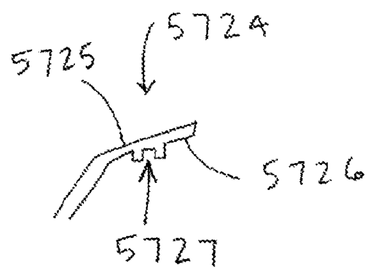

FIG. 57C is a side section view of an alternate embodiment of the peripheral portion 5711 of the dining dish 5709 of FIG. 57A. The peripheral portion 5724 of FIG. 57C has a top surface 5725 that slopes toward the center of the dining dish 5709, and also has a bottom surface 5726 that also slopes toward the center of the dining dish 5709. Similar to the peripheral portion 5711 of the dining dish 5709 in FIG. 57A, the peripheral portion 5724 of FIG. 57C has recessions 5727 for fitting over the heads 5708 of the posts 5700 to position the dining dish 5709.

Figure 57D:
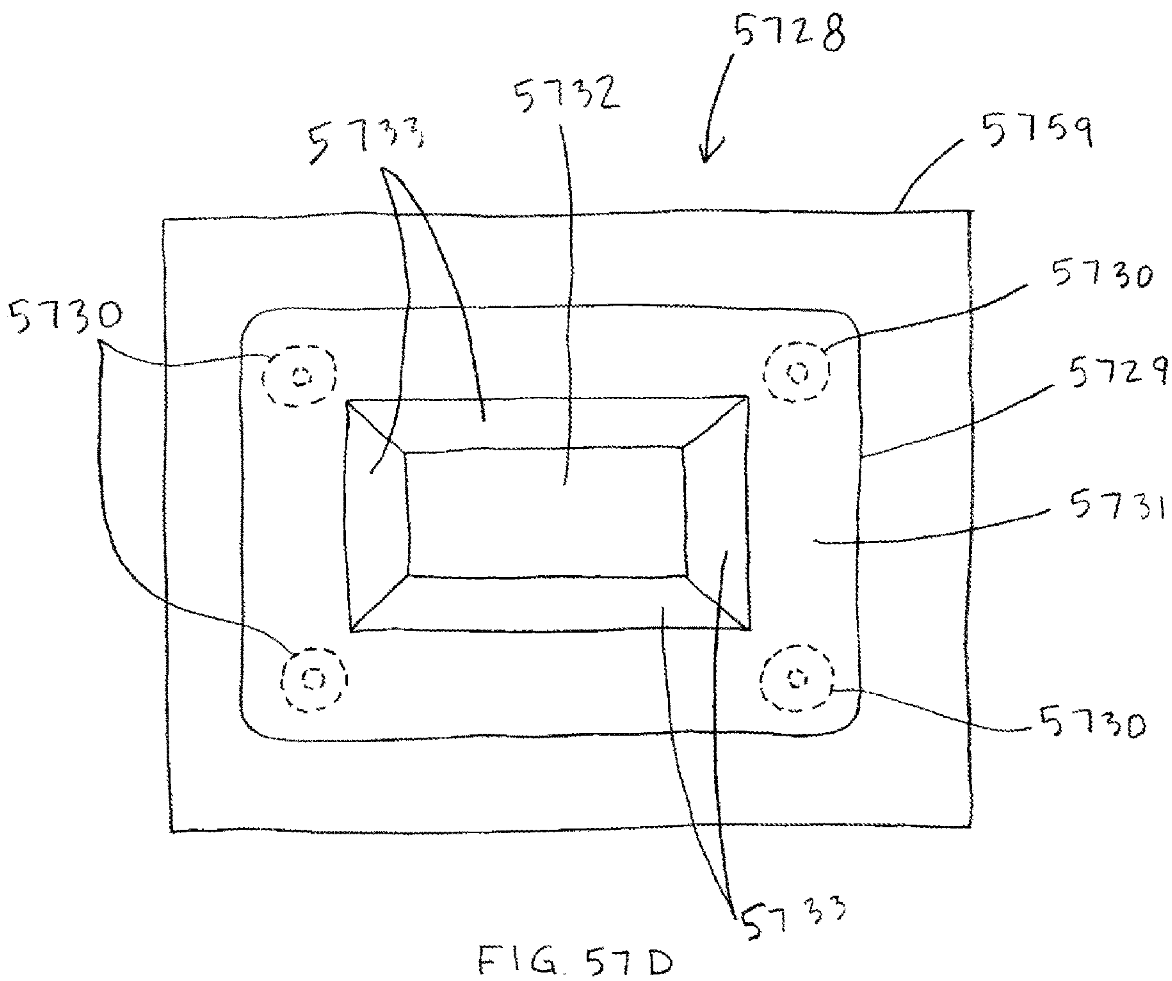
FIG. 57D is a plan view of a portion of a fully sealed watertight embodiment similar in some aspects to the embodiment of FIG. 57A.

FIG. 57D is a plan view of a portion 5728 of a fully sealed watertight embodiment of an active foodware system, where the embodiment is similar in some aspects to the embodiment of FIG. 57A. The portion 5728 provides a single dining dish 5729 (similar to the dining dish 5709 of FIG. 57A) which may be clear; however, as provided in previous figures, such as FIG. 1A, FIG. 8A, and the like, the active foodware system may have multiple dining dishes 5729. As provided in FIG. 57D, there are four silicone rubber diaphragms 5730 (similar to the silicone rubber diaphragms 5707 of FIG. 57A) on the housing structure 5759, with one diaphragm 5730 for supporting each corner of the dining dish 5729. Similar to the dining dish 5709 of FIG. 57A, the dining dish 5729 of FIG. 57D has a top peripheral portion 5731, a center lower surface 5732, and side surfaces 5733 that slope from the top peripheral portion 5731 down to the center lower surface 5732.

Figure 57E:
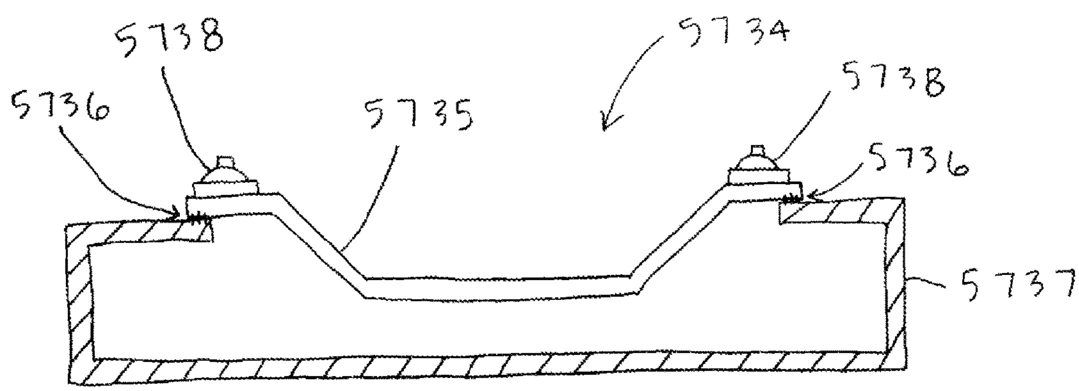
FIG. 57E is a side section view of a portion of an alternate embodiment of FIGS. 57A and 57D.

FIG. 57E is a side section view of a portion 5734 of an alternate embodiment of FIGS. 57A and 57D. As provided in FIG. 57E, a lens 5735 is attached 5736 to a housing structure 5737, where the lens 5736 may be white and frosted. The attachment 5736 may include glue and/or sealed with silicone rubber cement or polyurethane glue. As provided by FIG. 57E, the silicone rubber diaphragms 5738 (similar to the silicone rubber diaphragms 5707 of FIG. 57A, and the silicone rubber diaphragms 5730 of FIG. 57D) may be attached to the lens 5736, rather than to the housing structure 5737 (which is done for the embodiment provided in FIG. 57D).

Figure 57F:
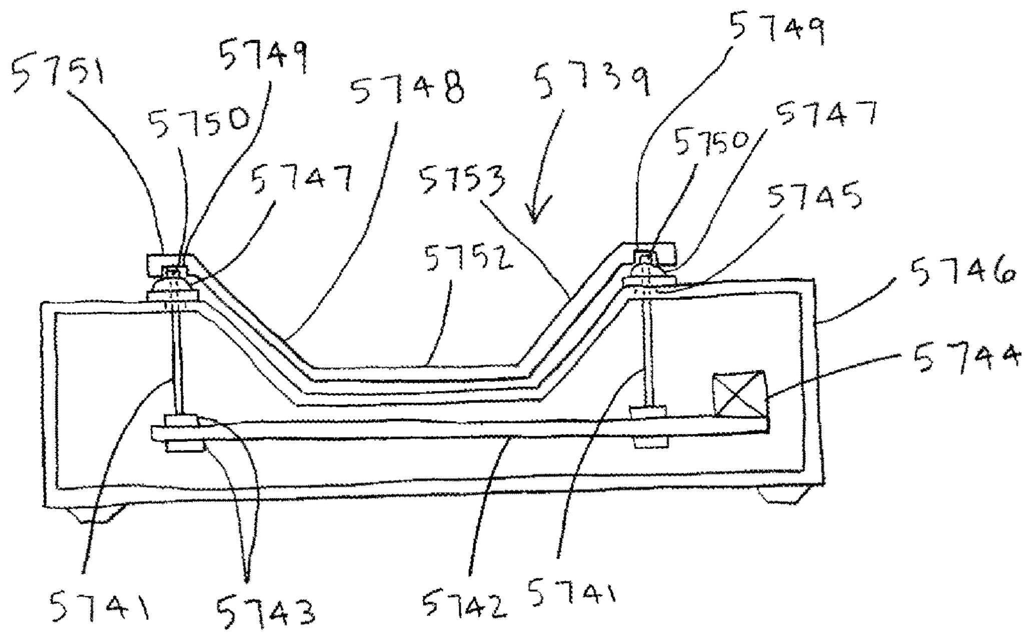
FIG. 57F is a side section view of a portion of a fully sealed watertight embodiment of an active foodware system.

FIG. 57F is a side section view of a portion 5739 of a fully sealed watertight embodiment of an active foodware system, where the portion 5739 of the embodiment of FIG. 57F is similar in some aspects to the portion 5740 of the embodiment of FIG. 57A. Posts 5741 are attached to a cantilever 5742. Nuts 5743 may be used to secure the posts 5741 to the cantilever 5742. A load cell 5744 is attached to the cantilever 5742. The posts 5741 extend through holes 5745 in a housing structure 5746, where the holes 5745 are covered by silicone rubber diaphragms 5747 for keeping the housing structure 5746 fully sealed. The heads 5750 of the posts 5741 may extend through the silicone rubber diaphragms 5747 to position a dining dish 5748. The dining dish 5748 may have recessions 5749 for fitting over the heads 5750 of the posts 5741 to position the dining dish 5748. The heads 5750 of the posts 5741 support the corners of the top peripheral portion 5751 of the dining dish 5748 so it doesn't rock while eating. The dining dish 5748 has the top peripheral portion 5751, a center lower surface 5752, and side surfaces 5753 that slope from the top peripheral surface 5751 down to the center lower surface 5752.

Figure 57G:
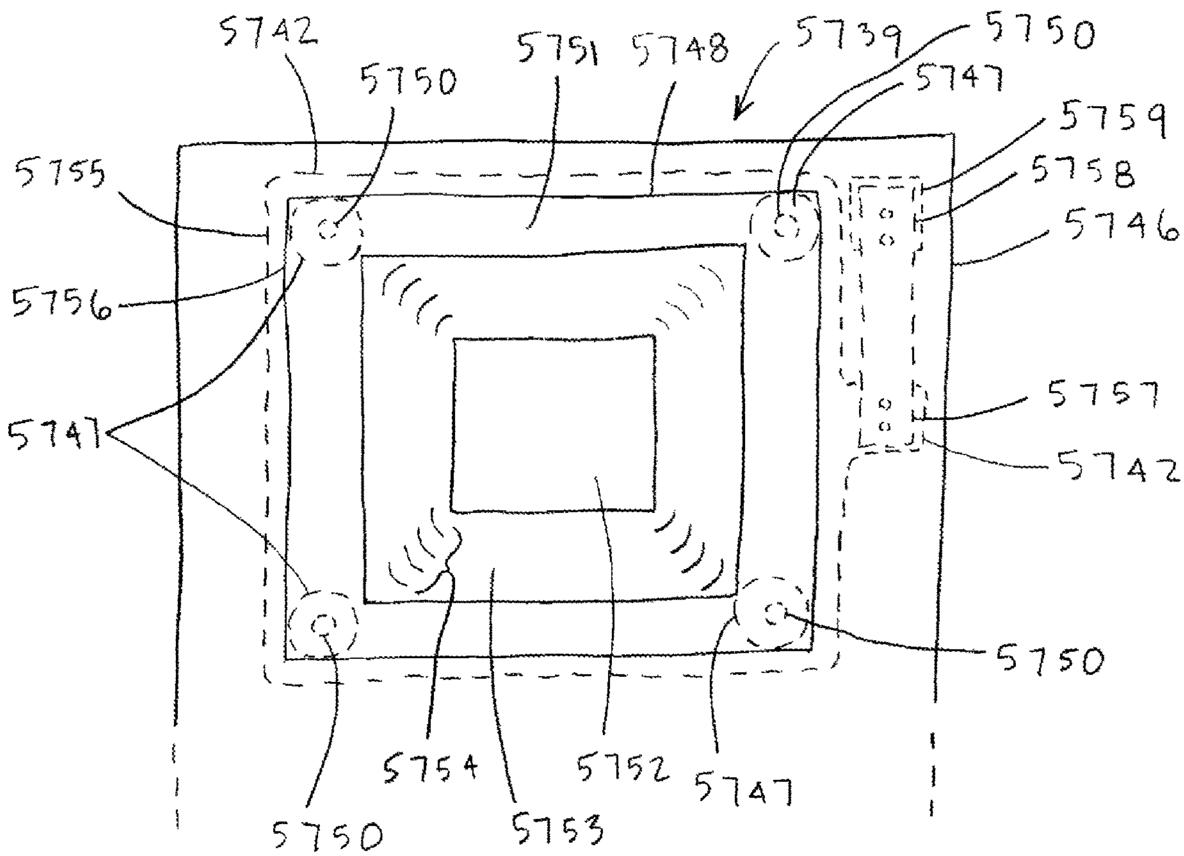
FIG. 57G is a plan view of the portion of the fully sealed watertight embodiment of FIG. 57F.

FIG. 57G is a plan view of the portion 5739 of the fully sealed watertight embodiment of FIG. 57F. The portion 5739 provides the single dining dish 5748; however, as provided in previous figures, such as FIG. 1A, FIG. 8A, and the like, the active foodware system may have multiple dining dishes 5748. As provided in FIG. 57G, there are four silicone rubber diaphragms 5747 on the housing structure 5746, with one diaphragm 5747 for supporting each corner of the dining dish 5748. The heads 5750 of the posts 5741 support the corners of the top peripheral portion 5751 of the dining dish 5748 so it doesn't rock while eating. Similar to the dining dish 5709 of FIG. 57A, the dining dish 5748 of FIG. 57G has the top peripheral portion 5751, a center lower surface 5752, and side surfaces 5753 that slope from the top peripheral portion 5751 down to the center lower surface 5752. Portions of the sloping side surfaces 5753 may be curved, as indicated by the curved lines 5754.

As provided by FIG. 57G, the plan view of the cantilever 5742 is square shaped, and the cantilever 5742 is positioned under the dining dish 5748, with the perimeter 5755 typically extending just beyond the projection of the perimeter 5756 of the dining dish 5748. One end 5757 of the beam load cell 5744 is mounted to the cantilever 5742, and the other end 5758 is mounted to the housing structure 5746, where the mounting may include mounting structure 5760.

FIGS. 58A-58J provide a variable dish-size design. A dish holder (also referred to as a dining plate mating structure) for mating with and supporting a dining dish may be supported by one or a plurality of load cells or cantilever beams, where each such cantilever beam may extend from, and be fastened to, a load cell. A dish holder may be supported by fastening to one or a plurality of load cells or cantilever beams. The dish holder may be supported by a load cell or cantilever beam using one or a plurality of swivel joints, ball joints, or other types of pinned joints. The dish holder may be supported by a load cell or cantilever beam using one or a plurality of roller wheels, roller bearings, or other types of roller joints. When a dish holder is supported by a plurality of load cells or cantilever beams associated with different load cells, the support typically includes at least one type of pinned joint and at least one type of roller joint.

A dish holder may be square, rectangular, L-shaped, round, or any convenient shape and size. A dish holder may include an opening for receiving a drinking vessel or drinking vessel holder.

Figures 58A, 58B, 58C, 58D, 58E, 58F, 58G:
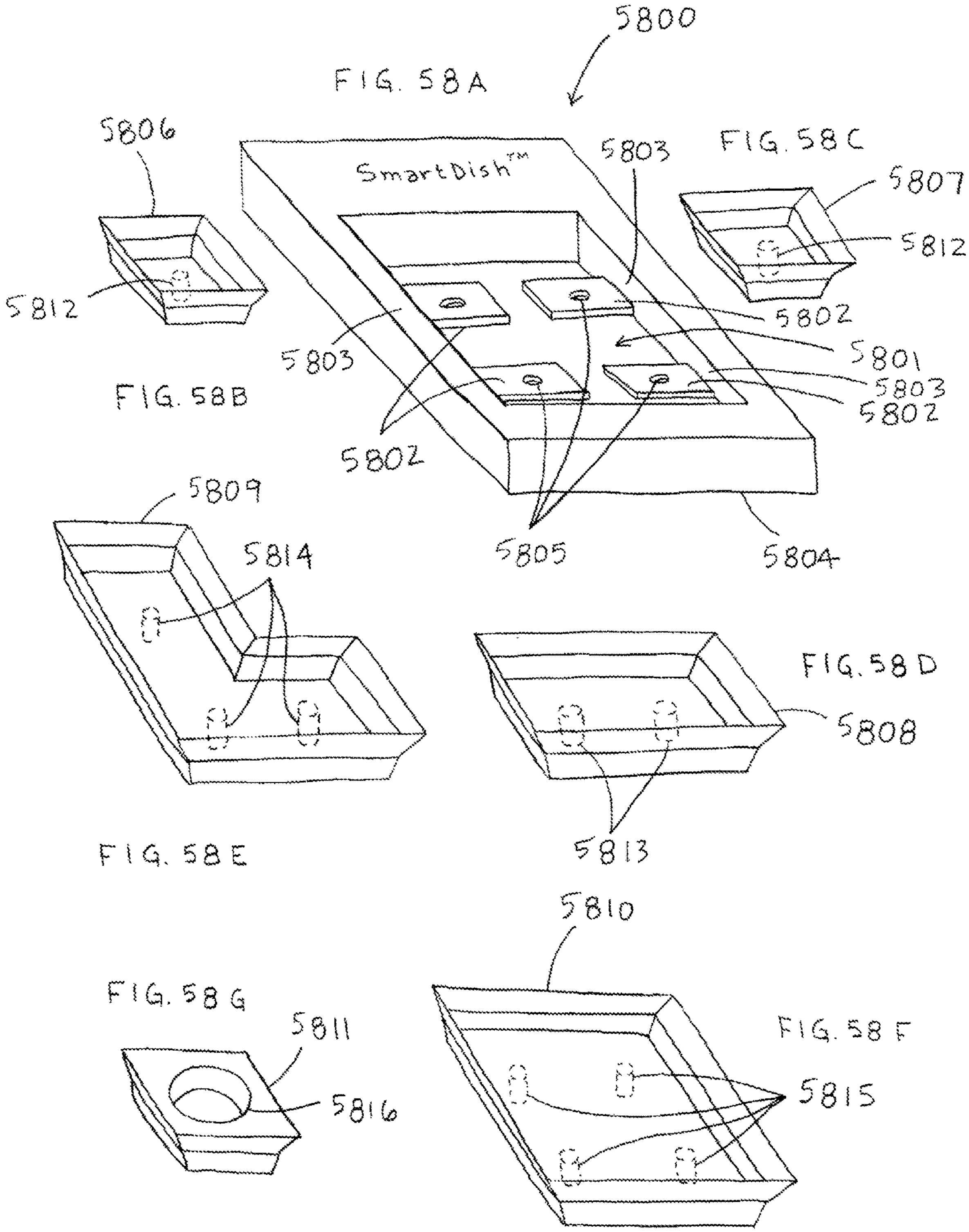
FIGS. 58A-58J provide a variable dish-size design.

More specifically, FIG. 58A is a perspective view of an embodiment 5800 of an active foodware system, also referred to as "SmartDish™". The embodiment 5800 may hold variable dish sizes. The embodiment 5800 has a main cavity 5801 with four load-cell cantilevers 5802 extending into the main cavity 5801 from the sides 5803 of a housing structure 5804. Each cantilever 5802 has an attachment hole 5805 for holding a dining plate mating structure, such as the dining plate mating structures 5806-5811. As provided by the perspective views of FIGS. 58B-58F, each dining plate mating structure 5806-5811 may have either one 5812, two 5813, three 5814, or four 5815 joints on the bottom for attaching to the attachment holes 5805 of the cantilevers 5802.

Figure 58H:
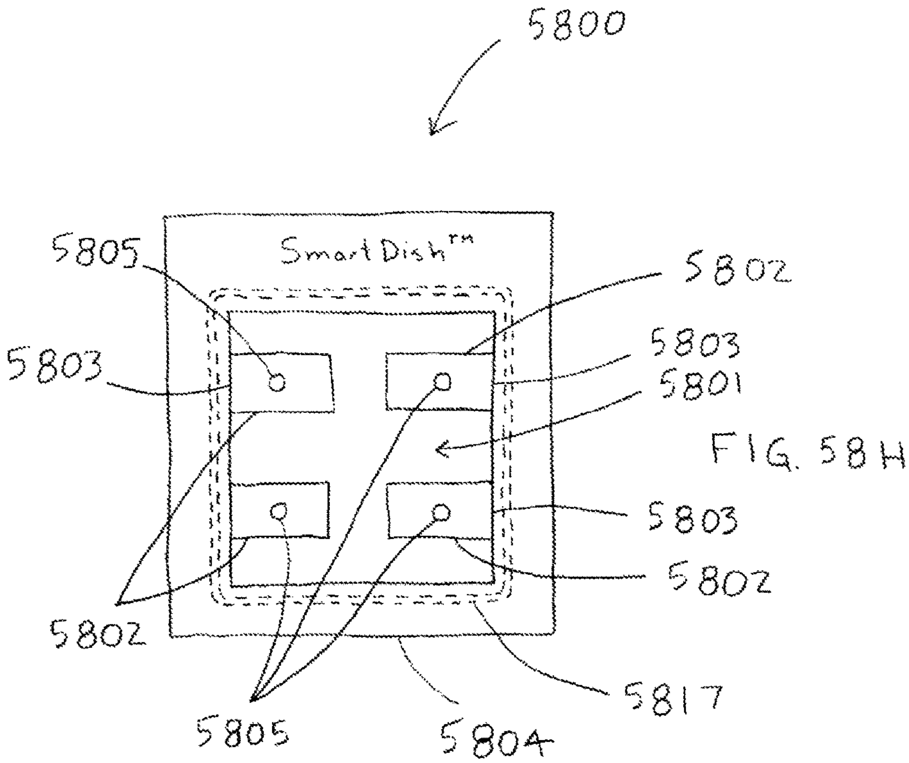
Figure 58I:
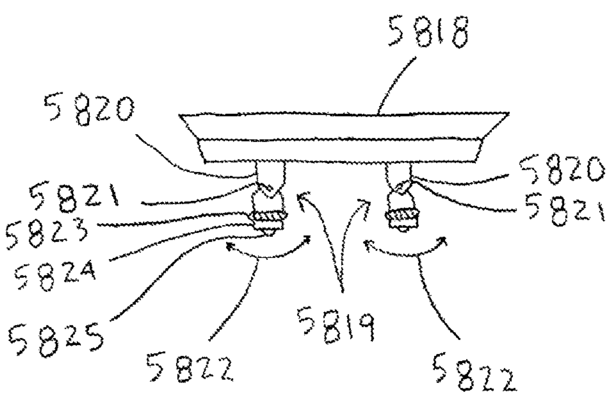
Figure 58J:
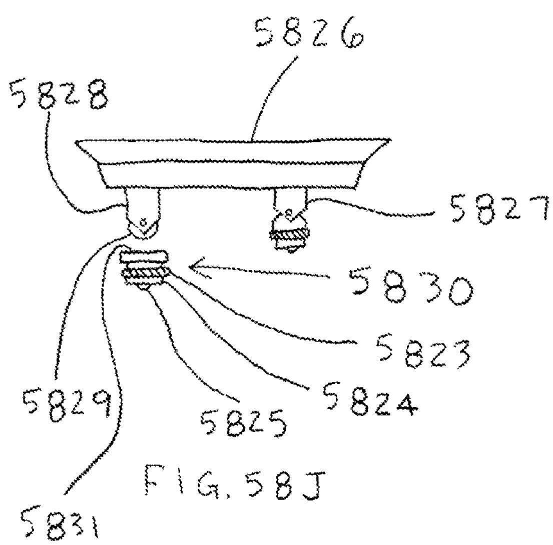

Various types of joints are provided in FIGS. 58A-58J, including a swivel pinned joint, a ball pinned joint, and a roller joint. (In particular refer to FIGS. 58I-58J.) There are two types of pinned joints: a swivel joint and a ball joint. The term "pinned joint" is commonly found in the engineering analysis of static systems, meaning the joint can rotate, but does not allow translation. In FIGS. 58A-58J, a swivel joint, also referred to as a swivel pinned joint, is a joint with a single fixed horizontal hinge axis that allows the joint to rotate about that axis. A ball joint, also referred to as a ball pinned joint, is a joint with a horizontal hinge axis that allows the joint to rotate in any direction relative to an axis lying in the horizontal plane. A roller joint is also commonly found in the engineering analysis of static systems, meaning the joint can rotate and also allows translation. In FIGS. 58A-58J, a roller joint may include a ball or roller wheel that rests or rolls on a horizontal flat surface. Refer to FIGS. 58I and 58J for further information on these different types of joints.

FIG. 58B is a perspective view of a dining plate mating structure 5806 with one joint 5812 on the bottom for attaching to a single cantilever hole 5805. Since four such dining plate mating structures 5806 will fit into the main cavity 5801, where each dining plate mating structure 5806 attaches to a single cantilever hole 5806, each such dining plate mating structure 5806 is referred to as a ¼-space square.

FIG. 58C is a perspective view of another dining plate mating structure 5807, also referred to as a ¼-space square. The single joint 5813 on the bottom of the ¼-space square of FIG. 58C is typically a fixed joint, and does not need to be a swivel or ball joint.

FIG. 58D is a perspective view of a dining plate mating structure 5808 with two joints 5813 on the bottom for attaching to two cantilever holes 5805. Since two such a dining plate mating structures 5808 will fit into the main cavity 5801, with each dining plate mating structure 5808 attaching to two cantilever holes 5805, each such dining plate mating structure 5808 is referred to as a ½-space square. Typically, a ½-space square has two swivel joints 5813, or has one swivel joint and one roller joint.

FIG. 58E is a perspective view of a dining plate mating structure 5809 with three joints 5814 on the bottom for attaching to three cantilever holes 5805. Each such dining plate mating structure 5809 is referred to as an L-shape. Typically, an L-shape has three ball joints 5814, or has one ball joint and two roller joints.

FIG. 58F is a perspective view of a dining plate mating structure 5810 with four joints 5815 on the bottom for attaching to all four cantilever holes 5805. Each such dining plate mating structure 5810 is referred to as a full-space square. Typically, a full-space square has four ball joints 5815, or has one ball joint and three roller joints.

FIG. 58G is a perspective view of a dining plate mating structure 5811 with a single fixed joint 5812 on the bottom (not shown) for attaching to a single cantilever hole 5805. The dining plate mating structure 5811 of FIG. 58G has a cylindrical cavity 5816 for holding a drink container. Each such dining plate mating structure 5811 is referred to as a ¼-space drink.

FIG. 58H is a plan view of the embodiment 5800 of an active foodware system, also referred to as "SmartDish™". The embodiment 5800 is for variable dish sizes 5806-5811. The embodiment 5800 has a main cavity 5801 with four load-cell cantilevers 5802 extending into the main cavity 5801 from the sides 5803 of the housing structure 5804. Each cantilever 5802 has an attachment hole 5805 for holding a dining plate mating structure 5806-5811. As provided by the perspective views of FIGS. 58B-58F, each dining plate mating structure 5806-5811 may have either one 5812, two 5813, three 5814, or four 5815 joints on the bottom for attaching to the attachment holes 5805 of the cantilevers 5802. Rather than having four LED strips 116, such as is provided by FIG. 1B, FIG. 58H provides a single large LED strip 5817 surrounding the main cavity 5801. Accordingly, only two of the four sides of a ¼-space square dining plate mating structure may be illuminated, but that is sufficient for some applications.

FIG. 58I is a side view of a dining plate mating structure 5818 with a two joints 5819 on the bottom, each joint for attaching to a single cantilever hole 5805. The two joints 5819 are swivel or ball joints to create a "pinned joint," so two load cells can measure a single dining plate mating structure spanning more than one load cell. In FIG. 58I, the two joints 5819 are able to swivel 5822 side to side. Refer also to FIGS. 59A-59E for similar joint structure, where a protuberance having an O-ring, a retaining washer, and a screw are attached to the bottom of a dining plate mating structure. In FIG. 58I, the protuberance 5820 additionally has a pinned joint 5821 that allows the end of the protuberance 5820 to swivel 5822. Near the end of the swiveling portion of the protuberance 5820 is an O-ring 5823 or clip held in place by a retaining washer 5824 and a screw 5825. When the protuberance 5820 is inserted into a hole 5805 on a cantilever 5802, the O-ring 5823 or clip allows the dining plate mating structure 5818 to snap to the cantilever 5802. The O-ring 5823 or clip expands on the opposite side of the cantilever 5802 to hold the dining plate mating structure 5818 on the cantilever 5802. The dining plate mating structure 5818 can be snapped off for cleaning.

FIG. 58J is a side view of a dining plate mating structure 5826 with two joints 5827, 5828 on the bottom, each joint 5827, 5828 for attaching to a single cantilever hole 5805. One of the joints is a swivel 5827 or ball joint similar to FIG. 58I. The other joint is a roller joint 5828. The roller joint 5828 may have a ball 5829 or roller (such as a roller wheel) in the tip. Typically the roller joint 5828 is used together with a hole plug 5830 for the cantilever hole 5805. The hole plug 5830 has a flat top surface 5831 for the roller joint 5828 to rest or roll on. Similar to the swivel 5827 or ball joint, near the end of the hole plug 5830 is an O-ring 5823 or clip held in place by a retaining washer 5824 and a screw 5825, so when the hole plug 5830 is inserted into a hole 5805 on a cantilever 5802, the O-ring 5823 or clip allows the dining plate mating structure 5826 to snap to the cantilever 5802.

FIG. 59A is a side view of a portion 5900 of an embodiment of an active foodware system. A protuberance 5901 having a rubber O-ring 5902 or plastic C-clip, a retaining washer 5903, and a screw 5904 are attached to the bottom of a dining plate mating structure 5905. The dining plate mating structure 5905 may be translucent, and the screw 5904 may be a sheet metal screw so it can self tap into the protuberance 5901. As provided in FIG. 59A, the O-ring/C-clip 5902 is slightly wider than a cantilever hole 5906 in a cantilever 5907. A load cell 5908 is attached to the cantilever 5907. In operation, the dining plate mating structure 5905 snaps onto the cantilever 5907, and the O-ring/C-clip 5902 expands on the other side of the cantilever 5907 to hold the dining plate mating structure 5905 on the cantilever 5907. The dining plate mating structure 5905 may be snapped off of the cantilever 5907 for cleaning. In other words, when the dining plate mating structure 5905 is pressed onto the cantilever 5907, the O-ring/C-clip 5902 on the protuberance 5901 compresses and moves through the cantilever hole 5906 to the other side of the cantilever 5907, where it decompresses and expands to hold the dining plate mating structure 5905 to the cantilever 5907.

The dining plate mating structure 5905 may have a tab 5908 or edge to help grasp to remove it. The dining plate mating structure 5905 may also have an optional lip 5909 or edge that overhangs a housing structure 5910, also called a base. As provided by FIG. 59A, the housing structure 5910 may have a barrier 5911 surrounding an opening 5912, where the opening 5912 is for the dining plate mating structure 5905.

FIG. 59B is a side exploded view of a portion 5913 of FIG. 59A. The bottom of the dining plate mating structure 5905 has a protuberance 5901 having a cantilever shoulder 5914, an O-ring shoulder 5915, and a screw hole 5916. A rubber O-ring 5902 or plastic C-clip is placed 5920 on the O-ring shoulder 5915. A retaining washer 5903 is then placed against the O-ring/C-clip 5902 and a screw 5904 is screwed into 5921 the screw hole 5916 of the protuberance 5901.

FIG. 59C is a plan view of the dining plate mating structure 5905 of FIG. 59A having one or more extensions 5917 from the top edge to help grasp to remove the dining plate mating structure 5905. Alternatively, the entire top edge of the dining plate mating structure 5905 may extend out to help grasp.

FIG. 59D is a perspective view from beneath the dining plate mating structure 5905, showing the elements of FIG. 59B assembled, including the O-ring/C-clip 5902, the retaining washer 5903, and the screw 5904. Also provided in FIG. 59D are openings 5918 in the sides 5919 of a bottom skirt of the dining plate mating structure 5905 for allowing the cantilever 5907 to pass through.

FIG. 59E is a perspective view from beneath the load-cell cantilever 5907, showing the cantilever hole 5906.

Figures 60A, 60B:
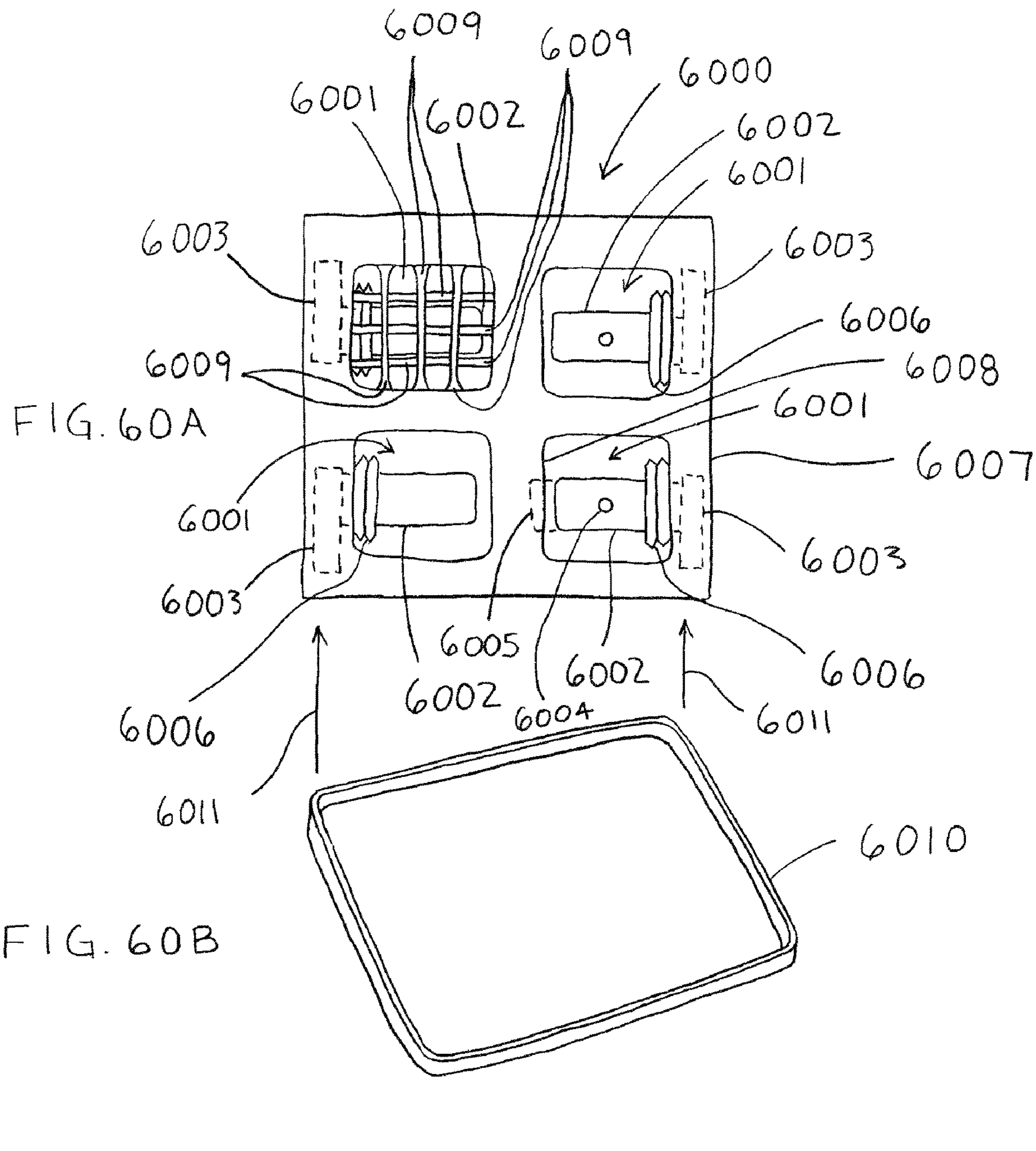
FIG. 60A is a bottom view of a portion of an active foodware system, also called a "SmartDish™". As provided in FIG. 60A, there are four openings, and a cantilever extends from a load cell into each opening. As provided by the perspective view of FIG. 60B, a clip-on drip pan may clip on and cover the entire bottom of the housing structure, covering all the openings.

FIG. 60A is a bottom view of a portion 6000 of an active foodware system, also called a "SmartDish™". As provided in FIG. 60A, there are four openings 6001. A cantilever 6002 extends from a load cell 6003 into each opening 6001. The cantilever 6002 may have a cantilever hole 6004 to snap in a dining plate mating structure (not shown). The dining plate mating structure may be white, translucent, and Melamine material. The cantilever 6002 may have a flexible bellows 6006 or polyurethane laminate (PUL) fabric protective covering to provide a watertight seal with a housing structure 6007. The cantilever 6002 may extend 6005 to the opposite end 6008 of the opening 6001 and use the end 6008 of the opening 6001 as a limit stop for deflection of the cantilever 6002. An opening may have cross bracing 6009 molded into the bottom piece of the housing structure 6007. The cross bracing 6009 protects the cantilever 6002 and allows food to drain out of the opening 6001. An optional, removable door (not shown) may cover each opening 6001. Alternately, as provided by the perspective view of FIG. 60B, a clip-on drip pan 6010 may clip on 6011 and cover the entire bottom of the housing structure 6007, covering all the openings 6001. The clip-on drip pan 6010 may be easily snapped on/off for use/cleaning. The drip pan 6010 may be stamped from aluminum.

Figure 61A:
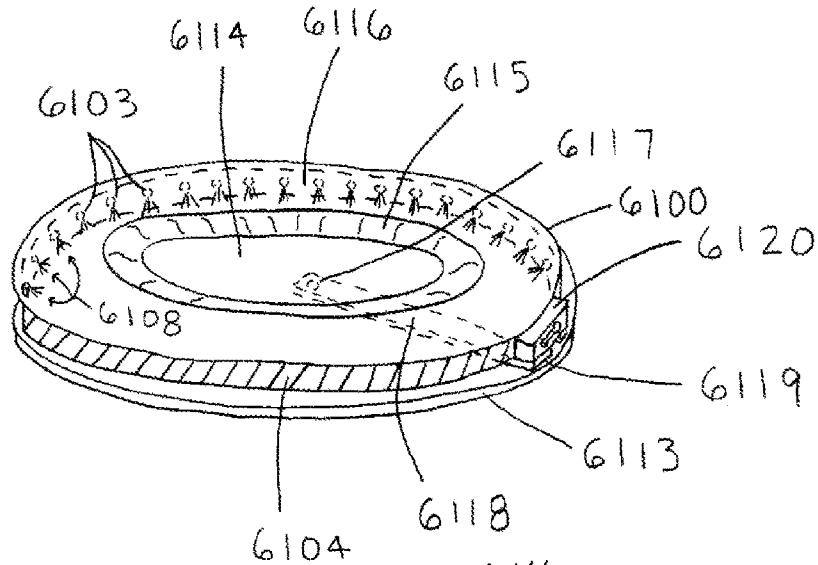
FIG. 61A is a perspective view.
Figure 61B:
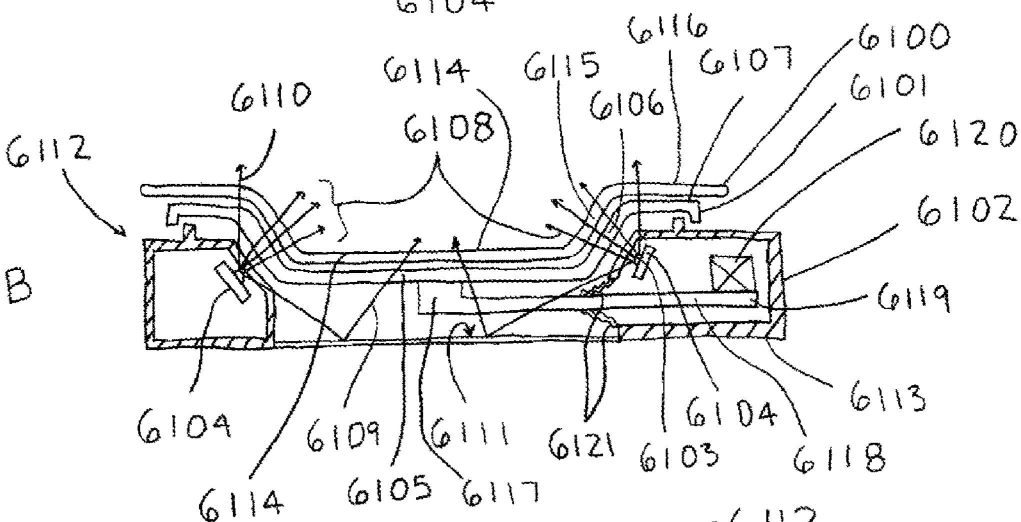
FIG. 61B is a side view.

FIG. 61A is a perspective view, and FIG. 61B is a side view, of an active foodware system having a dining plate 6100 positioned by a dining plate mating structure 6101 (where the dining plate mating structure 6101 and the walls 6102 of the associated housing structure 6112 having a base 6113 are not visible in FIG. 61A, but are shown in FIG. 61B). A plurality of LEDs 6103 are positioned around the perimeter of the dining plate mating structure 6101. An LED strip 6104 may be used to provide the plurality of LEDs 6103, where the plurality of LEDs 6103 includes LED integrated circuit chips soldered to a printed circuit board (PCB), where the PCB may have a flexible substrate. When the LED integrated circuit chips are soldered to a flexible PCB, a large number of LEDs can be powered together and individually addressed using fewer electrical wires. The plurality of LEDs 6103 may be wired sequentially on the PCB. Typically, LED commands for on/off, brightness, and color are directed to a single one of the plurality of LED chips 6103 using a clock signal, which may be directed by a microcontroller. Densities of LED placement may vary as convenient or desired. Some useful LED placement densities may range from 30 LEDs per meter up to 144 LEDs per meter. In one useful embodiment, an LED placement density of 144 LEDs per meter is used, where 116 LEDs 6103 total are placed around the perimeter of a dining plate mating structure 6101; however, the number of LEDs 6103 placed around the perimeter depends on the diameter of the dining plate mating structure and the placement density of LEDs. A useful LED strip with 144 LED chips per meter is an Adafruit NeoPixel RGBW 144 LED strip P2847. A useful density may be 60 LED chips per meter, such as provided by BTF-Lighting, model BTF-5V-60L-W.

The dining plate mating structure 6101 has a recessed region 6105 in the middle that is recessed in relation to a surrounding sidewall 6106. The sidewall 6106 has a translucent portion, and may be entirely translucent. The sidewall 6106 of the dining plate mating structure 6101 typically makes an angle of between 45 degrees to 90 degrees from horizontal; although, the angle may vary depending upon the application and the height of the sidewall 6106. The height of the dining plate mating structure sidewall 6106 from the recessed region 6105 is typically from a few millimeters to a few centimeters, although, the height may vary depending upon desired mating and lighting effects. The dining plate mating structure 6101 typically has a substantially horizontal flange 6107 around the perimeter, extending radially outward from the top of the sidewall 6106. In a useful embodiment, the recessed region 6105 has a translucent portion, and may be entirely translucent. In a useful embodiment, the substantially horizontal flange 6107 has a translucent portion, and may be entirely translucent. The direction of maximum radiation of the LEDs points radially inward on a substantially horizontally plane, and radiated light 6108 passes through the translucent portion of the sidewall 6106 of the dining plate mating structure 6101. The light 6109 radiated from the LEDs 6103 also may pass through the translucent portions of the recessed region 6105, and light 6110 radiated may also pass through the translucent portions of the substantially horizontal flange 6107. The light radiated from the LEDs 6103 also may reflect from reflective surfaces 6111 to provide optical effects. In a useful embodiment, reflective surfaces, such as the reflective surface 6111, are used to create an optical illusion that the dining plate 6100 is infinitely deep and there is an infinite amount of food on the dining plate 6100.

The dining plate 6100 typically has a centrally located dining surface 6114 for receiving solid food, where the dining surface 6114 is recessed in relation to a region surrounding the dining surface 6114. The region surrounding the dining surface typically includes a dining plate sidewall 6115 which makes an angle of between 45 degrees to 90 degrees from horizontal for helping to prevent spillage of food from the dining surface 6114. The height of the sidewall 6115 from the dining surface 6114 is typically from a few millimeters to a few centimeters, although, the height may vary depending upon the desired mating and lighting effects. The dining plate 6100 typically has a substantially horizontal flange 6116 around the perimeter, extending radially outward from the top of the sidewall 6115. The sidewall 6115 has a translucent portion, and may be entirely translucent. In a useful embodiment, the dining surface 6114 has a translucent portion, and may be entirely translucent. In a useful embodiment, the substantially horizontal flange 6116 has a translucent portion, and may be entirely translucent.

In general, the dining plate 6100 most securely mates with the dining plate mating structure 6101 when the side profile of the dining plate 6100 matches, or is similar to, the side profile of the dining plate mating structure 6101. Accordingly, the angle and height of the dining plate sidewall 6115 typically match the angle and height of the dining plate mating structure sidewall 6106. The larger the angle of the sidewalls, and the taller the sidewalls are, the more firm the mating of the dining plate 6100 is to the dining plate mating structure 6101, and the more resistant the dining plate 6100 is to inadvertently sliding laterally relative to the dining plate mating structure 6101 when pushing food around during dining.

At least a portion of the dining plate 6100 is translucent, and may be entirely translucent or transparent. Light from the LEDs that passes through translucent portions of the dining plate mating structure 6101 typically also passes through corresponding mating translucent portions of the dining plate 6100. For instance, light 6108 from the LEDs 6103 that passes through the dining plate mating structure sidewalls 6106 typically also passes through the dining plate sidewalls 6115; light 6109 from the LEDs 6103 that passes through the dining plate mating structure recessed region 6105 typically also passes through the dining plate dining surface 6114; and light 6110 from the LEDs 6103 that passes through the dining plate mating structure substantially horizontal flange 6107 typically also passes through the dining plate substantially horizontal flange 6116.

The dining plate mating structure 6101 and/or the dining plate 6100 may have translucent patterns, translucent colors, contours, lenses, variations in the index of refraction to redirect light in different directions or diffuse it, scoring to allow light to escape in desired regions, translucent images including images of animate and inanimate objects, translucent designs, and the like. One useful embodiment includes a translucent white dining plate mating structure 6101 that diffuses light, and a translucent dining plate 6100 having silver patterns, separated by translucent white and transparent portions, that reflect and redirect light passing through the dining plate mating structure 6101.

In a weight-sensing embodiment of FIG. 61A, the dining plate mating structure 6101 is supported by one end 6117 of a cantilever beam 6118. The second end 6119 of the cantilever beam 6118 is attached to a beam load cell 6120 attached to the housing structure base 6113. There may be a flexible seal 6121 attached to the cantilever beam 6118 and to the housing structure 6112 to prevent liquid and food crumbs from getting to the load cell 6120 and other electrical components The apparatus provided for FIG. 61A-61B has similarities to the apparatus previously provided in some of the previous figures, such as FIGS. 1A-1F, FIGS. 14A-14C and FIG. 31A. Many of the components and descriptions of these figures may be interchanged as if they were described specifically for a single figure.

One difference for the apparatus of FIGS. 61A-61B relative to the apparatuses of the prior figures is that it provides a single dining plate (also referred to as a dining dish) 6100 and a single dining plate mating structure (also referred to as a mate receptacle or a translucent plate mate) 6101; whereas the prior figures provide the apparatus for one portion of a plurality of similar portions of an active foodware system, where each portion has a dining plate and a dining plate mating structure, and where the plurality may be four similar portions arranged in a 2×2 array in a single housing structure.

Figure 61C:
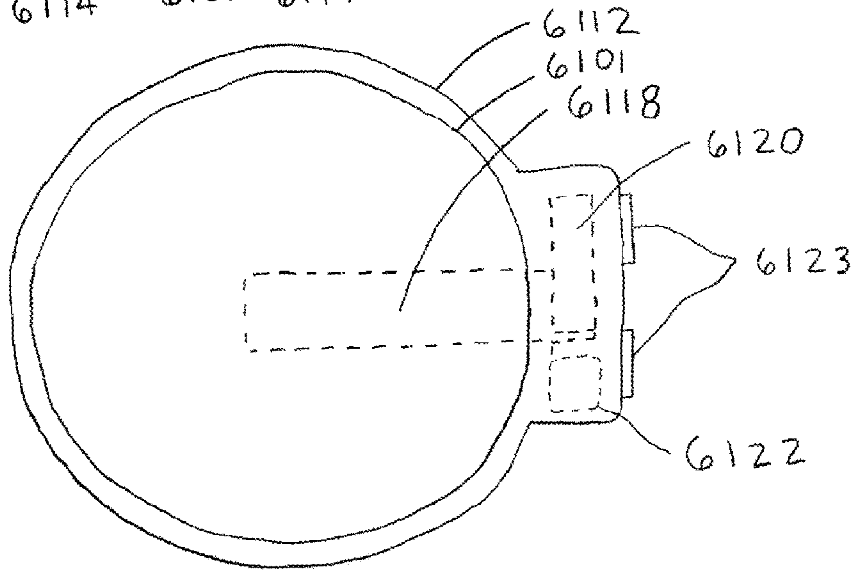
FIG. 61C is a plan view, of an active foodware system having a dining plate positioned by a dining plate mating structure, which may be supported by one end of a cantilever beam. An associated housing structure has a plurality of LEDs positioned around the perimeter.

Another difference for the apparatus of FIGS. 61A-61B relative to the apparatuses of the prior figures is that, as provided in the plan view of associated FIG. 61C, it typically provides electronics 6122 optionally including sound electronics with an auditory stimulating component including an audio output device, such as speakers 6123, for generating sound. Typically the generated sound is synchronized with light emitted from the plurality of LEDs 6103. In a useful embodiment, the generated sound is music selected wirelessly by a mobile phone or tablet computer, where a sequence of lighting effects is synchronized with the selected music, where the lighting effect may punctuate the beats and sounds of the music to enhance the audio-visual experience while dining. An exemplary electrical circuit block diagram for sensing and control is found in FIG. 3A.

The dining plate 6100 functions as a translucent lens, where different lenses may be used for different occasions.

One useful embodiment includes a birthday lens (see FIG. 70) which is used when a mobile phone selects a "Happy Birthday" song to be played. The specific lens may even be automatically detected by the active foodware system, which then automatically selects the appropriate music and lighting effects to accompany the lens. A restaurant can serve a piece of birthday cake on the active foodware system with the birthday lens, and rather than the waitstaff singing "Happy Birthday" to the customer, the active foodware system that includes the birthday lens will sing a birthday song and provide a synchronized sound and light show. The birthday lens may have translucent candles that are each simulated to be lit one at a time by LEDs in the housing structure shining light through translucent portions of the dining plate mating structure and the dining plate.

Another useful embodiment includes a holiday lens that shows snowflakes, Santa, reindeer, and the like, and plays holiday music, such as Christmas songs, synchronized with light effects. Such a holiday lens may be used to serve holiday treats to guests at a holiday party.

Another useful embodiment includes a relaxation lens that has pleasant translucent patterns that are backlit by LEDs in the housing structure, as relaxing, tranquil music is synchronized to mesmerizing lighting effects. Such a relaxation lens may be used for dinner after a hectic day at work.

Figure 61D:
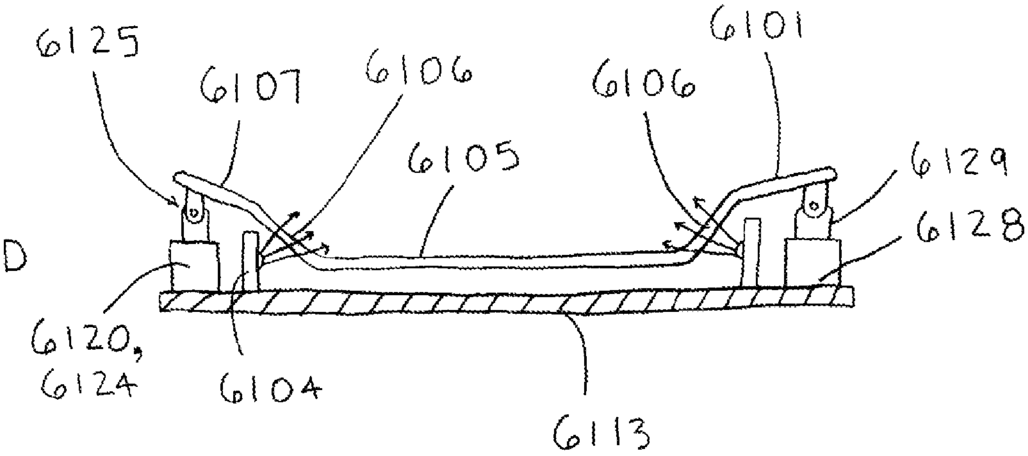
FIG. 61D is a side view of a portion of an active foodware structure that includes a dining plate mating structure supported under the flange by three beam load cells or three disc load cells.

FIG. 61D is a side view of a portion of an active foodware structure that includes a dining plate mating structure 6101 supported under the substantially horizontal flange 6107 by three beam load cells 6120 or three disc load cells 6124. Beam load cells 6120 are also known as bar load cells, and disc load cells 6124 are also known as button or washer load cells. The load cells may be attached by their reference location 6128 to the housing base 6113, and be attached by their sensing location 6129 to the substantially horizontal flange 6107 by articulated attachments 6125, which may be ball-joint-type attachments. The articulated attachments allow the dining plate mating structure 6101 to tilt slightly toward the center of gravity (CG) of food placed on the surface, allowing the load cells to sense vertical forces independently of each other, and so the CG of the food may be determined (see FIGS. 61J-61K). The substantially horizontal flange 6107 of the dining plate mating structure 6101 may extend over all or a portion of the load cells.

Figure 61E:
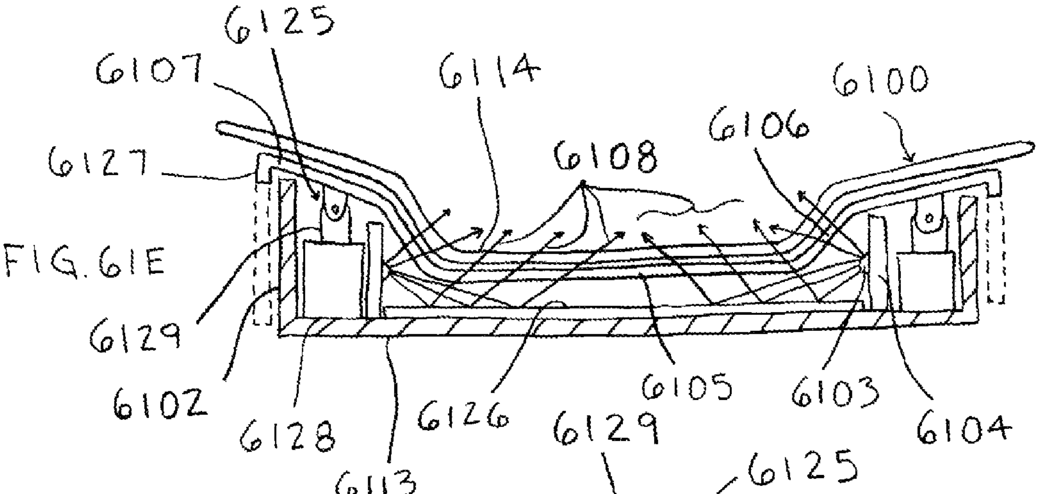
FIG. 61E is a side view of a variant of FIG. 61D, including a reflective surface.

FIG. 61E is a side view of a variant of FIG. 61D, including a reflective surface 6126. The reflective surface 6126 may include a 1-way mirror. The reflective surface 6126 reflects light 6108 from the LEDs 6103 through various translucent portions of the dining plate mating structure 6106 and the dining plate 6100.

In a useful embodiment, the dining plate mating structure recessed region 6105 and/or the dining plate dining surface 6114 includes a 2-way mirror, half-silvered mirror, mirrored translucent adhesive film, and the like. In this useful embodiment, the surface of the dining plate mating structure recessed region 6105 and/or the dining plate dining surface 6114 that faces down is the reflective surface of the 2-way mirror, and the surface facing up is the translucent surface. In this useful embodiment, reflective surfaces, such as the reflective surface 6126 or the reflective surface 6111, which may include a 1-way mirror, are used to reflect light up toward the reflective surface of the 2-way mirror. The 2-way mirror permits a transmitted portion of the light to pass through for the user to see from above, and reflects a reflected portion of the light back toward the 1-way mirror, which again reflects the light back toward the reflective surface of the 2-way mirror. This internal reflection continues. The multiple reflections between the 1-way mirror and the 2-way mirror create an optical illusion for the user viewing from above that the dining plate 6100 is infinitely deep and there is an infinite amount of food on the dining plate 6100 (see also FIG. 69).

The substantially horizontal flange 6107 of the dining plate mating structure 6106 may have a downward barrier or lip 6127 that extends down by the housing structure wall 6102 to help prevent liquid or food crumbs that spill from the dining plate 6100 from getting under the dining plate mating structure 6106 and over the housing structure wall 6102 and contacting the load cell or other electronic components.

Figure 61F:
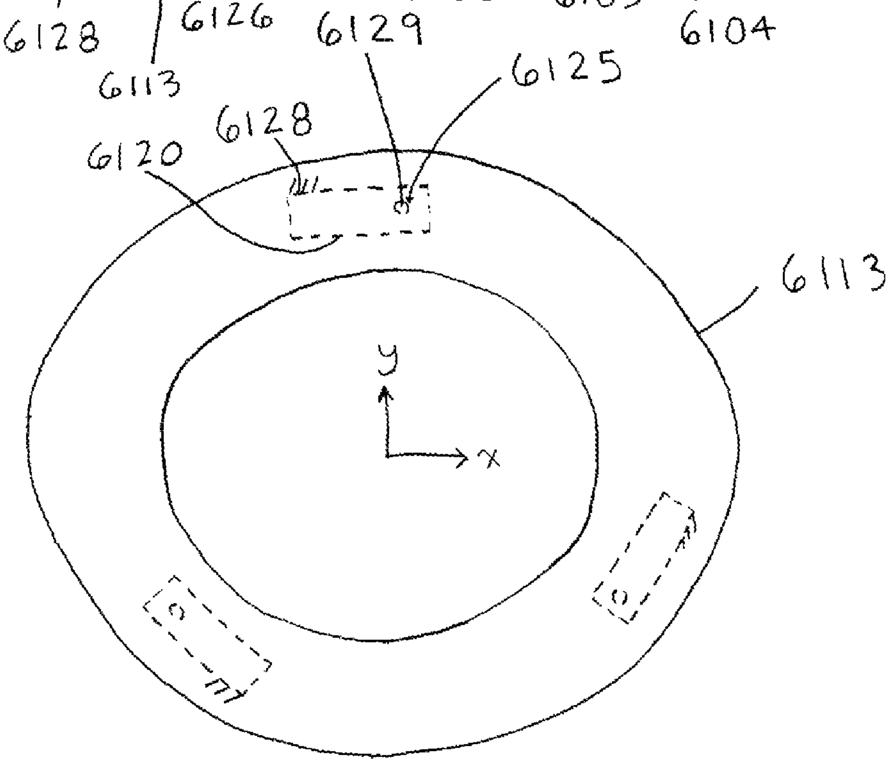
FIG. 61F is a plan view of three beam load cells positioned symmetrically around the periphery of a housing structure base.

FIG. 61F is a plan view of three beam load cells 6120 positioned symmetrically around the periphery of a housing structure base 6113. The beam load cells 6120 may be attached by their reference location end 6128 to the housing base 6113, and be attached by their sensing location end 6129 to the substantially horizontal flange 6107 of the dining plate mating structure 6106 by articulated attachments 6125, which may be ball-joint-type attachments. With three or more load cells, the centroid and total amount of food may be determined, so which food and how much was eaten can then be estimated.

Figure 61G:
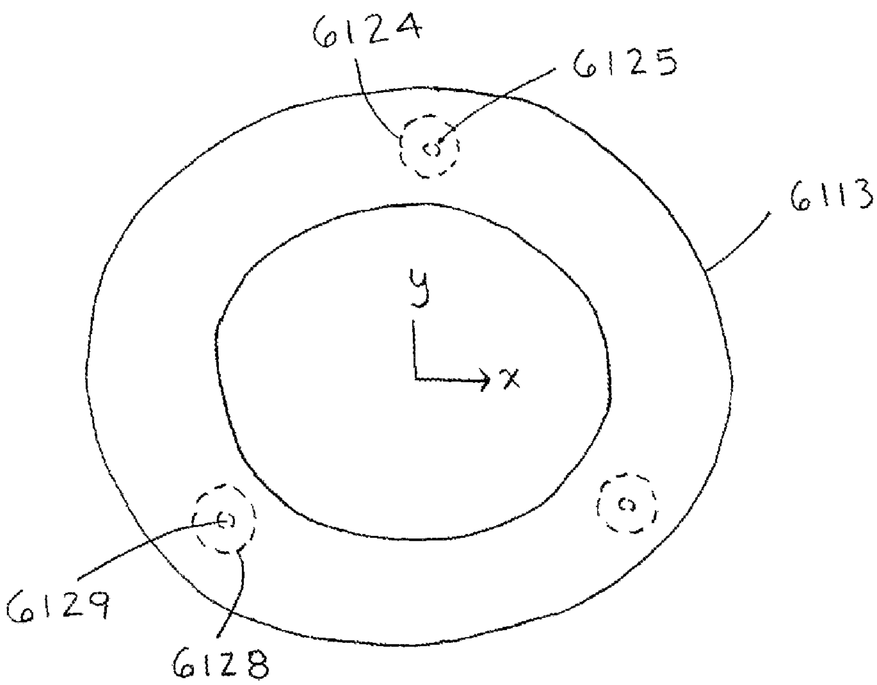
FIG. 61G is a plan view of three disc load cells positioned symmetrically around the periphery of a housing structure base.

FIG. 61G is a plan view of three disc load cells 6124 positioned symmetrically around the periphery of a housing structure base 6113. The disc load cells 6124 may be attached by their reference location bottom 6128 to the housing base 6113, and be attached by their sensing location button 6129 to the substantially horizontal flange 6107 of the dining plate mating structure 6106 by articulated attachments 6125, which may be ball-joint-type attachments. The disc load cells 6124 may be turned upside down from the description above, where the reference location bottom 6128 is attached to the substantially horizontal flange 6107 of the dining plate mating structure 6106, and the sensing location button 6129 attached to the housing base 6113 by articulated attachments 6125, which may be ball-joint-type attachments.

An exemplary electrical circuit block diagram for sensing and control for FIGS. 61F-61G is found in FIG. 3A.

Figure 61H:
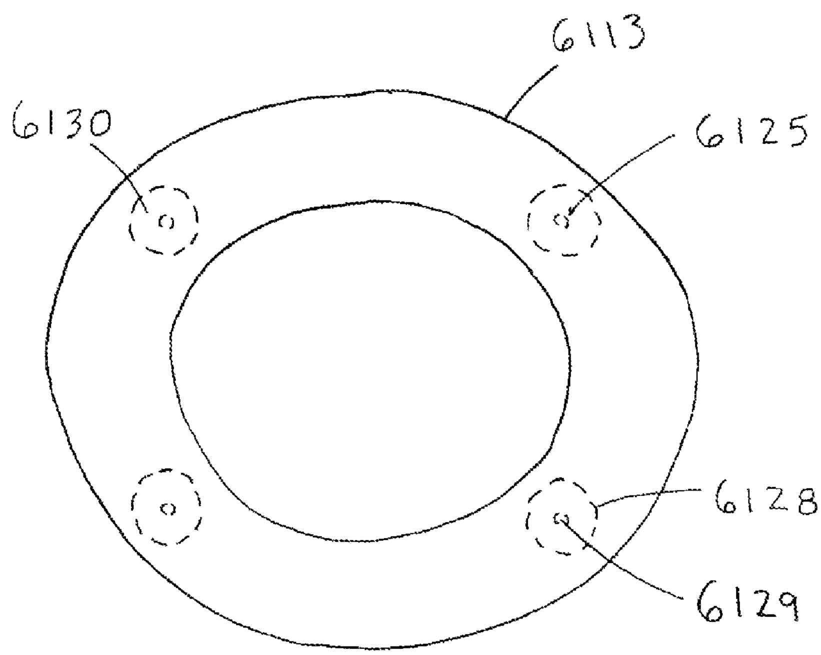
FIG. 61H is a plan view of four disc load sensors positioned symmetrically around the periphery of a housing structure base.

FIG. 61H is a plan view of four disc load sensors 6130 positioned symmetrically around the periphery of a housing structure base 6113. Disc load sensors 6130 differ from disc load cells 6124 in that disc load sensors 6130 only include one strain gage and a fixed resistor; whereas, disc load cells 6124 and beam load cells 6120 include four strain gages each. For stable weight results, typically four disc load sensors 6130 are used to measure a single weight; whereas, disc load cells 6124 and beam load cells 6120 each can measure a weight stably. An exemplary electrical circuit block diagram using a Wheatstone Bridge for sensing weight using the four load sensors 6130 of FIG. 61H is found in FIG. 3B; whereas an exemplary electrical circuit block diagram using a Wheatstone Bridge for sensing weight using the load cells is found in FIG. 2B. If the four load sensors 6130 of FIG. 61H are used to measure weight, the CG of the food cannot be separately determined, as can be done when three or more load cells are used. If the four load sensors 6130 of FIG. 61H are used to measure weight, the sensing circuit of FIG. 3B represents a single weight sensor, such as S1 309 in FIG. 3A, and so S2 and S3 are not needed.

The disc load sensors 6130 may be attached by their reference location bottom 6128 to the housing base 6113, and be attached by their sensing location button 6129 to the substantially horizontal flange 6107 of the dining plate mating structure 6106 by articulated attachments 6125, which may be ball-joint-type attachments. The disc load sensors 6130 may be turned upside down from the description above, where the reference location bottom 6128 is attached to the substantially horizontal flange 6107 of the dining plate mating structure 6106, and the sensing location button 6129 attached to the housing base 6113 by articulated attachments 6125, which may be ball-joint-type attachments.

Figure 61I:
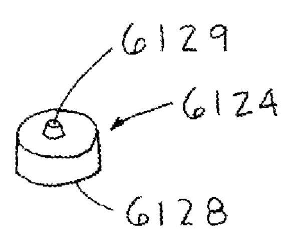
FIG. 61I is a perspective view of a disc load cell.

FIG. 61I is a perspective view of a disc load cell 6124, with a reference location bottom 6128 and sensing location button 6129.

Figure 61J:
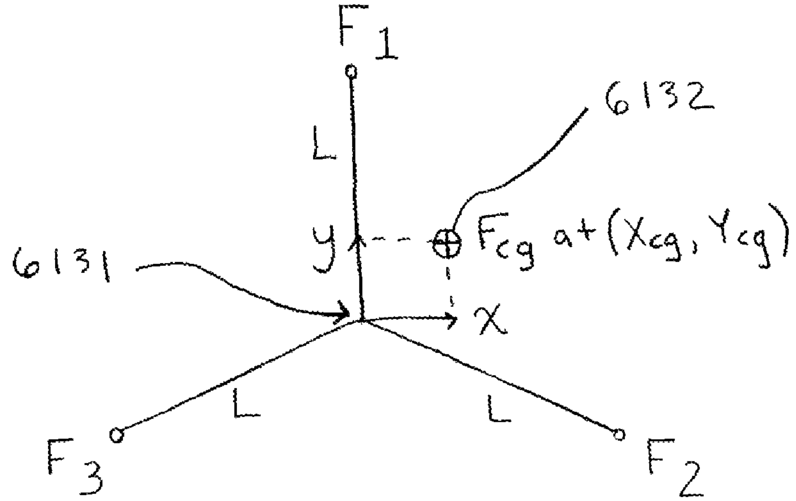
FIG. 61J is a graphical representation of three point forces F1, F2, and F3 sensed by three load cells positioned symmetrically.

FIG. 61J is a graphical representation of three point forces F1, F2, and F3 sensed by three load cells positioned symmetrically, and at lengths L from the center origin 6131, around the periphery of a housing structure base, such as provided by FIGS. 61F and 61G. For example, beam 6120 or disc 6124 load cells may be attached by their reference location bottom 6128 to the housing base 6113, and be attached by their sensing location button 6129 to the substantially horizontal flange 6107 of the dining plate mating structure 6106 by articulated attachments 6125, which may be ball-joint-type attachments.

With the graph of FIG. 61I the magnitude Fcg and coordinate position (Xcg, Ycg) of the center of gravity (CG) 6132 of measured force on the dining plate mating structure 6106, such as due to the weight and location of food, may be calculated from the three measured load-cell forces F1, F2, and F3, as follows:

From the sum of moments about the x-axis: Fcg*Ycg=F1*L−F2*L/2−F3*L/2, and so Ycg=(F1−F2/2−F3/2)*L/Fcg.

From the sum of moments about the y-axis: Fcg*Xcg=F2*L√3−F3*L√3, and so Xcg=(F2−F3)*(L√3)/Fcg.

Where from the sum of all forces: Fcg=F1+F2+F3.

Figure 61K:
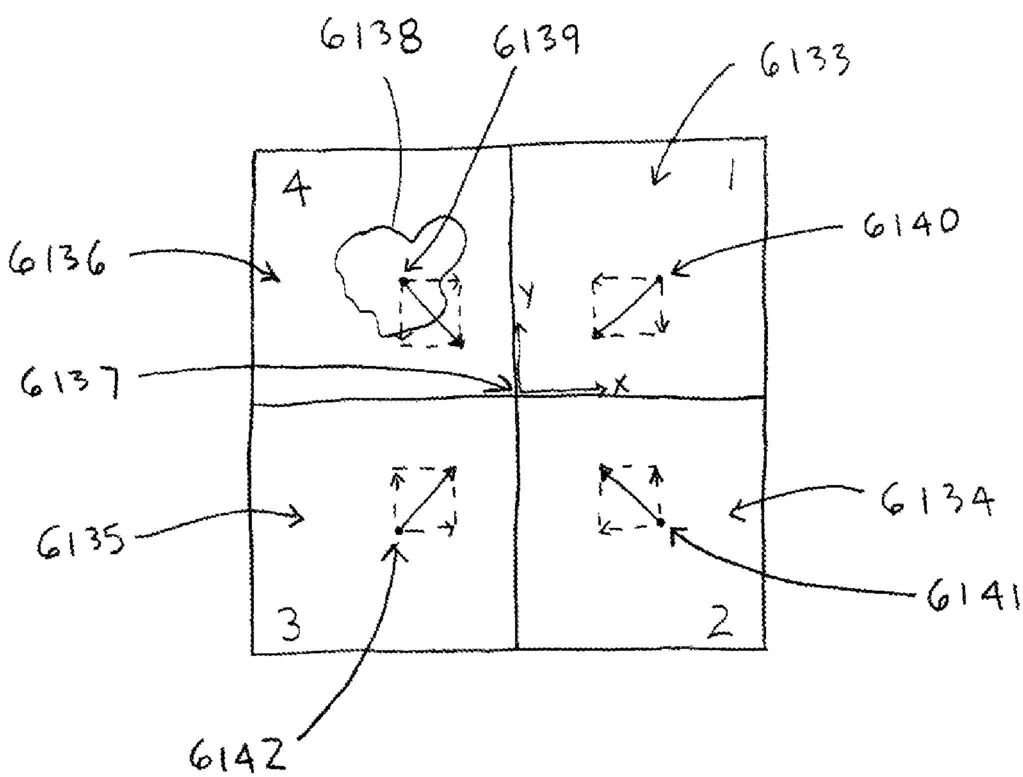
FIG. 61K provides four quadrants of a dining plate mating structure.

FIG. 61K provides four quadrants 6133-6136 of a dining plate mating structure, where the origin is at the center 6137. The four quadrants are numbered 1, 2, 3, and 4 in their corners. Sample food 6138 is provided in quadrant 4 at the CG 6139 shown. Other sample CGs 6140-6142 are shown in the quadrants 1-3. The following four scenarios are true when food is eaten from a quadrant, i.e., when Fcg decreases:

(a) If food is eaten from quadrant 1, then Xcg decreases and Ycg decreases, as indicated by the dashed component arrows in quadrant 1;
(b) If food is eaten from quadrant 2, then Xcg decreases and Ycg increases, as indicated by the dashed component arrows in quadrant 2;
(c) If food is eaten from quadrant 3, then Xcg increases and Ycg increases, as indicated by the dashed component arrows in quadrant 3; and
(d) If food is eaten from quadrant 4, then Xcg increases and Ycg decreases, as indicated by the dashed component arrows in quadrant 4.

Therefore, by determining the direction a CG moves, i.e., whether Xcg and Ycg increase or decrease, then which scenario of (a)-(d) above is known, and the quadrant from which the food was eaten may be determined.

If a CG moves, but Fcg remains unchanged, the diner might be playing with their food.

If Fcg increases, the diner may be pressing with their finger on the dining plate mating structure (e.g., pressing a button), or pressing with a utensil.

FIG. 62 is a side section view of an active foodware system 6200, also called a ChillPlate™, having a dining plate 6201 positioned by an underplate structure 6202, also called a DataPlate™. The dining plate 6201 may be translucent and/or transparent. The dining plate 6201 is positioned 6203 on the underplate 6202 by protruding structure 6204 on the bottom surface 6205 of the dining plate 6201 mating 6206 with cavities 6207 on the top surface 6208 of the underplate 6202. An LED strip 6209 with LEDs 6210 is positioned around the perimeter of the underplate 6202, between the top 6208 and bottom surface 6211 of the underplate 6202, with light 6212 from the LEDs 6210 emitting through the underplate 6202.

The underplate 6202 may have an electronics compartment 6213 including a microprocessor 6214, such as a Nordic nRF52832 (which has Bluetooth communication); a voltage converter and charger module 6215, such as an Adafruit PowerBoost 1000C for converting 3.3 volts to 5 volts; a battery 6216, such as a 2000 mAh lithium polymer (LiPo) battery; and a wireless-charging antenna 6217. There may be a compartment cover 6218. The underplate 6202 may include optional speakers 6219, such as on a slanted portion 6220 of the bottom surface of the underplate 6202. Alternatively, all sound may be provided by speakers of a smart phone (not shown). An app on the smart phone may have one or a plurality of pre-set sound and light effects for the underplate 6202, or may also allow user-definable or configurable music and visual effects for the underplate 6202.

FIG. 63A is a side section view of an active foodware system 6300, also called a ChillPlate™, and also called an IllumiDish™. The active foodware system 6300 includes a dining plate 6301 positioned by an underplate structure 6302 with three plate structures 6303, 6304, 6305 bounding two compartments 6306, 6307. The dining plate 6301 may have a clear center with silver swirly design around the periphery. The underplate structure 6302 has a top light-diffusing plate structure 6303, a middle reflective plate structure 6304, and a bottom component enclosure plate structure 6305. The top 6303, middle 6304, and bottom 6305 plate structures may each have a white light-diffusing center, with silver criss-cross pattern around the periphery. An LED strip 6308 with LEDs 6309 is positioned around the perimeter of the underplate 6302, between the top 6303 and middle 6304 plate structures of the underplate 6302. Since there are no electronics between the top and middle plate structures, light emitting from the LEDs 6309 is better able to illuminate the surface of the middle reflective plate structure 6304, which then reflects the light through the top diffusing plate structure 6303. There may be a side enclosure 6310, such as plastic or rubber, which covers the peripheral edges of the top 6303, middle 6304, and bottom 6305 plate structures.

Electronics are positioned between the middle 6304 and bottom 6305 plate structures, including a microprocessor 6311, such as a Nordic nRF52 (which has Bluetooth communication) and a printed circuit board; a voltage converter and charger module 6312, such as an Adafruit PowerBoost 1000C for converting 3.3 volts to 5 volts; a battery 6313, such as a 3.7 volt lithium polymer (LiPo) battery; and a wireless-charging antenna 6314. The underplate 6302 may include optional smartphone speakers 6315, such as on a slanted portion 6316 of the top surface 6317 of the bottom plate structure 6305. (This speaker configuration is further provided by the side view of FIG. 63D.) There may be two speakers, on opposite sides. Alternatively, there may be disc speakers 6318 placed over holes 6319 in the bottom plate structure 6305, such as three holes, which may be covered with polyurethane laminate (PUL) fabric 6320, to keep water out. (This is further provided by the side view of FIGS. 63B and 63C.)

FIG. 63B is a side section view, and FIG. 63C is a plan view of a disc speaker 6318 placed over holes 6319 in the bottom plate structure 6305, such as three holes. The three holes 6319 allow sound 6321 to pass through, and may be covered with polyurethane laminate (PUL) fabric 6320, to keep water out.

FIG. 63D is a side section view of a smartphone speaker 6315, such as a flat iPhone® speaker, on a slanted portion 6316 of the top surface 6317 of the bottom plate structure 6305. The speaker 6315 emits sound 6322 toward the side enclosure 6310 having a hole 6323 to allow sound 6324 to pass through, and may be covered with polyurethane laminate (PUL) fabric 6325, to keep water out.

Figure 64:
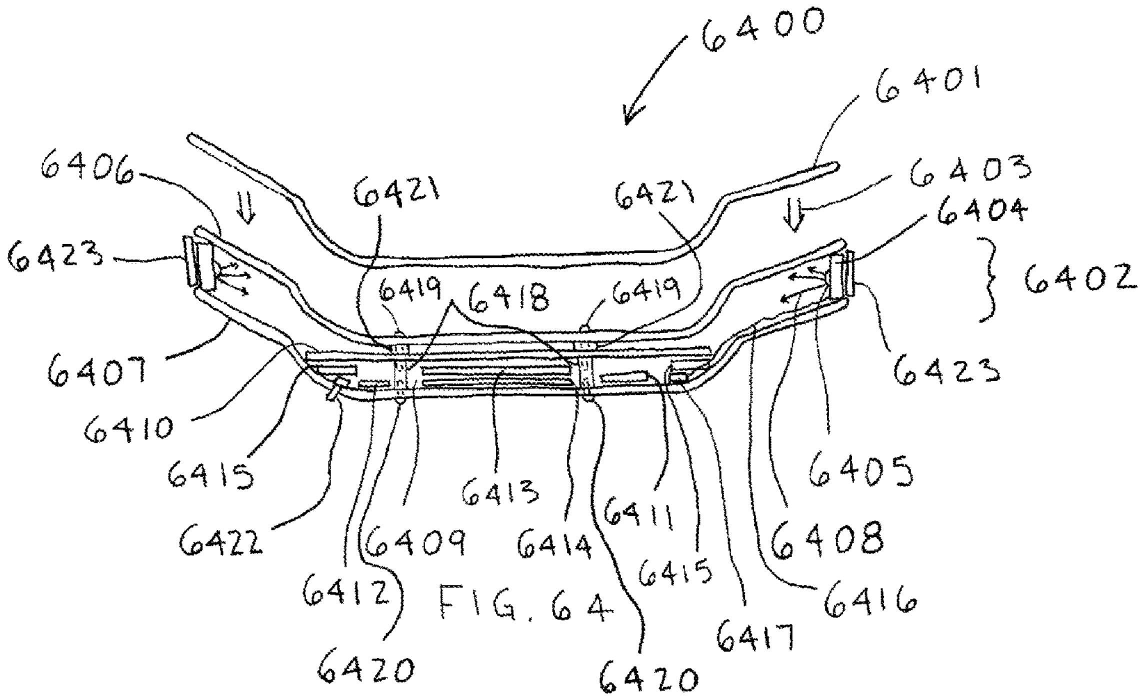
FIG. 64 is a side section view of an active foodware system, also called an IllumiDish™, having a dining plate positioned by an underplate structure. An LED strip with LEDs is positioned around the perimeter of the underplate.

FIG. 64 is a side section view of an active foodware system 6400, also called an IllumiDish™, having a dining plate 6401 positioned 6403 by an underplate structure 6402. The active foodware system 6400 of FIG. 64 is similar in many aspects to the active foodware system 6200 of FIG. 62. An LED strip 6404 with LEDs 6405 is positioned around the perimeter of the underplate 6402, between a top light-diffusing plate structure 6406 and a bottom light-reflecting plate structure 6407 of the underplate 6402. Light 6408 emits from the LEDs 6405.

The underplate 6402 may have an electronics area 6409 between an electronics area top cover 6410 and the bottom reflecting plate structure 6407. The electronics area 6409 typically includes a microprocessor 6411, such as a Nordic nRF52832 (which has Bluetooth communication); a voltage converter and charger module 6412, such as an Adafruit PowerBoost 1000C for converting 3.3 volts to 5 volts; a battery 6413; and a wireless-charging antenna 6414, such as a Qi antenna. The electronics area top cover 6410 may be a white plastic disc. The top cover 6410 may optionally be covered with aluminum foil or other reflective coating. The underplate 6402 may include speakers 6415. An electrical wire 6416 is shown in FIG. 64 to extend from the LED strip 6404 to a capacitor 6417 in the electronics area 6409. Typically the electrical wire 6416 is white, or in white heat shrink, so not as visible through the top light-diffusing plate 6406.

The top plate structure 6406, bottom plate structure 6407, and top cover 6410 may be held together with standoffs 6418. Four threaded standoffs 6418 may be used with top screws 6419 or bolts, and bottom screws 6420 or bolts. Thick washers 6421 may be used between the top plate structure 6406 and the top cover 6410. There may be an on/off slider switch 6422. An LED cover 6423, which may have the product name on it, covers the LED strip 6404 around the periphery.

Figure 65:
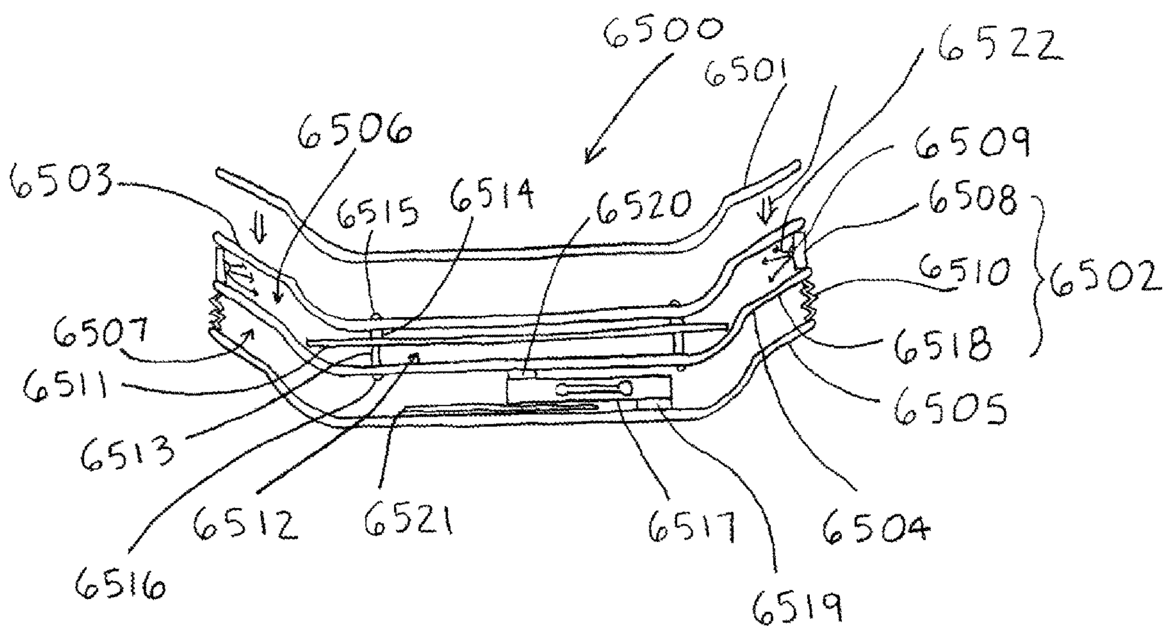
FIG. 65 is a side section view of an active foodware system, also called an IllumiDish™ plus weight sensing. A load cell for sensing weight is placed in a compartment between middle and bottom plate structures.

FIG. 65 is a side section view of an active foodware system 6500, also called an IllumiDish™ plus weight sensing. The active foodware system 6500 is similar in some aspects to the active foodware system 6300 of FIG. 63A, and includes a dining plate 6501 positioned by an underplate structure 6502 with three plate structures 6503, 6504, 6505 bounding two compartments 6506, 6507. The underplate structure 6502 has a top light-diffusing plate structure 6503, a middle reflective plate structure 6504, and a bottom electronics plate structure 6505. An LED strip 6508 with LEDs 6509 for emitting light 6522 is positioned around the perimeter of the underplate 6502, between the top 6503 and middle 6504 plate structures of the underplate 6502. A bellows 6510 surrounds the periphery of the compartment 6507 between the middle 6504 and bottom 6505 plate structures. Similar to the active foodware system 6400 of FIG. 64, there is an electronics area top cover 6511 over an electronics area 6512, and also standoffs 6513, washers 6514, top screws 6515 or bolts, and bottom screws 6516 or bolts, for holding together the top plate structure 6503, electronics area top cover 6511, and middle plate structure 6504. The electronics area 6512 typically includes electronics for light and sound, a battery, and the like (none shown in FIG. 65; refer to FIGS. 62-64).

A load cell 6517 for sensing weight may be placed in the compartment 6507 between the middle 6504 and bottom 6505 plate structures. Although not provided in FIG. 65, a load cell may be placed under a substantially horizontal peripheral flange 6518 of the middle plate structure 6504. A load cell may be positioned to the side of the bottom electronics plate structure 6505, and attached to a cantilever beam that extends under, and attaches to, the middle reflecting plate structure 6504. As shown in FIG. 65, a beam load cell 6517 attaches at one end to a first attachment structure 6519 attached to the bottom electronics plate structure 6505, and attaches at the other end to a second attachment structure 6520 attached to, and supporting, the middle reflecting plate structure 6504. The second attachment structure 6520 may include a cantilever. This compartment 6507 may also include a wireless charging antenna 6521.

Figure 66A:
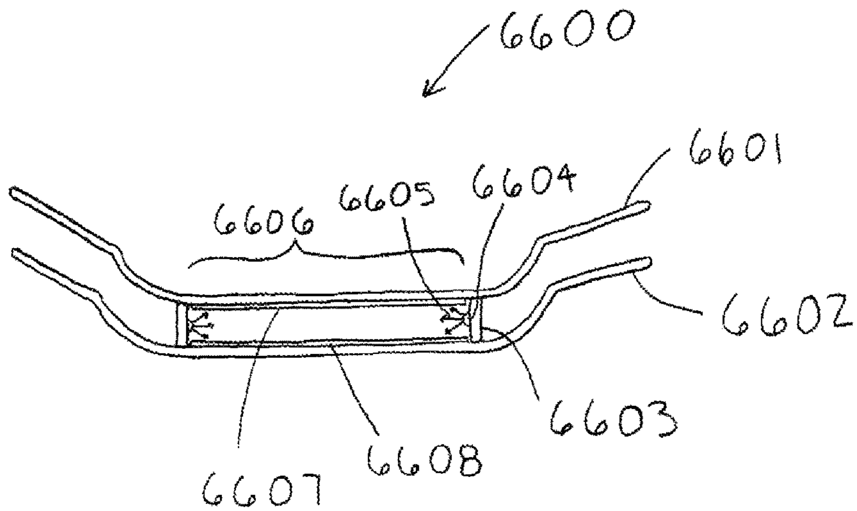
FIGS. 66A-66B are side section views of active foodware systems using an "infinity mirror" arrangement to provide the impression of a "bottomless plate".

FIG. 66A is a side section view of an active foodware system 6600 using an "infinity mirror" arrangement to provide the impression of a "bottomless plate". There is a top plate 6601 and a bottom plate 6602. Between the top 6601 and bottom 6602 plate is an LED strip 6603 with LEDs 6604 for emitting light 6605. The position of the LED strip 6603 is surrounding a middle portion 6606 between the top 6601 and bottom 6602 plates, with the LED strip 6603 inset from the outer periphery. The top plate 6601 is clear. Under the clear portion of the top plate 6601, and in the middle of the LED strip 6603, is a half-silvered mirror 6607, or a 2-way mirror, or see-through and/or tinted reflective coating, for example, car window tinting. On the bottom plate 6602, also in the middle of the LED strip 6603, is a fully reflective coating 6608, for example, mirrored Mylar.

Figure 66B:
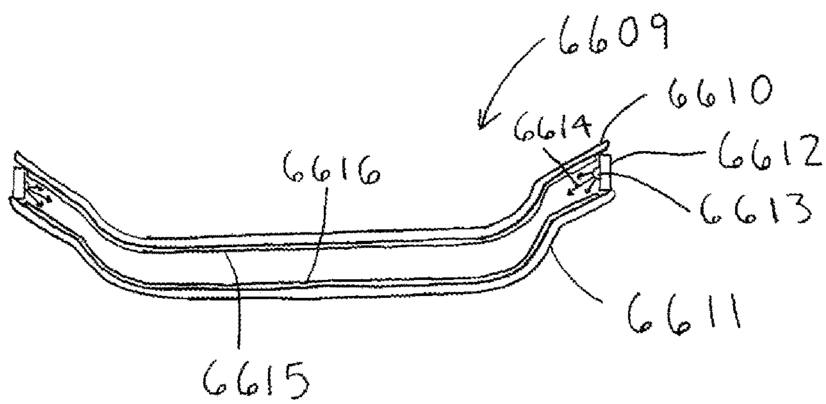

FIG. 66B is a side section view of an alternate embodiment 6609 of the active foodware system 6600. Similar to FIG. 66A, there is a top plate 6610 and a bottom plate 6611. Between the top 6610 and bottom 6611 plate is an LED strip 6612 with LEDs 6613 for emitting light 6614. The position of the LED strip 6612 is surrounding the top 6610 and bottom 6611 plates near the outer periphery. Optionally, an additional LED strip (not shown in FIG. 66B) may surround a middle portion between the top 6610 and bottom 6611 plates and inset from the outer periphery, such as in a similar position to the LED strip 6603 of FIG. 66A. Similar to FIG. 66A, in FIG. 66B in the middle of the LED strip 6612, and covering most of the underside of the top plate 6610, is a half-silvered mirror 6615, or a 2-way mirror, or see-through and/or tinted reflective coating, for example, car window tinting. On the bottom plate 6611, also in the middle of the LED strip 6612, and covering most of the top side of the bottom plate 6611, is a fully reflective coating 6616, for example, mirrored Mylar.

Figure 66C:
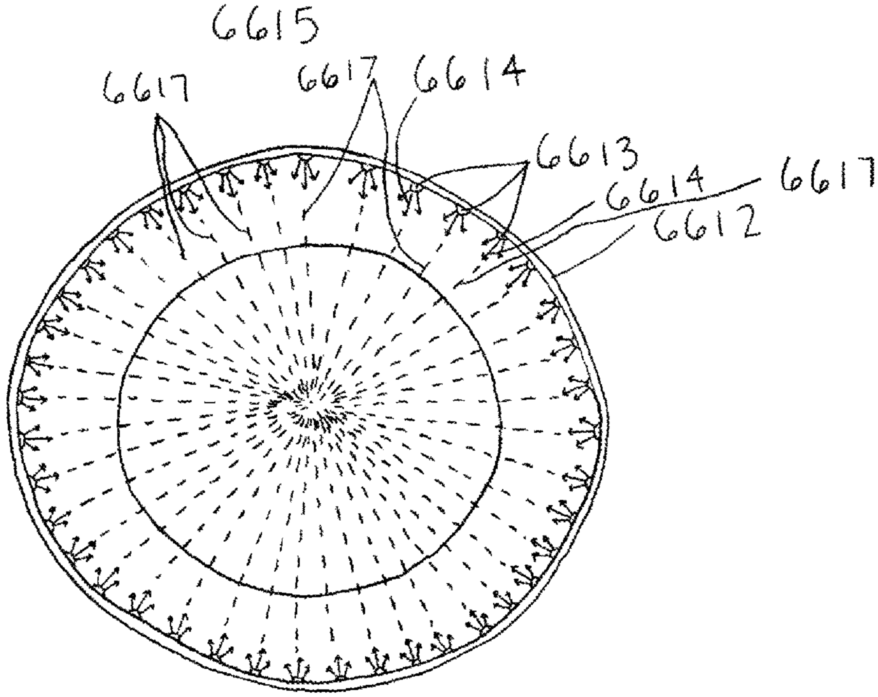
FIG. 66C is a plan view of the embodiment of FIG. 66B.

FIG. 66C is a plan view of the embodiment 6609 of FIG. 66B. When the LEDs 6613 of the LED strip 6612 are illuminated, the emitted light 6614 repeatedly reflects 6617 between the half-silvered mirror 6615 on the underside of the top plate 6610 and the fully reflective coating 6616 on the top side of the bottom plate 6611, and so the light 6614 from each LED 6613 appears to reflect forever to infinity.

Figure 67:
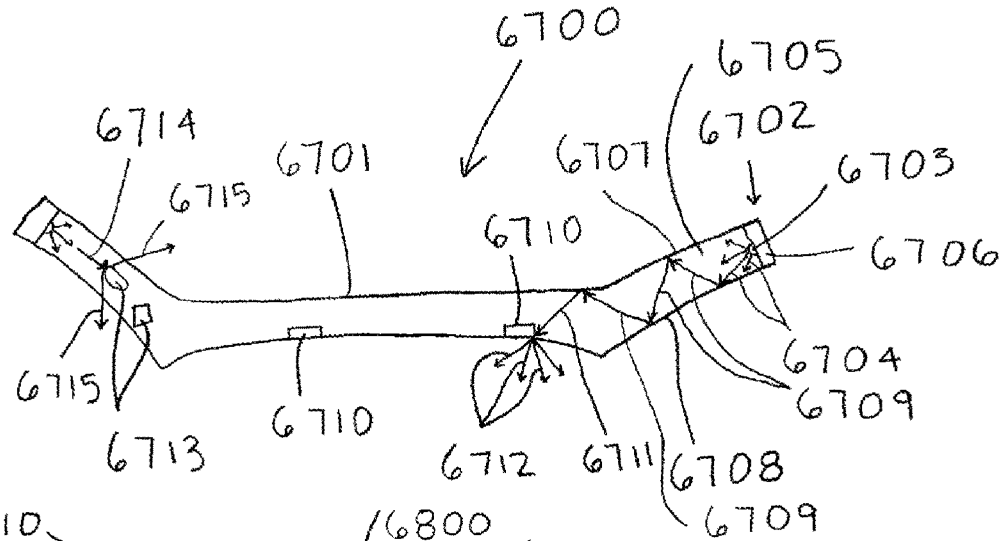
FIG. 67 is a side section view of an active foodware system. The active foodware system includes a dining plate that is edge lit, i.e., lighted around the edge. The dining plate may include etching on the surface and/or interstitials for scattering light.

FIG. 67 is a side section view of an active foodware system 6700. The active foodware system 6700 includes a dining plate 6701 that is edge lit, i.e., lighted around the edge 6702. The edge 6702 may be lighted with LEDs 6703 positioned around the perimeter of the dining plate 6701 for emitting light 6704 into the dining plate material 6705. An LED strip 6706 around the perimeter of the dining plate 6701 may include the LEDs 6703. When the light 6704 strikes a surface of the dining plate 6701, such as the top surface 6707 or bottom surface 6708, where the angle of incidence is greater than the critical angle (according to Snell's law based on the index of refraction of the dining plate material), the light is internally reflected 6709.

The dining plate 6701 may include etching 6710 on the surface for scattering light. That is, etching 6710 a surface creates a roughened portion where the angle of incidence for some of the light 6711 is less than the critical angle, and so that incident light 6711 is not internally reflected, allowing that light 6711 to exit 6712 the dining plate 6701 and to be seen by an observer.

The dining plate 6701 may also include interstitials 6713 for scattering light. A portion 6714 of the light 6704 may be redirected by the interstitials 6713 to strike the surface of the dining plate 6701 at an angle of incidence less than the critical angle, allowing that portion 6714 to exit 6715 the dining plate 6701 and be seen by the observer.

Figure 68A:
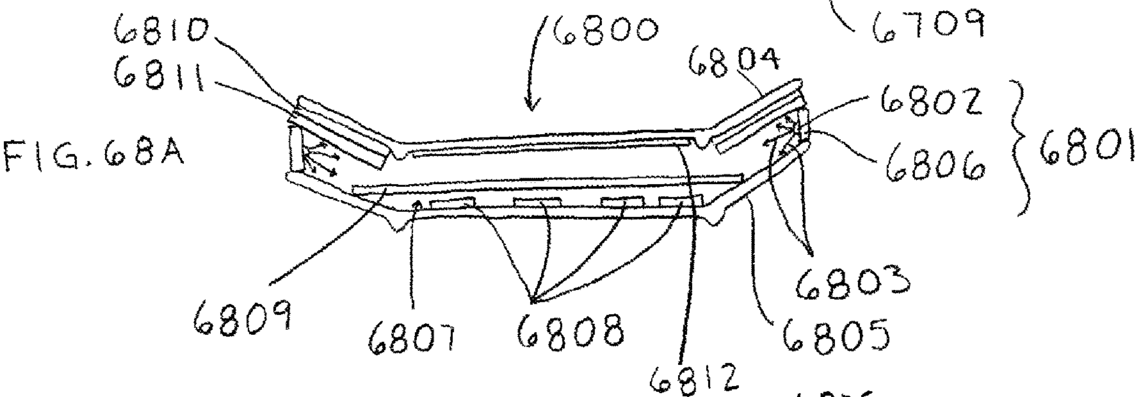
FIGS. 68A-68B are side section views of active foodware systems, also called an IllumiDish™. LEDs for emitting light are positioned around the perimeter of the underplate. The underplate has an electronics area.

FIG. 68A is a side section view of an active foodware system 6800, also called an IllumiDish™. The active foodware system 6800 of FIG. 68A is similar in many aspects to the active foodware system 6400 of FIG. 64. The active foodware system 6800 includes an underplate 6801. LEDs 6802 for emitting light 6803 are positioned around the perimeter of the underplate 6801, and between a top plate structure 6804 and a bottom plate structure 6805 of the underplate 6801. The LEDs 6802 may be part of an LED strip 6806. The top 6804 and bottom 6805 plate structures may be clear glass or plastic plates. Alternatively, the top plate structure 6804 may be glass, and the bottom plate structure 6805 may be plastic, and the like.

The underplate 6801 may have an electronics area 6807 including electronics 6808. The electronics area 6807 is between an electronics top cover 6809 (also called a divider disk) and the bottom plate structure 6805. Under the top plate structure 6804 may be decorative rims 6810 or additional translucent designs 6811. The decorative rims 6810 may be plastic. Also under the top plate structure 6804 may be translucent "contact paper" and/or adhesive plastic 6812 to diffuse light. The translucent "contact paper" and/or adhesive plastic 6812 may be mirrored or white. There may also be a half-silvered mirror.

Figure 68B:
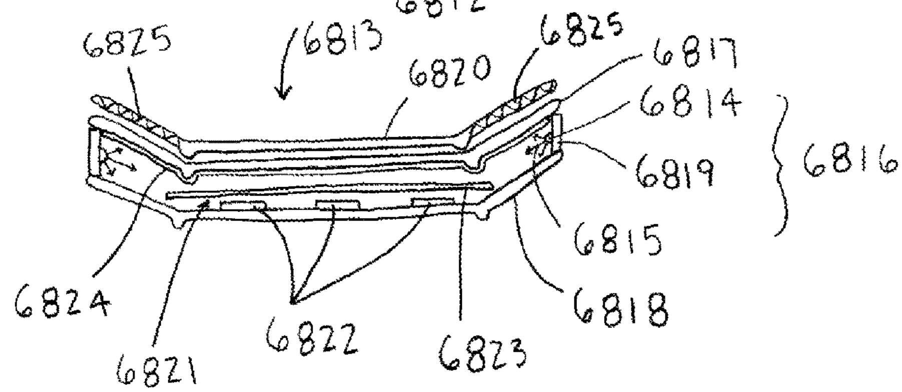

FIG. 68B is a side section view of another embodiment 6813 of the active foodware system 6800 of FIG. 68A. The embodiment 6813 includes an underplate 6816. Similar to the active foodware system 6800 of FIG. 68A, LEDs 6814 for emitting light 6815 are positioned around the perimeter of the underplate 6816, and between a top plate structure 6817 and a bottom plate structure 6818 of the underplate 6816. The LEDs 6814 may be part of an LED strip 6819. The top plate structure 6817 may be clear glass or durable plastic, and the bottom plate structure 6818 may be opaque glass or durable plastic. The embodiment 6813 may also include an optional dining plate 6820, which may be glass, durable plastic, disposable plastic, and the like. The dining plate 6820 may have translucent characters and/or designs 6825.

The underplate 6816 may have an electronics area 6821 including electronics 6822. The electronics area 6821 is between an electronics top cover 6823 and the bottom plate structure 6818. Under the top plate structure 6817 may be translucent adhesive film 6824. The translucent adhesive film 6824 may be mirrored or white. There may also be a half-silvered mirror or 2-way mirror.

Figure 68C:
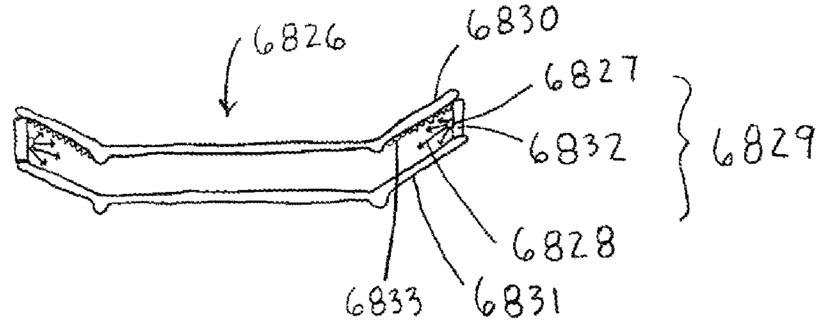
FIG. 68C is a side section view of another embodiment, where under the top plate structure the surface may be frosted, glazed, and/or roughened to diffuse light.

FIG. 68C is a side section view of another embodiment 6826 of the active foodware system 6800 of FIG. 68A. The embodiment 6826 includes an underplate 6829. Similar to the active foodware system 6800 of FIG. 68A, LEDs 6827 for emitting light 6828 are positioned around the perimeter of the underplate 6829, and between a top plate structure 6830 and a bottom plate structure 6831 of the underplate 6829. The LEDs 6827 may be part of an LED strip 6832. Under the top plate structure 6830 the surface 6833 may be frosted, glazed, and/or roughened to diffuse light.

Figure 69:
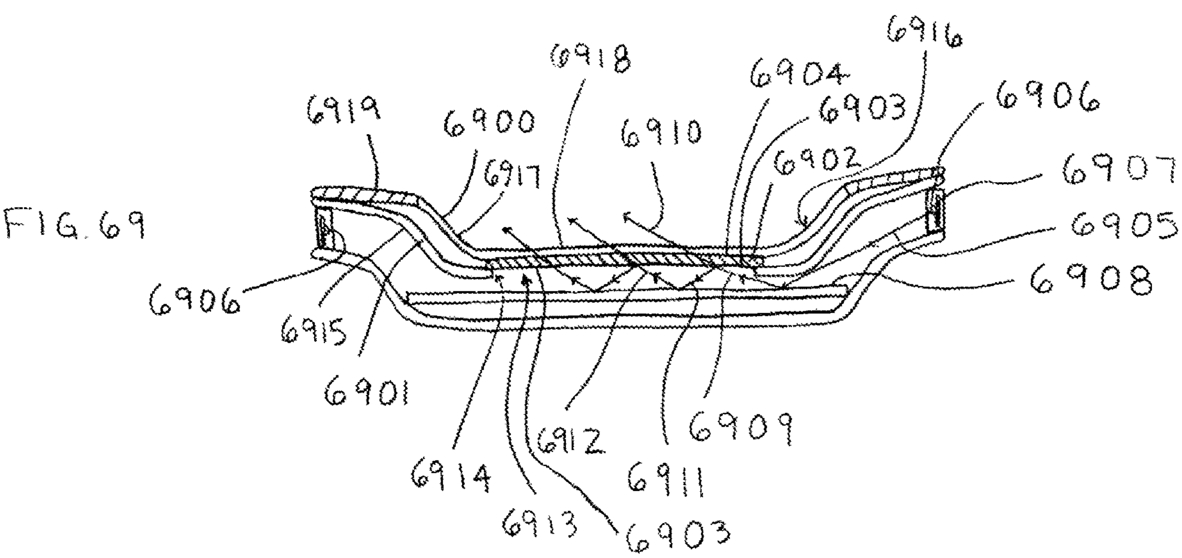
FIG. 69 is a side view of an active foodware system that creates an optical illusion for a user viewing from above that the dining plate is infinitely deep and/or there is an infinite amount of food on the dining plate.

FIG. 69 is a side view of an active foodware system that creates an optical illusion for a user viewing from above that the dining plate 6900 is infinitely deep and/or there is an infinite amount of food on the dining plate 6900. The active foodware system of FIG. 69 has many similar aspects to the active foodware system 6600 of FIGS. 66A-66C, the active foodware system 6400 of FIG. 64, the active foodware system 6500 of FIG. 65, and the embodiment 6813 of FIG. 68B. The active foodware system of FIG. 69 includes a dining plate mating structure 6901. The dining plate mating structure 6901 and/or the dining plate 6900 includes a 2-way mirror 6902, half-silvered mirror, mirrored translucent adhesive film, or the like. The surface of the 2-way mirror 6902 that faces down is the reflective surface 6903, and the surface facing up is the translucent surface 6904. Light 6905 is provided from one or a plurality of light sources 6906, typically positioned at the perimeter of the dining plate mating structure 6901, and directing light radially inward. The light sources 6906 may be LEDs, and may be LEDs on an LED strip 6907 surrounding the dining plate mating structure 6901. A reflective surface 6908, which may include a 1-way mirror, is used to reflect light up 6909 toward the reflective surface 6903 of the 2-way mirror 6902. The 2-way mirror 6902 permits a transmitted portion 6910 of the light to pass through for the user to see from above, and reflects a reflected portion 6911 of the light back toward the reflective surface 6908 of the 1-way mirror, which again reflects the light back 6912 toward the reflective surface 6903 of the 2-way mirror 6902. This internal reflection continues. The multiple reflections between the reflective surface 6908 of the 1-way mirror and the reflective surface 6903 of the 2-way mirror 6902 create an optical illusion for the user viewing from above that the dining plate 6900 is infinitely deep and there is an infinite amount of food on the dining plate 6900.

The dining plate mating structure 6901 may be opaque white (such as a white "King Zak™" plate), and may have an opening 6913 cut out. The opening 6913 may be covered by a 2-way mirror 6902 or half-silvered mirror, where the 2-way mirror 6902 may be attached 6914 to the opening 6913 along its edge, with 8 mil double-stick tape. In this embodiment, light 6905 from the light sources 6906 only passes through the 2-way mirror 6902 and not through the opaque white portion 6915 of the dining plate mating structure 6901.

The dining plate 6900 may have a clear portion 6916, including a side wall 6917 and recessed center portion 6918, where the side wall 6917 inclines from the recessed center portion 6918 to a perimeter flange 6919. The perimeter flange 6919 may have a silver vine pattern.

A translucent image, which may include a character, design, text, and the like, may be included to enhance the effect of the multiple reflections and optical illusion. The translucent image may be included between the reflective surface 6908 of the 1-way mirror and the reflective surface

6903 of the 2-way mirror 6902. The translucent image may be included above the reflective surface 6903 of the 2-way mirror 6902, or at another location which provides the desired effect. In a useful embodiment, the reflective surface 6903 of the 2-way mirror 6902 may be on the bottom of a dining plate mating structure 6901, and the translucent image may be molded into a dining plate 6900 mated with the dining plate mating structure 6901. The translucent image may include a translucent film, translucent ink, reflective elements molded into a translucent structure, and the like.

The active foodware system of FIG. 69 may include a sensing component, such as one or a plurality of load cells or load sensors. The active foodware system of FIG. 69 may include an auditory stimulating component, which may include speakers. Light and lighting effects from the light sources 6906 may be synchronized with sound from the auditory stimulating component. The light and sound may be related to, or controlled by, a sensing signal from the sensing component. The active foodware system of FIG. 69 may include electrical components such as provided by FIGS. 2A-2B and 3A-3B.

Figure 70:
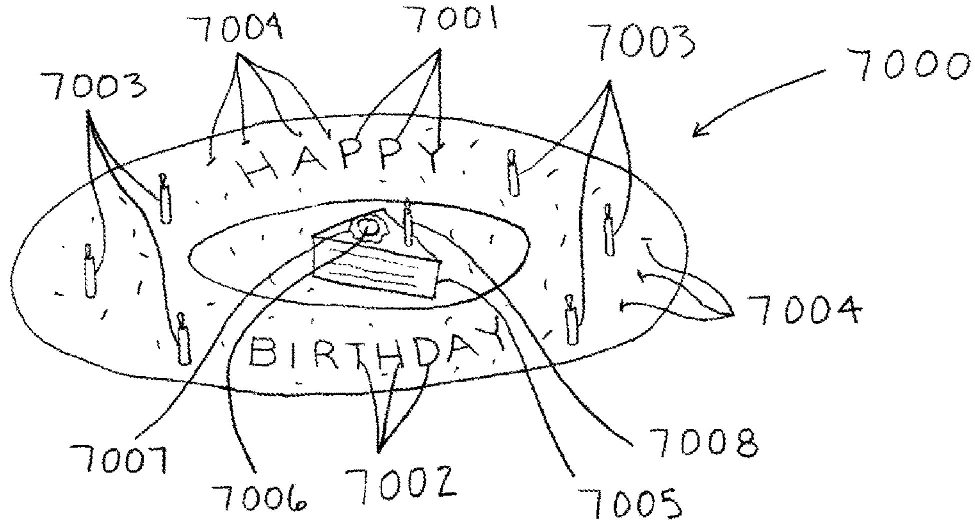
FIG. 70 is a perspective view of a dining plate for use with the active foodware systems described herein having a transparent or translucent dining plate with dining plate mating structures and/or underplates having LEDs.

FIG. 70 is a perspective view of a dining plate 7000 for use with the active foodware systems described herein having a transparent or translucent dining plate with dining plate mating structures and/or underplates having LEDs. The dining plate 7000 has a design. The design may include a transparency with a printed design. In this embodiment, the design includes the words, "HAPPY BIRTHDAY" 7001, 7002, six candles 7003, and confetti 7004. Such a design may be for a dessert plate, such as for holding birthday cake 7005 with a cherry 7006 on whipped cream 7007, and a physical candle 7008. In an exemplary operation, the LEDs of the underplate (not shown) near the word, "HAPPY" 7001, are illuminated first. Then, the LEDs of the underplate near the word, "BIRTHDAY" 7002, are illuminated. Then, each transparency candle 7003 may be illuminated sequentially by the two to three nearest LEDs. Each transparency candle 7003 in the sequence may be illuminated slowly, from 0% to 100% of full brightness. If the active foodware system provides sound, then a Happy Birthday audio file may be played, such as an MP3 of "Birthday" by the Beatles.

Figure 71A:
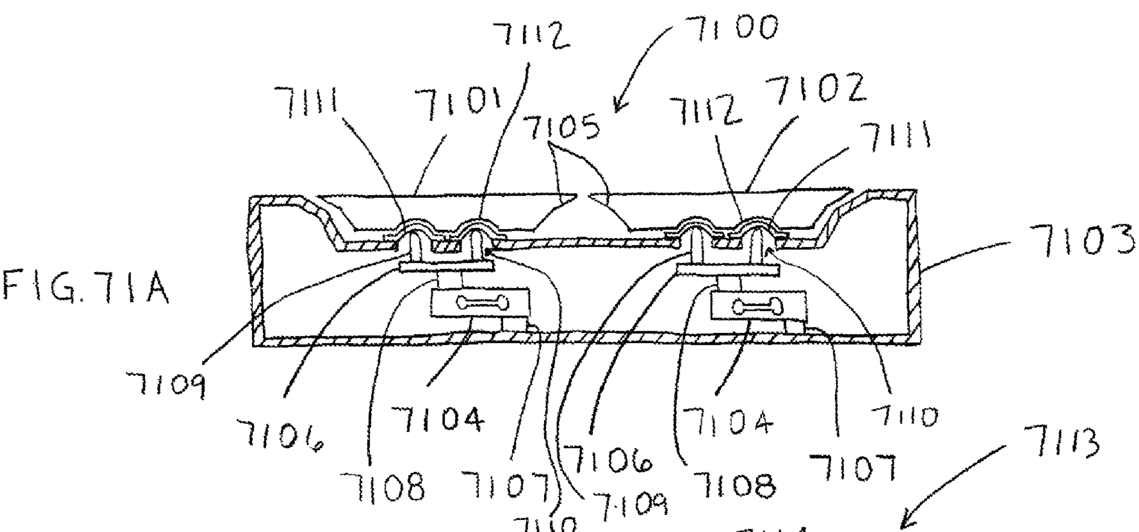
FIG. 71A is a side section view of an active foodware system having two separate food dishes. Under each dish, and inside a housing structure, is a load cell for sensing weight.

FIG. 71A is a side section view of an active foodware system 7100 having two separate food dishes 7101, 7102. Under each dish 7101, 7102, and inside a housing structure (also called a base) 7103, is a load cell 7104 for sensing weight. The load cells 7104 may be positioned under the substantially horizontal flanges 7105 surrounding the dishes. Each of the load cells 7104 may also be positioned to the side of the flanges 7105 and attached to a cantilever beam that extends under the support structures 7106 for the dishes 7101, 7102. As shown in FIG. 71A, each of the beam load cells 7104 may attach at one end to a first attachment structure 7107 attaching to the bottom of the housing structure 7103, and may attach at the other end to a second attachment structure 7108 attaching to a support structure 7106 with sensing protrusions 7109 that support the dishes 7101, 7102. The second attachment structure 7108 may include a cantilever.

The sensing protrusions 7109 extend through openings 7110 in the housing structure 7103. The openings 7110 may be covered by silicone rubber diaphragms 7111 to create a water seal for the housing structure 7103. The sensing protrusions 7109 contact the diaphragms 7111. There may be depressions 7112 or indentations in the food dishes 7101, 7102 to register the dishes 7101, 7102 with the sensing protrusions 7109. Each of the dishes 7101, 7102 is on sensing protrusions 7109 for a different load cell 7104, but the depressions in each of the dishes 7101, 7102 aren't so deep that the rest of each of the dishes 7101, 7102 touches the housing structure 7103. In this way, the weight of food in each of the food dishes 7101, 7102 may be sensed by the load cells 7104 in the watertight housing structure 7103.

Figure 71B:
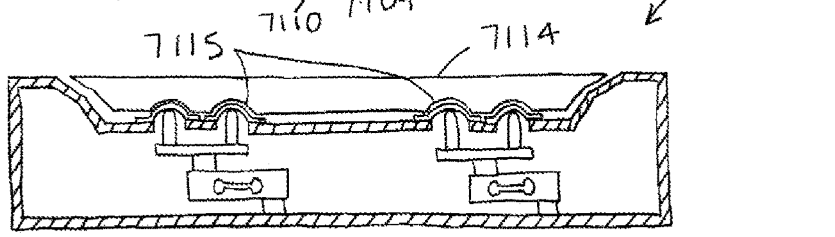
FIG. 71B is a side section view of an active foodware system, similar to the active foodware system of FIG. 71A, but having a single food dish straddling multiple load cells.

FIG. 71B is a side section view of an active foodware system 7113, similar to the active foodware system of FIG. 71A, but having a single food dish 7114. The single food dish 7114 has depressions 7115 or indentations to register the dish 7114 with the sensing protrusions 7109, and straddling multiple load cells 7104.

Figure 72:
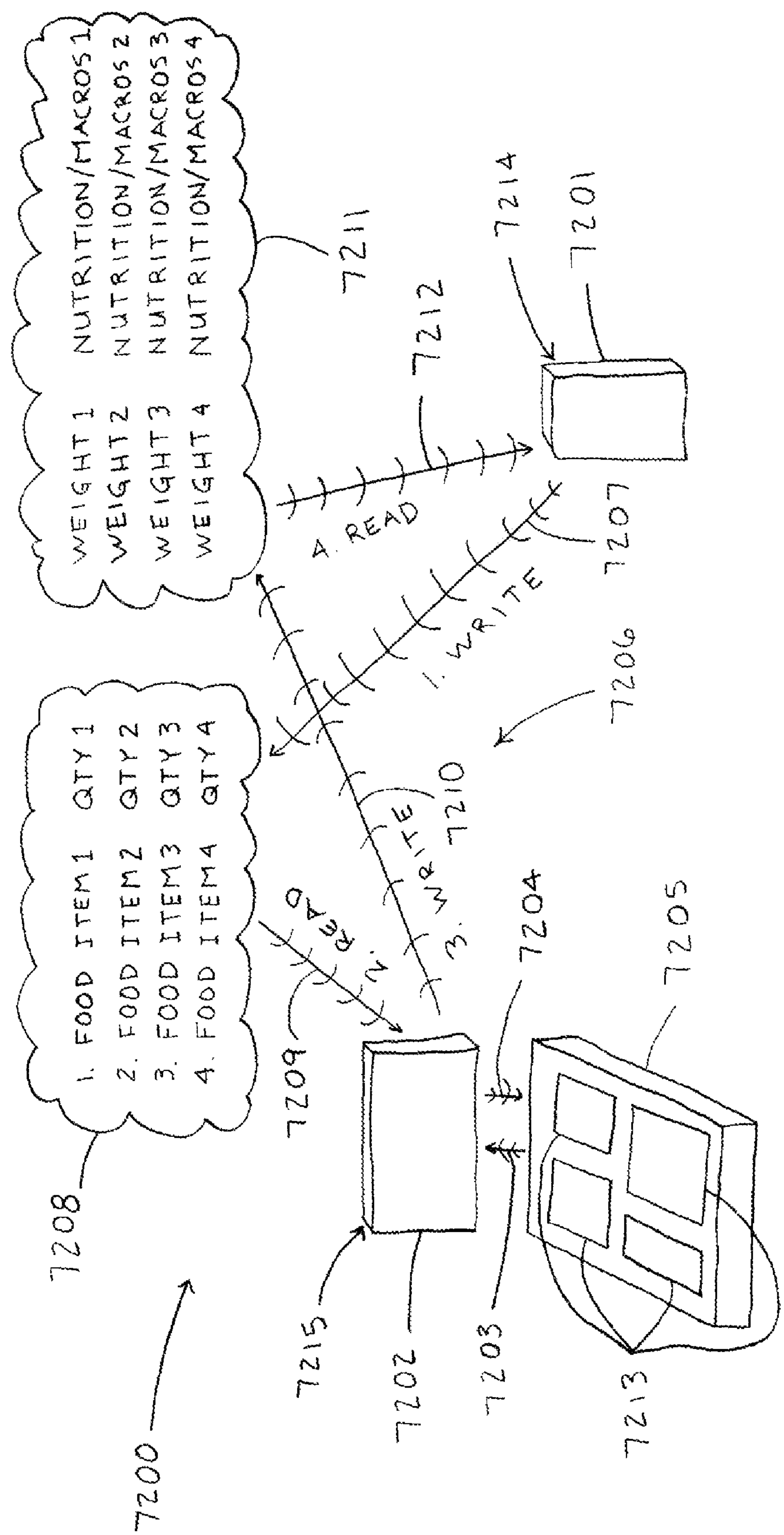
FIG. 72 is a flow diagram for processing nutrition information.

FIG. 72 is a flow diagram 7200 for processing nutrition information. Some components relating to the flow diagram 7200 are described as follows:

1. CCA 7214=calorie-counting software application (such as MyFitnessPal™, LoseIt!™, and the like);
2. UC 7201=user's own computer (such as a mobile phone, tablet computer, smart watch, laptop computer, deskside computer, and the like);
3. MSC 7202=mechanical structure application computer (such as a mobile phone, tablet computer, smart watch, laptop computer, deskside computer, and the like) (such as the mobile communication device 107 of the active foodware system 100 of FIG. 1A);
4. MS 7205=inventive mechanical structure, also referred to as SmartDish™, for sensing the weight of food in each dining dish (such as the housing structure 101 of the active foodware system 100 of FIG. 1A and/or the mechanical housing structure 7336 of the useful embodiment of the active foodware system 7337 of FIG. 73A, and the like); and
5. MSA 7215=mechanical structure software app.

The diagram 7200 provides an alternative to various CCAs 7214 running on a UC 7201 from each communicating directly with an MSC 7202 that may be connected wirelessly or by wire for reading 7203 and writing 7204 with the MS 7205. In the diagram 7200, wireless data communication is indicated by a series of curved lines across a communication arrow. The MSC 7202 may be the same device as the UC 7201, or it may be a separate device. The MSC 7202 may run the MSA 7215, where the MSA 7215 may control the operation of the MS 7205. The MSA 7215 running on the MSC 7202 may communicate with the MS 7205 using Bluetooth, Bluetooth Low Energy (BLE), or other convenient wireless or wired connection for reading 7203 and writing 7204 data.

In a first step of the flow diagram 7200, the UC 7201 running the user's selected CCA 7214 may send (or write) 7207 wirelessly or by wire food-item data to GoogleFit™, which may be in "the cloud" 7208. The communication may be over the internet 7206. The MSA 7215 may allow the user to assign each food item to a specific dining dish location 7213 on their MS 7205. For example, as provided by the cloud element 7208 of FIG. 72, the dining dish location 7213 designated as location #1 is assigned a food item #1 with quantity value #1; the dining dish location 7213 designated as location #2 is assigned a food item #2 with quantity value #2; the dining dish location 7213 designated as location #3 is assigned a food item #3 with quantity value #3; and the dining dish location 7213 designated as location #4 is assigned a food item #4 with quantity value #4. In a second step, if GoogleFit also contains the nutrient/gram conversions for each food item, those values may be read 7209 wirelessly or by wire by the MSA 7215 and used. The communication may be over the internet 7206. Otherwise, the MSA 7215 may look up the food item, for instance, using a United States Department of Agriculture (USDA) database. The weight and nutrition information for each food item in the dining dishes 7213 of the MS 7205 may then be displayed on the MSC 7202 by the MSA 7215.

The user may view the food weight and/or nutrition data displayed on the MSC 7202, and re-enter it as a corrected quantity into their CCA 7214 on their UC 7201, e.g., they may replace a 6" banana with 15 g of banana. Or, in a third step, the MSA 7215 may write 7210 wirelessly or by wire the food weight and/or nutrition data to the internet "cloud," e.g., GoogleFit, IllumidineNutrition, and/or another weight and/or nutrition repository 7211 (that may have its own OAuth internet protocol code to regulate access). For example, as provided by the cloud element 7211 of FIG. 72, the dining dish location 7213 designated as location #1 is listed as sensing food with weight #1 having nutrition/macros value #1; the dining dish location 7213 designated as location #2 is listed as sensing food with weight #2 having nutrition/macros value #2; the dining dish location 7213 designated as location #3 is listed as sensing food with weight #3 having nutrition/macros value #3; and the dining dish location 7213 designated as location #4 is listed as sensing food with weight #4 having nutrition/macros value #4. Then, in a fourth step, the CCA 7214 may read 7212 wirelessly or by wire the data from the nutrition repository 7211 and update automatically. The communication may be over the internet 7206.

Accordingly, the CCA 7214 doesn't need to communicate directly with the MSA 7215. It may get the food data, such as weight and/or nutrition data, from a secure cloud database 7211.

The MS 7205 may be made a "sensor" for GoogleFit to pair with a mobile device or other computer. Then, the MS 7205 "sensor" would be a "software sensor" available to a variety of applications, such as Android® and iPhone® apps, as a data source object.

Figure 73A:
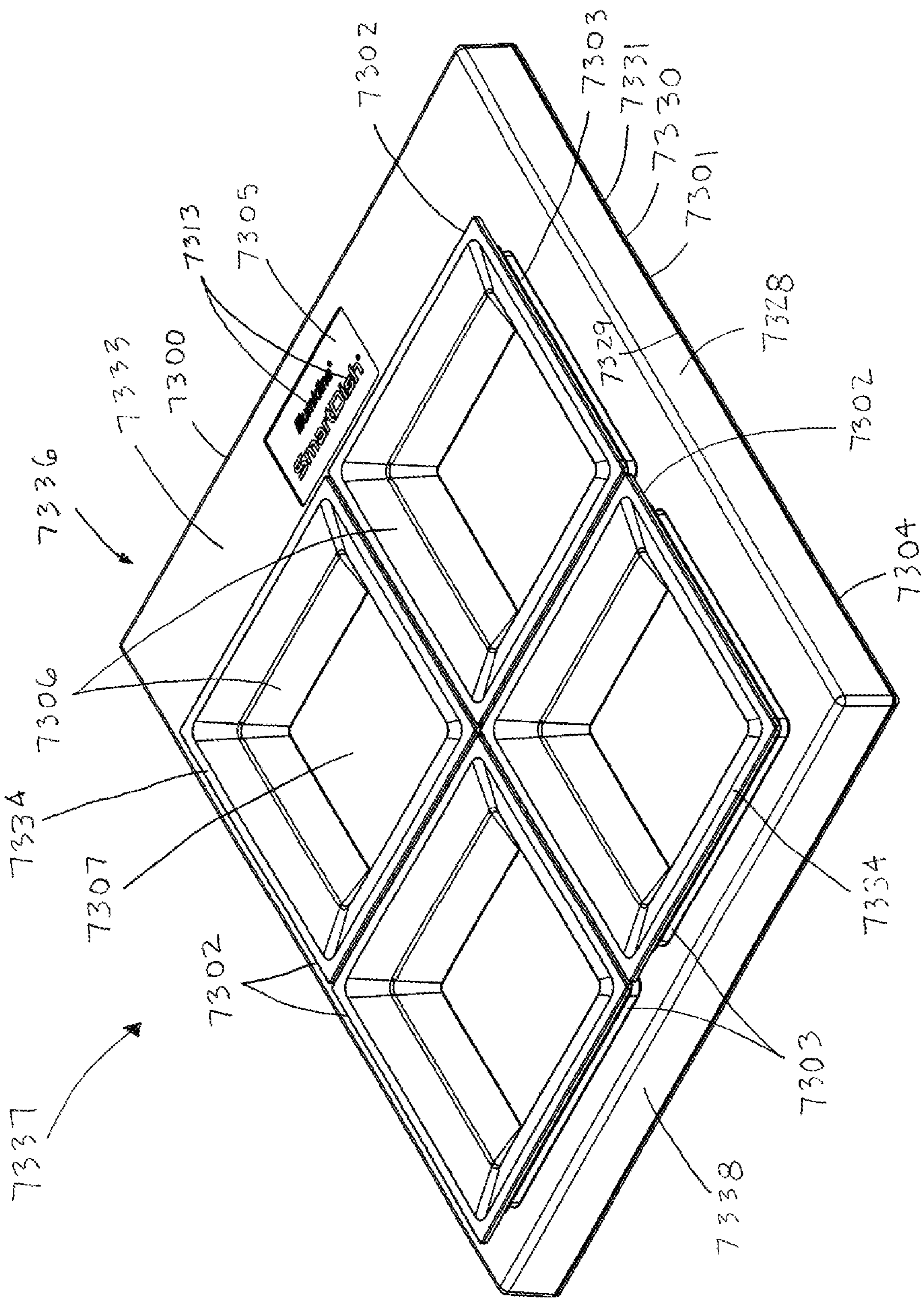
FIGS. 73A-73F are a perspective, plan, front, right-side, bottom, and rear view, respectively, of a useful embodiment of an active foodware system providing many useful features. The useful embodiment includes a mechanical housing structure having a top and a base. Each of four dining dishes is placed in functional relation to a mating dish holder, where each dish holder extends through an opening in the top and is in functional relationship to a load cell food sensor.

The following figures, FIG. 73A-94, describe the active foodware system 7337 of FIG. 73A. Starting with FIG. 73A, and up through FIG. 94, after an element reference number is first described, that element reference number typically will be used throughout the subsequent figures for the same element of the active foodware system 7337 in order to provide continuity between the figures for the active foodware system 7337. Typically, the first two digits of an element reference number indicates the figure number where the element is first described.

FIG. 73A is a perspective view of a useful embodiment of an active foodware system 7337 providing many useful features. While numerous useful features are described below, the useful embodiment does not require all the useful features described below to be present simultaneously for operation of the useful embodiment in order for the user to receive benefit from the invention. Any number of versions of the useful embodiment may include only one or some of the useful features described below.

The useful embodiment typically includes a mechanical housing structure 7336 having a top 7300 and a base 7301. The top 7300 may have a sidewall 7328 and a front wall 7338. Each of four dining dishes 7302 is typically placed in functional relation to a mating dish holder 7332 (not easily visible in FIG. 73A), where each dish holder 7332 typically extends through an opening in the top 7300 and is in functional relationship to a food sensor. Although four dining dishes 7302 are shown, each in relation to a mating dish holder 7332, any convenient number of dining dishes 7302 and mating dish holders 7332 may be used. The food sensor may be a weight sensor, and the weight sensor may be a load cell, and the load cell may be a beam load cell for sensing the weight of the food in the dining dish 7302. The food sensor may be an optical sensor, and the optical sensor may be a camera, light-emitting diode, and/or a photodetector. The optical sensor may be used to determine the weight of food, type of food, and/or nutritional properties of the food in the dining dish 7302 on the dish holder 7332.

Typically when a dining dish 7302 is placed in functional relationship to a mating dish holder 7332, it is physically constrained by the structure of the dish holder 7332 so typically the dining dish 7302 cannot easily translate or rotate from a desired placement, where the placement determines both position and orientation. In one useful embodiment, at least a portion of the dining dish 7302 is placed into a cavity of the dish holder 7332. When the dining dish 7302 is placed in functional relationship to a mating dish holder 7332, typically there are multiple points of contact between the dining dish 7302 and dish holder 7332 which physically constrain the dining dish 7302 from moving relative to the dish holder 7332 when subjected to typical dining forces, where such dining forces are produced when adding, subtracting, stirring, moving, or cutting food in the dining dish 7302.

Typically surrounding each opening in the top 7300 is a liquid barrier 7303. Each liquid barrier 7303 is typically narrow and prevents liquid on the top surface 7333 of the top 7300 from passing through the opening in the top 7300 that the liquid barrier 7303 surrounds.

Typically the base 7301 has a rib around at least a portion of the top side of its perimeter which functions as a tongue that fits into a mating groove in the bottom side of the perimeter of the top 7300. The tongue may be taller than the groove is deep, which leaves a small gap 7304 between the bottom edge 7329 of the sidewall 7328 of the top 7300 and the top edge 7331 of the sidewall 7330 of the base 7301.

The top surface 7333 of the top 7300 may have an information area 7305 having information 7313. The information 7313 may include text, symbols, graphics, and other indicia. The information 7313 may be displayed on an electronic display screen, such as an LED or LCD screen, and the like. The information area 7305 may be recessed relative to the top surface 7333 of the top 7300. The information 7313 may be static, and may include raised or lowered structure relative to the surface of the information area 7305. The information 7313 may include, but is not limited to company name, product name, model number, serial number, usage instructions, warnings, certifications, registrations, patent numbers, heating information, cleaning instructions, material information, recycling information, and the like.

Each dining dish 7302 may have a wall 7306 extending from a dining surface 7307 up to an upper region 7334. The wall 7306 and upper region 7334 surround at least a portion of the dining dish 7302, and typically surround the entire dining dish 7302. The dining surface 7307 is recessed in relation to the upper region 7334 surrounding the dining surface 7307 in order to receive solid food and prevent spillage of the food from the dining surface 7307.

Figure 73B:
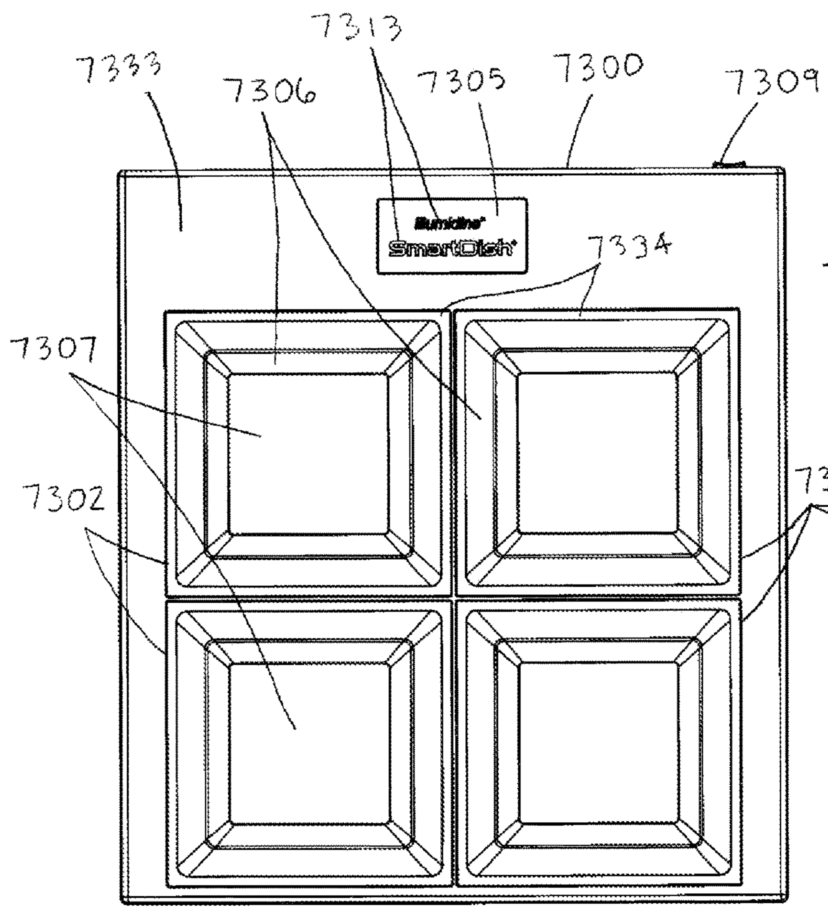

FIG. 73B is a plan view of the embodiment of FIG. 73A. In addition to the elements already described for FIG. 73A, a function control 7309 is visible extending from the rear of the mechanical housing structure 7336. Such a function control 7309 may be an electrical on/off switch.

Figure 73D:
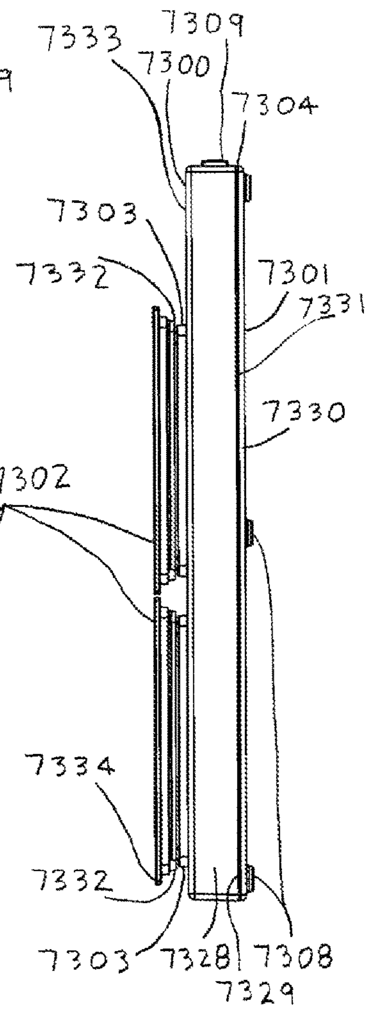
Figure 73C:
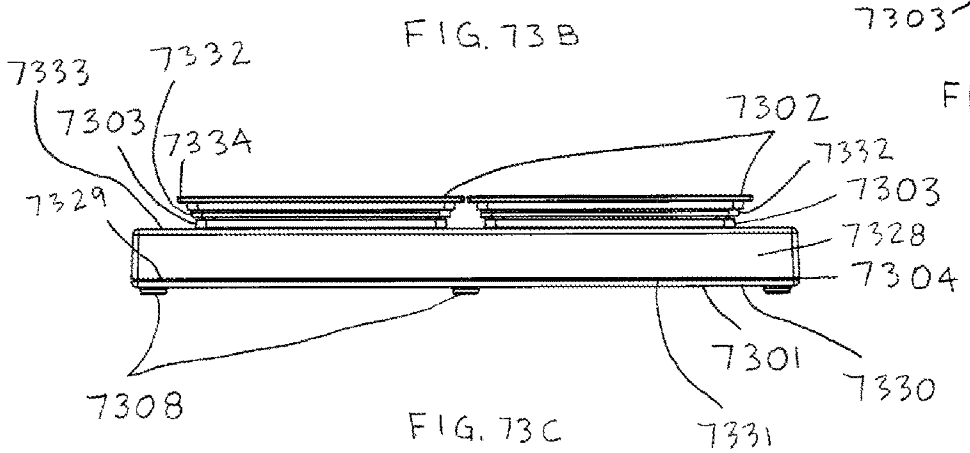

FIG. 73C is a front view of the embodiment of FIG. 73A. In addition to the elements already described for FIGS. 73A-73B, the perimeter edge of a dish holder 7332 is visible underneath a dining dish 7302 and above the liquid barrier

7303. Typically the base has non-skid feet 7308 attached to the bottom to prevent the mechanical housing structure 7336 from sliding on a table or counter top while dining.

FIG. 73D is a right-side view of the embodiment of FIG. 73A.

FIG. 73E is a bottom view of the embodiment of FIG. 73A. The base 7301 has a bottom surface 7313. The bottom surface 7313 of the base 7301 may have an information area 7315 having information 7316. The information 7316 may include text, symbols, graphics, and other indicia. The information 7316 may be displayed on an electronic display screen, such as an LED or LCD screen, and the like. The information area 7315 may be recessed relative to the bottom surface 7314 of the base 7301. The information 7316 may be static, and may include raised or lowered structure relative to the surface of the information area 7315. The information 7316 may include, but is not limited to company name, product name, model number, serial number, usage instructions, warnings, certifications, registrations, patent numbers, heating information, cleaning instructions, material information, recycling information, and the like.

The bottom surface 7314 of the base 7301 may have screw holes 7317 for screws to fasten the base 7301 to mating screw receptacles attached to the top 7300. A screw hole 7317 may be recessed 7339, such as chamfered, countersunk or counterbored, so the head of the screw used to fasten the base 7301 to the top 7300 will not protrude beyond the bottom surface 7314 of the base 7301.

The C-shaped lens-support bottom surface 7318A may have an inner edge 7319A and an outer edge 7335A. The inner edge 7319A joins the edge of the cantilever housing pocket outer wall 7338A to form a first opening A through the base 7301. Similarly, the C-shaped lens-support bottom surface 7318B may have an inner edge 7319B and an outer edge 7335B. The inner edge 7319B joins the edge of the cantilever housing pocket outer wall 7338B to form a second opening B through the base 7301. As provided in the lower right portion of FIG. 73E, a lower portion of a dish holder 7332 is visible through each of the two openings A and B on the sides of a cantilever housing pocket cover 7323 that covers a cantilever housing pocket 8304. The bottom face portion 7320A, bottom base portion 7321A, and outer sidewall portion 7322A of a dish holder portion 7332A are visible through the first opening A, and the bottom face portion 7320B, bottom base portion 7321B, and outer sidewall portion 7322B of the dish holder portion 7332B are visible through the second opening B. If liquid passes over the liquid barrier 7303 of the top 7300, it may drain through the openings A and B until it reaches the table or counter upon which the mechanical housing structure 7336 is placed.

Each cantilever housing pocket cover 7323 is typically fastened to the bottom surface 7314 of the base 7301. Typically, a screw is used, and the cantilever housing pocket cover 7323 has a first screw hole 7324A and a second screw hole 7324B. Typically the first screw hole 7324A and second screw hole 7324B are either, chamfered, countersunk or counterbored so the head of the screw does not extend past the bottom surface 7314 of the base 7301.

Each cantilever housing pocket cover 7323 may have a drainage hole 7325. The drainage hole 7325 allows liquid to escape from the cantilever housing pocket 8304 that the cantilever housing pocket cover 7323 otherwise seals.

A load-cell support pocket is typically covered by a load-cell support pocket cover 7326. Each load-cell support pocket cover 7326 is fastened to the bottom surface 7314 of the base 7301 by one or more fasteners. As fasteners, a pair of screws may be used, such that each load-cell support pocket cover 7326 may have two screw holes 7327. Typically the screw holes 7327 are either chamfered, countersunk or counterbored so the head of each screw does not extend past the bottom surface 7314 of the base 7301.

FIG. 73F provides a rear panel 7312. Typically the rear panel 7312 is removable. A removable rear panel 7312 facilitates assembly of the top 7300 and base 7301 when a printed circuit board (PCB) is affixed to the base 7301, and it has components such as a switch 7309, a data/power connector 7310, a power connector, illumination elements 7311, and the like, that are to be affixed to the rear panel 7312. A data connector 7310 may have screw holes 7340 for mounting the data/power connector 7310 to the rear panel 7312.

There may be one or a plurality of illumination elements 7311. A convenient number of illumination elements 7311 is four, where each illumination element 7311 is an LED. Four LEDs may be used, where each LED illuminates a different desired color, such as red, yellow, green, and blue. The illumination elements 7311 may indicate any convenient state. An exemplary set of states for four LED illumination elements 7311 includes: red may indicate that external power is being applied; yellow may indicate that a battery is being charged; green may indicate that a programmable processor is functioning property; and blue may indicate that a programmable processor is communicating with a mobile phone or tablet computer via Bluetooth.

Figure 74A:
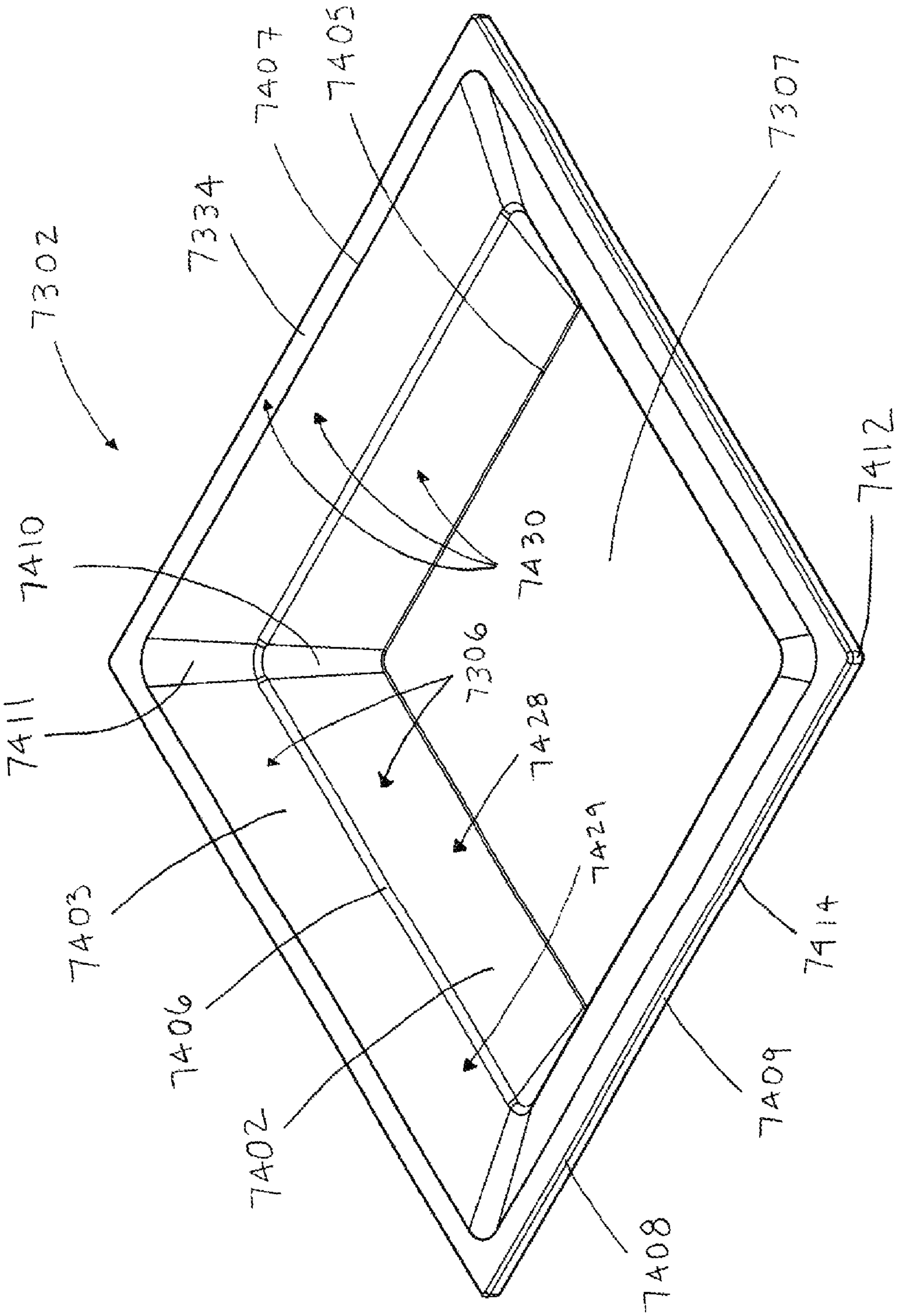
FIGS. 74A-74C are a perspective, plan, and front view, respectively, of a useful embodiment of a dining dish of the active foodware system.

FIG. 74A is a perspective view of a useful embodiment of a dining dish 7302 of the active foodware system 7337. The dining dish 7302 may also be referred to as a dining plate 7302. The useful embodiment of the dining dish 7302 typically includes a dining surface 7307 recessed relative to a region 7430 that may surround all or a portion of the dining surface 7307. The region 7430 may include a wall 7306 that may surround all or a portion of the dining surface 7307, and that may have multiple facets, flat surfaces, curves, corners, fillets, edges, and the like.

In the useful embodiment of FIG. 74A, the wall 7306 typically includes a lower wall portion 7428 having substantially flat faces 7402 joined by curved corner faces 7410. The wall 7306 may also include an upper wall portion 7429 having substantially flat faces 7403 joined by curved corner faces 7411. The lower edge of the lower wall portion 7428 is joined to the dining surface 7307, where the joining may include a curved fillet 7405. When both a lower wall portion 7428 and an upper wall portion 7429 are used, the upper edge of the lower wall portion 7428 is typically joined to the upper wall portion 7429, where the joining may include a curved fillet 7406.

The upper edge of the upper wall portion 7429 may join by a joining edge 7407 to an upper region 7334. The upper region 7334 may have a substantially horizontal surface. The upper region 7334 may be surrounded by a drip lip 7409 having a drip lip corner 7412, where the upper region 7334 may be joined to the drip lip 7409 by a curved fillet 7408. The drip lip 7409 directs any liquid that drains over the outer edge 7408 of the dining dish 7302 to drip straight down along the drip lip 7409 and drip from the lower edge 7414 of the drip lip 7409, rather than wick its way along the outer faces of the surrounding wall.

The dining plate 7302 typically has a dining surface 7307, the dining surface 7307 being recessed in relation to a region 7430 of the dining plate 7302 surrounding the dining surface 7307, where the dining surface 7307 is recessed for receiving solid food and preventing spillage from said dining surface 7307. The region 7430 may include an upper region 7334 and a wall 7306, both which may surround the dining surface 7307. Functionally related to the dining plate 7302 may be a visual stimulating component that is software programmable for emitting light from any portion of the region 7430 for providing a user with information or entertainment while dining. The region 7430 may include a wall 7306 for retaining the food on the dining surface 7307. The wall 7306 may have a translucent wall portion, and the upper region 7334 may have a translucent region portion. The visual stimulating component may include a plurality of LED elements positioned on the opposite side of the wall 7306 to said dining surface 7307. The visual stimulating component may include a plurality of LED elements positioned on the opposite side of the upper region 7334 to said dining surface 7307. The direction of maximum radiation intensity of each LED element may be directed at the wall 7306 and/or the upper region 7334 for emitting light through the translucent portions.

The slope of the lower wall portion 7428 and the upper wall portion 7429 may range from nearly zero degrees to 90 degrees. A useful slope for the lower wall portion 7428 is 50 degrees, but may conveniently range from 40 to 60 degrees. A useful slope for the upper wall portion 7429 is 30 degrees, but may conveniently range from 30 to 40 degrees.

There may be a single wall, or a plurality of walls as provided by FIG. 74A. When an upper wall portion 7429 is used with a shallower slope than an adjoining lower wall portion 7428, the upper wall portion 7429 typically provides a larger area to redirect food toward the center of the dining surface 7307 where the food may have been working its way toward the outer edge 7408 of the dining dish 7302. The shallower slope of the upper wall portion 7429 is not as aggressive at draining the food back toward the dining surface 7307 so typically the lower wall portion 7428 has a steeper slope. Based on the relative slopes, the upper wall portion 7429 may also require more horizontal space than the lower wall portion 7428.

The width of the dining dish 7302 is typically between 2 inches and 8 inches, and the height is typically between 0.25 inches and 3 inches. Typically, the dining dish 7302 is at least twice as wide as it is tall. A useful width of the dining dish 7302 is approximately 5 inches, but ranges from 4 to 6 inches. A useful height of the dining dish 7302 is approximately 0.75 inches, but ranges from 0.5 to 1 inch. Typically the dining dish 7302 is relatively low profile and not for drinking, but instead is typically for eating solid food.

Figure 74C:
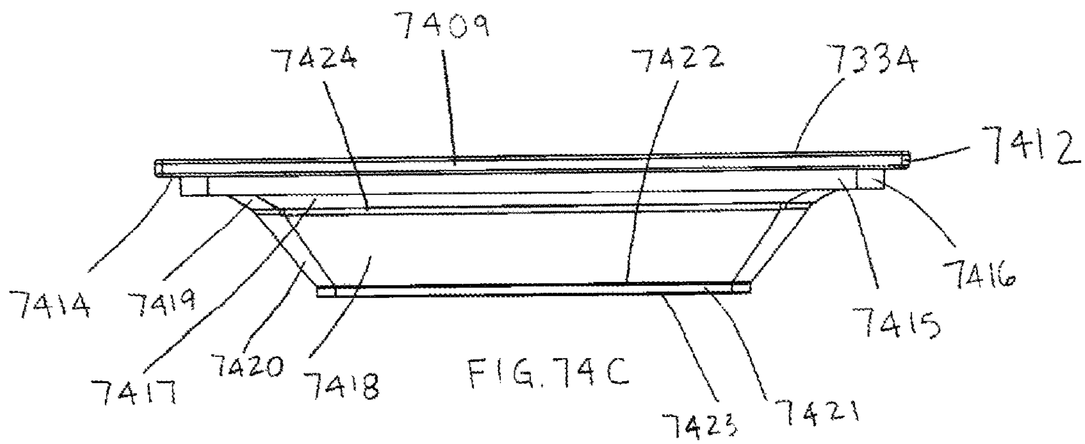
Figure 74B:
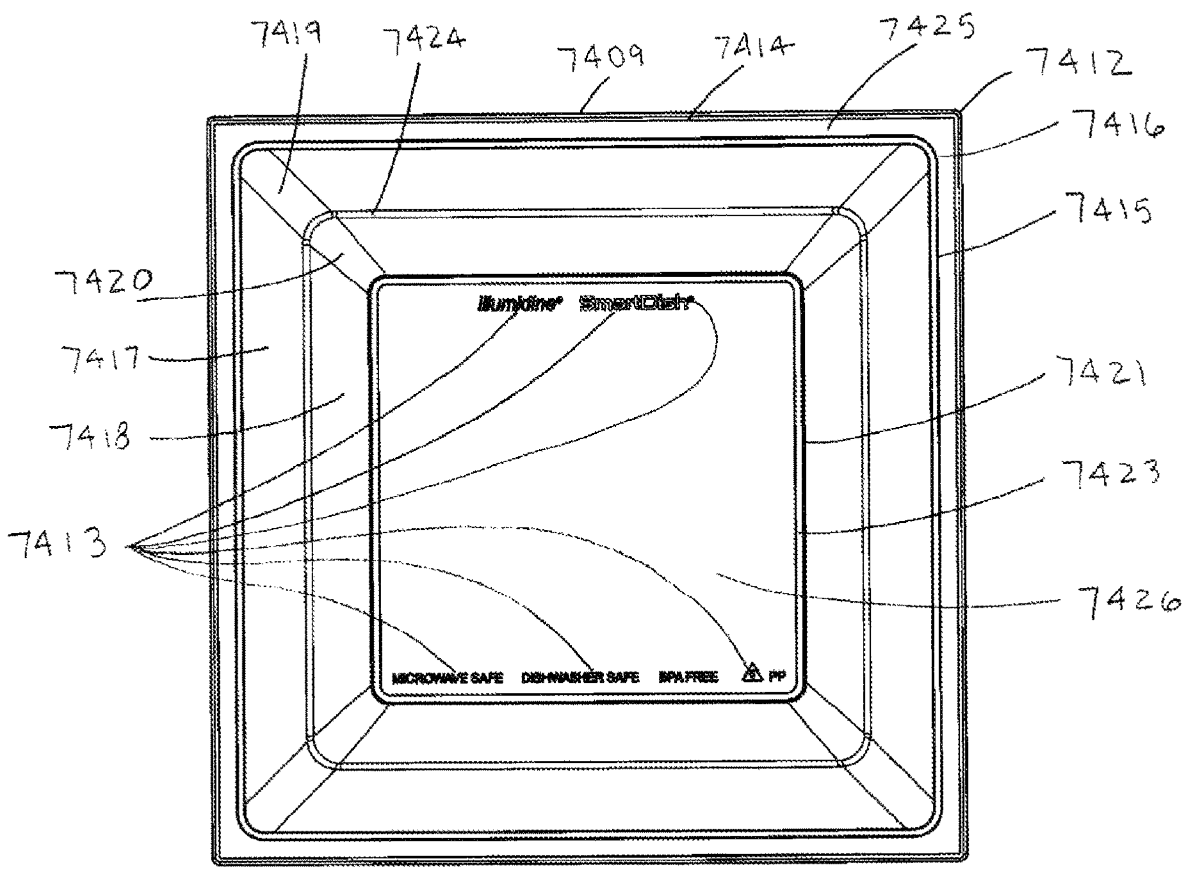

FIG. 74B is a bottom view of the embodiment of FIG. 74A. In addition to the elements already described for FIG. 74A, the dining dish 7302 may include a dish carrier guide 7415 with corner 7416. The lifting surface 7425 is bounded on one side by the dish carrier guide 7415 and on the other side by the drip lip 7409. Typically the lifting surface 7425 is substantially horizontal.

The outer surface of the lower wall portion 7428 may have lower outer substantially flat faces 7418 joined by outer curved corner faces 7420. The outer surface of the upper wall portion 7429 may have upper outer substantially flat faces 7417 joined by outer curved corner faces 7419. The lower outer faces 7418 join the upper outer faces 7417, where the joining may include a curves fillet 7424.

The dining dish 7302 has a bottom dish surface 7426 that may be substantially shaped and contoured similar to the outer upper surface of the dining surface 7307. Surrounding the bottom dish surface 7426 is a dish base 7423. The dish base 7423 may have a side face 7421 joined to the lower outer face 7418, where the joining may include a curved fillet 7422. The bottom dish surface 7426 may include bottom information 7413. The bottom information 7413 may include text, symbols, graphics, and other indicia. The bottom information 7413 may be added by coloring, etching, resurfacing, engraving, may be raised, and the like, relative to the bottom dish surface 7426. The bottom information 7413 may include, but is not limited to company name, product name, model number, serial number, usage instructions, warnings, certifications, registrations, patent numbers, heating information, cleaning instructions, material information, recycling information, and the like.

FIG. 74C is a side view of the embodiment of FIGS. 74A and 74B.

Figure 75:
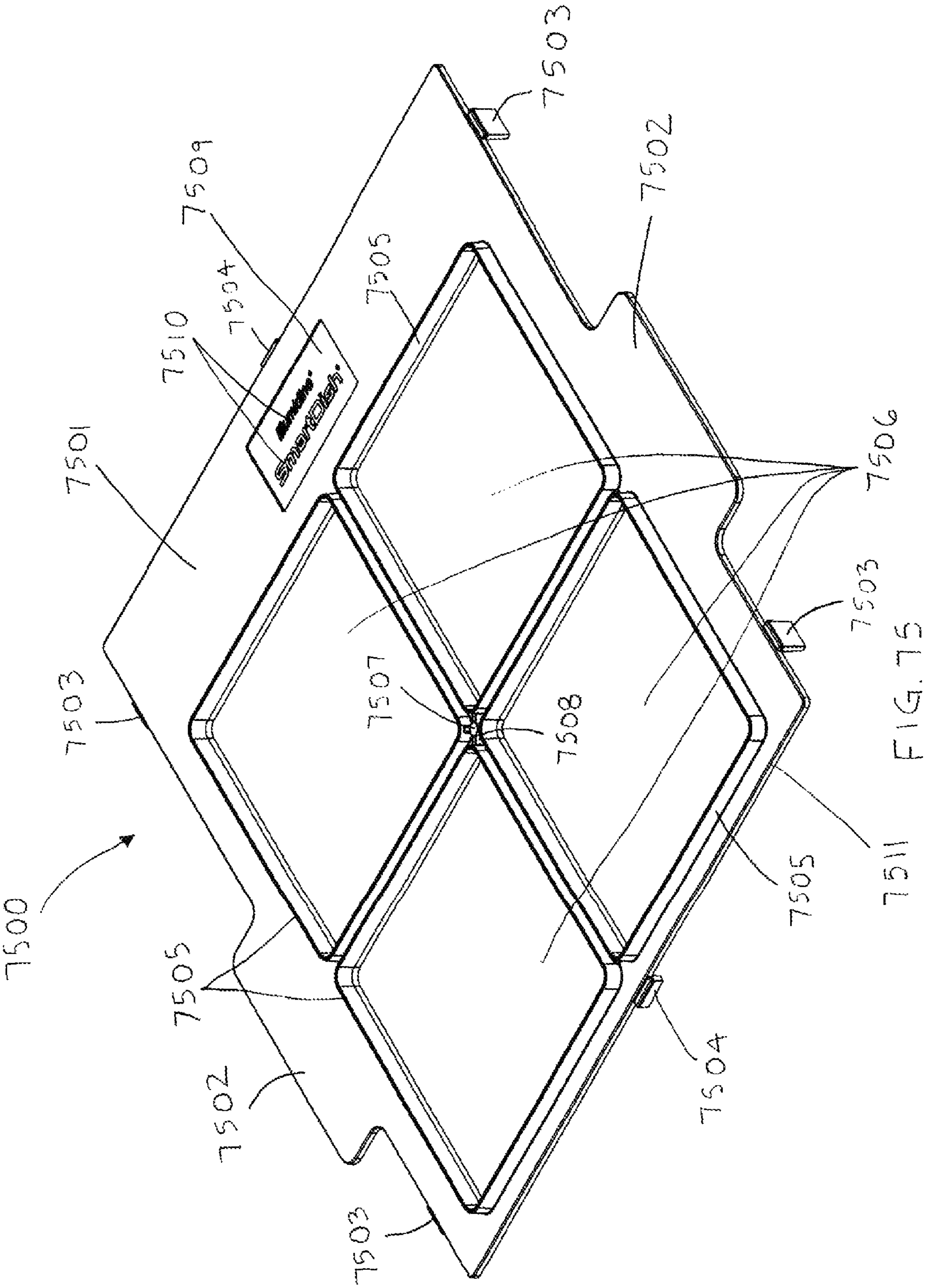
FIG. 75 is a perspective view of a useful embodiment of a dish carrier of the active foodware system.

FIG. 75 is a perspective view of a useful embodiment of a dish carrier 7500 of the active foodware system 7337. The dish carrier 7500 typically includes a top surface 7501. The dish carrier 7500 typically includes at least one carrying structure, such as handle 7502.

The top surface 7501 of the dish carrier 7500 may have an information area 7509 having information 7510. The information 7510 may include text, symbols, graphics, and other indicia. The information 7510 may be displayed on an electronic display screen, such as an LED or LCD screen, and the like. The information area 7509 may be recessed relative to the top surface 7501 of the dish carrier 7500. The information 7510 may be static, and may include raised or lowered structure relative to the surface of the information area 7509.

To help with injection molding manufacturing, as well as to add structural strength and stability, the dish carrier 7500 may have an injection gate post 7507 with ribs 7508 that extend from the gate post 7507 to one or more water barrier walls 7505. The injection gate post 7507 accepts molten plastic during the injection-molding process, and channels the molten plastic through the ribs 7508 to fill the water barrier walls 7505. Without the gate post 7507 and ribs 7508, the injection molding process might require very high pressures to fill the mold of the dish carrier 7500, causing the mold to distort or even open up while being filled with plastic. Additionally, the ribs add structural strength to the dish carrier 7500, and help prevent it from sagging or twisting when a dining dish 7302, 7302 with food in it is placed in one or more of the four openings 7506 of the dish carrier 7500.

The dish carrier 7500 typically includes a plurality of legs 7503. The legs 7503 are typically arranged around the periphery. The legs 7503 may extend down from the dish carrier side 7511. When the dish carrier 7500 is free standing on a table, counter, or other horizontal surface, the legs 7503 elevate the dish carrier 7500. When the dish carrier 7500 is placed on the top surface 7333 of the mechanical housing structure 7336 of FIG. 73A, the legs 7503 help position the dish carrier 7500 using contact with the sidewalls 7328 of the top 7300.

In addition to the legs 7503, the dish carrier 7500 may also include one or more positioning structures 7504. Front and rear positioning structures 7504 are provided in FIG. 75. Unlike the legs 7503, the positioning structures 7504 are not intended to contact a table, counter, or other horizontal surface. However, like the legs 7503, the positioning structures 7504 are for helping to position the dish carrier 7500 using contact with the front wall 7338 and rear edge of the top 7300.

The dish carrier 7500 typically includes four openings 7506, although any convenient number of openings 7506 may be used. A portion of a dining dish 7302 and/or a dish holder 7332 may pass through an opening 7506. Surrounding each opening 7506 is a water barrier wall 7505. When the dish carrier 7500 is placed on the top 7300, each water barrier wall 7505 is positioned around each liquid barrier 7303. Similar to the liquid barrier 7303 of the top 7300, the water barrier wall 7505 of the dish carrier 7500 helps to prevent liquid spilled on the top surface 7501 from easily pouring down into an opening 7506.

The water barrier wall 7505 of the dish carrier 7500 may also serve to support a dining dish 7302 for carrying. The top surface of the water barrier wall 7505 is typically aligned to contact the lifting surface 7425 of a dining dish 7302 when the dish carrier 7500 is lifted.

A typical use-case scenario is the dish carrier 7500 is placed on a horizontal kitchen countertop. A dining dish 7302 is typically placed in an opening 7506 of the dish carrier 7500. Up to four dining dishes 7302 may be placed, with one dining dish 7302 placed in each of the four openings 7506. Food is then typically loaded onto the dining surface 7307 of at least one dining dish 7302.

When a dining dish 7302 is placed in an opening 7506 of the dish carrier 7500, the length of the legs 7503 is typically pre-determined such that the base 7423 of the dining dish 7302 comes into contact with the countertop at the same time, or dimensionally just before, the lifting surface 7425 of the dining dish 7302 contacts the top surface of the water barrier wall 7505 of the dish carrier 7500. In this way, the countertop supports most of the weight of the food placed in the dining dish 7302, and the dish carrier 7500 supports little to know food weight while the dish carrier 7500 is resting on the countertop.

After food is loaded into one or more dining dishes 7302, the dish carrier 7500 typically is lifted from the countertop by one or more lifting structures, such as handles 7502, and transported to a dining table where the mechanical housing structure 7336 is sitting. During transport, dish carrier guide 7415 with corner 7416 of the dining dish 7302 is typically positioned on the inner side of the water barrier wall 7505 of the dish carrier 7500, and prevents the dining dish 7302 from sliding around in the opening 7506 in the dish carrier 7500. The dish carrier 7500 typically is then lowered and placed on the top 7300 of the mechanical housing structure 7336, with the position of the dish carrier 7500 relative to the top 7300 guided by the legs 7503 and the positioning structures 7504. When the dish carrier 7500 is lowered into position on the top 7300, a portion of each dining dish 7302 typically comes into contact with a mating dish holder 7332, making the contact before the undersurface of the dish carrier 7500 contacts the top surface 7333 of the top 7300.

After a dining dish 7302 contacts its mating dish holder 7332, the dining dish 7302 typically stops lowering, while the dish carrier 7500 continues to lower until its undersurface contacts the top surface 7333 of the top 7300. While the dish carrier 7500 continues to lower, the lifting surface 7425 of each dining dish 7302 typically pulls away and no longer contacts the top surface of its associated water barrier wall 7505. When the dish carrier 7500 contacts the top surface 7333 of the top 7300, a small gap may have opened up between the lifting surface 7425 of each dining dish 7302 and the top surface of the associated water barrier wall 7505. This gap typically allows a dining dish 7302 and its mating dish holder 7332 to deflect slightly downward without the lifting surface 7425 of a dining dish 7302 re-contacting the top surface of the associated water barrier wall 7505. Such non-contacting deflection is typically required so that a strain-sensing sensor, such as a strain gage, that is functionally associated with the dish holder 7332, may be used to sense in real time the weight of food present in a dining dish 7302 in contact with its mating dish holder 7332.

Typically each dish holder 7332 is joined to a beam load cell having a plurality of strain gages, typically four strain gages, so each dish holder 7332 can sense weight. When the weight and type of food is known in a dining dish 7302 mated with a weight-sensing dish holder 7332, the nutritional content of the meal can be determined. If the weight of the meal is determined before eating, the expected nutritional content is known should the diner finish all their food. While dining, the weight typically can be determined in real time, so that at any point, the diner knows how much nutrition they've consumed up to that point, and how much nutrition they will not consume if they stopped eating. After the diner finishes eating, the initial weight of food minus the final weight of food determines how much nutrition they've eaten. This amount of eaten nutrition may be stored in a database for the diner, and may be used to track over time health parameters, such as weight gain or loss, blood-sugar levels, sodium levels, carbohydrates, and the like.

The outer width dimension of each dining dish 7302 is typically greater than the outer width dimension of each dish holder 7332, which in turn is typically smaller than the inner width dimension of each water barrier wall 7505. In this way, each dish holder 7332 may remain joined to a portion of the mechanical housing structure 7336, typically the base 7301, while each opening 7506 of the dish carrier 7500 extends beyond and around the outer width dimension of the dish holders 7332. So, using the dish carrier 7500 with legs 7503 and positioning structure 7504, a dining dish 7302 may be lowered into contact with its mating dish holder 7332, without a water barrier wall 7505 of the dish carrier 7500 contacting a dish holder 7332.

The mechanical housing structure 7336 may have weight sensors functionally associated with each dish holder 7332, and so it may be used sense the weight of food in one or a plurality of dining dishes 7302 mated with such weight-sensing dish holders 7332. The dish carrier 7500 may then be used together with the mechanical housing structure 7336 to sense the weight of food on one or more dining dishes 7302, before eating, while eating and in real time, or after a diner eats from the dining dishes 7302.

An important use-case is when only one mechanical housing structure 7336 is available, but there are multiple diners desiring to weigh their food. In this case, each diner may have their own dish carrier 7500 having their own dining dishes 7302 holding their own food. Each such diner may use their dish carrier 7500 lift their dining dishes 7302 and place their dish carrier with dining dishes 7302 and their food onto the one available mechanical housing structure 7336 for weighing their food. This scenario may be used in a cafeteria setting, a hospital, an assisted-living environment, and the like, where the mechanical housing structure 7336 may be expensive relative to a lower cost and easier to clean dish carrier 7500. So, for economic reasons, the number of mechanical housing structures 7336 is more limited than the number of dish carriers 7500.

Figure 73:
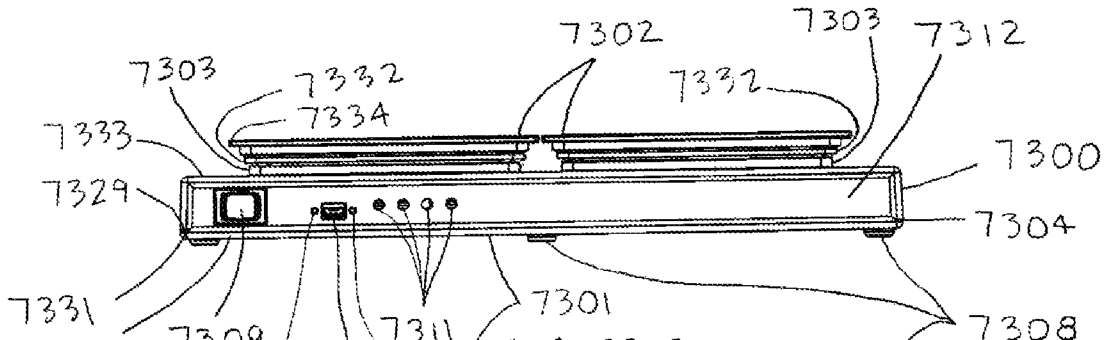
Figure 73:
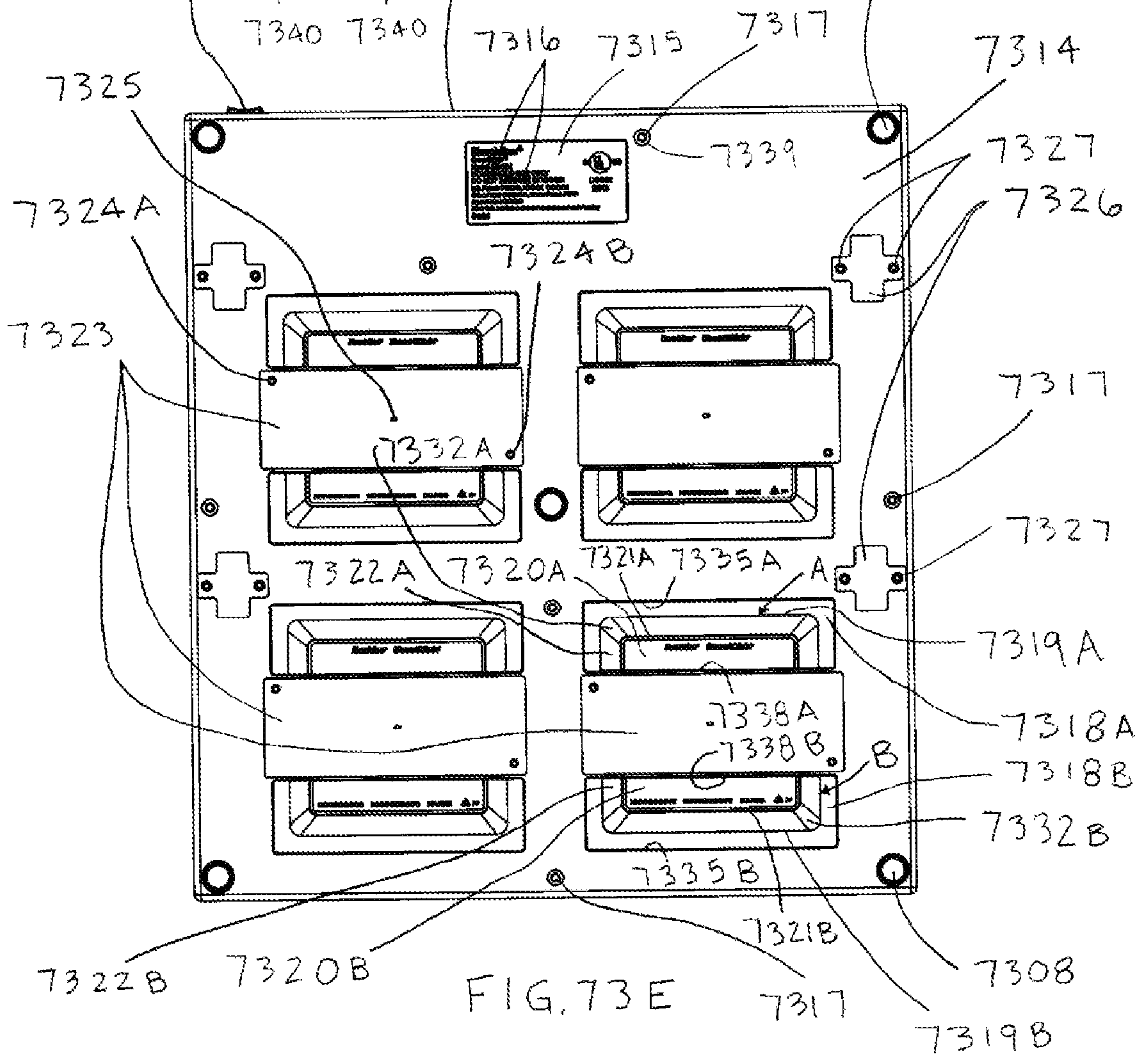
Figure 76A:
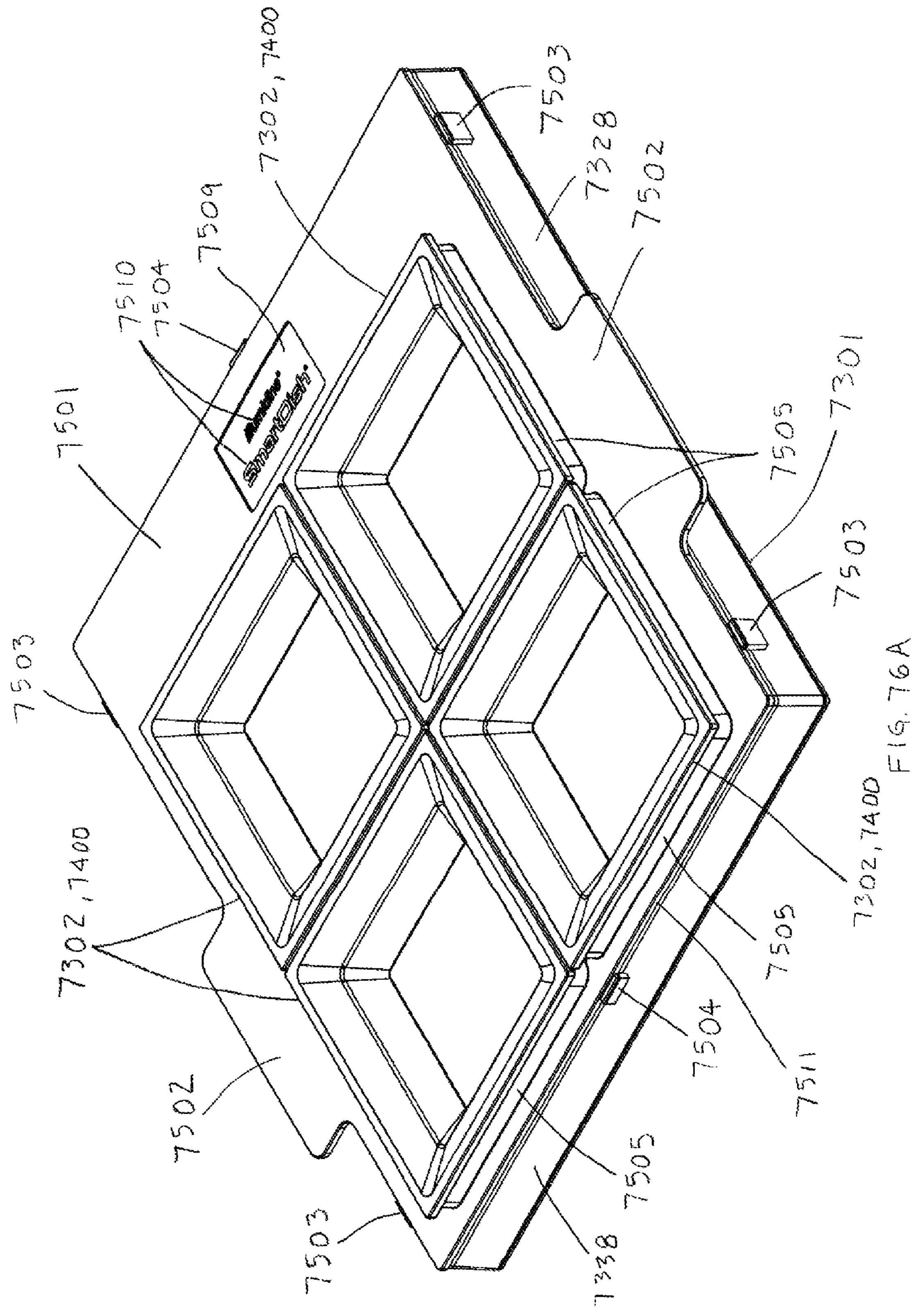
FIGS. 76A-76D are a perspective, plan, front, and right-side view, respectively, of the dish carrier of FIG. 75 assembled on top of the mechanical housing structure of FIGS. 73A-73E.
Figure 76B:
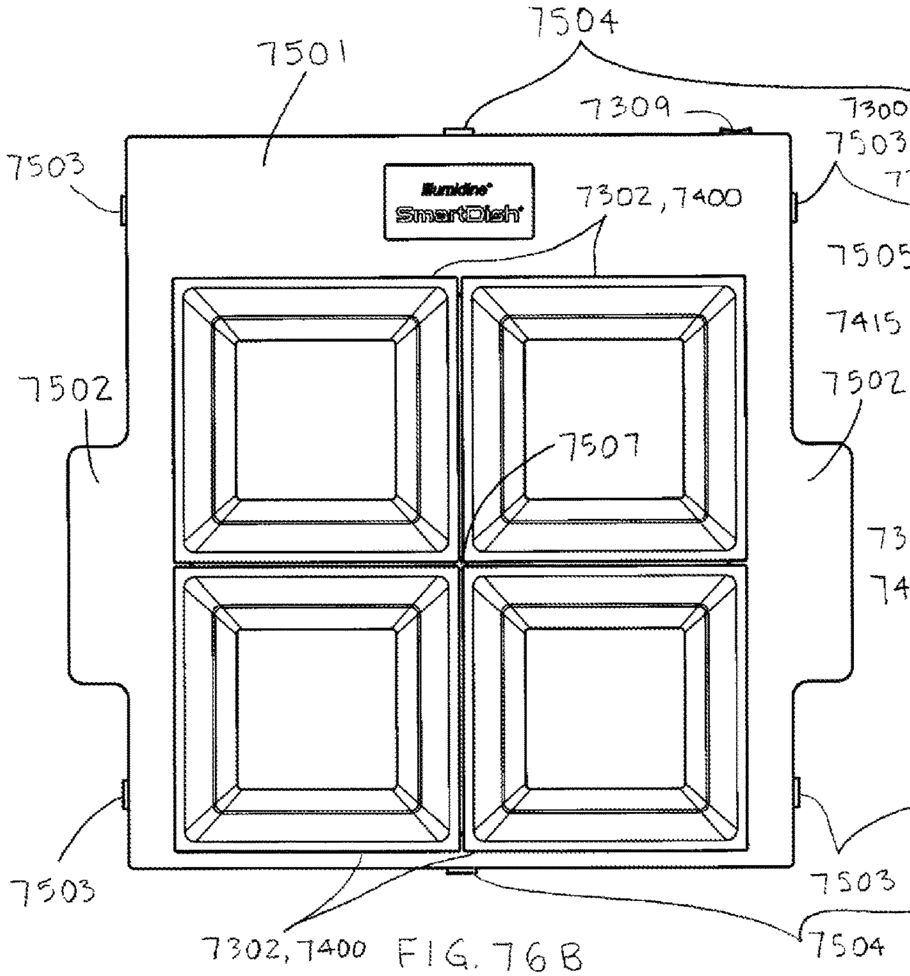
Figure 76D:
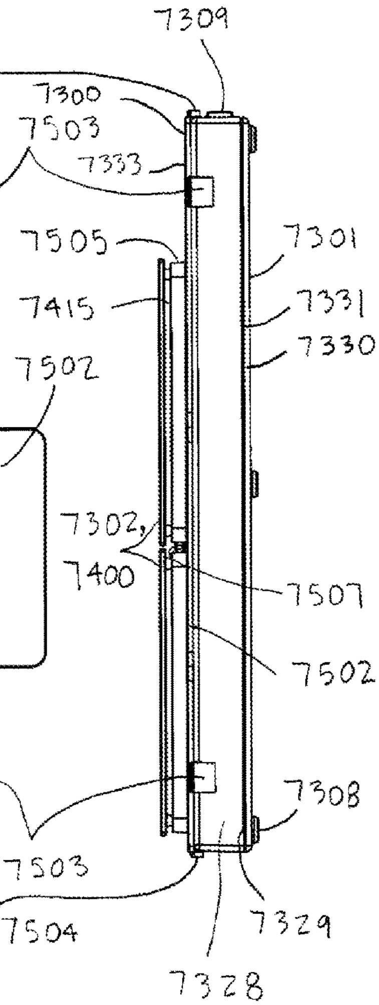
Figure 76C:
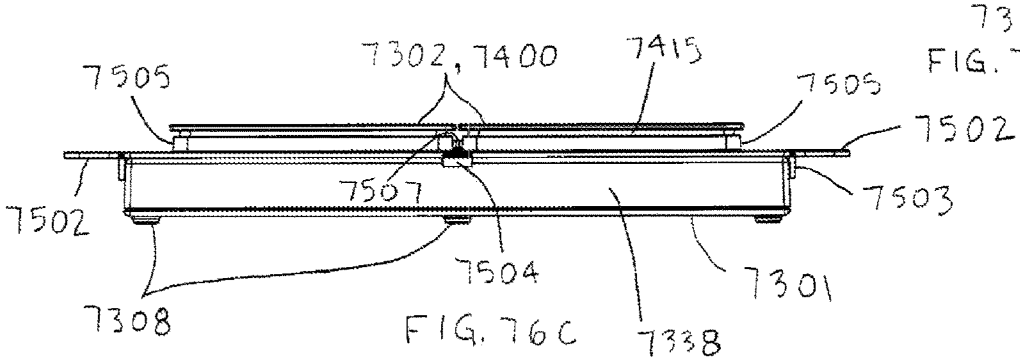

FIG. 76A is a perspective view of the dish carrier 7500 of FIG. 75 assembled on top of the mechanical housing structure 7336 of FIGS. 73A-73E, including some additional visible elements of the dining dish 7302 of FIGS. 74A-74C. In order to provide continuity between the elements of the figures, selected element reference numbers from FIGS. 73, 74, and 75 are labeled on FIG. 76A. Similarly, FIG. 76B is a plan view, FIG. 76C is a front view, and FIG. 76D is a side view of the same assembly, with selected elements labeled.

Figure 77A:
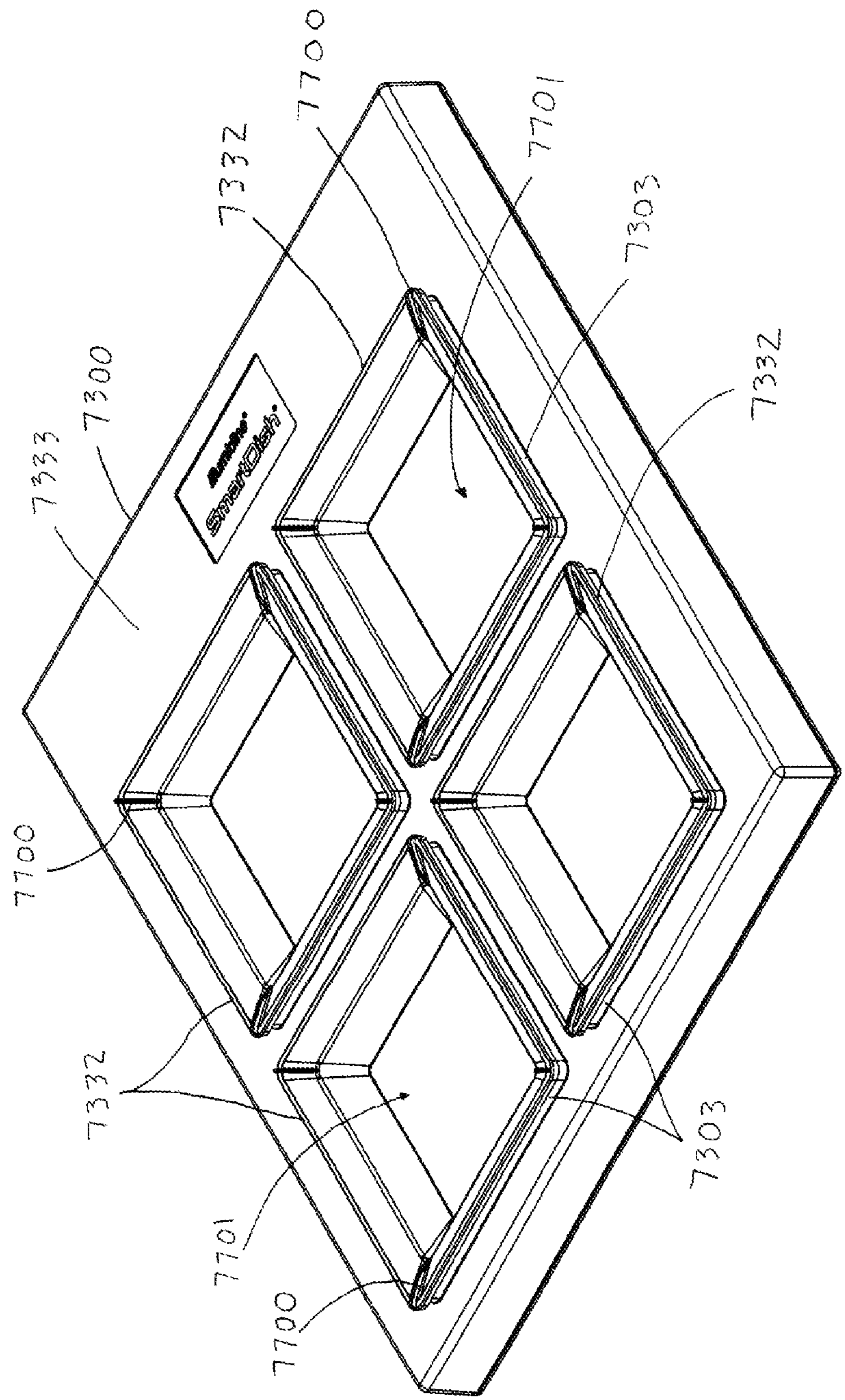
FIGS. 77A-77D are a perspective, plan, front, and right-side view, respectively, of the active foodware system of FIG. 73A, where the dining dishes are removed to show dish holders that mate with the dining dishes.
Figure 77B:
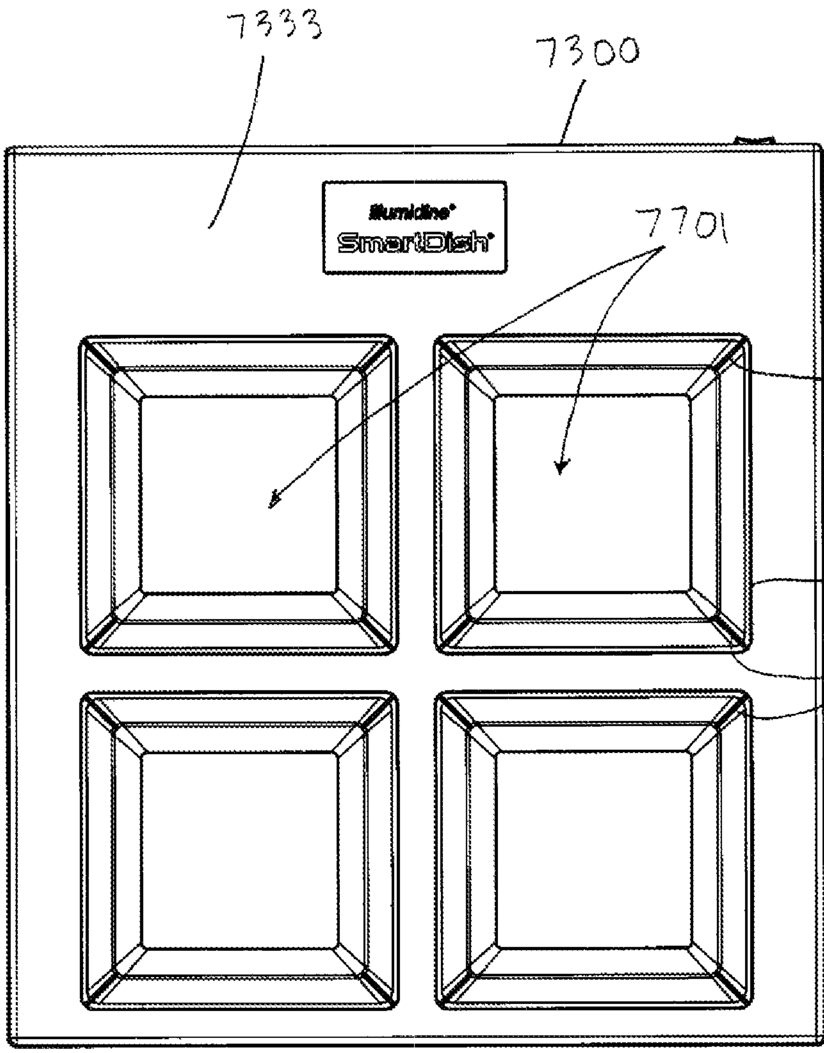
Figure 77D:
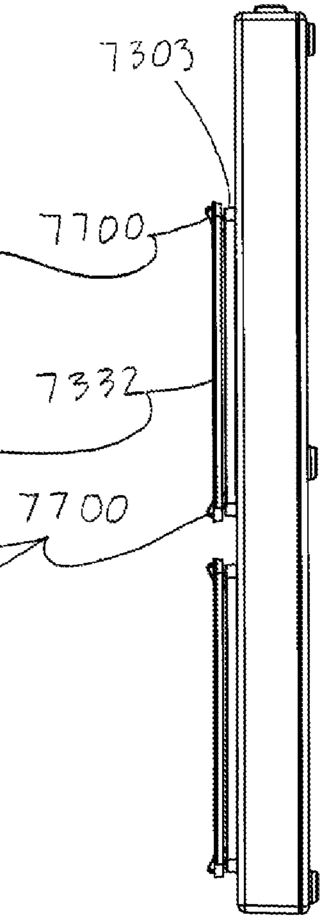
Figure 77C:
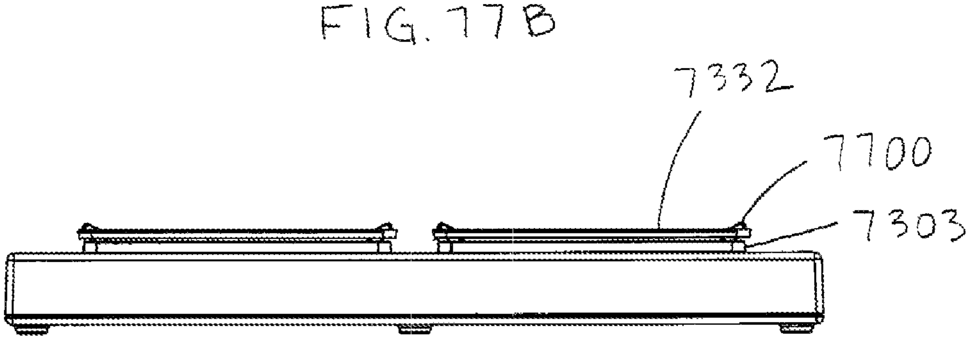

FIG. 77A is a perspective view of the active foodware system 7337 of FIG. 73A, where the dining dishes 7302 of FIG. 73A are removed to show dish holders 7332 that mate with the dining dishes 7302. FIG. 77B is a plan view, FIG. 77C is a front view, and FIG. 77D is a right-side view of the active foodware system provided by FIG. 77A.

Figure 78A:
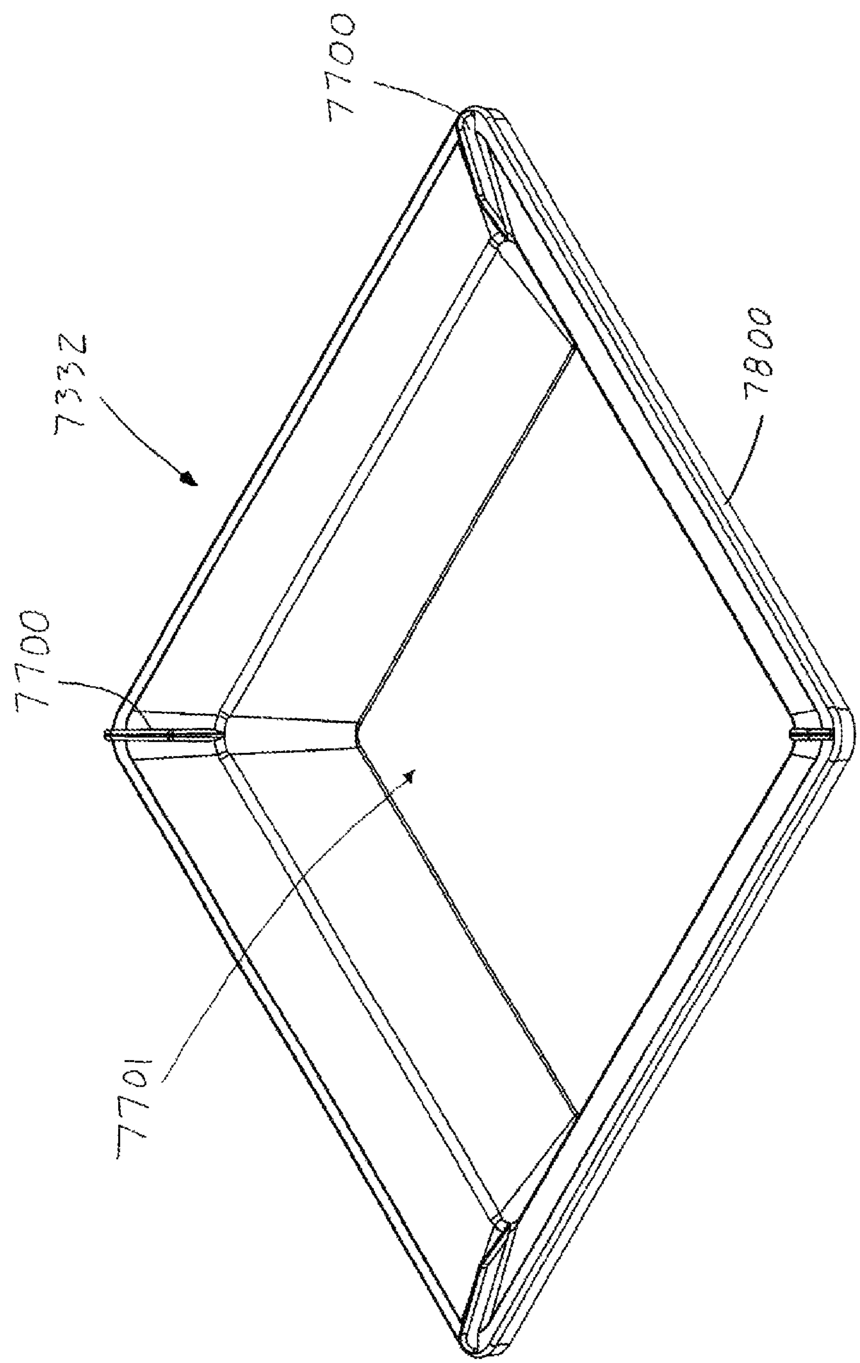
FIGS. 78A-78E are a perspective, plan, front, right-side, and bottom view, respectively, of a dish holder.

FIG. 78A is a perspective view of a dish holder 7332. Each dish holder 7332 typically has mechanical structure for securely mating with a dining dish 7302. FIG. 77A provides a useful embodiment of a mechanical structure for mating that includes a cavity 7701 in the dish holder 7332 for receiving at least a portion of a dining dish 7302. Such a cavity in the dish holder 7332 typically prevents a mated dining dish 7302 from sliding side to side when placed in the dish holder 7332.

To aid with mating, the cavity 7701 of the dish holder 7332 may have the same shape as at least a portion of the bottom of the dining dish 7302 to which it mates. In particular, the size, shape, and angles of the surfaces of the cavity portion of a dish holder 7332 may have substantially the same size, shape, and angles of the surfaces of the bottom portion of a dining dish 7302. Accordingly, when a dining dish 7302 is essentially "stacked" into the mating dish holder 7332, there will be a close fit that will not allow the dining dish 7302 much room to move relative to the dish holder 7332. Making the slope of the walls steep also can help provide a secure mating.

The dining dish 7302 typically is simply lowered into a cavity 7701 in a dish holder 7332 to which it mates, where the mating prevents the dining dish 7302 from substantially translating, rotating, or rocking relative to its mating dish holder 7332. The dining dish 7302 is secured in place in the dish holder 7332 typically only by mating mechanical structure. In this way, the dining dish 7302 can be easily placed into, or lifted from, the cavity of the dish holder 7332, without requiring an additional mating and/or unmating force, other than the force required to lift the dining dish 7302 with its food contents. The dining dish 7302 is not physically affixed to its mating dish holder 7332 by suction or magnetic force.

Each dish holder 7332 may have an anti-rocking structure 7700 to prevent a mated dining dish 7302 from rocking when seated in a dish holder 7332. The anti-rocking structure 7700 may include ribs positioned in the corners of the dish holder 7332, where the height of each rib is substantially the dimension of the gap between the bottom surface of the corner of a dining dish 7302 and the top surface of a dish holder 7332. Without such an anti-rocking structure, if a diner were to press against the outer perimeter of a dining dish 7302, the dining dish 7302 might be able to pivot about its base and rock until the bottom surface of the corner of the dining dish 7302 contacts the top surface of its mating dish holder 7332. The anti-rocking structure 7700 essentially removes most, or all, of the gap between the bottom surface of the corner of a dining dish 7302 and the top surface of a dish holder 7332 so there is little, if any, room for the dining dish 7302 to rock before contacting the anti-rocking structure 7700.

A dish holder 7332 may include a dish holder drip lip 7800 around at least a portion of the perimeter of the dish holder 7332. Typically, the drip lip 7800 extends around the entire perimeter of the dish holder 7332. The drip lip 7800 directs any liquid that drains over the outer edge of the dish holder 7332 to drip straight down along the drip lip 7800 and drip from the lower edge of the drip lip 7800, rather than wick its way along the outer faces of the underside of the dish holder 7332.

Figure 78B:
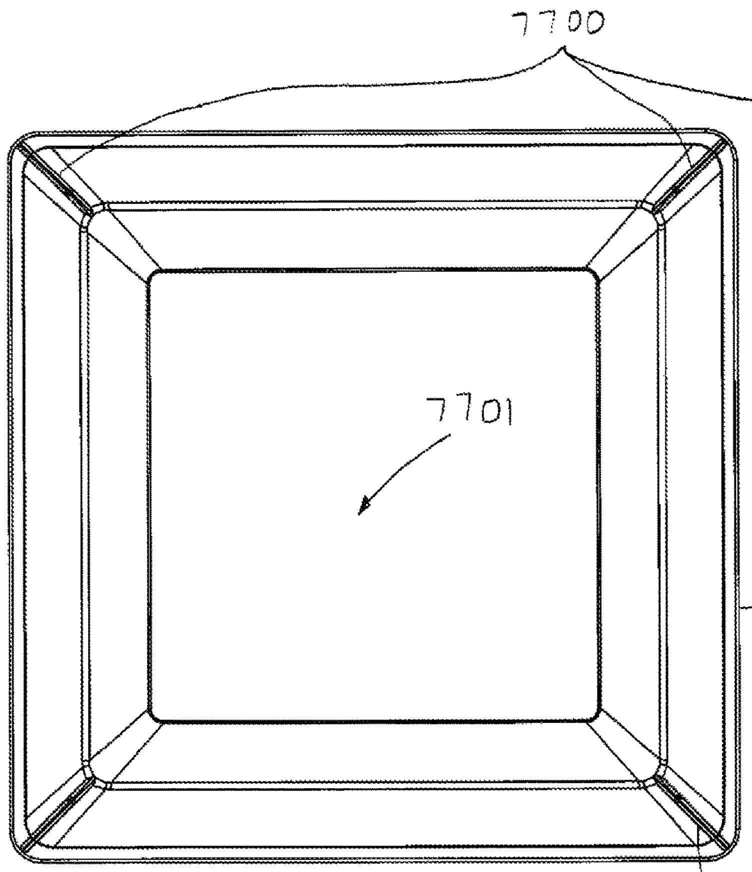
Figure 78D:
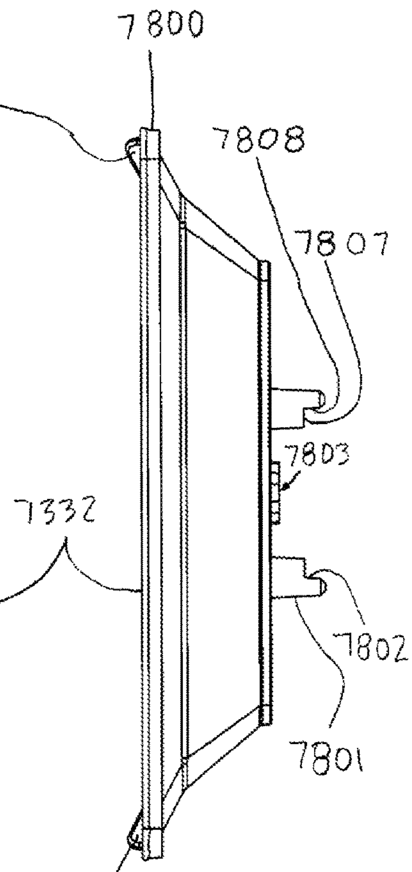
Figure 78C:
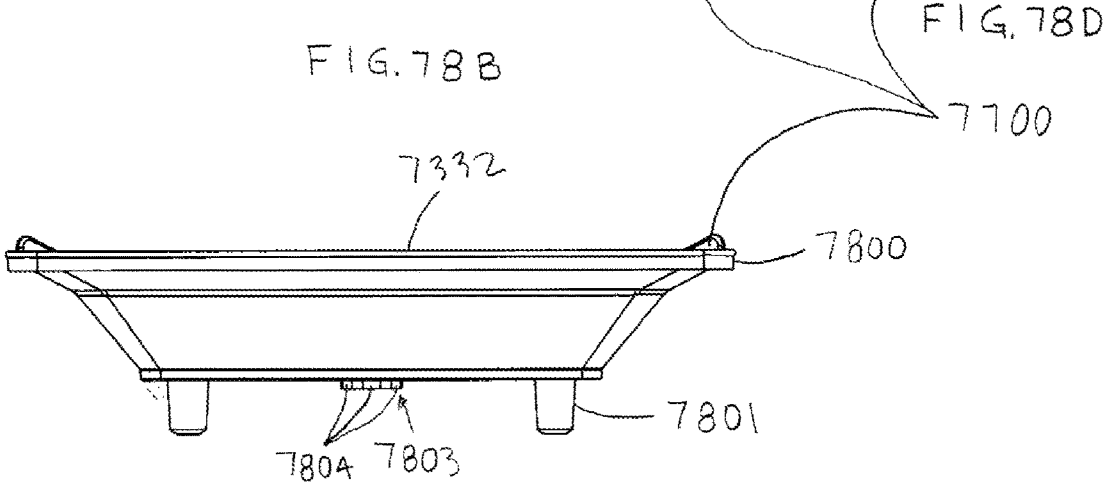
Figure 78E:
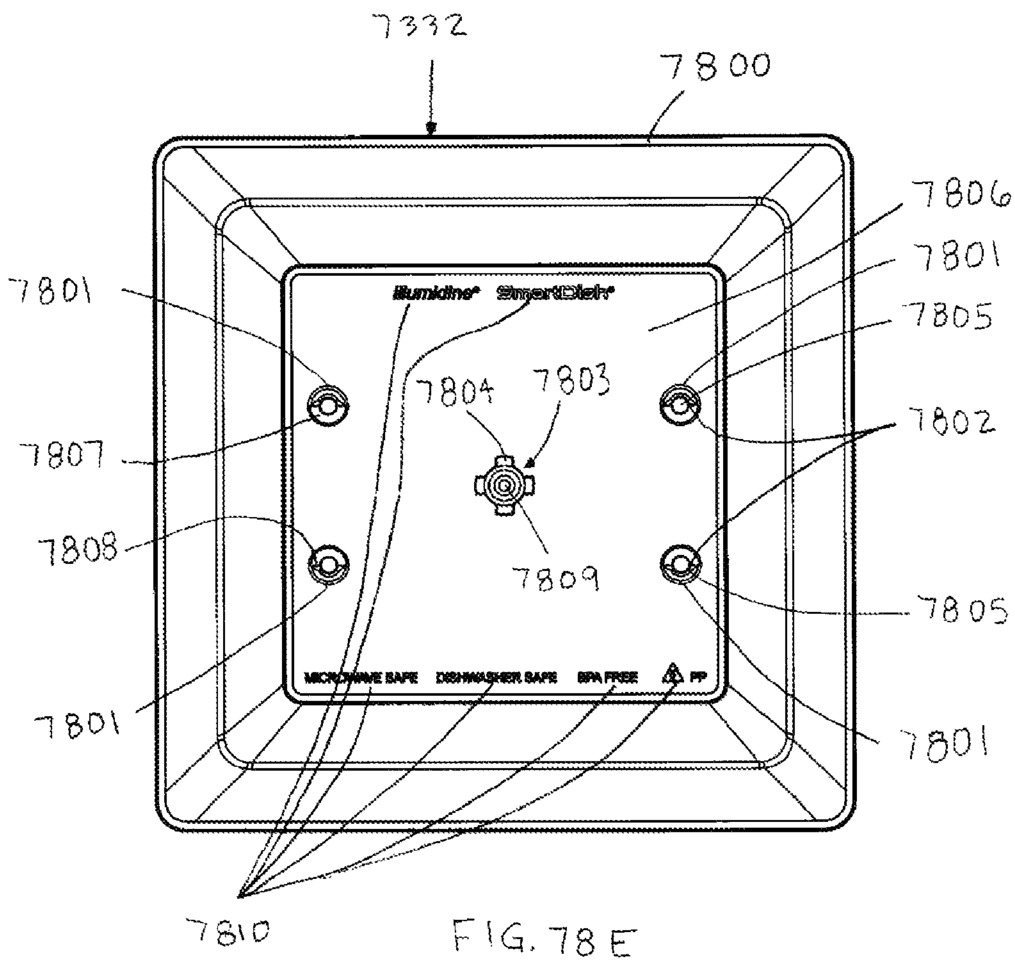

FIG. 78B is a plan view, FIG. 78C is a front view, FIG. 78D is a right side view, and FIG. 78E is a bottom view of the dish holder 7332 of FIG. 78A.

As provided in FIGS. 78C-78E, on the bottom of the dish holder 7332 typically there is at least one leg 7801 for positioning the dish holder 7332 relative to a weight sensor. A useful embodiment typically includes four legs 7801 with notches 7802. The notches 7802 typically provide a horizontal surface 7807 for resting on a beam, such as a cantilever beam that is part of a load-cell assembly. The notches 7802 also typically provide a vertical surface 7808 for straddling a beam, such as a cantilever beam, where the vertical surfaces are for securing the dish holder 7332 from moving laterally relative to the cantilever beam. A leg 7802 may also have a center hole 7805 to reduce the effective thickness of the leg 7802 when injection molding, so the leg 7802 doesn't warp or sag when the injection-molded plastic cools.

As provided in FIGS. 78C-78E, on the bottom 7806 of the dish holder 7332, typically there is snap mounting structure 7803 to receive a fastener for fastening the dish holder 7332 to a weight sensor. For example, as shown, the mounting structure may include a hole 7809 for fastening, such as by screwing, one of the two halves of a plastic snap pair, with the other half of a plastic snap pair affixed to a load-cell assembly, for sensing weight of the dish holder 7332 and anything placed on it, such as a dining dish 7302 with food. A convenient plastic snap pair, including a snap plug and a snap receptacle, is available from Kamsnaps.com. In this way, the dish holder 7332 may be removably attached to the load-cell assembly, where the dish holder 7332 can be easily removed by unsnapping it from the load-cell assembly for cleaning. Alternatively, the snap mounting structure 7803 may be manufactured to include a "built-in" snap structure, such that the dish holder 7332 has a snap structure molded to it as a single piece.

The snap mounting structure 7803 may optionally have one or more ribs 7804. A rib 7804 provides a mounting surface for supporting a plastic snap. An advantage to using a plurality of ribs 7804 for supporting a plastic snap instead of uniformly increasing the diameter of the snap mounting structure 7803, is that uniformly increasing the diameter of the snap mounting structure 7803 would create region that is undesirably wide for injection molding, and the extra material might lead to shrinkage or sagging during cooling.

The bottom surface 7806 of the dish holder 7332 may include bottom information 7810. The bottom information 7810 may include text, symbols, graphics, and other indicia. The bottom information 7810 may be added by coloring, etching, resurfacing, engraving, may be raised, and the like, relative to the bottom dish holder surface 7806. The bottom information 7810 may include, but is not limited to company name, product name, model number, serial number, usage instructions, warnings, certifications, registrations, patent numbers, heating information, cleaning instructions, material information, recycling information, and the like.

Figure 79A:
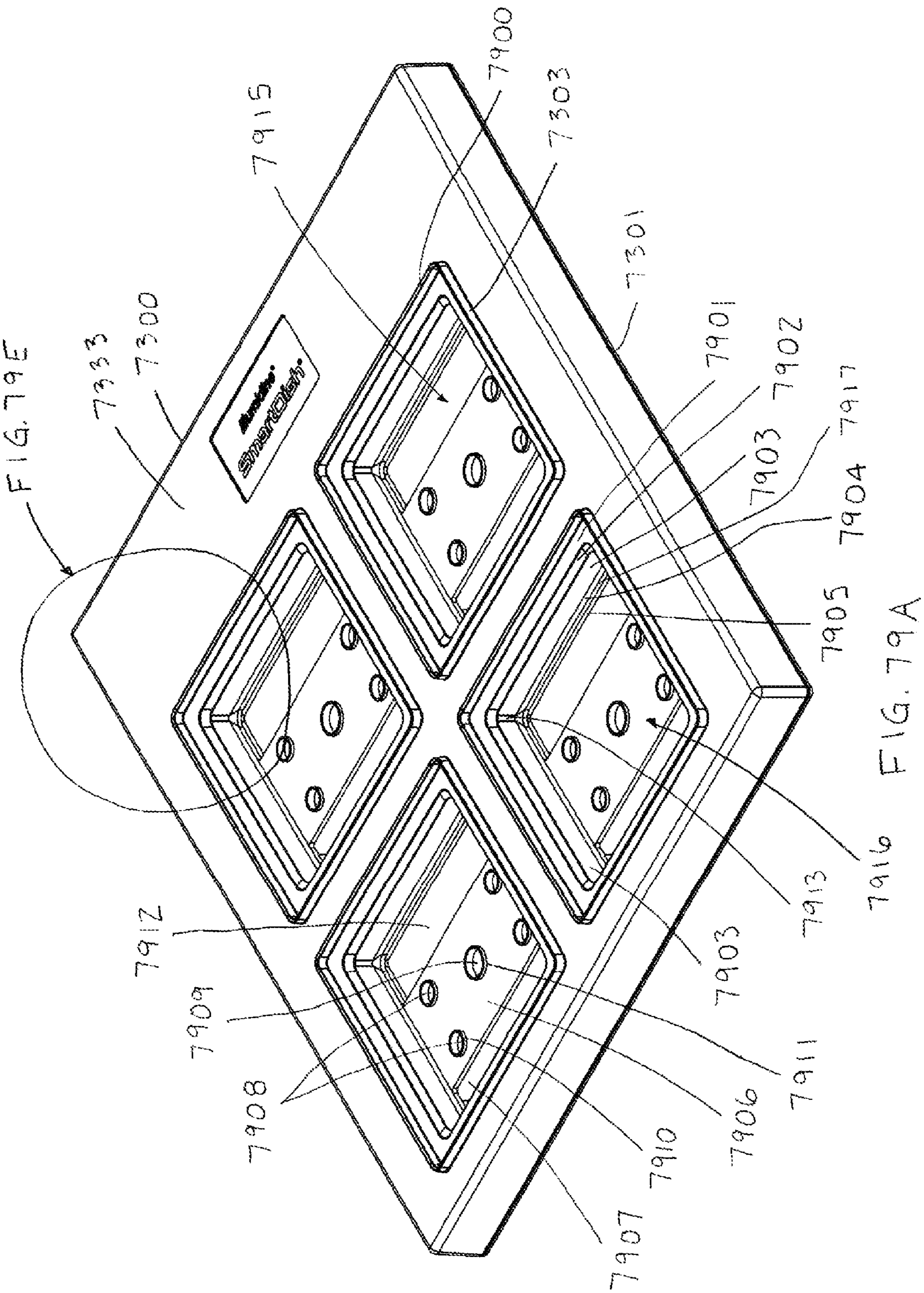
FIGS. 79A-79E are a perspective, plan, front, right-side, and upper-left-zoomed-in perspective view, respectively, of the active foodware system of FIG. 73A, where the dining dishes and the dish holders of FIG. 73A are removed to reveal mechanical structure underneath.
Figure 79B:
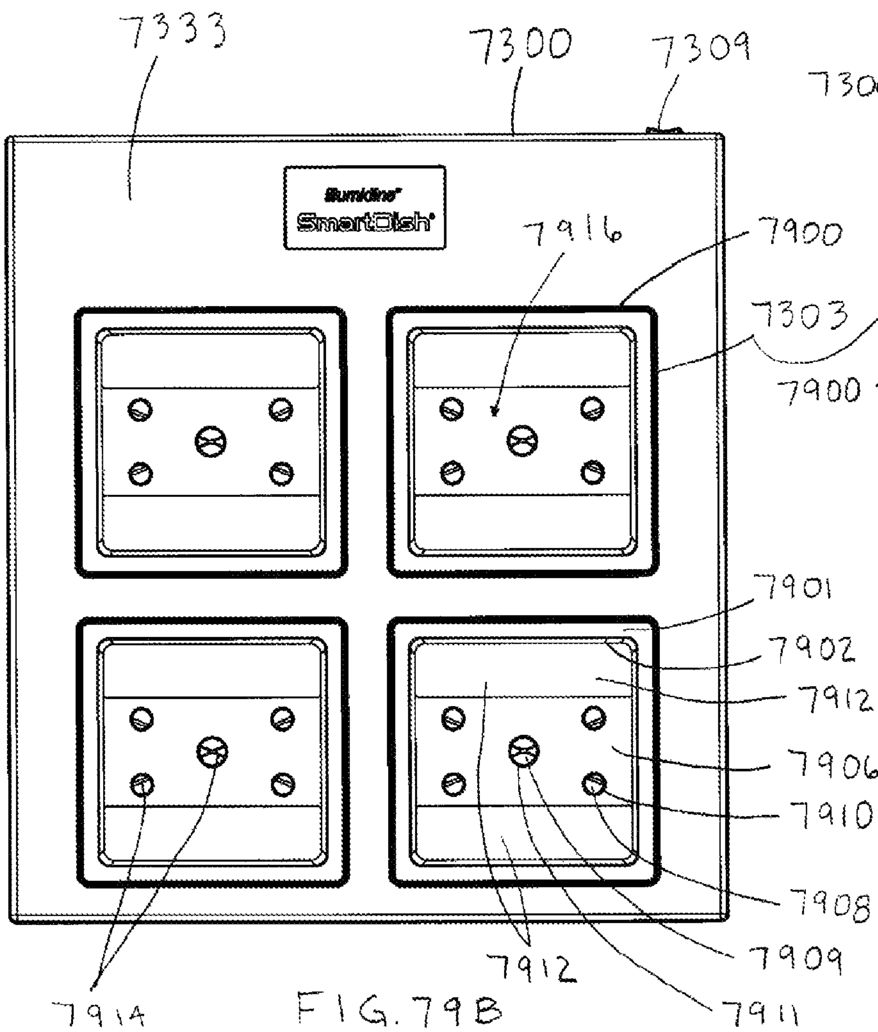
Figure 79D:
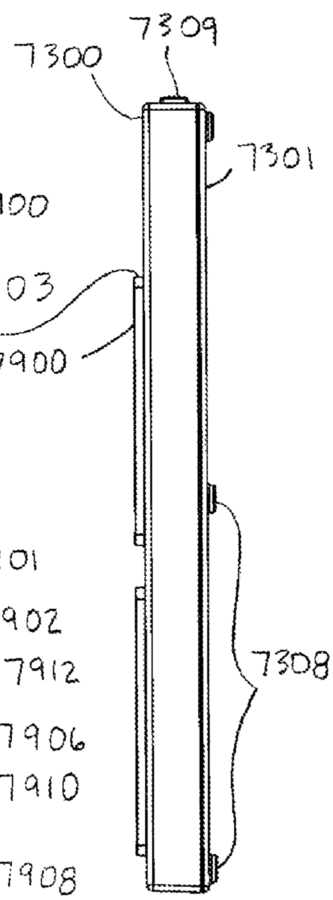
Figure 79C:
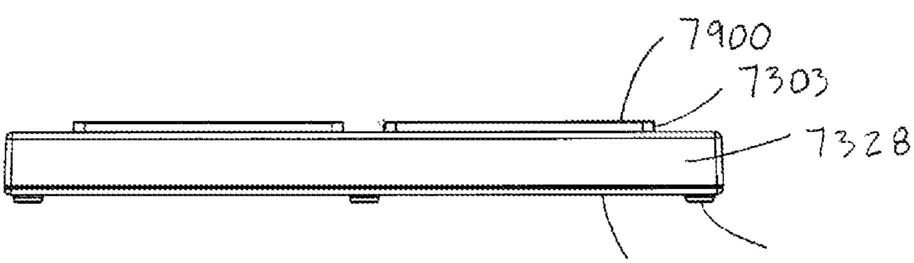
Figure 79E:
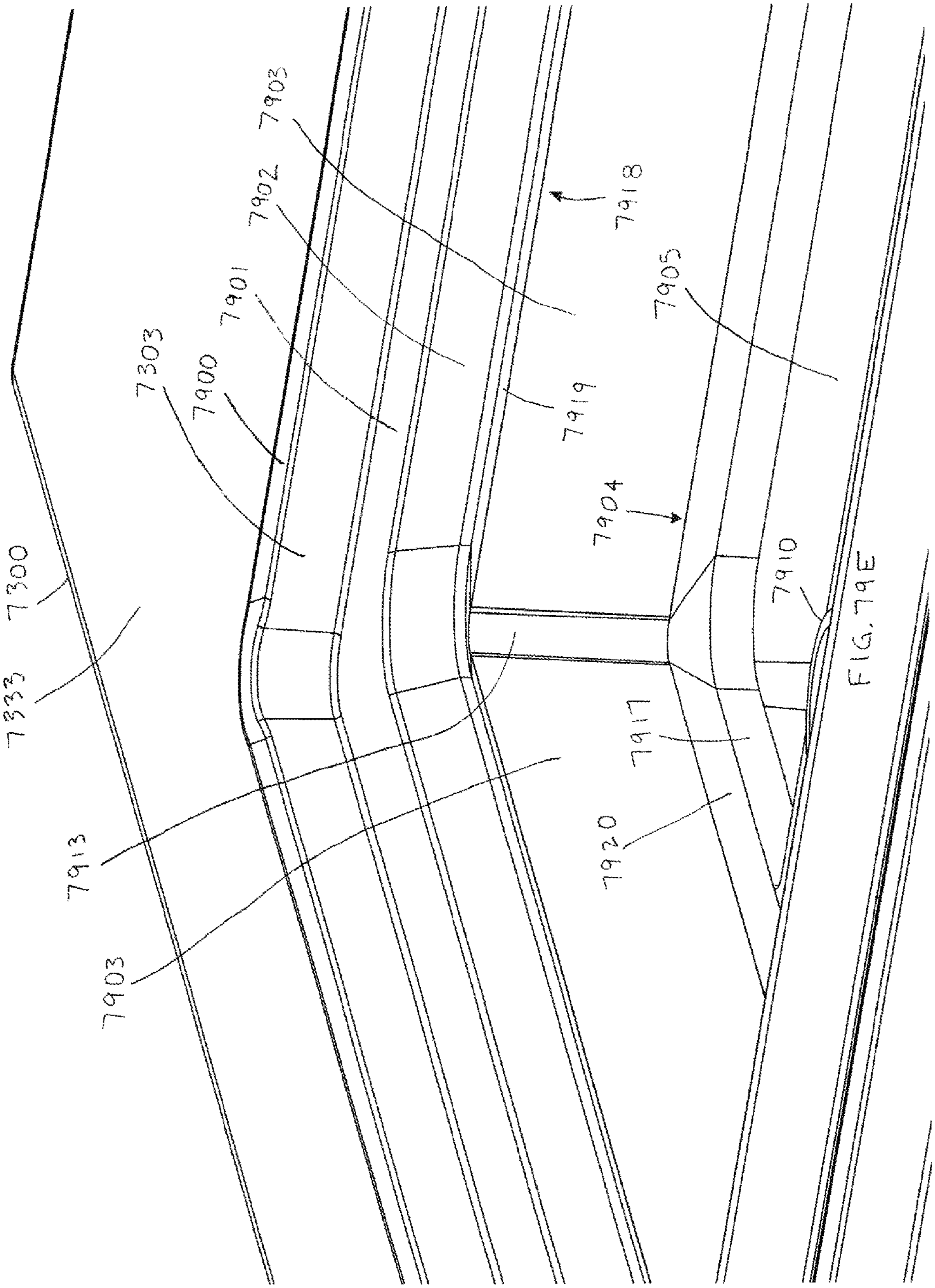

FIG. 79A is a perspective view of the active foodware system 7337 of FIG. 73A, where the dining dishes 7302 and the dish holders 7332 of FIG. 73A are removed to reveal mechanical structure underneath. FIG. 79B is a plan view, FIG. 79C is a front view, and FIG. 79D is a right-side view of the active foodware system provided by FIG. 77A. FIG. 79E is a zoomed-in perspective view of the upper left corner region of FIG. 79A as indicated by the labeled circle.

There are typically four openings 7915 in the top surface 7333 of the top 7300, where each opening 7915 is surrounded by a liquid barrier 7303, although any convenient number of openings 7506 may be used. Each liquid barrier 7303 may have a top edge 7900, as provided in FIGS. 79A-79E. As clearly provided in FIG. 79E, the top edge 7900 may be slanted to match the slope of the outer wall of a dish holder 7332, so both the inner and outer edges of the top edge 7900 are approximately equal distances away from the outer wall of a dish holder 7332 positioned above an opening 7915.

Typically there is a horizontal surface 7901 surrounded by the liquid barrier 7303. Typically, such a horizontal surface 7901 is coplanar with the top surface 7333 of the top 7300. The horizontal surface 7901 helps to catch any small food particles or liquid that make it over the liquid barrier 7303.

The horizontal surface 7901 may have an inner edge 7902 surrounding the opening 7915 in the top 7300. The inner edge 7902 may be slanted to match the slope of the outer wall of a dish holder 7332, so both the upper and lower edges of the inner edge 7902 are approximately equal distances away from the outer wall of a dish holder 7332 positioned above an opening 7915.

One or more lenses 7903 are typically positioned below the horizontal surface 7901, and typically recessed from the inner edge 7902. By recessing the lenses 7903, liquid or food particles that fall off the horizontal surface 7901 into the opening 7915 will fall in front of a lens 7903 and not necessarily drain down the lens 7903. There are typically four lenses 7903 for an opening 7915 that is square in general shape. Alternatively, a single lens with four separate lens surfaces may be used. A cylindrical lens, octagonal lens, or other convenient lens shape may also be used.

When four lenses 7903 are used for an opening 7915 that is square in general shape, the top 7300 typically has a lens post 7913 in each of the four corners of the opening 7915 to support the ends of the lenses 7903, and to create a water-tight seal. Alternatively, the base 7301 may have the lens posts. Each lens 7903 is typically supported along the top edge by top lens-receiving structure 7918 (see FIG. 79E) below the underside of the top 7300. A typical top lens-receiving structure 7918 includes a lens front brace 7919. Each lens 7903 is typically supported along the bottom edge by base lens-receiving structure 7904 above the topside of the base 7301.

As provided by FIGS. 79A and 79E, the base lens-receiving structure 7904 above the topside of the base 7301 may include a ledge 7920 with side surface 7917 extending over a vertical drainage surface 7905. The ledge 7920 may be sloping to help direct liquid to drain over the drainage surface 7905. Any liquid that contacts a lens 7903 and drains down the lens 7903 is intended to drain over the side surface 7917 of the base lens-receiving structure 7904 and drop through the drainage chute 7912 and onto the table or countertop, without coming into contact with the vertical drainage surface 7905.

A drainage pan (not shown) may be placed under the base 7301 of the mechanical housing structure 7336 to catch liquid that drains. The drainage pan may be configured for mating with the base 7301 or with another portion of the mechanical housing structure 7336. The drainage pan may removably snap onto, or be fastened to, a portion of the mechanical housing structure 7336 so the drainage pan is stays with the mechanical housing structure 7336 when it is moved. The drainage pan may then be removed from the mechanical housing structure 7336 for draining and cleaning.

A cantilever housing structure 7916 typically extends from one side of the opening 7915 to the other, typically joining the side surface 7917. The cantilever housing 7916 may have a top surface 7906 and a side surfaces 7907 on each side with a drainage chute 7912. The top surface 7906 of the cantilever housing 7916 may have a leg hole 7908 for each leg 7801 in the dish holder 7332 to pass through. Typically surrounding each leg hole 7908 is a water barrier 7910 to deter liquid that gets under the dish holder 7332 and on top 7906 of the cantilever housing 7916 from entering the cantilever housing 7916 through a leg hole 7908.

Typically centrally located in the top 7906 of the cantilever housing 7916 is a snap hole 7909. Typically surrounding the snap hole 7909 is water barrier 7911 to deter liquid that gets under the dish holder 7332 and on top 7906 of the cantilever housing 7916 from entering the cantilever housing 7916 through a snap hole 7909. The snap hole 7909 is for a snap plug connector on the bottom of a dish holder 7332 to connect with a mating snap receptacle connector that is part of a load-cell assembly, such as where the snap receptacle is attached to a cantilever beam extending to the side of a beam load cell.

The plan view of FIG. 79B shows an portion of the upper surface 7914 of a cantilever housing pocket cover 7323, as seen from above, through leg holes 7908 and snap holes 7909. The upper surface 7914 of the cantilever housing pocket cover 7323 provides an upward-facing surface of the bottom wall of the cantilever housing pocket of the cantilever housing 7916, which houses a cantilever beam extending to the side of a beam load cell. A cantilever beam is not present in the cantilever housing 7916 in FIGS. 79A-79E.

Figure 80:
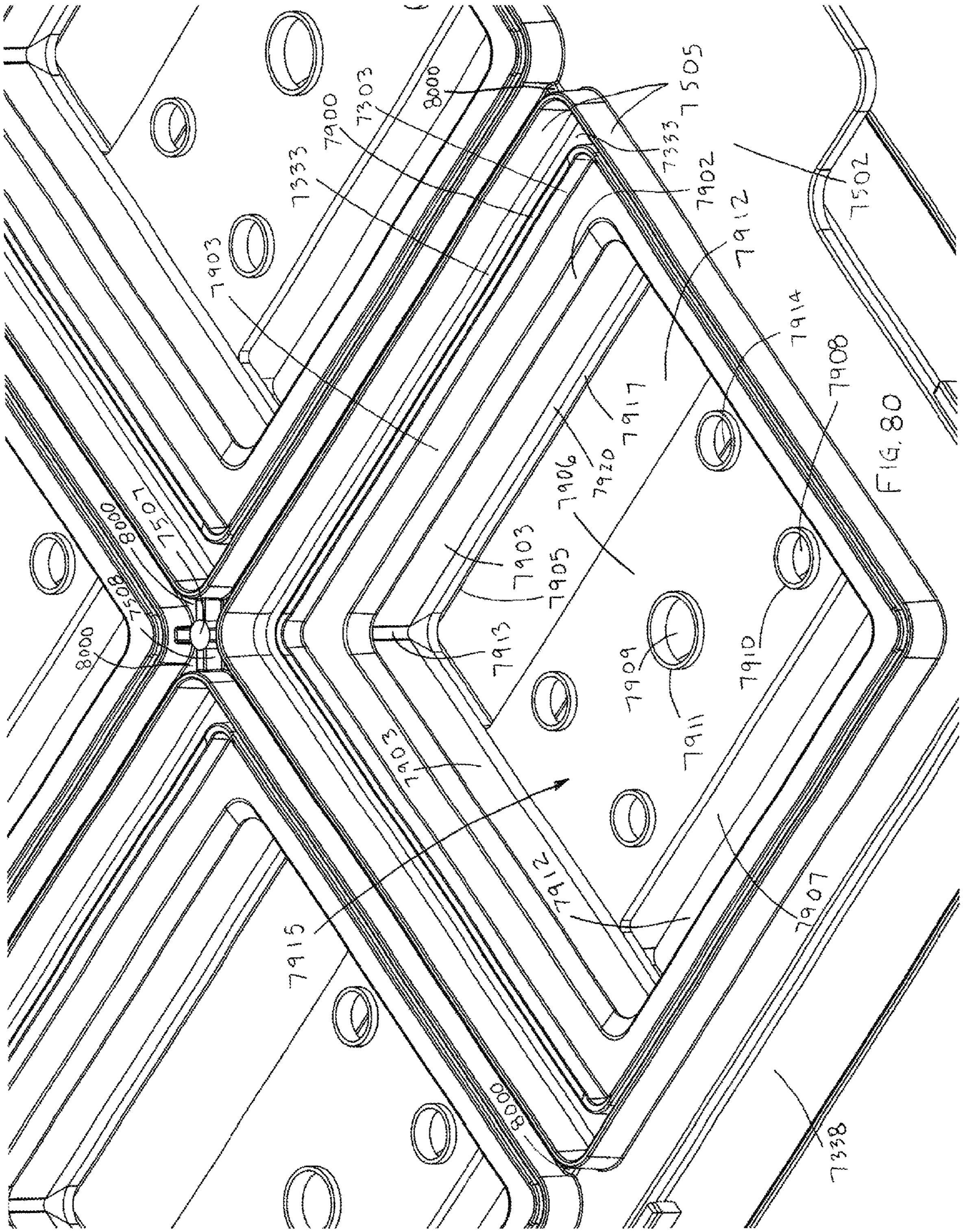
FIG. 80 is a zoomed in perspective view of the active foodware system of FIG. 73A, where the dining dishes and the dish holders of FIG. 73A are removed to reveal mechanical structure underneath, and the dish carrier is displayed.

FIG. 80 is a zoomed in perspective view of the active foodware system 7337 of FIG. 73A, where the dining dishes 7302 and the dish holders 7332 of FIG. 73A are removed to reveal mechanical structure underneath, and the dish carrier 7500 is displayed. FIG. 80 zooms in on the lower right portion of FIG. 73A. A selection of element reference numbers are added to show the correlation with other figures and previously described elements. Optionally, there is a raised portion 8000 in the channels between each of the water barrier walls 7505 of the dish carrier 7500. This raised portion 8000 adds structural stiffness as well as provides a larger cross section for plastic flow in an injection mold. In FIG. 80, with the dining dishes 7302 and the dish holders 7332 of FIG. 73A removed, the top surface 7333 of the top 7300 is visible between the water barrier walls 7505 of the dish carrier 7500 and the liquid barrier 7303 of the top 7300.

Figure 81A:
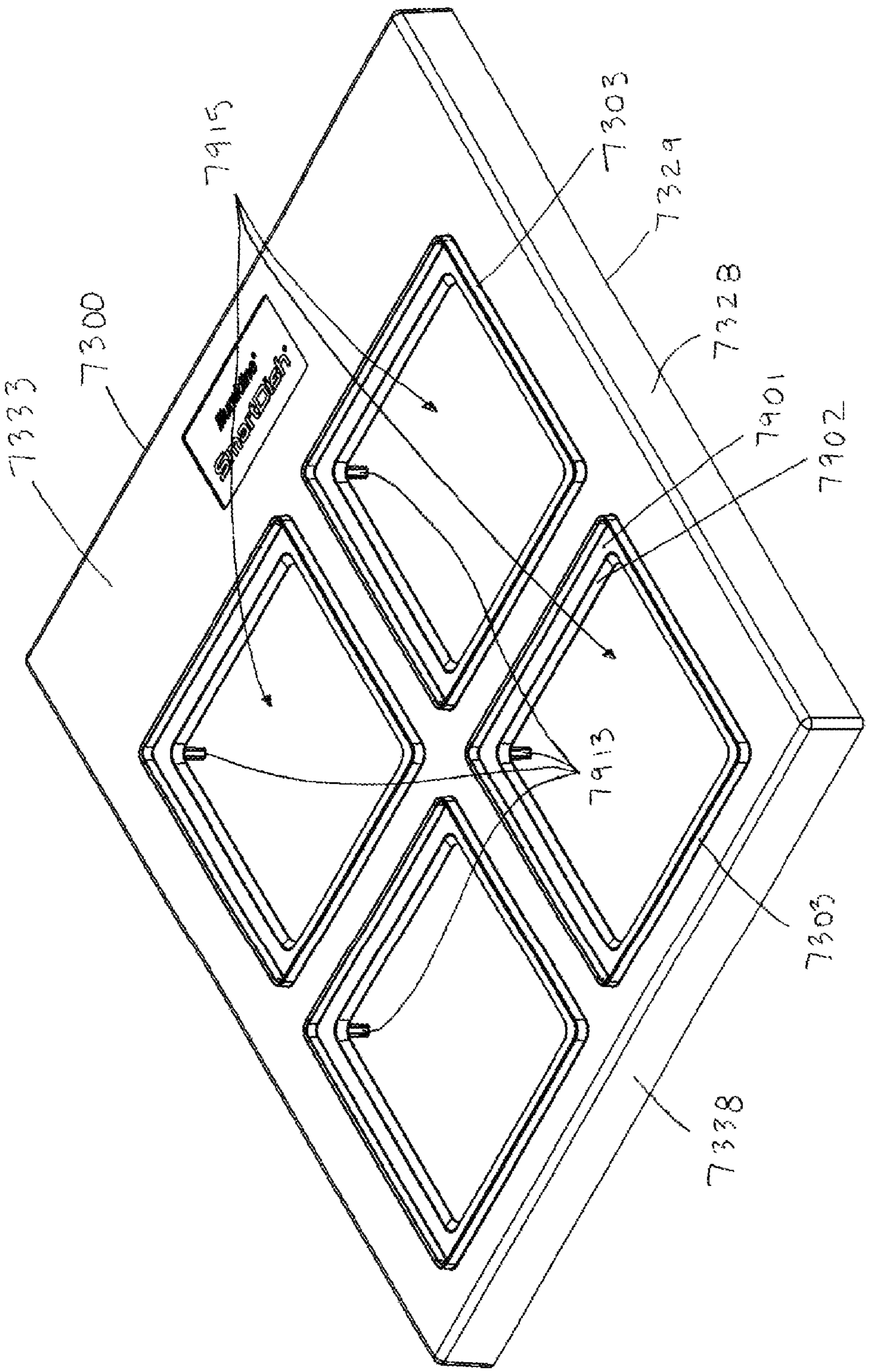
FIGS. 81A-81C are a perspective, bottom, and rear view, respectively, of the top of the mechanical housing structure of the useful embodiment of the active foodware system of FIG. 73A. In particular, the dining dishes, dish holders, and base of FIG. 73A are not shown.

FIG. 81A is a perspective view of the top 7300 of the mechanical housing structure 7336 of the useful embodiment of the active foodware system 7337 of FIG. 73A. In particular, the dining dishes 7302, dish holders 7332, and base 7301 of FIG. 73A are not shown.

Figure 81C:
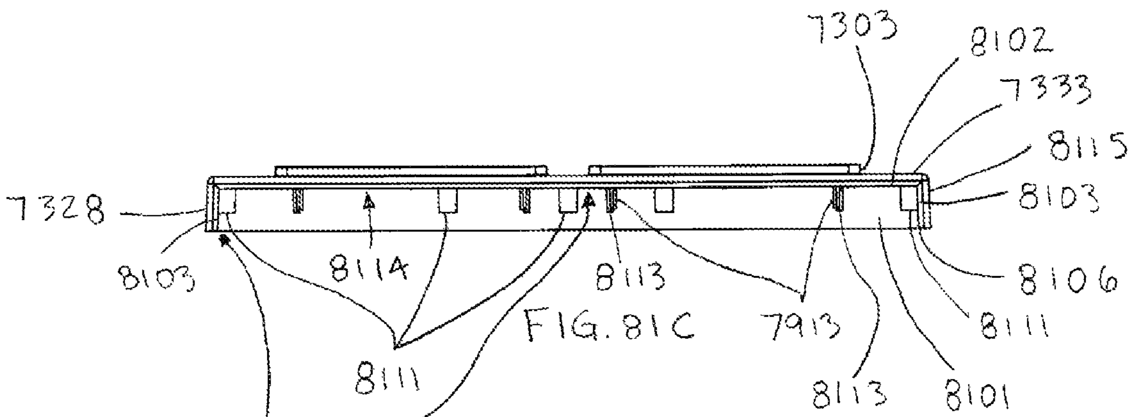
Figure 81B:
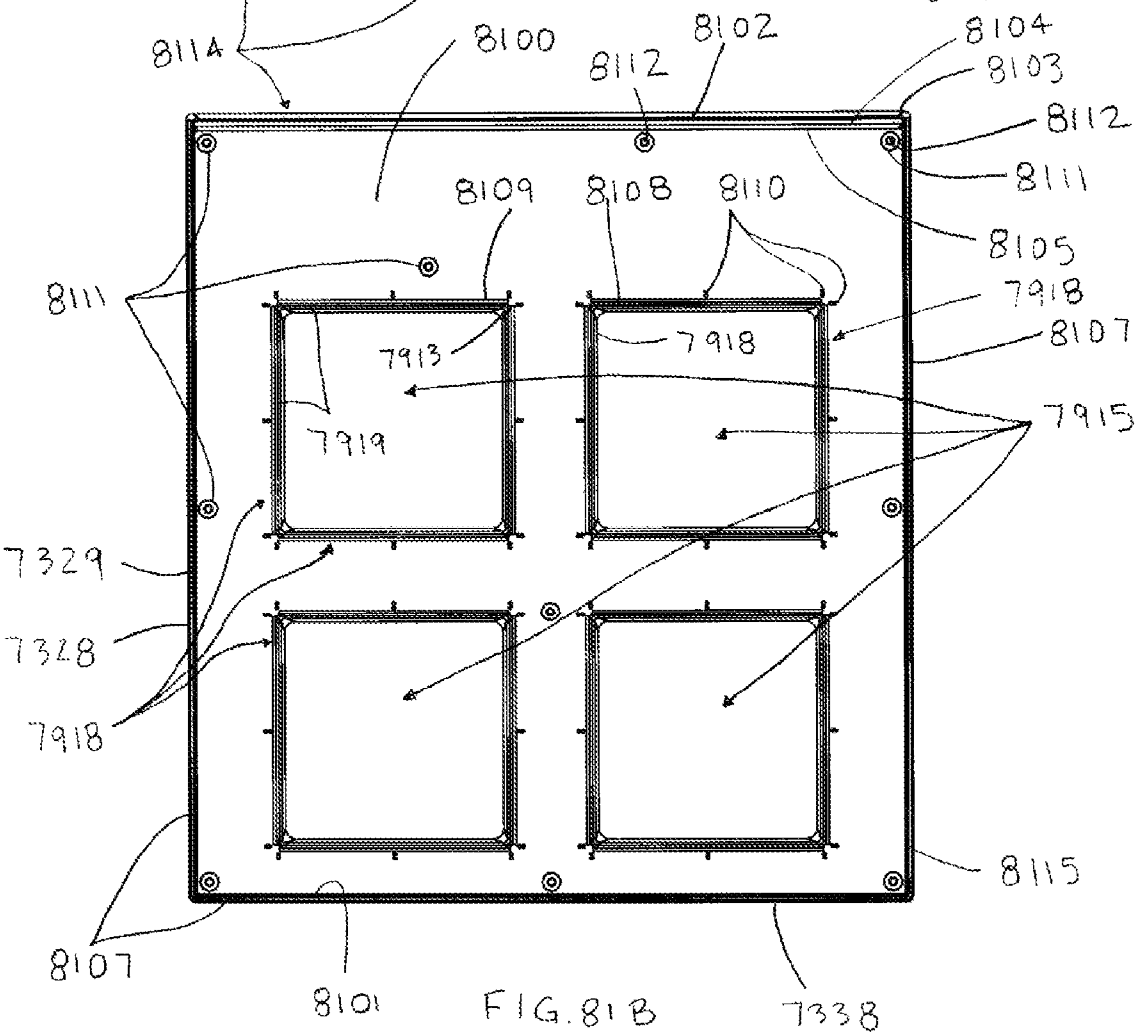

FIG. 81B is a plan view and FIG. 81C is a rear view of the top 7300 of FIG. 81A. The top 7300 has a bottom surface 8100. The front wall 7338 has a rear face 8101. The top 7300 of the mechanical housing structure 7336 of useful embodiment of the active foodware system 7337 typically does not have a rear wall that is manufactured into the top 7300 such that the rear wall and top 7300 are a single piece, as is the front wall 7338. Instead, the rear portion of the top 7300 is configured for receiving a removable rear panel 7312. A removable rear panel 7312 is not provided in FIGS. 81B and 81C. A removable rear panel 7312 facilitates assembly of the top 7300 and base 7301 when a printed circuit board (PCB) is affixed to the base 7301, and when the rear panel 7312 has components such as a switch 7309, a data/power connector 7310, a power connector, illumination elements 7311, and the like, that are to be affixed to the rear panel 7312. Configuration of the rear portion of the top 7300 may include a top rear-panel receiving structure 8114. Such a top rear-panel receiving structure 8114 may include mechanical structure including a panel slot 8104 bounded by a panel forward brace 8105, a panel rear brace 8102, and a panel side brace 8103. The panel side brace 8103 may include an angled face 8106 for mating with a mating angled face on the base 7301. A typical range of angles for the angled face 8106 is between 30 and 60 degrees, and a convenient angle is 45 degrees. Such an angled mating provides structural support and helps to create a watertight closure.

There typically is a groove 8107 on the bottom edge 7329 of the sidewall 7328 of the top 7300 that continues around the bottom of the front wall 7338 and the sidewall 8115. The groove 8107 typically is for fitting onto a mating rib that extends up from a mating portion of the perimeter of the base 7301. When the groove 8107 fits onto a mating rib, a parting line is produced that typically includes a small gap 7304 between the bottom edge 7329 of the sidewall 7328 of the top 7300 and the top edge 7331 of the sidewall 7330 of the base 7301. The rib is sometimes referred to as a "tongue." Preferably, the rib on the base 7301 is inserted into the groove 8107 of the top 7300 providing a watertight connection between the top 7300 and the base 7301. In the mechanical housing structure 7336 of the useful embodiment of the active foodware system 7337 of FIG. 73A, the base 7301 typically has the rib, and the top 7300 typically has the groove 8107, so that liquid that drips down a sidewall 7328 and into the gap 7304 drains down and away from the rib and not up into the groove. In an alternate embodiment, the base 7301 may include a groove, and the top 7300 may include a rib; however, in such a configuration, liquid that drips down a sidewall 7328 and into the gap 7304 might then drain down and collect in the groove, which could lead to growth of bacteria.

On the bottom surface 8100 of the top 7300, and positioned around the each opening 7915, typically is a top lens-receiving structure 7918 for receiving, positioning, and securing lenses 7903 from above. Such a top lens-receiving structure 7918 may include mechanical structure including a lens slot 8108, a lens front brace 7919, a lens rear brace 8109, and a lens post 7913 in each of the four corners of the openings 7915 to support the ends of the lenses 7903, and to create a watertight seal. The lens post 7913 may include a lens-post extension 8113 that extends into a mating cavity in the base 7301, providing additional structural support for the top 7300, as well as improving the watertight seal between the lenses 7903 and the top 7300 and base 7301.

FIG. 81B provides a plurality of top illumination supports 8110 extending from the bottom surface 8100 of the top 7300. The top illumination supports 8110 may include pairs of posts to position an illumination component, such as a strip of LEDs or LED chips, which may be multicolor LED chips, where the LED strip passes between each of the posts of a pair. Each LED strip may be flexible, and may be bent into a square shape to surround an opening 7915. Each of the posts of a pair of posts may be cylindrical, or have a square, triangular, octagonal, oval, or any other convenient cross section. The gap between the two posts of a pair of posts is typically only slightly larger than the thickness of the flexible LED strip. The end of each post of a pair of posts may be slanted to facilitate receiving a flexible LED strip that is first placed in corresponding base illumination supports on the base 7301 before the top 7300 is placed on top of the base 7301. LED strips are not provided in FIG. 81A-81C. There is typically one LED strip surrounding each of the four openings 7915, where in general any convenient number of openings 7506 may be used. The top illumination supports 8110 support the LED strips from above, and position them behind the lenses 7903, where light radiation from each LED of the LED strips is directed to pass through the lenses 7903. Only the tips of the top illumination supports 8110 provided in FIG. 81B are visible in FIG. 81C, since most of the top illumination supports 8110 are obscured by the panel rear brace 8102 in FIG. 81C.

FIGS. 81B-81C provide a plurality of top bosses 8111. The top bosses 8111 typically extend down from the bottom surface 8100 of the top 7300. The top bosses 8111 may include a top boss hole 8112 for receiving a fastener for joining the top 7300 with the base 7301. Convenient fasteners typically include a machine screw, a self-tapping screw, a sheet-metal screw, a rivet, and the like. The shank of such fasteners typically passes through an associated base boss that extends upward from the base 7301. Typically threads on the fastener then mate with threads in the top boss hole 8112. When a self-tapping screw is used, it creates mating threads in the top boss hole 8112.

Figure 82A:
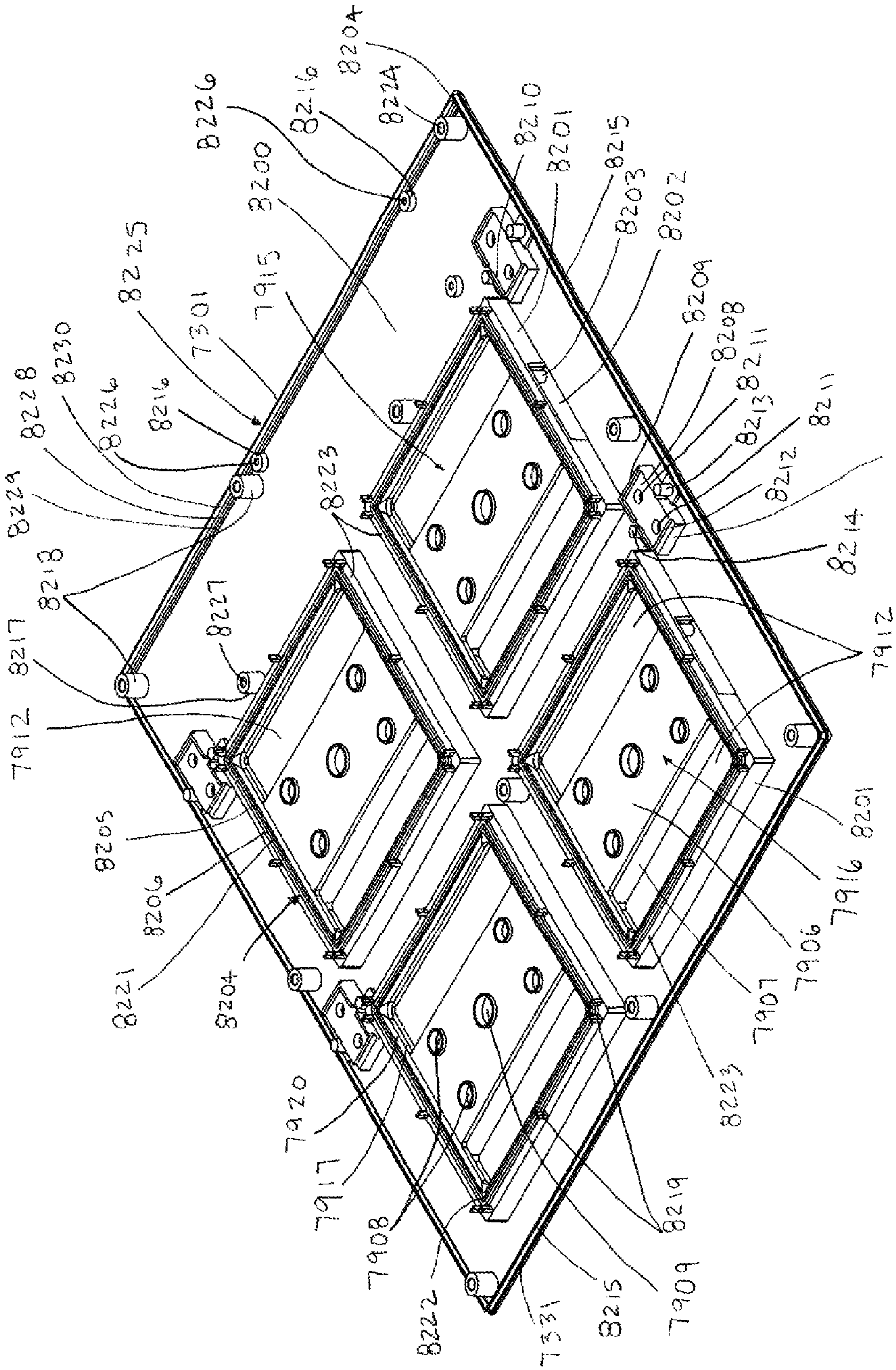
FIGS. 82A-82D are a perspective, plan, front, and right-side view, respectively, of the base of the mechanical housing structure of the useful embodiment of the active foodware system of FIG. 73A.
Figures 82B, 82C, 82D:
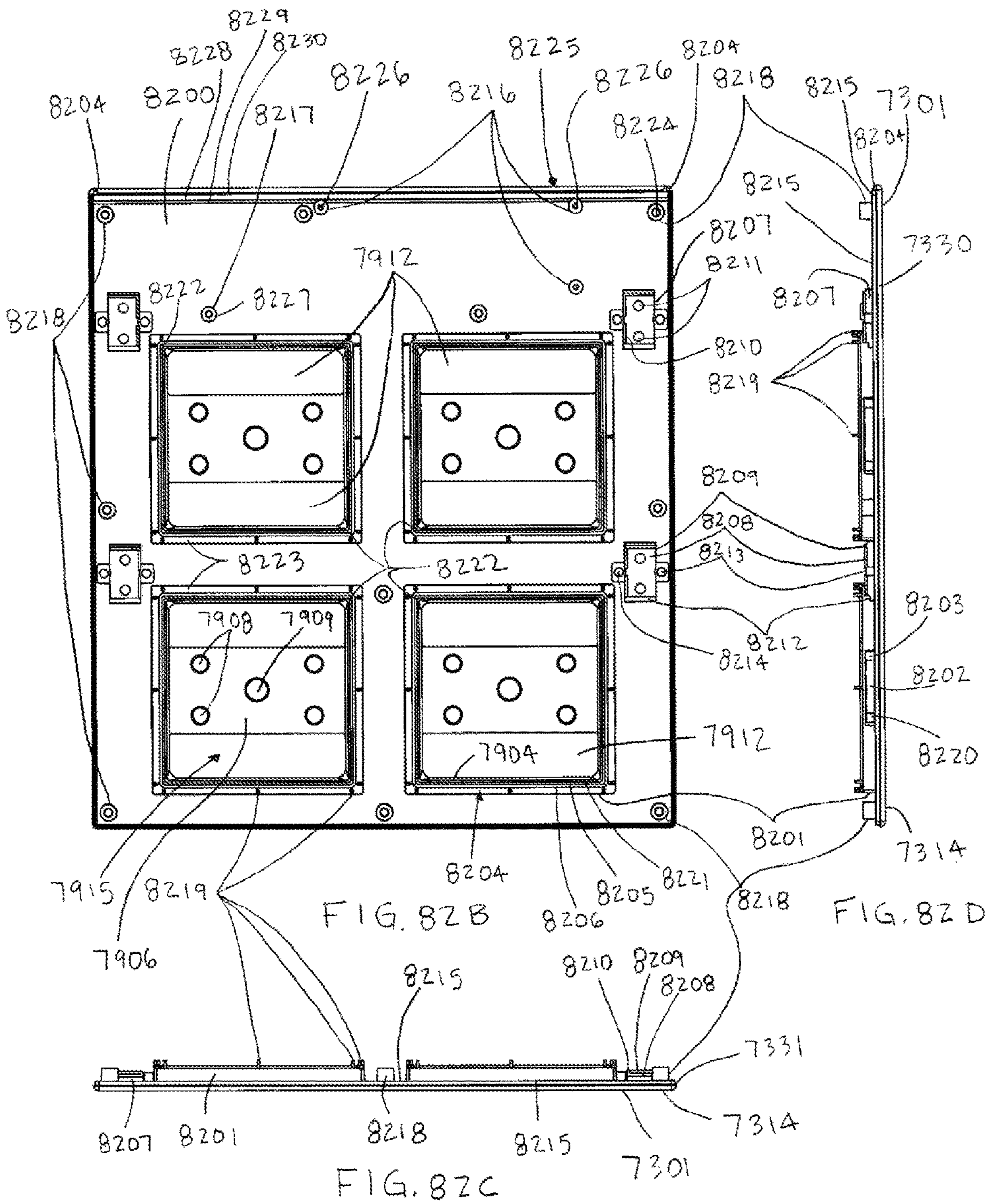

FIG. 82A is a perspective view of the base 7301 of the mechanical housing structure 7336 of the useful embodiment of the active foodware system 7337 of FIG. 73A. FIG. 82B is a plan view, FIG. 82C is a front view, and FIG. 82D is a right-side view of the base 7301 of FIG. 82A. The base 7301 has a top surface 8200.

Typically extending upward from the top surface of the base 7301 are four base lens supports 8201, one for each opening 7915. Each base lens support 8201 is typically square in shape, where each side of the square base lens support 8201 supports a different lens 7903 from below. There are typically a total of 16 lenses inside the mechanical housing structure 7336 of the useful embodiment of the active foodware system 7337 of FIG. 73A. On one sidewall that faces to the side of each base lens support 8201 is a cantilever opening 8202 leading to a cantilever housing pocket 8304. Cantilever housing pocket cover bosses 8203 and 8220 are used to fasten a cantilever housing pocket cover 7323 over the cantilever housing pocket 8304.

Typically on the top of each base lens support 8201, and positioned around the each opening 7915, is a base lens-receiving structure 7904 for receiving, positioning, and securing lenses 7903 from below. Such a base lens-receiving structure 7904 may include mechanical structure including a lens slot 8205, a lens platform front brace 8221, a lens rear brace 8206, and a lens post mating cavity 8222 in each corners of the base lens-receiving structure 7904 to receive a lens-post extension 8113, providing additional structural support for the top 7300, as well as improving the watertight seal between the lenses 7903 and the top 7300 and base 7301.

FIG. 82B provides a plurality of base illumination supports 8219 typically extending upward from the top surface 8223 of each of the base lens supports 8201. The base illumination supports 8219 may include pairs of posts to position an illumination component, such as a strip of LEDs, where the LED strip passes between each of the posts of a pair. Each LED strip may be flexible, and may be bent into a square shape to surround an opening 7915. Each of the posts of a pair of posts may be cylindrical, or have a square, triangular, octagonal, oval, or any other convenient cross section. The gap between the two posts of a pair of posts is typically only slightly larger than the thickness of the LED strip. LED strips are not provided in FIG. 82A-82C. There is typically one LED strips surrounding each of the four openings 7915, where in general any convenient number of openings 7506 may be used. The base illumination supports 8219 support the LED strips from beneath, and position them behind the lenses 7903, where light radiation from each LED of the LED strips is directed to pass through the lenses 7903. There may be additional lower bridging structure connecting the lower portion of each post of a pair of posts of the base illumination supports 8219. Such a lower bridging structure supports an LED strip from beneath and elevates the LED strip to a desired height, so the LEDs of the LED strip are positioned at a desired height relative to an associated lens 7903.

FIGS. 82A-82D provide a plurality of base bosses 8218. The base bosses 8218 typically extend up from the top surface 8200 of the base 7301. The base bosses 8218 may include a base boss hole 8224 for receiving a fastener for joining the top 7300 with the base 7301. Convenient fasteners typically include a machine screw, a self-tapping screw, a sheet-metal screw, a rivet, and the like. The shank of such fasteners typically passes up through the base boss hole 8224 that extends upward from the base 7301 and into an aligned top boss hole 8112 in a top boss 8111 that extends down from the bottom surface 8100 of the top 7300. Typically threads on the fastener then mate with threads in the top boss hole 8112; whereas the head of the fastener remains near the bottom surface of the base 7301. When a self-tapping screw is used, it creates mating threads in the top boss hole 8112.

PCB bosses 8216 are typically positioned on the top surface 8200 of the base 7301 and may have fastener holes 8226. A printed circuit board (PCB) may be fastened to the PCB bosses 8216 with screws that pass through holes in the PCB and into a fastener holes 8226 of one or more PCB bosses 8216.

A battery-clip boss 8217 may be positioned on the top surface 8200 of the base 7301 and have a fastener hole 8227. A battery turn button, also known as a mirror clip or offset clip, may be fastened to the battery-clip boss 8217 with a screw that passes through a hole in the battery turn button and into the fastener hole 8227 of the battery-clip boss 8217.

Typically there is a load-cell support 8207 for each load cell, typically one associated with each opening 7915. The load-cell support 8207 provided is for use with a beam load cell (not provided in FIGS. 82A-82D). The load-cell support 8207 typically has one or more load-cell mounting holes 8211 in a load-cell support top surface 8208 for fastening a load cell. Fastening typically includes using one or more machine screws passing up from the bottom surface 7314 of the base 7301 through the load-cell mounting holes 8211. There may be a ledge 8212 off the load-cell support top surface 8208 at a specific distance from one of the load-cell mounting holes 8211 that determines the point where a beam load cell may start to bend relative to the load-cell mounting hole 8211. There may also be one or more positioning constraints 8209 and 8210 to help position the fixed end of a beam load cell prior to fastening with one or more screws. A positioning constraint 8209 may have an "L" shape to constrain two positional dimensions. There may be one or more load-cell support pocket bosses 8213 and 8214 that are used to receive fasteners from the bottom surface 7314 of the base 7301 in order to fasten a load-cell support pocket cover 7326.

The base 7301 of the mechanical housing structure 7336 of useful embodiment of the active foodware system 7337 is typically configured for receiving a removable rear panel 7312. A removable rear panel 7312 is not provided in FIGS. 82A-81D. A removable rear panel 7312 facilitates assembly of the top 7300 and base 7301 when a printed circuit board (PCB) is affixed to the PCB bosses 8216 of the base 7301, and when the rear panel 7312 has components such as a switch 7309, a data/power connector 7310, a power connector, illumination elements 7311, and the like, that are to be affixed to the rear panel 7312. Configuration of the rear portion of the base 7301 may include a base rear-panel receiving structure 8225. Such a base rear-panel receiving structure 8225 may include mechanical structure including a panel slot 8228 bounded by a panel forward brace 8229 and a panel rear brace 8230. The panel rear brace 8230 on the base 7301 may include an angled face 8204 on each end for mating with an angled face 8106 on the panel side brace 8103 of the top 7300. A typical range of angles for the angled face 8106 is between 30 and 60 degrees, and a convenient angle is 45 degrees. Such an angled mating provides structural support and helps to create a watertight closure.

A rib 8215 typically extends upward from the top surface 8200 of the base 7301, and extends around at least a portion of the perimeter of the base 7301. Since the mechanical housing structure 7336 of the useful embodiment of the active foodware system 7337 typically includes a rear panel 7312 instead of a wall manufactured as a single piece into the top 7300, the rib 8215 only passes around the front and two sides, and not around the rear of the base 7301 where the base rear-panel receiving structure 8225 is.

Typically associated with the rib 8215 there is a mating groove 8107 on the bottom edge 7329 of the sidewall 7328 of the top 7300 that typically continues around the bottom of the front wall 7338 and the sidewall 8115. The groove 8107 typically is for fitting onto the mating rib 8215 that extends upward from a mating portion of the perimeter of the base 7301. When the groove 8107 fits onto the mating rib 8215, a parting line typically is produced that typically includes a small gap 7304 between the bottom edge 7329 of the sidewall 7328 of the top 7300 and the top edge 7331 of the sidewall 7330 of the base 7301. The rib 8215 is sometimes referred to as a "tongue." Preferably, the rib 8215 on the base 7301 is inserted into the groove 8107 of the top 7300 providing a watertight connection between the top 7300 and the base 7301. In the mechanical housing structure 7336 of the useful embodiment of the active foodware system 7337 of FIG. 73A, the base 7301 typically has the rib 8215, and the top 7300 typically has the groove 8107, so that liquid that drips down a sidewall 7328 and into the gap 7304 drains down and away from the rib 8215 and not up into the groove. In an alternate embodiment, the base 7301 may include a groove, and the top 7300 may include the rib 8215; however, in such a configuration, liquid that drips down a sidewall 7328 and into the gap 7304 might then drain down and collect in the groove, which could lead to growth of bacteria.

Figure 83A:
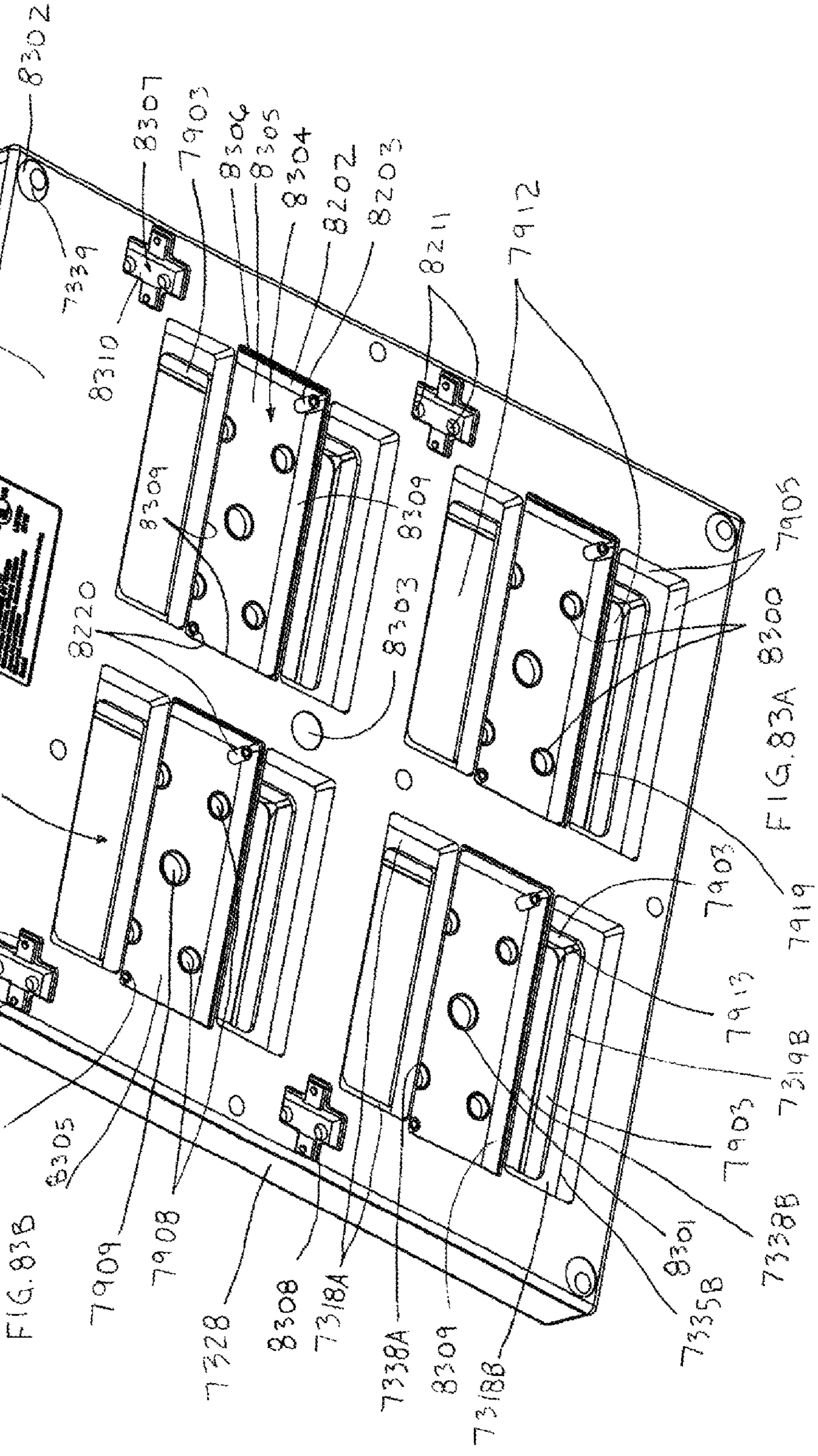
FIG. 83A is a bottom perspective view of the mechanical housing structure of the useful embodiment of the active foodware system of FIG. 73A, where the dining dishes and the dish holders of FIG. 73A are removed to reveal mechanical structure underneath.

FIG. 83A is a bottom perspective view of the mechanical housing structure 7336 of the useful embodiment of the active foodware system 7337 of FIG. 73A, where the dining dishes 7302 and the dish holders 7332 of FIG. 73A are removed to reveal mechanical structure underneath.

Typically underneath each opening 7915, and on the opposite side of the cantilever housing top surface 7906, is a cantilever housing pocket 8304. The cantilever housing pocket 8304 typically has a cantilever housing inner top surface 8305. The cantilever housing inner top surface 8305 is bordered by three cantilever housing inner side walls 8309. The fourth side of the cantilever housing inner top surface 8305 that faces outward to the side is a cantilever opening 8202 for passing a cantilever beam for weight sensing. The cantilever housing pocket cover bosses 8203 and 8220 are used to fasten a cantilever housing pocket cover 7323 over the cantilever housing pocket 8304.

The cantilever housing inner top surface 8305 of the cantilever housing pocket 8304 typically has a leg hole 7908 for each leg 7801 in a dish holder 7332 to pass through. Typically surrounding each leg hole 7908, and extending downward from the cantilever housing inner top surface 8305, is a leg drip lip 8300 from which liquid may drip that gets under the dish holder 7332 and on top 7906 of the cantilever housing 7916, and over the water barrier 7910 of the leg hole 7908. The leg drip lip 8300 helps direct liquid to drip straight down onto the upper surface 7914 of the cantilever housing pocket cover 7323 that covers the cantilever housing pocket 8304, and prevents liquid from wicking along the surface of the cantilever housing inner top surface 8305.

Similarly, typically surrounding a snap hole 7909, and extending downward from the cantilever housing inner top surface 8305, is a snap drip lip 8301 from which liquid may drip that gets under the dish holder 7332 and on top 7906 of the cantilever housing 7916, and over the water barrier 7911 of the snap hole 7909. The snap drip lip 8301 helps direct liquid to drip straight down onto the upper surface 7914 of the cantilever housing pocket cover 7323 that covers the cantilever housing pocket 8304, and prevents liquid from wicking along the surface of the cantilever housing inner top surface 8305.

Typically surrounding at least a portion of each cantilever housing pocket 8304, and where the cantilever housing pocket 8304 meets the bottom surface 7314 of the base 7301, is a recessed cantilever housing pocket ledge 8306. The cantilever housing pocket ledge 8306 is typically for mating with a cantilever housing pocket cover 7323 that covers the cantilever housing pocket 8304. Typically, the cantilever housing pocket cover 7323 is fastened by screws to the cantilever housing pocket cover bosses 8203 and 8220.

Typically beneath the load-cell support 8207 for each load cell is a load-cell support pocket 8307. Fasteners such as threaded screws are typically used to fasten a load cell to the load-cell support top surface 8208 of the load-cell support 8207. The threads of one or more load-cell screws for a load cell typically pass from the load-cell support pocket 8307, through the load-cell mounting holes 8211, and are screwed into mating holes of a beam load cell to affix the beam load cell to the load-cell support top surface 8208 of the load-cell support 8207. The head of each load-cell screw typically remains in the load-cell support pocket 8307, and may rest against the load-cell support pocket bottom surface 8310 surrounding the load-cell mounting holes 8211.

Figure 83B:
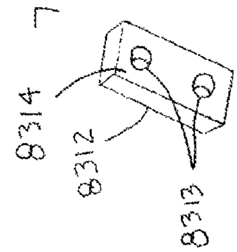
FIG. 83B provides a load-cell screw support.

Alternatively, FIG. 83B provides a load-cell screw support 8312 with a similar shape to the load-cell support pocket bottom surface 8310, and with load-cell screw support holes 8313 aligned with the load-cell mounting holes 8211. The load-cell screw support 8312 typically is for placing into the load-cell support pocket 8307, and resting against the load-cell support pocket bottom surface 8310, such that the threads of the one or more load-cell screws for the load cell also pass through the load-cell screw support holes 8313. The load-cell screw support 8312 typically is for distributing the load from the load-cell screws over a larger area, so the load-cell support pocket bottom surface 8310 doesn't bend or break while the load cell is sensing weight. The load-cell screw support 8312 is typically made from a metal, such as aluminum, zinc, nickel, or steel, but may be made from any convenient material, such as plastic. The head of each load-cell screw may rest against the load-cell screw support surface 8314 surrounding the load-cell screw support holes 8313.

Typically surrounding at least a portion of each load-cell support pocket 8307, and where the load-cell support pocket 8307 meets the bottom surface 7314 of the base 7301, is a recessed load-cell support pocket ledge 8308. The load-cell support pocket ledge 8308 is typically for mating with a load-cell support pocket cover 7326 that covers the load-cell support pocket 8307. Typically, the load-cell support pocket cover 7326 is fastened by screws to load-cell support pocket boss holes 8311 in the bottom of one or more load-cell support pocket bosses 8213 and 8214.

There may be foot structures on the bottom surface 7314 of the base 7301. Typically the foot structures include non-skid feet 7308 attached to the bottom surface 7314 of the base 7301 to prevent the mechanical housing structure 7336 from sliding on a table or counter top while dining. The feet 7308 may have any convenient form, including circular and rectangular. For the case where the feet 7308 are circular, FIG. 83A provides shallow circular recesses 8302 and 8303 for receiving circular feet 7308. The circular recess 8302 covers a screw hole 7317 that may be recessed 7339, such as chamfered, countersunk or counterbored. The circular recess 8303 does not cover a screw hole.

Figure 84:
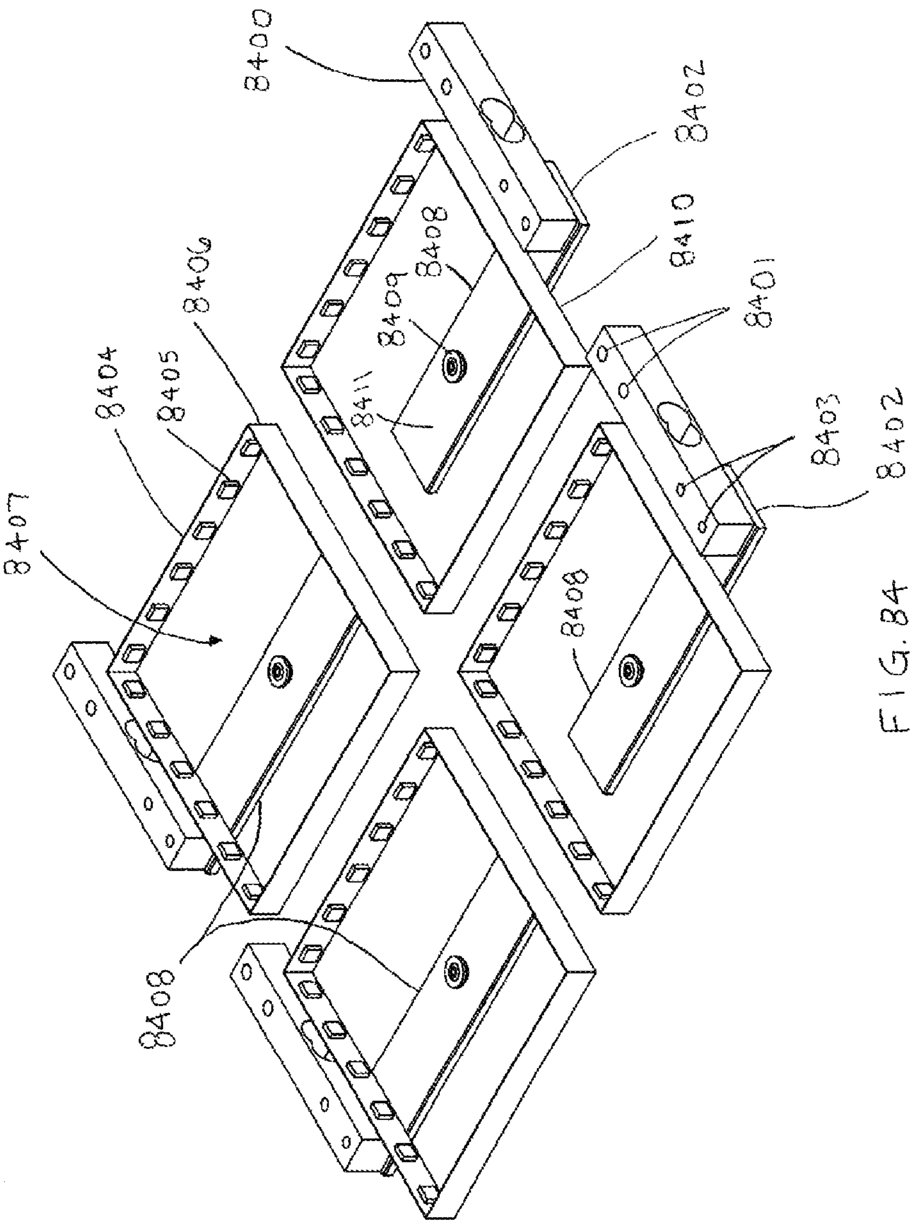
FIG. 84 is a perspective view of the some components that are typically contained inside the mechanical housing structure of the useful embodiment of the active foodware system of FIG. 73A, between the top and base. The top, the base, the dining dishes, and the dish holders of FIG. 73A are removed to reveal the components.

FIG. 84 is a perspective view of the some components that are typically contained inside the mechanical housing structure 7336 of the useful embodiment of the active foodware system 7337 of FIG. 73A, between the top 7300 and base 7301. The top 7300, the base 7301, the dining dishes 7302, and the dish holders 7332 of FIG. 73A are removed to reveal the components.

A beam load cell 8400 is typically joined to a load-cell support 8207 with load-cell screws. The threads of one or more load-cell screws for a load cell 8400 typically pass from the load-cell support pocket 8307, through the load-cell mounting holes 8211 (and optionally additionally through load-cell screw support holes 8313), and are screwed into mating holes of a beam load cell 8400 to secure the beam load cell 8400 to the load-cell support top surface 8208 of the load-cell support 8207. The head of each load-cell screw typically remains in the load-cell support pocket 8307, and may rest against the load-cell support pocket bottom surface 8310 surrounding the load-cell mounting holes 8211 (or optionally may rest against the load-cell screw support surface 8314 surrounding the load-cell screw support holes 8313). The threads of each load-cell screw are screwed into a load-cell screw hole 8401 on the fixed end of the load cell 8400.

A cantilever beam 8408 is typically fastened at one end 8402 to the non-fixed end of the load cell 8400, typically using screws screwed into non-fixed-end-load-cell screw holes 8403 of the load cell 8400, and where the screws are typically machine screws. The cantilever beam 8408 is typically for applying an external weight force to the load cell 8400 for sensing weight. The external weight force is typically exerted against the cantilever beam 8408 by a dish holder 7332, where the external weight force typically includes weight of food in a dining dish 7302 that is mated with the dish holder 7332, as well as the weight of the dining dish 7302, the dish holder 7332, fasteners for securing the dish holder 7332 to the cantilever beam 8408, and the like.

A snap receptacle 8409 may be fastened to the cantilever beam 8408, typically to the cantilever-beam upper surface 8411, for helping to removably secure the dish holder 7332 to the cantilever beam 8408. The snap receptacle 8409 may be plastic. The fastening of the snap receptacle 8409 may include a screw passing through a hole in the cantilever beam 8408 and into the snap receptacle 8409. Alternately, a snap plug may be fastened to the cantilever beam 8408. The snap plug may be plastic.

When a snap receptacle 8409 is fastened to the cantilever beam 8408, typically the dish holder 7332 has a mating snap plug so the dish holder 7332 may be removably secured to the cantilever beam 8408. Accordingly, the dish holder 7332 may be easily removed by the user for cleaning or replacement, yet remain secured to the cantilever beam 8408 while dining, so the dish holder 7332 reliably exerts onto the cantilever beam 8408 the weight force of the food in a mated dining dish 7302.

A mating snap plug, for mating with a snap receptacle 8409, may be fastened to the lower portion of the dish holder 7332, such as to the snap mounting structure 7803. The snap plug functionality also may be manufactured directly into the lower portion of the dish holder 7332, so there the dish holder 7332 and snap plug functionality are a single part.

The snap receptacle 8409 and snap plug may be swapped in the description above.

An LED strip 8404 is a strip of material having a plurality of light emitting diodes (LEDs) or LED chips 8405, which may be multicolor LED chips. The density of LEDs or LED chips on an LED strip 8405 may vary as convenient or desired. For the LED strip 8405 used with the mechanical housing structure 7336 of the useful embodiment of the active foodware system 7337 of FIG. 73A, a useful density may be 60 LED chips per meter, such as provided by BTF-Lighting, model BTF-5V-60L-W. A density of 144 LED chips per meter may also be used, such as provided by an Adafruit NeoPixel RGBW 144 LED strip P2847. The LED strip 8404 is typically a flexible circuit board substrate with LEDs mechanically and electrically attached. A flexible circuit board may include copper for circuit connections between LEDs 8404, capacitors, resistors, wires, and other electrical components, as well as include flexible electrically insulating material, solder, ink for coloring and text printing, and the like. Each LED strip 8404 is typically shaped into a square, such as by bending, where one corner 8406 of the square is open where the LED strip 8404 starts and ends. The LED strip open corner 8406 is where electrical connections, typically wires, are made to the LED strip. The electrical connections may include two, three, four, or more wires, for providing power and signals to the LEDs 8405 of the LED strip 8404. The LEDs 8405 are positioned to face to the square interior 8407. Each side of the square-shaped LED strip typically has six LEDs 8405; although, each side may contain any convenient number of LEDs 8405 which may be more or fewer. More LEDs 8405 typically increases cost, computing requirements, and electrical power requirements; whereas, fewer LEDs typically decreases cost, computing requirements, and electrical power requirements.

A portion of both the dish holder 7332 and dining dish 7302 typically extend into or near the square interior 8407. If the dish holder 7332 and dining dish 7302 are translucent, light from one or more of the LEDs 8405 may illuminate the dish holder 7332 and dining dish 7302. Some light radiation from the LEDs 8405 may also pass through both the dish holder 7332 and dining dish 7302, and illuminate the food or other contents of the dining dish 7302.

Light radiation from the LEDs 8405 or other light sources that passes through the dish holder 7332 and/or dining dish 7302, and that reaches food on the dining dish 7302, may be used to determine the type of food present, food ingredients, calories, sodium, other nutrition content, color, amount, and other food properties. When LEDs 8405 produce a light source in the near infrared (NIR) region of the electromagnetic spectrum (from 780 nm to 2500 nm), mass spectroscopy may be performed on the food in a dining dish 7302. In addition to an LED 8405 as a light source, other components (not shown here) used for mass spectroscopy may be located below, to the side, or above the food, or any other convenient functional location. Computation may be performed remotely, such as the internet "cloud." Such other components may include a camera, such as the camera of a smart phone or tablet computer. Such other components typically include a detector and a dispersive element (such as a prism, or, more commonly, a diffraction grating) to allow the intensity at different wavelengths to be recorded. Fourier transform NIR instruments using an interferometer may be used, especially for wavelengths above ~1000 nm. Depending on the food, the spectrum can be measured in either reflection or transmission. In addition to using LEDs 8405 as the source of NIR light, incandescent or quartz halogen light bulbs may be used as broadband sources of near-infrared radiation for analytical applications. If the camera of a smart phone or tablet computer is capable of detecting NIR wavelengths, the camera may be used to help detect light, and smart phone or tablet computer also may be used to perform spectroscopy computations, such as a Fourier transform, on the detected light.

An LED strip 8404 is typically positioned relative to the top surface 8223 of each of the base lens supports 8201 using base illumination supports 8219, and positioned relative to the top 7300 using top illumination supports 8110. The cantilever beam 8408 passes through a cantilever opening 8202 in the base 7301, and typically passes under the LED strip lower surface 8410.

Figure 85:
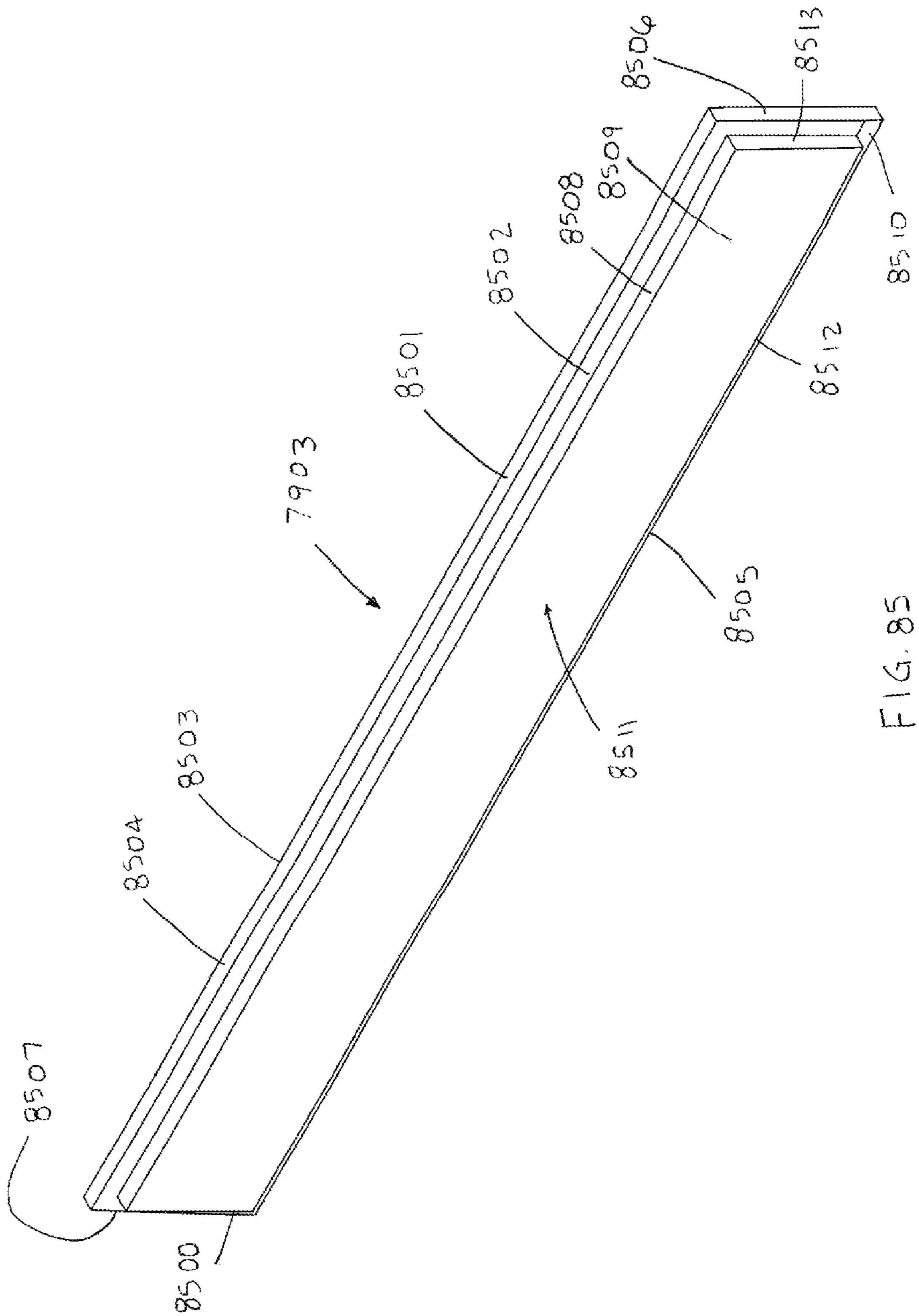
FIG. 85 is a perspective view of a lens used inside the mechanical housing structure of the useful embodiment of the active foodware system of FIG. 73A.

FIG. 85 is a perspective view of a lens 7903 used inside the mechanical housing structure 7336 of the useful embodiment of the active foodware system 7337 of FIG. 73A. The useful embodiment of the active foodware system 7337 of FIG. 73A typically uses 16 lenses 7903, one around each of the four sides of each of the four openings 7915. In general, any convenient number of openings 7506 and surrounding lenses 7903 may be used.

The lens 7903 typically has a top surface 8501, a bottom surface 8505, a front surface 8502, a rear surface 8503, a right surface 8506, and a left surface 8507. The lens 7903 may also have a second front surface 8510 that is not coplanar with the front surface 8502. Typically there is a lens plateau 8511 extending from the front surface 8502. The lens plateau 8511 has a top surface 8508, a bottom surface 8512, a front surface 8509, a right surface 8513, and a left surface 8500. The lens 7903 and lens plateau 8511 are typically molded as a single unit. For simplicity, when referring to a lens 7903, it is understood to be referring to a lens 7903 with lens plateau 8511, unless specifically stated otherwise.

A lens 7903 is typically translucent or transparent. The lens 7903 may include one or more translucent colors. The surface of all or a portion of the lens 7903 may be roughened to scatter light, such as by bead blasting. The lens 7903 may be impregnated with light-scattering elements, which may include a variety of forms, and may be transparent, translucent, and/or opaque, and/or may be air pockets. The lens 7903 may include a translucent film. The lens 7903 may include a translucent graphic. The lens 7903 may include a graphical display, such as an LED display, liquid crystal display (LCD), plasma display, or any other convenient graphical display technology. When the lens 7903 includes a graphical display, the graphical display may be computer programmable to display different graphics, a sequence of images, and/or videos.

Typically, the lens top surface 8501 is inserted into the lens slot 8108 of the lens-receiving structure 7918 of the top 7300. Typically, the lens bottom surface 8505 is inserted into a lens slot 8205 of the lens-receiving structure 7904 of the base 7301. Each lens right surface 8506 and left surface 8507 typically mates with a portion of a side surface of a lens-post extension 8113, and each plateau right surface 8513 and left surface 8500 typically mates with a portion of a side surface of a lens post 7913 that is joined to the lens-post extension 8113. Each joined lens post 7913 and lens-post extension 8113 is positioned in each of the four corners of an opening 7915, and is for supporting the ends of the lenses 7903, and is for creating a watertight seal so liquid doesn't reach LEDs 8405, LED strips 8404, and other electrical components positioned behind the lenses 7903.

Figure 86A:
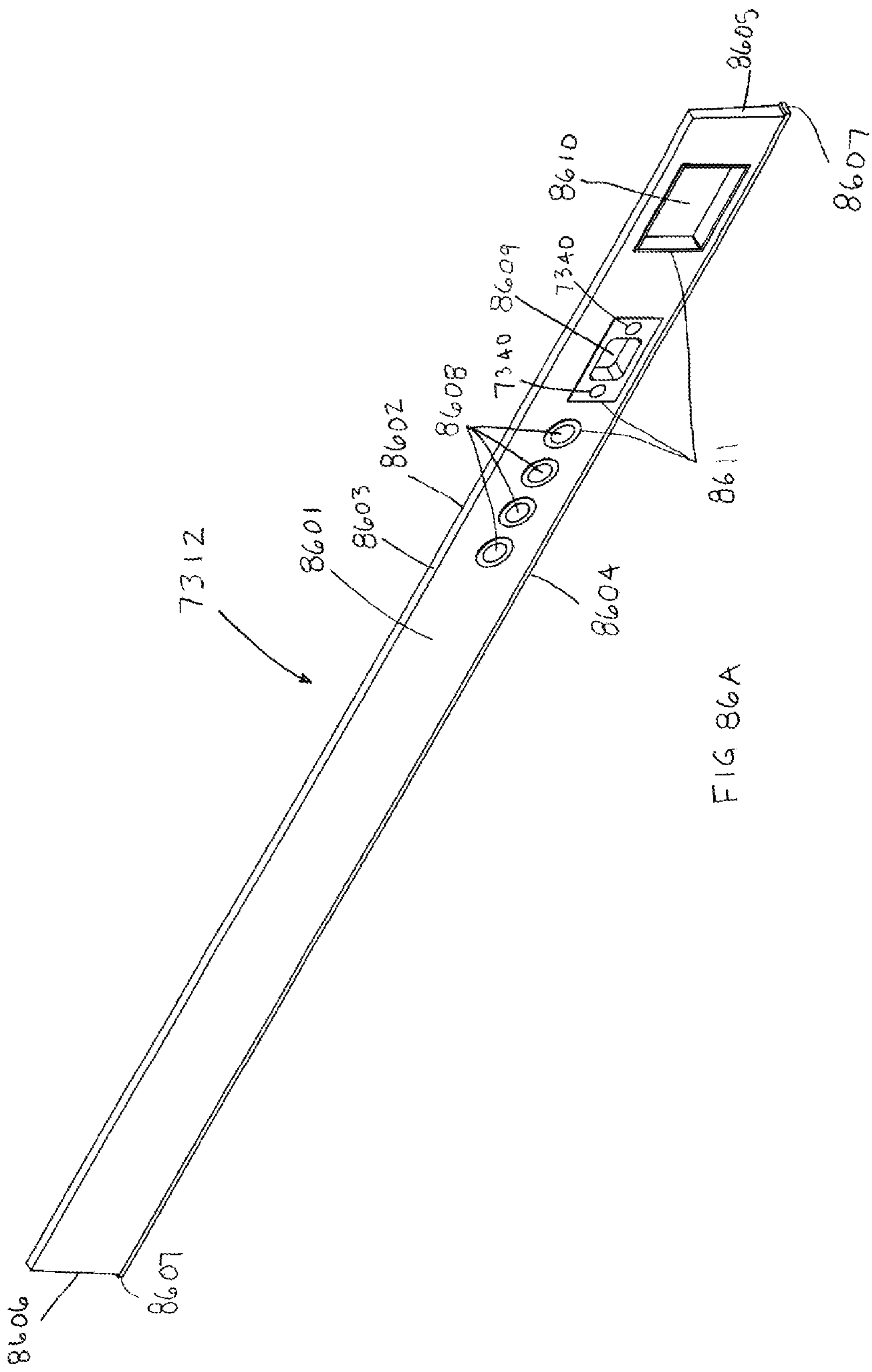
FIGS. 86A-86C are a perspective, rear, and bottom view, respectively, of a removable rear panel used at the rear of the mechanical housing structure of the useful embodiment of the active foodware system of FIG. 73A.
Figure 86B:
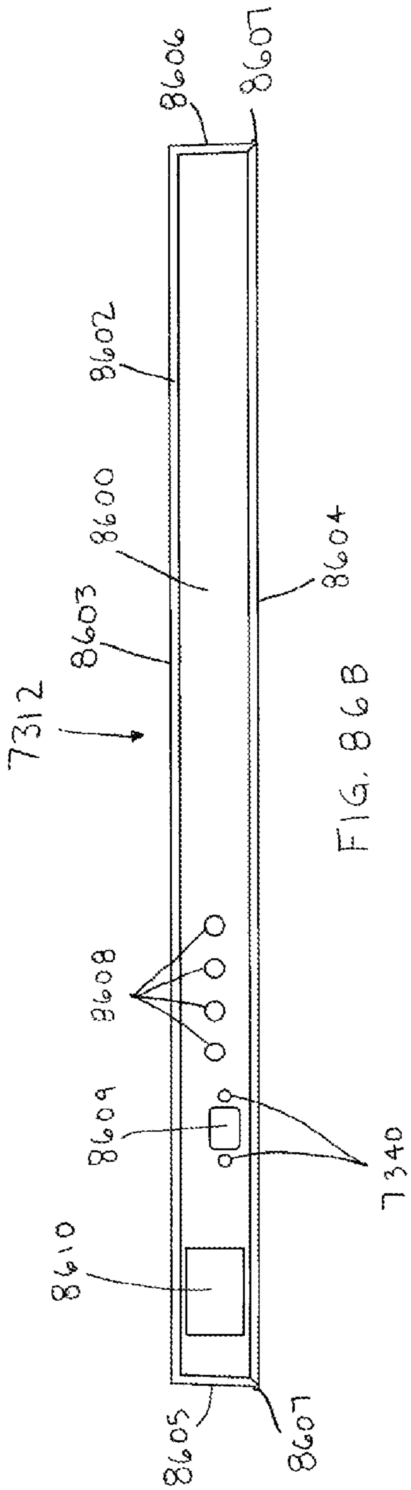
Figure 86C:
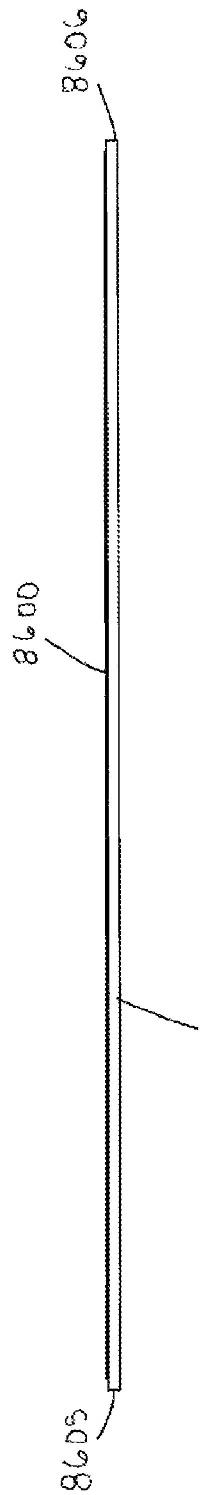

FIG. 86A is a perspective view of a removable rear panel 7312 used at the rear of the mechanical housing structure 7336 of the useful embodiment of the active foodware system 7337 of FIG. 73A. FIG. 86B is a rear view, and FIG. 86C is a bottom view of the rear panel 7312 of FIG. 86A.

The rear panel 7312 typically has a forward surface 8601, a rearward surface 8602, a top surface 8603, a bottom surface 8604, a right surface 8605, and a left surface 8606. The rear panel 7312 may also have extensions 8607 on each side that fit between the top 7300 and base 7301 and that extend to the sides to the rib 8215 of the base 7301, in order to provide a watertight closure.

The rear panel 7312 may have one or more component holes to receive and secure components. The rear panel 7312 may have a switch hole 8610 to receive a switch 7309, a data connector hole 8609 to receive a data/power connector 7310, and/or one or more illumination element holes 8608 to receive illumination elements 7311. Illumination elements 7311 may include LEDs. Hollow LED lenses, which may be Fresnel lenses, may be secured watertight into the illumination element holes 8608 with the hollow portion of the LED lenses on the inside of the mechanical housing structure 7336, where LEDs extending from a printed circuit board may be inserted into a cavity in the hollow LED lenses. A convenient hollow LED lens is made by Visual Communications Company, Inc. (VCC), with model SMS 172 CTP (which is clear, although any convenient color may be used), typically used with a rubber O-ring moisture seal, and typically used with a retaining ring model RNG 132 to help secure to a display panel. Each component hole may have a forward component plateau 8611 having a vertical forward surface surrounding it to provide a flat forward surface to mate with the component. Each component hole may have a rearward component plateau 8600 having a vertical forward surface surrounding it to provide a flat rearward surface to mate with the component.

The bottom surface 7604 of the rear panel 7312 typically is inserted into the panel slot 8228 bounded by a panel forward brace 8229 and a panel rear brace 8230 of the rear-panel receiving structure 8225 of the base 7301. When the top 7300 is placed on the base 7301, the top surface 8603 of the rear panel 7312 is inserted into the panel slot 8104 bounded by a panel forward brace 8105, a panel rear brace 8102, and a panel side brace 8103 of the rear-panel receiving structure 8114 of the top 7300.

The top surface of the rearward component plateau 8600 typically mates with the lower surface of the panel rear brace 8102 of the top 7300; the side surfaces of the rearward component plateau 8600 typically mate with the panel side braces 8103 of the top 7300; and the bottom surface of the rearward component plateau 8600 typically mates with the upper surface of the panel rear brace 8230 of the base 7301. Such mating of the rearward component plateau 8600 helps provide a watertight connection of the rear panel 7312 with the top 7300 and base 7301.

Figure 87A:
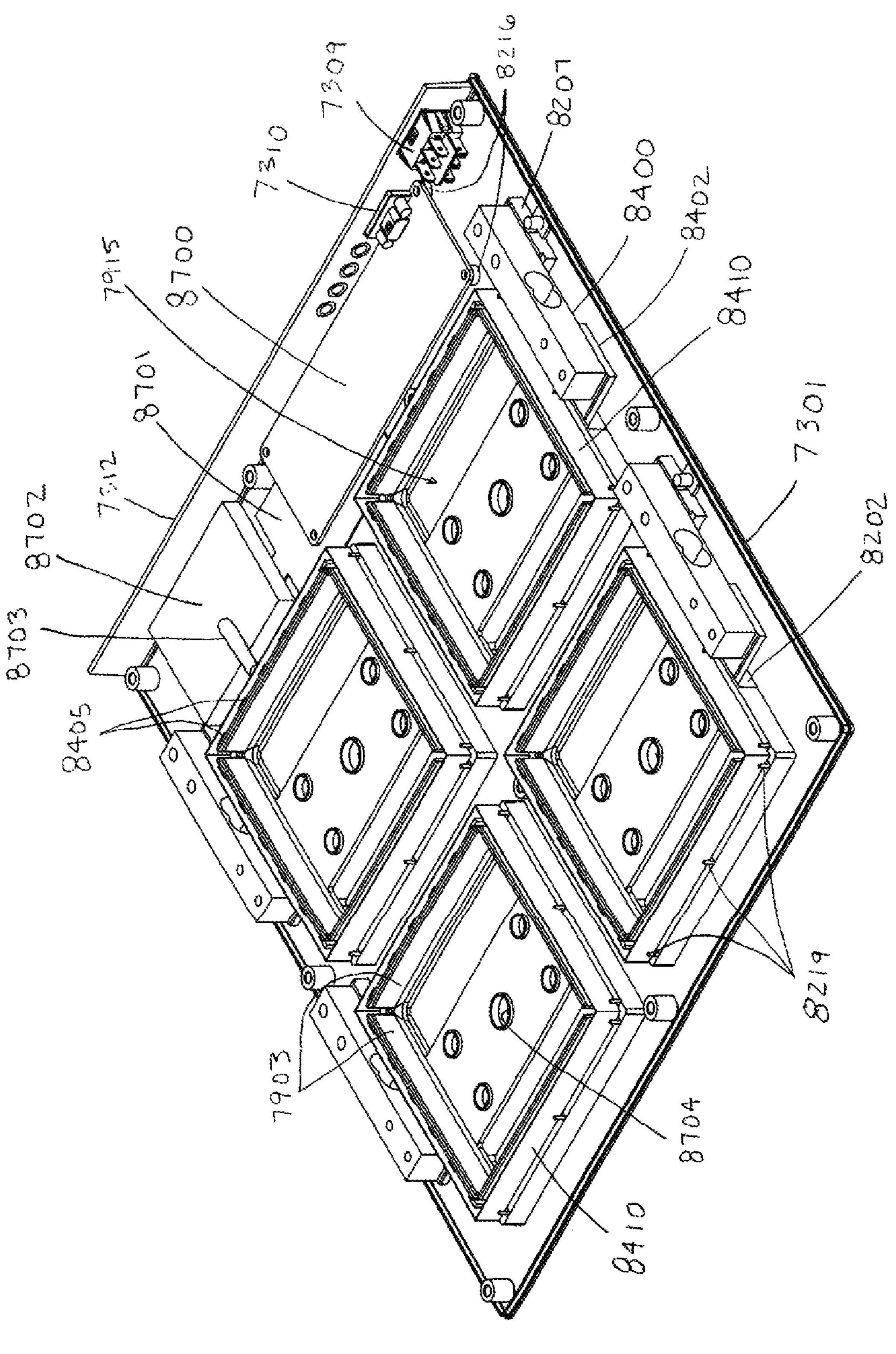
Figure 87F:
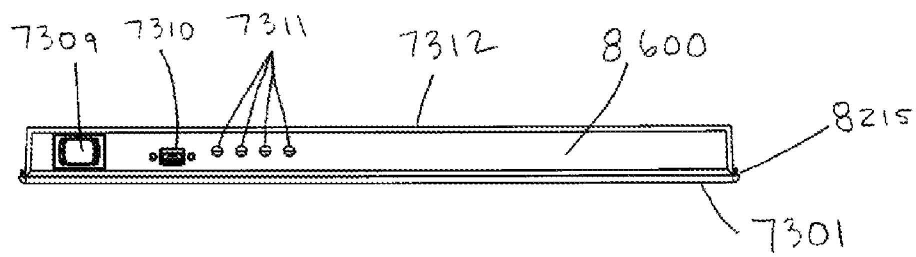
Figure 87E:
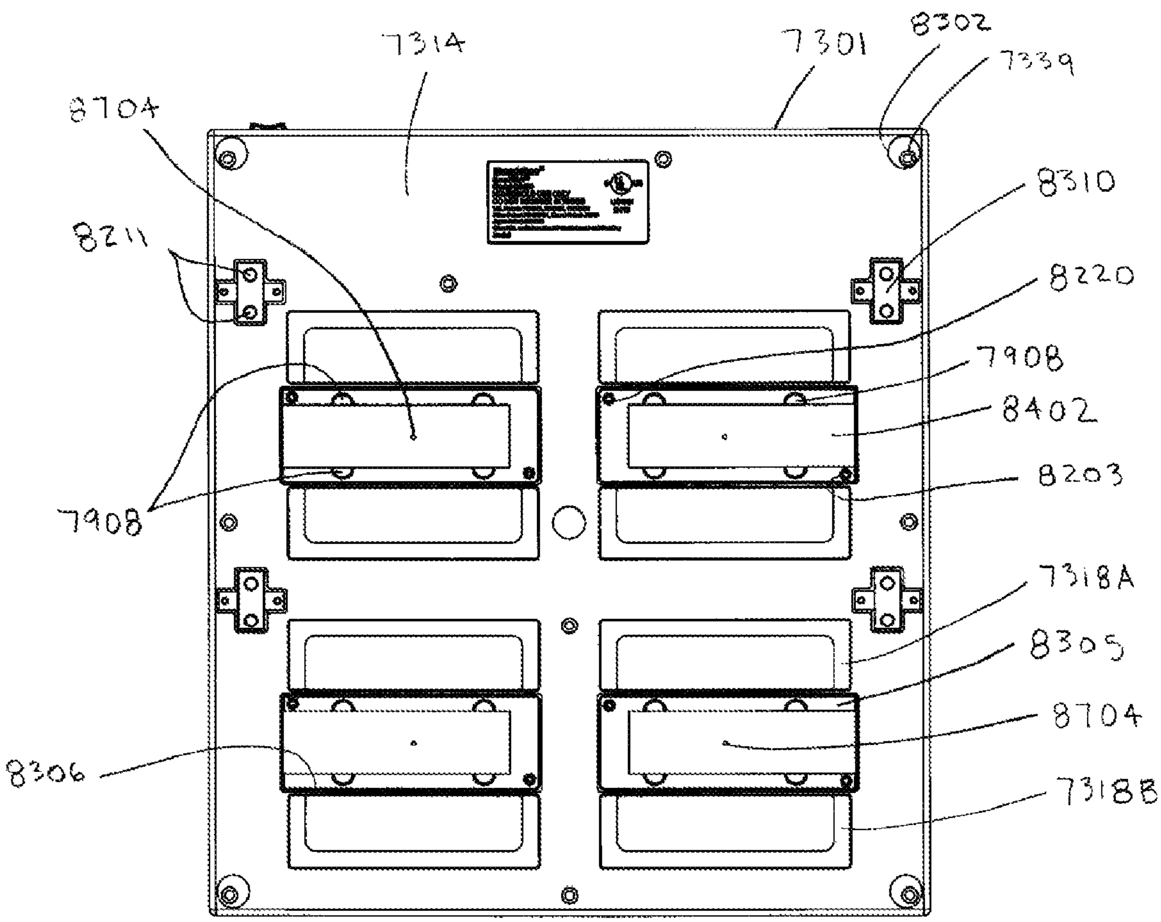

FIG. 87A is a perspective view of the base 7301 with a few of the components that are typically inside of the mechanical housing structure 7336 of the useful embodiment of the active foodware system 7337 of FIG. 73A. FIG. 87B is a plan view, FIG. 87C is a front view, FIG. 87D is a right-side view, FIG. 87E is a bottom view, and FIG. 87F is a rear view of the base 7301 with the components provided by FIG. 87A.

A few of the typical components provided in FIG. 87A include four openings 7915, and around each opening typically is: (1) a beam load cell 8400 attached by its fixed end to a load-cell support 8207, and attached by its non-fixed end to a cantilever beam 8402 having a hole 8704 for fastening a snap receptacle 8409, where the cantilever beam 8402 passes through a cantilever opening 8202; (2) a square-shaped LED strip 8410 with each LED strip side having six LEDs 8405, where the LED strip 8410 is positioned by illumination supports 8219; and (3) four lenses 7903 positioned to the inside of the square-shaped LED strip 8410 so that light from the LEDs 8405 pass through the lenses 7903 and toward a portion of a dish holder 7332 associated with the opening 7915. A lens post 7913 and a lens-post extension 8113 typically in each of the four corners of an opening 7915 of the top 7300 typically fill the gap that is visible in FIG. 87A between the right and left ends of each lens 7903.

Provided in FIG. 87A is a printed circuit board (PCB) 8700, an antenna 8701, a battery 8702, and a battery turn button 8703. The PCB 8700 typically has electrical connections (not shown for clarity) to various components, where the electrical connections may be electrical wires, electrical PCB traces, wireless electrical connections which may transmit and/or receive electromagnetic, optical, acoustic wireless signals, and the like. The PCB 8700 typically has a programmable processor, data communication circuitry, signal amplification circuitry, electrical output circuitry, connectors, and the like. The PCB 8700 may include one or more of the electrical components provided in FIGS. 2A, 2B, 3A, and 3B. The PCB 8700 is typically fastened to the base 7301 with screws passing through holes in the PCB 8700 and secured into the PCB bosses 8216.

Typically, electrical wires are used to connect the PCB 8700 with load cells 8400, LED strips 8410, the switch 7309, the battery 8702, and illumination elements 7311. The antenna is typically connected to the PCB 8700 by a connector. The data/power connector 7310, programmable processor, load cell amplifiers, LED strip drivers, battery charging circuitry, power selection circuitry, digital data storage, and the like are typically soldered to the PCB 8700 and connected as desired using electrical traces, such as copper traces, on the PCB 8700.

A convenient programmable processor may be an nRF51 or nRF52 family processor, and the like, including an nRF52832 or nRF52840 processor. Although, any other convenient programmable processor may be used. A convenient load-cell amplifier may be an HX711, which includes an analog-to-digital converter (A/D).

The PCB 8700 may include a speaker and/or speaker driver for a speaker for providing sound, which may be music, speech and the like, where the sound may be synchronized with light or visual images which may be static or moving video, where the synchronization may be provided by a programmable processor. A speaker may be positioned inside the mechanical housing structure 7336, positioned in or on the rear panel 7312, or positioned outside the mechanical housing structure 7336.

The PCB 8700 typically has electrical connections (not shown for clarity) to various components, including but not limited to four load cells 8400, four square-shaped LED strips 8410, the battery 8702, the antenna 8701, the data/power connector 7310, the switch 7309, and illumination elements 7311. Typically the data/power connector 7310 is soldered directly to the PCB 8700.

The antenna 8701 typically receives electrical power wirelessly; although, it may transmit electrical power wirelessly. The antenna 8701 may be a Qi antenna for receiving electrical power from a Qi charger; although, it may be an antenna for a different format of electrical charging. The antenna 8701 may send or receive data signals.

When the antenna 8701 receives electrical power wirelessly, a compatible wireless electrical power charger is used. Typically, the compatible wireless electrical power charger is positioned under the mechanical housing structure 7336, typically under a portion of the base 7301 directly below where the antenna 8701 is positioned. In general, a compatible wireless electrical power charger is typically positioned next to the outer surface of the mechanical housing structure 7336, and near to where the antenna 8701 is positioned next to the inner surface of the mechanical housing structure 7336.

A useful electrical power charging arrangement includes a charging positioning structure, which positions the mechanical housing structure 7336 of FIG. 73A, the housing structure 101 of FIG. 1A, the plate of FIG. 61A, and related figures, and the like, to rest against a preferred position of the electrical power charger for charging. Such a stand may position the structure to be charged horizontally, vertically, or at an angle. The stand may include positions for receiving one or a plurality of structures to be charged simultaneously. The stand may resemble a kitchen dish rack, where the structures to be charged are placed after rinsing, so the structures to be charged may dry efficiently while they charge wirelessly, and all at the same time.

The battery 8702 may be held in place by a battery turn button or other convenient means. A battery turn button may be screwed into the fastener hole 8227 of the battery-clip boss 8217 of the base 7301. The battery 8702 may also be held in place with Velcro®.

Figure 88A:
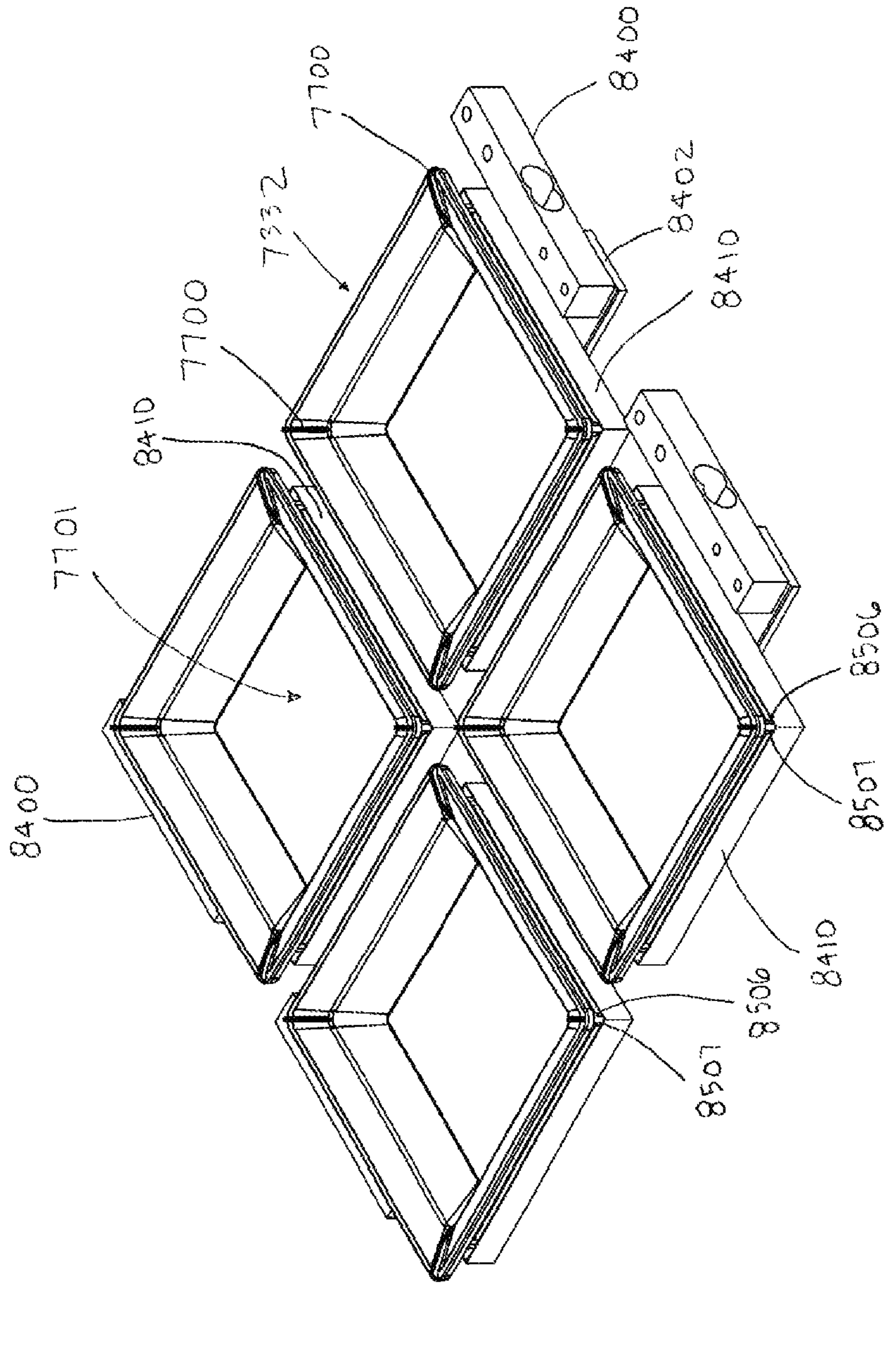
FIG. 88A-88D are a perspective, zoomed perspective, bottom view, and rear view, respectively, of the four dish holders, as well as some components that are typically contained inside the mechanical housing structure of the useful embodiment of the active foodware system of FIG. 73A.
Figure 88B:
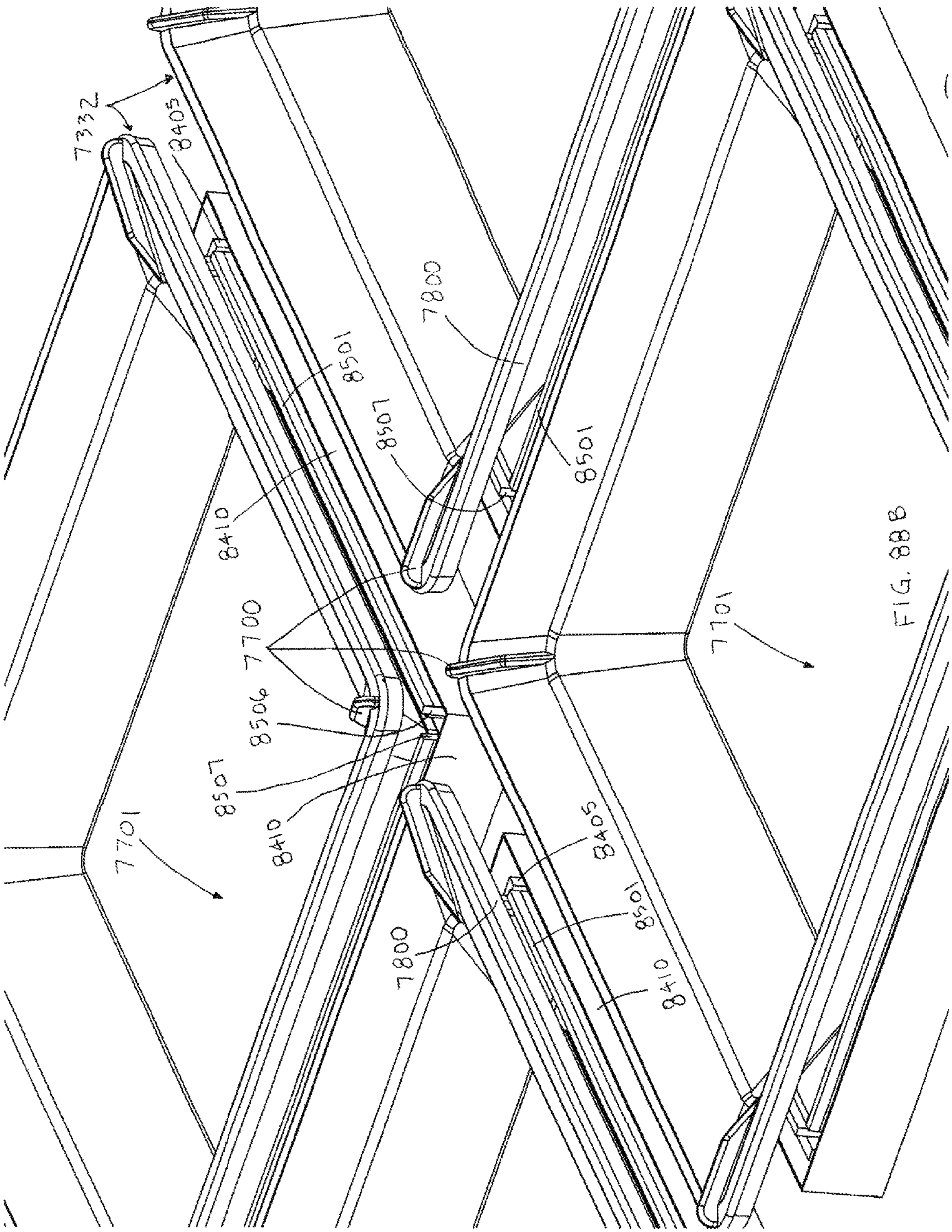
Figure 88D:
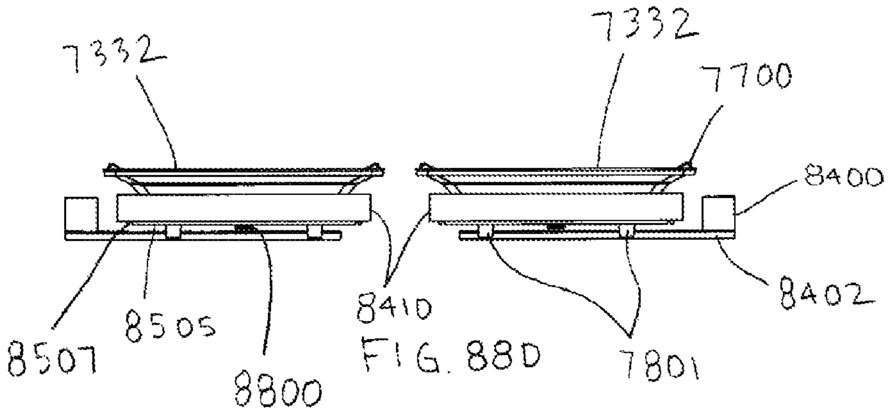
Figure 88C:
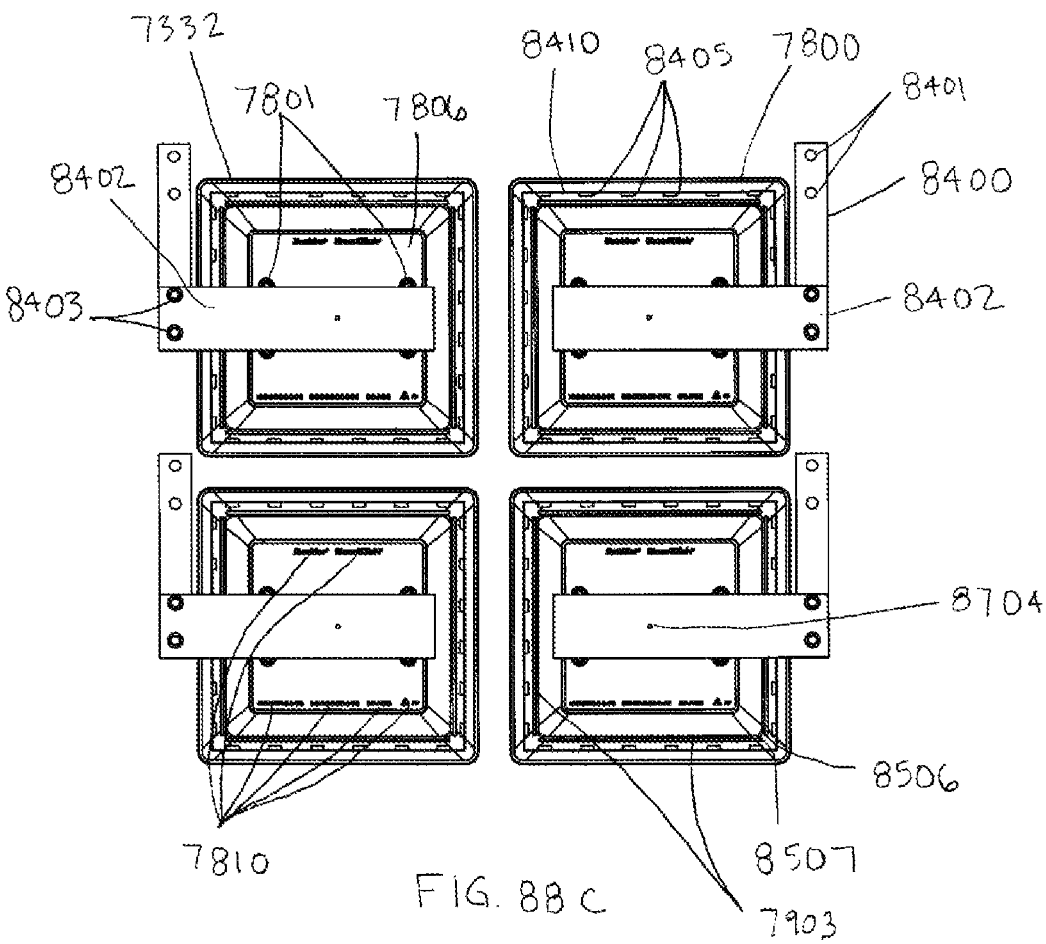

FIG. 88A is a perspective view of the four dish holders 7332, as well as some components that are typically contained inside the mechanical housing structure 7336 of the useful embodiment of the active foodware system 7337 of FIG. 73A, between the top 7300 and base 7301. The top 7300, the base 7301, and the dining dishes 7302 of FIG. 73A are removed to reveal the components. FIG. 88B is a zoomed perspective view, FIG. 88C is a bottom view, and FIG. 88D is a rear view of the dish holders 7332 and components provided in FIG. 88A. In particular, FIGS. 88A-88D provide how a dish holder 7332 is positioned relative to a cantilever beam 8402, a squared-shaped LED strip 8410 with LEDs 8405, four lenses 7903 with ends 8506 and 8507, and a load cell 8400.

As provided by FIGS. 88A-88D, one can see how light radiation from an LED 8405 of an LED strip 8410 may pass through a translucent lens 7903, and then through a translucent portion of a dish holder 7332, and on to illuminate a portion of a dining dish 7302 (not shown in FIGS. 88A-88D).

FIG. 88D provides a snap plug 8800 typically affixed to the bottom of a dish holder 7332. For clarity, the mating snap receptacle 8409 is not shown fastened to the top surface of the cantilever beam 8402; although, an optional hole 8704 for fastening a snap receptacle 8409 is provided.

Figure 89A:
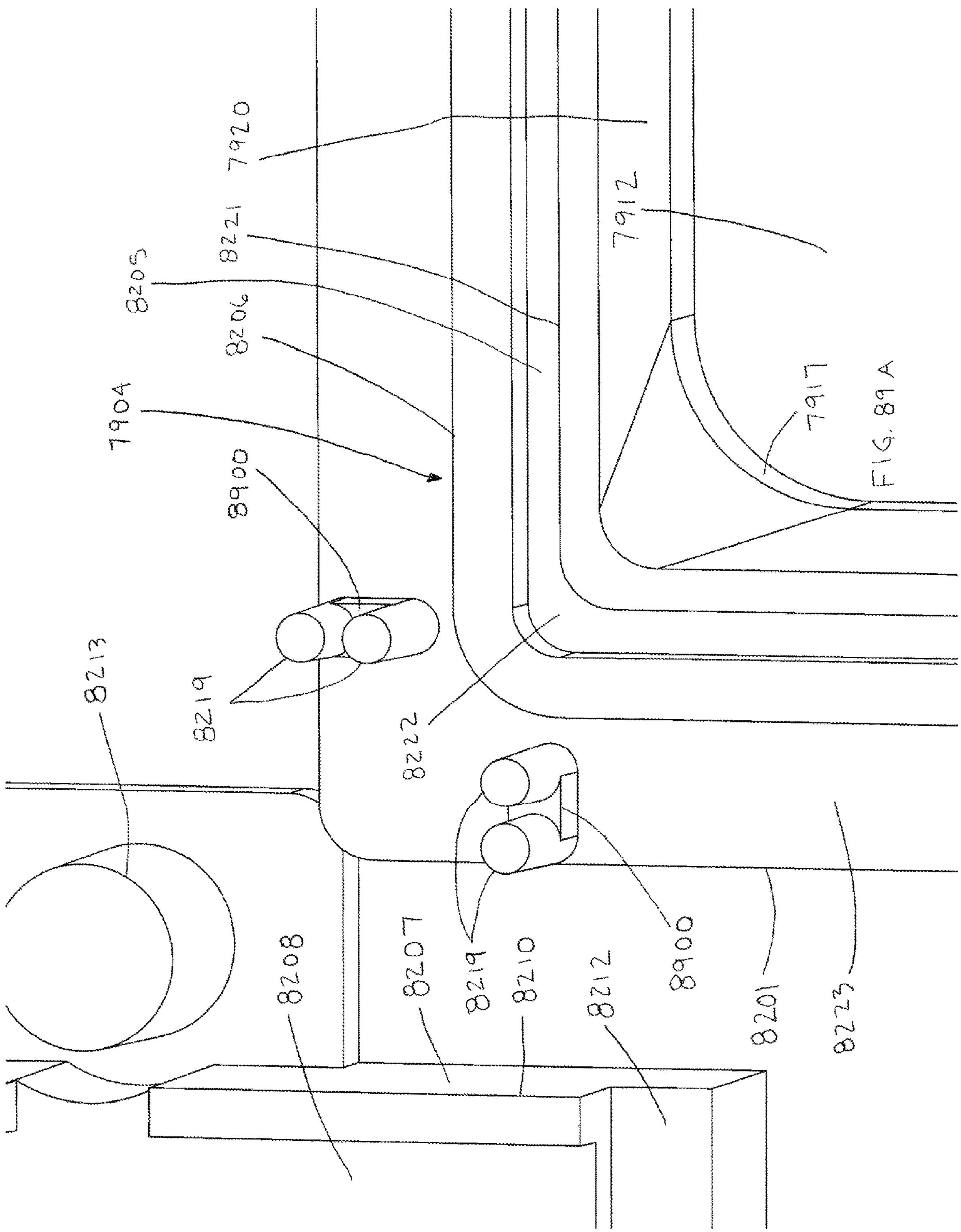
FIGS. 89A-89B are a zoomed perspective views of the upper left corner of FIG. 82A, which is a perspective view of the base of the mechanical housing structure of the useful embodiment of the active foodware system of FIG. 73A.
Figure 89B:
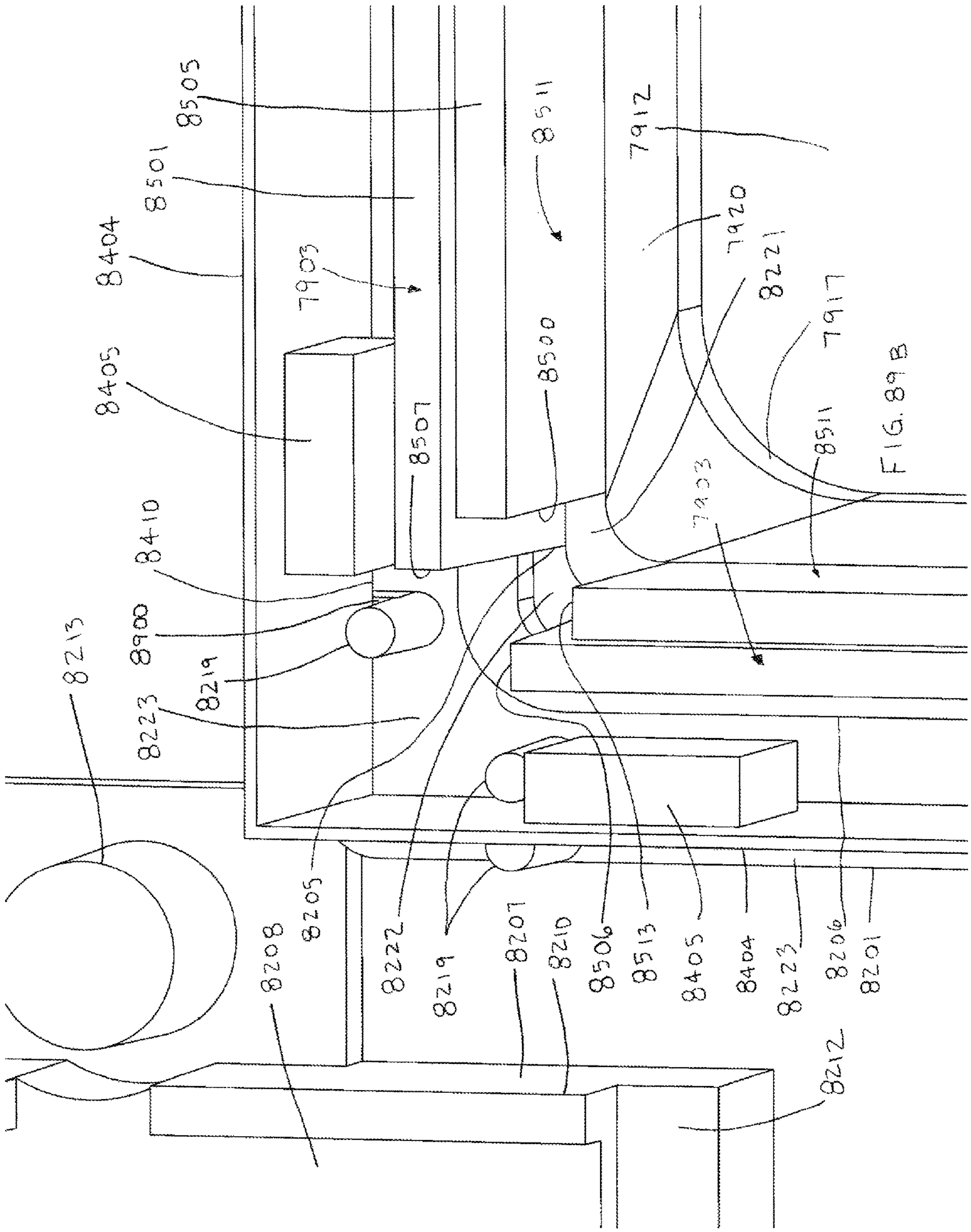

FIGS. 89A-89B are a zoomed perspective views of the upper left corner of FIG. 82A, which is a perspective view of the base 7301 of the mechanical housing structure 7336 of the useful embodiment of the active foodware system 7337 of FIG. 73A. Several element reference numbers from FIG. 82A are added to FIGS. 89A-89B to show the correspondence. FIG. 89A does not provide LED strips 8404 or lenses 7903; whereas, FIG. 89B does provide them.

The base illumination supports 8219 typically support the sides of each LED strip 8404, and position each LED strip 8404 on the side of the lenses 7903 opposite to the side of the drainage chute 7912. In this way, light radiation from each LED 8405 of the LED strips 8404 is directed to pass through the lenses 7903 in the direction of the drainage chute 7912 and toward a portion of a dish holder 7332 (not shown here). Each LED strip 8404 may be supported from beneath the LED strip lower surface 8410 by the top surface 8223 of each of the base lens supports 8201. There may be additional lower bridging structure 8900 connecting the lower portion of each post of a pair of posts of the base illumination supports 8219. The lower bridging structure 8900 may support an LED strip 8404 from beneath the LED strip lower surface 8410, and elevate the LED strip to a desired height, so the LEDs 8405 of the LED strip 8404 are positioned at a desired height relative to an associated lens 7903.

Figure 90A:
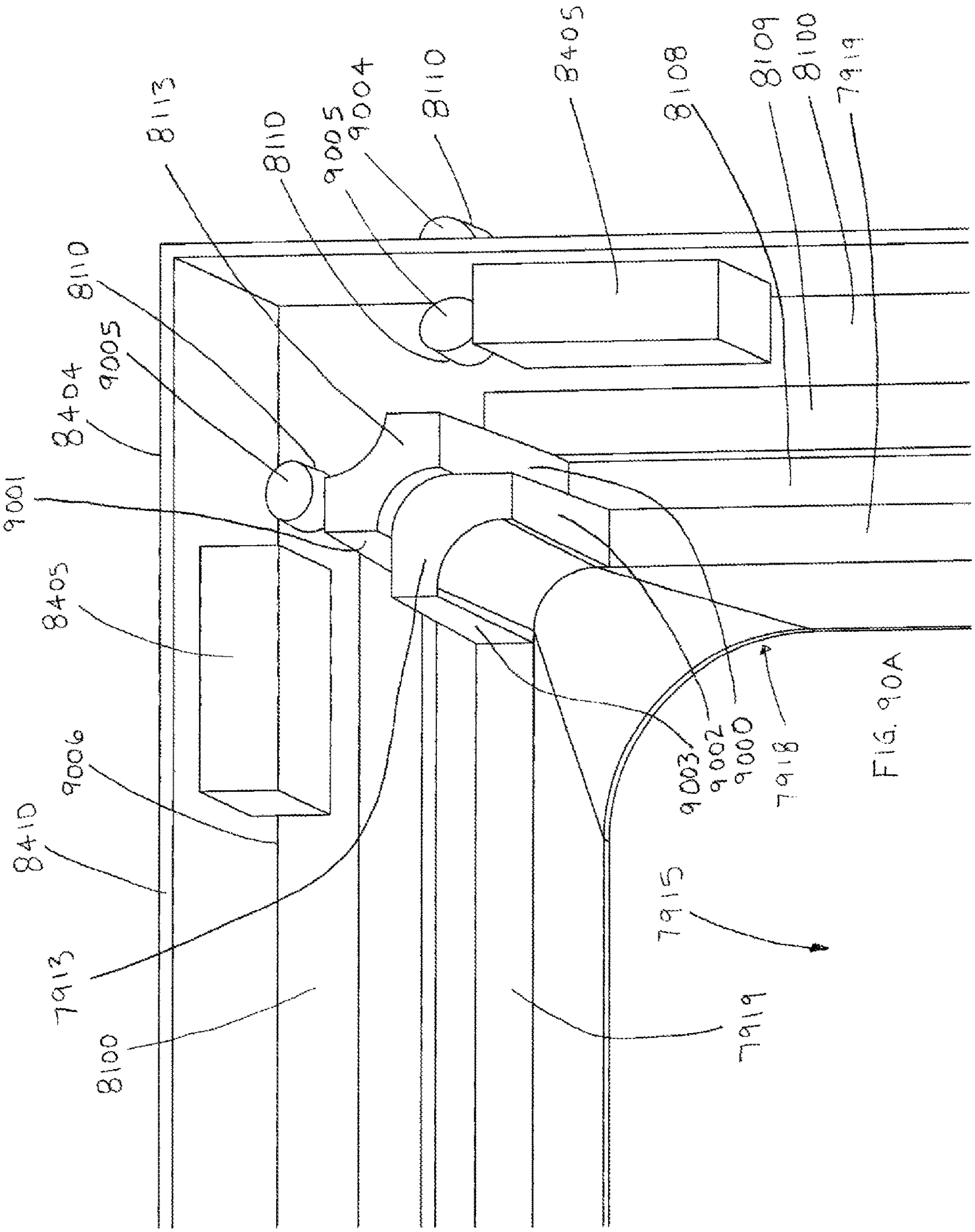
FIGS. 90A-90B are a zoomed perspective views of the upper right corner of FIG. 81B, which is a bottom view of the top of the mechanical housing structure of the useful embodiment of the active foodware system of FIG. 73A.
Figure 90B:
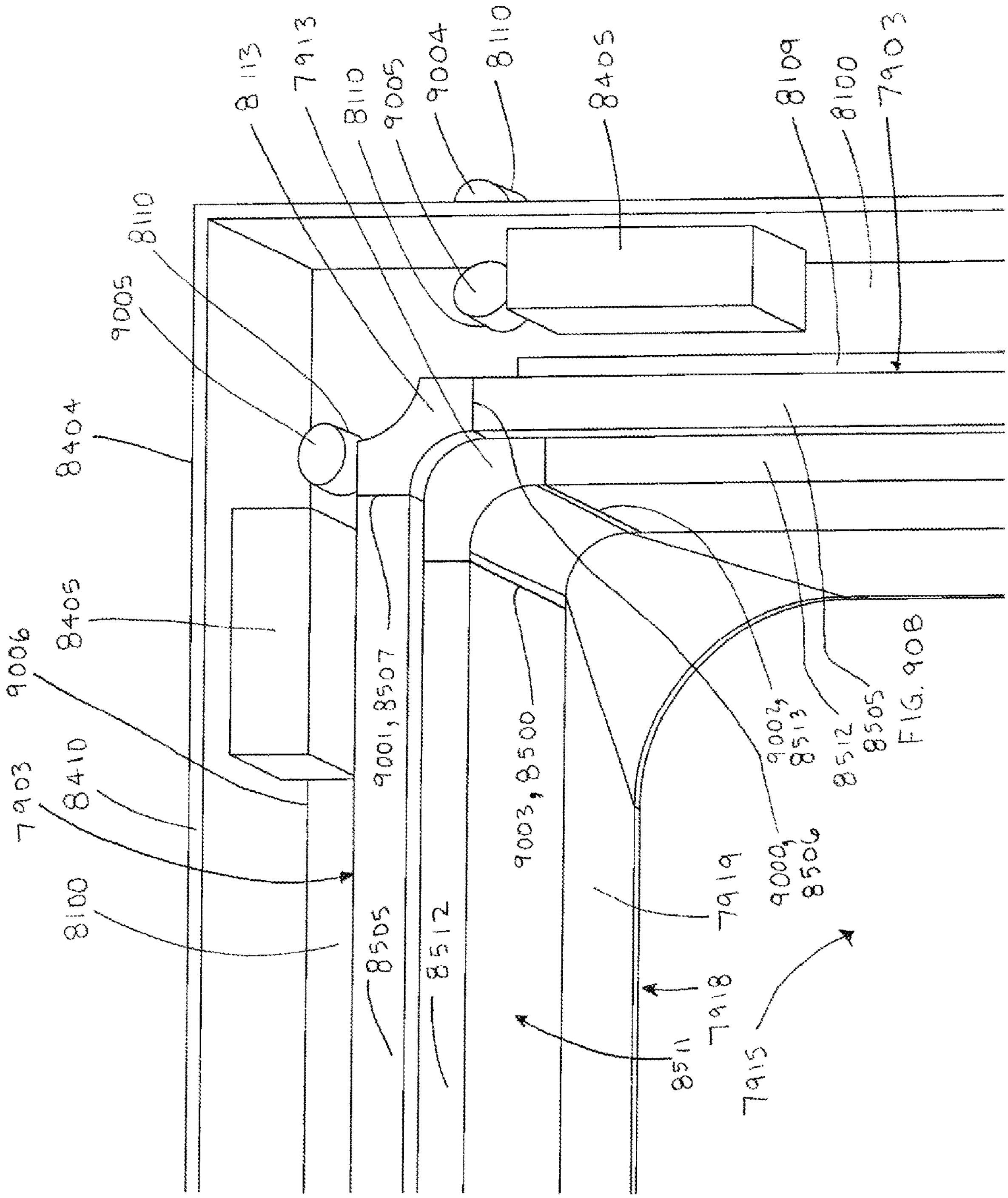

FIGS. 90A-90B are a zoomed perspective views of the upper right corner of FIG. 81B, which is a bottom view of the top 7300 of the mechanical housing structure 7336 of the useful embodiment of the active foodware system 7337 of FIG. 73A. Several element reference numbers from FIG. 81B are added to FIGS. 90A-90B to show the correspondence. FIG. 90A does not provide LED strips 8404 or lenses 7903; whereas, FIG. 90B does provide them.

Typically, the lens top surface 8501 is inserted into the lens slot 8108 of the lens-receiving structure 7918 of the top 7300. Typically, the lens bottom surface 8505 is inserted into a lens slot 8205 of the lens-receiving structure 7904 of the base 7301 (not shown in FIGS. 90A-90B). Each lens right surface 8506 typically mates with a portion of a side surface 9000 of a lens-post extension 8113, and each lens left surface 8507 typically mates with a portion of a side surface 9001 of a lens-post extension 8113. Each plateau right surface 8513 typically mates with a portion of a side surface 9002 of a lens post 7913 that is joined to the lens-post extension 8113, and each plateau left surface 8500 typically mates with a portion of a side surface 9003 of a lens post 7913 that is joined to the lens-post extension 8113. A joined lens post 7913 and lens-post extension 8113 is typically positioned in each of the four corners of each of the four openings 7915 of the top 7300, and is for supporting the ends 8513, 8500 of each of the 16 total lenses 7903, and is for creating a watertight seal so liquid doesn't reach LEDs 8405, LED strips 8404, and other electrical components positioned on the side of the lenses 7903 opposite to the openings 7915.

The top illumination supports 8110 typically support the sides of each LED strip 8404, and position each LED strip 8404 on the side of the lenses 7903 opposite to the side of the opening 7915. In this way, light radiation from each LED 8405 of the LED strips 8404 is directed to pass through the lenses 7903 in the direction of the opening 7915 and toward a portion of a dish holder 7332 (not shown here). Each LED strip 8404 may be supported from above by the lower surface 8100 of the top 7300. Although not provided here, there may be additional lower bridging structure connecting a portion of each post of a pair of posts of the top illumination supports 8110 so the LEDs 8405 of the LED strip 8404 are positioned at a desired height relative to an associated lens 7903.

The LED strip 8404 may be positioned between the base illumination supports 8219 before the top 7300 is positioned on the base 7301 and secured. The surfaces 9004, 9005 of pair of posts of a top illumination support 8110 may be sloped toward each other. When positioning the top 7300 onto the base 7301, sloped surfaces 9004, 9005 of the top illumination supports 8110 may help to catch and guide the top surface 9006 of an LED strip 8404 to slide between the pair of posts of a top illumination support 8110.

Figure 91A:
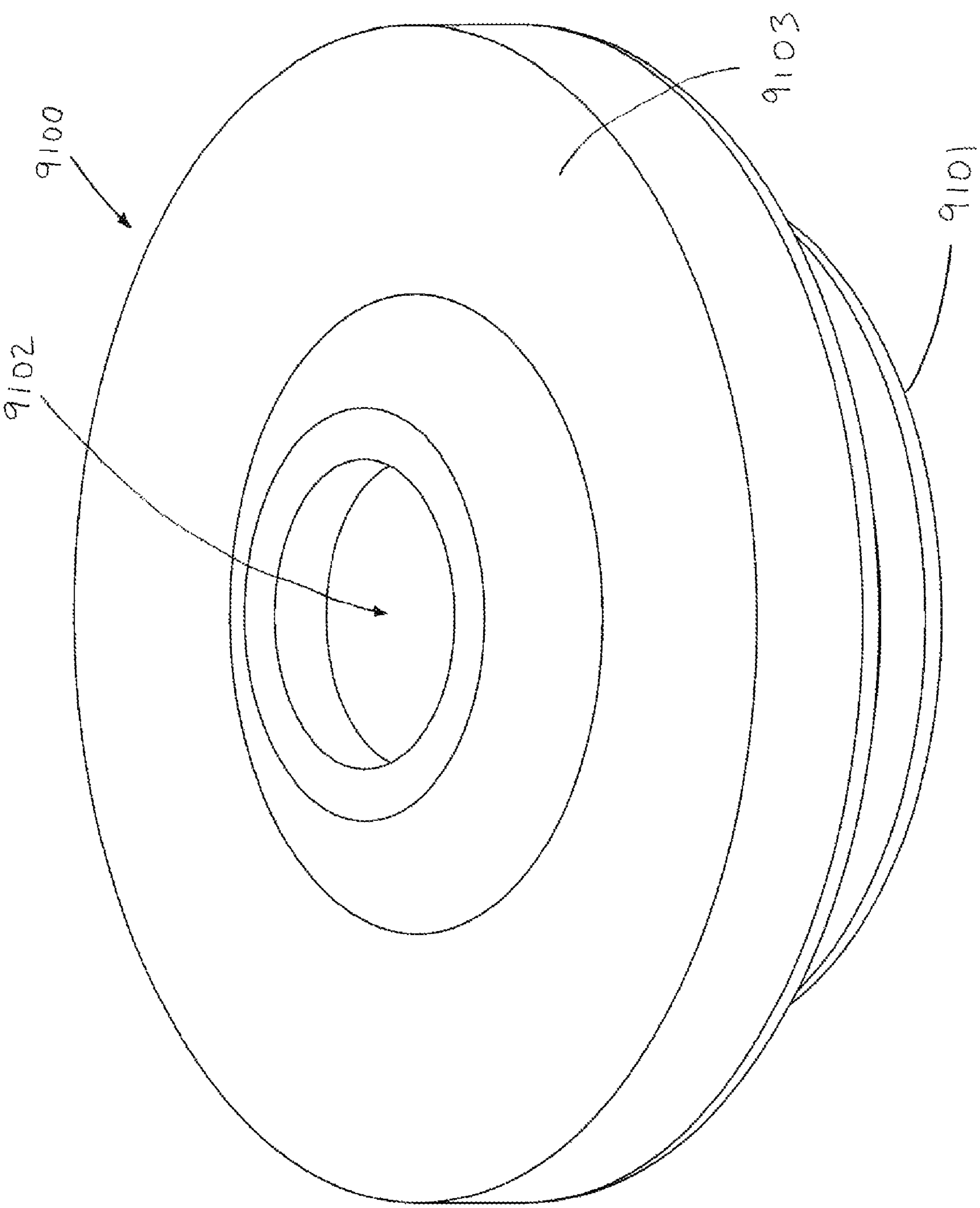
FIGS. 91A-91C are a zoomed perspective, a bottom, and a side view, respectively, of a snap plug used in the useful embodiment of the active foodware system of FIG. 73A.
Figure 91C:
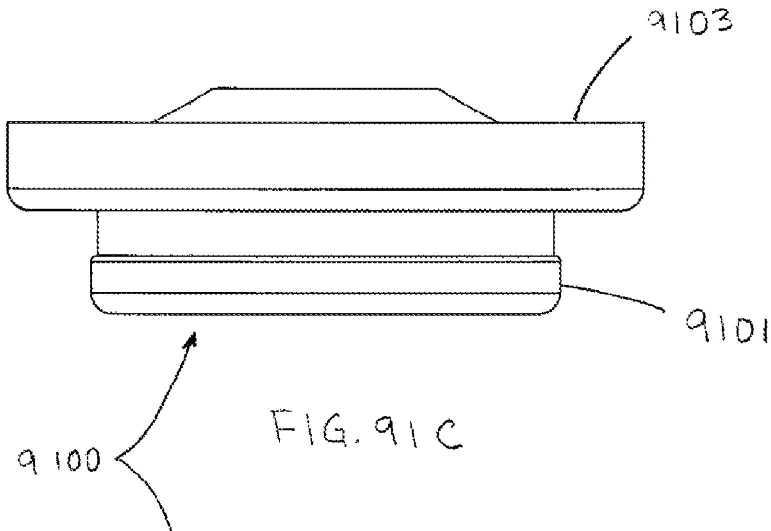
Figure 91B:
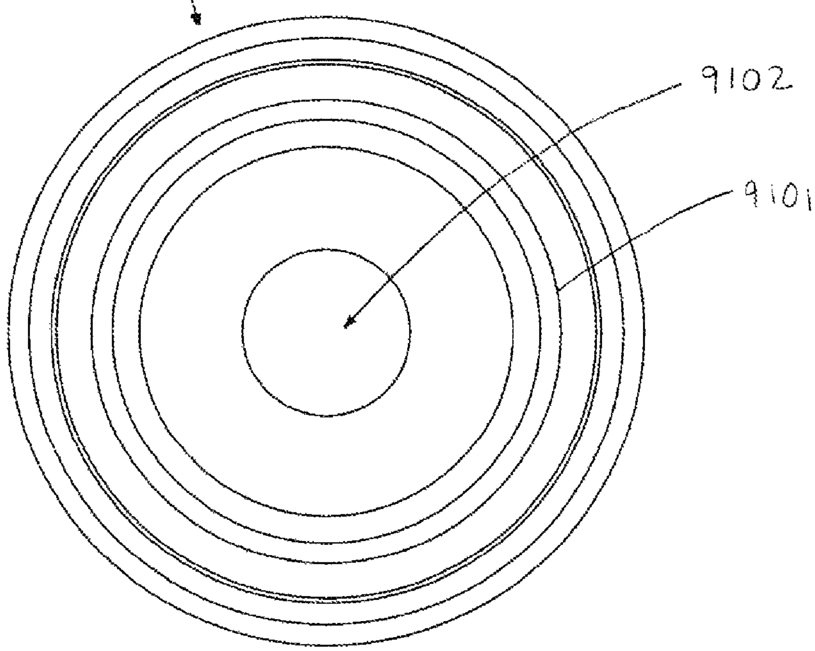

FIG. 91A is a zoomed perspective view of a snap plug 9100 used in the useful embodiment of the active foodware system 7337 of FIG. 73A. FIG. 91B is a bottom view, and FIG. 91C is a side view of the snap plug 9100 of FIG. 91A.

The snap plug 9100 typically includes a snap-plug protuberance 9101, a snap-plug hole 9102, and a snap-plug mating surface 9103. The snap plug 9100 may be fastened to the bottom surface of a dish holder 7332, to the snap mounting structure 7803 of a dish holder 7332, or to a cantilever-beam upper surface 8411 of a cantilever beam 8402. The snap plug 9100 may be fastened by passing a screw through the snap-plug hole 9102. The snap-plug mating surface 9103 of the snap plug 9100 is typically in contact with a portion of the component to which the snap plug 9100 is fastened. For example, when the snap plug 9100 is fastened to the snap mounting structure 7803 of a dish holder 7332, the snap-plug mating surface 9103 is in contact with a portion of the snap mounting structure 7803. In such example, a screw is typically inserted from side of the snap-plug protuberance 9101 of the snap plug 9100, and screwed into the hole 7809 of the snap mounting structure 7803. Alternatively, the snap-plug protuberance 9101 of the snap mounting structure 7803 may be manufactured directly into the bottom of a dish holder 7332 or the top of a cantilever beam 8402.

A mating snap receptacle (not provided) typically has similar structure to the snap plug 9100, and includes a snap-receptacle hole, and a snap-receptacle mating surface, but where the snap-plug protuberance 9101 is replaced on the snap receptacle by a snap-receptacle protuberance that fits around, and mates with, the snap-plug protuberance 9101 of the snap plug 9100. Mating and unmating of the snap-plug protuberance 9101 with the snap-receptacle protuberance typically requires a minor force. Mating of the snap-plug protuberance 9101 with the snap-receptacle protuberance typically includes friction between the two protuberances, an overlap, or an undercut where at least one of the snap-plug protuberance 9101 and the snap-receptacle protuberance clips to the other, requiring flexion in order to mate or unmate. Sometimes the mating or unmating produces an audible snap or click sound, especially when at least one of the snap-plug protuberance 9101 and the snap-receptacle protuberance has an undercut relative to the other and clips to the other.

Typically the snap-plug protuberance 9101 is fastened to the snap mounting structure 7803 of a dish holder 7332, and the snap-receptacle protuberance is fastened to a cantilever-beam upper surface 8411 of a cantilever beam 8402; although, the snap-plug protuberance 9101 and snap-receptacle protuberance may be reversed.

Figure 92B:
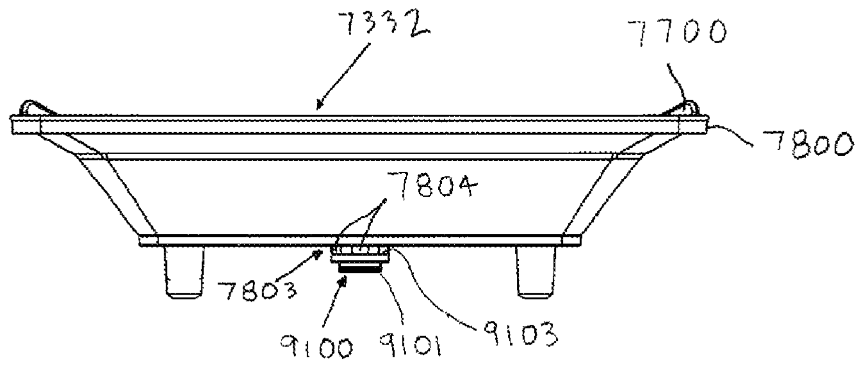
FIGS. 92A-92B are a bottom and side view, respectively, of FIG. 78E, where a snap plug is fastened to snap mounting structure of the dish holder of FIG. 78E.
Figure 92A:
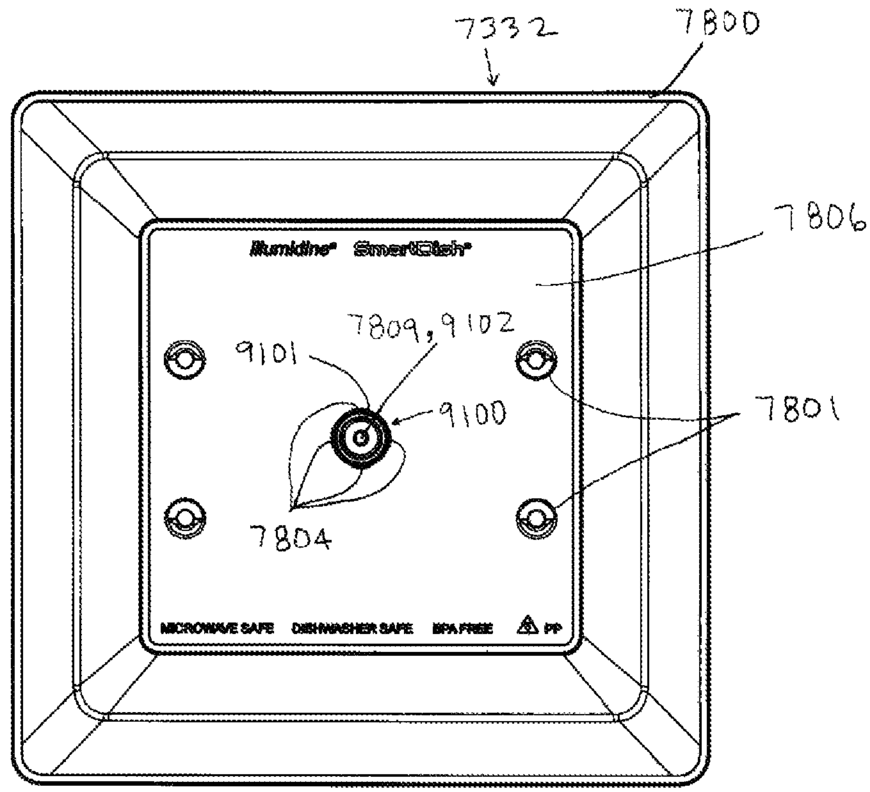

FIG. 92A is the bottom view of FIG. 78E, where a snap plug 9100 is fastened to snap mounting structure 7803 of the dish holder 7332 of FIG. 78E. FIG. 92B is a side view of FIG. 92A. For clarity, the holes 7809, 9102 are shown without a fastener such as a screw or rivet inserted.

Figure 93:
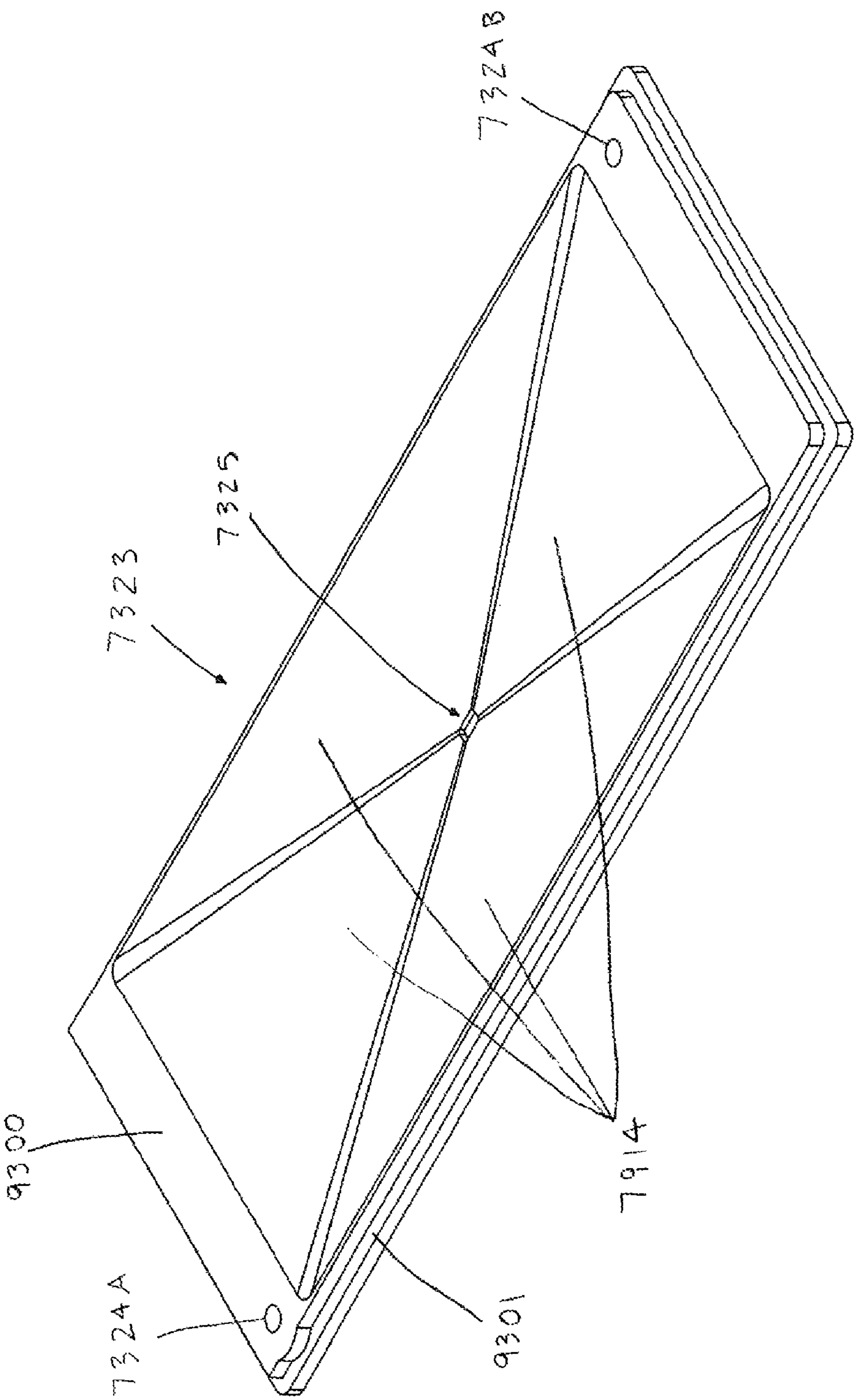
FIG. 93 is a perspective view of the upper surface of a cantilever housing pocket cover.

FIG. 93 is a perspective view of the upper surface 7914 of a cantilever housing pocket cover 7323. The upper surface 7914 of the cantilever housing pocket cover 7323 provides an upward-facing surface of the bottom wall of the cantilever housing pocket 8304 of the cantilever housing 7916, which houses a cantilever beam 8402 extending to the side of a beam load cell 8400.

Each cantilever housing pocket cover 7323 typically is fastened to the bottom surface 7314 of the base 7301. Typically, a screw is used as a fastener, and the cantilever housing pocket cover 7323 may have a first screw hole 7324A and a second screw hole 7324B. Typically the first screw hole 7324A and second screw hole 7324B are either, chamfered, countersunk or counterbored, so the head of the fastening screw does not extend past the bottom surface 7314 of the base 7301.

Each cantilever housing pocket cover 7323 may have a drainage hole 7325. The drainage hole 7325 allows liquid to escape and/or moist air to evaporate from the cantilever housing pocket 8304 that the cantilever housing pocket cover 7323 otherwise seals. The upper surface 7914 may slope toward the drainage hole 7325 to help liquid drain out that gets under the dish holder 7332 and on top 7906 of the cantilever housing 7916 and over the water barrier 7910 of a leg hole 7908 or the water barrier 7911 of a snap hole 7909. The upper surface 7914 may include one or more planar surfaces or curved surfaces sloped toward the drainage hole 7325.

Each cantilever housing pocket cover 7323 may have a cantilever housing pocket plateau 9300 through which the first screw hole 7324A and a second screw hole 7324B pass. The cantilever housing pocket plateau 9300 typically adds thickness to the bottom side of the cantilever housing pocket cover 7323 (visible in FIG. 73E) so the first screw hole 7324A and second screw hole 7324B may be either, chamfered, countersunk or counterbored, so the head of the fastening screw does not extend past the bottom surface 7314 of the base 7301. The upper surface 7914 may start from the cantilever housing pocket plateau 9300 and slope toward the drainage hole 7325.

Typically surrounding at least a portion of each cantilever housing pocket 8304, and where the cantilever housing pocket 8304 meets the bottom surface 7314 of the base 7301, is a recessed cantilever housing pocket ledge 8306. The cantilever housing pocket ledge 8306 is typically for mating with a cantilever housing pocket cover ledge 9301 of a cantilever housing pocket cover 7323 that covers the cantilever housing pocket 8304, thus creating a watertight connection.

Figure 94:
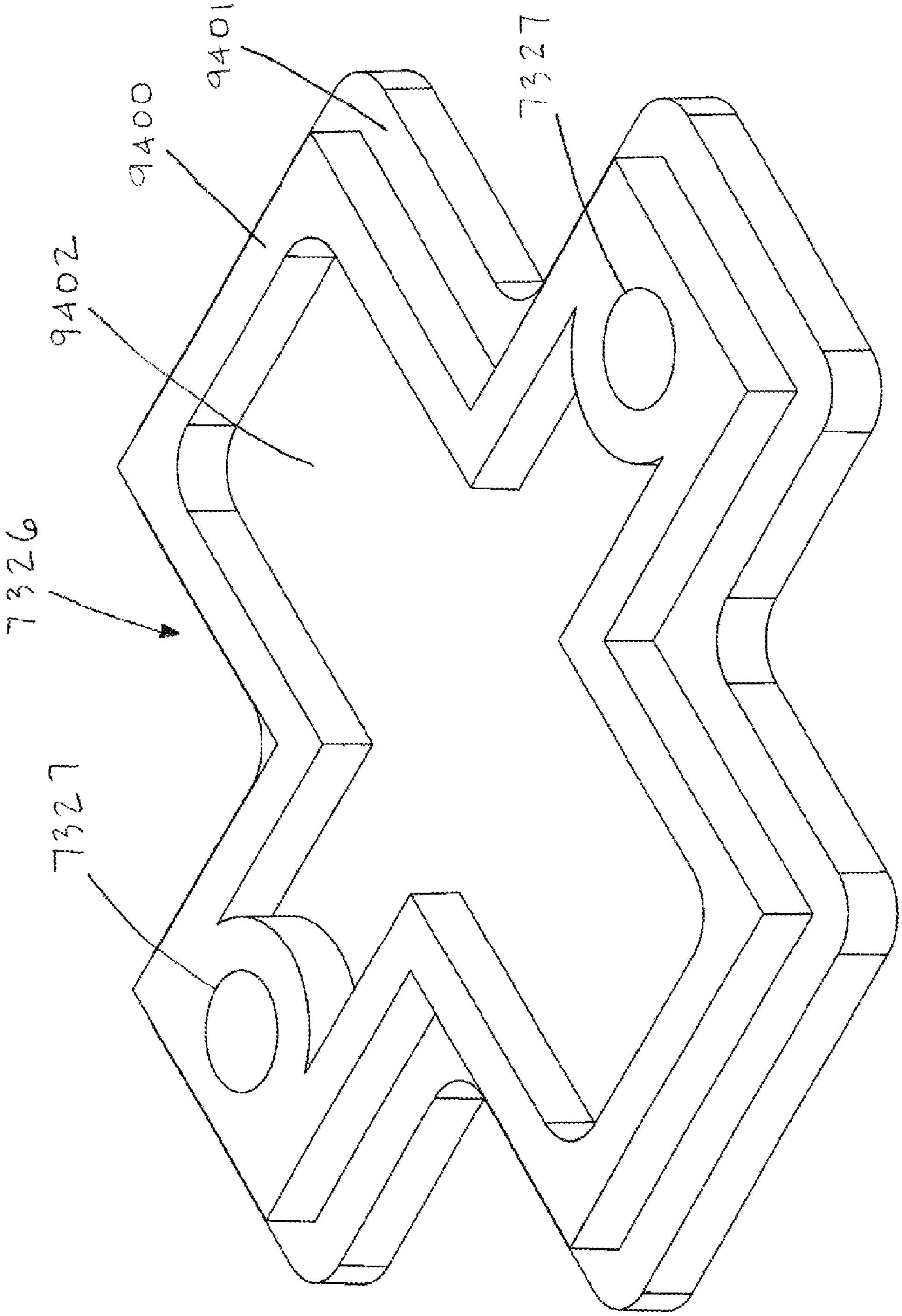
FIG. 94 is a perspective view of the upward facing surface of a load-cell support pocket cover.

FIG. 94 is a perspective view of the upward facing surface 7914 of a load-cell support pocket cover 7326. Each load-cell support pocket 8307 typically is covered by a load-cell support pocket cover 7326. Each load-cell support pocket cover 7326 typically is fastened to the bottom surface 7314 of the base 7301 by one or more fasteners. A screw may be used as the fastener for a screw hole 7327 of the load-cell support pocket cover 7326.

Each load-cell support pocket cover 7326 may have a load-cell support pocket plateau 9400 through which a screw hole 7327 passes. The load-cell support pocket plateau 9400 typically adds thickness to the bottom side of the load-cell support pocket cover 7326 (visible in FIG. 73E) so the screw hole 7327 may be either chamfered, countersunk or counterbored, so the head of each screw does not extend past the bottom surface 7314 of the base 7301. The center portion 9402 of the load-cell support pocket plateau 9400 may be removed to improve moldabililty, reduce cost, reduce weight, and the like, of the load-cell support pocket plateau 9400.

Typically surrounding at least a portion of each load-cell support pocket 8307, and where the load-cell support pocket 8307 meets the bottom surface 7314 of the base 7301, is a recessed load-cell support pocket ledge 8308. The load-cell support pocket ledge 8308 is typically for mating with a load-cell support pocket cover ledge 9401 of a load-cell support pocket cover 7326 that covers the load-cell support pocket 8307, thus creating a watertight connection.

Sealants such as silicone, polyurethane, other non-toxic elastic or sealing materials, and the like, either in liquid or solid form, may be used to enhance the watertight connection between various structures to prevent liquid and/or food from entering the interior of the mechanical housing structure 7336 of the useful embodiment of the active foodware system 7337 of FIG. 73A and contacting the electrical components or making the mechanical housing structure 7336 difficult to clean and sanitize. Such a sealant may be used to enhance the watertight connection between a cantilever housing pocket ledge 8306 and a cantilever housing pocket cover ledge 9301 of a cantilever housing pocket cover 7323 that covers the cantilever housing pocket 8304. Such a sealant may be used to enhance the watertight connection between a load-cell support pocket ledge 8308 and a load-cell support pocket cover ledge 9401 of a load-cell support pocket cover 7326 that covers the load-cell support pocket 8307. Such a sealant may be used to improve the watertight seal for any other connection between various elements of the mechanical housing structure 7336 of the useful embodiment of the active foodware system 7337 of FIG. 73A that is intended to be watertight, such as between the top 7300 and base 7301, around the rib 8215 between the top 7300 and base 7301, around the lenses 7903, around the rear panel 7312, around the rear-panel components 7309, 7310, 7311, 7340, around fasteners, for the load-cell support pocket cover 7326, and the like.

Typically some of the parts of the mechanical housing structure 7336 of the useful embodiment of the active foodware system 7337 of FIG. 73A are manufactured with opaque plastic and some of the parts are made with translucent plastic. Parts typically made from food-safe opaque plastic include the top 7300, the base 7301, the rear panel 7312, the cantilever housing pocket cover 7323, the load-cell support pocket cover 7326, and the dish carrier 7500. Parts typically made from food-safe translucent or transparent plastic include the dining dish 7302, dish holder 7332, and lenses 7903.

Typical food-safe opaque plastics include acrylonitrile butadiene styrene (ABS), styrene acrylonitrile (SAN), low-density polyethylene (LDPE), and high-density polyethylene (HDPE). Typical food-safe translucent and transparent plastics include polypropylene (PP), polystyrene (PS), and polyethylene terephthalate (PET, PETE). Plastics which are typically not considered food safe include bisphenol A (BPA), polycarbonate, polyvinylchloride (PVC).

Typically, ABS is preferred for the top 7300, the base 7301, the rear panel 7312, the cantilever housing pocket cover 7323, the load-cell support pocket cover 7326, and the dish carrier 7500, since ABS typically has desirable mechanical properties during and after molding. Typically PP is preferred for the dining dish 7302 and dish holder 7332 since PP may be dishwasher and microwave safe. Typically PS is preferred for the lenses 7903 due to its optical properties.

The mechanical housing structure 7336 of the useful embodiment of the active foodware system 7337 of FIG. 73A typically includes a data communication component that communicates information with a computer, including a laptop or deskside computer, mobile phone, tablet computer, cloud computer, web server computer, and the like. The data communication component may include a wireless communication component for communicating information wirelessly, and/or the data communication component may include a wired communication component for communicating information with a wire. Data communication may include sending and receiving information. Wireless communication may be via Bluetooth.

The active foodware system 100 of FIG. 1A provides a housing structure 101 with some similarities to the mechanical housing structure 7336 of the useful embodiment of the active foodware system 7337 of FIG. 73A. Accordingly, much of the description of FIG. 1A and related figures typically apply to FIG. 73A and related figures (including FIG. 73B-94), and vice versa.

In particular, FIG. 1A provides a mobile communication device 107 and arrangement that applies to FIG. 73A and related figures, where the active foodware system 100 may include, or be configured to communicate with, a mobile communication device 107 for communicating a data signal with a data processor, where the housing structure 101 includes the data processor. The mobile communication device 107 typically has a graphical display 108, a microprocessor, at least one camera 109, a microphone 133, and a speaker 134. The mobile communication device 107 may be attached by an attachment member 110 to the top portion 111 of the housing structure 101, to a bottom portion 112 (see FIG. 1B), to a free-standing structure, or not attached to any support.

Figure 95:
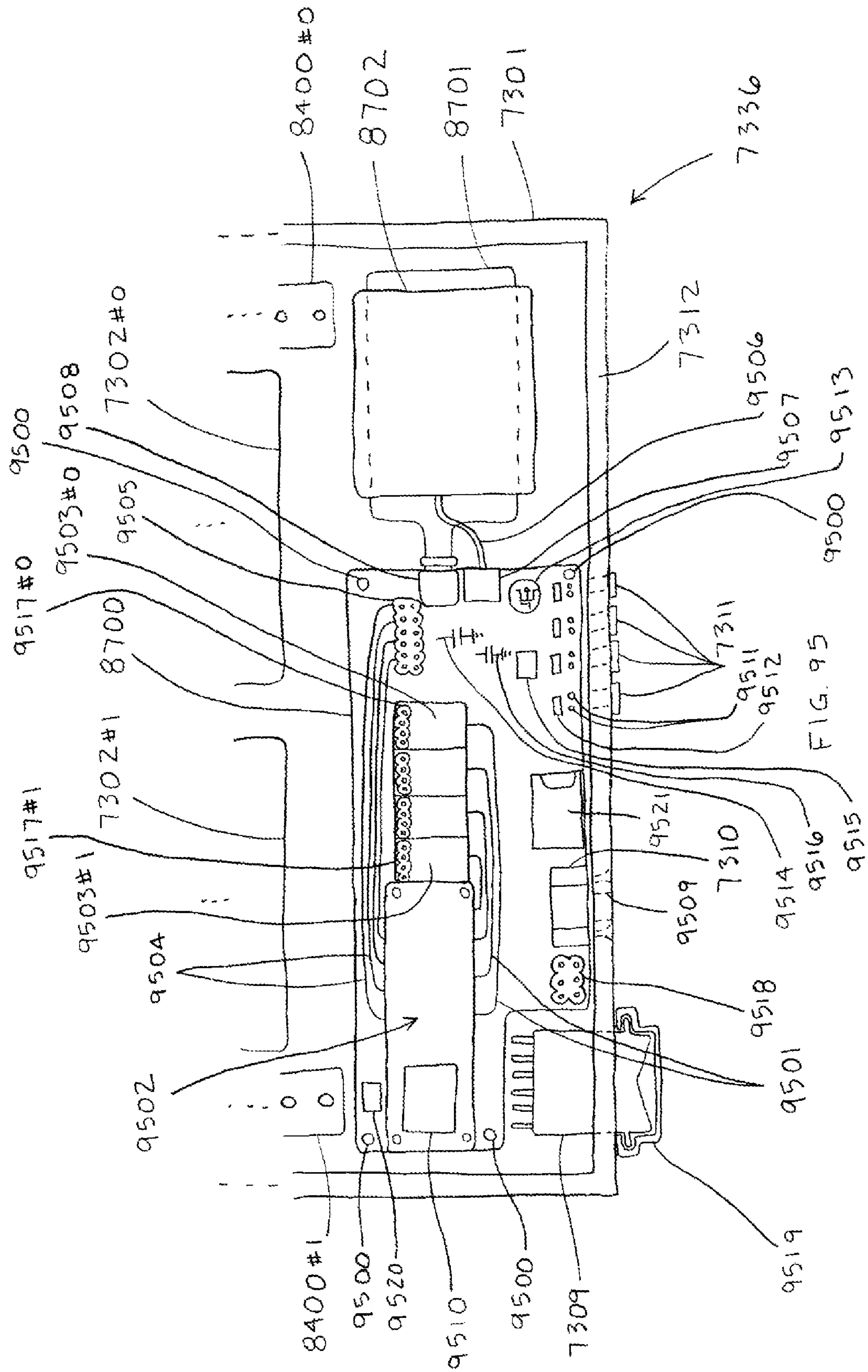
FIG. 95 is a plan view of a layout of a printed circuit board (PCB), as well as other components, and their positioning in a housing structure, such as the mechanical housing structure of FIGS. 87B, 87A, 87F, and 73A.

FIG. 95 is a plan view of a layout of a printed circuit board (PCB) 8700, as well as other components, and their positioning in a housing structure, such as the mechanical housing structure 7336 of FIGS. 87B, 87A, 87F, and 73A. Accordingly, whenever possible, the element numbers from FIGS. 87B, 87A, 87F, and 73A will be used to identify corresponding components in FIG. 95. Refer to the discussion above for additional description of such previously described elements. A portion of the dining dishes 7302 from FIG. 73A are provided in FIG. 95, with the portion of dining dish 7302 #0 on the right, and the portion of dining dish 7302 #1 on the left.

The PCB 8700 is screwed to the base 7301 of the mechanical housing structure 7336 using screws (not shown) through the PCB screw holes 9500. As provided previously above, the PCB 8700 typically has electrical connections to various components, including but not limited to electrical traces 9501 from a microprocessor section 9502 to amplifiers 9503 for four load cells 8400; and electrical traces 9504 from the microprocessor section 9502 to the LED strip header 9505 for four square-shaped LED strips 8410 (not shown in FIG. 95). The microprocessor section 9502 has a microprocessor 9510, such as an nRF52-series microprocessor. A battery 8702 may connect, typically by wires 9506, to a connector 9507 on the PCB 8700. The connector 9507 may be a 2-pin JST-PH connector. An antenna 8701, which may be a Qi antenna, may connect to a connector 9508 on the PCB 8700. The connector 9508 may be a micro USB (uUSB) connector. A data/power connector 7310 is typically soldered directly to the PCB 8700 and accessible through an opening 9509 in the rear panel 7312. A switch 7309 is also accessible from the rear panel 7312, and illumination elements 7311 are visible on rear panel 7312.

The PCB 8700 has pairs of holes 9511 for soldering illumination elements 7311, such as LEDs. Resistors 9512 for the illumination elements 7311 may be next to the pairs of holes 9511. There may be four LED illumination elements 7311, including from left to right in FIG. 95 LED illumination elements 7311 of the following colors: red, yellow, green, and blue.

The PCB 8700 includes a transistor 9513 for selecting between power from the antenna 8701 and USB power from the data/power connector 7310. The data/power connector 7310 may be an Amphenol uUSB connector. The transistor 9513 may be a MOSFET transistor. Associated with the transistor 9513 is a capacitor 9514, which may be a 10 uF capacitor. There may be a battery charger component 9515 and associated capacitor 9516, which may be a 10 uF capacitor.

There may be four amplifiers 9503, one for each of the four load cells 8400. Each amplifier 9503 may include an HX711 load-cell amplifier with 24-bit analog-to-digital converter (ADC). Output for the amplifiers 9503 is available at the headers 9517. The four load cells 8400 are numbered #0, #1, #2, and #3, where in FIG. 95 load cell 8400 #0 is on the right and load cell 8400 #1 on the left, and #2 and #3 (not shown in FIG. 95) are numbered continuing in a clockwise fashion. Based on these load cell 8400 positions, as provided in FIG. 95, a convenient position for the amplifiers 9503 for the load cells 8400 may be from left to right as amplifier 9503 #1, #2, #3, and amplifier 9503 #0. Corresponding to amplifier 9503 #0 is header 9517 #0, and corresponding to amplifier 9503 #1 is header 9517 #1.

The PCB 8700 has an LED strip header 9505 for the four LED strips 8404 (not provided in FIG. 95). The header is typically a 6-pin×2-row set of pins, where the pins may be right-angle pins. As provided in FIG. 95, the top right three pins are for LED strip 8404 #0, the top left three pins are for LED strip 8404 #1, the lower left three pins are for LED strip 8404 #2, and the lower right three pins are for LED strip 8404 #3.

The PCB 8700 has a switch header 9518 for the switch 7309. The switch header 9518 may be a 6-pin header, which may be 3-pins×2-rows, and where the pins may be right-angle pins. The switch 7309 may be a double-pole-double-throw (DPDT) switch, and may be a rocker switch, and may be for on-off control. The switch 7309 may have a silicone rubber cover 9519.

The PCB 8700 may have a Flash chip 9520, which may be a GD25Q16 16M-bit SPI Serial Flash chip. The PCB 8700 may also have an optional micro SD (uSD) card holder 9521.

FIG. 96 provides an example app display 9600 for a computer, mobile phone, tablet computer, and the like. Specific elements of the display 9600 of FIG. 96 are discussed in detail previously regarding the "first implementation of the first exemplary useful application of the active foodware system 100" relating to FIG. 1A. Rather that repeat, please refer to that previous discussion.

Figure 97:
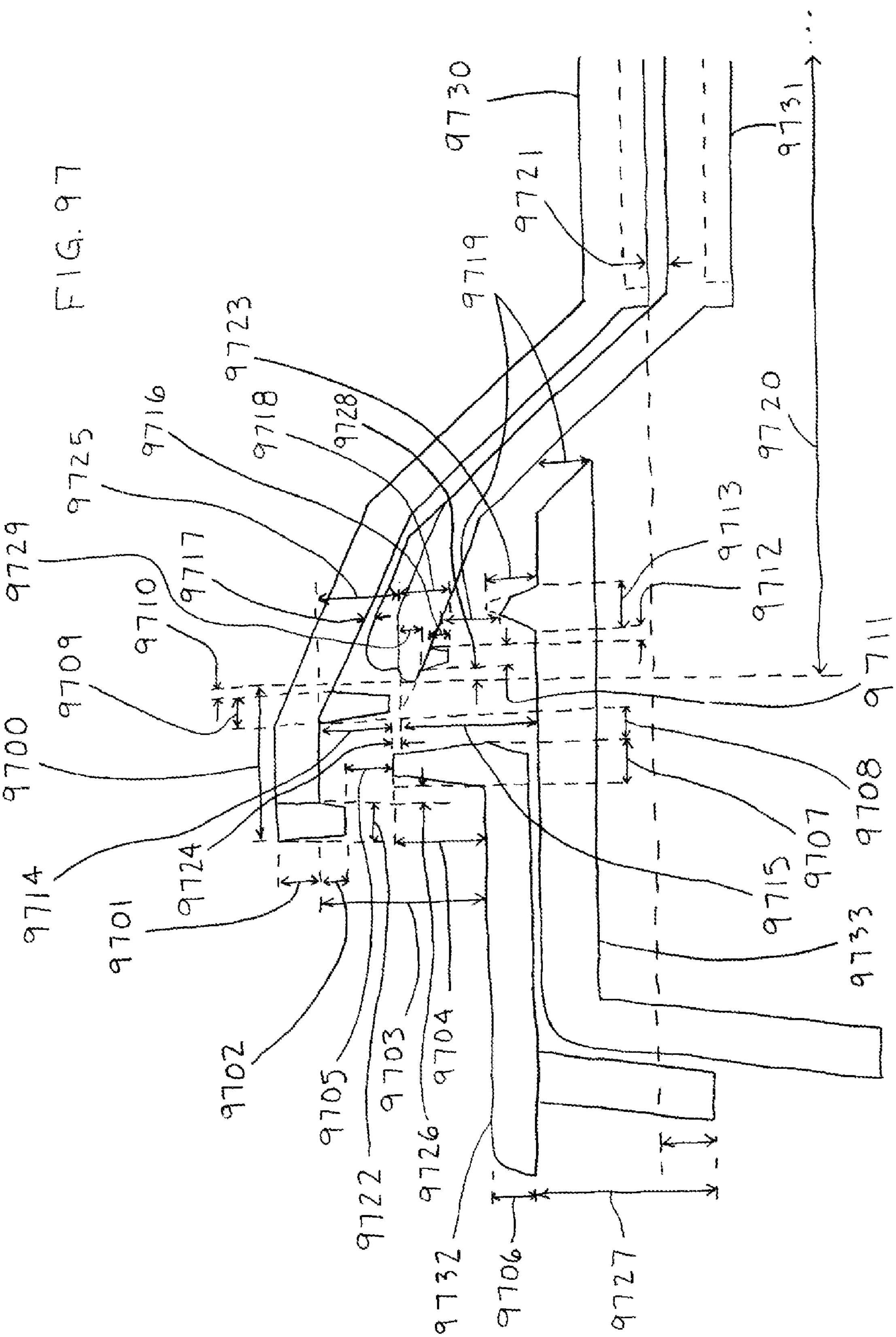
FIG. 97 is a side section view of a portion of a dining dish, dish holder, dish carrier, and top of a mechanical housing structure.

FIG. 97 is a side section view of a portion of a dining dish 9730, dish holder 9731, dish carrier 9732, and top 9733 of a mechanical housing structure. Example dimensions for each of the element names is provided below:

Elem # Dimension Element Name

Figure 98:
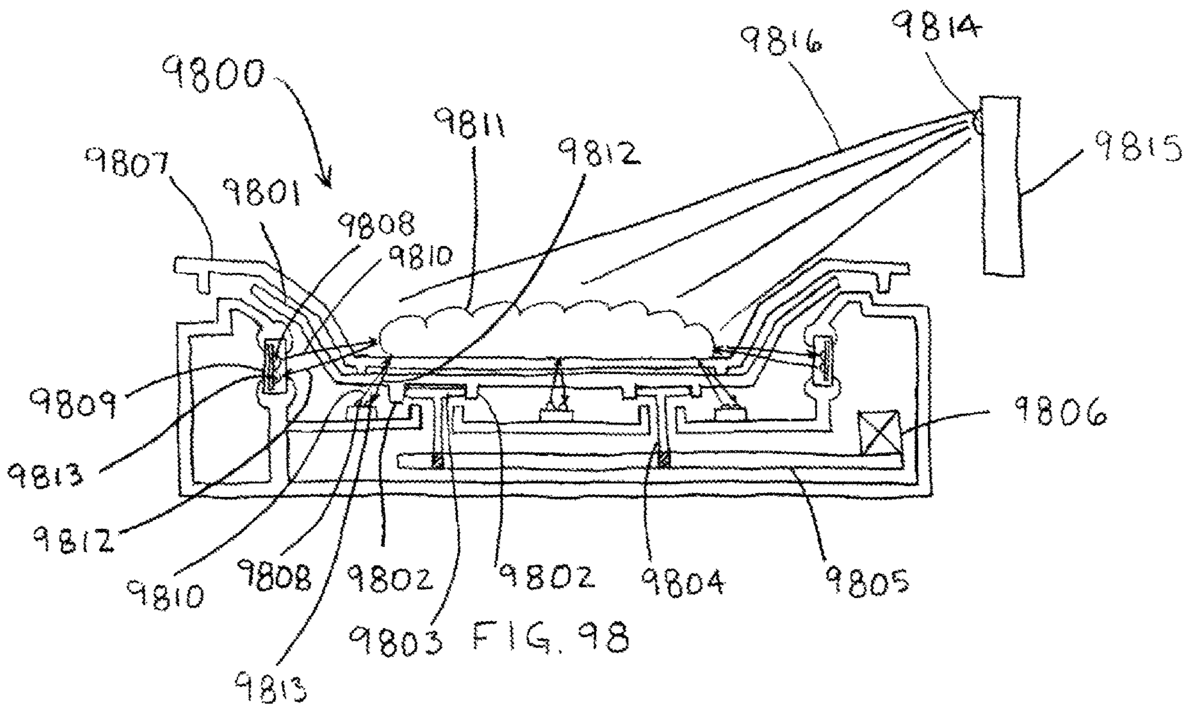
FIG. 98 is a side section view of a portion of an embodiment of an active foodware system for food recognition.

9700. 0.225" DishFlange_ExtensionLength
9701. 1.80 mm DishFlange_Thickness
9702. 0.03" DishFlange_EdgeRidge_Height
9703. 0.38" Dish_DishCarrierOverhang
9704. 0.25" DishCarrier_WaterBarrierWall_Height
9705. 0.10" Cantilever_BottomClearance
9706. 0.10" DishCarrier_Thickness
9707. 0.07" DishCarrier_WaterBarrierWall_Thickness
9708. 0.04" DishFlange_DishCarrierGuide_GapToDishCarrier
9709. 0.055" DishFlange_DishCarrierGuide_Thickness
9710. 0.01" DishFlange_DishCarrierGuide_GapToDishHolder_Horizontal
9711. 0.055" DishHolder_EdgeRidge_Thickness
9712. 0.01" DishHolder_EdgeRidge_GapToTopWaterBarrier
9713. 0.07" Top_WaterBarrierAroundDish_Thickness
9714. 0.15" DishFlange_DishCarrierGuide" Height
9715. 0.32" DishHolder_TopEmptyOverhang
9716. 0.05" DishHolder_EdgeRidgelnnerHeight
9717. 0.01" Dish_AllowedRockingGap
9718. 0.12" DishHolder_EdgeRidge_Height
9719. 0.125" DishHolder_DistanceRecessedIntoTopToCutOut
9720. 4.357" Dish_TopOuterWidthAfterFillet0p02in
9721. 0.0305" Dish_ToDishHolderBaseGapMeasuredFromModels
9722. 0.05" DishFlange_EdgeRidge_Thickness
9723. 0.20" Top_WaterBarrierAroundDish_Height
9724. 0.01" DishFlange_DishCarrierGuide_GapToDishHolder_Vertical
9725. 0.16" Dish_DishHolderOverhang
9726. 0.01" DishFlange_EdgeRidgeGapToDishCarrierWaterBarrierWall
9727. 0.42" DishCarrier_SideLeg_Length
9728. 0.0095" DishHolder_EdgeRidge_GapToTopOuter WidthAfterFillet_0p02in
9729. 0.9588 mm Dish_TopOuterFilletRadius_Height FIG. 98 is a side section view of a portion 9800 of an embodiment of an active foodware system for food recognition. As provided by FIG. 98, the portion 9800 of the embodiment is similar in some aspects to other embodiments previously provided, including the embodiments of FIGS. 54A, 14B, and 5E. A dining plate mating structure 9801 is supported by protrusions 9802 to the heads 9803 of screws 9804 screwed into the cantilever beam 9805. A load cell 9806 is attached to the cantilever beam 9805 for sensing weight of food 9811. A dining plate 9807 is supported by the dining plate mating structure 9801.

As provided in FIG. 98, the portion 9800 includes an LED emitter 9808 that emits light 9810. The LED emitter 9808 may be inside an LED housing 9809. There may be a plurality of emitters positioned to the sides and beneath the food 9811. The emitted light 9810 is for passing through the LED housing 9809, through the dining plate mating structure 9801, through the dining plate 9807, and reflecting from the food 9811. The LED emitter 9808 may include a laser diode emitter for scanning through wavelengths.

Light 9812 reflecting from the food 9811 is received by a detector 9813. There may be a plurality of detectors positioned to the sides and beneath the food 9811. The detector 9813 may be a near-infrared (NIR) and/or mid-infrared (MIR) detector diode for receiving attenuated total reflectance (ATR). NIR light is approximately 750-2500 nm wavelength, which is just beyond visible light. The NIR/MIR received signal from the detector 9813 may be decoded using a Fourier Transform to produce a spectrum of the food 9811 to be recognized. A camera 9814, such as a camera on a mobile phone 9815 and/or tablet computer, may receive light 9816 from the food 9811 and help with image recognition to distinguish between foods 9811 that produce similar NIR/MIR spectra.

Figure 99A:
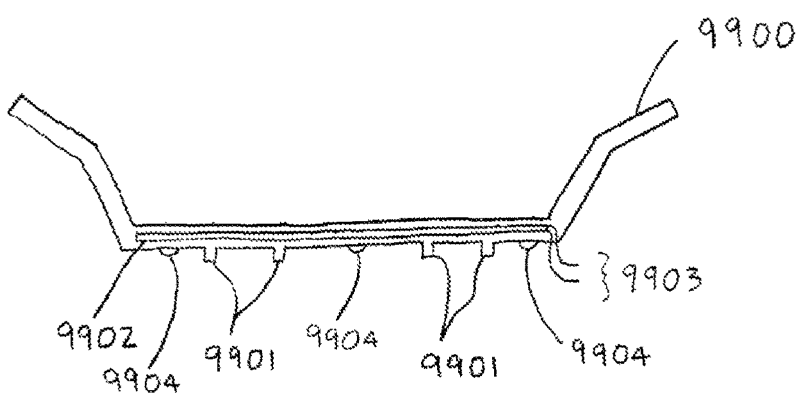
FIG. 99A is a side section view of a dining plate mating structure for food heating.

FIG. 99A is a side section view of a dining plate mating structure 9900 for food heating. The dining plate mating structure 9900 is similar to the dining plate mating structure 9801 of FIG. 98. The dining plate mating structure 9900 may have protrusions 9901 for support by heads of screws screwed into a cantilever beam (not shown). As provided by FIG. 99A, the dining plate mating structure 9900 has a heating coil 9902 for controlling heat and temperature of food. The heating coil 9902 has heating-coil terminals 9903. The dining plate mating structure 9900 may include temperature sensors 9904, such as a thermocouple, thermistor, and the like. As provided in FIG. 99B, the dining plate mating structure 9900 may have an associated microprocessor (CPU) 9905 for controlling the temperature.

Figure 99B:
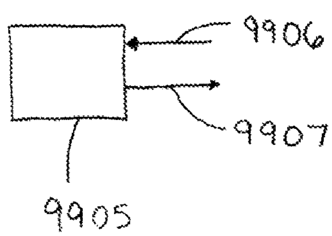
FIG. 99B is a block diagram of a microprocessor (CPU) for receiving a signal from a temperature sensor, and comparing the temperature to a set temperature, for controlling the temperature signal to a heating coil.

FIG. 99B is a block diagram of a microprocessor (CPU) 9905 for receiving a signal 9906 from a temperature sensor 9904, and comparing the temperature 9906 from the temperature sensor 9904 to a set temperature, for controlling the temperature signal 9907 to the heating coil 9902.

Figures 100A, 100B:
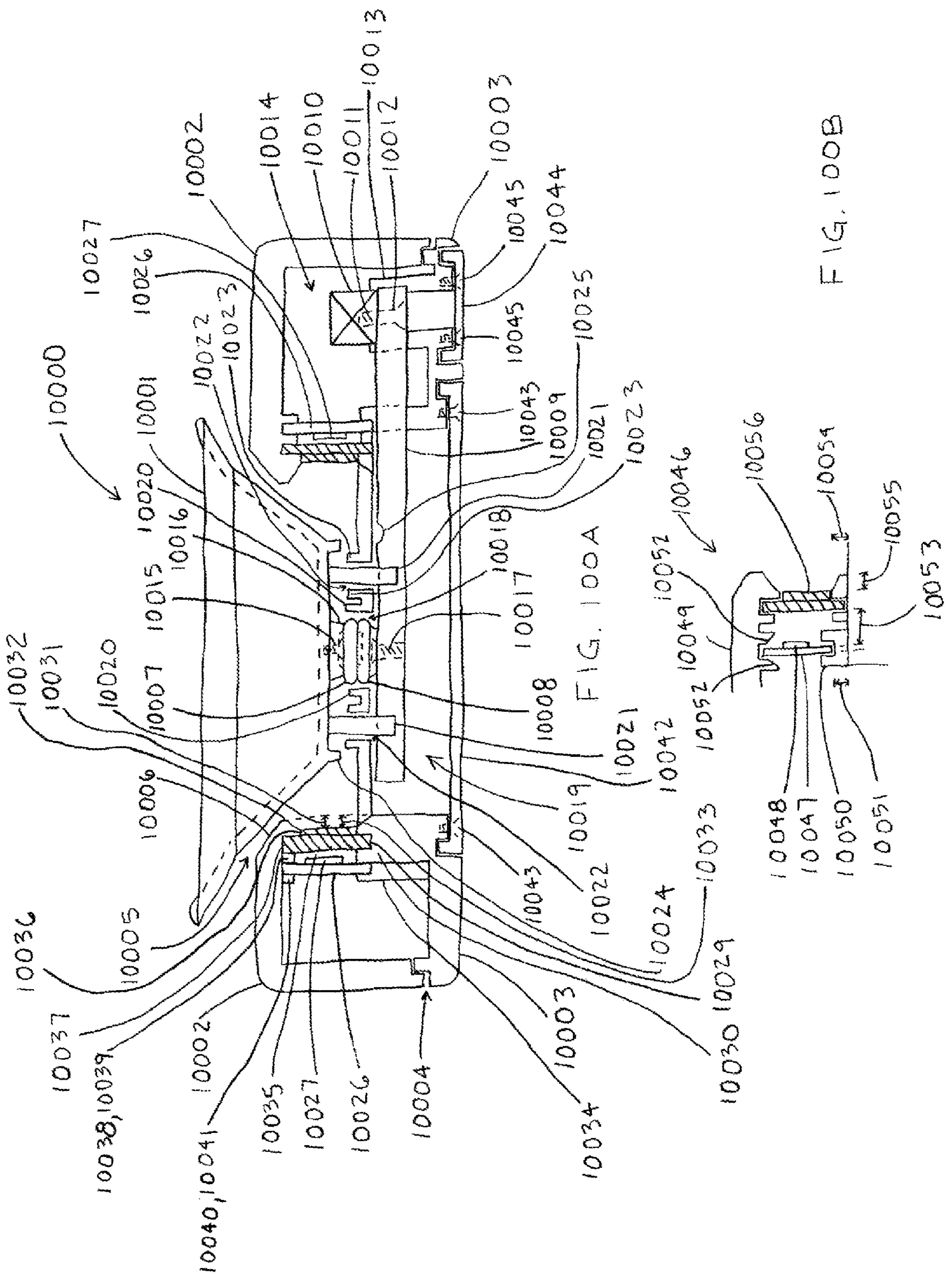
FIG. 100A is a side section view of a portion of an embodiment of an active foodware system. A dining plate mating structure is attached by a pair of snaps to a cantilever beam extending from a load cell. An LED strip with LEDs reside in an LED area, and are positioned behind a lens.
FIG. 100B is a side section view of an alternate embodiment of a portion of the embodiment of FIG. 100A, including an LED strip with LED positioned between a housing structure top and a base cantilever housing lens rear brace.

FIG. 100A is a side section view of a portion 10000 of an embodiment of an active foodware system. As provided by FIG. 100A, the portion 10000 of the embodiment is similar in some aspects to other embodiments previously provided, including the embodiment of FIG. 14B. The portion 10000 of FIG. 100A includes a dining plate mating structure 10001, also called a dish support.

A housing structure is provided by FIG. 100A, including a housing structure top 10002 on a housing structure base 10003. There may be a parting line, where the top-base parting line height is 0.05" 10004. The dining plate mating structure 10001 is partially recessed in an opening 10005 in the housing structure top 10002. The surface 10006 of opening 10005 in the housing structure top 10002 next to the dining plate mating structure 10001 typically slopes as shown.

As provided by FIG. 100A, the dining plate mating structure 10001 is attached by a pair of snaps 10007, 10008 to a cantilever beam 10009 extending from a load cell 10010. The cantilever 10009 may be fastened to the load cell 10010 by a screw 10011 passing through a screw hole 10012 in the cantilever 10009. The screw 10011 may be a flathead screw, and the screw hole 10012 may be countersunk into the cantilever 10009. The load cell 10010 is supported by a load cell support 10013 in a load cell area 10014.

One of the snaps 10007 may be attached by a screw 10015 to a spacer 10016 extending from the dining plate mating structure 10001; and the mating snap 10008 may be attached to the cantilever beam 10001 by a screw 10017. As provided by FIG. 100A, the snaps 10007, 10008 extend from the dining plate mating structure 10001 through a hole 10018 into a cantilever compartment 10019. Surrounding the hole 10018 is a barrier 10020.

There are also dish support legs 10021 extending from the dining plate mating structure 10001 to the cantilever 10009 through holes 10022 into the cantilever compartment 10019. Surrounding the holes 10022 are barriers 10023. On the underneath side of the dining plate mating structure 10001 is typically another barrier 10024 which hangs down outside the barriers 10023. There is an optional narrow, very shallow drainage channel 10025 in the cantilever beam 10009 to guide water to the side of the cantilever beam 10009.

An LED strip 10026 with LEDs 10027 reside in an LED area 10028, and are positioned behind a lens 10029 (identified by the crosshatching). The lens 10029 is positioned between the housing structure top 10002 and a base cantilever housing structure 10030. As provided by FIG. 100A, the lens 10029 may be set back from the edge of the opening 10005 in the housing structure top 10002 by a lens top recess chamfer width of 0.05" 10031. The lens top recess chamfer cutout edge height may be 0.02" 10032. The base cantilever housing structure 10030 extends up from the housing structure base 10003. As provided by FIG. 100A, the lens 10029 may be set back from the side of the base cantilever housing structure 10030 by a base cantilever housing lens recess chamfer width of 0.05" 10033. Under the LED strip 10026 and behind the cantilever housing structure 10030 is an LED strip support 10034.

There may be an LED strip LED clearance behind the lens of 0.05" 10035. The lens plateau thickness may be 0.03" or 0.04" 10036. The lens thickness without the plateau may be 0.05" 10037. A lens rear brace width may be 0.05" 10038, and its height may be 0.05" 10039. An LED strip rear brace width may be 0.05" 10040, and its height may be 0.05" 10041.

The housing structure base 10003 may have a cantilever housing cover 10042. The cantilever housing cover 10042 may be attached to the housing structure base 10003 by screws 10043. The housing structure base 10003 may have a load cell cover 10044. The load cell cover 10044 may be attached to the housing structure base 10003 by screws 10045.

FIG. 100B is a side section view of an alternate embodiment 10046 of a portion of the embodiment of FIG. 100A. The alternate embodiment 10046 includes an LED strip 10047 with LED 10048 positioned between a housing structure top 10049 and a base cantilever housing lens rear brace 10050. The height of the base cantilever housing lens rear brace inner slot may be 0.05" 10051. The LED strip 10047 is supported at the top by sloping LED strip braces 10052. With an LED thickness of 0.06", and a gap between the LED and the back of the lens of 0.05", the base cantilever housing lens rear brace width is 0.11" 10053. The base cantilever housing lens recess chamfer height 10054 and width 10055 may both be 0.05". To help identify it, a lens 10056 is crosshatched.

Figure 101A:
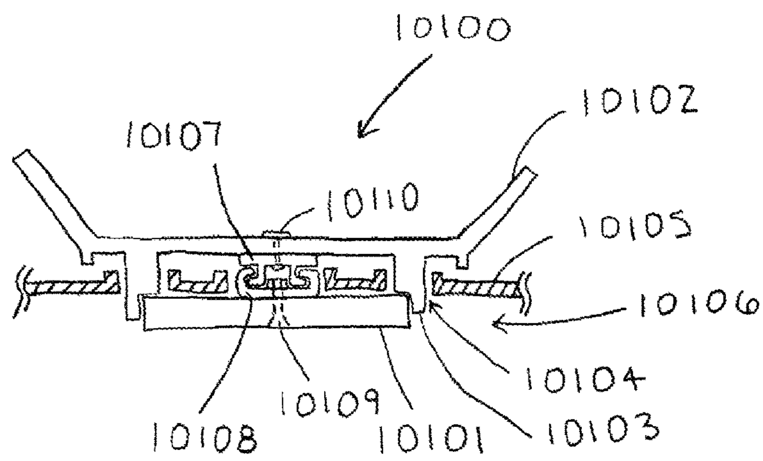
FIG. 101A is an end section view.

FIG. 101A is an end section view of a portion 10100 of an embodiment of an active foodware system. The end section view is looking down the end of a cantilever beam 10101. A dining plate mating structure 10102 has legs 10103 for supporting and aligning the dining plate mating structure 10102 to the cantilever 10101. The legs 10103 extend through openings 10104 in the top 10105 of a cantilever compartment 10106, also called a cantilever-container compartment. A pair of mating push snaps 10107, 10108 hold the dining plate mating structure 10102 to the cantilever 10101. The snaps 10107, 10108 may be in the middle of the dining plate mating structure 10102. The snaps 10107, 10108 may be held onto the dining plate mating structure 10102 via an M2 screw 10109 or a small-diameter-head rivet 10110.

Figure 101B:
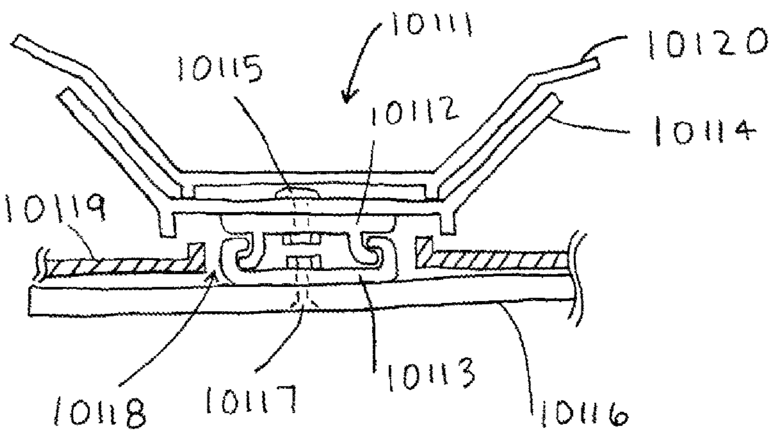
FIGS. 101B-101J and 101M-101P are side section views of portions of embodiments of an active foodware system, where two sides of a snap hold a dining plate mating structure to a cantilever.

FIG. 101B is a side section view of a portion 10111 of an embodiment of an active foodware system. The portion 10111 provides two sides 10112, 10113 of a plastic snap mated together, such as a KAM snap. One side 10112 of the snap is attached to a dining plate mating structure 10114, also called the support dish. In FIG. 101B, the plug side 10112 of the snap, also called the stud side, is attached to the dining plate mating structure 10114 by a screw 10115. In FIG. 101B, the screw 10115 is a pan head screw. The mating socket side 10113 of the snap, also called the receptacle side, is attached to a cantilever 10116 by a screw 10117. In FIG. 101B, the screw 10117 is a flathead screw, and it is countersunk into the cantilever 10116. The two sides 10112, 10113 of the plastic snap connect through an opening 10118 in a housing structure 10119 over the cantilever 10116. A dining dish 10120 is on the dining plate mating structure 10114.

Figure 101C:
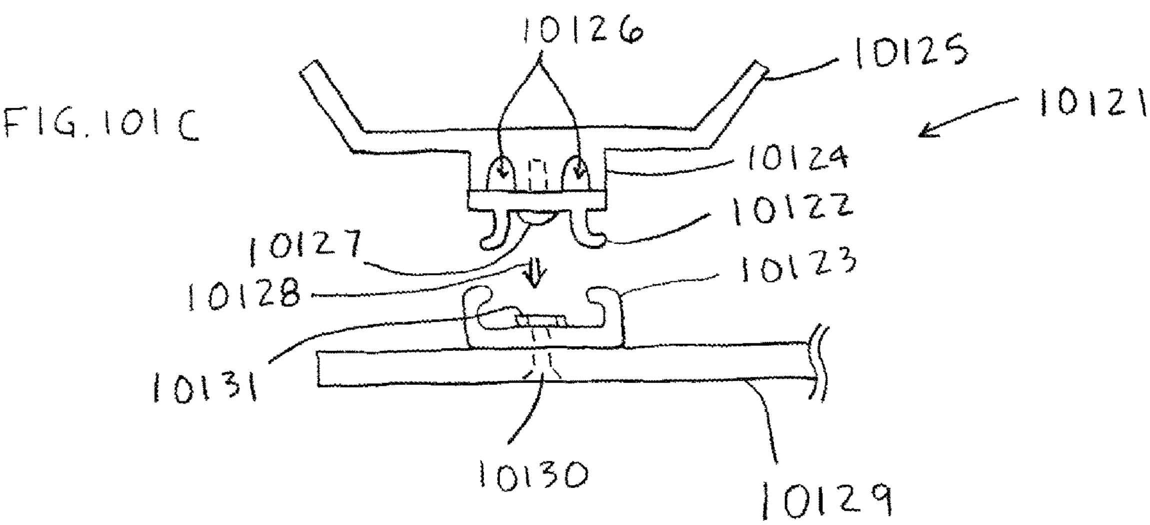

FIG. 101C is a side section view of a portion 10121 of an embodiment of an active foodware system. The portion 10121 provides two halves 10122, 10123 of a pre-molded plastic snap, such as KAM snap. A #20 T5 KAM snap may be used. One side 10122 of the snap is attached to an extension 10124 of a dining plate mating structure 10125, also called the support dish. The extension 10124 may be made as long as necessary. The extension 10124 may include a cylindrical channel 10126 so that the material of the extension 10124 isn't too thick. In FIG. 101C, the plug side 10122 of the snap is attached to the extension 10124 of the dining plate mating structure 10125 by a screw 10127. In FIG. 101C, the screw 10127 is a pan head screw threaded into the extension 10124. The socket side 10123 of the snap for mating 10128 is attached to a cantilever 10129 by a screw 10130. In FIG. 101C, the screw 10130 is a flathead screw. The screw 10130 may be countersunk into the cantilever 10129 and secured by a nut 10131.

Figure 101D:
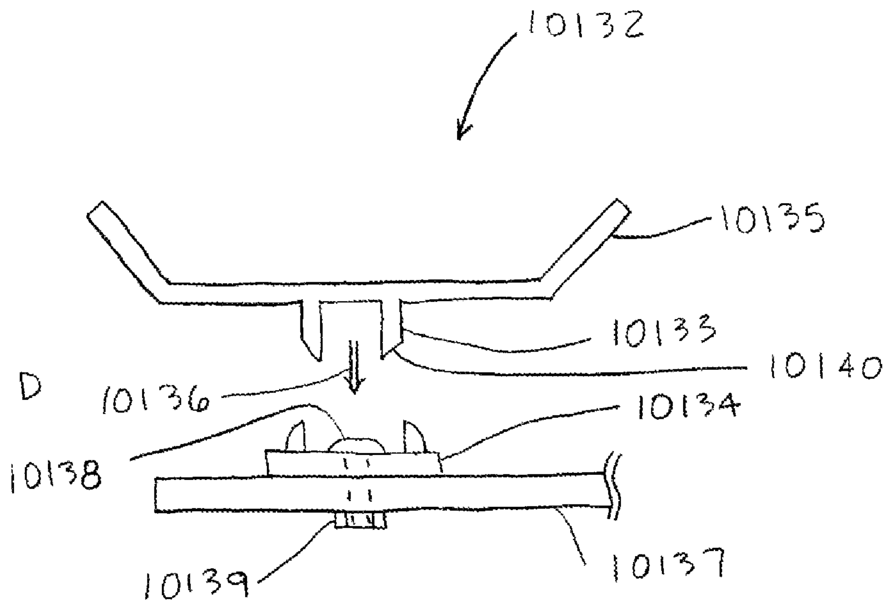

FIG. 101D is a side section view of a portion 10132 of an embodiment of an active foodware system. The portion 10132 provides two sides 10133, 10134 of a snap. In FIG. 101D, the plug side 10133 of the snap is provided as part of the dining plate mating structure 10135, also called a dish support. The plug side 10133 of the snap may have sloped ends 10140. The receptacle side 10134 of the snap for mating 10136 is attached to a cantilever 10137 by a screw 10138. The receptacle side 10134 may be a snap half made by a 3rd-party manufacturer. In FIG. 101D, the screw 10138 is a pan head screw secured by a nut 10139. The nut 10139 may go on the bottom side of the cantilever 10137 if it's too large in diameter to go on the top side of the cantilever 10137, such that the plug side 10133 won't fit. A KAM snap #14/16 T3 is a great size and snap strength, but the depth of the snap isn't deep enough to use regular M2 screws; although, an M2 flathead screw may work. A #14/16 snap receptacle is much lower profile than a #20.

Figure 101E:
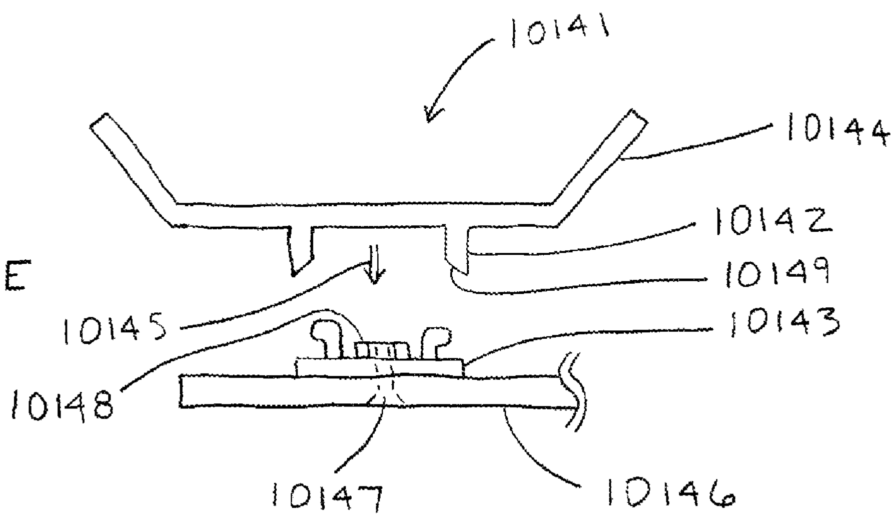

FIG. 101E is a side section view of a portion 10141 of an embodiment of an active foodware system. The portion 10141 provides two sides 10142, 10143 of a snap. In FIG. 101E, the receptacle side 10142 of the snap is provided as part of the dining plate mating structure 10144. The receptacle side 10142 of the snap may have sloped ends 10149. The plug side 10143 of the snap for mating 10145 is attached to a cantilever 10146 by a screw 10147. In FIG. 101E, the screw 10147 is a flathead screw secured by a nut 10148. The nut 10148 may go on the top side of the cantilever 10146, since the mating receptacle half 10142 of the snap fits around the outside of the snap structure of the plug side 10143.

Figure 101F:
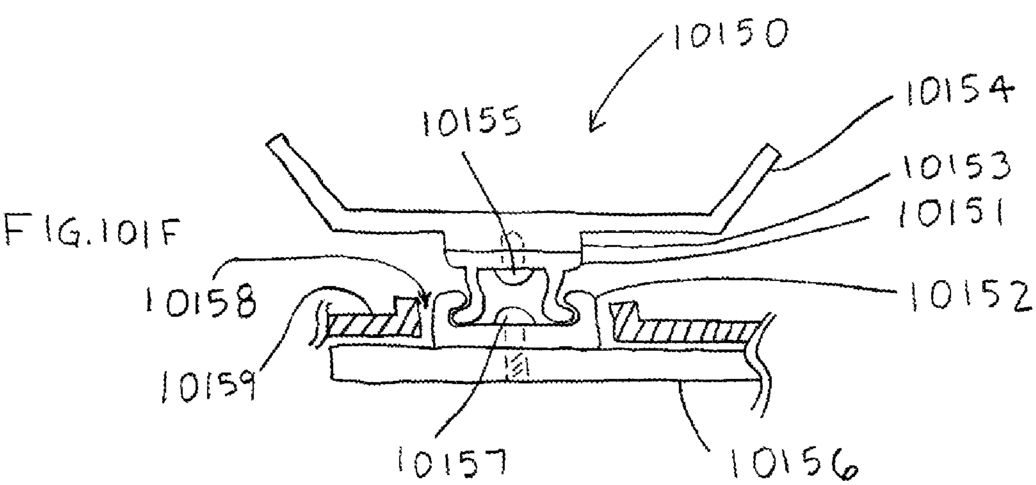

FIG. 101F is a side section view of a portion 10150 of an embodiment of an active foodware system. The portion 10150 provides two halves 10151, 10152 of a plastic snap mated together. One side 10151 of the snap is attached to an extension 10153 of a dining plate mating structure 10154. In FIG. 101F, the plug side 10151 of the snap is attached to the extension 10153 of the dining plate mating structure 10154 by a screw 10155. The extension 10153 provides more vertical space for the screw 10155. In FIG. 101F, the screw 10155 is a pan head screw, and is threaded into the extension 10153. The socket side 10152 of the snap for mating is attached to a cantilever 10156 by a screw 10157. In FIG. 101F, the screw 10157 is a pan head screw, and is threaded into the cantilever 10156. As provided by FIG. 101F, the two sides 10151, 10152 of the snap connect through an opening 10158 in a housing structure 10159 over the cantilever 10156.

Figure 101G:
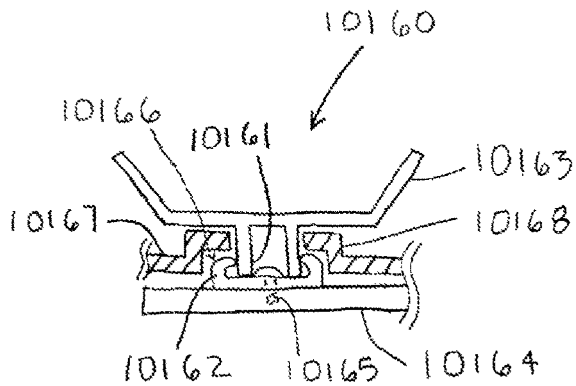

FIG. 101G is a side section view of a portion 10160 of an embodiment of an active foodware system. The portion 10160 provides two sides 10161, 10162 of a snap mated together. In FIG. 101G, the plug side 10161 of the snap is provided as part of the dining plate mating structure 10163. The receptacle side 10162 of the snap for mating is attached to a cantilever 10164 by a screw 10165. In FIG. 101G, the screw 10165 is a pan head screw threaded into the cantilever 10164. As provided by FIG. 101G, the two sides 10161, 10162 of the snap connect through an opening 10166 in a housing structure 10167 over the cantilever 10164. As provided in FIG. 101G, the portion 10168 of the housing structure nearest the opening steps up and over the outer portion of the receptacle side 10162 of the snap.

Figure 101H:
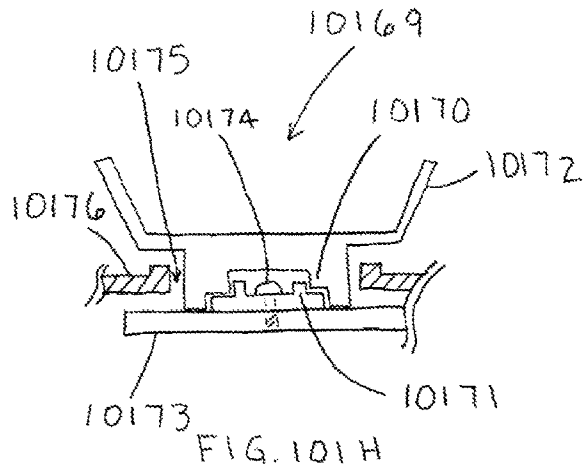

FIG. 101H is a side section view of a portion 10169 of an embodiment of an active foodware system. The portion 10169 provides two sides 10170, 10171 of a snap mated together. In FIG. 101H, the receptacle side 10170 of the snap is provided as part of the dining plate mating structure 10172. As further provided in FIG. 101H, the receptacle side 10170 of the snap also allows the dining plate mating structure 10172 to rest on a cantilever 10173 while providing a wide post/large diameter support. The plug side 10171 of the snap for mating is attached to the cantilever 10173 by a screw 10174. In FIG. 101H, the screw 10174 is a pan head screw threaded into the cantilever 10173. As provided by FIG. 101H, the two sides 10170, 10171 of the snap connect through an opening 10175 in a housing structure 10176 over the cantilever 10173.

Figure 101I:
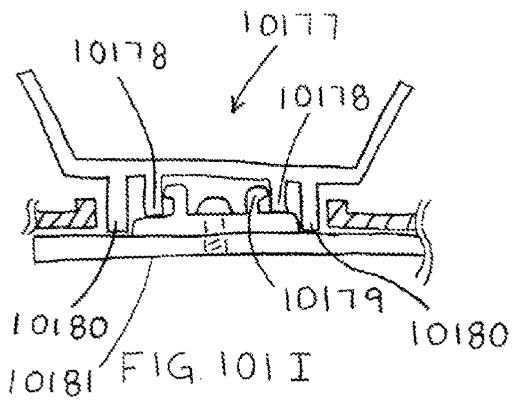

FIG. 101I is a side section view of a portion 10177 of an embodiment of an active foodware system. The portion 10177 is similar to the portion 10169 of FIG. 101H, but where the receptacle side of the portion 10169 of FIG. 101H with a wide post is separated into two structures in the portion 10177 of FIG. 101I: (1) a receptacle structure 10178 for snapping to the outside edge of the plug side 10179 of the snap, and (2) a leg structure 10180 for resting on a cantilever 10181. The receptacle structure 10178 may also have side slots (not visible in FIG. 101I).

Figure 101J:
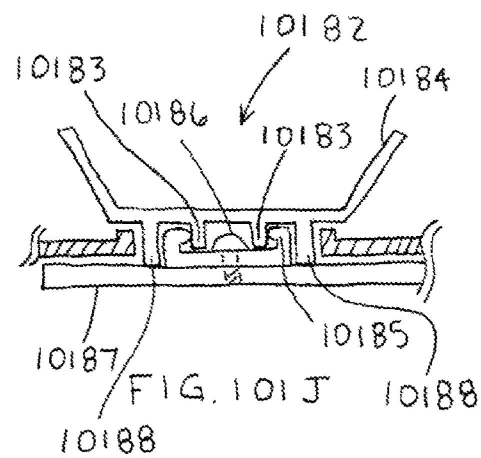

FIG. 101J is a side section view of a portion 10182 of an embodiment of an active foodware system. The portion 10182 is similar to the portion 10177 of FIG. 101I, but where the plug structure 10183 is provided as part of the dining plate mating structure 10184, and is for snapping to the inside edge of a receptacle side 10185 of the snap. The receptacle side 10185 of the snap may be screwed by a screw 10186 to a cantilever 10187. The portion 10182 of FIG. 101J also includes a leg structure 10188 for resting on the cantilever 10187.

Figure 101K:
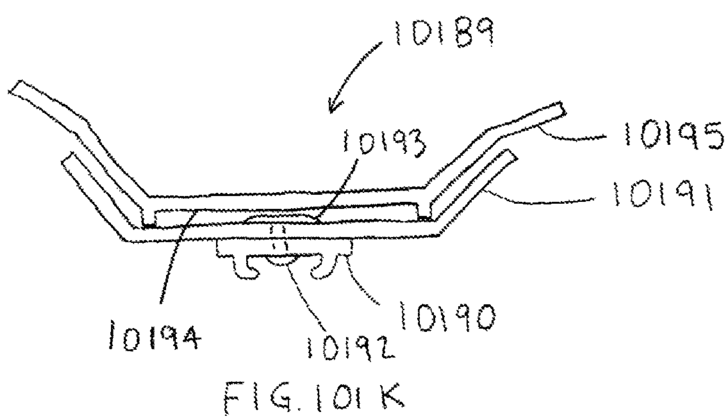
FIG. 101K is a side section view of a portion of an embodiment of an active foodware system providing one side of a snap fastened to a dining plate mating structure.

FIG. 101K is a side section view of a portion 10189 of an embodiment of an active foodware system. In FIG. 101K, the portion 10189 provides one side 10190 of a snap fastened to a dining plate mating structure 10191 (also referred to as a support dish) with a rivet 10192. A screw (not shown in FIG. 101K) may also be used for fastening; however, a plastic rivet 10192 through the dining plate mating structure 10191 requires less vertical space than when a screw is used, such as in FIG. 101F. As provided by FIG. 101K, the head 10193 of the rivet 10192 fits under the base 10194 of a dining dish 10195.

Figure 101L:
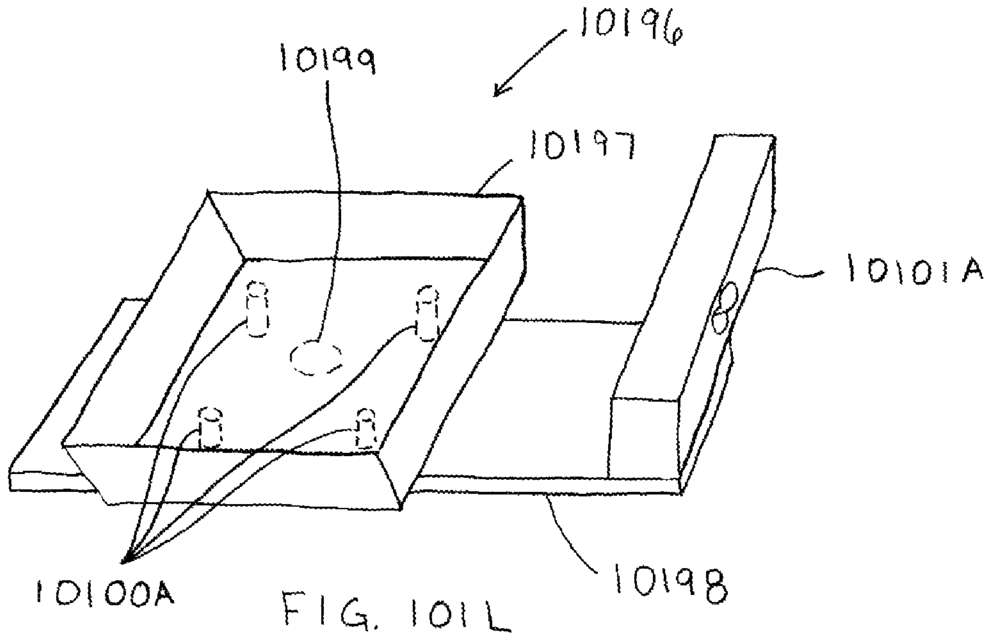
FIG. 101L is a perspective view of a portion of an embodiment of an active foodware system, where a dining plate mating structure is snapped to a cantilever with one plug-receptacle snap.

FIG. 101L is a perspective view of a portion 10196 of an embodiment of an active foodware system. In FIG. 101L, a dining plate mating structure 10197 (also referred to as a support dish) is snapped to a cantilever 10198 with one plug-receptacle snap 10199. The dining plate mating structure 10197 may have two or more legs provide support that don't snap. FIG. 101L provides four support legs 10100A. The cantilever 10198 is attached to a load cell 10101A.

Figure 101M:
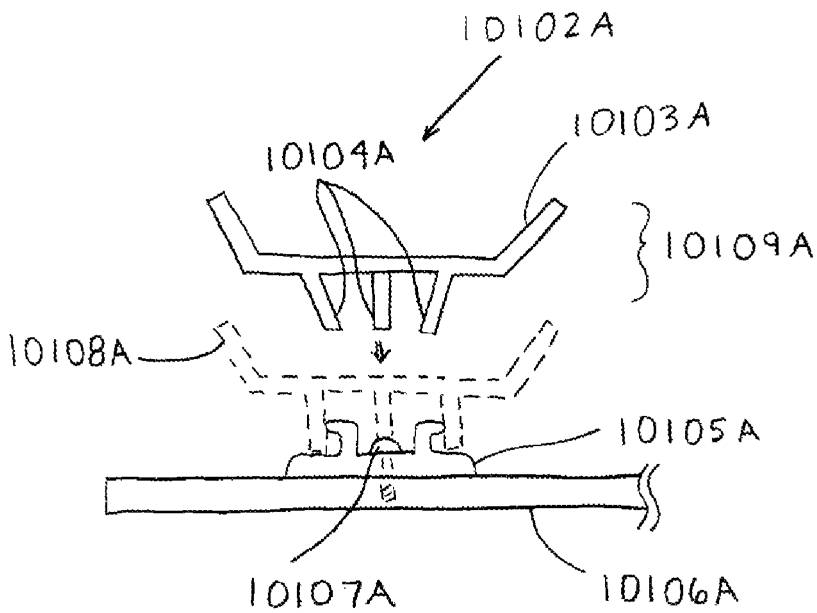

FIG. 101M is a side section view of a portion 10102A of an embodiment of an active foodware system. In FIG. 101M, a dining plate mating structure 10103A has receptacle flexures 10104A for mating with a plug side 10105A of a snap. The plug side 10105A of the snap may be screwed to a cantilever 10106A with a screw 10107A, where the cantilever 10106A may be threaded. A dashed outline 10108A provides the dining plate mating structure 10103A in a position that is mated with the plug side 10105A of the snap. The dining plate mating structure 10103A may comprise two different plastics, where the dish portion 10109A of the dining plate mating structure 10103A may be stiff plastic, and where the receptacle flexures 10104A are flexible. Overmolding may be used to combine two different plastics.

Figure 101N:
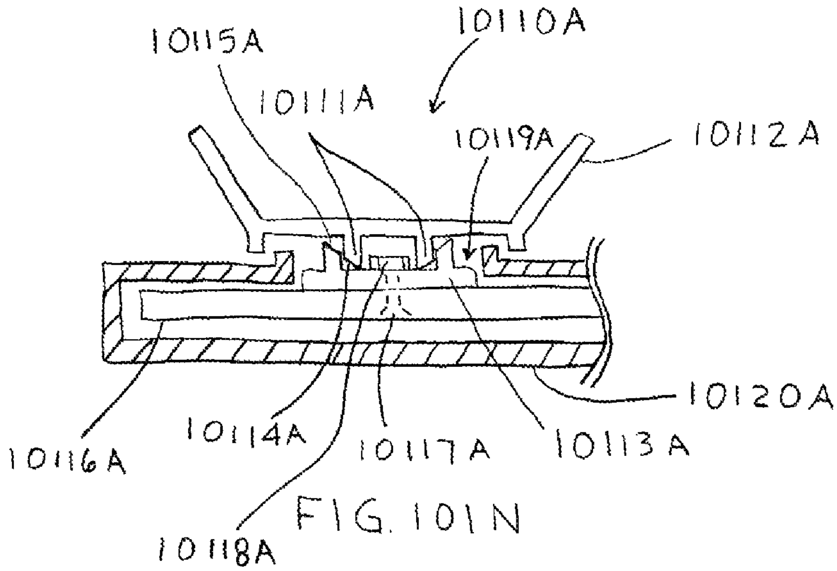

FIG. 101N is a side section view of a portion 10110A of an embodiment of an active foodware system. The portion 10110A of FIG. 101N is similar is some aspects to the portion 10132 of FIG. 101D. As provided by the portion 10110A of FIG. 101N, a plug side 10111A of a snap on the dining plate mating structure 10112A is mated with a receptacle side 10113A of the snap. The plug side 10111A of the snap may be hard plastic molded onto the dining plate mating structure 10112A, also referred to as the dish support. The ends 10114A of the plug side 10111A may be sloped. The receptacle side 10113A of the snap may be made of a flexible resin and/or plastic. The ends 10115A of the receptacle side 10113A of the snap may be sloped. The receptacle side 10113A of the snap may be fastened to a cantilever 10116A with a screw 10117A. The screw 10117A may be recessed and secured with a nut 10118A. The plug side 10111A and receptacle 10113A side of the snap may mate through an opening 10119A in a cantilever compartment 10120A around the cantilever 10116A.

Figure 101O:
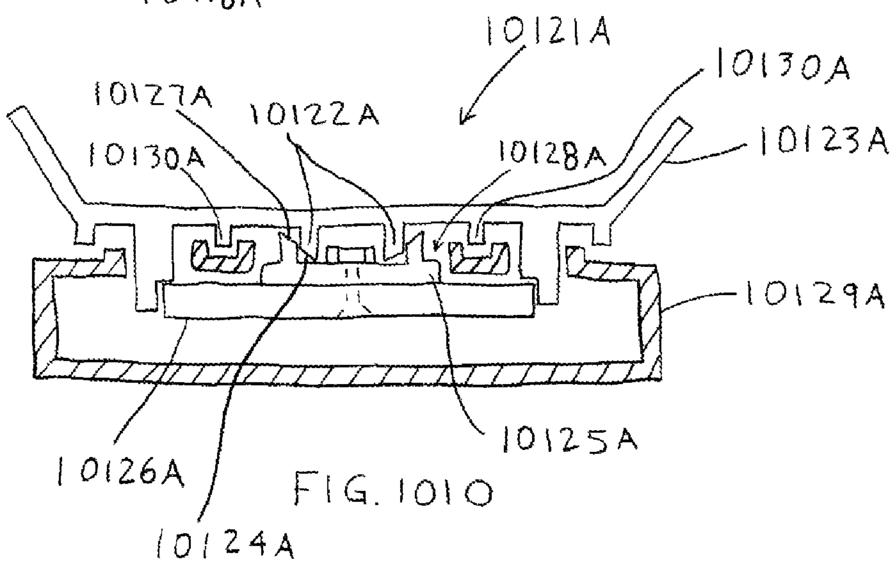

FIG. 101O is an end section view of a portion 10121A of an embodiment of an active foodware system. The portion 10121A of FIG. 101O is similar in some aspects to the portion 10100 of FIG. 101A. One important difference is that, in the portion 10121A of FIG. 101O, the plug side 10122A of the snap is molded onto the dining plate mating structure 10123A, also referred to as a support dish. The ends 10124A of the plug side 10122A may be sloped. The plug side 10122A of the snap is for mating with a receptacle side 10125A of the snap that is flexible and fastened to a cantilever 10126A. The ends 10127A of the receptacle side 10125A of the snap may be sloped. The plug side 10122A and receptacle 10125A side of the snap may mate through an opening 10128A in a cantilever compartment 10129A around the cantilever 10126A. As provided by FIG. 101O, the dining plate mating structure also has additional barriers 10130A.

The genders of the plug side 10122A and receptacle side 10125A may be reversed, such that a plug side of the snap is on the cantilever 10126A, and a receptacle side of the snap is on the dining plate mating structure 10123A. However, since it's easier for flexible plastic to stretch than to compress, it's preferred to have the flexible receptacle side 10125A of the snap fastened to the cantilever 10126A, as provided in FIG. 101O.

Figure 101P:
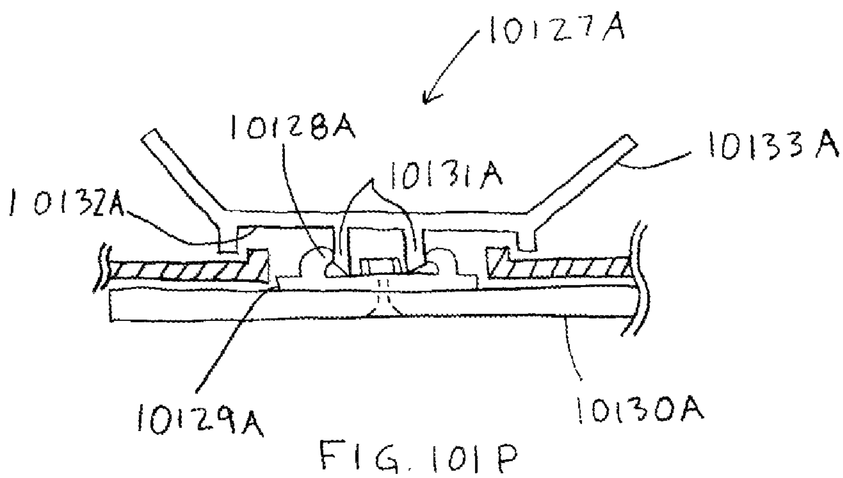

FIG. 101P is a side section view of a portion 10127A of an embodiment of an active foodware system. The portion 10127A of FIG. 101P is similar in some aspects to the portion 10110A of FIG. 101N. One difference is that, in the portion 10127A of FIG. 101P, the ends 10128A of the receptacle side 10129A of the snap are hook shaped.

As provided by the portion 10127A of FIG. 101P, the receptacle side 10129A of the snap is fastened to a cantilever 10130A, and the plug side 10131A of the snap is molded onto the bottom 10132A of the dining plate mating structure 10133A, rather than the other way around, since the receptacle side 10129A of the snap can expand in diameter to accommodate the more rigid plug side 10131A of the snap on the dining plate mating structure 10133A, but a plug side of a snap doesn't easily compress. The dining plate mating structure 10133A is also sometimes referred to as the dish.

A size #20 T5 KAM snap receptacle side of a snap may be preferred to use, since a size #14 T3 doesn't have a large enough diameter for an M2 nut. Alternatively, a rivet may be used to attach a size #14 receptacle side of a snap to the cantilever 10130A.

A receptacle side of a snap may be created from a white Nylon tube drilled out to 15⁄64". A 15⁄64" hole snaps onto a #20 plug side of a snap. Since it is a pretty tight snap fit, a 31⁄128" hole may be preferred over a 15⁄64" hole. The 31⁄128" hole may be preferred when the inner edge of the tube is chamfered. A ¼" hole holds, but doesn't snap, and it is not snug. A #20 plug side of a KAM snap has an exterior ridge of 0.0039", equal to 0.099 mm, extending radially outward near the end of the plug.

A 15⁄64" outside diameter (OD) and a 31⁄128" OD tube work as plug sides of a snap in a #20 receptacle side of a snap. #20 receptacles sides of a KAM snap have a very subtle hex internal shape.

FIG. 102A is an end section view of a portion 10200 of an embodiment of an active foodware system. The end section view is looking down the end of a cantilever beam 10201. The portion 10200 of FIG. 102A is similar in some aspects to the portion 10100 of FIG. 101A, except the snap sides 10107, 10108 of FIG. 101A are replaced in FIG. 102A with a flexure arm 10202 that extends through a hole 10203 in the cantilever 10201 for holding the dining plate mating structure 10204 to the cantilever 10201. Similar to FIG. 101A, in FIG. 102A there may be four legs. There may be only one hole 10203 in the middle for the flexure arm 10202, with the four support legs around it. In the end view of FIG. 102A, only two 10205, 10206 of the four legs are viewable.

FIG. 102B is an end section view of a portion 10207 of an embodiment of an active foodware system. The end section view is looking down the end of a cantilever beam 10208. The portion 10207 of FIG. 102B is similar in some aspects to the portion 10200 of FIG. 102A, except the flexure arm 10202 of FIG. 102A is replaced in FIG. 102B with four flexures 10209 (with only two viewable in FIG. 102B). The four separate flexures 10209 may each have a support ledge 10210 and a ridge 10211 on the end for holding the dining plate mating structure 10212 to the cantilever 10208.

FIG. 102C is an end section view of a portion 10213 of an embodiment of an active foodware system. The end section view is looking down the end of a cantilever beam 10214. The portion 10213 of FIG. 102C is similar in some aspects to the portion 10207 of FIG. 102B, except the flexure 10209 of FIG. 102B extending from the ledge 10210 is replaced in FIG. 102C with flexures 10215 extending from the dining plate mating structure 10216. There are separate legs 10226 for vertical strength and support, and separate flexures 10215 to snap on to the cantilever 10214.

FIG. 102D is an end section view of a portion 10217 of an embodiment of an active foodware system. The end section view is looking down the end of a cantilever beam 10218. The portion 10217 of FIG. 102D is similar in some aspects to the portion 10213 of FIG. 102C, except the flexures 10219 of FIG. 102D are also positioned against the sides of the cantilever 10218.

FIG. 102E is an end section view of a portion 10221 of an embodiment of an active foodware system. The end section view is looking down the end of a cantilever beam 10222. The portion 10221 of FIG. 102E is similar in some aspects to the portion 10213 of FIG. 102C, except the flexure 10215 of FIG. 102C extending from the dining plate mating structure 10216 is replaced in FIG. 102E with a flexure 10223 extending from the bottom of the leg 10224 and bowing up toward the dining plate mating structure 10225 before extending down under the cantilever 10222, for holding the dining plate mating structure 10225 to the cantilever 10222.

FIG. 102F is an end section view of a portion 10227 of an embodiment of an active foodware system. The end section view is looking down the end of a cantilever beam 10228. The portion 10227 of includes a portion of a dining plate mating structure 10229 with a flexure 10230 with a ridge 10231 at the end for fitting into an indentation 10232 in the cantilever 10228.

FIG. 102G is a section view of a portion 10233 of an embodiment of an active foodware system. The portion 10233 of includes a portion of a dining plate mating structure 10234 with supports 10235 with a flexure 10236 next to them.

Figure 103A:
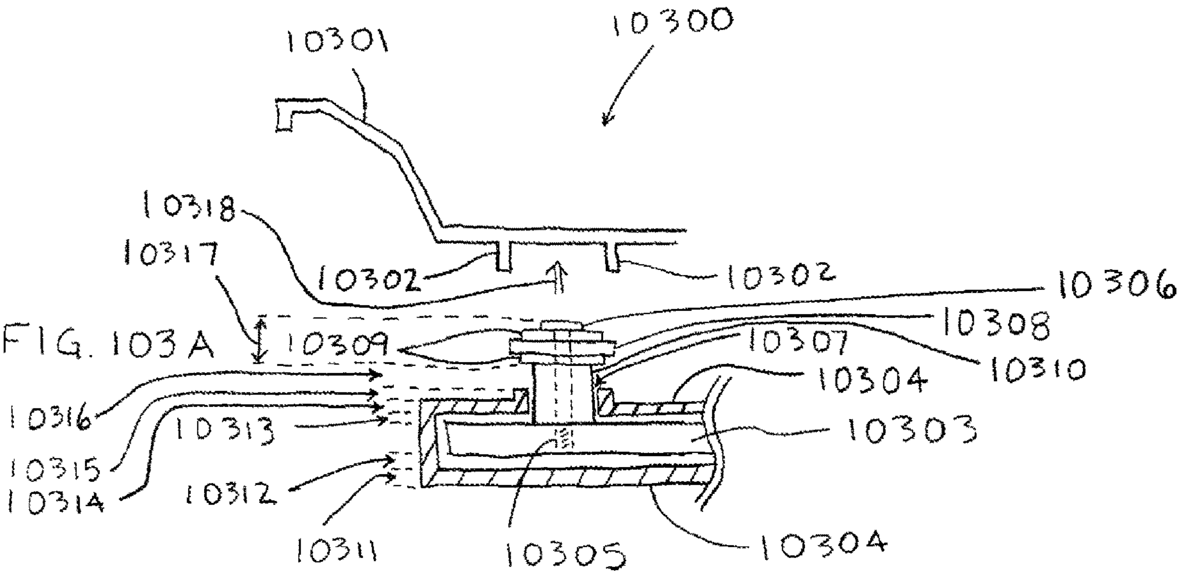
FIGS. 103A-103D are side section views of portions of embodiments of an active foodware system including a rubber washer or O-ring for fitting into a retaining barrier on a dining plate mating structure.

FIG. 103A is a side section view of a portion 10300 of an embodiment of an active foodware system. The portion 10300 of includes a portion of a dining plate mating structure 10301 with a retaining barrier 10302. A cantilever beam 10303 is in a housing structure 10304. A screw 10305 with a flat head 10306, such as a wafer-head screw, a flathead screw, or a V screw, extends through a hole 10307 in the housing structure 10304 and is screwed into the cantilever 10303. The screw 10305 positions a rubber washer 10308 above the hole 10307. A plastic or stainless steel shim washer 10309 on each side of the rubber washer 10308, together with a hollow spacer 10310, positions the rubber washer 10308 on the screw 10305. The spacer 10310 may be plastic or aluminum or other metal spacer, typically ⅜" long. The rubber washer 10308 is for snapping to 10318, and gripping, the retaining barrier 10302 on the dining plate mating structure 10301, and creating a snap/friction joint.

Typical dimensions are as follows:

1. Thickness 10311 of the bottom of the housing structure=⅛".
2. Gap 10312 between the upper surface of the housing structure bottom and the cantilever=⅛".
3. Gap 10313 between the lower surface of the housing structure top and the cantilever=1/16".
4. Thickness 10314 of the top of the housing structure=1/16".
5. Height 10315 of barrier around the hole above the top surface of the housing structure=⅛".
6. Gap 10316 between the top of the barrier and the bottom of the lower plastic or metal washer=⅛".
7. Combined height 10317 of the rubber washer with the lower and upper plastic or metal washer and screw head=¼", which equals the additional height added by using this snap/friction joint, instead of directly attaching the dining plate mating structure to the spacer.

Figure 103B:
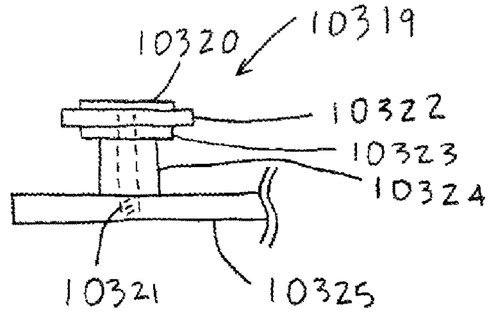

FIG. 103B is a side section view of a portion 10319 of an embodiment of an active foodware system. The portion 10319 of FIG. 103B is similar in some aspects to the portion 10300 of FIG. 103A, except there is no upper plastic or stainless steel shim washer between a rubber washer and a head of a screw. Instead, the head 10320 of a screw 10321, such as a wafer-head screw, supports the top surface of a rubber washer 10322 in FIG. 103B. A plastic or stainless steel shim washer 10323, on top of a plastic or metal (e.g., aluminum) hollow spacer 10324 or standoff, on top of a cantilever 10325, supports the bottom surface of the rubber washer 10322. The screw 10321 is screwed into the cantilever 10325.

Figure 103C:
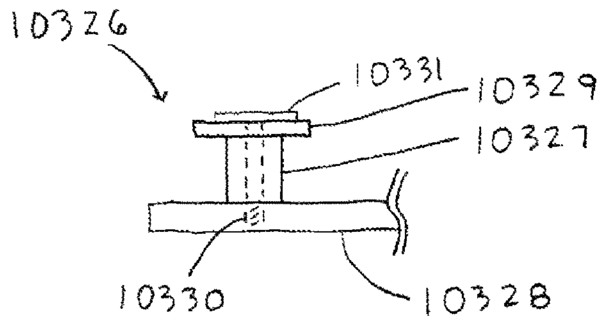

FIG. 103C is a side section view of a portion 10326 of an embodiment of an active foodware system. The portion 10326 of FIG. 103C is similar in some aspects to the portion 10319 of FIG. 103B, except there is no lower plastic or stainless steel shim washer under a rubber washer. Instead, a plastic or metal (e.g., aluminum) hollow spacer 10327 or standoff, on top of a cantilever 10328, supports the bottom surface of the rubber washer 10329. The screw 10330, such as a wafer-head screw, with screw head 10331, is screwed into the cantilever 10328.

Figure 103D:
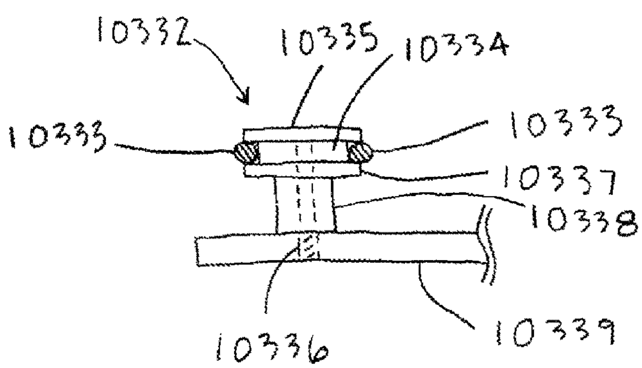

FIG. 103D is a side section view of a portion 10332 of an embodiment of an active foodware system. The portion 10332 of FIG. 103D is similar in some aspects to the portion 10319 of FIG. 103B, except an O-ring 10333 around a spacer 10334 or washer replaces the rubber washer 10322 of FIG. 103B. The head 10335 of a screw 10336, such as a wafer-head screw, supports the top of the O-ring 10333 and its spacer 10334 or washer. A stainless steel shim or washer 10337, on top of a plastic or metal (e.g., aluminum) hollow spacer 10338 or standoff, on top of a cantilever 10339, supports the bottom of the O-ring 10333 and its spacer 10334 or washer. The screw 10336 is screwed into the cantilever 10339.

Figure 104A:
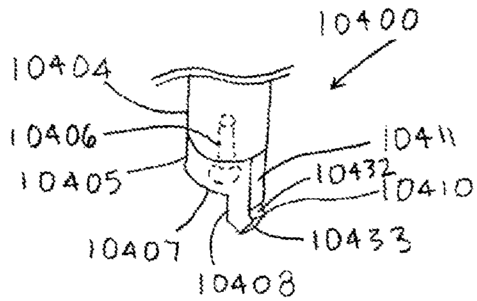
FIGS. 104A-104G are views of portions of embodiments of an active foodware system, including portions of legs and cantilevers, where the legs are for supporting a dining plate mating structure on the cantilever, and for being held to the side of the cantilever by a spring or O-ring.

FIG. 104A is a perspective view of a portion 10400 of an embodiment of an active foodware system. The portion 10400 is a portion of a leg of a dining plate mating structure (not shown) for supporting the dining plate mating structure on a cantilever 10401 (see FIGS. 104C and 104D), and for being held to the side of the cantilever 10401 by a spring 10402 (see FIG. 105A) or an O-ring 10403 (see FIG. 106). As provided by FIG. 104A, the portion 10400 may have an upper leg piece 10404 and lower leg piece 10405 joined by a screw 10406. The lower leg piece 10405 has a ledge 10407 and a protruding tongue 10408 extending down. The tongue 10408 is for fitting in a groove 10409 in the side of the cantilever 10401 (see FIGS. 104C, 104D, and 104E). The tongue 10408 may have a ridge 10410 extending to the side, and a flat surface 10411 above the ridge 10410. The ridge may have an upward-facing face 10432 and a downward-facing face 10433.

Figure 104B:
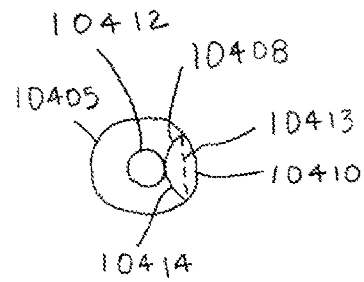

FIG. 104B is a bottom view of the portion 10400. FIG. 104B provides a screw hole 10412, the tongue 10408, and a hidden line 10413 identifying the flat surface 10411 above the ridge 10410. The tongue 10408 may have a curved inner surface 10414 to match a curved groove 10409 in the side of the cantilever 10401 (see FIGS. 104D and 104E).

Figure 104C:
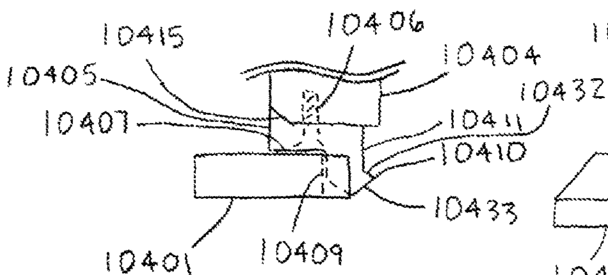

FIG. 104C is a side section view of the portion 10400 of the leg on the cantilever 10401. The ledge 10407 is on the cantilever 10401, and the tongue 10408 is in the groove 10409 of the cantilever 10401. As provided by FIG. 104C, the lower leg piece 10405 may have an alignment wedge 10415 for aligning the lower leg piece 10405 with the upper leg piece 10404. The screw 10406 may be a flathead screw. As provided in FIG. 104C, the tongue 10408 has a ridge 10410 with an upward-facing face 10432 and a downward-facing face 10433.

Figure 104D:
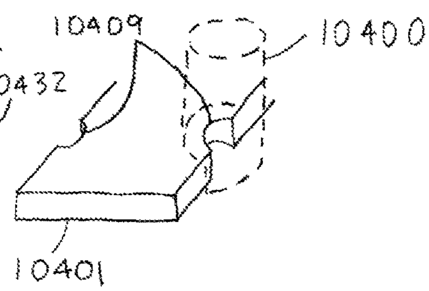

FIG. 104D is a perspective view of the cantilever 10401 with a dashed outline of the portion 10400 of the leg in the groove 10409 of the cantilever 10401.

Figure 104E:
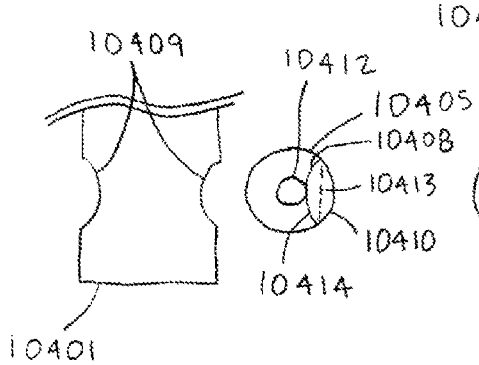

FIG. 104E is a bottom view of the portion 10400 next to the cantilever 10401. As provided for FIG. 104B, the tongue 10408 may have a curved inner surface 10414 to match the curved groove 10409 in the side of the cantilever 10401.

Figure 104F:
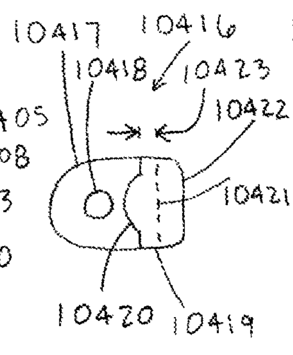

FIG. 104F is a bottom view of an alternate embodiment 10416 of the portion 10400. FIG. 104F provides a lower leg piece 10417 having a screw hole 10418, a tongue 10419 with curved inner surface 10420, and a hidden line 10421 identifying a flat surface above a ridge 10422 that is not as curved as the ridge 10410 of the portion 10400. As provided by FIG. 104F, the tongue 10419 is thicker 10423 than the tongue 10408 of the portion 10400, so it is less likely to break.

Figure 104G:
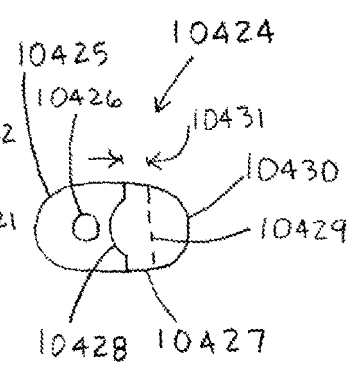

FIG. 104G is a bottom view of an alternate embodiment 10424 of the portion 10400. FIG. 104G provides a lower leg piece 10425 having a screw hole 10426, a tongue 10427 with curved inner surface 10428, and a hidden line 10429 identifying a flat surface above a ridge 10430 with similar curvature as the ridge 10410 of the portion 10400. As provided by FIG. 104G, the tongue 10427 is thicker 10431 than the tongue 10408 of the portion 10400, so it is less likely to break.

Figure 105A:
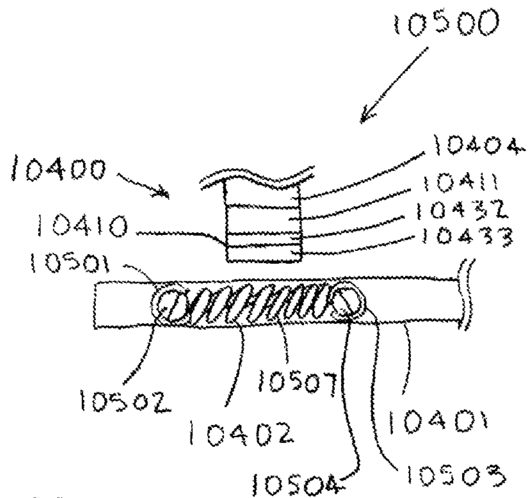
FIGS. 105A-105D are side views of portions of an embodiment of an active foodware system, including portions of a cantilever and spring for holding a leg of a dining plate mating structure against the side of the cantilever.

FIG. 105A is a side view of a portion 10500 of an embodiment of an active foodware system. For continuity between FIGS. 104A-104G and FIGS. 105A-105D, the same element numbers initially used in FIGS. 104A-104G are used for the identical elements of FIGS. 105A-105D. In the portion 10500 is the portion 10400 of a leg provided in FIG. 104A, where the portion 10400 is positioned above the cantilever 10401. A first end 10501 of the spring 10402 is held to the side of the cantilever 10401 by a head 10502 of a first screw. Similarly, a second end 10503 of the spring 10402 is held to the side of the cantilever 10401 by a screw head 10504 of a second screw.

Figure 105B:
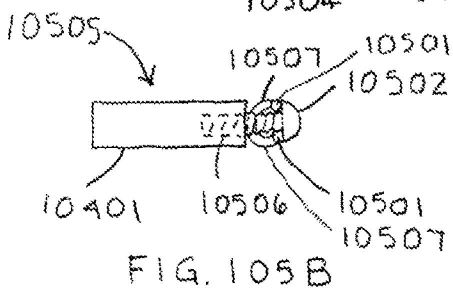

FIG. 105B is an end section view of a portion 10505 of an embodiment of an active foodware system. The end section view is looking down the end of the cantilever beam 10401. The head 10502 of the first screw 10506 holds the first end 10501 of the spring 10402 in place, where the loops 10507 of the spring 10402 are held against the side of the cantilever 10401.

As is evident from comparing the side section view of FIG. 104C with the side section view of FIG. 105B, that in order to achieve the configuration of FIG. 104C, the ridge 10410 of the tongue 10408 of the portion 10400 of the leg must pass between the loops 10507 of the spring 10402 and the cantilever 10401 of FIG. 105A, such that the loops 10507 of the spring 10402 rest against the flat surface 10411 of the tongue 10408. Due to the thickness of the tongue 10408, and based on physics and the tension in the spring 10402, the flat surface 10411 of the tongue 10408 of the portion 10400 of the leg will be held against the side of the cantilever 10401, and the curved inner surface 10414 of the tongue 10408 will be held in the groove 10409 of the cantilever 10401.

Figure 105C:
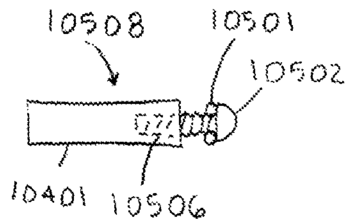

FIG. 105C is an end section view of a portion 10508 of an embodiment of an active foodware system. The end section view is looking down the end of the cantilever beam 10401. The portion 10508 of FIG. 105C is similar to the portion 10505 of FIG. 105B, except, in FIG. 105C, only the first end 10501 of the spring 10402 is shown against the head 10502 of the screw 10506, and the loops 10507 of the spring 10402 are not shown.

Figure 105D:
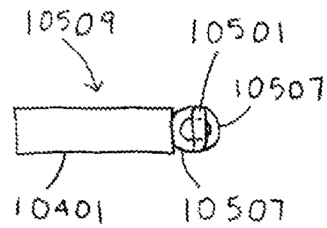

FIG. 105D is an end view of a portion 10509 of an embodiment of an active foodware system. The end view is looking down the end of the cantilever beam 10401. The portion 10509 of FIG. 105D is similar to the portion 10505 of FIG. 105B, except, in FIG. 105D, only the first end 10501 of the spring 10402 and the loops 10507 of the spring 10402 are shown, and the head 10502 and the screw 10506 are not shown.

Figure 106:
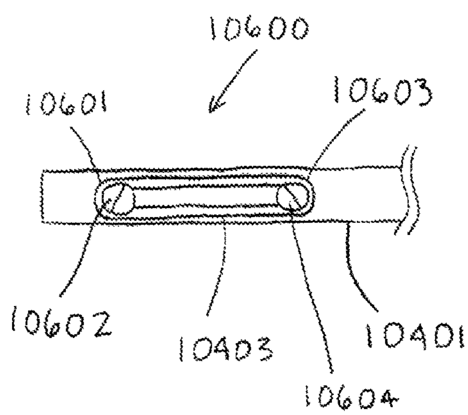
FIG. 106 is a side view of a portion of an embodiment of an active foodware system, including a portion of a cantilever and an O-ring for holding a leg of a dining plate mating structure against the side of the cantilever.

FIG. 106 is a side view of a portion 10600 of an embodiment of an active foodware system. For continuity between FIGS. 104A-104G, FIGS. 105A-105D and FIG. 106, the same element numbers initially used in FIGS. 104A-104G and FIGS. 105A-105D are used for the identical elements of FIG. 106. A first end 10601 of the O-ring 10403 is held to the side of the cantilever 10401 by a head 10602 of a first screw. Similarly, a second end 10603 of the O-ring 10403 is held to the side of the cantilever 10401 by a screw head 10604 of a second screw. In a similar manner to the spring 10402 of FIG. 105A, due to the thickness of the tongue 10408, and based on physics and the tension in the O-ring 10403, the flat surface 10411 of the tongue 10408 of the portion 10400 of the leg will be held against the side of the cantilever 10401, and the curved inner surface 10414 of the tongue 10408 will be held in the groove 10409 of the cantilever 10401. A benefit of the O-ring 10403, is that it is typically cheaper than a spring 10402.

Figure 107A:
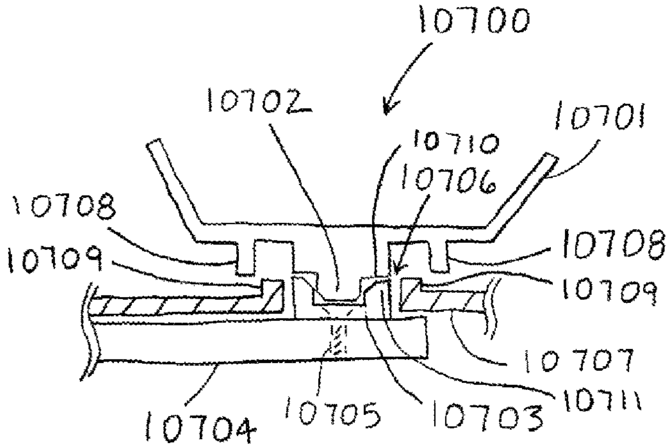
FIGS. 107A and 107C are side section views of portions of embodiments of an active foodware system, where a dining plate mating structure has a protrusion for inserting into a base piece attached to a cantilever.

FIG. 107A is a side section view of a portion 10700 of an embodiment of an active foodware system. A dining plate mating structure 10701 has a protrusion 10702 for inserting into a base piece 10703 attached to a cantilever 10704. The base piece 10703 may be attached to the cantilever 10704 by a flathead screw 10705. The base piece 10703 may be flexible plastic, such as polypropylene. When connected, the protrusion 10702 and base piece 10703 pass through an opening 10706 in the top panel 10707 of a cantilever compartment. The dining plate mating structure 10701 may also have a barrier 10708 hanging down around a barrier 10709 extending up on the top panel 10707 and surrounding the opening 10706. The dining plate mating structure 10701 is less stable if the protrusion 10702 rests on the screw 10705 or on the flexible base piece 10703 than if it rests on the cantilever 10704. For instance, in FIG. 107A, the protrusion 10702 has shoulders 10710 for resting on the walls 10711 of the base piece 10703

Figure 107B:
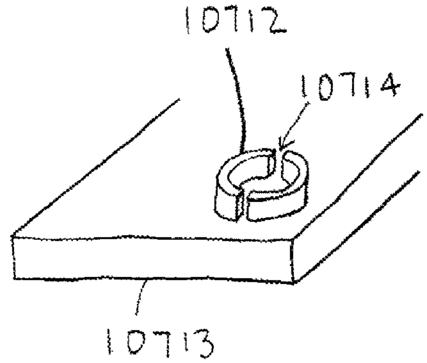
FIG. 107B is a perspective view of an embodiment of a circular base piece attached to a cantilever.

FIG. 107B is a perspective view of an embodiment of a circular base piece 10712 attached to a cantilever 10713, where the base piece 10712 has one or more optional slits 10714 for flexure, and to allow the base piece 10712 to release air when a protrusion is inserted.

Figure 107C:
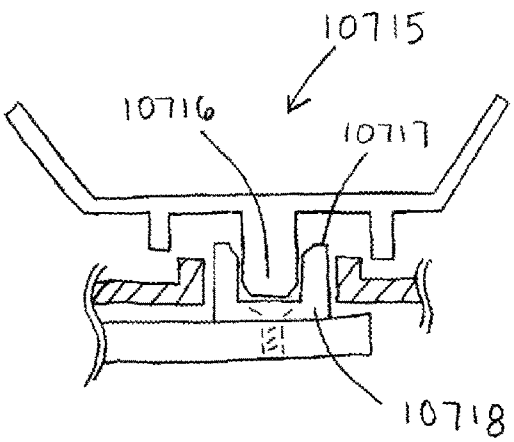

FIG. 107C is a side section view of a portion 10715 of an alternate embodiment of an active foodware system. The portion 10715 of FIG. 107C is similar to the portion 10700 of FIG. 107C, except the protrusion 10716 of FIG. 107C does not have shoulders to rest on the walls 10717 of a base piece 10718. Additionally, the walls 10717 of the base piece 10718 of the portion 10715 are taller than the walls 10711 of the base piece 10703 of the portion 10700.

Figure 107D:
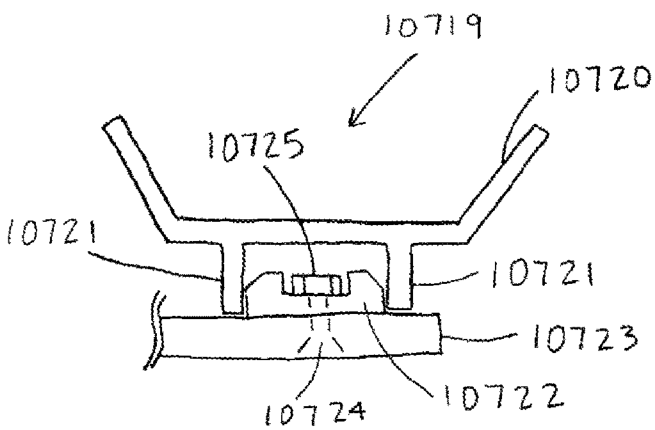
FIG. 107D is a side section view of a portion of an embodiment of an active foodware system, where a dining plate mating structure has a protrusion for attaching around a base piece attached to a cantilever.

FIG. 107D is a side section view of a portion 10719 of an embodiment of an active foodware system. A dining plate mating structure 10720 has a protrusion 10721 for attaching around a base piece 10722 attached to a cantilever 10723. The base piece 10722 may be attached to the cantilever 10723 by a flathead screw 10724 and a nut 10725. As provided by FIG. 107D, the protrusion 10721 rests on the cantilever 10723, so the dining plate mating structure 10720 is more stable than the configurations of FIGS. 107A and 107C.

Figure 107E:
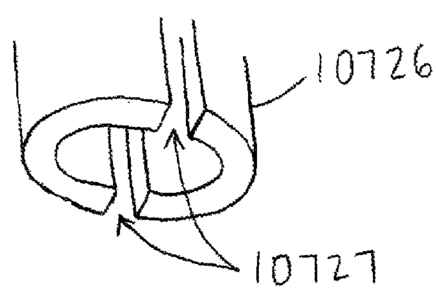
FIG. 107E is a perspective view from below of an embodiment where the protrusion of FIG. 107D is a circular protrusion.

FIG. 107E is a perspective view from below of an embodiment where the protrusion 10721 of FIG. 107D is a circular protrusion 10726. The circular protrusion 10726 has one or more side slits 10727 to allow flexure, and to allow air to escape when it is attached around a base piece.

Figure 108A:
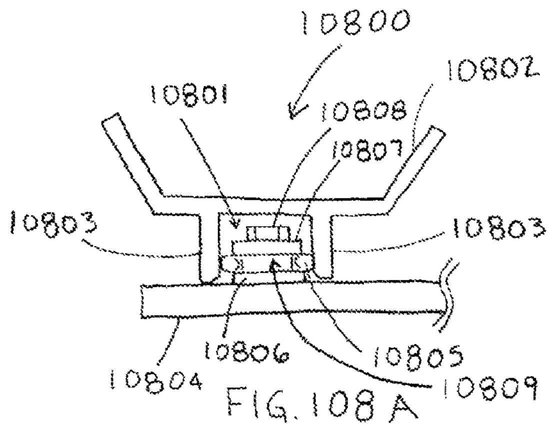
FIG. 108A is a side section view of a portion of an embodiment of an active foodware system, where a dining plate mating structure has a protrusion for attaching around a base piece attached to a cantilever, and where the base piece includes a rubber O-ring.

FIG. 108A is a side section view of a portion 10800 of an embodiment of an active foodware system. The portion 10800 of FIG. 108A is similar to the portion 10719 of FIG. 107D, except for a base piece 10801. A dining plate mating structure 10802 has a protrusion 10803 for attaching around the base piece 10801 attached to a cantilever 10804. The base piece 10801 includes a rubber O-ring 10805. The O-ring 10805 has a Nylon washer 10806 under it to elevate it from the cantilever 10804. Another Nylon washer 10807 is on the top of the O-ring 10805, and a nut 10808 is on top of the washer 10807. In the middle of the O-ring 10805 there is a middle Nylon washer 10809 to prevent the O-ring 10805 from collapsing. The assembled base piece 10801 may be attached to the cantilever 10804 by a screw and the nut 10808. As provided by FIG. 108A, the protrusion 10803 rests on the cantilever 10804, so the dining plate mating structure 10802 is more stable than the configurations of FIGS. 107A and 107C.

Figure 108B:
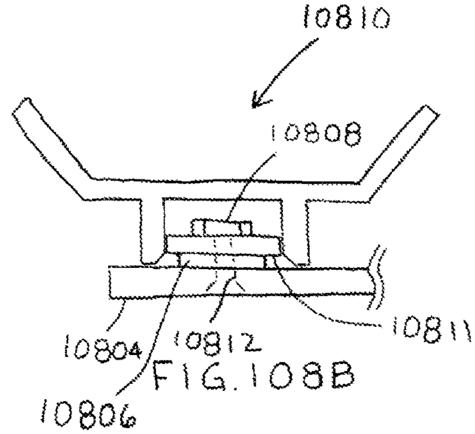
FIG. 108B is similar FIG. 108A, except a rubber washer replaces the O-ring.

FIG. 108B is a side section view of a portion 10810 of an alternate embodiment of an active foodware system. The portion 10810 of FIG. 108B is similar to the portion 10800 of FIG. 108A, except a rubber washer 10811 replaces the O-ring 10805 and top Nylon washer 10807, and no middle Nylon washer 10809 is needed to prevent the rubber washer 10811 from collapsing. FIG. 108B also provides a dashed outline 10812 for the screw that attaches the assembled base piece 10801 to the cantilever 10804, along with a nut 10808.

Figure 109A:
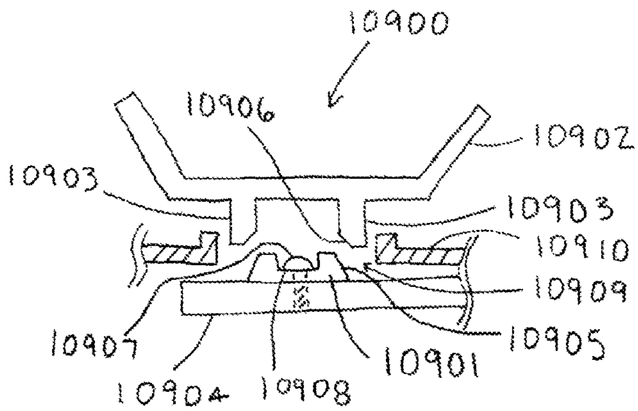
FIG. 109A is similar FIG. 108A, except for a different base piece.

FIG. 109A is a side section view of a portion 10900 of an embodiment of an active foodware system. The portion 10900 of FIG. 109A is similar to the portion 10800 of FIG. 108A, except for a different base piece 10901. A dining plate mating structure 10902 has a protrusion 10903 for attaching around the base piece 10901 attached to a cantilever 10904. As evident in FIG. 109A, the base piece 10901 has sloping sides 10905 with a slope similar to the slope of the inner edges 10906 of the protrusion 10903. A screw 10907 attaches the base piece 10901 to the threaded cantilever 10904. As provided by FIG. 109A, the screw 10907 may pass through a recessed portion 10908 in the center of the base piece 10901. Also as provided by FIG. 109A, the protrusion 10903 may attach to the base piece 10901 through an opening 10909 in a top panel 10910.

Figure 109B:
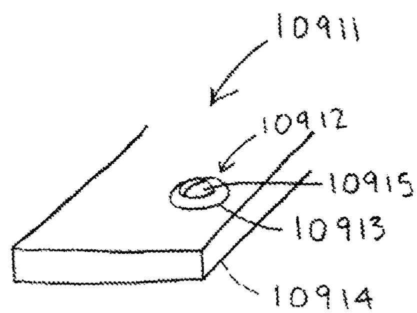
FIG. 109B provides a base piece including an O-ring attached to a cantilever with a screw.

FIG. 109B is a perspective view of a portion 10911 of an embodiment of an active foodware system. The portion 10911 of FIG. 109B provides a base piece 10912 including an O-ring 109B attached to a cantilever 10914 with a screw 10915.

Figure 109C:
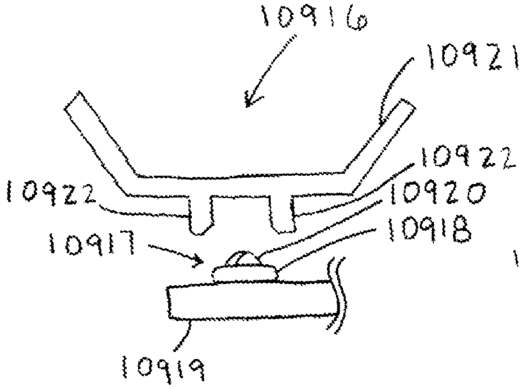
FIG. 109C is similar to FIG. 109A, where the base piece of FIG. 109C includes a rubber O-ring, grommet, or washer attached to a cantilever with a screw.

FIG. 109C is a side view of a portion 10916 of an embodiment of an active foodware system. The portion 10916 of FIG. 109C is similar to the portion 10900 of FIG. 109A, where the base piece 10917 of FIG. 109C includes a rubber O-ring 10918, grommet, or washer attached to a cantilever 10919 with a screw 10920. In FIG. 109C, a dining plate mating structure 10921 includes a protrusion 10922 for attaching around the base piece 10917. For the base piece 10917, typically an O-ring 10918 is preferred to a washer, since the O-ring 10918 makes a single point of contact with the wall of the protrusion 10922. An advantage of the protrusion 10922 being on the outside of the base piece 10917 is that the dining plate mating structure 10921 rests on the cantilever 10919, so it's stable.

Figure 109D:
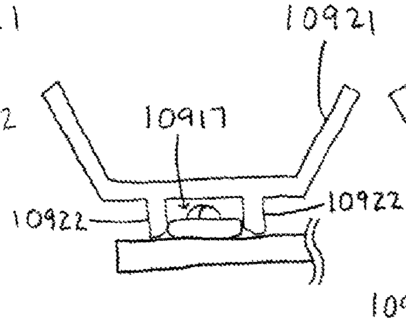
In FIG. 109D, the dining plate mating structure is lowered, such that the protrusion is attached around the base piece.

FIG. 109D is a side view of the portion 10916 of FIG. 109C, but where the dining plate mating structure 10921 is lowered, such that the protrusion 10922 is attached around the base piece 10917.

Figure 109E:
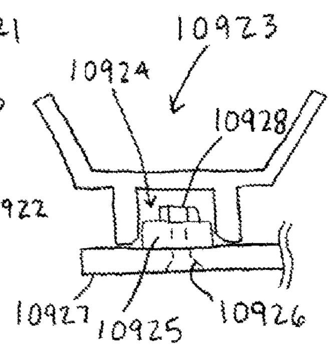
In FIG. 109E the base piece includes a tall rubber washer.

FIG. 109E is a side section view of a portion 10923 of an embodiment of an active foodware system. The portion 10923 of FIG. 109E is similar to the portion 10810 of FIG. 108B, except the base piece 10924 includes a rubber washer 10925 that is taller, and there is no lower Nylon washer 10806. FIG. 109E provides a dashed outline 10926 for the screw that attaches the base piece 10924 to a cantilever 10927, along with a nut 10928.

Figure 110B:
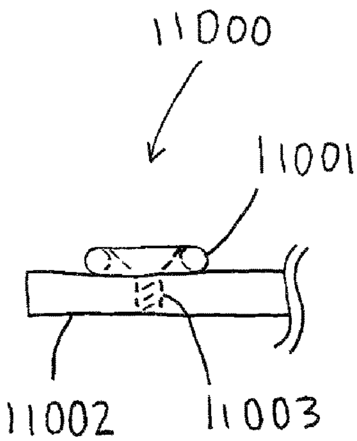
Figure 110A:
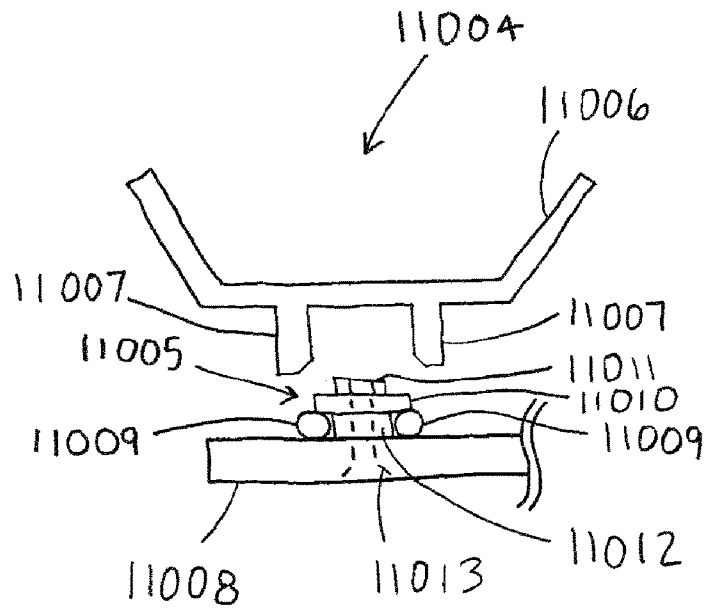

FIG. 110A is a side section view of a portion 11004 of an embodiment of an active foodware system. The portion 11004 of FIG. 110A is similar to the portion 10800 of FIG. 108A, except the base piece 11005 does not have a lower Nylon washer 10806, and a dining plate mating structure 11006 is not yet lowered and attached to the base piece 11005. Similar to the portion 10800 of FIG. 108A, FIG. 110A provides the dining plate mating structure 11006 with a protrusion 11007 for attaching around the base piece 11005 attached to a cantilever 11008. The base piece 11005 includes an O-ring 11009. The O-ring 11009 has a Nylon washer 11010 on the top, and a nut 11011 is on top of the washer 11010. In the middle of the O-ring 11009 there is a middle Nylon washer 11012 to prevent the O-ring 11009 from collapsing. The assembled base piece 11005 may be attached to the cantilever 11008 by a screw 11013 and the nut 11011. Because the nut 11011 is used, there is no need to thread the cantilever 11008.

FIG. 110B is a side section view of a portion 11000 of an embodiment of an active foodware system. The portion 11000 of FIG. 110B is similar to the portion 10916 of FIG. 109C, except where an O-ring 11001 is attached to a cantilever 11002 by a flathead screw 11003 threaded into the cantilever 11002.

FIG. 111A is a perspective view of a portion 11100 of an embodiment of an active foodware system. The portion 11100 of FIG. 111A is similar in some aspects to the embodiments of FIG. 9D-9E, and FIGS. 14A-14C. A dining plate mate structure 11101 (see the side section view of FIG. 111C) is supported by a cantilever 11102 attached to a load cell 11103. The portion 11100 of FIG. 111A provides a main cantilever 11102 together with multiple cantilever support beams 11104 and structure surrounding the main cantilever 11102. The cantilever support beams 11104 are also referred to as cantilever side beams. Similar to FIGS. 9D-9E, the surrounding cantilever support beams 11104 provide stiffness, so the main cantilever 11102 and the cantilever support beams 11104 may be made from plastic. There may be an opening 11105 for LED strip wires 11106 (see the plan view of FIG. 111B) to pass through. Similar to FIGS. 14A-14C, there may be drainage gaps/slots 11107 next to the main cantilever 11102.

FIG. 111B is a plan view of the portion 11100 of FIG. 111A, additionally providing an LED strip 11108 with LEDs 11109, with the LED strip 11108 around the inner area of the cantilever support beams 11104. LED strip electrical wires 11106 pass through the opening 11105 for the LED strip wires 11106. The load cell 11103 may be a beam load cell. The drainage gaps/slots 11107 are for water to drain down, and for the LED strip 11108 to be supported from beneath, if desired. Supporting 11110 the LED strip 11108 from above may be sufficient (as shown in FIG. 111C).

FIG. 111C is a side section view of the portion 11100 of FIG. 111A, additionally providing an LED strip 11108 with LEDs 11109, with the LED strip 11108 around the inner area of the cantilever support beams 11104. As provided in FIG. 111C, the LED strip 11108 may be supported 11110 from above. The dining plate mating structure 11101 is provided attached to the main cantilever 11102. The dining plate mating structure 11101 may be attached to the main cantilever 11102 by screws 11111 through holes 11119 in the cantilever 11102. The dining plate mating structure 11101 is also referred to as a dish holder/receptacle. A dining dish 11112 is on the dining plate mating structure 11101. Similar to FIG. 14B, the dining dish 11112 of FIG. 111C may have a surrounding water barrier 11113 and lifting tabs 11114. As provided by FIGS. 111A-111C, the cantilever support beams 11104 may have a top extension 11115 that attaches to the top of the load cell, and may have a bottom extension 11116 that attaches to the bottom of the load cell. The top 11115 and bottom 11116 extensions may attach to the load cell with screws 11117. The top 11115 and bottom 11116 extensions may be connected by a side panel 11118 that covers the end of the load cell.

A first useful embodiment of the invention includes an active foodware system including a dining plate having a dining surface, the dining surface being recessed in relation to a region of the dining plate surrounding the dining surface, the dining surface recessed for receiving solid food and preventing spillage from the dining surface; and a visual stimulating component that is software programmable for emitting light from the region for providing a user with information or entertainment, which may be while dining; wherein the region comprises a wall for retaining the food on the dining surface; the wall comprising a translucent wall portion; the visual stimulating component comprising a plurality of LED elements positioned on the opposite side of the wall to the dining surface; and the direction of maximum radiation intensity of each LED element directed at the wall for emitting light through the translucent wall portion.

A second useful embodiment of the invention includes an active foodware system including a dining plate having a dining surface, the dining surface being recessed in relation to a region of the dining plate surrounding the dining surface, the dining surface recessed for receiving solid food and preventing spillage from the dining surface; and a visual stimulating component that is software programmable for emitting light from the region for providing a user with information or entertainment, which may be while dining; and a sensing component comprising a load cell for sensing weight of the food, the dining surface not extending over the load cell.

The second useful embodiment of the invention may additionally include a dining plate mate for removably mating with the dining plate; wherein the load cell is a beam-type load cell; a cantilever beam is attached to the load cell and to the mate; and the cantilever beam extends to one side of the load cell at substantially a 90-degree angle.

Active foodware systems are provided above that include a number of different elements, components, features, circuits, and capabilities. It is not practical given space constraints to include a different figure for each possible combination, and so the elements, components, features, circuits, and capabilities are provided individually and in exemplary embodiment to clearly demonstrate the implementation and exemplary combinations of such elements, components, features, circuits, and capabilities that may be combined. Accordingly, any of the elements, components, features, circuits, and capabilities provided in one figure or embodiment may be combined with any of the elements, components, features, circuits, and capabilities provided in another figure or embodiment, to provide another useful embodiment of this invention, as if such elements, components, features, circuits, and capabilities are explicitly provided in a single figure. For example, although not explicitly shown, any embodiment provided may include one or a plurality of load cells and/or load sensors, one or a plurality of LED and/or LED strips, one or a plurality of dining plate mating structures and dining plates, any of the waterproofing, liquid redirecting, and sealing apparatus or techniques provided, sensing and control, circuits, auditory components, reflective components, including 1-way and 2-way mirrors, and the like.

It is evident from the above description that a new way of using foodware in an active foodware system, particularly dinnerware, is provided. Instead of static dinnerware that while being attractive is passive, the subject dinnerware is active providing for numerous stimuli for a variety of purposes. The active foodware system dinnerware can be used to encourage young users or diners to eat their food, learn while eating, be responsive to requests and commands, be entertained, be monitored, listen to music, watch TV, communicate by means of the dinnerware, and the like. Adults may use the dinnerware to communicate with others, watch events, review activities, read email, search the internet, and the like. The subject active foodware system provides an entirely new paradigm in the use of common foodware and makes the active foodware system highly versatile in its applications.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An active foodware system comprising:

a dining plate having a dining surface, said dining surface being recessed in relation to a region of said dining plate surrounding said dining surface, said dining surface recessed for receiving solid food and preventing spillage from said dining surface; and a visual stimulating component that is software programmable for emitting light from said region for providing a user with information or entertainment;

wherein said region comprises a wall for retaining said food on said dining surface;

said wall comprises a translucent wall portion;

said visual stimulating component comprises a plurality of LED elements positioned on the opposite side of said wall to said dining surface; and the direction of maximum radiation intensity of each said LED element is directed substantially inward to the center region of said dining plate for emitting light through said translucent wall portion.

2. The active foodware system according to claim 1, wherein each of said LED elements is individually software controlled for providing visual effects while dining.

3. The active foodware system according to claim 1 further comprising an auditory display or haptic display for providing feedback synchronized with said information or entertainment.

4. The active foodware system according to claim 1, wherein said wall is substantially vertical or diagonal.

5. The active foodware system according to claim 1 further comprising a software programmable processor and wireless communication component, said software programmable processor for controlling said LED elements, and said wireless communication component for wirelessly communicating digital data with a second processor or for wirelessly receiving electrical power.

6. The active foodware system according to claim 5, wherein said second processor includes a server computer, a mobile telephone, a tablet computer, a game console, or a wireless computer.

7. The active foodware system according to claim 1, said dining surface comprising a translucent dining portion;

wherein each said LED element further for emitting light upward through said translucent dining portion.

8. The active foodware system according to claim 7 further comprising an extended surface extending from the top of said wall in a direction away from said dining surface;

said extended surface comprising a translucent extended portion;

wherein each said LED element further for emitting light upward through said translucent extended portion.

9. The active foodware system according to claim 8, said extended surface for carrying said dining plate or for guiding said food onto said dining surface.

10. The active foodware system according to claim 8 further comprising a mechanical structure for at least one of (1) supporting said dining plate and (2) enclosing electrical components;

wherein at least one of said dining surface, said translucent wall portion, and an LED element are positioned below the top surface of said mechanical structure.

11. The active foodware system according to claim 10, wherein at least a portion of said extended surface extends over at least a portion of said mechanical structure, or at least a portion of said extended surface is attached to said mechanical structure by a flexible moisture seal.

12. The active foodware system according to claim 8 further comprising a reflective surface;

wherein each said LED element further for emitting light for reflecting as reflected light from said reflective surface, at least a portion said reflected light passing through said translucent dining portion, or said translucent wall portion, or said translucent extended portion.

13. The active foodware system according to claim 12, wherein said reflective surface is positioned beneath said dining surface, or said wall, or said extended surface.

14. The active foodware system according to claim 12, wherein said translucent dining portion, or said translucent wall portion, or said translucent extended portion includes a partially reflective surface for reflecting a reflected portion of said reflected light and transmitting a transmitted portion of said reflected light.

15. An active foodware system comprising:

a dining plate having a dining surface, said dining surface being recessed in relation to a region of said dining plate surrounding said dining surface, said dining surface recessed for receiving solid food and preventing spillage from said dining surface;

a visual stimulating component that is software programmable for emitting light from said region for providing a user with information or entertainment; and a sensing component comprising a load cell for sensing weight of said food, said dining surface not extending over said load cell.

16. The active foodware system according to claim 15, wherein the top surface of said load cell is higher than said dining surface.

17. The active foodware system according to claim 15 further comprising a flexible seal for repelling liquid, said flexible seal attached to said dining plate and to a mechanical structure enclosing electrical components, said flexible seal for preventing liquid from contacting said electrical components.

18. The active foodware system according to claim 17, said flexible seal comprising silicone rubber, or polyurethane laminate fabric, or a bellows.

19. The active foodware system according to claim 15 further comprising a dining plate mate for removably mating with said dining plate;

wherein said load cell is a beam-type load cell;

a cantilever beam is attached to said load cell and to said mate; and said cantilever beam extends to one side of said load cell at substantially a 90-degree angle.

20. The active foodware system according to claim 19, wherein at least a portion of the top surface of said mate comprises a similar shape to at least a portion of the bottom surface of said dining plate, wherein when said dining plate is placed on said mate, said dining plate is substantially prevented by said mate from translating or rocking relative to said mate.

21. The active foodware system according to claim 19, wherein when said dining plate is mated with said mate, said cantilever beam extends under said dining surface.

22. The active foodware system according to claim 15, wherein said load cell is attached to a cantilever beam extending substantially to the side of said load cell for supporting said dining surface.

23. The active foodware system according to claim 22, wherein the top surface of said load cell is higher than the top surface of said cantilever beam.

24. The active foodware system according to claim 22, said cantilever beam comprising a flexible seal for repelling liquid.

25. The active foodware system according to claim 24, said flexible seal attached to said cantilever and to a mechanical structure enclosing electrical components, said flexible seal for preventing liquid from contacting said electrical components.

26. The active foodware system according to claim 25, said flexible seal comprising silicone rubber, or polyurethane laminate fabric, or a bellows.

27. The active foodware system according to claim 15 further comprising a software programmable processor for processing weight from said sensing component to provide a weight signal.

28. The active foodware system according to claim 27, said software programmable processor for further processing said weight signal with nutrient information to provide a nutrient signal.

29. The active foodware system according to claim 28, wherein said nutrient information is received wirelessly from a server computer, and said nutrient signal is further processed with user information to provide user health information.

30. The active foodware system according to claim 28 further comprising a wireless communication component for wirelessly communicating said nutrient signal with a second processor.

31. The active foodware system according to claim 30, wherein said second processor is for displaying said nutrient signal, or said software programmable processor further for controlling light intensity or color of a plurality of LED elements for emitting light from said region.

32. The active foodware system according to claim 30, wherein said nutrient information is calorie density, said nutrient signal is number of calories, and said second processor is a mobile telephone or tablet computer, and said second processor displaying said number of calories.

33. The active foodware system according to claim 15, said sensing component comprising a plurality of load cells for sensing weight of said food, said dining surface not extending over any of said load cells.

34. The active foodware system according to claim 33 further comprising a mechanical structure supporting a plurality of dining surfaces;

wherein each of said load cells is for sensing weight of food on a different dining surface; and none of said dining surfaces extend over any of said load cells.

35. The active foodware system according to claim 33 further comprising a dining plate mate for removably mating with said dining plate;

wherein said mate is supported by at least one of said load cells.

36. The active foodware system according to claim 35, wherein said mate is attached to at least one of said load cells, or said mate is attached to at least one cantilever beam, wherein each said cantilever beam is attached to a different one of said load cells.

37. The active foodware system according to claim 35 further comprising a mechanical structure supporting a plurality of dining plate mates, each dining plate mate for removably mating with a different dining plate;

wherein each of said dining plate mates is supported by at least one of said load cells, and each said load cell supports at most one of said dining plate mates.

38. The active foodware system according to claim 37, wherein each of said load cells is positioned to the side of said dining plate mate it supports and not between any two of said dining plate mates, whereby said plurality of dining plate mates may be positioned near each other without positional interference from a said load cell.

39. The active foodware system according to claim 37, wherein each of said dining plate mates is rectangular for mating with rectangular dining plates.

* * * * *